(12) United States Patent
Kondo et al.

(10) Patent No.: US 7,672,526 B2
(45) Date of Patent: Mar. 2, 2010

(54) SIGNAL PROCESSING DEVICE, SIGNAL PROCESSING METHOD, PROGRAM, AND RECORDING MEDIUM

(75) Inventors: Tetsujiro Kondo, Tokyo (JP); Kazushi Yoshikawa, Kanagawa (JP); Tetsushi Kokubo, Kanagawa (JP); Hisakazu Shiraki, Kanagawa (JP); Michimasa Obana, Tokyo (JP); Masanori Kanemaru, Kanagawa (JP); Hideo Kasama, Kanagawa (JP)

(73) Assignee: Sony Corporation, Tokyo (JP)

( * ) Notice: Subject to any disclaimer, the term of this patent is extended or adjusted under 35 U.S.C. 154(b) by 1082 days.

(21) Appl. No.: 10/556,842
(22) PCT Filed: Jun. 15, 2004
(86) PCT No.: PCT/JP2004/008690

§ 371 (c)(1),
(2), (4) Date: Nov. 16, 2005

(87) PCT Pub. No.: WO2005/001762

PCT Pub. Date: Jan. 6, 2005

(65) Prior Publication Data

US 2007/0110333 A1    May 17, 2007

(30) Foreign Application Priority Data

Jun. 27, 2003    (JP) .............................. 2004-184017

(51) Int. Cl.
*G06K 9/36*    (2006.01)
(52) U.S. Cl. ..................................... 382/254; 382/276
(58) Field of Classification Search ................ 382/275, 382/276; 348/208.1
See application file for complete search history.

(56) References Cited

U.S. PATENT DOCUMENTS 5,563,963 A * 10/1996 Kaplan et al. ............... 382/266
6,052,489 A * 4/2000 Sakaue ....................... 382/266
6,285,801 B1 * 9/2001 Mancuso et al. ............ 382/268
6,678,405 B1 * 1/2004 Kondo et al. ................ 382/159
7,224,851 B2 * 5/2007 Kinjo ......................... 382/276

FOREIGN PATENT DOCUMENTS

JP    8-237476    9/1996

(Continued)

OTHER PUBLICATIONS

U.S. Appl. No. 11/626,556, filed Jan. 24, 2007, Kondo et al.

(Continued)

*Primary Examiner*—Charles Kim
*Assistant Examiner*—Stephen R Koziol
(74) *Attorney, Agent, or Firm*—Oblon, Spivak, McClelland, Maier & Neustadt, L.L.P.

(57) ABSTRACT

The present invention relates to a signal processing device and signal processing method, and program and recording medium, whereby images and the like closer approximating real world signals can be obtained. With regard to an input image of dimensions fewer than the dimensions of actual world light signals, wherein actual world light signals have been projected and a part of the continuity of the actual world light signals has been lost, actual world signals are estimated at an actual world signal estimating unit 10003 from the input image within a processing region set at a processing region setting unit 10001, corresponding to continuity set at a continuity setting unit 10002. On the other hand, information relating to at least one of processing region, continuity, and actual world signals, is supplied from a user I/F 10006 to the processing region setting unit 10001, continuity setting unit 10002, or actual world signal estimating unit 10003, according to user operations. The present invention can be applied to, for example, cases of removing movement blurring from an image, for example.

8 Claims, 190 Drawing Sheets

FOREIGN PATENT DOCUMENTS

| | | |
|---|---|---|
| JP | 10-200753 | 7/1998 |
| JP | 2000-201283 | 7/2000 |
| JP | 2001-84368 | 3/2001 |
| JP | 2001-250119 | 9/2001 |
| JP | 2002/112025 | 4/2002 |
| JP | 2002-373336 | 12/2002 |
| JP | 2003-16446 | 1/2003 |
| JP | 2003-16456 | 1/2003 |
| JP | 2003-18578 | 1/2003 |
| WO | WO 02/067193 A1 | 8/2002 |

OTHER PUBLICATIONS

U.S. Appl. No. 11/627,116, filed Jan. 25, 2007, Kondo et al.
U.S. Appl. No. 11/627,145, filed Jan. 25, 2007, Kondo et al.
U.S. Appl. No. 11/627,163, filed Jan. 25, 2007, Kondo et al.
U.S. Appl. No. 10/562,176, filed Dec. 23, 2005, Kondo et al.
U.S. Appl. No. 10/557,112, filed Nov. 16, 2005, Kondo et al.
Naoki Kojima, et al., "A Method for Resolution Enhancement Based on a Mathematical Model of Imaging Detectors", Proceedings of the 2003 IEICE General Conference, Institute of Electronics, Information and Communication Engineers, Mar. 19, 2003, D-11-p. 100.

* cited by examiner

FIG. 15
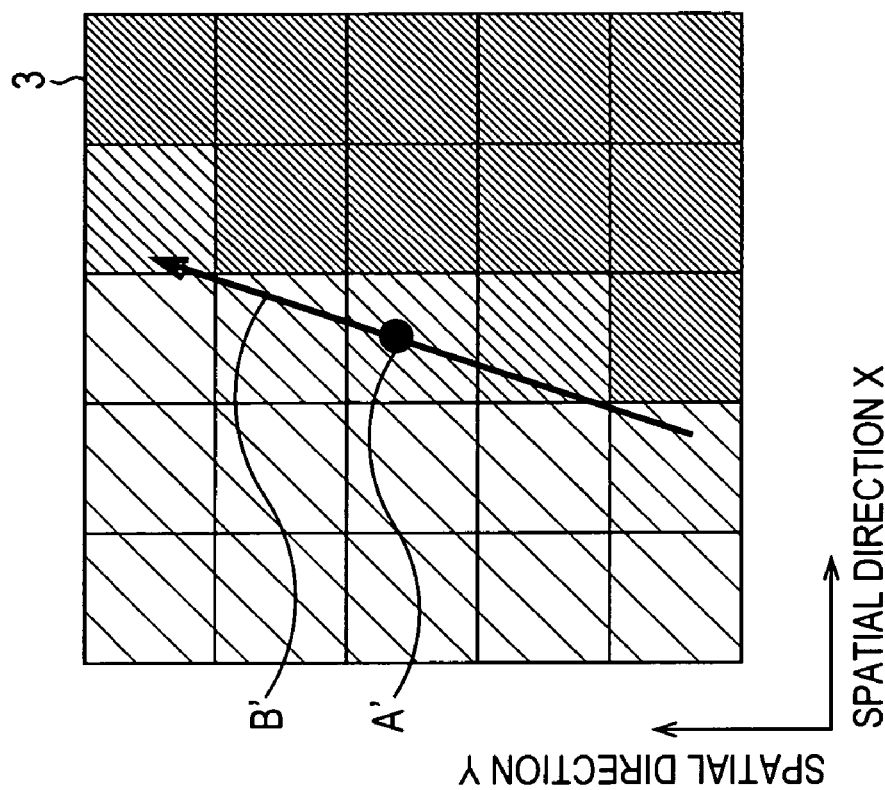
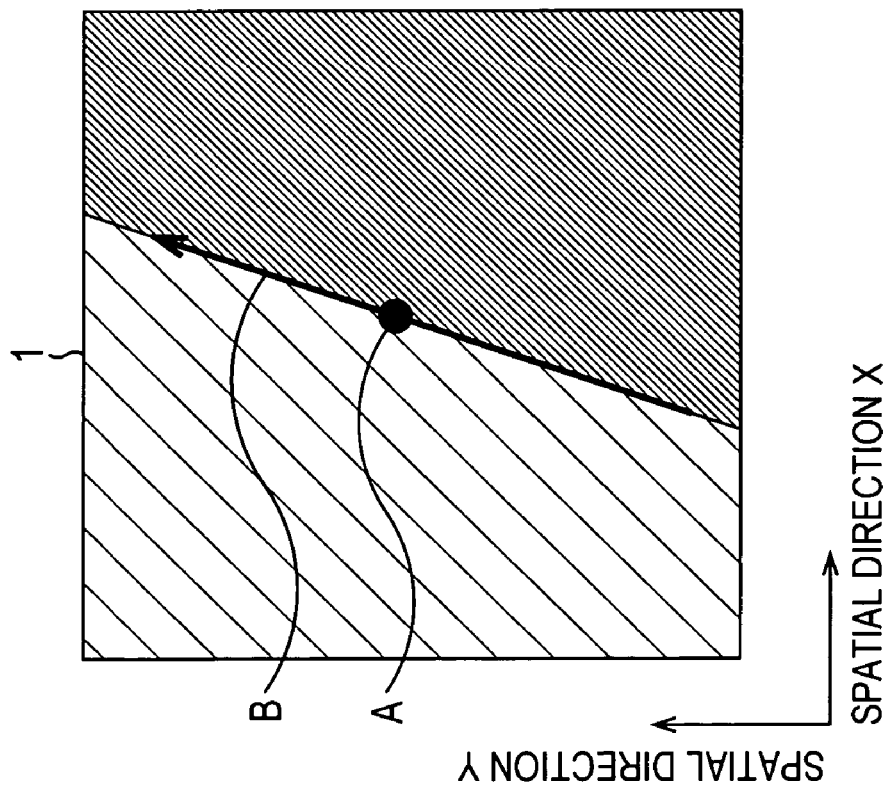

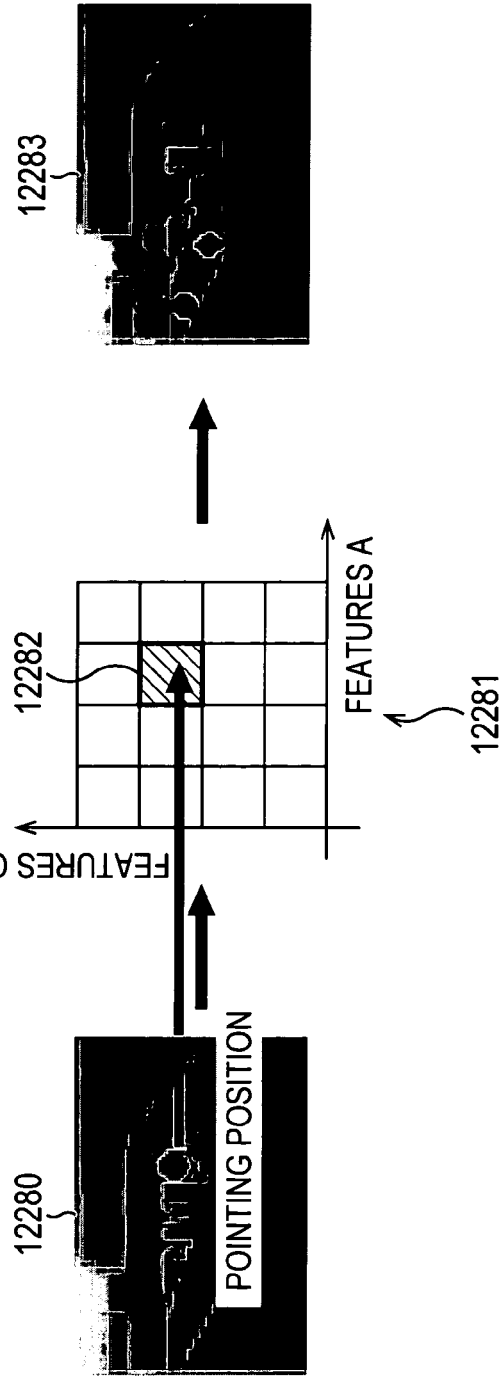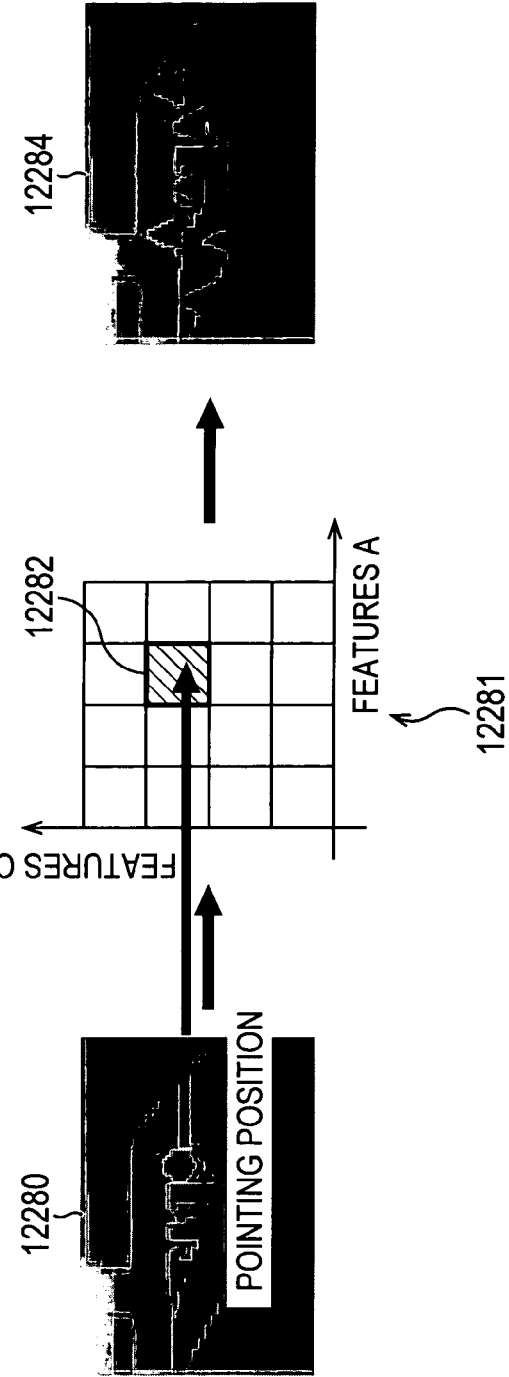

US 7,672,526 B2

SIGNAL PROCESSING DEVICE, SIGNAL PROCESSING METHOD, PROGRAM, AND RECORDING MEDIUM

TECHNICAL FIELD

The present invention relates to a signal processing device and signal processing method, and a program and recording medium, and in particular relates to a signal processing device and signal processing method, and a program and recording medium, enabling images and the like with closer approximation to real world signals.

BACKGROUND ART

Technology for detecting phenomena in the actual world (real world) with sensors and processing sampling data output from the sensors is widely used. For example, image processing technology wherein the actual world is imaged with an imaging sensor and sampling data which is the image data is processed, is widely employed.

Also, arrangements are known having second dimensions with fewer dimensions than first dimensions obtained by detecting with sensors first signals, which are signals of the real world having first dimensions, obtaining second signals including distortion as to the first signals, and performing signal processing based on the second signals, thereby generating third signals with alleviated distortion as compared to the second signals (e.g., Japanese Unexamined Patent Application Publication No. 2001-250119).

However, conventionally, signal processing taking into consideration the continuity of real world signals had not been performed, so obtaining images and the like which closer approximate real world signals has been difficult.

DISCLOSURE OF INVENTION

The present invention has been made in light of the situation as described above, and provides for obtaining of images and the like which closer approximate real world signals.

A signal processing device according to the present invention comprises: processing region setting means for setting a processing region to be processed, with regard to second signals of second dimensions that are fewer than first dimensions had by first signals which are real world signals and are projected whereby a part of the continuity of the real world signals is lost; continuity setting means for setting the continuity of the real world signals that has been lost in the second signals; actual world estimating means for estimating signals of the real world, corresponding to the second signals within a processing region set by the processing regions setting means, according to the continuity set by the continuity setting means; and information supplying means for supplying information relating to at least one of the processing region, the continuity, and the real world signals, to the processing region setting means, the continuity setting means, or the actual world estimating means, in accordance with user operations.

A signal processing method according to the present invention comprises: a processing region setting step for setting a processing region with processing region setting means for setting the processing region to be processed, with regard to second signals of second dimensions that are fewer than first dimensions had by first signals which are real world signals and are projected whereby a part of the continuity of the real world signals is lost; a continuity setting step for setting the continuity with continuity setting means for setting the continuity of the real world signals that has been lost in the second signals; an actual world estimating step for estimating signals of the real world with world estimating means for estimating signals of the real world, corresponding to the second signals within a processing region set in the processing regions setting step, according to the continuity set in the continuity setting step; and an information supplying step for supplying information relating to at least one of the processing region, the continuity, and the real world signals, to the processing region setting means, the continuity setting means, or the actual world estimating means, in accordance with user operations.

A program according to the present invention causes a computer to perform predetermined signal processing, the program comprising: a processing region setting step for setting a processing region with processing region setting means for setting the processing region to be processed, with regard to second signals of second dimensions that are fewer than first dimensions had by first signals which are real world signals and are projected whereby a part of the continuity of the real world signals is lost; a continuity setting step for setting the continuity with continuity setting means for setting the continuity of the real world signals that has been lost in the second signals; an actual world estimating step for estimating signals of the real world with world estimating means for estimating signals of the real world, corresponding to the second signals within a processing region set in the processing regions setting step, according to the continuity set in the continuity setting step; and an information supplying step for supplying information relating to at least one of the processing region, the continuity, and the real world signals, to the processing region setting means, the continuity setting means, or the actual world estimating means, in accordance with user operations.

A recording medium according to the present invention stores a program for causing a computer to perform predetermined signal processing, the program comprising: a processing region setting step for setting a processing region with processing region setting means for setting the processing region to be processed, with regard to second signals of second dimensions that are fewer than first dimensions had by first signals which are real world signals and are projected whereby a part of the continuity of the real world signals is lost; a continuity setting step for setting the continuity with continuity setting means for setting the continuity of the real world signals that has been lost in the second signals; an actual world estimating step for estimating signals of the real world with world estimating means for estimating signals of the real world, corresponding to the second signals within a processing region set in the processing regions setting step, according to the continuity set in the continuity setting step; and an information supplying step for supplying information relating to at least one of the processing region, the continuity, and the real world signals, to the processing region setting means, the continuity setting means, or the actual world estimating means, in accordance with user operations.

With the signal processing device and signal processing method, and program and recording medium, according to the present invention, a processing region is set by processing region setting means, with regard to second signals of second dimensions that are fewer than first dimensions had by first signals which are real world signals and are projected whereby a part of the continuity of the real world signals is lost; the continuity of the real world signals that has been lost in the second signals is set by continuity setting means; and signals of the real world are estimated by world signal estimating means, corresponding to the second signals within a processing region set by the processing regions setting means, according to the continuity set by the continuity setting means. On the other hand, at least one of the processing region, the continuity, and the real world signals, is supplied to the processing region setting means, the continuity setting means, or the actual world estimating means, by information supplying means, in accordance with user operations.

BRIEF DESCRIPTION OF THE DRAWINGS

FIG. 15 is a diagram for describing the relationship between signals of the actual world 1 and data 3.

FIG. 120A is a diagram for describing motion vectors.

FIG. 120B is a diagram for describing motion vectors.

FIG. 120C is a diagram for describing motion vectors.

FIG. 120D is a diagram for describing motion vectors.

FIG. 121 is a flowchart for describing the processing of the signal processing device 4 shown in FIG. 119.

FIG. 122 is a block diagram illustrating a configuration example of a continuity setting unit 11042.

FIG. 123 is a flowchart for describing the processing of the continuity setting unit 11042.

FIG. 124 is a flowchart for describing the processing of the continuity setting unit 11042.

FIG. 125 is a diagram for describing the processing of the continuity setting unit 11042.

FIG. 126A is a diagram illustrating an output image obtained regarding each of three types of amounts of movement.

FIG. 126B is a diagram illustrating output images obtained regarding each of three types of amounts of movement.

FIG. 126C is a diagram illustrating output images obtained regarding each of three types of amounts of movement.

Figure 126A:
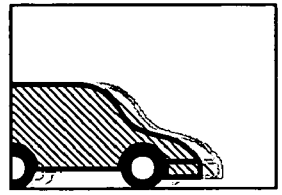
Figure 126B:
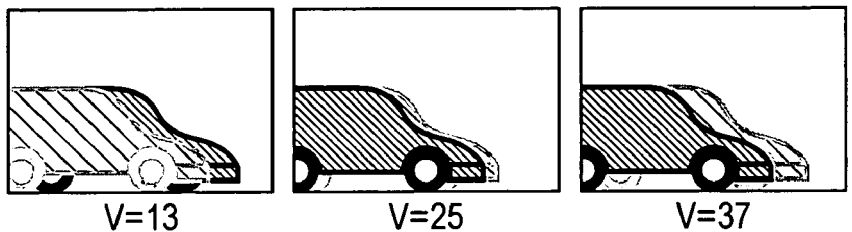
Figure 126C:
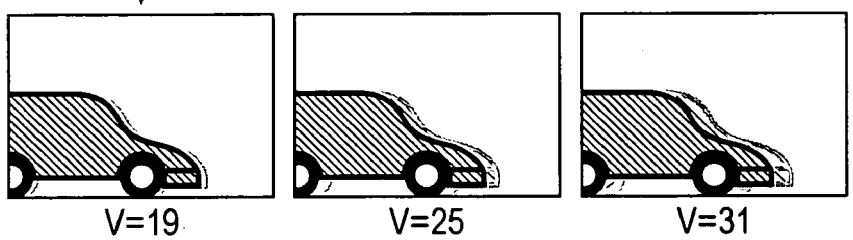
Figure 126D:
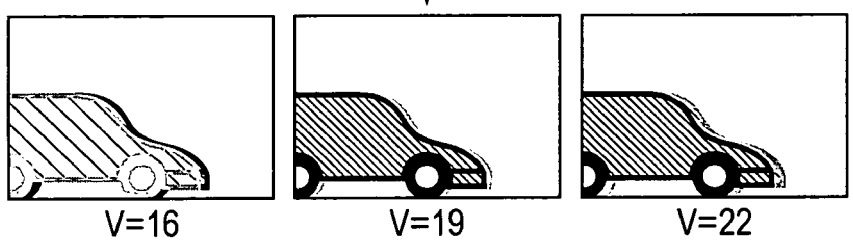

FIG. 126D is a diagram illustrating output images obtained regarding each of three types of amounts of movement.

Figure 126E:
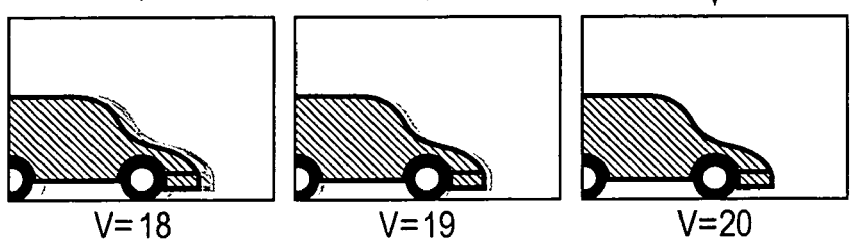

FIG. 126E is a diagram illustrating output images obtained regarding each of three types of amounts of movement.

Figure 111:
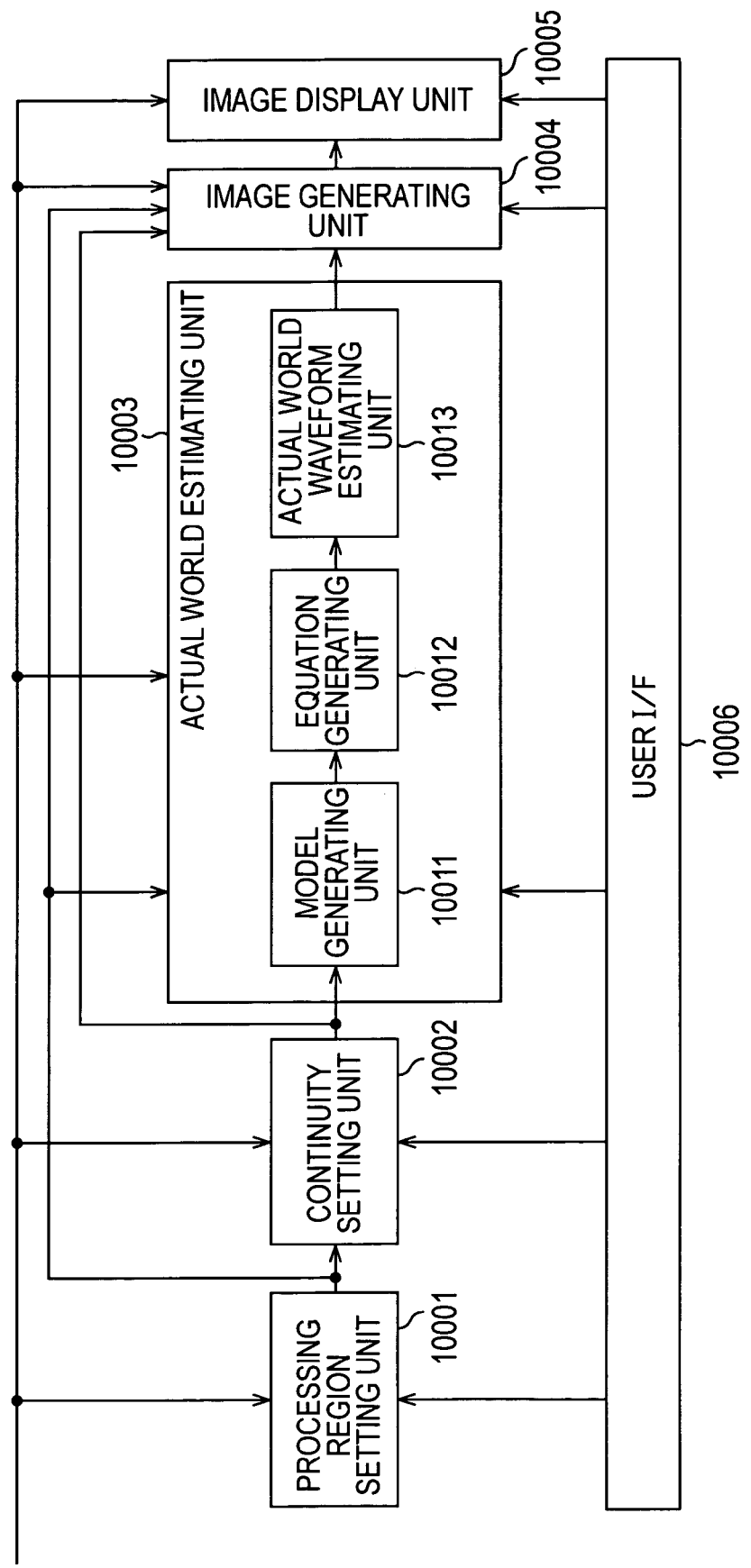
FIG. 111 is a block diagram illustrating a configuration example of another embodiment of the signal processing device 4 shown in FIG. 1.
Figure 127:
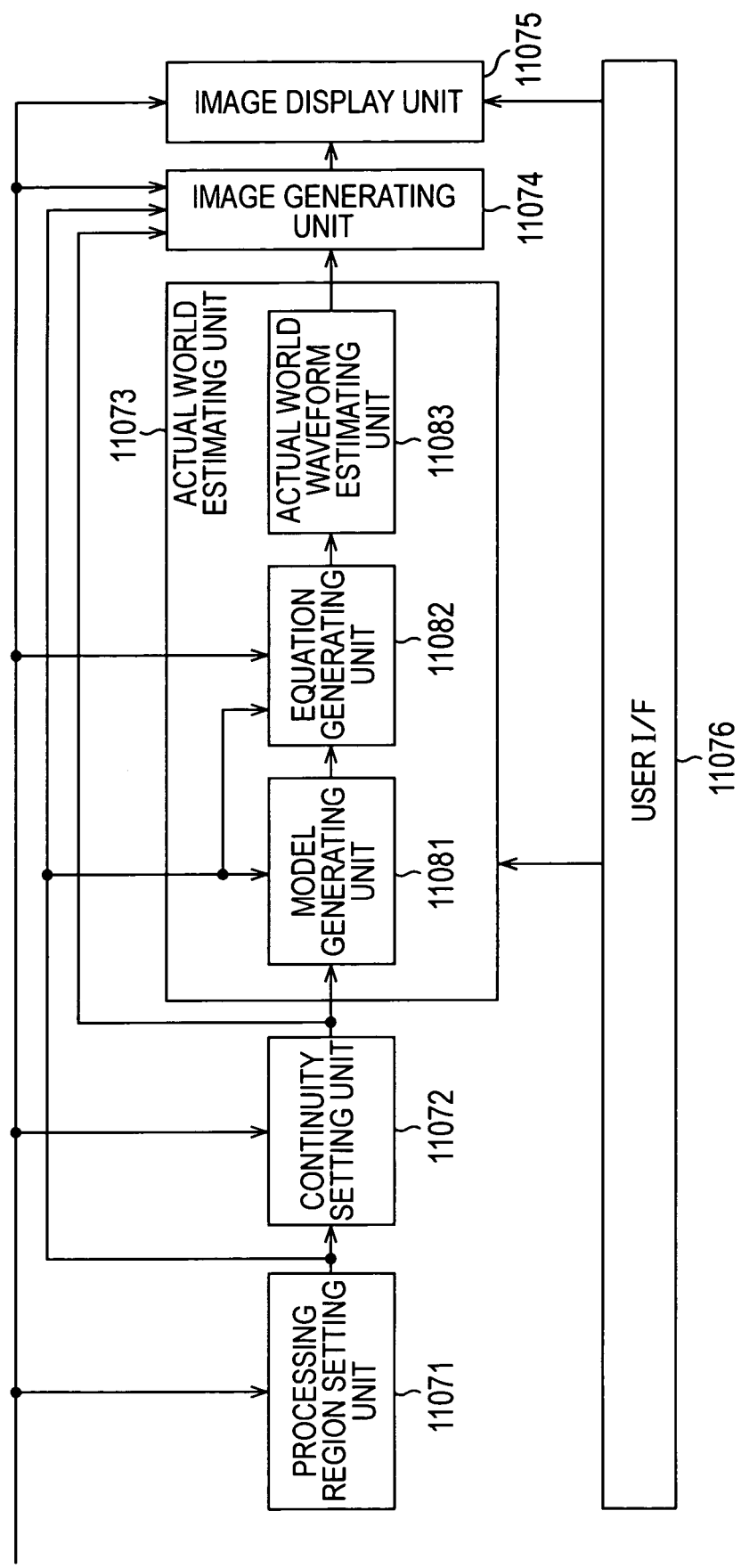

FIG. 127 is a block diagram illustrating a configuration example of another applied embodiment of the signal processing device 4 shown in FIG. 111.

Figure 128:
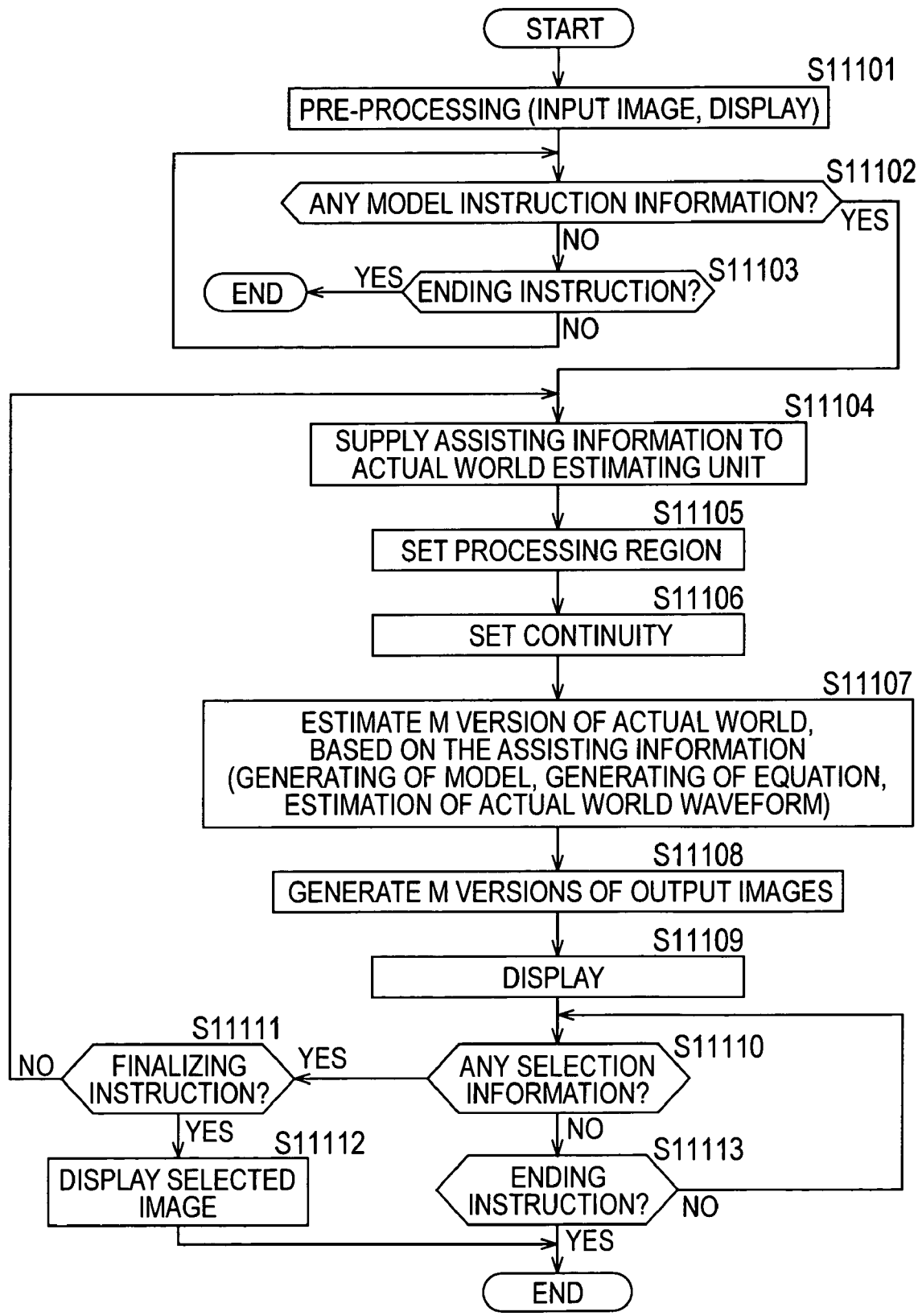

FIG. 128 is a flowchart for describing the processing of the signal processing device 4 shown in FIG. 127.

Figure 129:
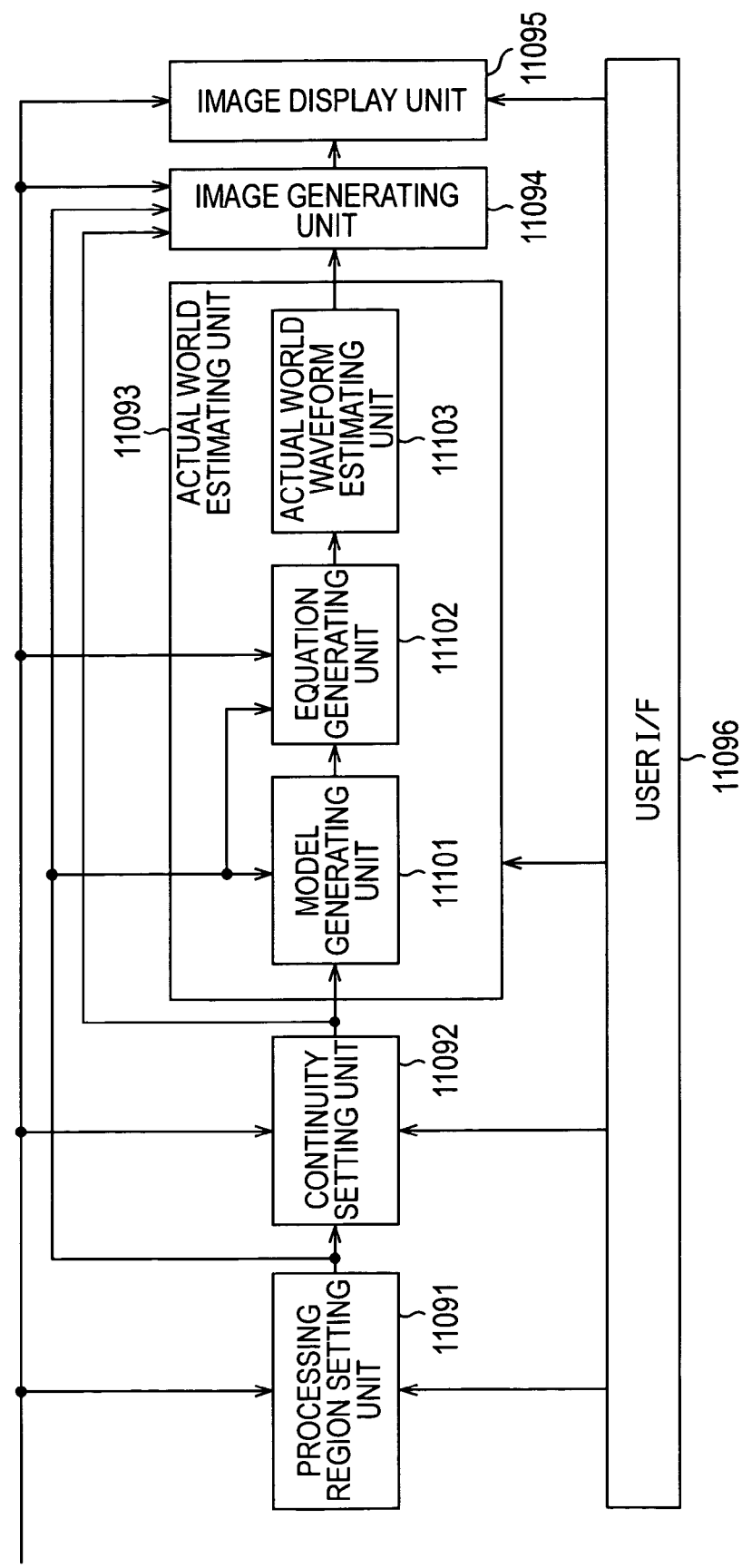

FIG. 129 is a block diagram illustrating a configuration example of another applied embodiment of the signal processing device 4 shown in FIG. 111.

Figure 130:
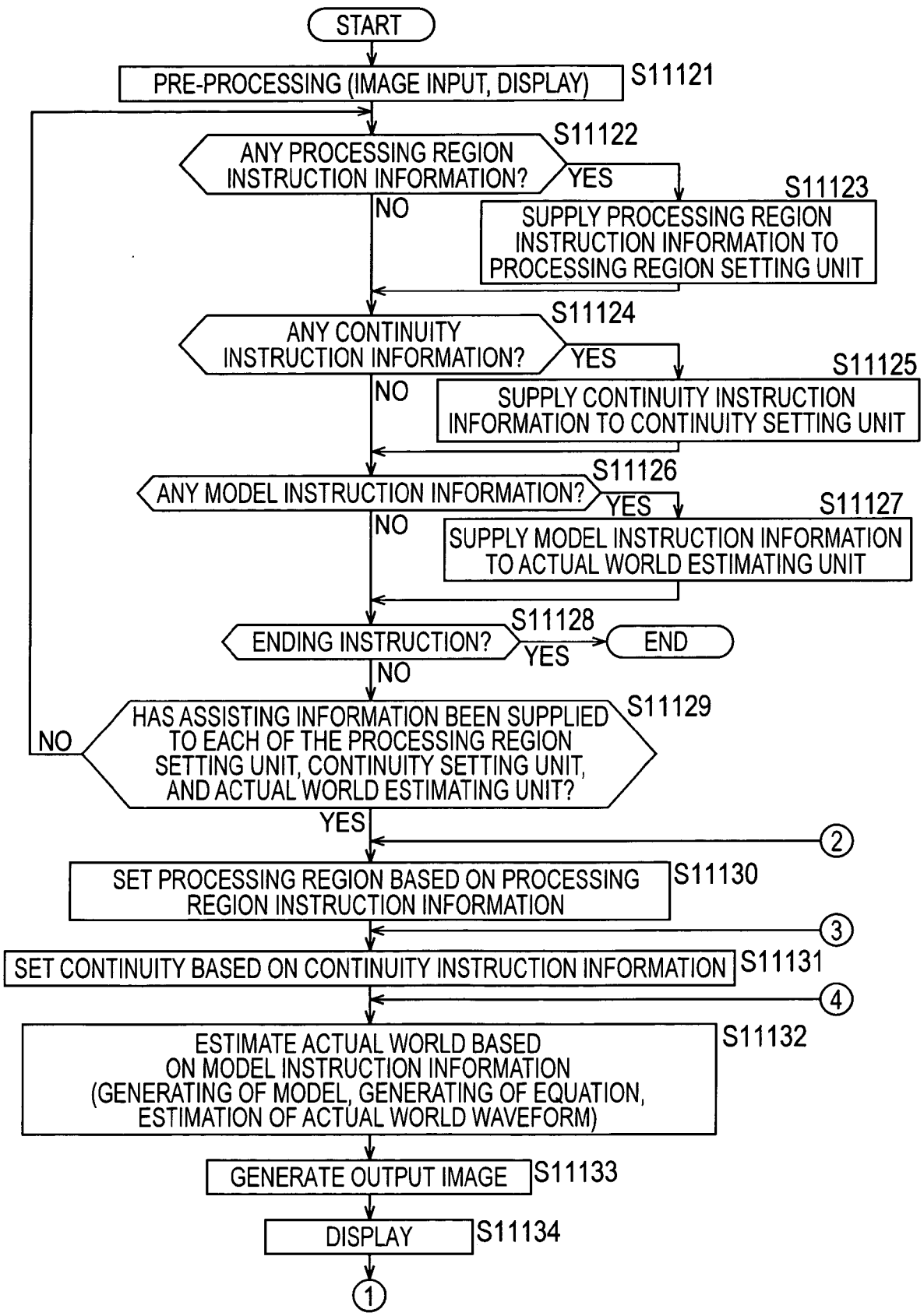

FIG. 130 is a flowchart for describing the processing of the signal processing device 4 shown in FIG. 129.

Figure 131:
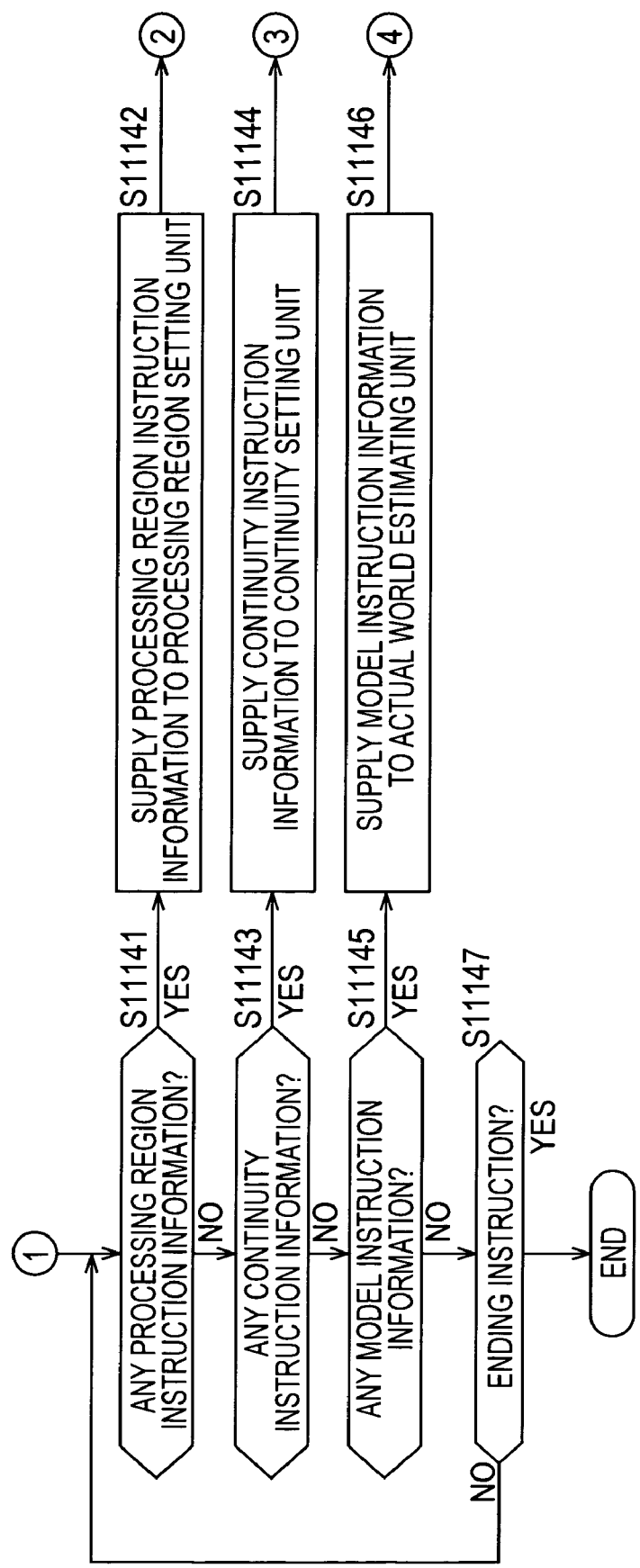

FIG. 131 is a flowchart for describing the processing of the signal processing device 4 shown in FIG. 129.

Figure 132:
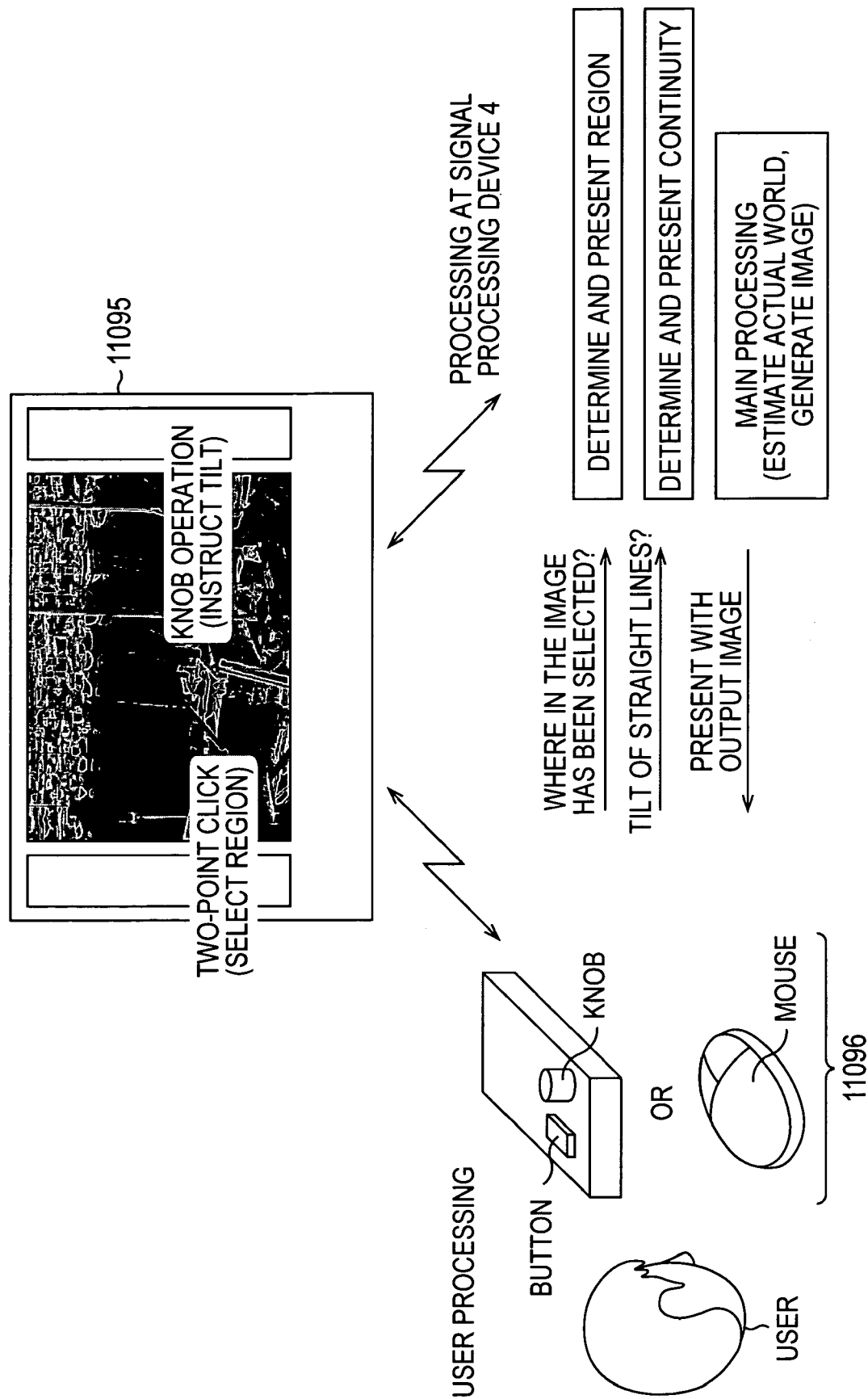

FIG. 132 is a diagram for describing the processing of the signal processing device 4 shown in FIG. 129.

Figure 133:
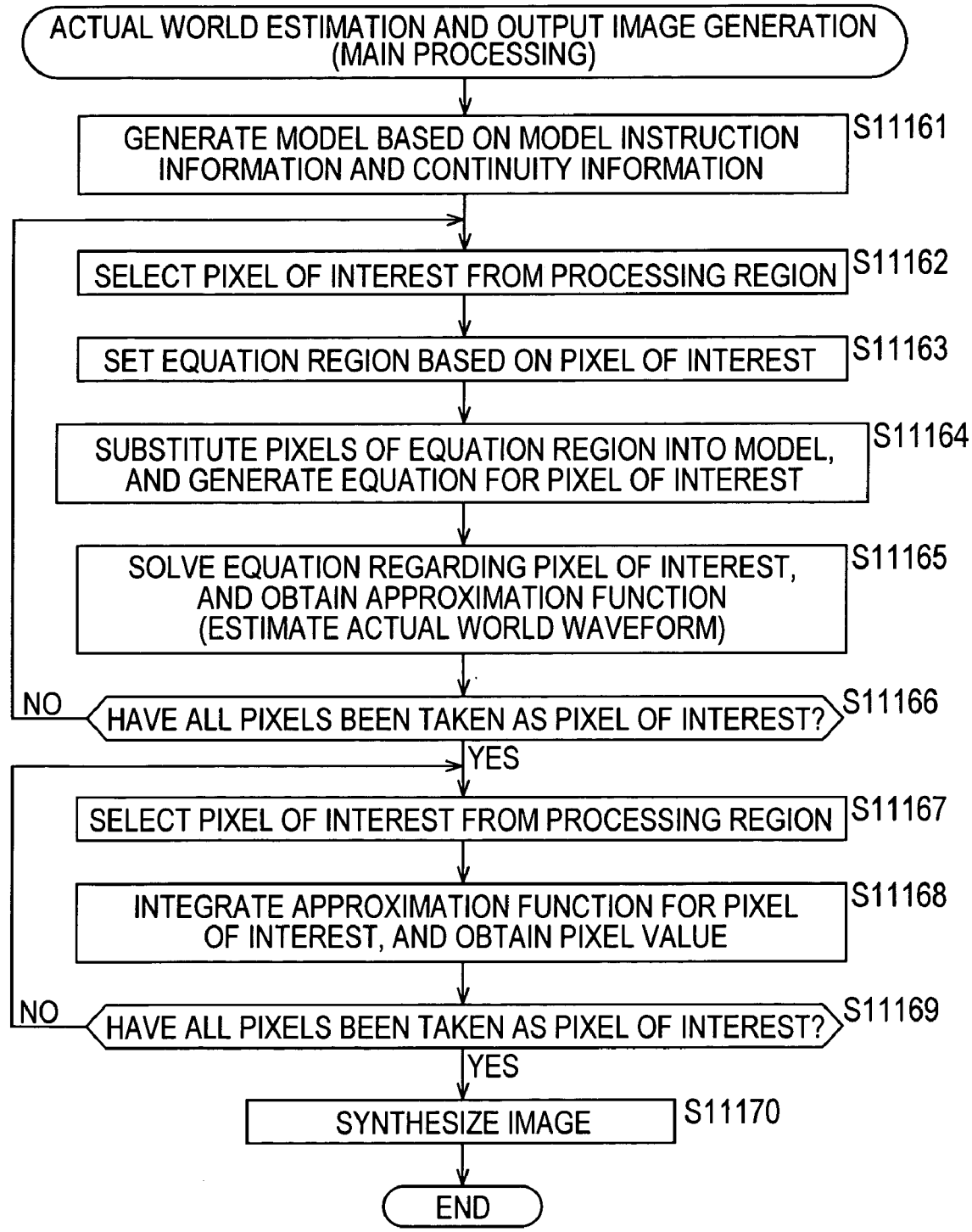

FIG. 133 is a flowchart for describing main processing with the signal processing device 4.

Figure 134:
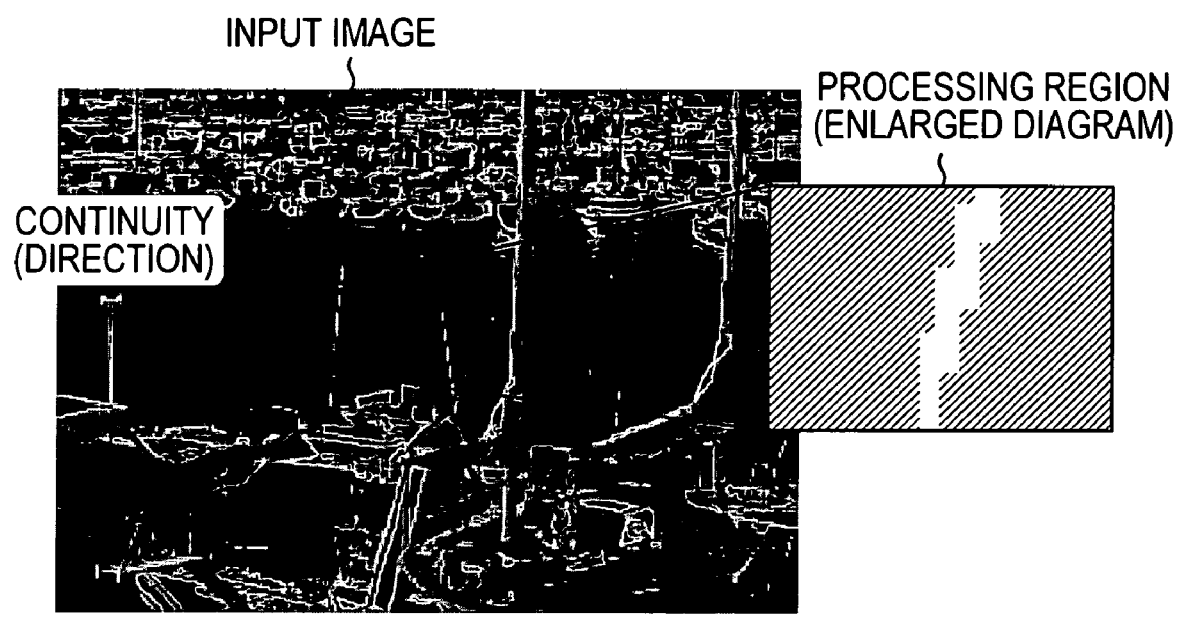

FIG. 134 is a diagram illustrating a processing region and the direction of continuity in an input image.

Figure 135B:
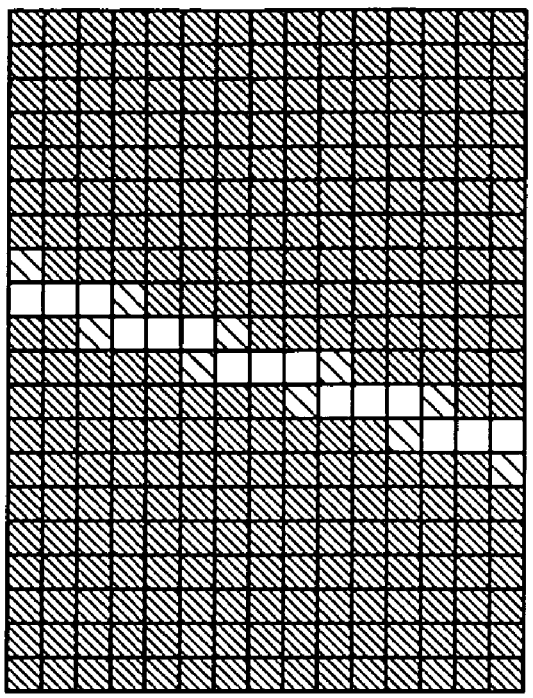
Figure 135A:
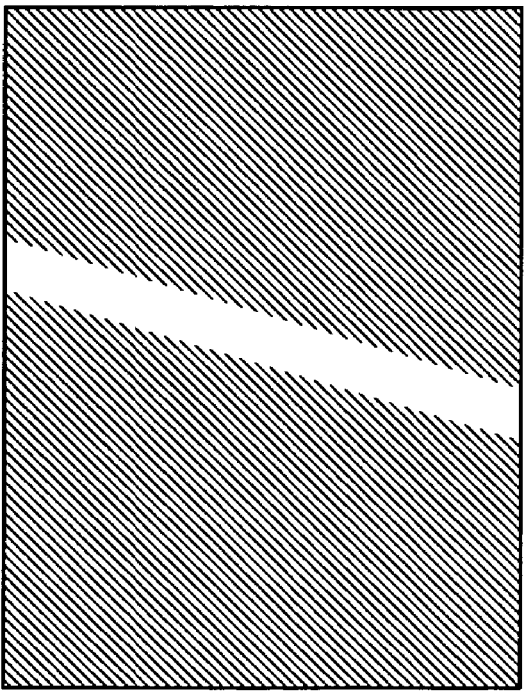

FIG. 135A is a diagram illustrating light signals of the actual world 1 and an input image obtained from a sensor 2 regarding the light signals.

FIG. 135B is a diagram illustrating light signals of the actual world 1 and an input image obtained from a sensor 2 regarding the light signals.

Figure 136A:
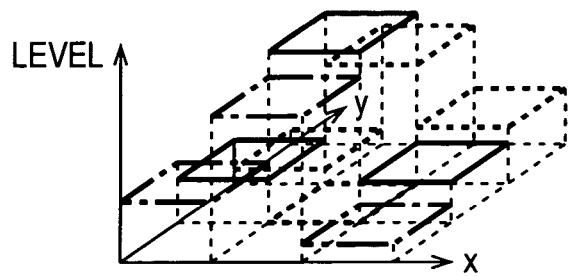

FIG. 136A is a diagram describing main processing with the signal processing device 4.

Figure 136B:
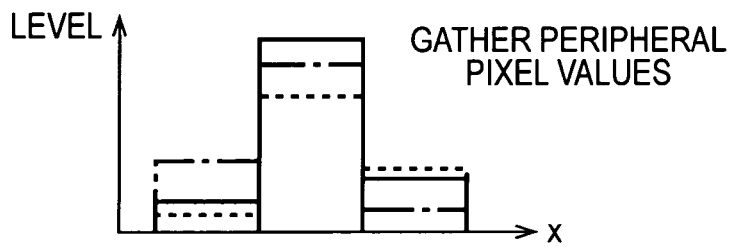

FIG. 136B is a diagram describing main processing with the signal processing device 4.

Figure 136C:
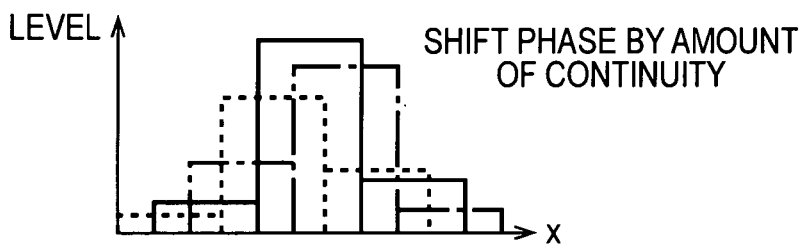

FIG. 136C is a diagram describing main processing with the signal processing device 4.

Figure 136D:
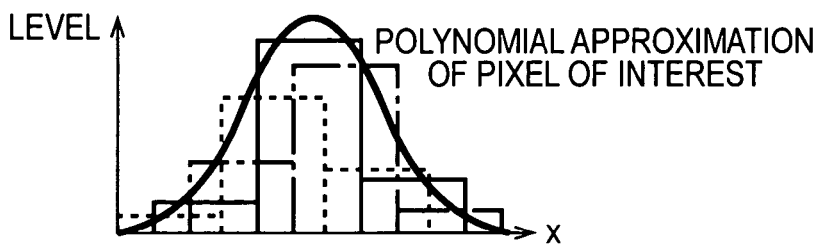

FIG. 136D is a diagram describing main processing with the signal processing device 4.

Figure 136E:
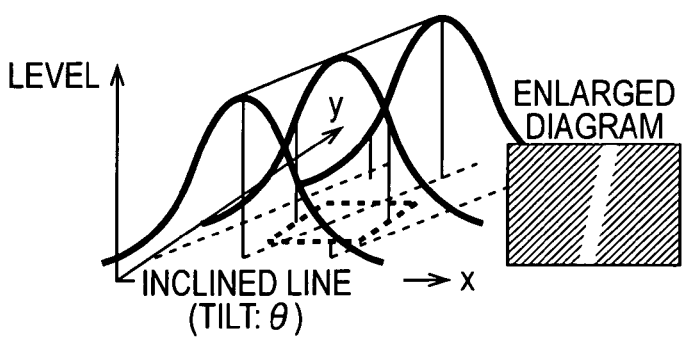

FIG. 136E is a diagram describing main processing with the signal processing device 4.

Figure 137:
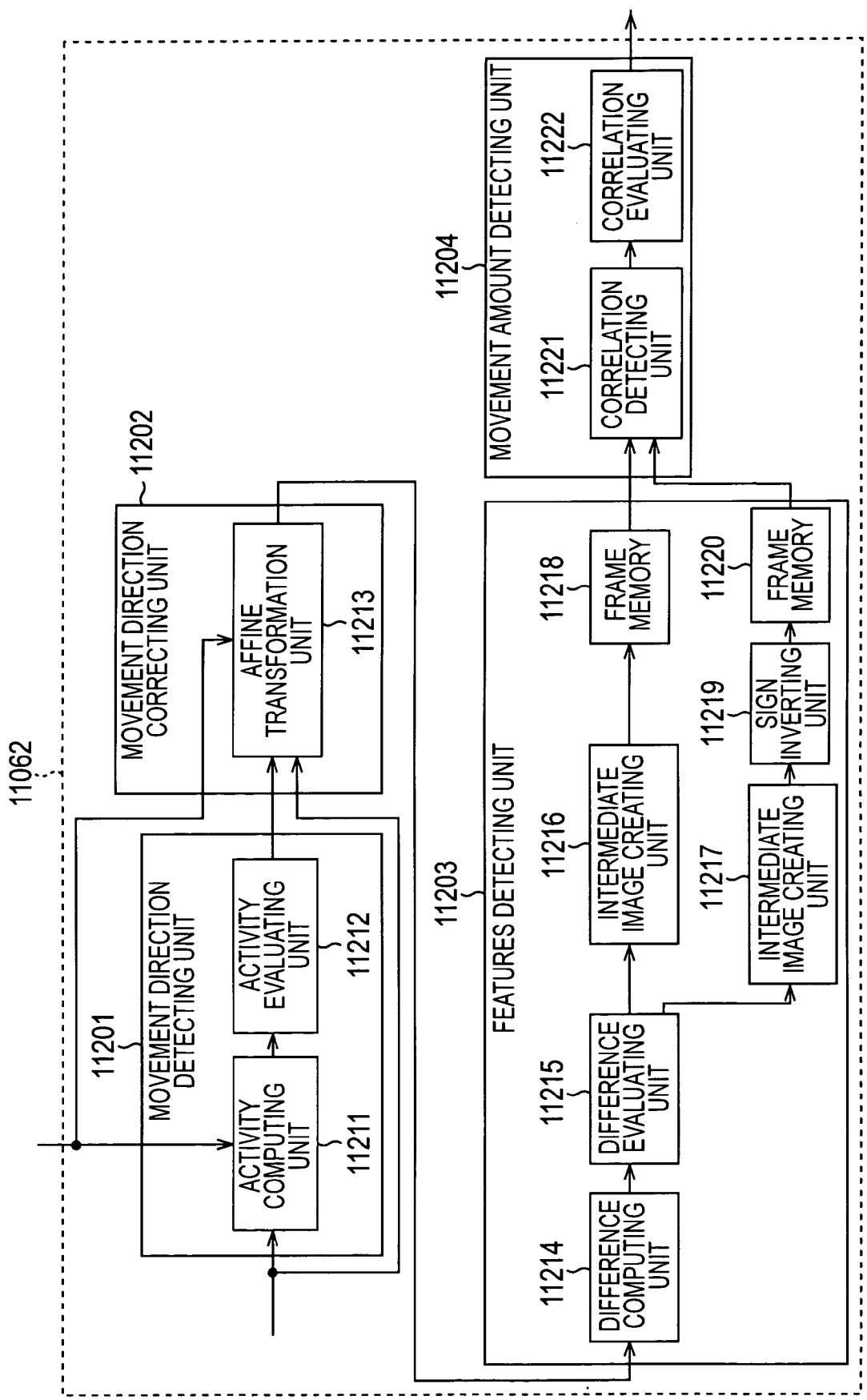

FIG. 137 is a block diagram illustrating a configuration example of a movement detecting unit 11062.

Figure 138:
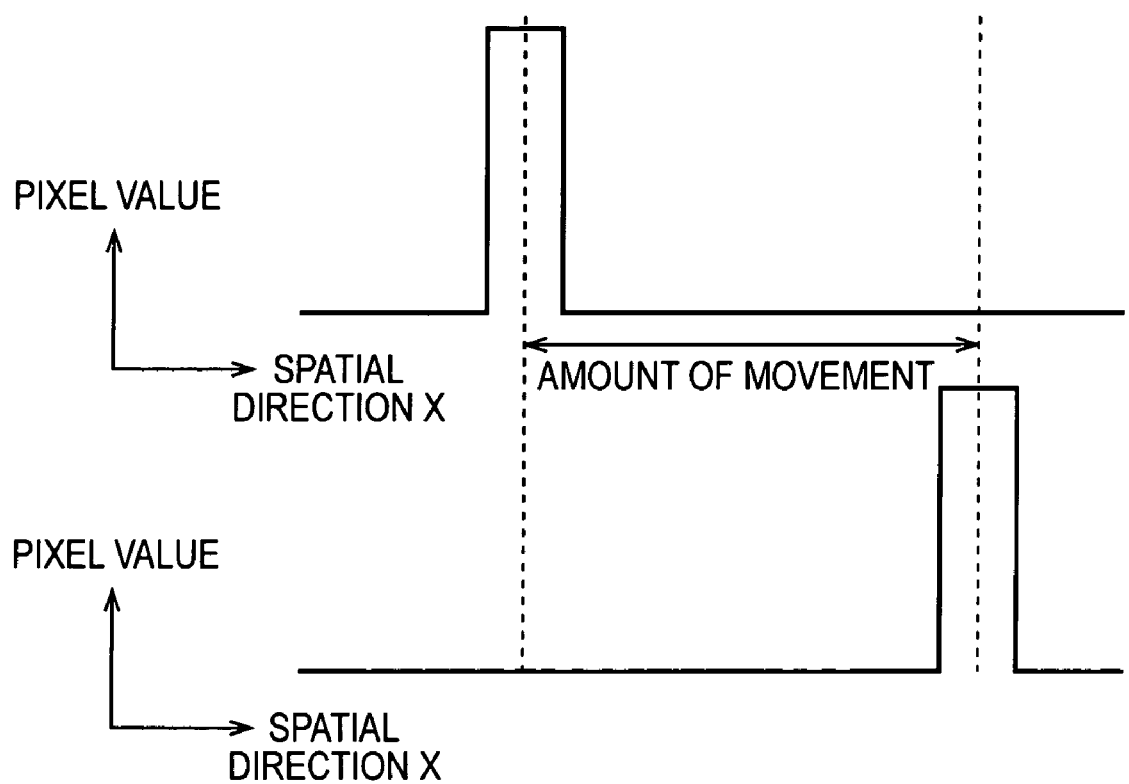

FIG. 138 is a diagram for describing amount of movement.

Figure 139:
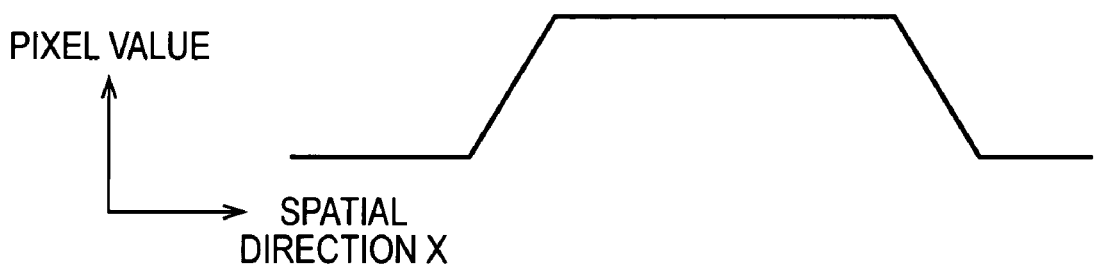

FIG. 139 is a diagram illustrating pixel values of an image output from a camera, taken by the camera while a foreground object passes in front of a background object.

Figure 140:
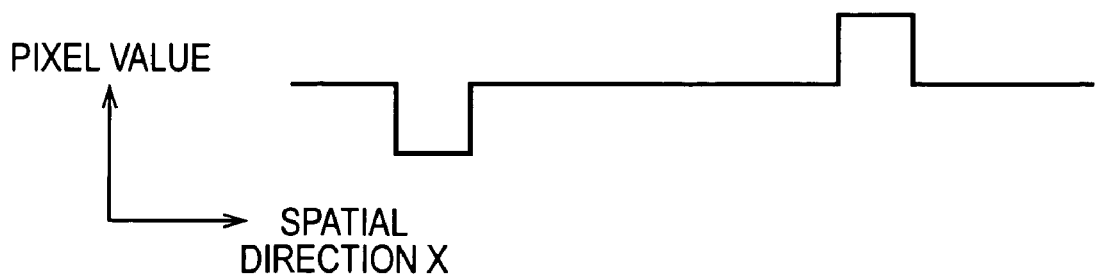

FIG. 140 is a diagram illustrating difference values of the pixel values of pixels in the image shown in FIG. 139.

Figure 141:
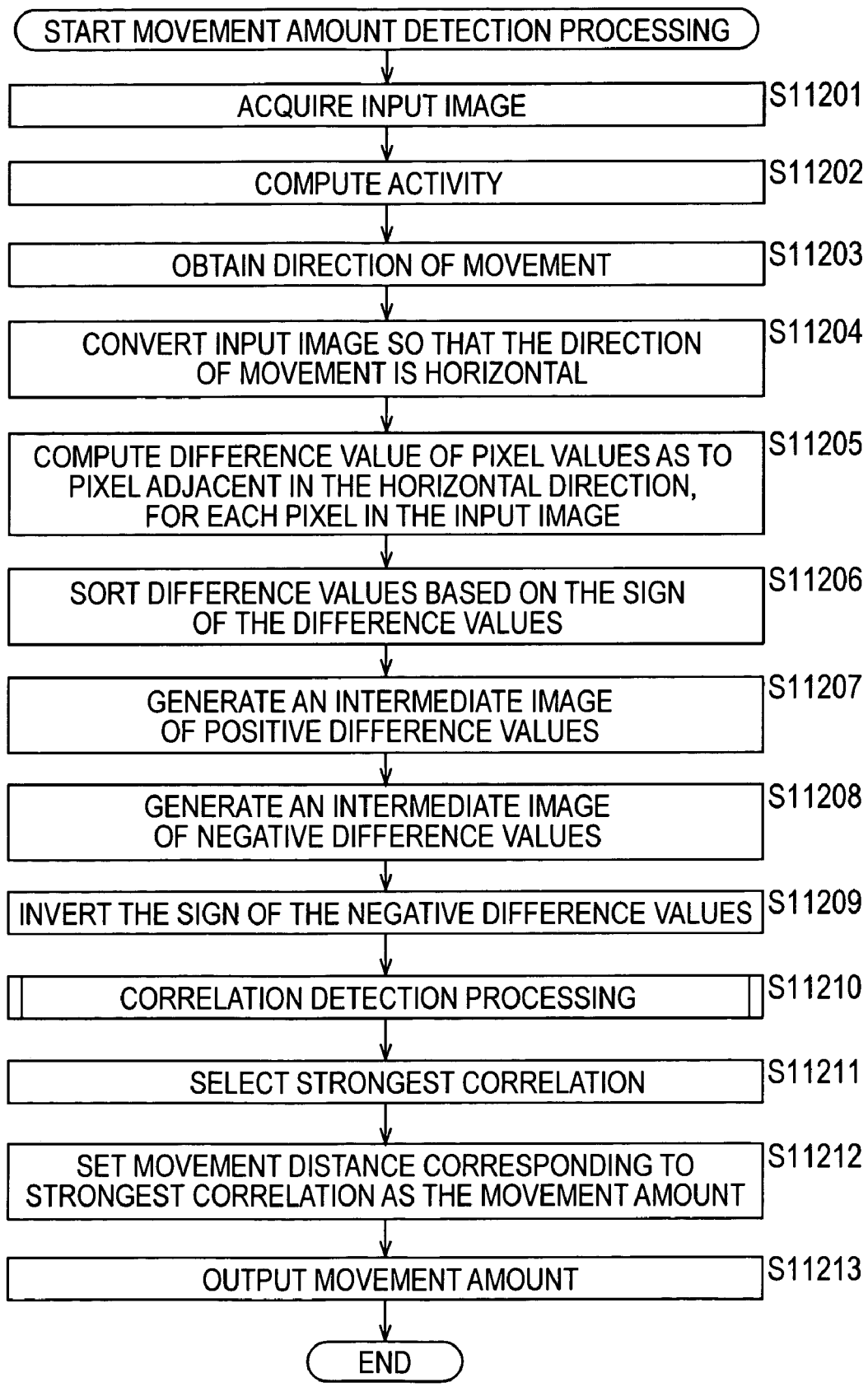

FIG. 141 is a flowchart for describing processing for detecting amount of movement.

Figure 142:
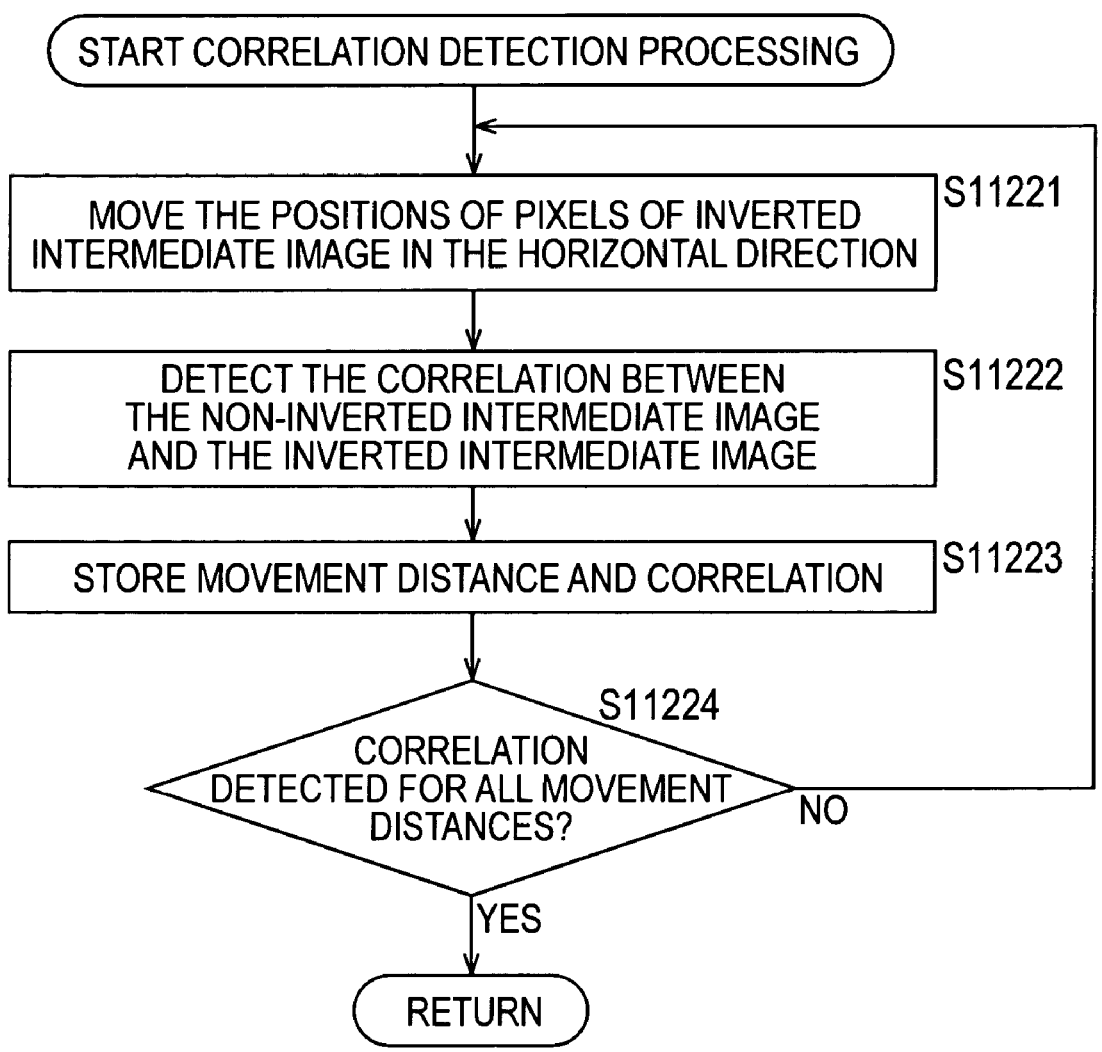

FIG. 142 is a flowchart for describing processing for detecting correlation.

Figure 143:
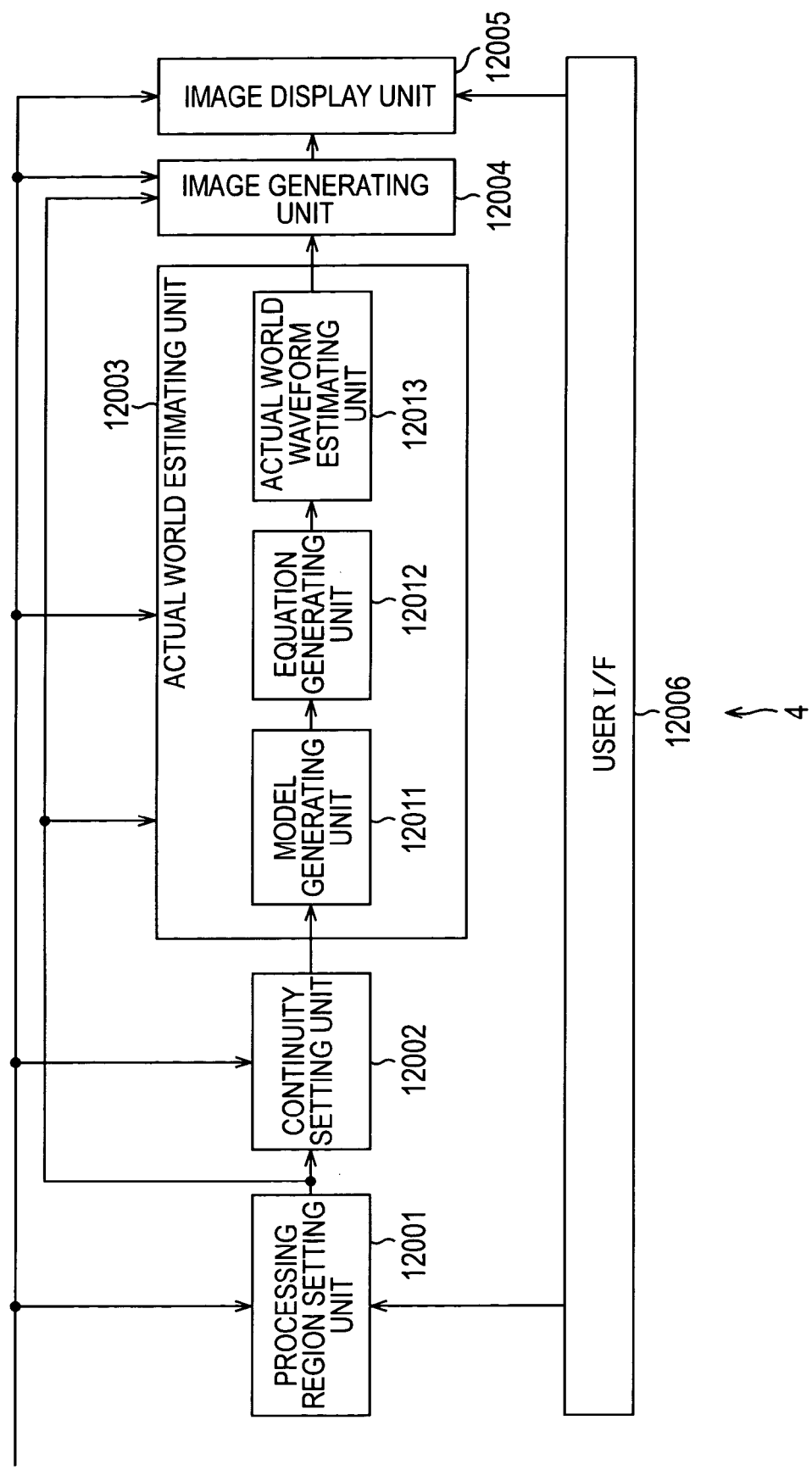

FIG. 143 is a block diagram illustrating a configuration example of another applied embodiment of the signal processing device 4 shown in FIG. 111.

Figure 144:
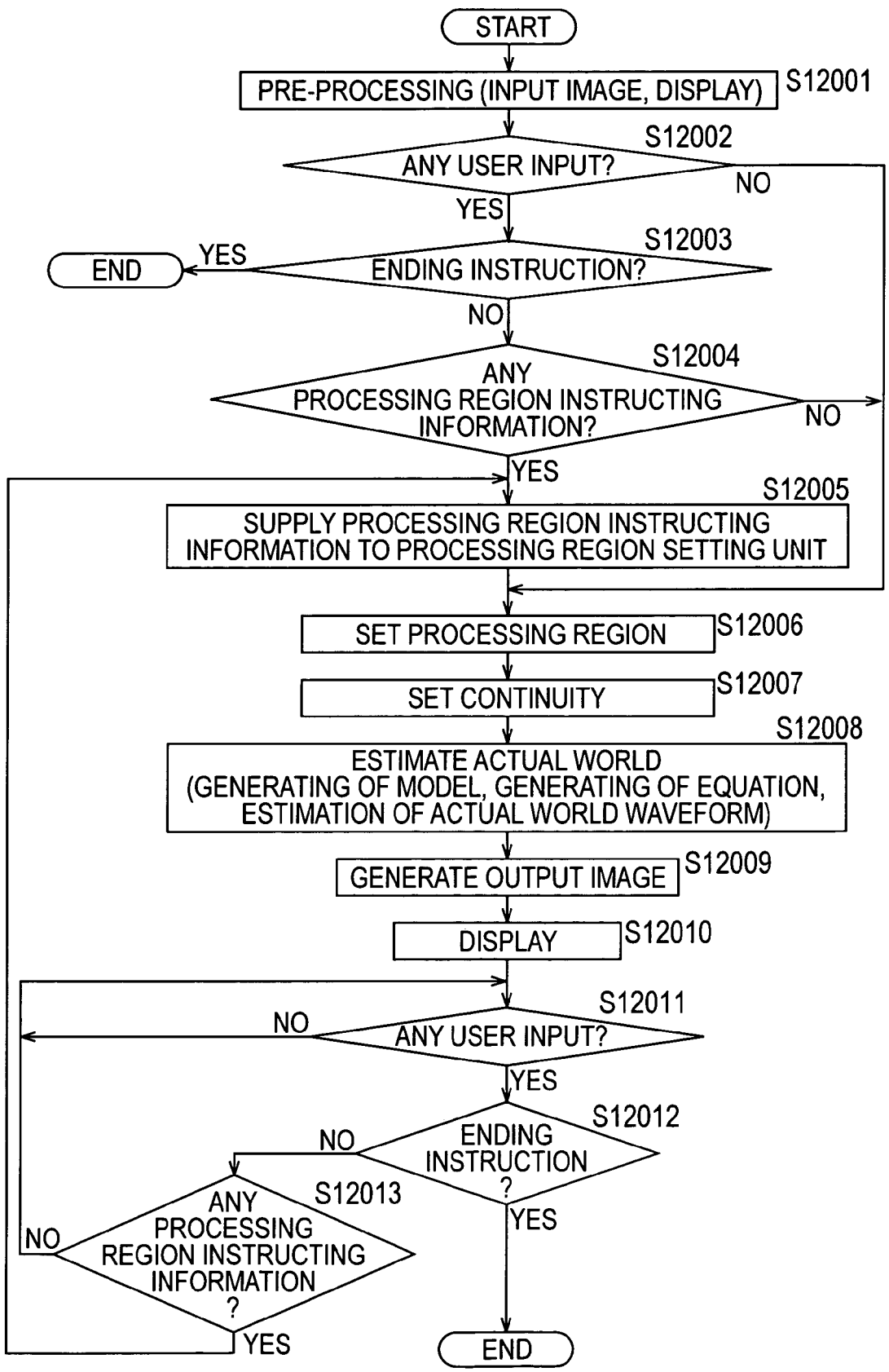

FIG. 144 is a flowchart for describing the processing of the signal processing device 4 shown in FIG. 143.

Figure 145:
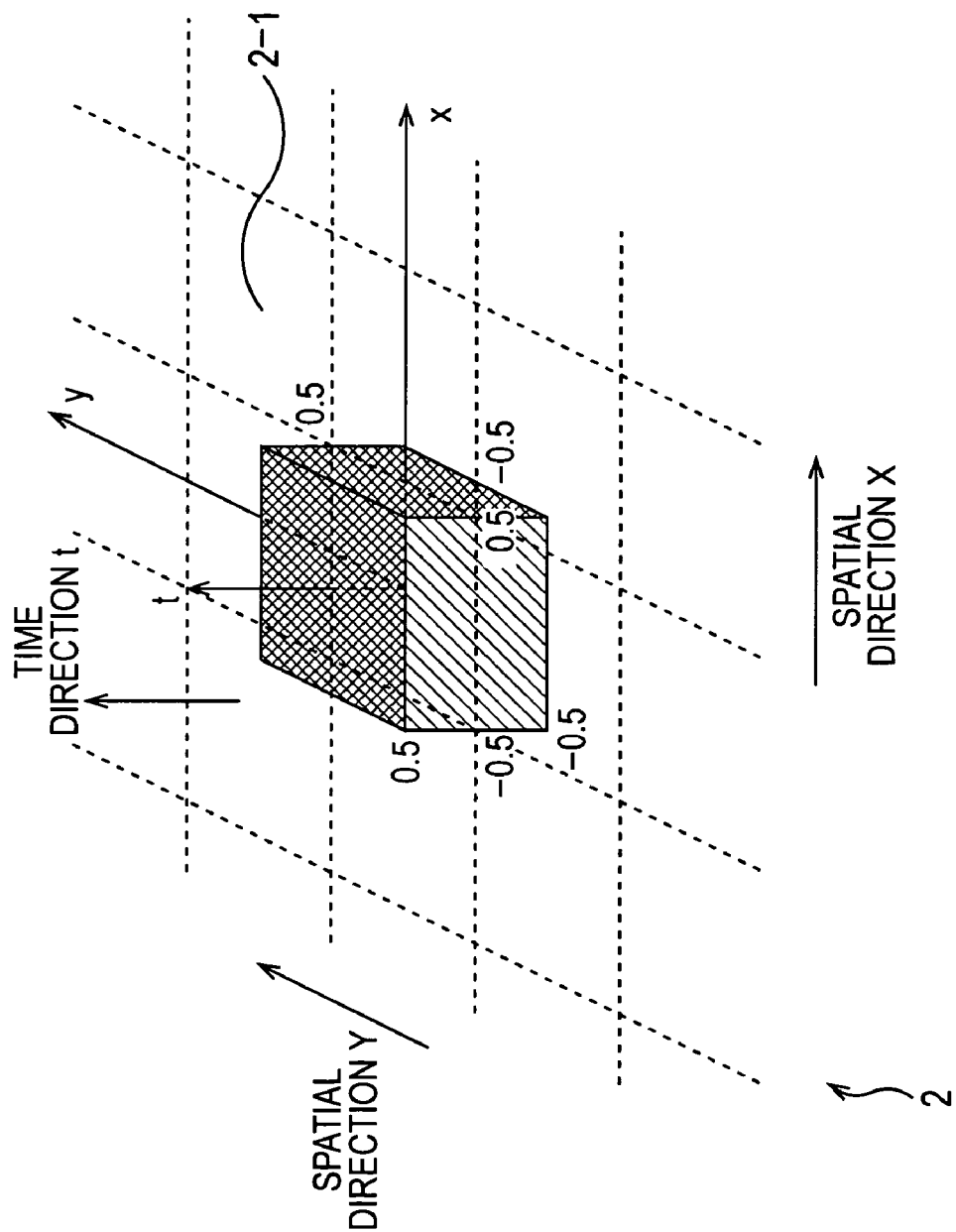

FIG. 145 is a diagram for describing integration effects in the event that the sensor 2 is a CCD.

Figure 146:
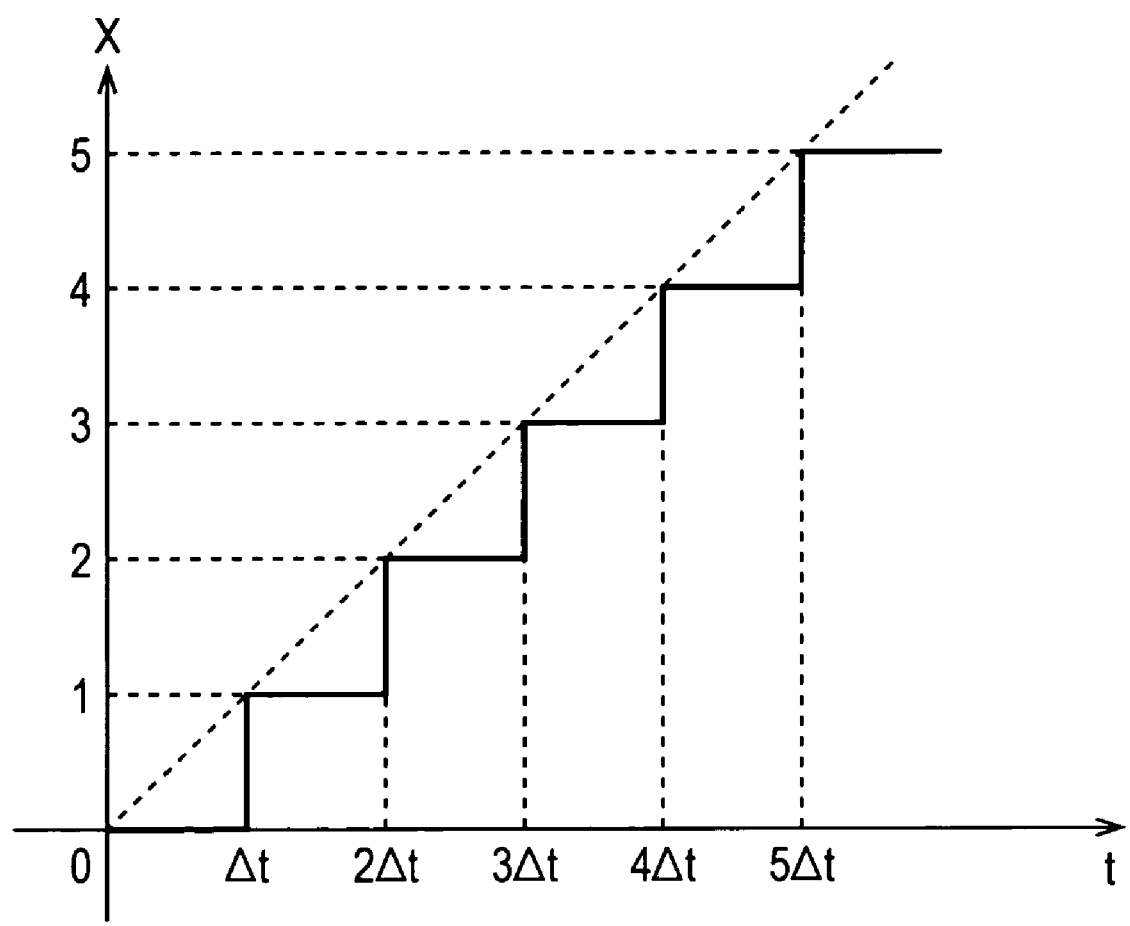

FIG. 146 is a diagram for describing amount of movement.

Figure 147A:
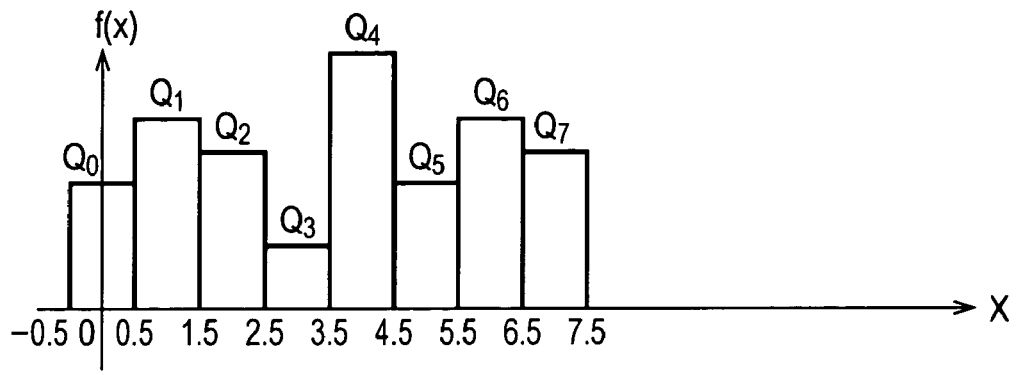

FIG. 147A is a diagram for describing movement blurring generated by the integration effects of the sensor 2.

Figure 147B:
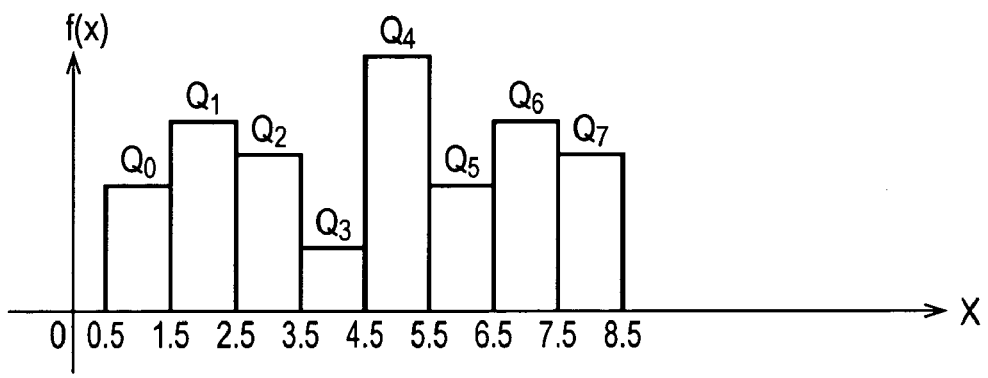

FIG. 147B is a diagram for describing movement blurring generated by the integration effects of the sensor 2.

Figure 147C:
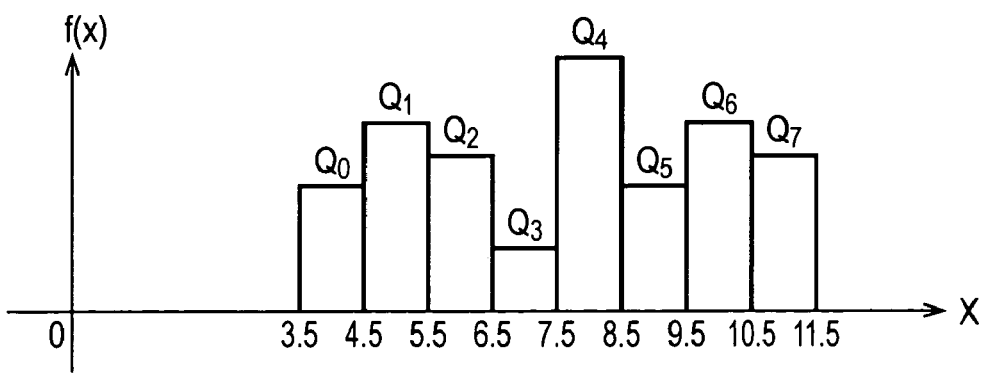

FIG. 147C is a diagram for describing movement blurring generated by the integration effects of the sensor 2.

Figure 148A:
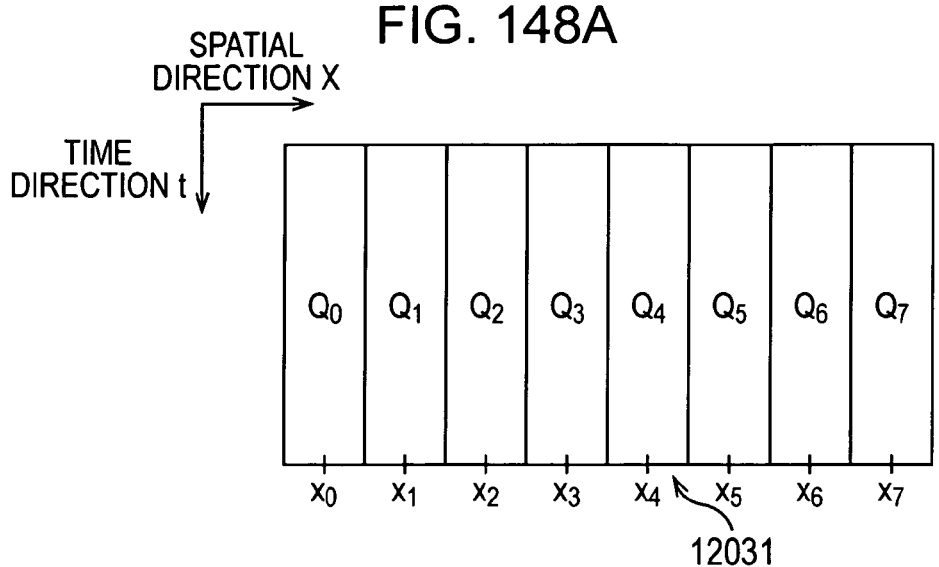

FIG. 148A is a diagram for describing movement blurring generated by the integration effects of the sensor 2.

Figure 148B:
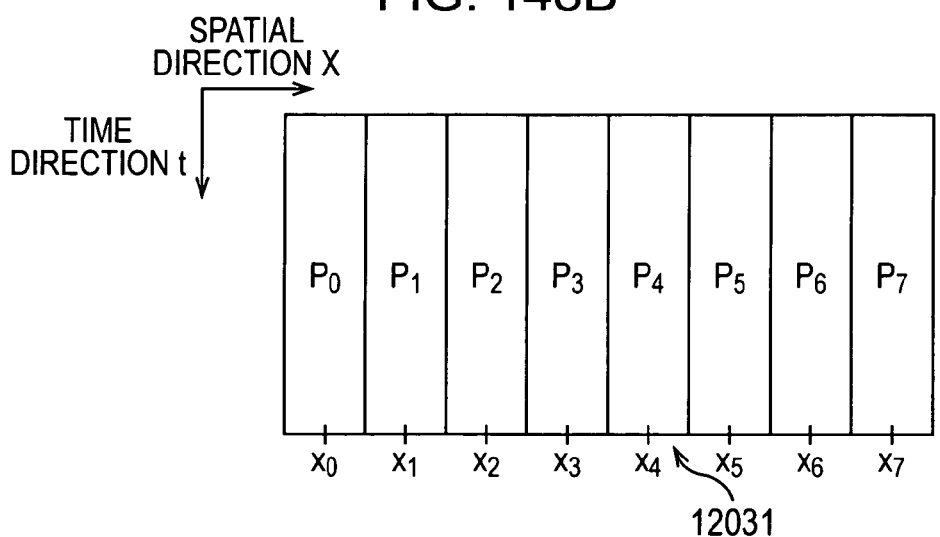

FIG. 148B is a diagram for describing movement blurring generated by the integration effects of the sensor 2.

Figure 148C:
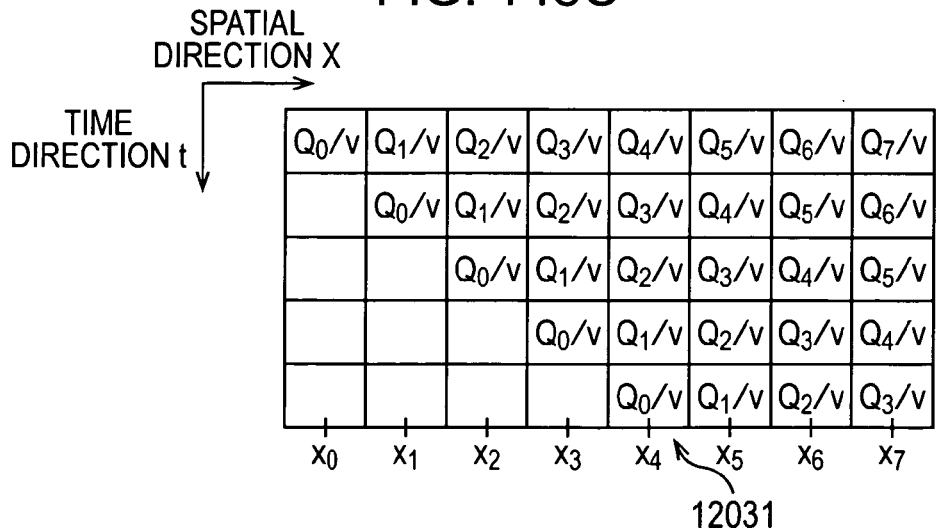

FIG. 148C is a diagram for describing movement blurring generated by the integration effects of the sensor 2.

Figure 149:
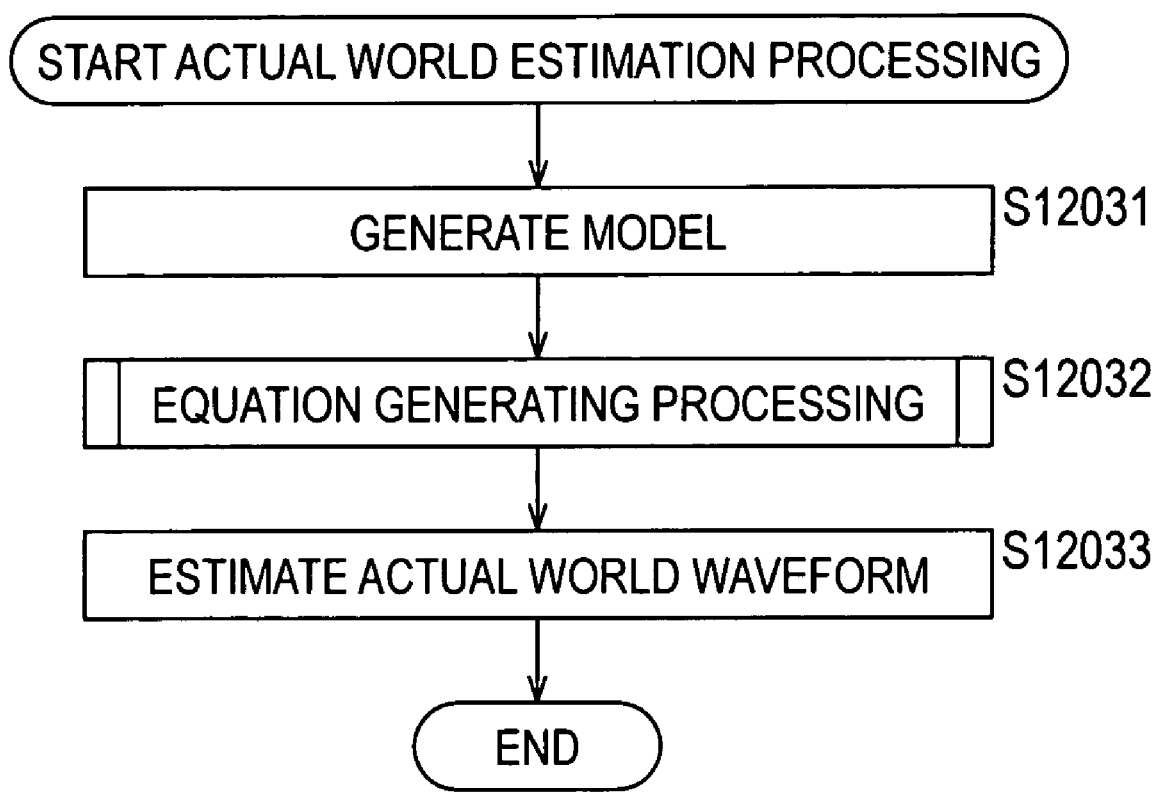

FIG. 149 is a flowchart for describing actual world estimation processing by the actual world estimating unit 12003.

Figure 150:
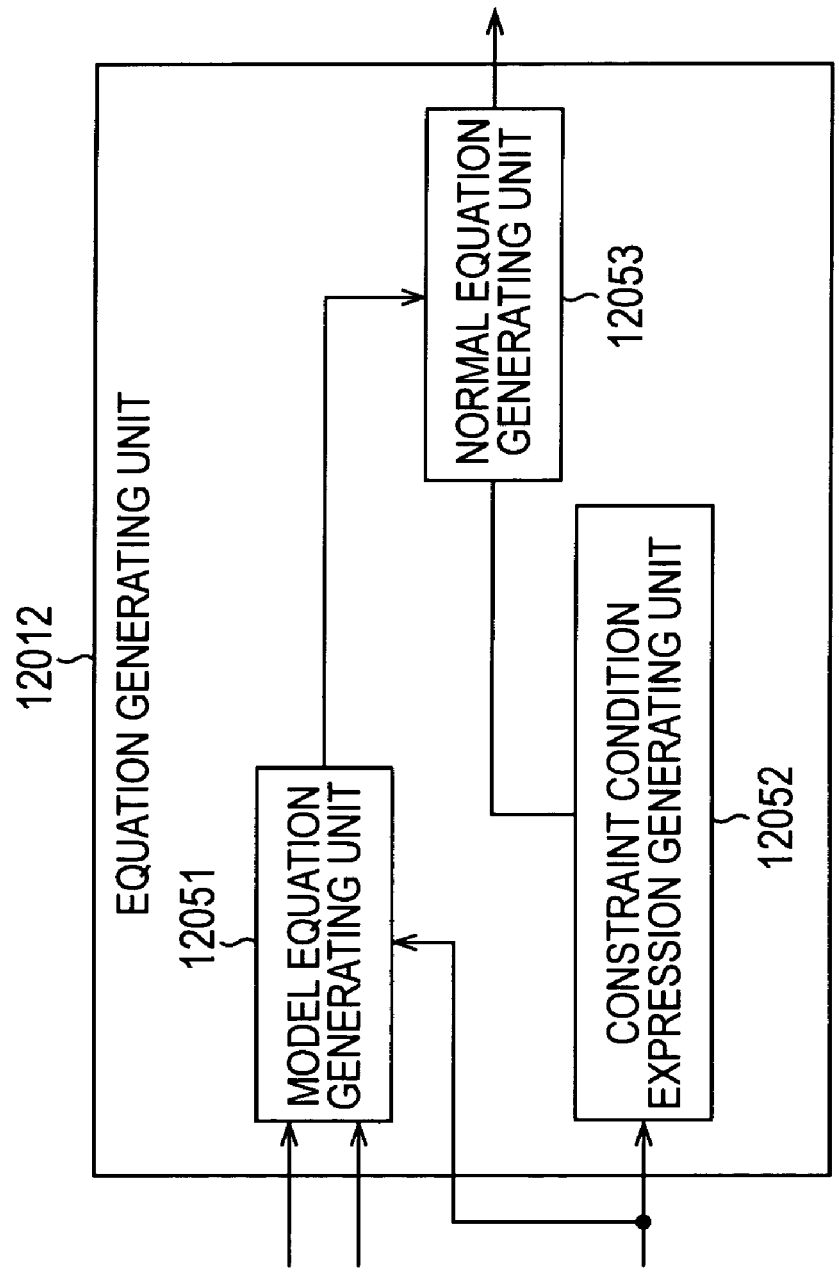

FIG. 150 is a block diagram illustrating a configuration example of an equation generating unit 12012.

Figure 151:
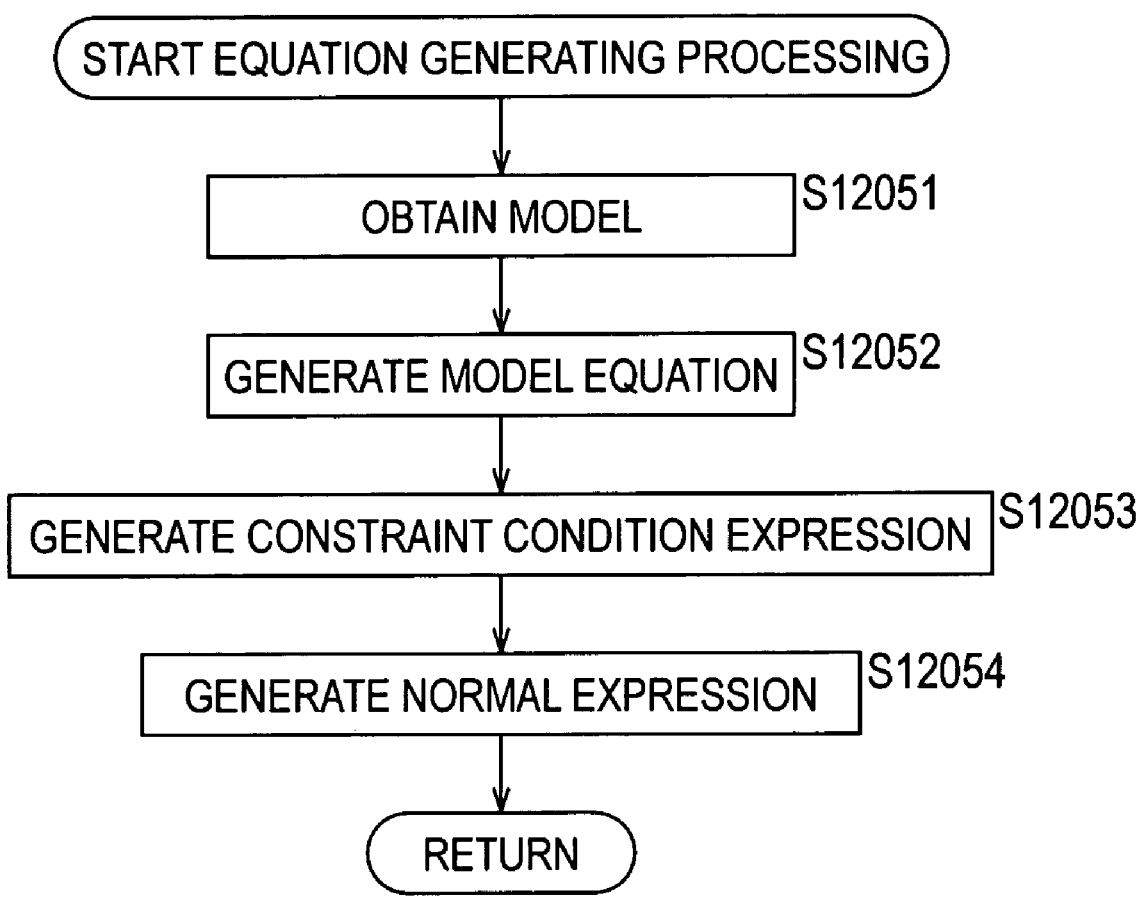

FIG. 151 is a flowchart for describing the equation generating processing in step S12032 in FIG. 149.

Figure 152A:
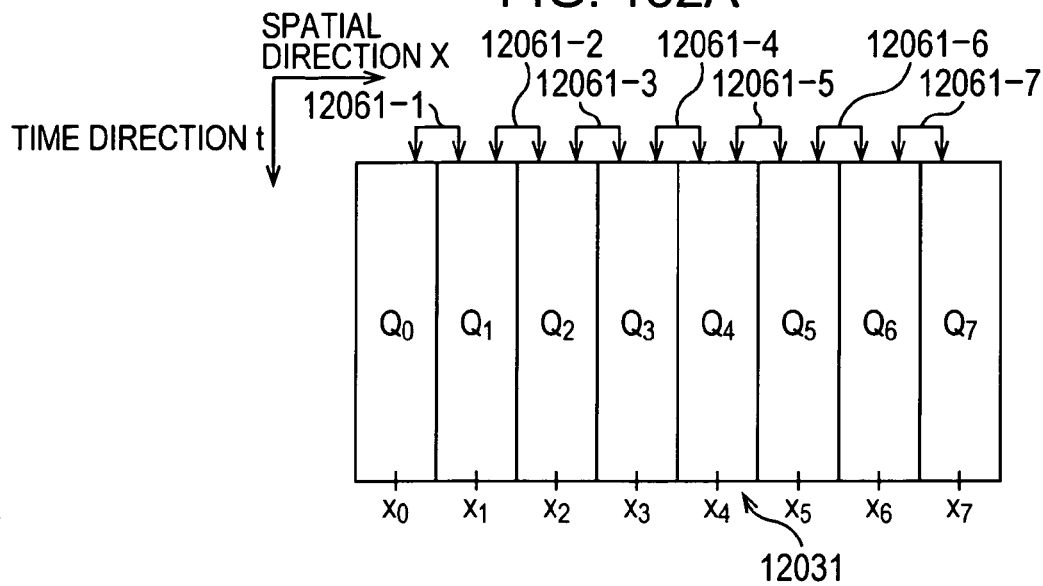

FIG. 152A is a diagram for describing constraining conditions.

Figure 152B:
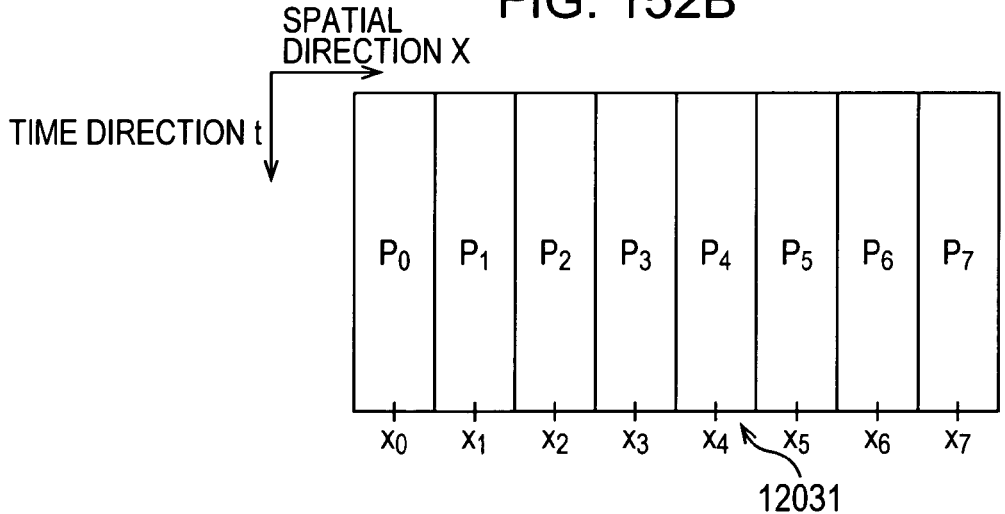

FIG. 152B is a diagram for describing constraining conditions.

Figure 152C:
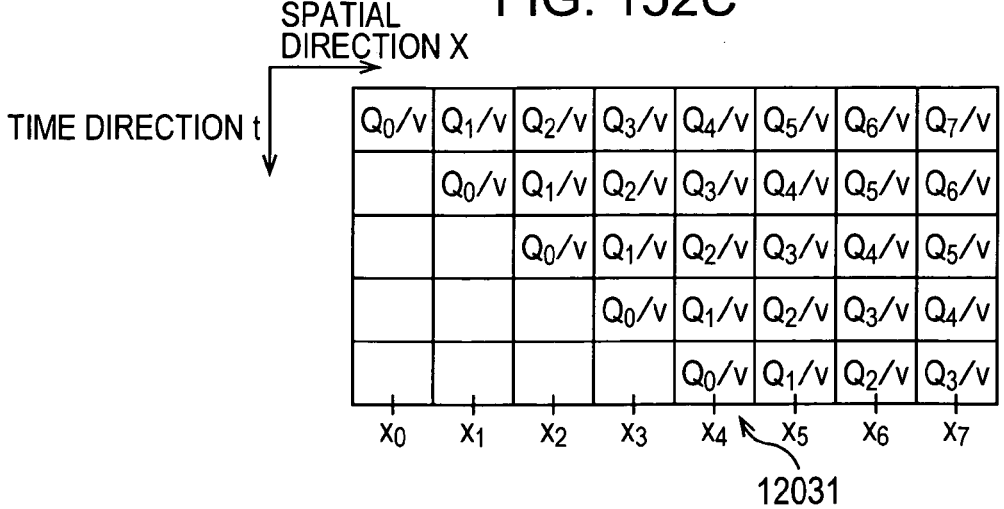

FIG. 152C is a diagram for describing constraining conditions.

Figure 153:
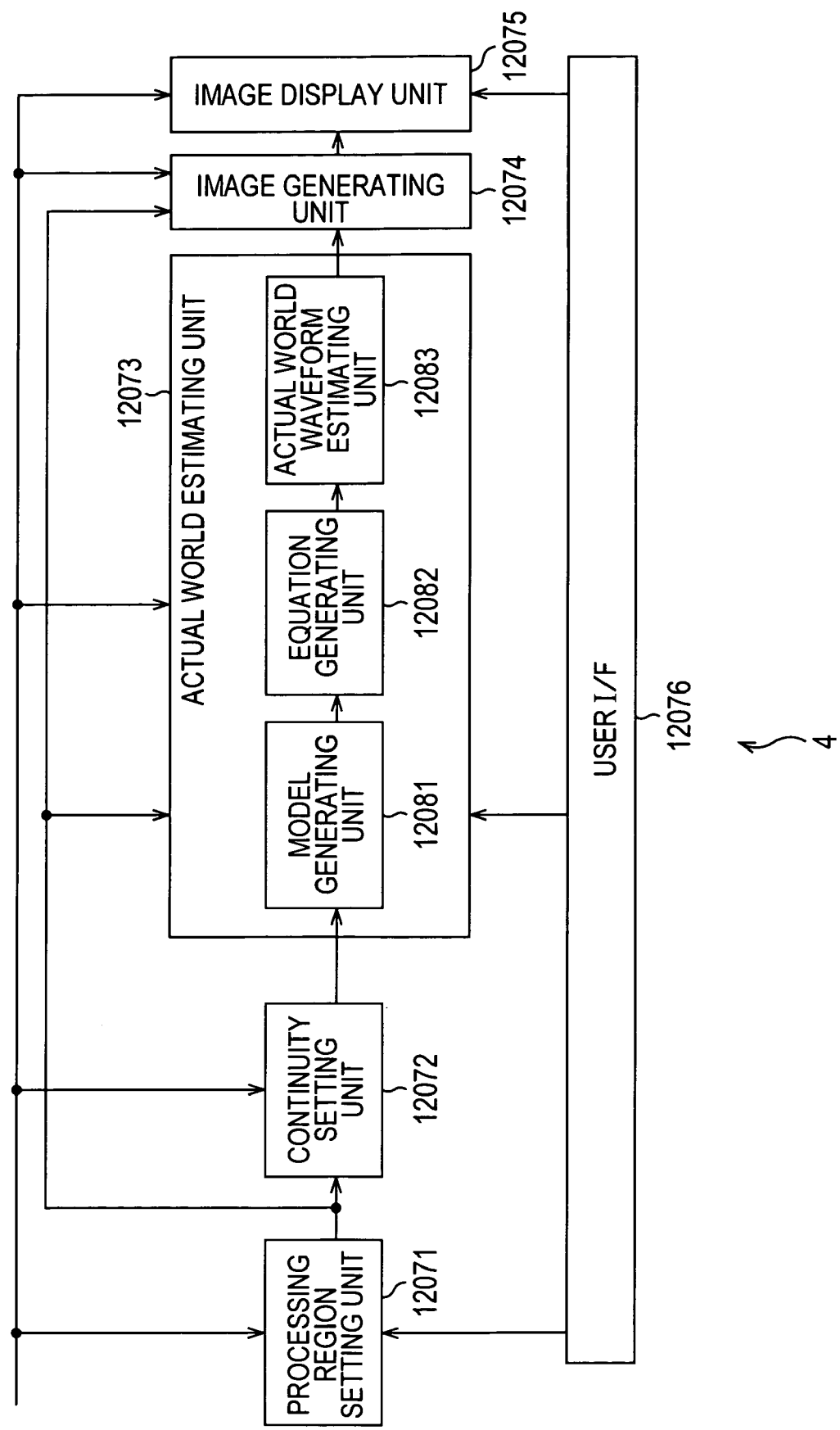

FIG. 153 is a block diagram illustrating a configuration example of another applied embodiment of the signal processing device 4 shown in FIG. 111.

Figure 154:
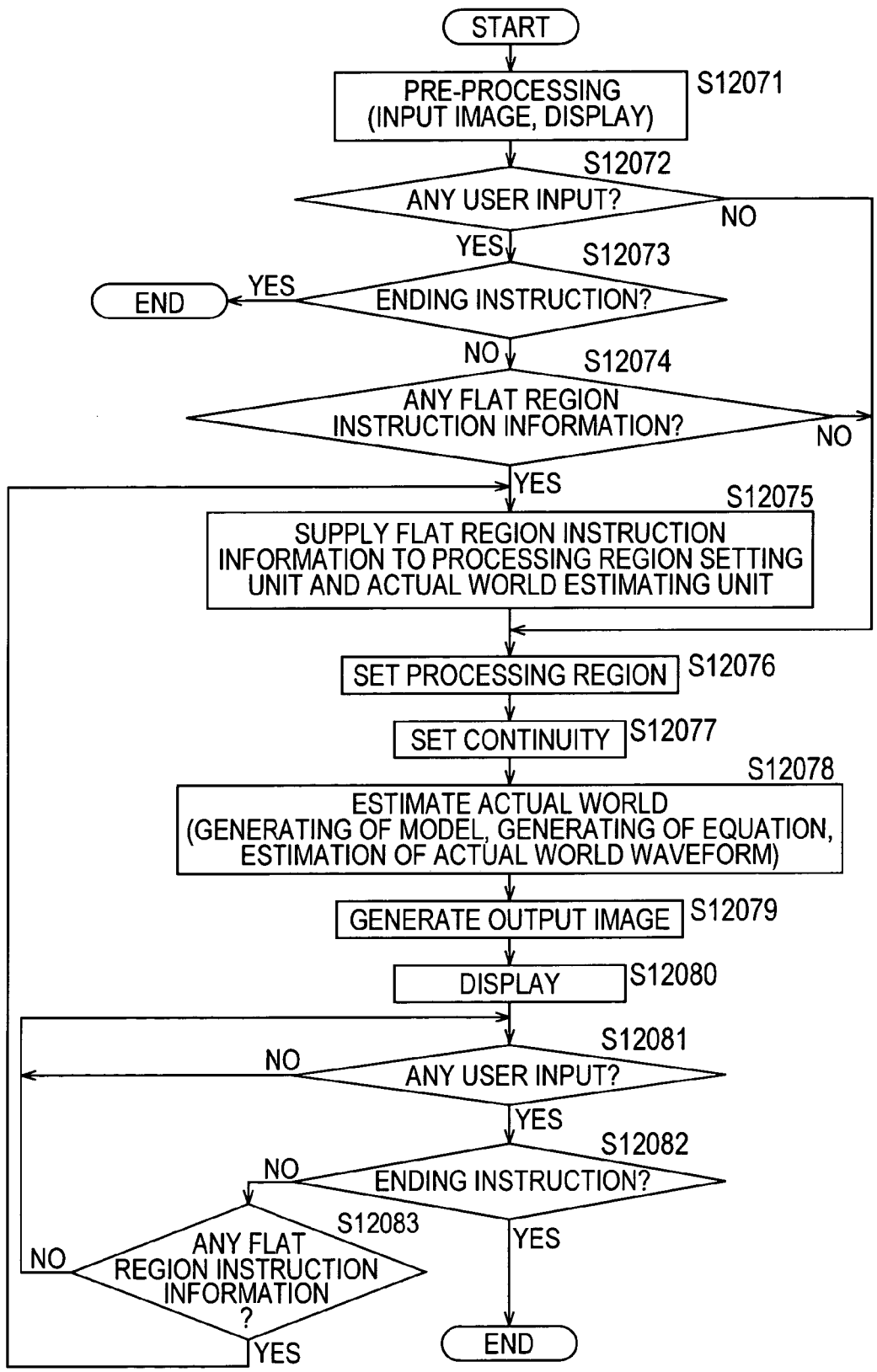

FIG. 154 is a flowchart for describing the processing of the signal processing device 4 shown in FIG. 153.

Figure 155:
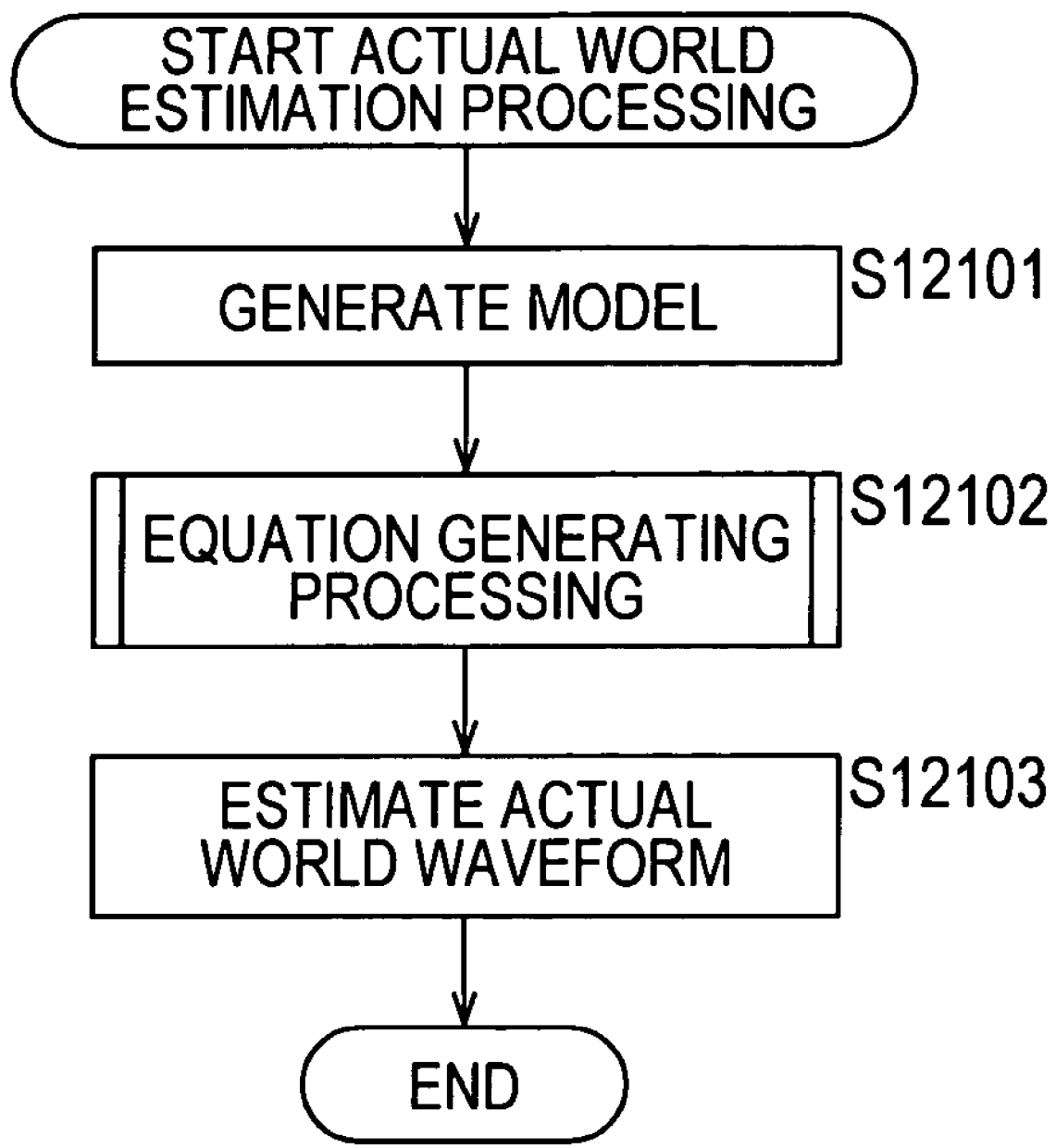

FIG. 155 is a flowchart for describing actual world estimation processing by the actual world estimating unit 12073.

Figure 156:
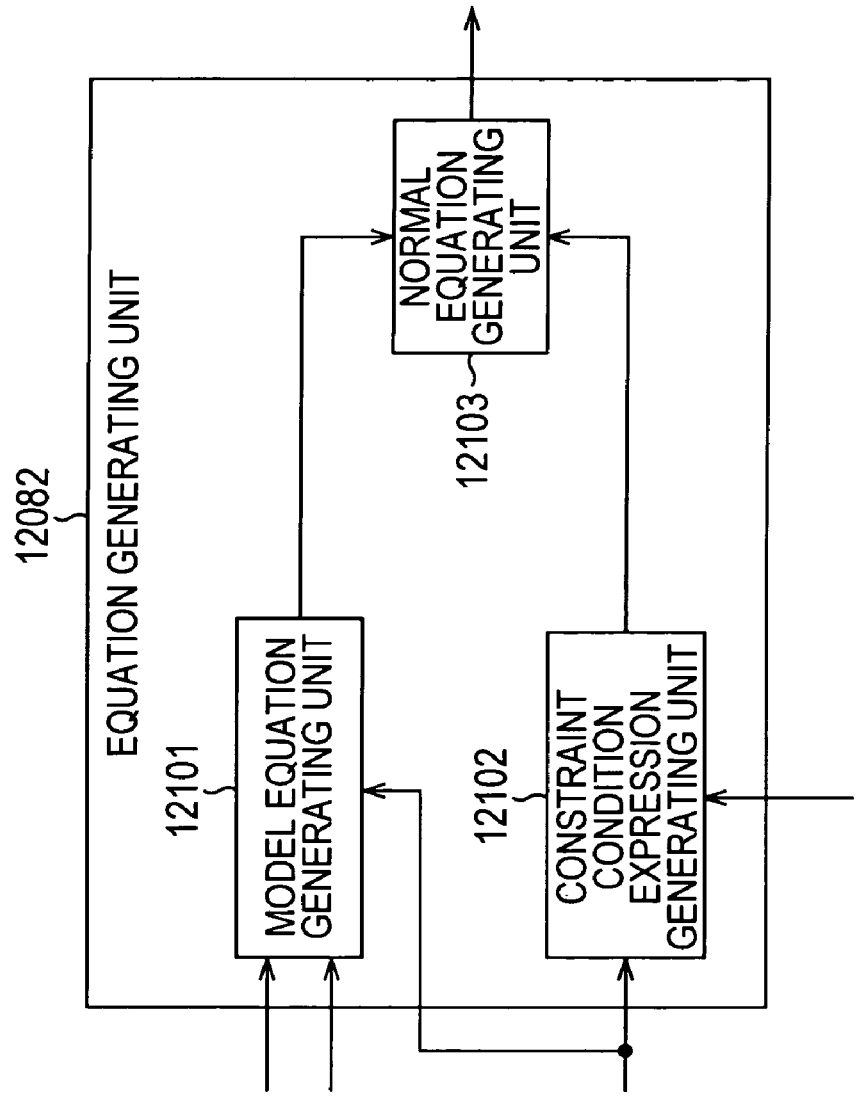

FIG. 156 is a block diagram illustrating a configuration example of a equation generating unit 12082.

Figure 157:
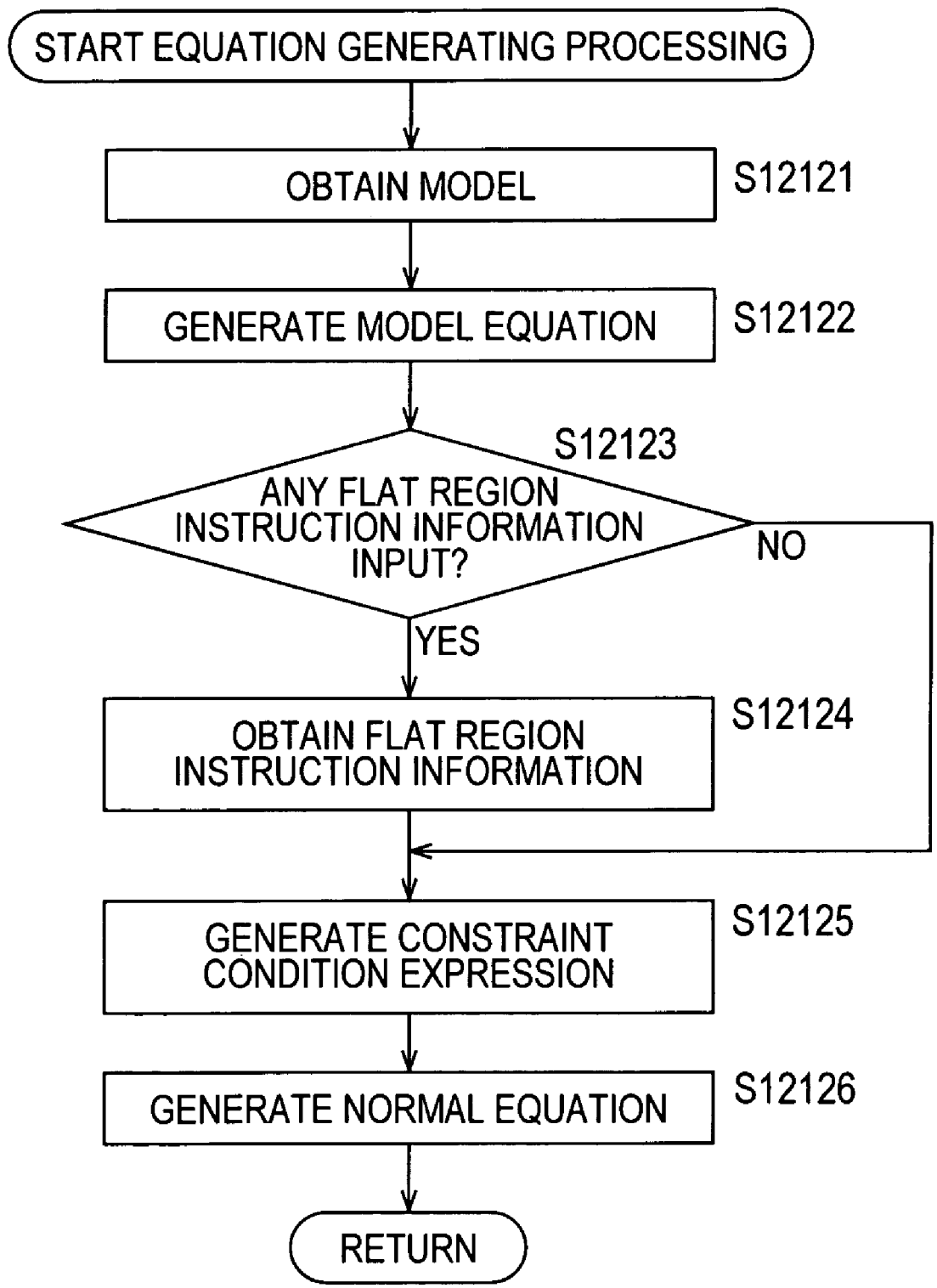

FIG. 157 is a flowchart for describing the equation generating processing in step S12102 in FIG. 155.

Figure 158:
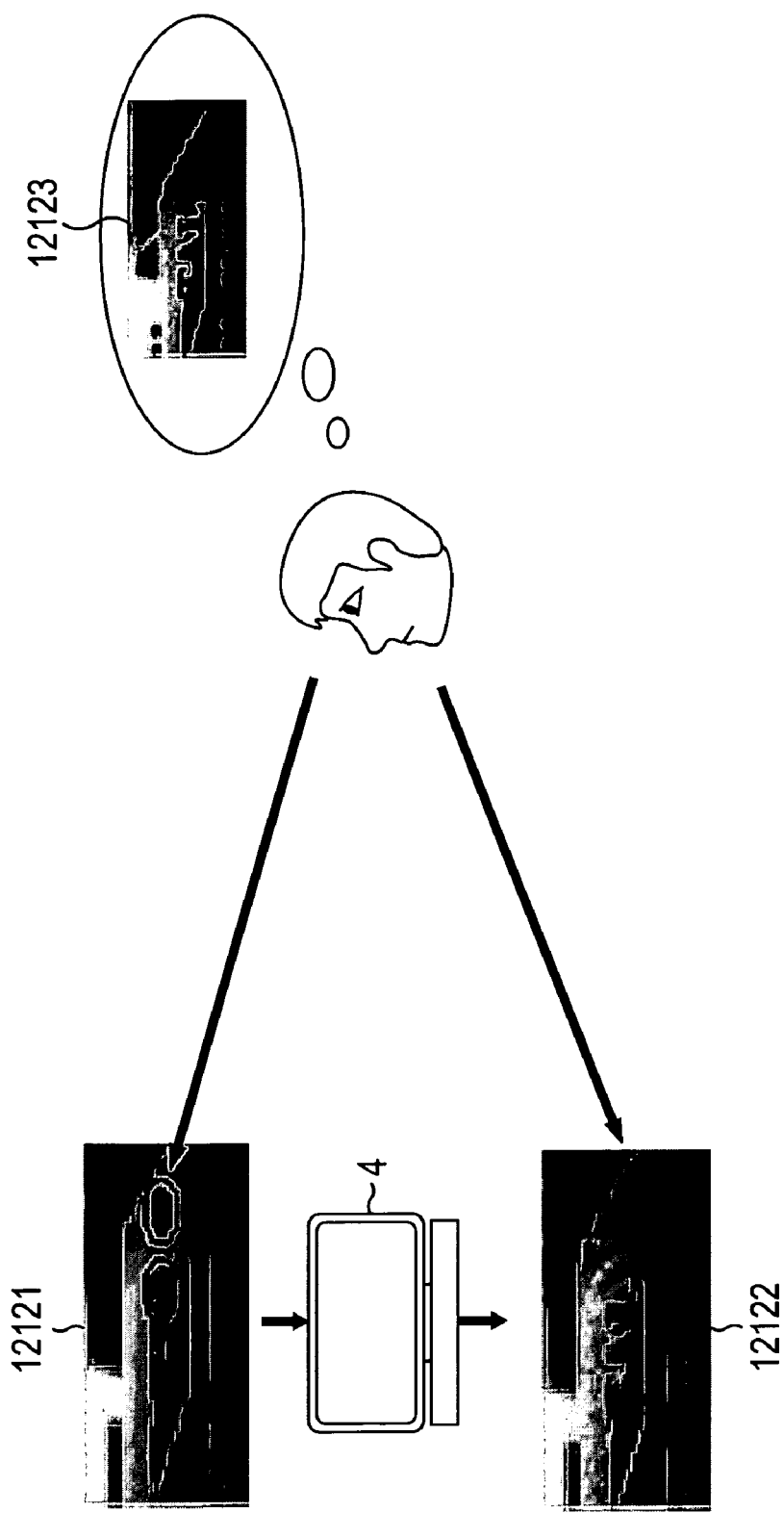

FIG. 158 is a diagram for describing the overview of processing by the signal processing device 4 shown in FIG. 153.

Figure 159:
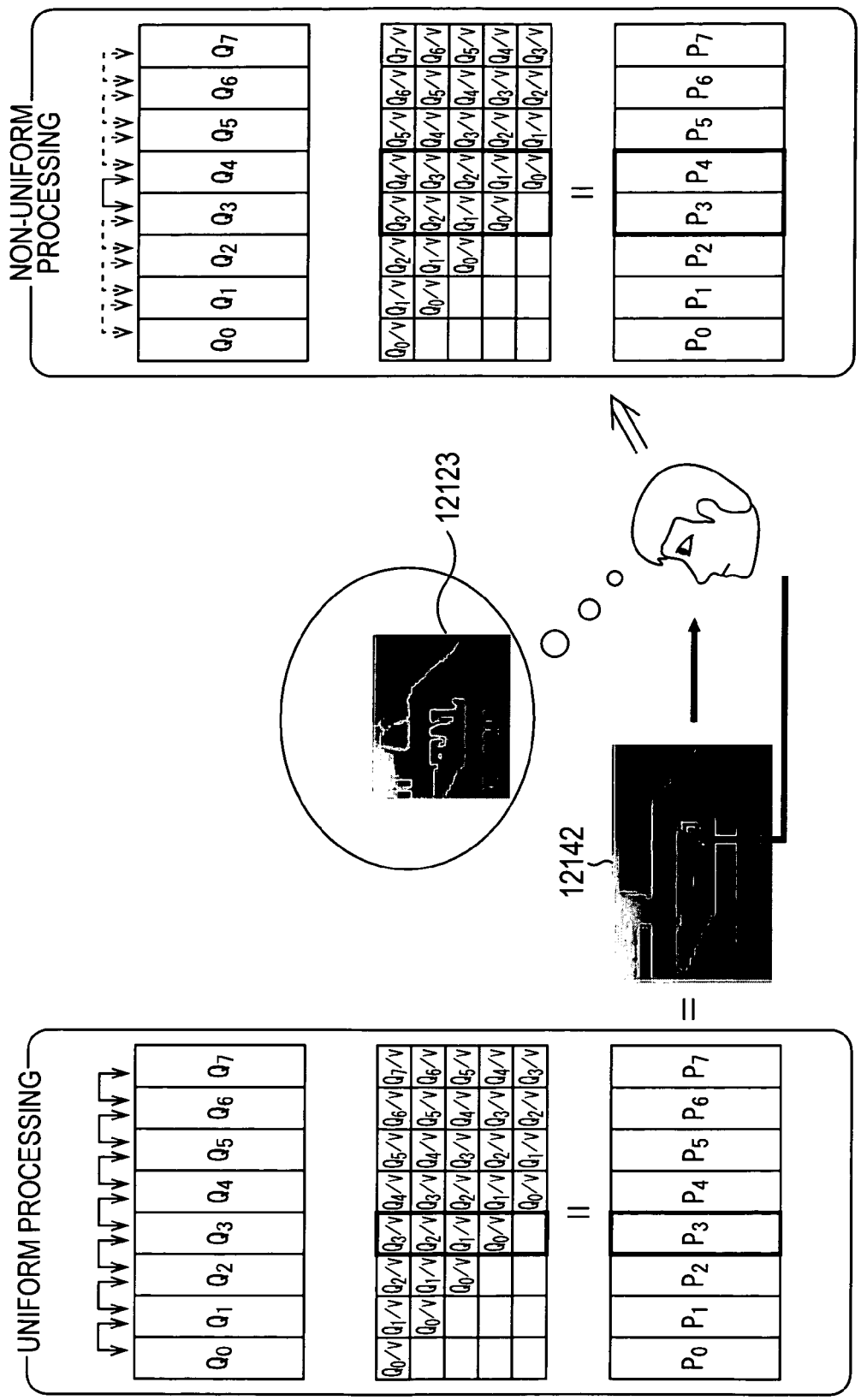

FIG. 159 is a diagram for describing the overview of processing by the signal processing device 4 shown in FIG. 153.

Figure 160A:
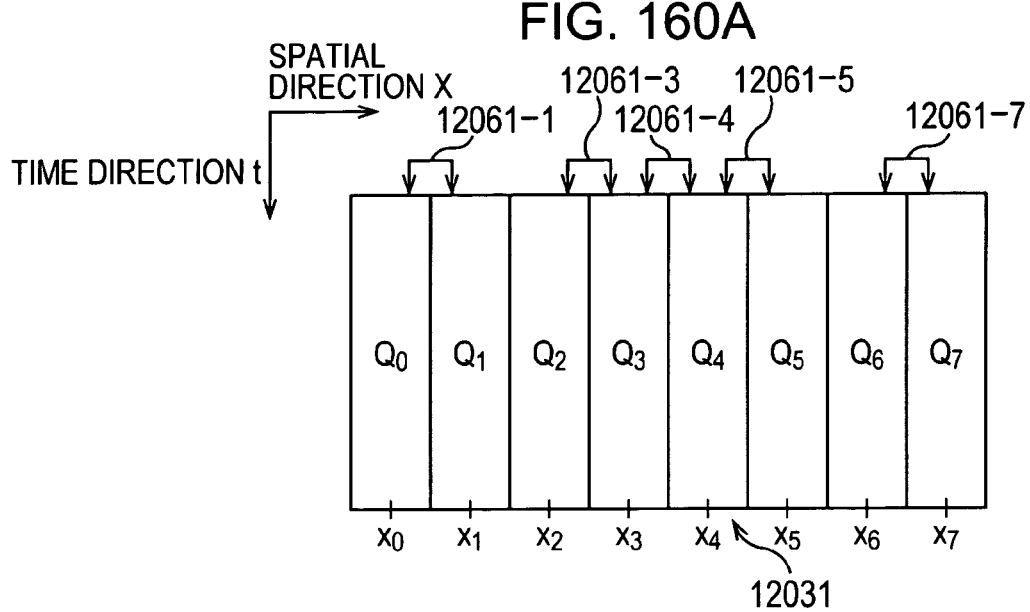

FIG. 160A is a diagram for describing constraining conditions.

Figure 160B:
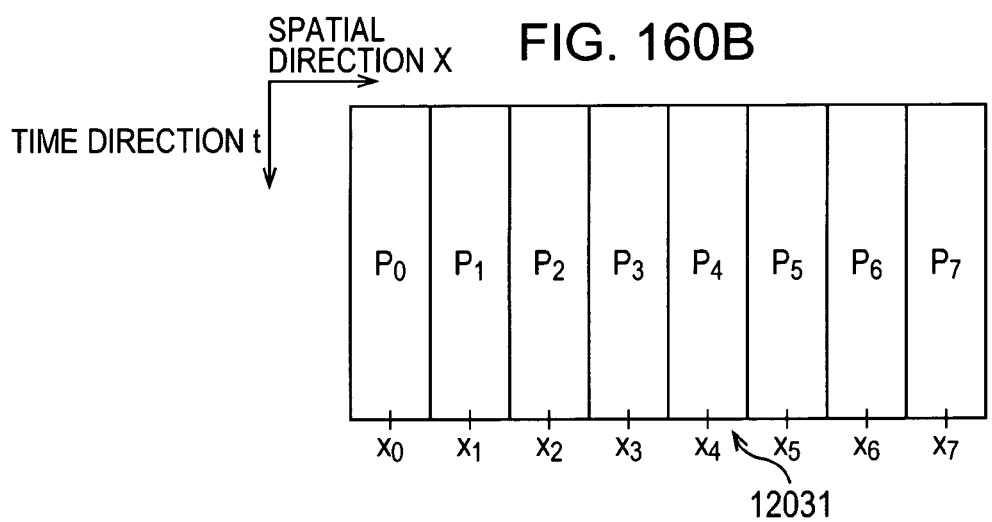

FIG. 160B is a diagram for describing constraining conditions.

Figure 160C:
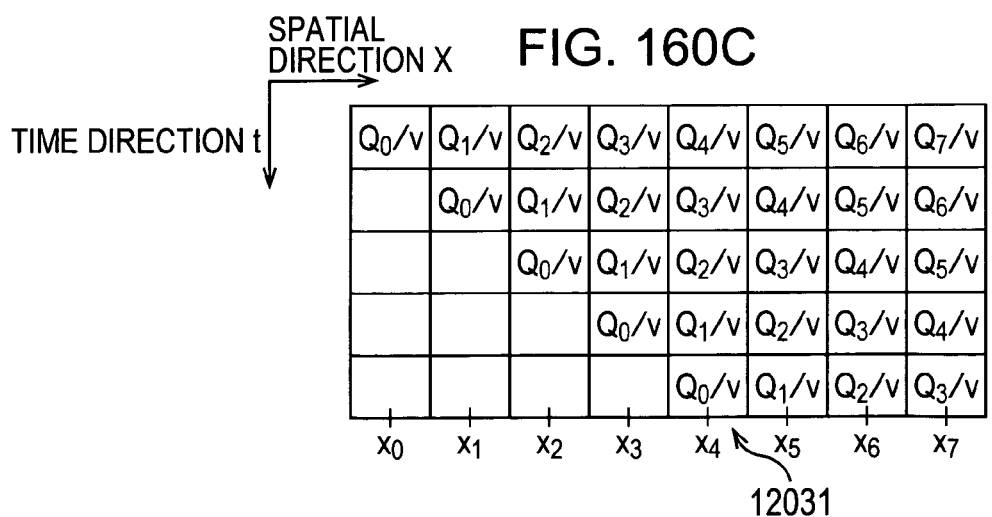

FIG. 160C is a diagram for describing constraining conditions.

Figure 161:
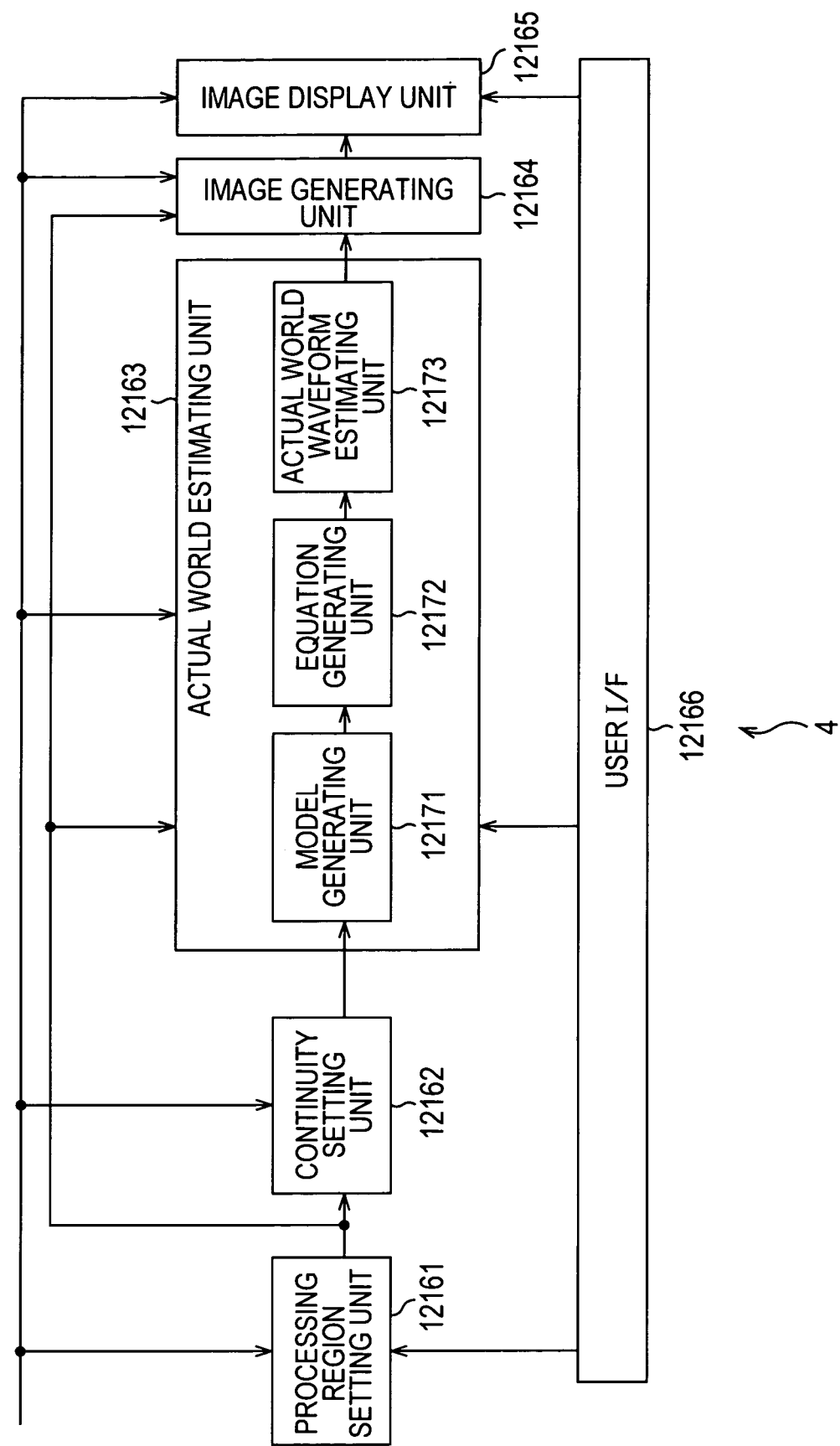

FIG. 161 is a block diagram illustrating a configuration example of another applied embodiment of the signal processing device 4 shown in FIG. 111.

Figure 162:
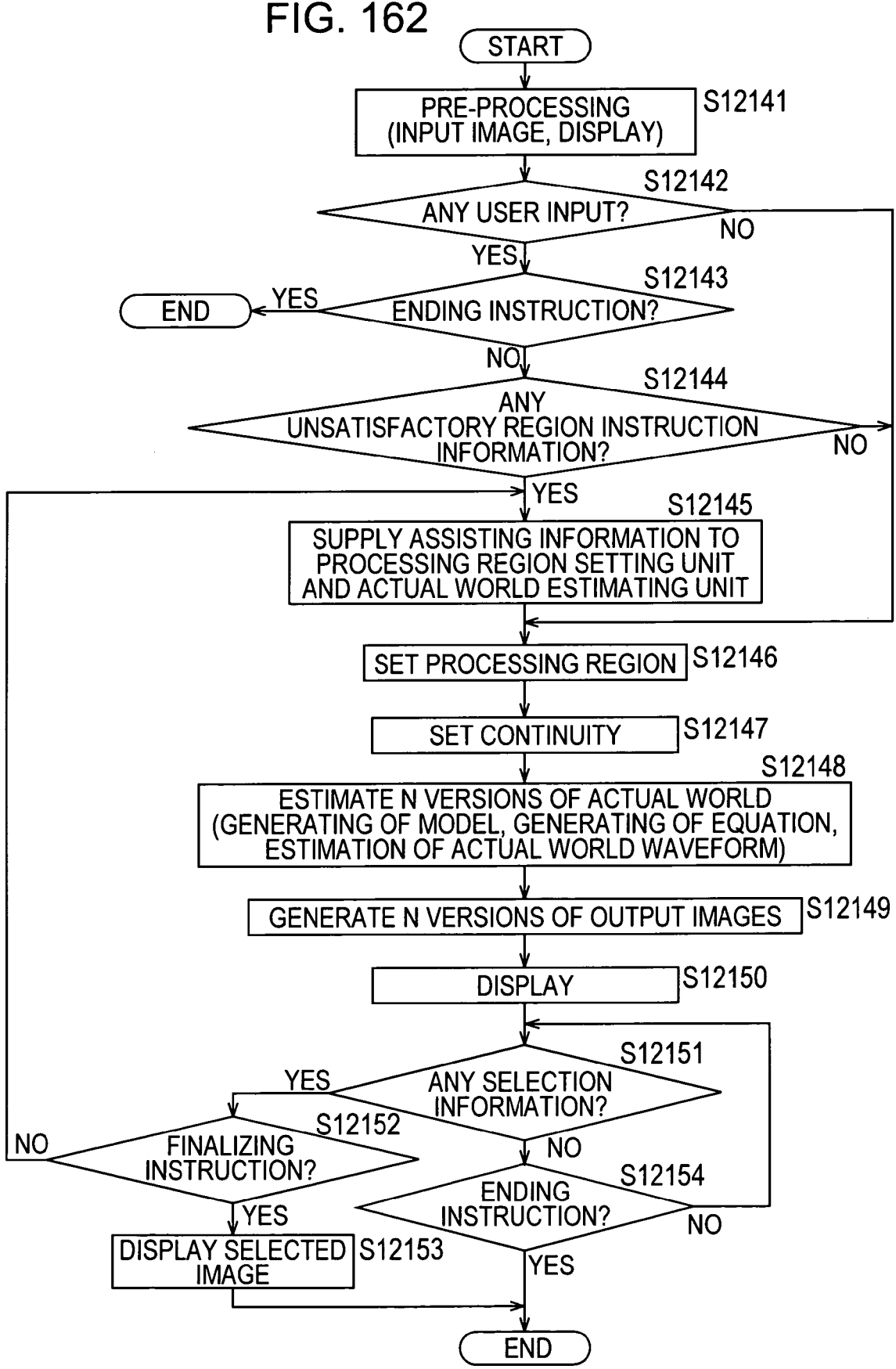

FIG. 162 is a flowchart for describing the processing of the signal processing device 4 shown in FIG. 161.

Figure 163:
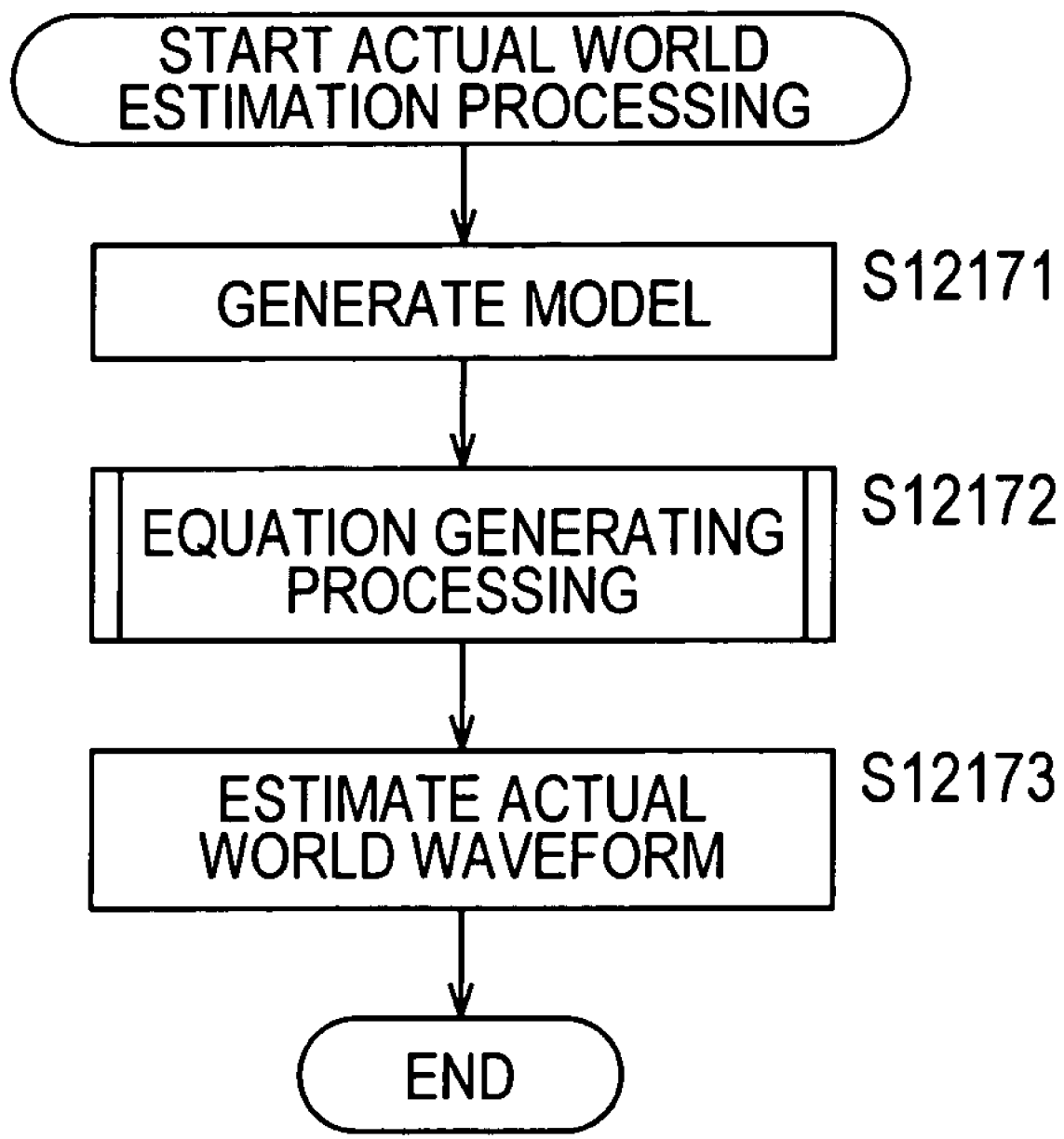

FIG. 163 is a flowchart for describing actual world estimation processing by the actual world estimating unit 12163.

Figure 164:
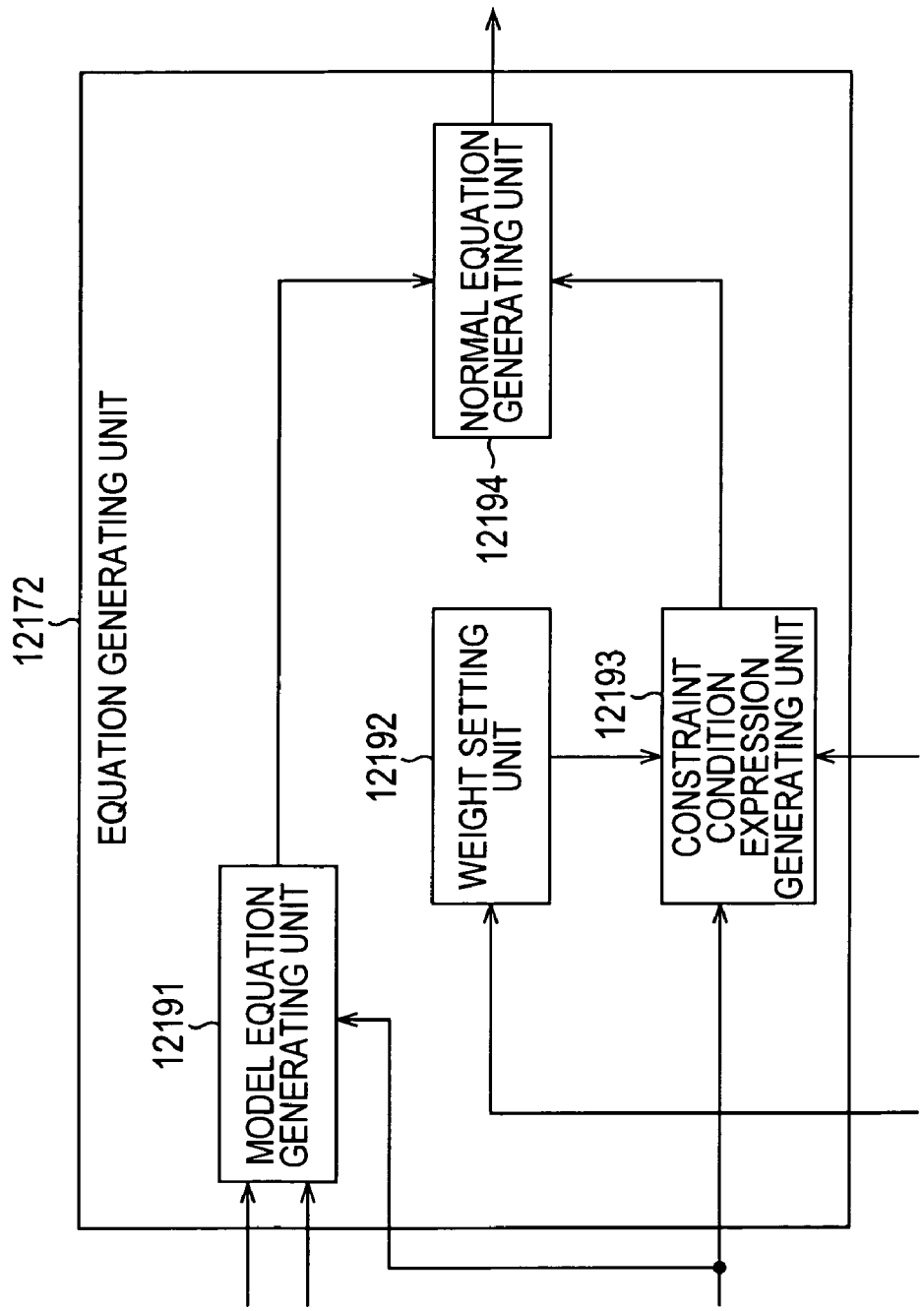

FIG. 164 is a block diagram illustrating a configuration example of a equation generating unit 12172.

Figure 165:
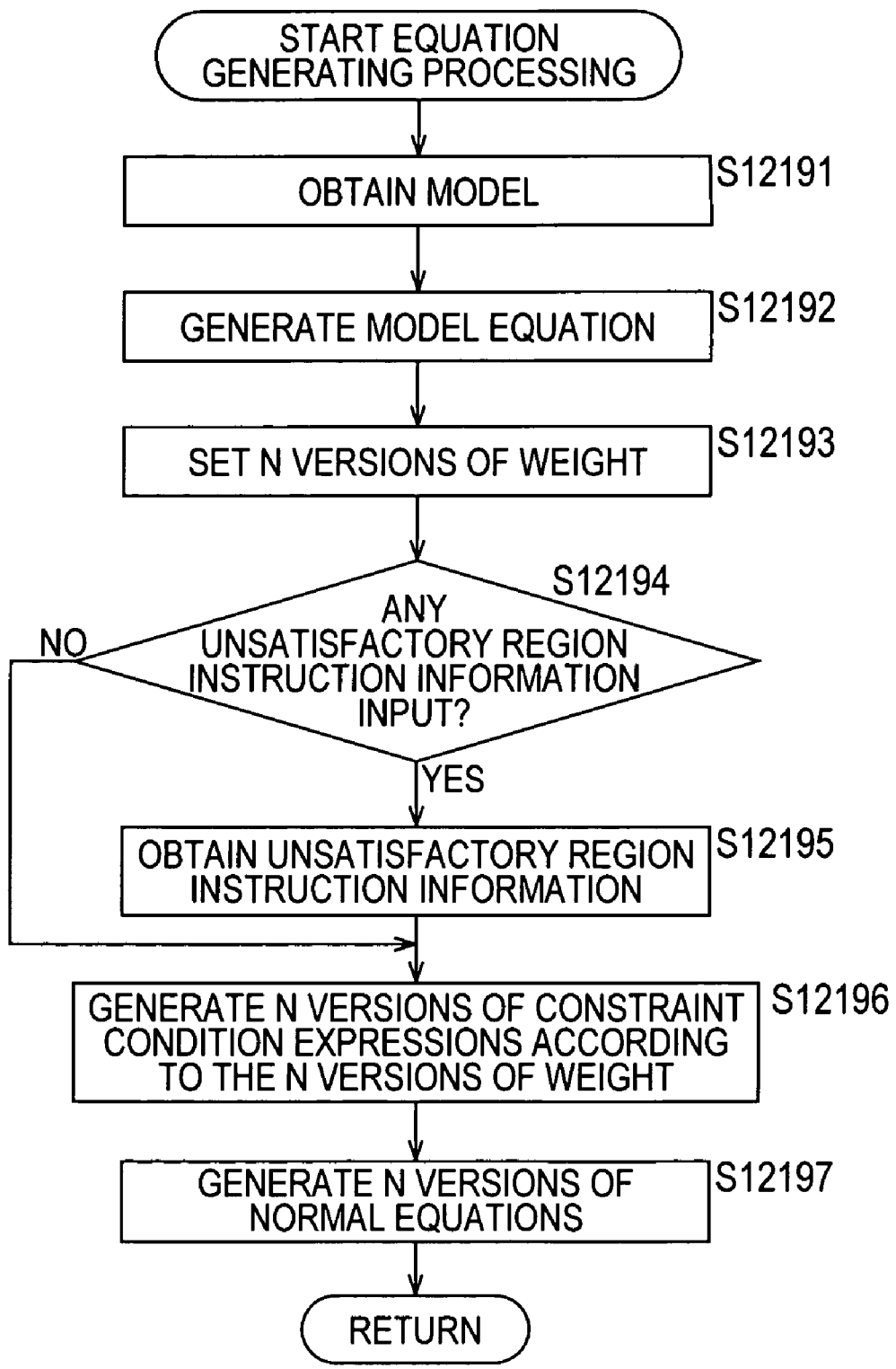

FIG. 165 is a flowchart for describing the equation generating processing in step S12172 in FIG. 163.

Figure 166:
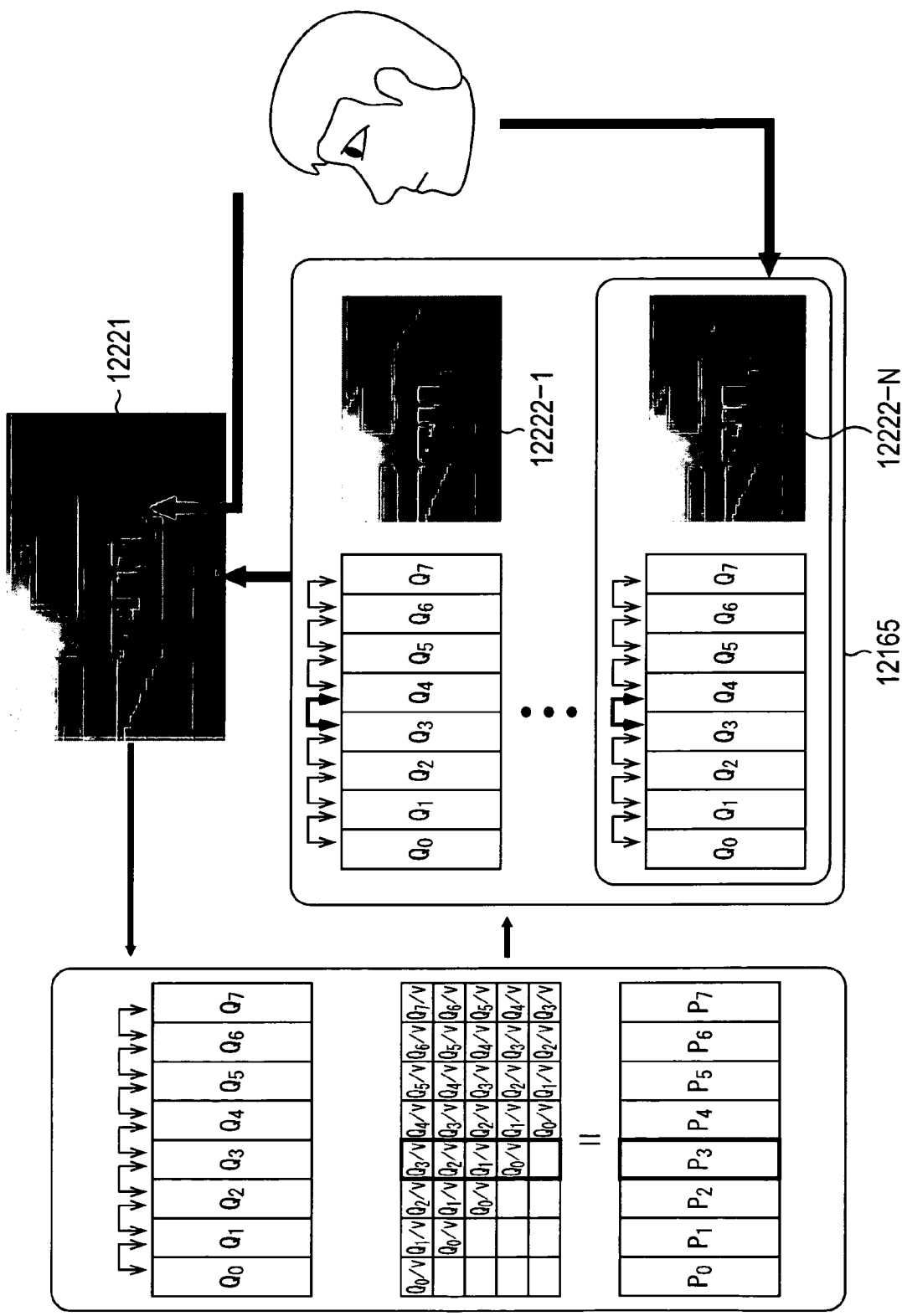

FIG. 166 is a diagram for describing the overview of processing by the signal processing device 4 shown in FIG. 161.

Figure 167:
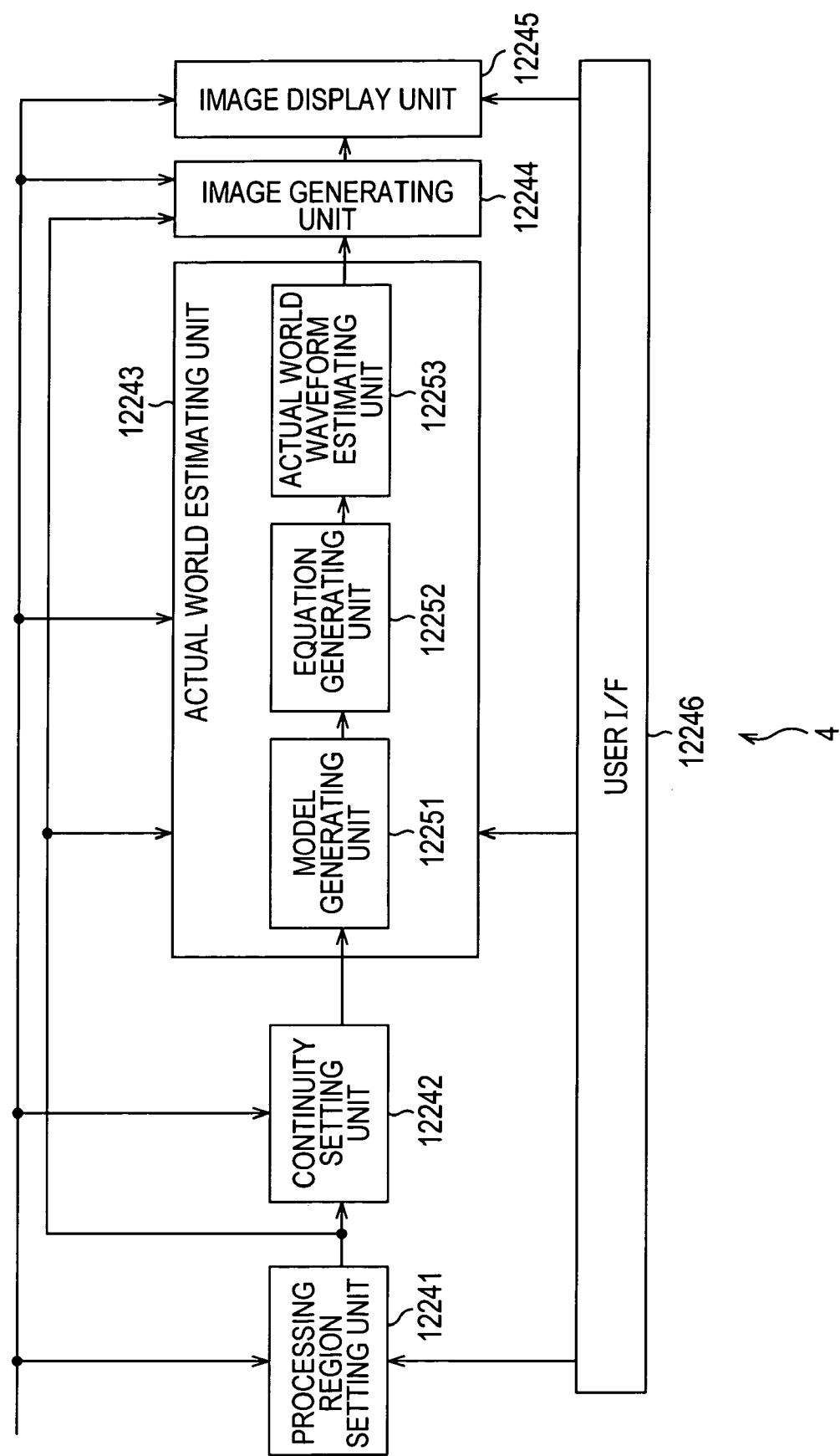

FIG. 167 is a block diagram illustrating a configuration example of another applied embodiment of the signal processing device 4 shown in FIG. 111.

Figure 168:
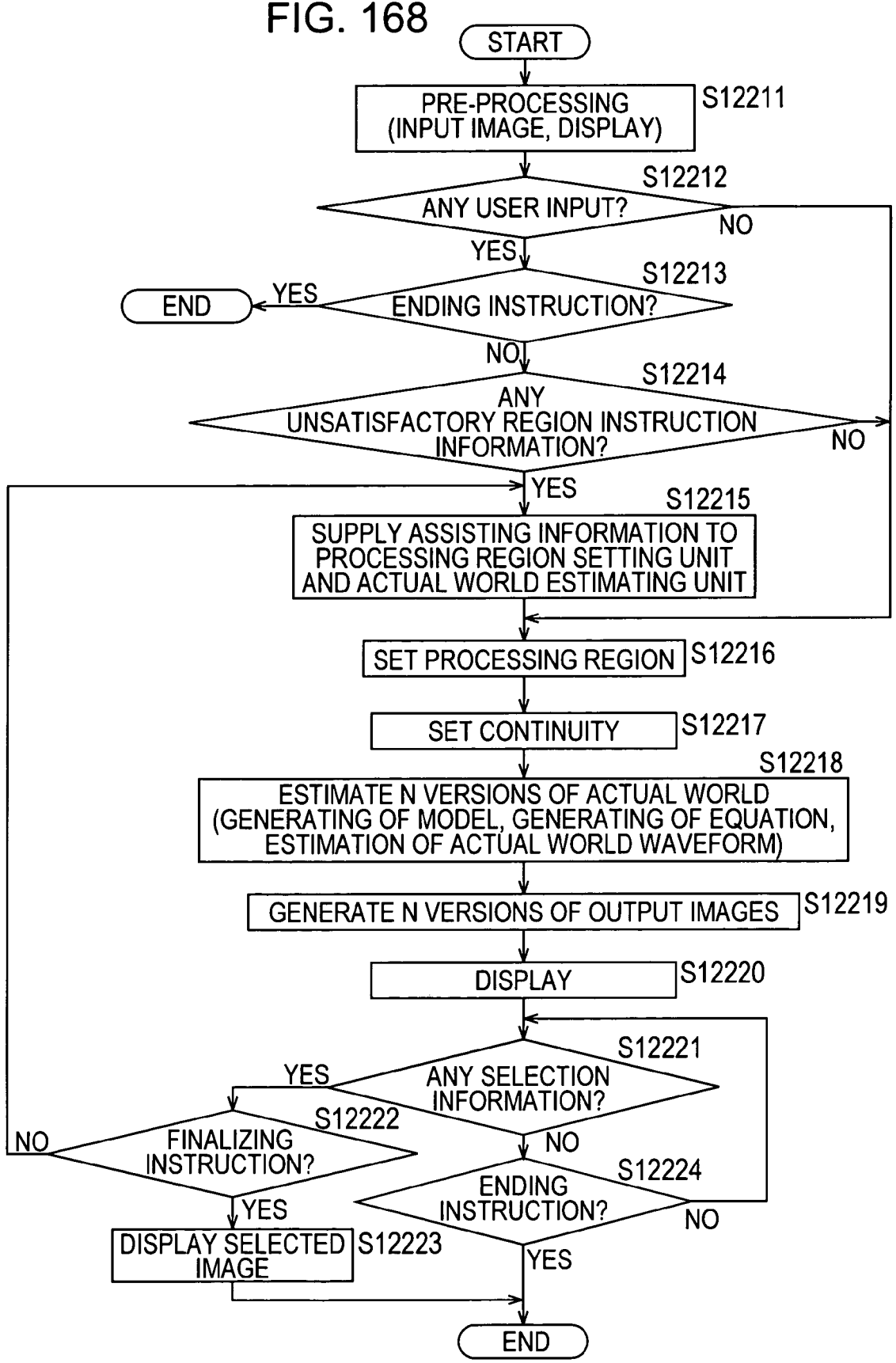

FIG. 168 is a flowchart for describing the processing of the signal processing device 4 shown in FIG. 167.

Figure 169:
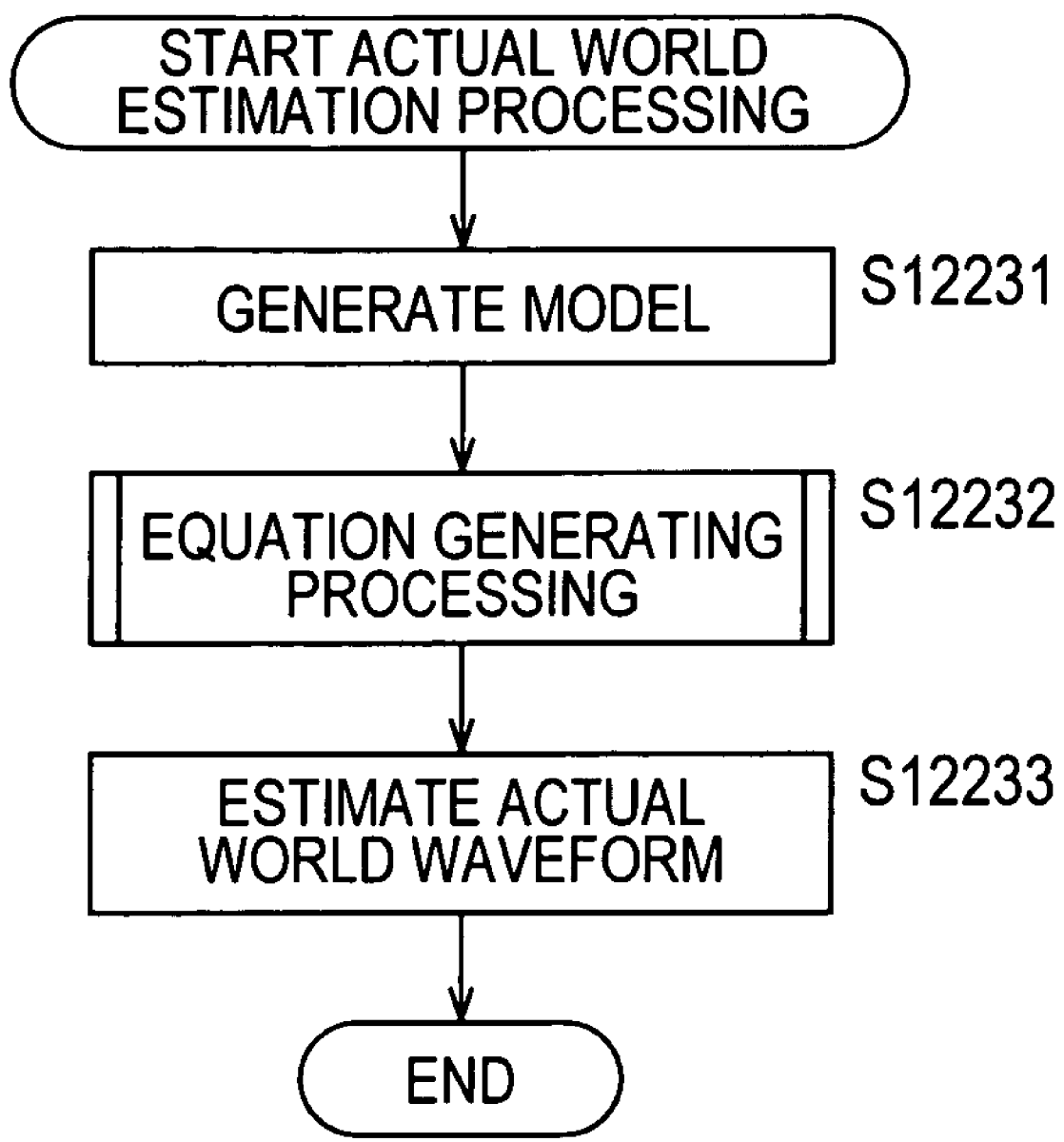

FIG. 169 is a flowchart for describing actual world estimation processing by the actual world estimating unit 12243.

Figure 170:
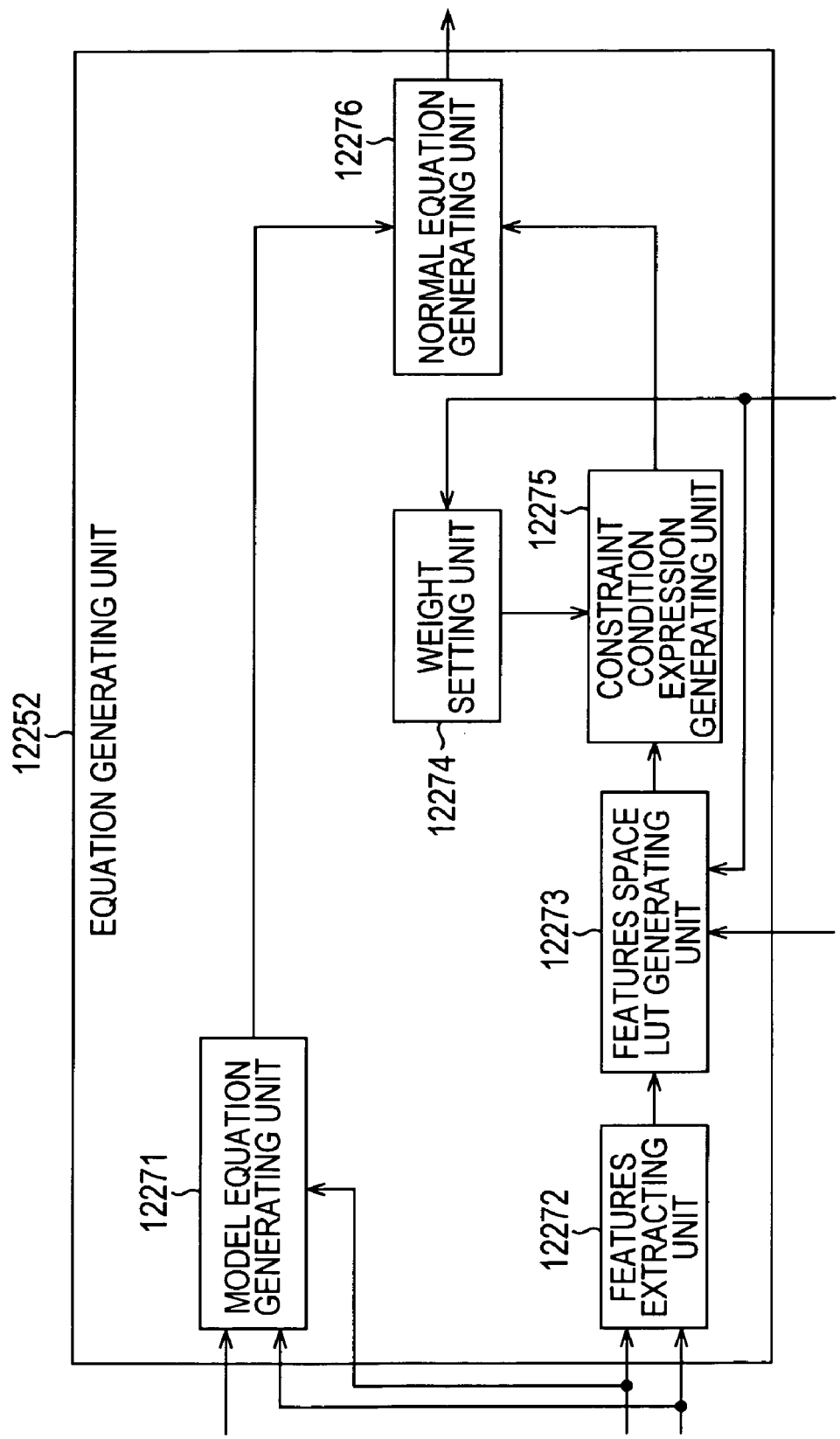

FIG. 170 is a diagram illustrating a configuration example of a equation generating unit 12252.

Figure 171:
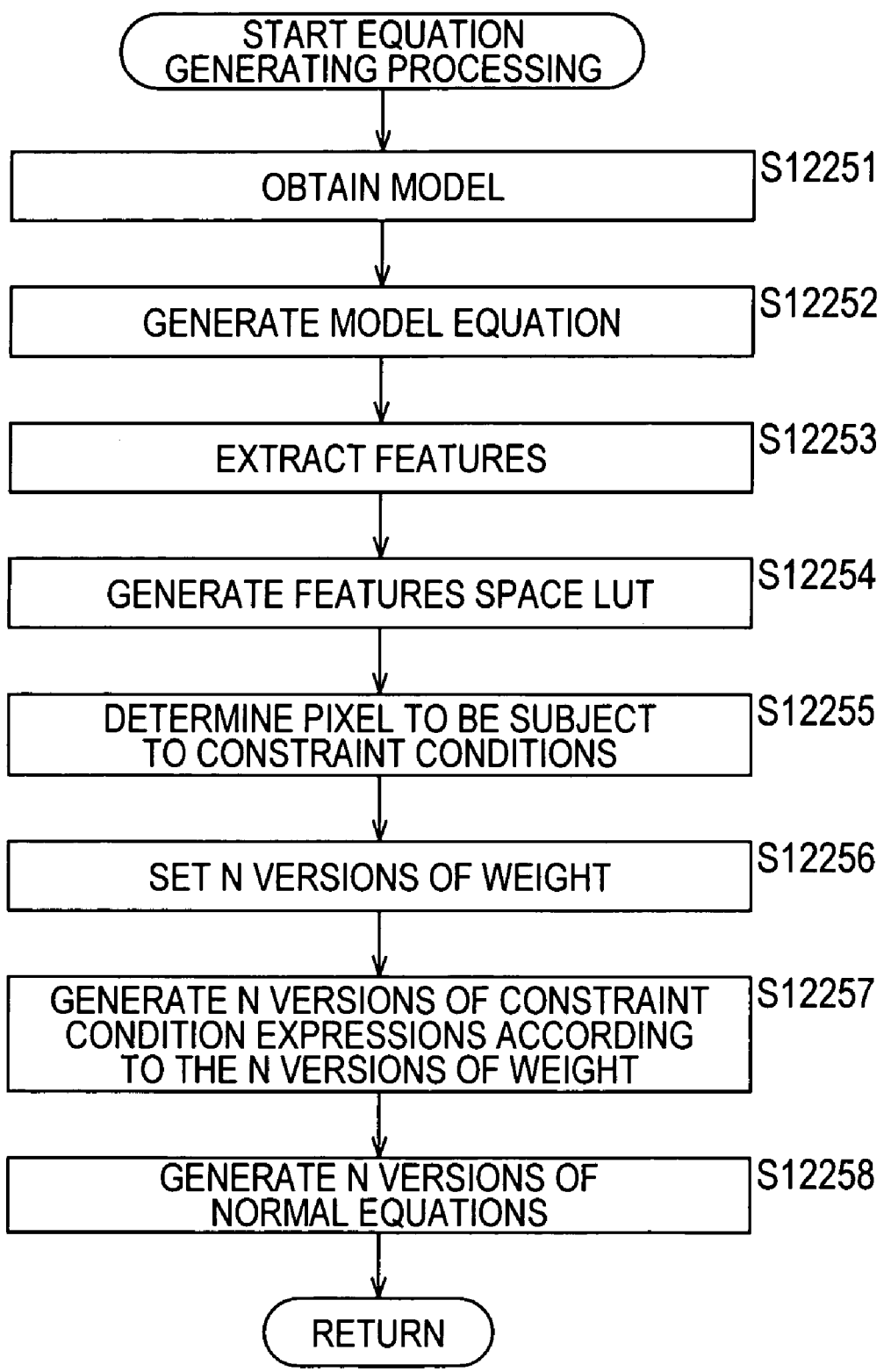

FIG. 171 is a flowchart for describing the equation generating processing in step S12232 in FIG. 169.

FIG. 172A is a diagram for describing the overview of processing by the signal processing device 4 shown in FIG. 167.

FIG. 172B is a diagram for describing the overview of processing by the signal processing device 4 shown in FIG. 167.

Figure 173:
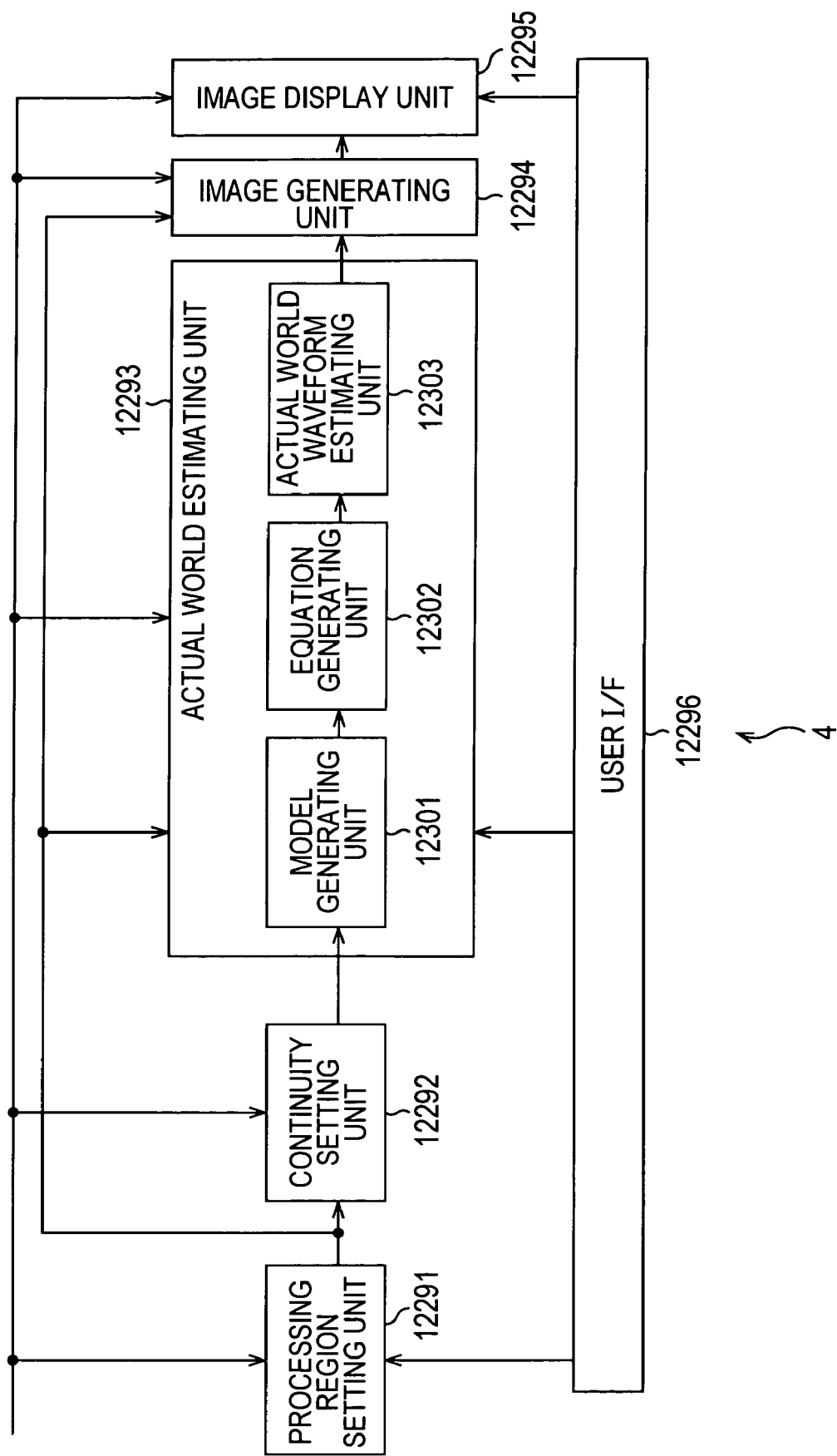

FIG. 173 is a block diagram illustrating a configuration example of another applied embodiment of the signal processing device 4 shown in FIG. 111.

Figure 174:
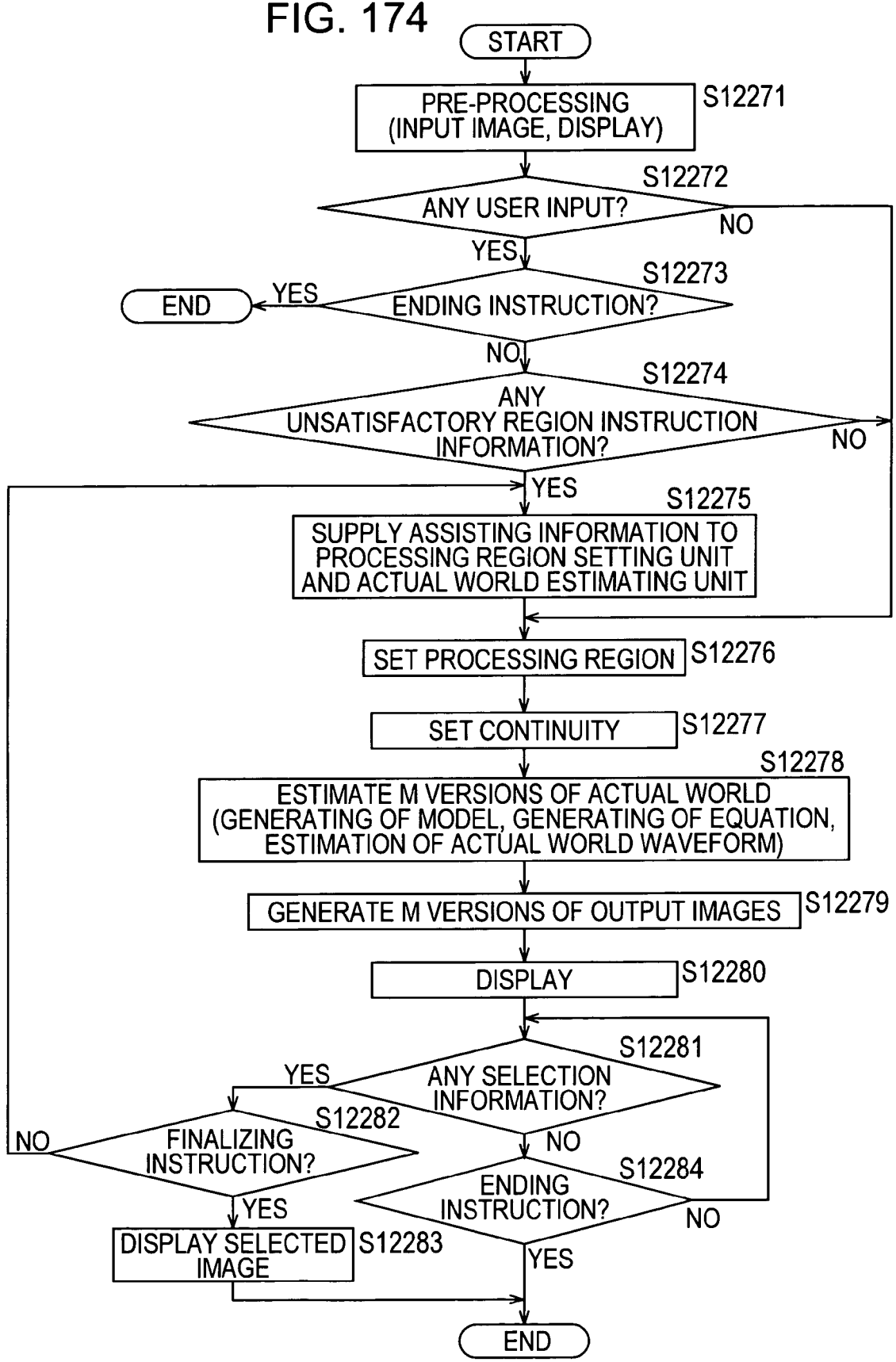

FIG. 174 is a flowchart for describing the processing of the signal processing device 4 shown in FIG. 173.

Figure 175:
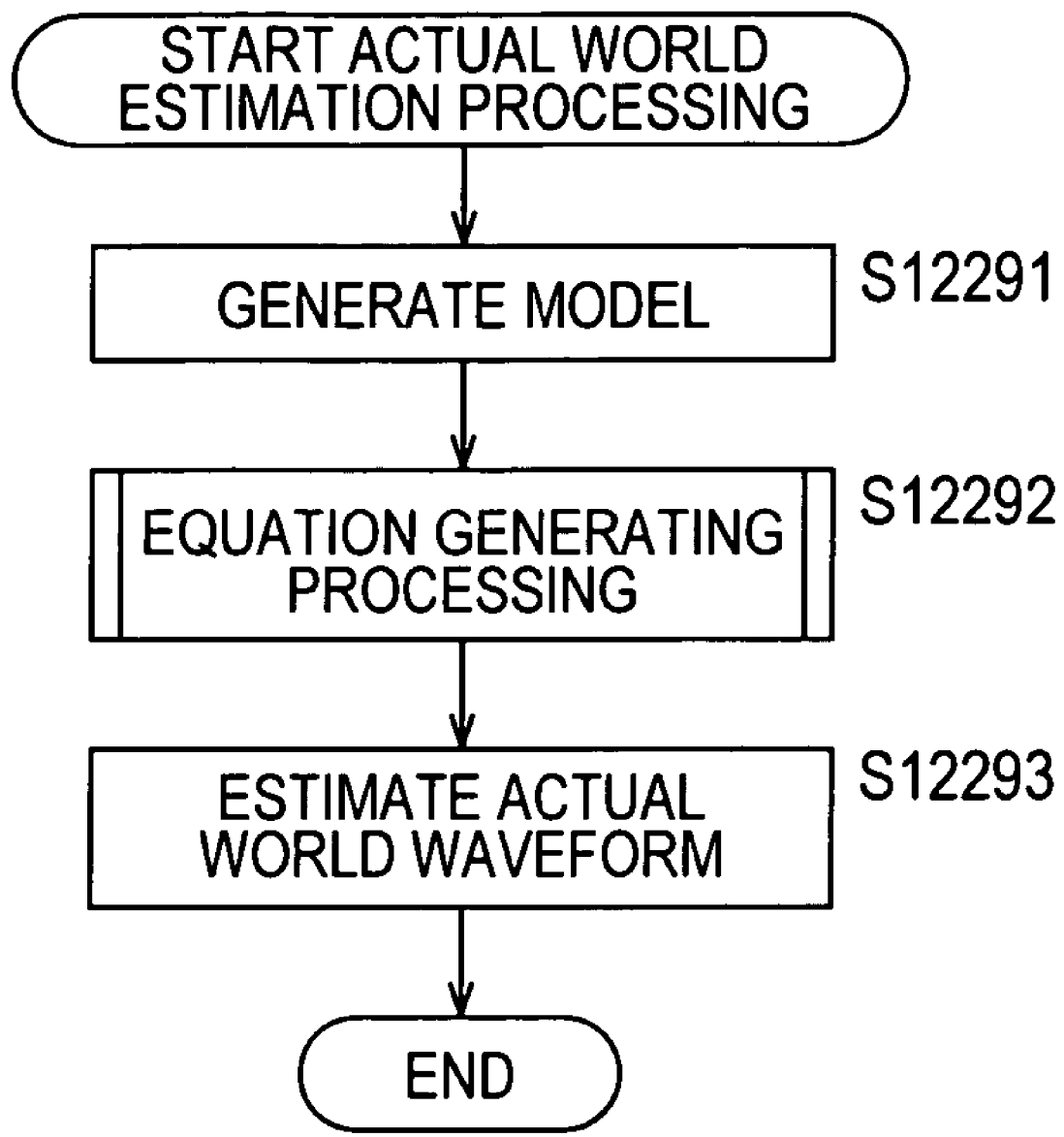

FIG. 175 is a flowchart for describing actual world estimation processing by the actual world estimating unit 12293.

Figure 176:
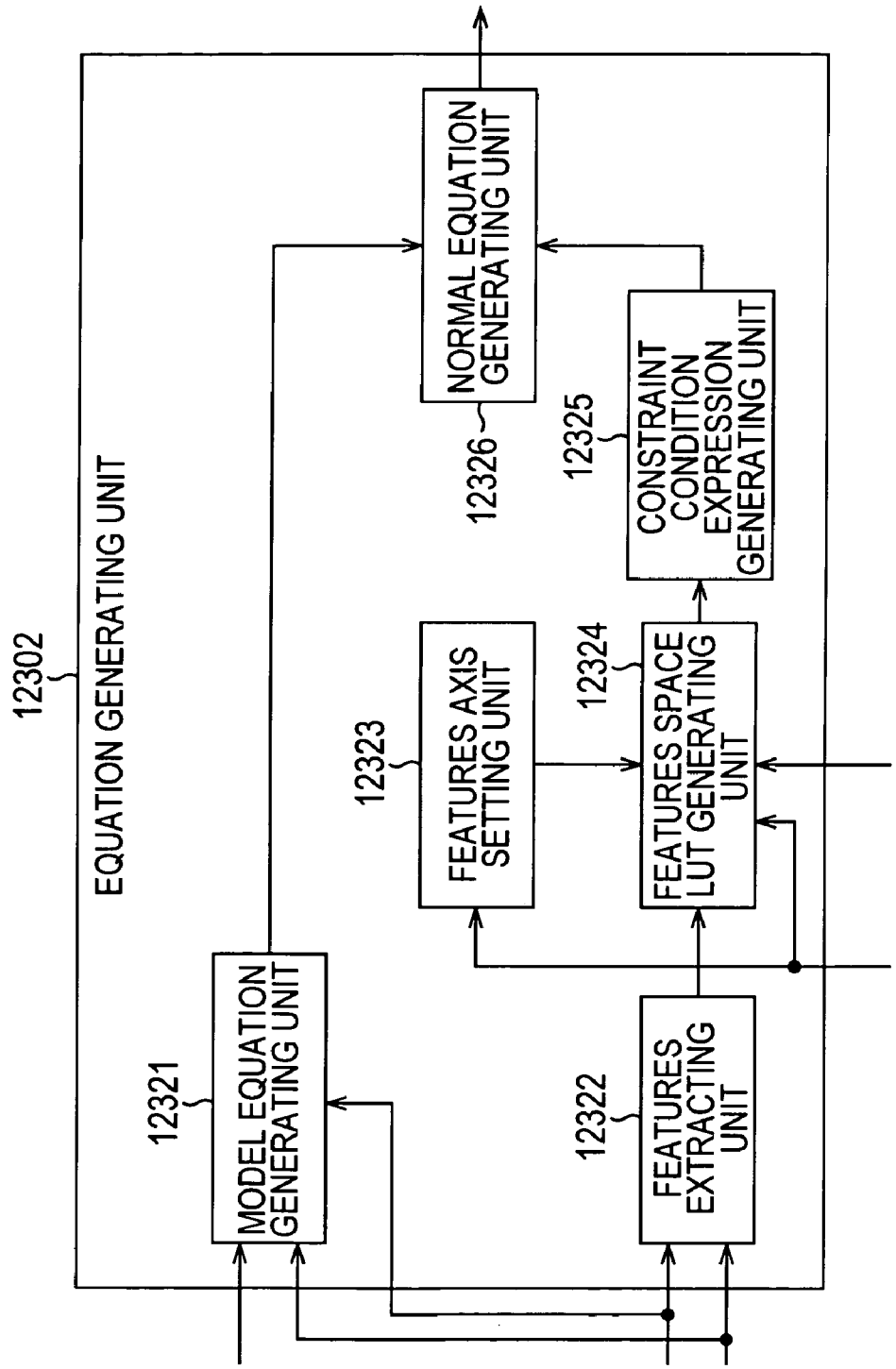

FIG. 176 is a diagram illustrating a configuration example of a equation generating unit 12302.

Figure 177:
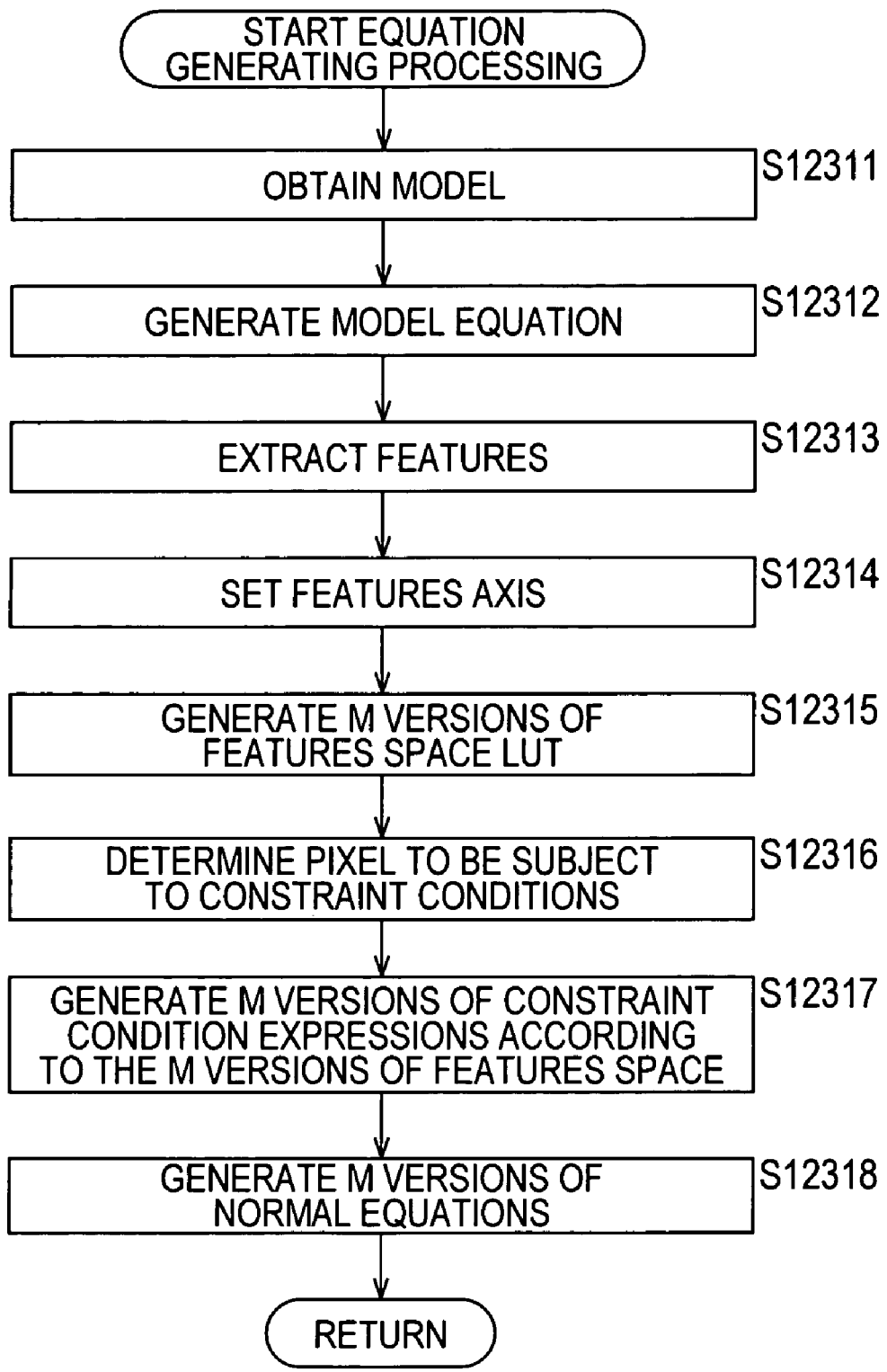

FIG. 177 is a flowchart for describing the equation generating processing in step S12292 in FIG. 175.

Figure 178:
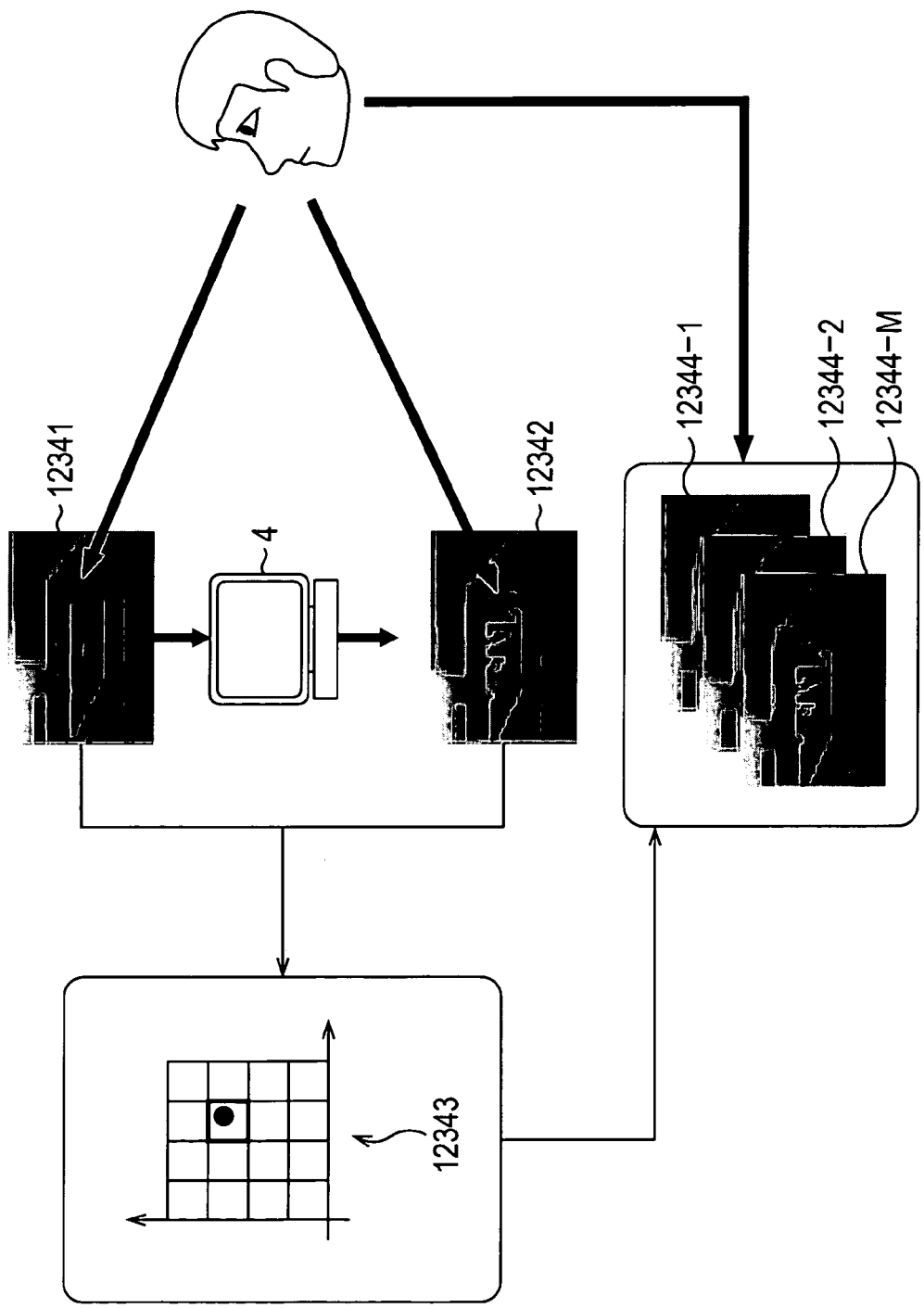

FIG. 178 is a diagram for describing the overview of processing by the signal processing device 4 shown in FIG. 173.

Figure 179:
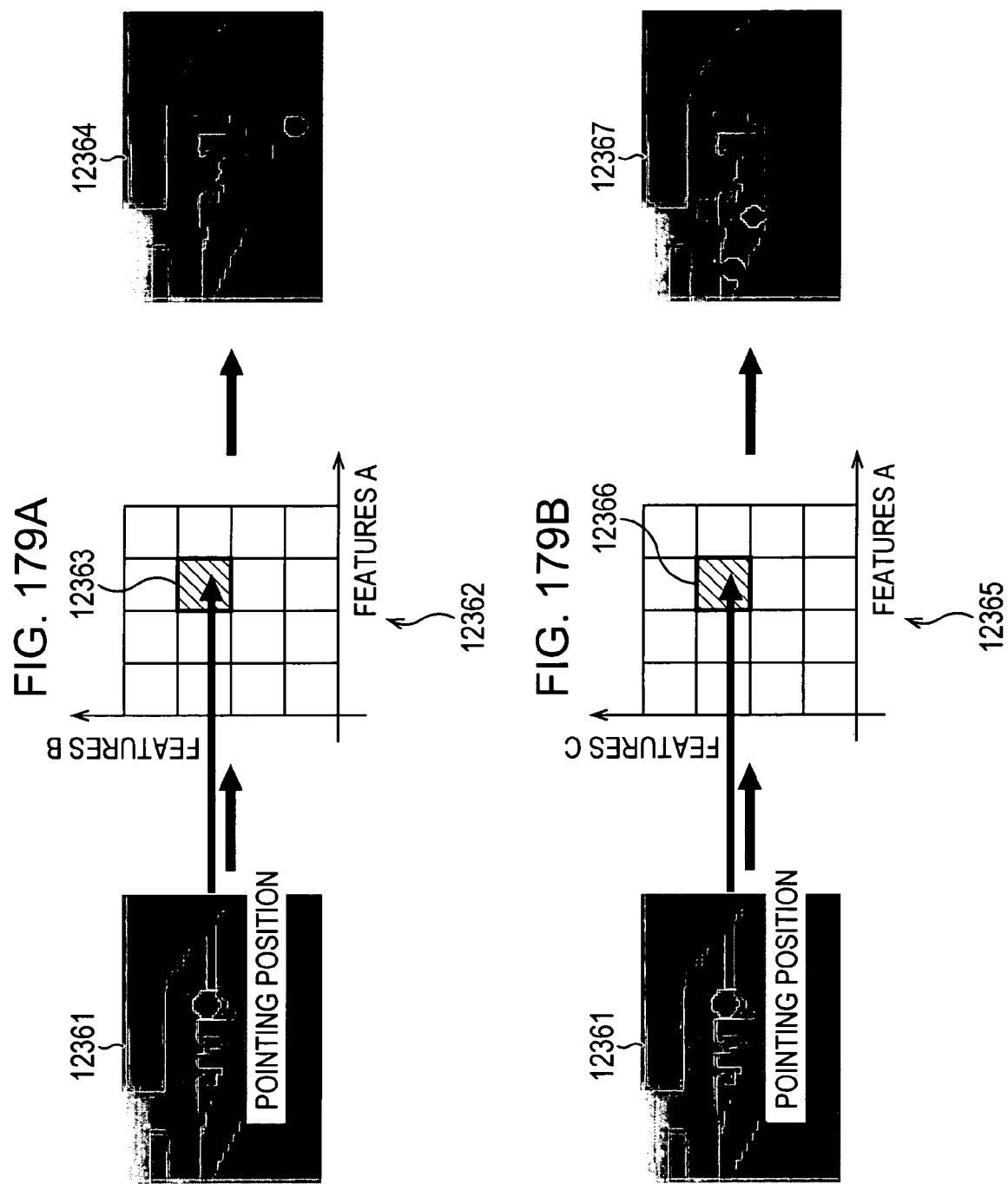

FIG. 179A is a diagram for describing the overview of processing by the signal processing device 4 shown in FIG. 173.

FIG. 179B is a diagram for describing the overview of processing by the signal processing device 4 shown in FIG. 173.

Figure 180:
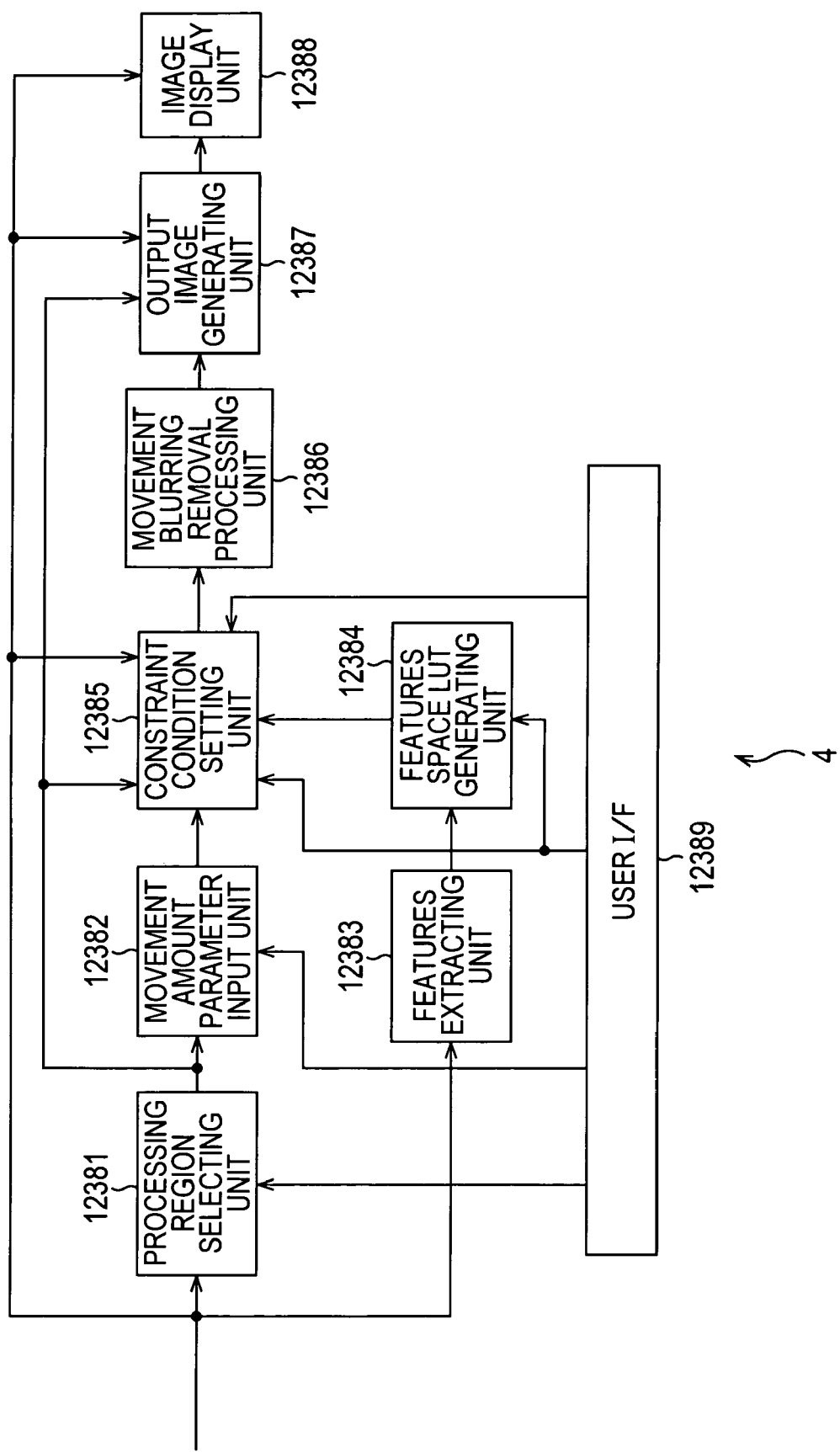

FIG. 180 is a block diagram illustrating a configuration example of a signal processing device 4 equivalent to the signal processing device 4 shown in FIG. 153, FIG. 161, FIG. 167, and FIG. 173.

Figure 181:
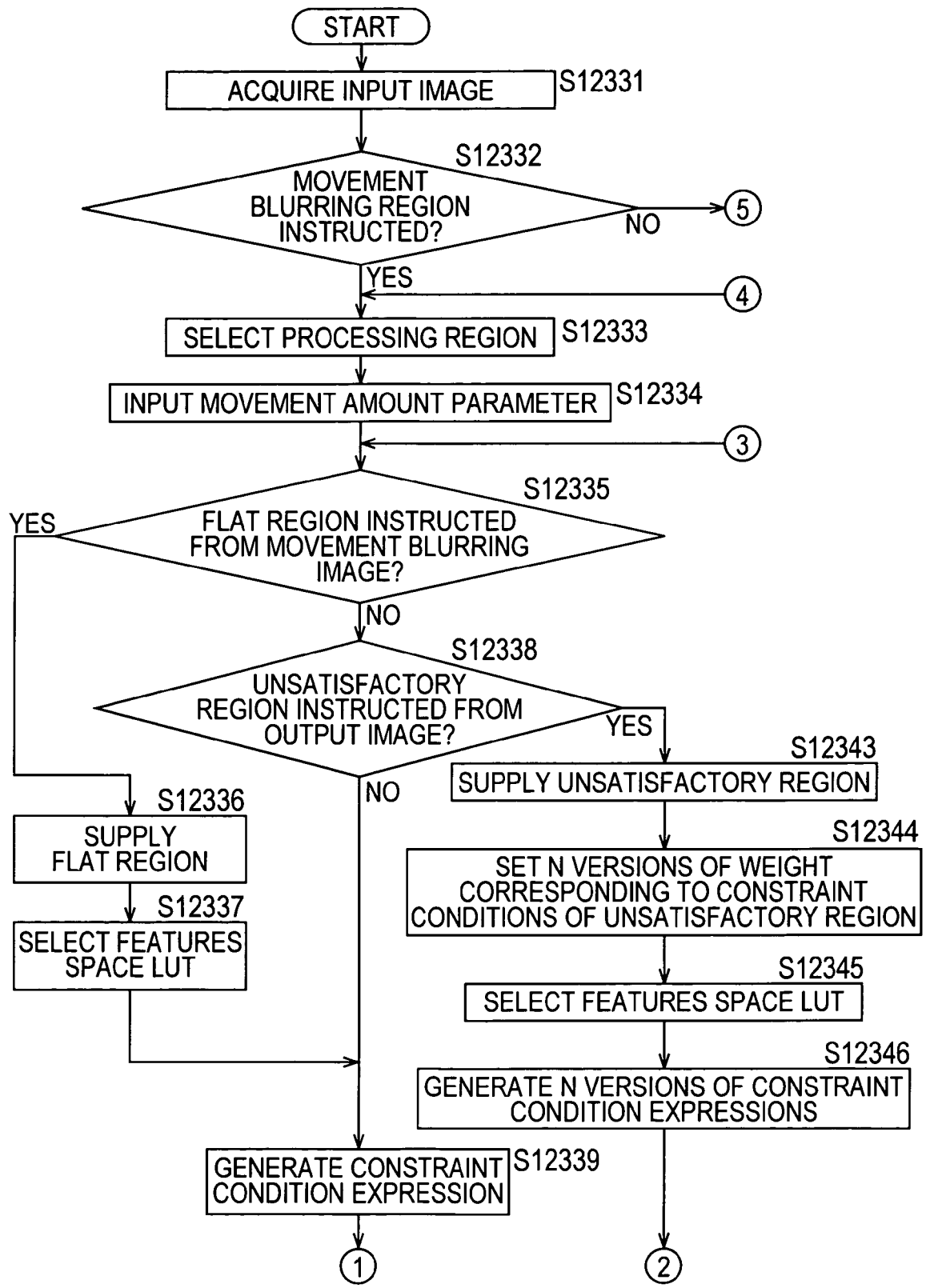

FIG. 181 is a flowchart for describing the processing of the signal processing device 4 shown in FIG. 180.

Figure 182:
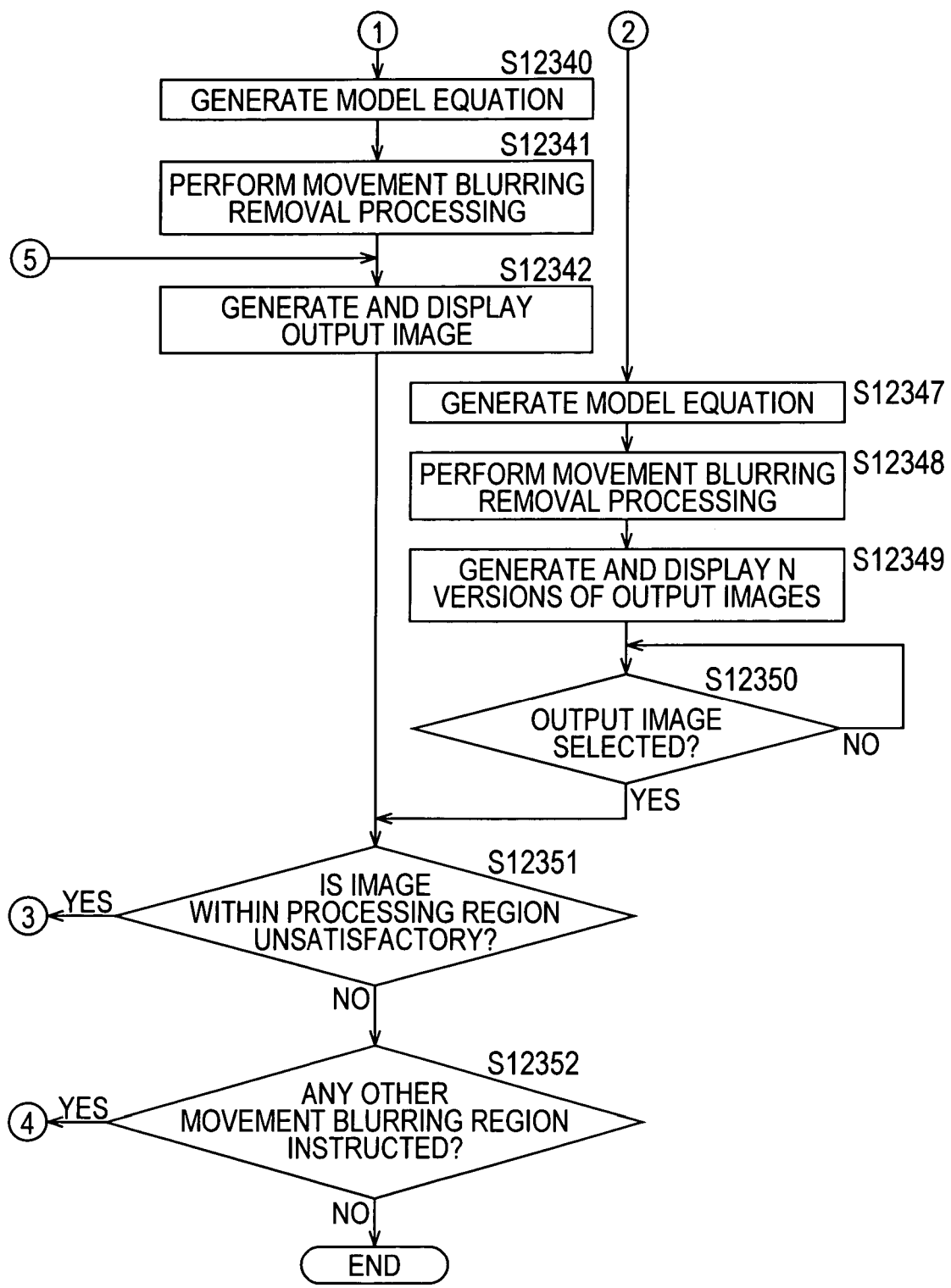

FIG. 182 is a flowchart for describing the processing of the signal processing device 4 shown in FIG. 180.

Figure 183:
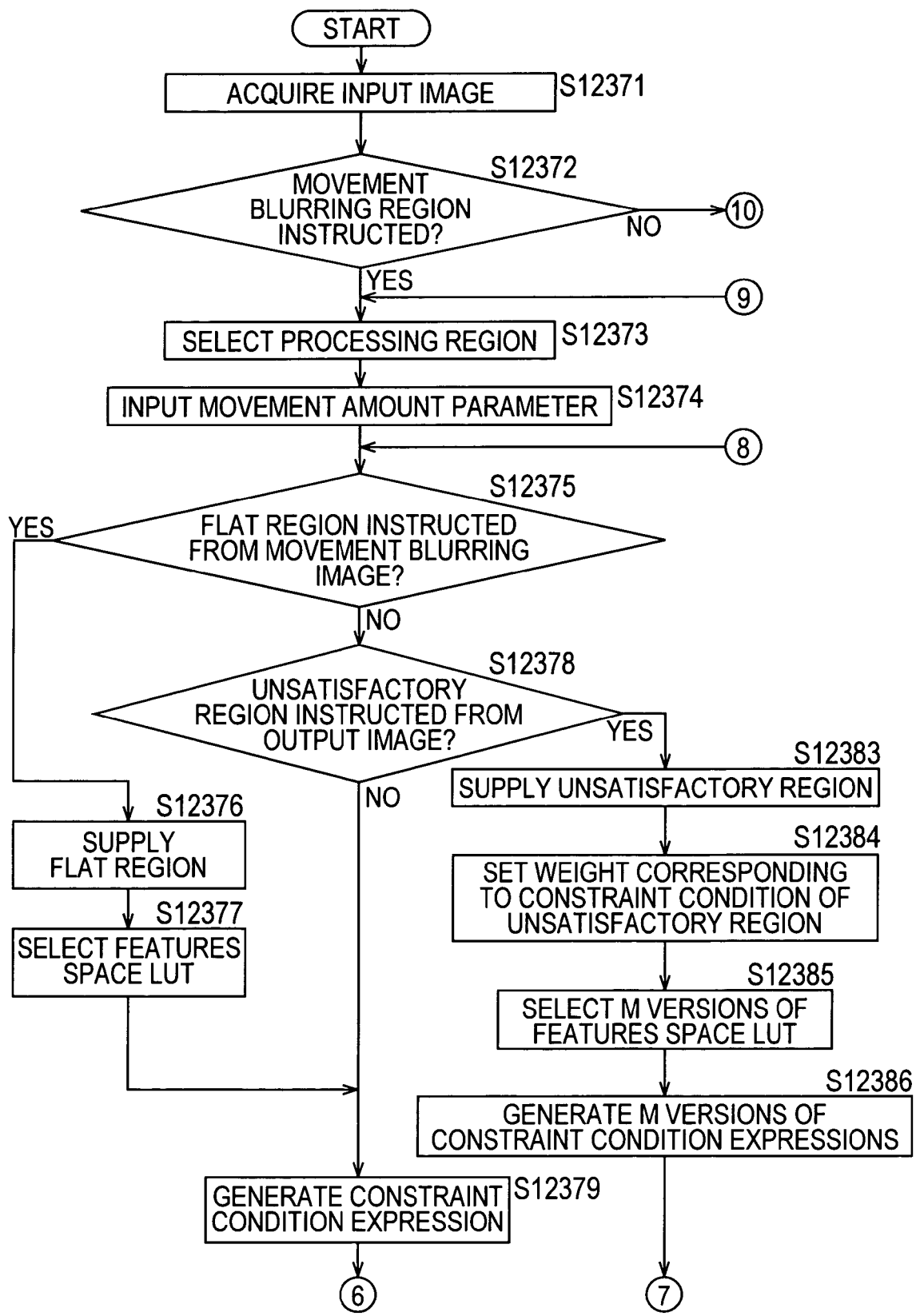

FIG. 183 is a flowchart for describing the processing of the signal processing device 4 shown in FIG. 180.

Figure 184:
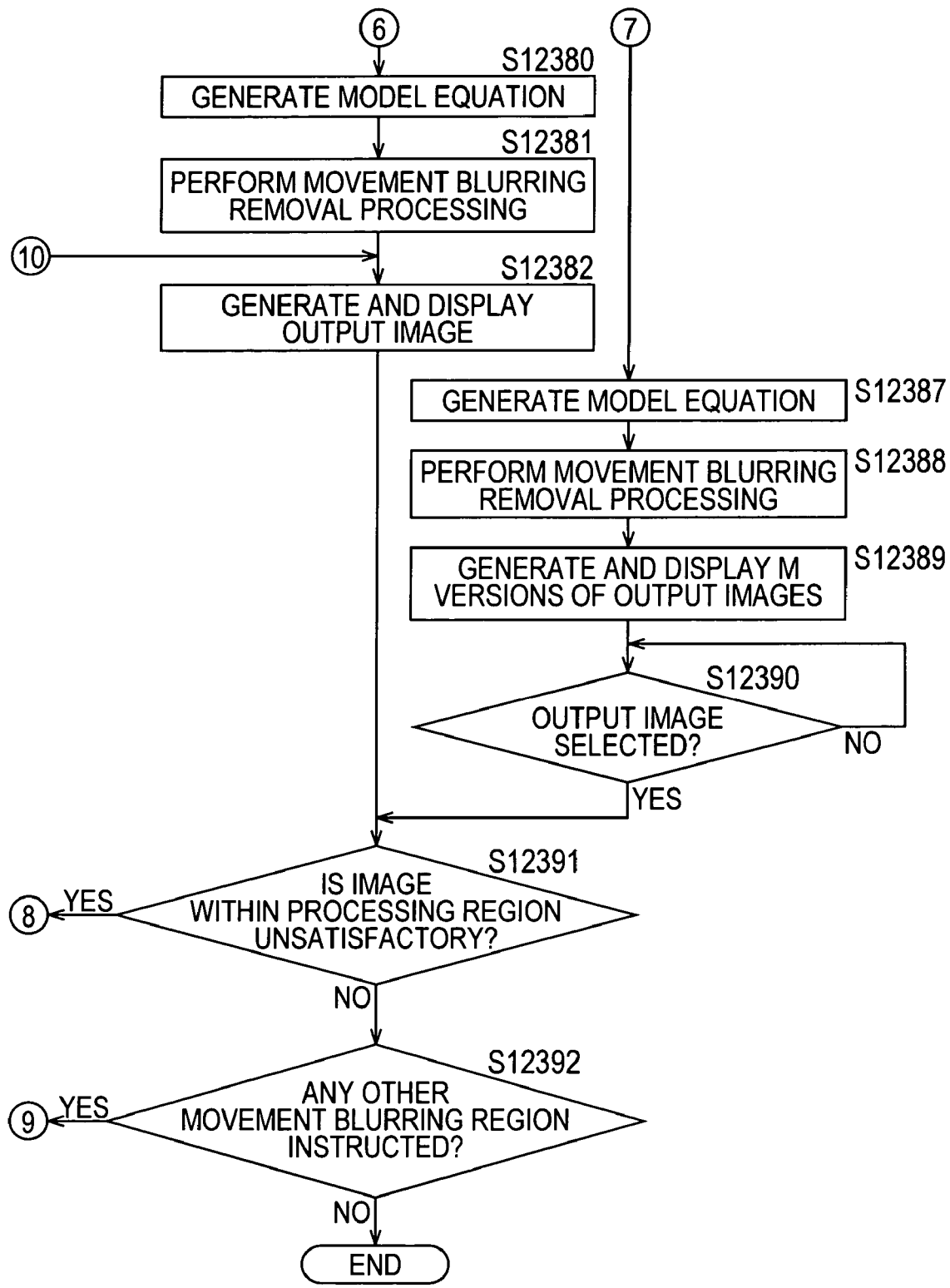

FIG. 184 is a flowchart for describing the processing of the signal processing device 4 shown in FIG. 180.

Figure 185:
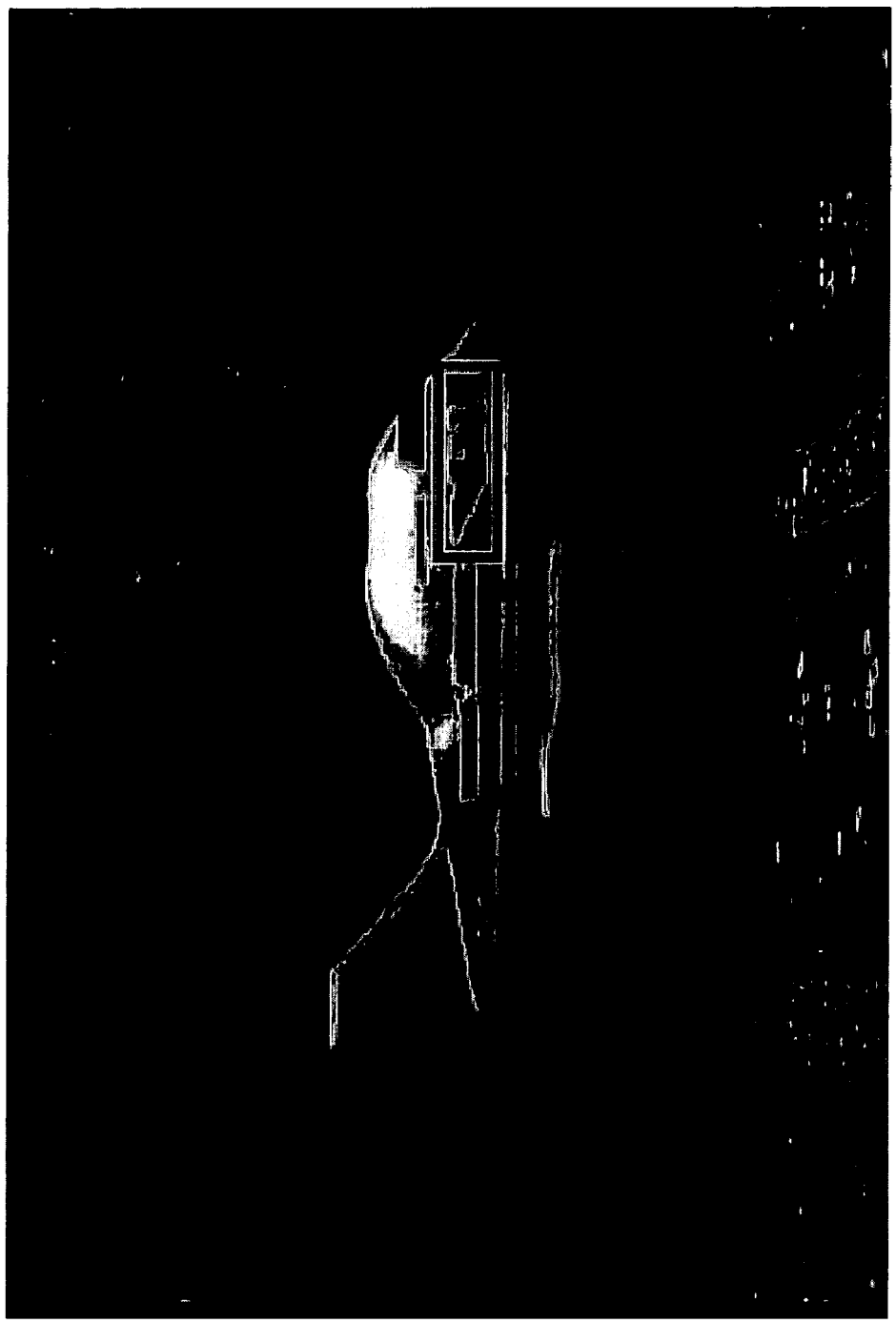

FIG. 185 is a diagram illustrating an input image.

Figure 186:
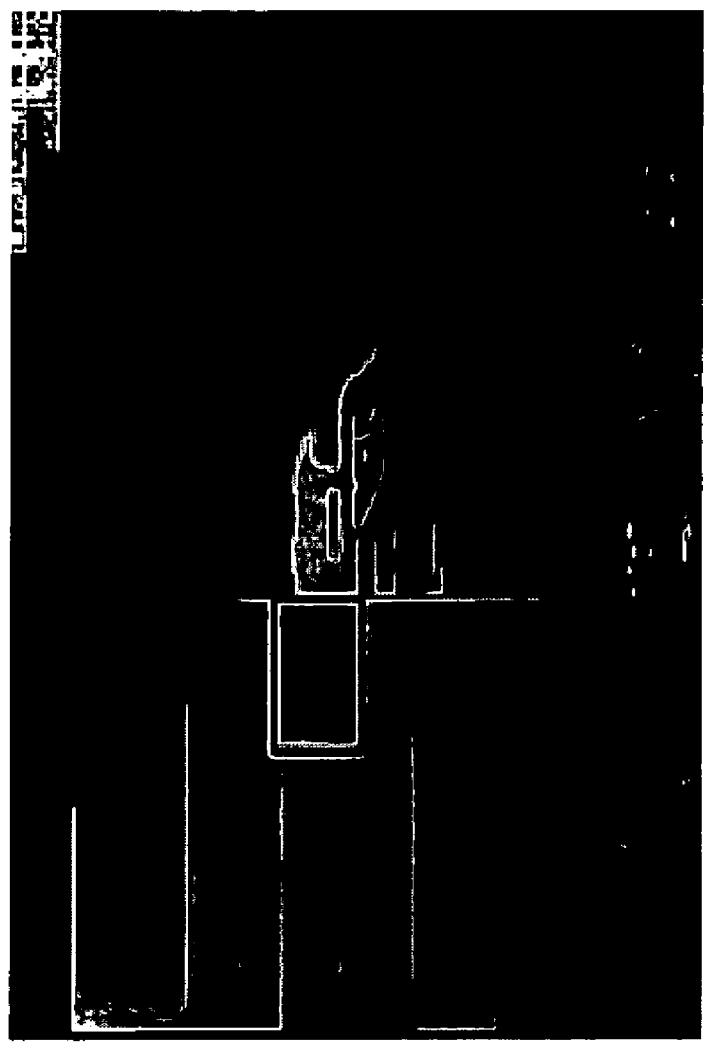

FIG. 186 is a diagram for describing instructing of a flat region with regard to the input image shown in FIG. 185.

Figure 187:
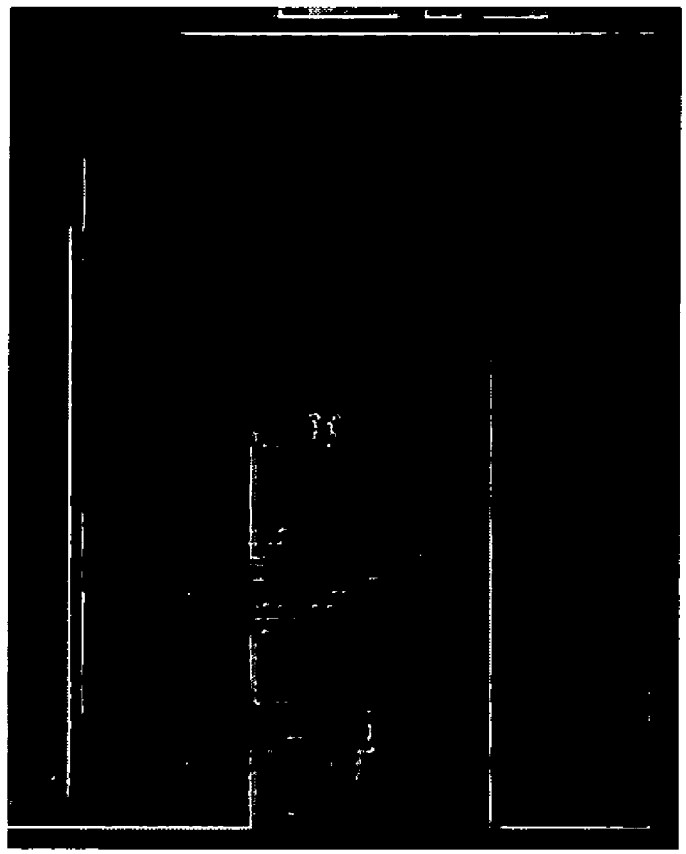

FIG. 187 is a diagram illustrating an output image, which is the processing results of the input image shown in FIG. 185.

Figure 188:
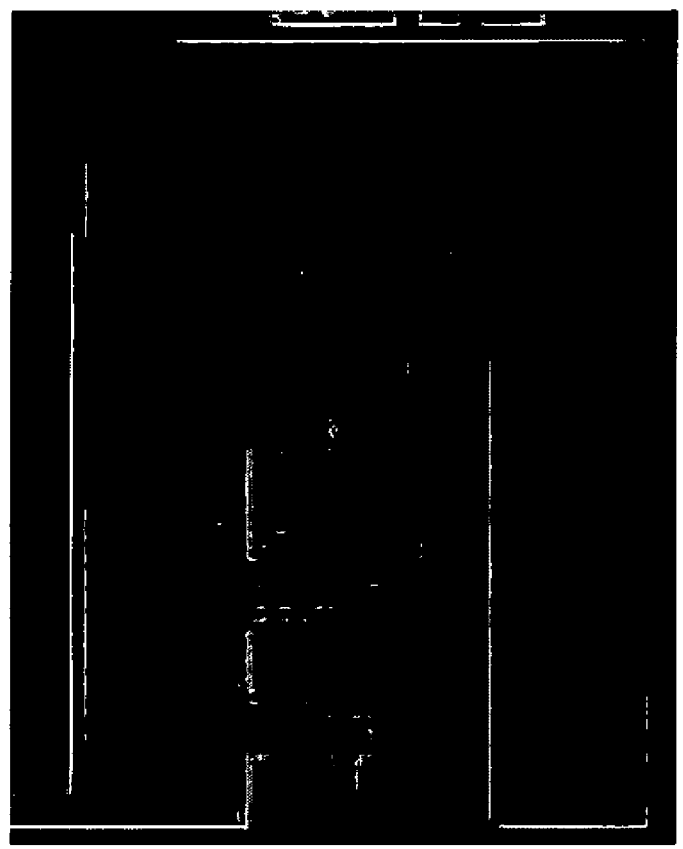

FIG. 188 is a diagram illustrating an output image, which is the processing results of the input image shown in FIG. 185.

Figure 189:

FIG. 189 is a diagram for describing instructing of unsatisfactory region with regard to the input output shown in FIG. 188.

Figure 190B:
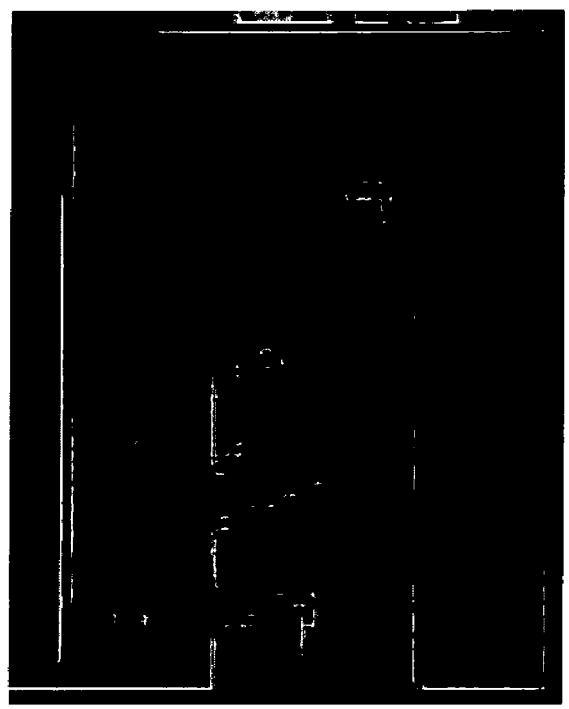
Figure 190A:
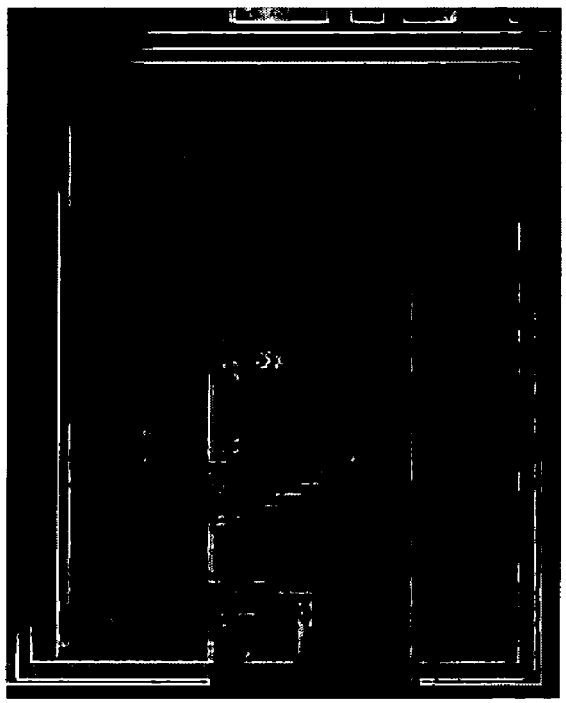

FIG. 190A is a diagram illustrating an output image which is reprocessing results of the output image shown in FIG. 188.

FIG. 190B is a diagram illustrating an output image which is reprocessing results of the output image shown in FIG. 188.

Figure 191B:
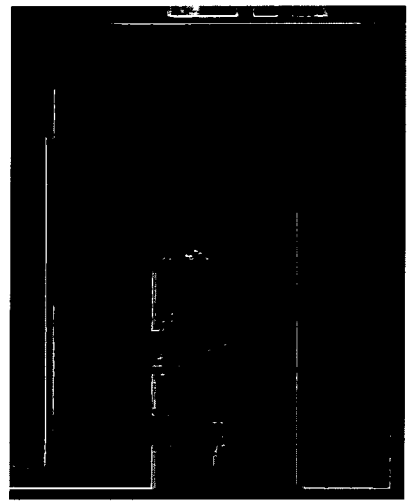
Figure 191D:
Figure 191A:
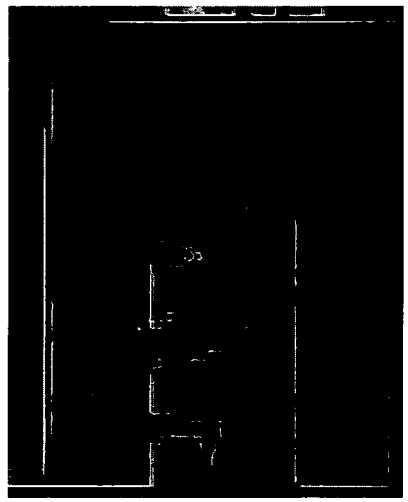

FIG. 191A is a diagram illustrating an output image which is reprocessing results of the output image selected in FIG. 190A and FIG. 190B.

FIG. 191B is a diagram illustrating an output image which is reprocessing results of the output image selected in FIG. 190A and FIG. 190B.

Figure 191C:

FIG. 191C is a diagram illustrating an output image which is reprocessing results of the output image selected in FIG. 190A and FIG. 190B.

FIG. 191D is a diagram illustrating an output image which is reprocessing results of the output image selected in FIG. 190A and FIG. 190B.

Figure 192:
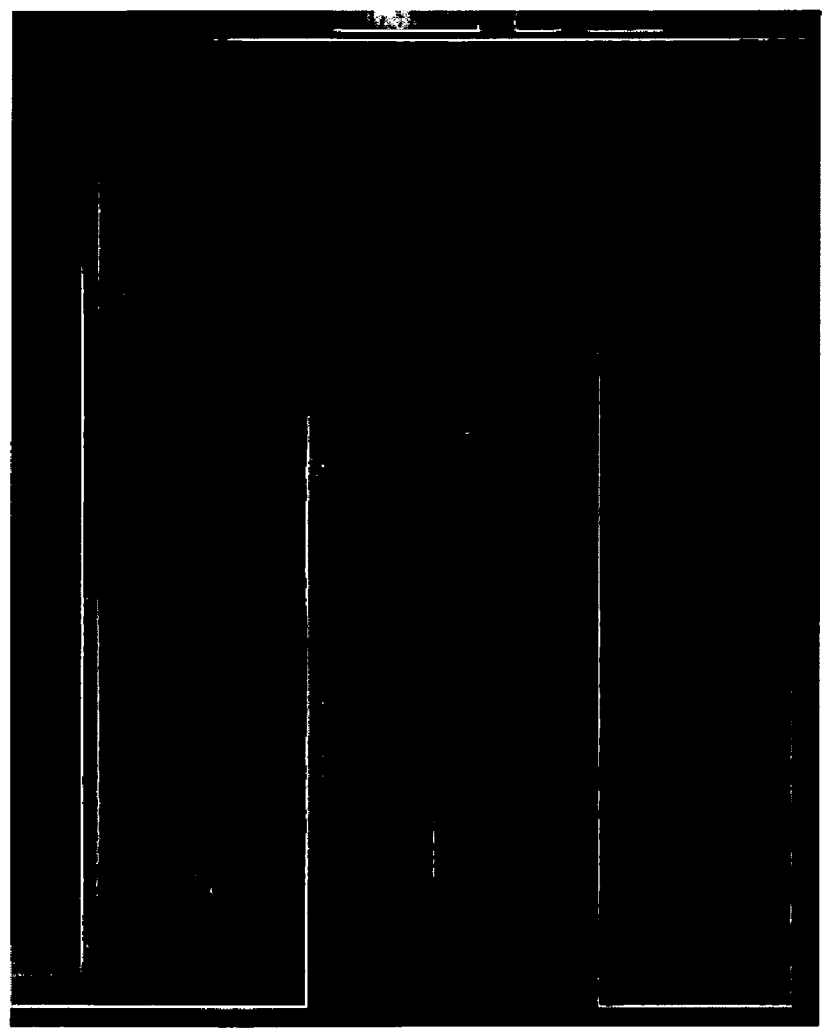

FIG. 192 is a diagram wherein the input image shown in FIG. 185 has been enlarged.

Figure 193:
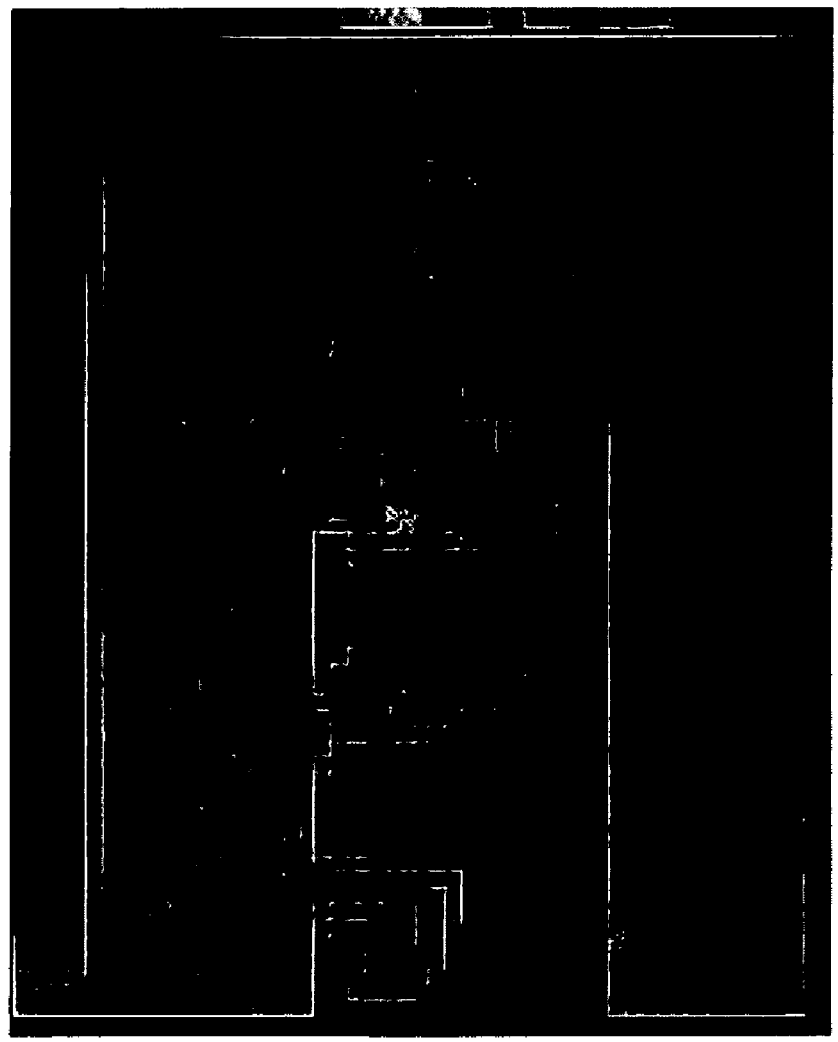

FIG. 193 is a diagram illustrating an output image which is processing results of the input image shown in FIG. 192.

Figure 194:
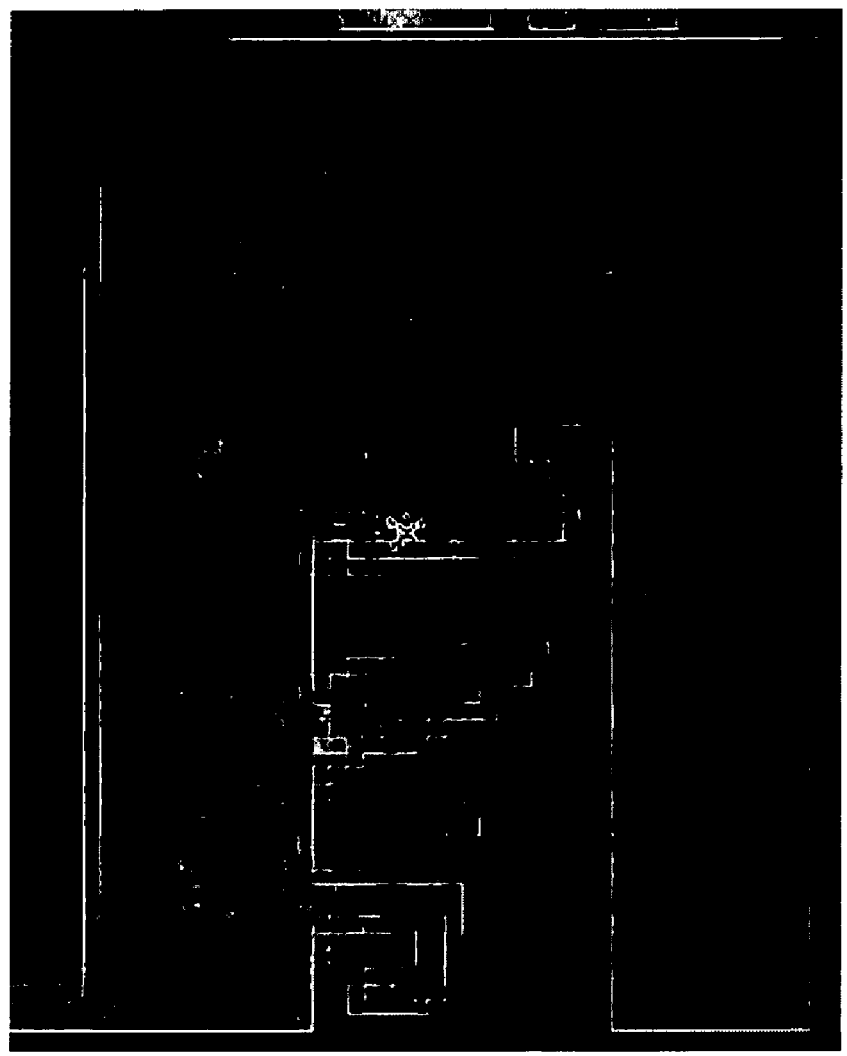

FIG. 194 is a diagram illustrating an output image which is processing results of the input image shown in FIG. 192.

BEST MODE FOR CARRYING OUT THE INVENTION

Figure 1:
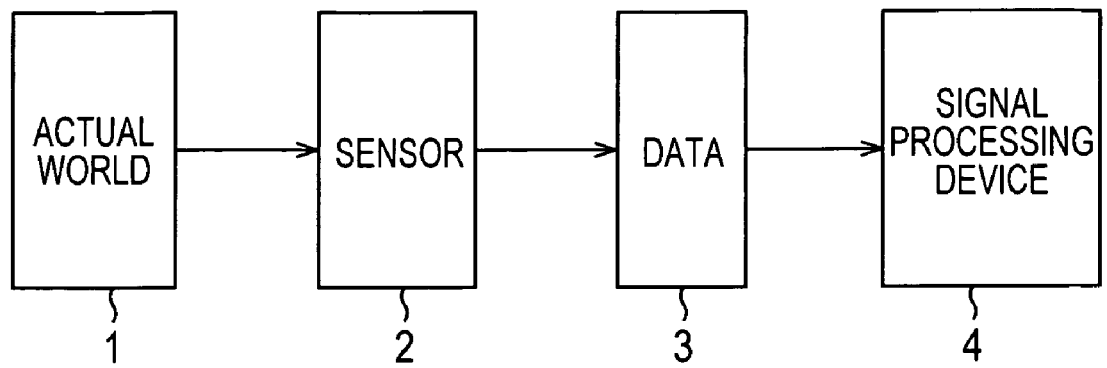
FIG. 1 is a diagram illustrating the principle of the present invention.

FIG. 1 illustrates the principle of the present invention. As shown in the drawing, events (phenomena) in an actual world 1 having dimensions of space, time, and mass, are acquired by a sensor 2, and formed into data. Events in the actual world 1 refer to light (images), sound, pressure, temperature, mass, humidity, brightness/darkness, or smells, and so forth. The events in the actual world 1 are distributed in the space-time directions. For example, an image of the actual world 1 is a distribution of the intensity of light of the actual world 1 in the space-time directions.

Taking note of the sensor 2, of the events in the actual world 1 having the dimensions of space, time, and mass, the events in the actual world 1 which the sensor 2 can acquire, are converted into data 3 by the sensor 2. It can be said that information indicating events in the actual world 1 are acquired by the sensor 2.

That is to say, the sensor 2 converts information indicating events in the actual world 1, into data 3. It can be said that signals which are information indicating the events (phenomena) in the actual world 1 having dimensions of space, time, and mass, are acquired by the sensor 2 and formed into data.

Hereafter, the distribution of events such as images, sound, pressure, temperature, mass, humidity, brightness/darkness, or smells, and so forth, in the actual world 1, will be referred to as signals of the actual world 1, which are information indicating events. Also, signals which are information indicating events of the actual world 1 will also be referred to simply as signals of the actual world 1. In the present Specification, signals are to be understood to include phenomena and events, and also include those wherein there is no intent on the transmitting side.

The data 3 (detected signals) output from the sensor 2 is information obtained by projecting the information indicating the events of the actual world 1 on a space-time having a lower dimension than the actual world 1. For example, the data 3 which is image data of a moving image, is information obtained by projecting an image of the three-dimensional space direction and time direction of the actual world 1 on the time-space having the two-dimensional space direction and time direction. Also, in the event that the data 3 is digital data for example, the data 3 is rounded off according to the sampling increments. In the event that the data 3 is analog data, information of the data 3 is either compressed according to the dynamic range, or a part of the information has been deleted by a limiter or the like.

Thus, by projecting the signals shown are information indicating events in the actual world 1 having a predetermined number of dimensions onto data 3 (detection signals), a part of the information indicating events in the actual world 1 is dropped. That is to say, a part of the information indicating events in the actual world 1 is dropped from the data 3 which the sensor 2 outputs.

However, even though a part of the information indicating events in the actual world 1 is dropped due to projection, the data 3 includes useful information for estimating the signals which are information indicating events (phenomena) in the actual world 1.

With the present invention, information having continuity contained in the actual world 1 or the data 3 is used as useful information for estimating the signals which is information of the actual world 1. Continuity is a concept which is newly defined.

Taking note of the actual world 1, events in the actual world 1 include characteristics which are constant in predetermined dimensional directions. For example, an object (corporeal object) in the actual world 1 either has shape, pattern, or color that is continuous in the space direction or time direction, or has repeated patterns of shape, pattern, or color.

Accordingly, the information indicating the events in actual world 1 includes characteristics constant in a predetermined dimensional direction.

With a more specific example, a linear object such as a string, cord, or rope, has a characteristic which is constant in the length-wise direction, i.e., the spatial direction, that the cross-sectional shape is the same at arbitrary positions in the length-wise direction. The constant characteristic in the spatial direction that the cross-sectional shape is the same at arbitrary positions in the length-wise direction comes from the characteristic that the linear object is long.

Accordingly, an image of the linear object has a characteristic which is constant in the length-wise direction, i.e., the spatial direction, that the cross-sectional shape is the same, at arbitrary positions in the length-wise direction.

Also, a monotone object, which is a corporeal object, having an expanse in the spatial direction, can be said to have a constant characteristic of having the same color in the spatial direction regardless of the part thereof.

In the same way, an image of a monotone object, which is a corporeal object, having an expanse in the spatial direction, have a constant characteristic of having the same color in the spatial direction regardless of the part thereof.

In this way, events in the actual world 1 (real world) have characteristics which are constant in predetermined dimensional directions, so signals of the actual world 1 have characteristics which are constant in predetermined dimensional directions.

In the present Specification, such characteristics which are constant in predetermined dimensional directions will be called continuity. Continuity of the signals of the actual world 1 (real world) means the characteristics which are constant in predetermined dimensional directions which the signals indicating the events of the actual world 1 (real world) have.

Countless such continuities exist in the actual world 1 (real world).

Next, taking note of the data 3, the data 3 is obtained by signals which is information indicating events of the actual world 1 having predetermined dimensions being projected by the sensor 2, and includes continuity corresponding to the continuity of signals in the real world. It can be said that the data 3 includes continuity wherein the continuity of actual world signals has been projected.

However, as described above, in the data 3 output from the sensor 2, a part of the information of the actual world 1 has been lost, so a part of the continuity contained in the signals of the actual world 1 (real world) may be lost from the data.

In other words, the data 3 contains at least a part of the continuity within the continuity of the signals of the actual world 1 (real world) as data continuity. Data continuity means characteristics which are constant in predetermined dimensional directions, which the data 3 has.

With the present invention, continuity of the actual world 1 signals, or the data continuity which the data 3 has, is used as significant data for estimating signals which are information indicating events of the actual world 1.

For example, with the signal processing device 4, information indicating an event in the actual world 1 which has been lost is generated by signals processing of the data 3, using data continuity.

Now, with the signal processing device 4, of the length (space), time, and mass, which are dimensions of signals serving as information indicating events in the actual world 1, continuity in the spatial direction or time direction, are used.

In FIG. 1, the sensor 2 is formed of, for example, a digital still camera, a video camera, or the like, and takes images of the actual world 1, and outputs the image data which is the obtained data 3, to a signal processing device 4. The sensor 2 may also be a thermography device, a pressure sensor using photo-elasticity, or the like.

The signal processing device 4 is configured of, for example, a personal computer or the like, and performs signal processing with regard to the data 3.

Figure 2:
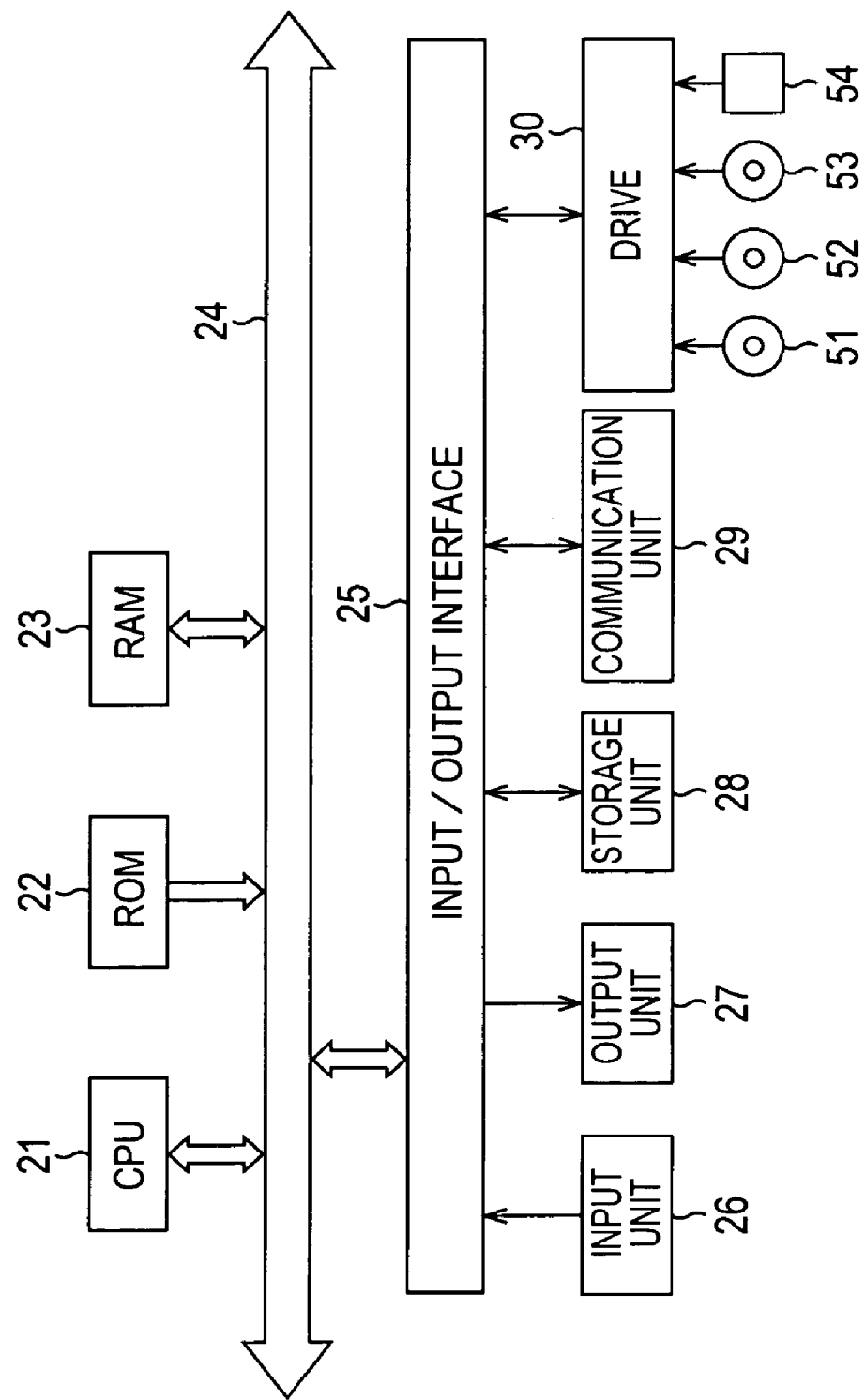
FIG. 2 is a block diagram illustrating an example of the hardware configuration of a signal processing device 4.

The signal processing device 4 is configured as shown in FIG. 2, for example. A CPU (Central Processing Unit) 21 executes various types of processing following programs stored in ROM (Read Only Memory) 22 or the storage unit 28. RAM (Random Access Memory) 23 stores programs to be executed by the CPU 21, data, and so forth, as suitable. The CPU 21, ROM 22, and RAM 23, are mutually connected by a bus 24.

Also connected to the CPU 21 is an input/output interface 25 via the bus 24. An input device 26 made up of a keyboard, mouse, microphone, and so forth, and an output unit 27 made up of a display, speaker, and so forth, are connected to the input/output interface 25. The CPU 21 executes various types of processing corresponding to commands input from the input unit 26. The CPU 21 then outputs images and audio and the like obtained as a result of processing to the output unit 27.

A storage unit 28 connected to the input/output interface 25 is configured of a hard disk for example, and stores the programs and various types of data which the CPU 21 executes. A communication unit 29 communicates with external devices via the Internet and other networks. In the case of this example, the communication unit 29 acts as an acquiring unit for capturing data 3 output from the sensor 2.

Also, an arrangement may be made wherein programs are obtained via the communication unit 29 and stored in the storage unit 28.

A drive 30 connected to the input/output interface 25 drives a magnetic disk 51, optical disk 52, magneto-optical disk 53, or semiconductor memory 54 or the like mounted thereto, and obtains programs and data recorded therein. The obtained programs and data are transferred to the storage unit 28 as necessary and stored.

Figure 3:
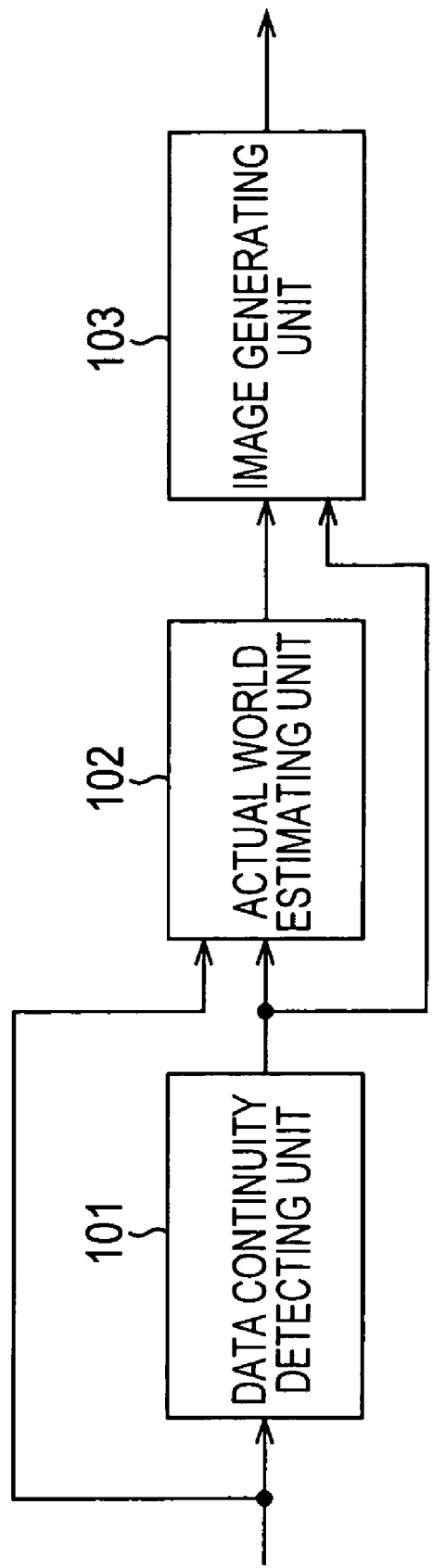
FIG. 3 is a block diagram illustrating a configuration example of an embodiment of the signal processing device 4 shown in FIG. 1.

FIG. 3 is a block diagram illustrating a signal processing device 4.

Note that whether the functions of the signal processing device 4 are realized by hardware or realized by software is irrelevant. That is to say, the block diagrams in the present Specification may be taken to be hardware block diagrams or may be taken to be software function block diagrams.

With the signal processing device 4 of which the configuration is shown in FIG. 3, image data which is an example of the data 3 is input, and the continuity of the data is detected from the input image data (input image). Next, the signals of the actual world 1 acquired by the sensor 2 are estimated from the continuity of the data detected. Then, based on the estimated signals of the actual world 1, an image is generated, and the generated image (output image) is output. That is to say, FIG. 3 is a diagram illustrating the configuration of the signal processing device 4 which is an image processing device.

The input image (image data which is an example of the data 3) input to the signal processing device 4 is supplied to a data continuity detecting unit 101 and actual world estimating unit 102.

The data continuity detecting unit 101 detects the continuity of the data from the input image, and supplies data continuity information indicating the detected continuity to the actual world estimating unit 102 and an image generating unit 103. The data continuity information includes, for example, the position of a region of pixels having continuity of data, the direction of a region of pixels having continuity of data (the angle or gradient of the time direction and space direction), or the length of a region of pixels having continuity of data, or the like in the input image. Detailed configuration of the data continuity detecting unit 101 will be described later.

The actual world estimating unit 102 estimates the signals of the actual world 1, based on the input image and the data continuity information supplied from the data continuity detecting unit 101. That is to say, the actual world estimating unit 102 estimates an image which is the signals of the actual world cast into the sensor 2 at the time that the input image was acquired. The actual world estimating unit 102 supplies the actual world estimation information indicating the results of the estimation of the signals of the actual world 1, to the image generating unit 103. The detailed configuration of the actual world estimating unit 102 will be described later.

The image generating unit 103 generates signals further approximating the signals of the actual world 1, based on the actual world estimation information indicating the estimated signals of the actual world 1, supplied from the actual world estimating unit 102, and outputs the generated signals. Or, the image generating unit 103 generates signals further approximating the signals of the actual world 1, based on the data continuity information supplied from the data continuity detecting unit 101, and the actual world estimation information indicating the estimated signals of the actual world 1, supplied from the actual world estimating unit 102, and outputs the generated signals.

That is to say, the image generating unit 103 generates an image further approximating the image of the actual world 1 based on the actual world estimation information, and outputs the generated image as an output image. Or, the image generating unit 103 generates an image further approximating the image of the actual world 1 based on the data continuity information and actual world estimation information, and outputs the generated image as an output image.

For example, the image generating unit 103 generates an image with higher resolution in the spatial direction or time direction in comparison with the input image, by integrating the estimated image of the actual world 1 within a desired range of the spatial direction or time direction, based on the actual world estimation information, and outputs the generated image as an output image. For example, the image generating unit 103 generates an image by extrapolation/interpolation, and outputs the generated image as an output image.

Detailed configuration of the image generating unit 103 will be described later.

Next, the principle of the present invention will be described with reference to FIG. 4.

For example, signals of the actual world 1, which are an image for example, are imaged on the photoreception face of a CCD (Charge Coupled Device) which is an example of the sensor 2. The CCD, which is an example of the sensor 2, has integration properties, so difference is generated in the data 3 output from the CCD as to the image of the actual world 1. Details of the integration properties of the sensor 2 will be described later.

With the signal processing by the signal processing device 4, the relationship between the image of the actual world 1 obtained by the CCD, and the data 3 taken by the CCD and output, is explicitly taken into consideration. That is to say, the relationship between the data 3 and the signals which is information of the actual world obtained by the sensor 2, is explicitly taken into consideration.

Figure 4:
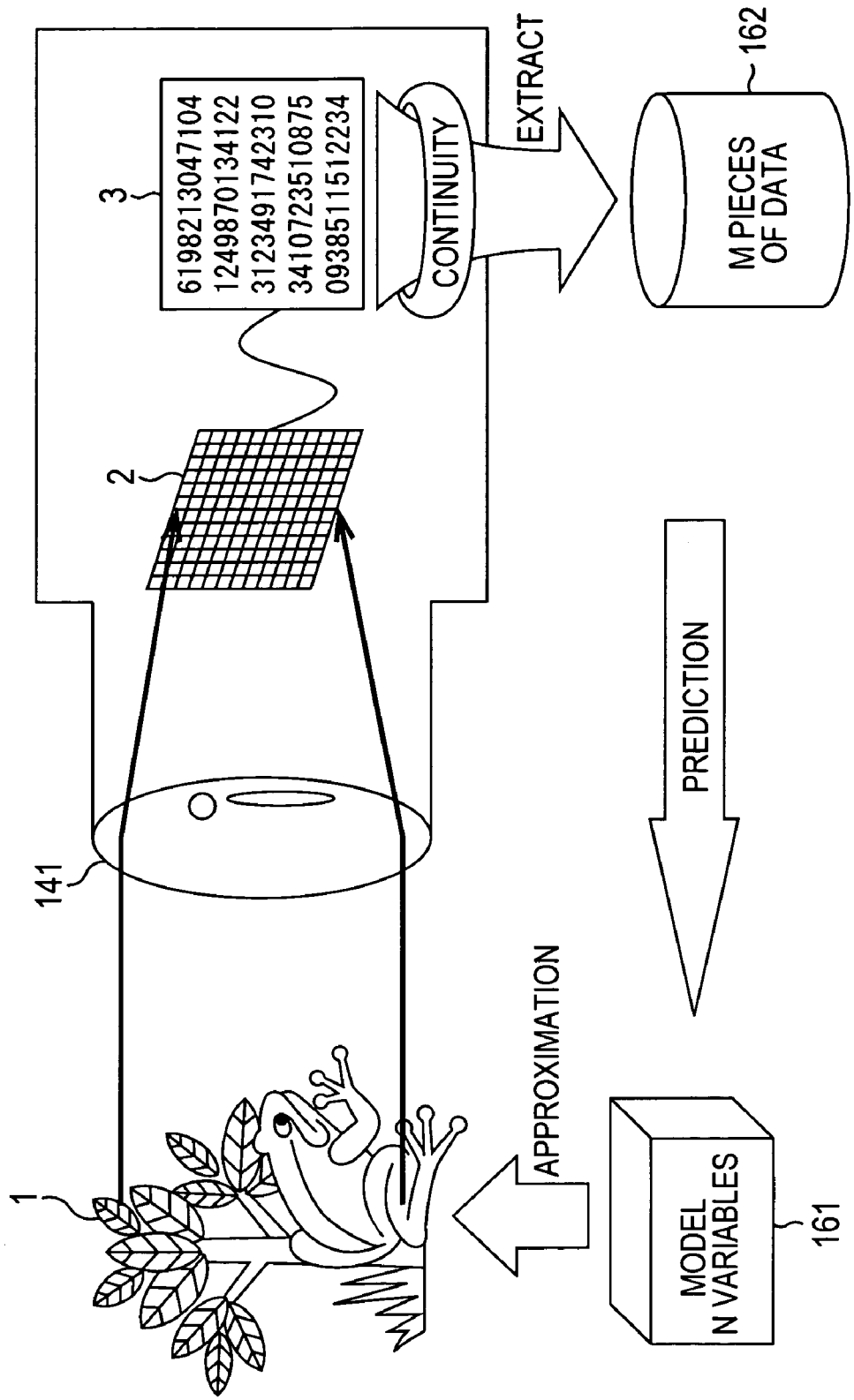
FIG. 4 is a diagram describing in detail the principle of the signal processing performed by the signal processing device 4.

More specifically, as shown in FIG. 4, the signal processing device 4 uses a model 161 to approximate (describe) the actual world 1. The model 161 is represented by, for example, N variables. More accurately, the model 161 approximates (describes) signals of the actual world 1.

In order to predict the model 161, the signal processing device 4 extracts M pieces of data 162 from the data 3. At the time of extracting the M pieces of data 162 from the data 3, the signal processing device 4 uses the continuity of the data contained in the data 3, for example. In other words, the signal processing device 4 extracts data 162 for predicting the model 161, based on the continuity of the data contained in the data 3. Consequently, in this case, the model 161 is constrained by the continuity of the data.

That is to say, the model 161 approximates (information (signals) indicating) events of the actual world 1 having continuity (constant characteristics in a predetermined dimensional direction), which generates the data continuity in the data 3 when acquired with the sensor 2.

Now, in the event that the number M of the data 162 is N or more, which is the number of variables of the model, the model 161 represented by the N variables can be predicted, from the M pieces of the data 162.

In this way, the signal processing device 4 can take into consideration the signals which are information of the actual world 1, by predicting the model 161 approximating (describing) the (signals of the) actual world 1.

Next, the integration effects of the sensor 2 will be described.

An image sensor such as a CCD or CMOS (Complementary Metal-Oxide Semiconductor) sensor or the like, which is the sensor 2 for taking images, projects signals, which are information of the real world, onto two-dimensional data, at the time of imaging the real world. The pixels of the image sensor each have a predetermined area, as a so-called photoreception face (photoreception region). Incident light to the photoreception face having a predetermined area is integrated in the space direction and time direction for each pixel, and is converted into a single pixel value for each pixel.

The space-time integration of images will be described with reference to FIG. 5 through FIG. 8.

An image sensor images a subject (object) in the real world, and outputs the obtained image data as a result of imagining in increments of single frames. That is to say, the image sensor acquires signals of the actual world 1 which is light reflected off of the subject of the actual world 1, and outputs the data 3.

For example, the image sensor outputs image data of 30 frames per second. In this case, the exposure time of the image sensor can be made to be 1/30 seconds. The exposure time is the time from the image sensor starting conversion of incident light into electric charge, to ending of the conversion of incident light into electric charge. Hereafter, the exposure time will also be called shutter time.

Figure 5:
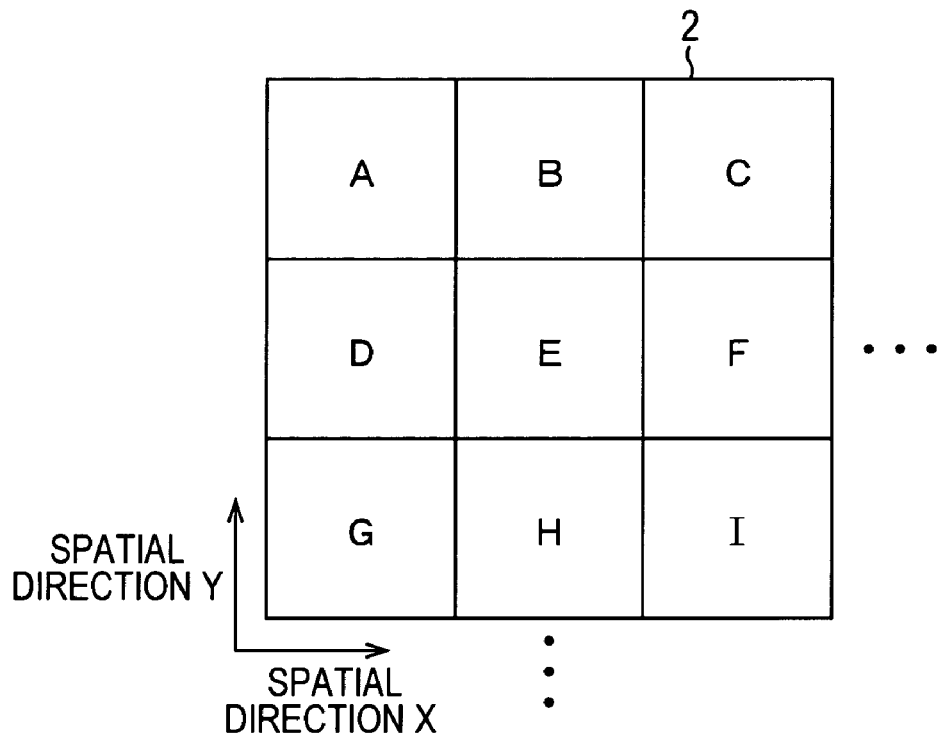
FIG. 5 is a diagram for describing an example of array of pixels on an image sensor.

FIG. 5 is a diagram describing an example of a pixel array on the image sensor. In FIG. 5, A through I denote individual pixels. The pixels are placed on a plane corresponding to the image displayed by the image data. A single detecting element corresponding to a single pixel is placed on the image sensor. At the time of the image sensor taking images of the actual world 1, the one detecting element outputs one pixel value corresponding to the one pixel making up the image data. For example, the position in the spatial direction X (X coordinate) of the detecting element corresponds to the horizontal position on the image displayed by the image data, and the position in the spatial direction Y (Y coordinate) of the detecting element corresponds to the vertical position on the image displayed by the image data.

Distribution of intensity of light of the actual world 1 has expanse in the three-dimensional spatial directions and the time direction, but the image sensor acquires light of the actual world 1 in two-dimensional spatial directions and the time direction, and generates data 3 representing the distribution of intensity of light in the two-dimensional spatial directions and the time direction.

Figure 6:
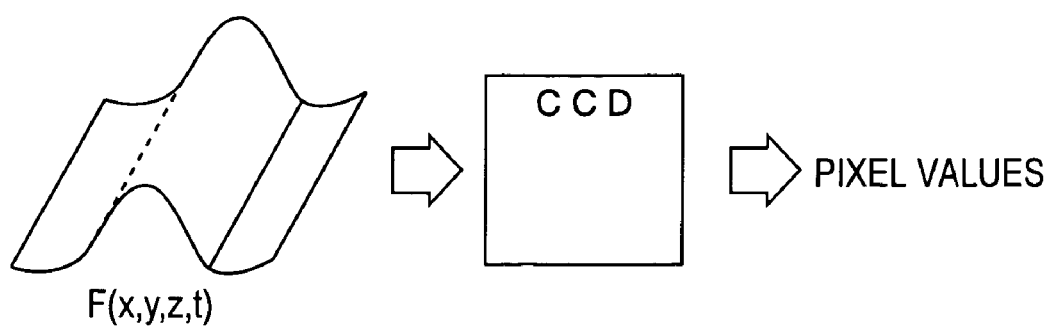
FIG. 6 is a diagram for describing the operations of a detecting device which is a CCD.

As shown in FIG. 6, the detecting device which is a CCD for example, converts light cast onto the photoreception face (photoreception region) (detecting region) into electric charge during a period corresponding to the shutter time, and accumulates the converted charge. The light is information (signals) of the actual world 1 regarding which the intensity is determined by the three-dimensional spatial position and point-in-time. The distribution of intensity of light of the actual world 1 can be represented by a function $F(x, y, z, t)$, wherein position x, y, z, in three-dimensional space, and point-in-time t, are variables.

The amount of charge accumulated in the detecting device which is a CCD is approximately proportionate to the intensity of the light cast onto the entire photoreception face having two-dimensional spatial expanse, and the amount of time that light is cast thereupon. The detecting device adds the charge converted from the light cast onto the entire photoreception face, to the charge already accumulated during a period corresponding to the shutter time. That is to say, the detecting device integrates the light cast onto the entire photoreception face having a two-dimensional spatial expanse, and accumulates a change of an amount corresponding to the integrated light during a period corresponding to the shutter time. The detecting device can also be said to have an integration effect regarding space (photoreception face) and time (shutter time).

The charge accumulated in the detecting device is converted into a voltage value by an unshown circuit, the voltage value is further converted into a pixel value such as digital data or the like, and is output as data 3. Accordingly, the individual pixel values output from the image sensor have a value projected on one-dimensional space, which is the result of integrating the portion of the information (signals) of the actual world 1 having time-space expanse with regard to the time direction of the shutter time and the spatial direction of the photoreception face of the detecting device.

That is to say, the pixel value of one pixel is represented as the integration of $F(x, y, t)$. $F(x, y, t)$ is a function representing the distribution of light intensity on the photoreception face of the detecting device. For example, the pixel value P is represented by Expression (1).

$$P = \int_{t_1}^{t_2} \int_{y_1}^{y_2} \int_{x_1}^{x_2} F(x, y, t) \, dx \, dy \, dt \qquad (1)$$

In Expression (1), $x_1$ represents the spatial coordinate at the left-side boundary of the photoreception face of the detecting device (X coordinate). $x_2$ represents the spatial coordinate at the right-side boundary of the photoreception face of the detecting device (X coordinate). In Expression (1), $y_1$ represents the spatial coordinate at the top-side boundary of the photoreception face of the detecting device (Y coordinate). $y_2$ represents the spatial coordinate at the bottom-side boundary of the photoreception face of the detecting device (Y coordinate). Also, $t_1$ represents the point-in-time at which conversion of incident light into an electric charge was started. $t_2$ represents the point-in-time at which conversion of incident light into an electric charge was ended.

Note that actually, the gain of the pixel values of the image data output from the image sensor is corrected for the overall frame, for example.

Each of the pixel values of the image data are integration values of the light cast on the photoreception face of each of the detecting elements of the image sensor, and of the light cast onto the image sensor, waveforms of light of the actual world 1 finer than the photoreception face of the detecting element are hidden in the pixel value as integrated values.

Hereafter, in the present Specification, the waveform of signals represented with a predetermined dimension as a reference may be referred to simply as waveforms.

Thus, the image of the actual world 1 (light signals) is integrated in the spatial direction and time direction in increments of pixels, so a part of the continuity of the image of the actual world 1 drops out from the image data, so another part of the continuity of the image of the actual world 1 is left in the image data. Or, there may be cases wherein continuity which has changed from the continuity of the image of the actual world 1 is included in the image data.

Further description will be made regarding the integration effect in the spatial direction for an image taken by an image sensor having integration effects.

Figure 7:
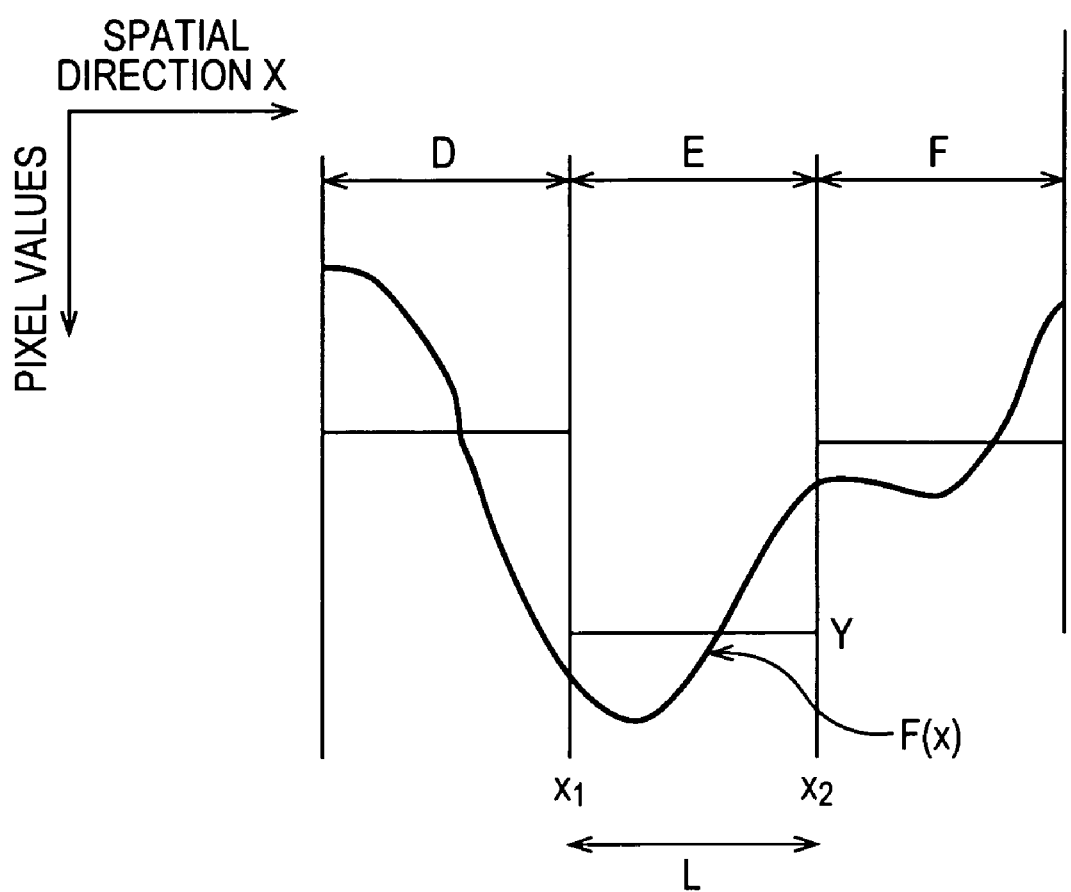
FIG. 7 is a diagram for describing the relation between light cast into detecting elements corresponding to pixel D through pixel F, and pixel values.

FIG. 7 is a diagram describing the relationship between incident light to the detecting elements corresponding to the pixel D through pixel F, and the pixel values. F(x) in FIG. 7 is an example of a function representing the distribution of light intensity of the actual world 1, having the coordinate x in the spatial direction X in space (on the detecting device) as a variable. In other words, F(x) is an example of a function representing the distribution of light intensity of the actual world 1, with the spatial direction Y and time direction constant. In FIG. 7, L indicates the length in the spatial direction X of the photoreception face of the detecting device corresponding to the pixel D through pixel F.

The pixel value of a single pixel is represented as the integral of F(x). For example, the pixel value P of the pixel E is represented by Expression (2).

$$P = \int_{x_1}^{x_2} F(x) dx \quad (2)$$

In the Expression (2), $x_1$ represents the spatial coordinate in the spatial direction X at the left-side boundary of the photoreception face of the detecting device corresponding to the pixel E. $x_2$ represents the spatial coordinate in the spatial direction X at the right-side boundary of the photoreception face of the detecting device corresponding to the pixel E.

In the same way, further description will be made regarding the integration effect in the time direction for an image taken by an image sensor having integration effects.

Figure 8:
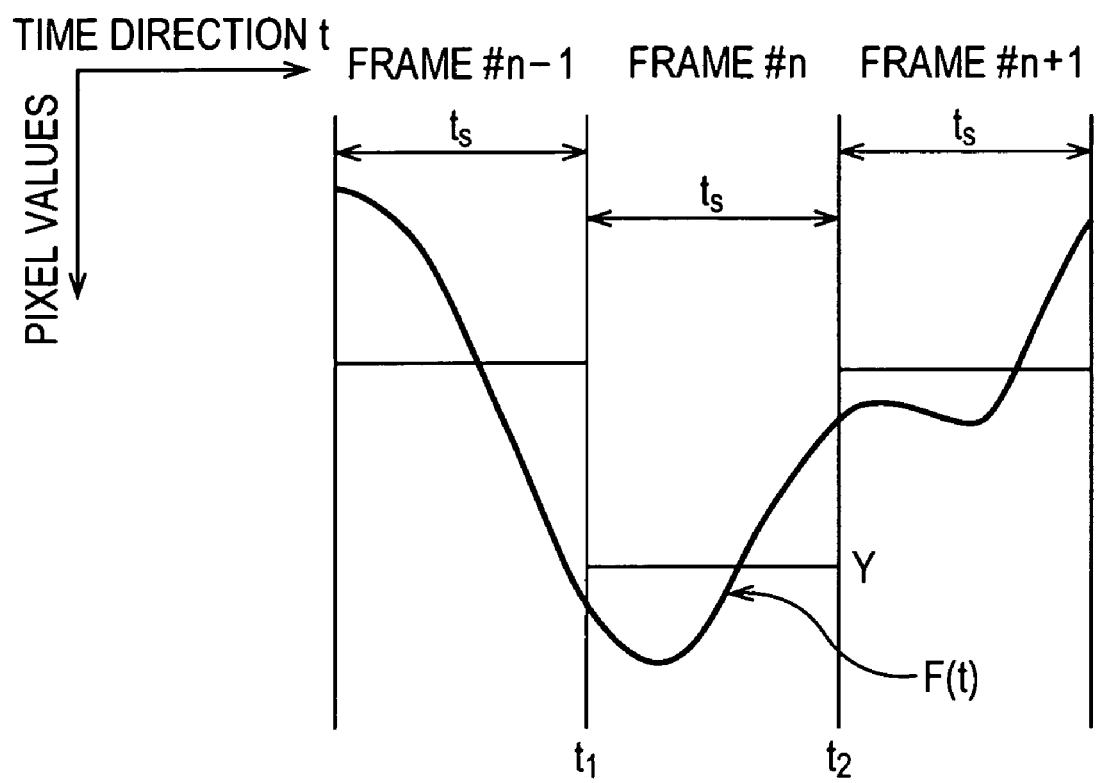
FIG. 8 is a diagram describing the relation between elapsing of time, light cast into a detecting element corresponding to one pixel, and pixel values.

FIG. 8 is a diagram for describing the relationship between time elapsed, the incident light to a detecting element corresponding to a single pixel, and the pixel value. F(t) in FIG. 8 is a function representing the distribution of light intensity of the actual world 1, having the point-in-time t as a variable. In other words, F(t) is an example of a function representing the distribution of light intensity of the actual world 1, with the spatial direction Y and the spatial direction X constant. $T_s$ represents the shutter time.

The frame #n−1 is a frame which is previous to the frame #n time-wise, and the frame #n+1 is a frame following the frame #n time-wise. That is to say, frame #n−1, frame #n, and frame #n+1, are displayed in the order of frame #n−1, frame #n, and frame #n+1.

Note that in the example shown in FIG. 8, the shutter time $t_s$ and the frame intervals are the same.

The pixel value of a single pixel is represented as the integral of F(t). For example, the pixel value P of the pixel of frame #n is represented by Expression (3).

$$P = \int_{t_1}^{t_2} F(t) dx \quad (3)$$

In the Expression (3), $t_1$ represents the time at which conversion of incident light into an electric charge was started. $t_2$ represents the time at which conversion of incident light into an electric charge was ended.

Hereafter, the integration effect in the spatial direction by the sensor 2 will be referred to simply as spatial integration effect, and the integration effect in the time direction by the sensor 2 also will be referred to simply as time integration effect. Also, space integration effects or time integration effects will be simply called integration effects.

Next, description will be made regarding an example of continuity of data included in the data 3 acquired by the image sensor having integration effects.

Figure 9:
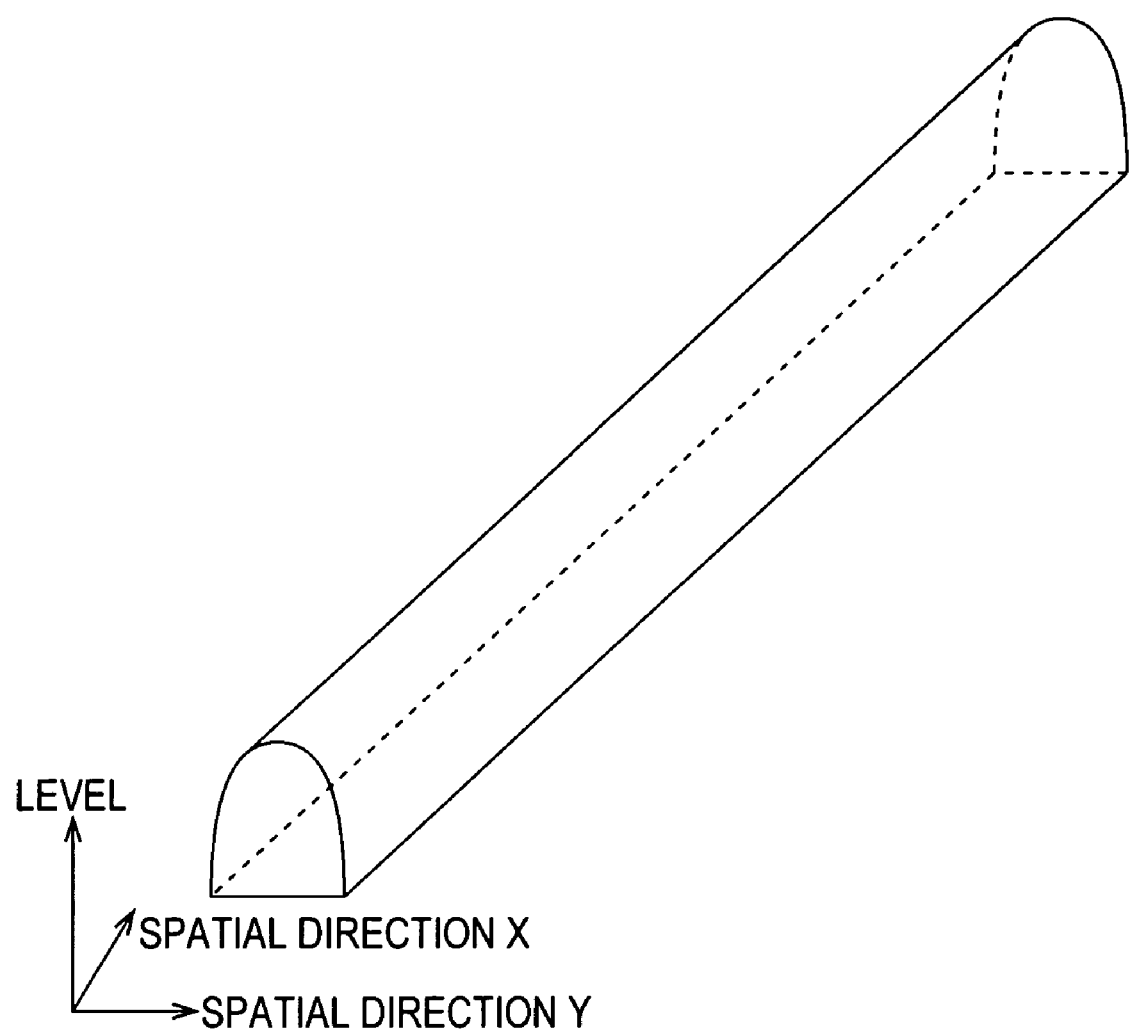
FIG. 9 is a diagram illustrating an example of an image of a linear object in the actual world 1.

FIG. 9 is a diagram illustrating a linear object of the actual world 1 (e.g., a fine line), i.e., an example of distribution of light intensity. In FIG. 9, the position to the upper side of the drawing indicates the intensity (level) of light, the position to the upper right side of the drawing indicates the position in the spatial direction X which is one direction of the spatial directions of the image, and the position to the right side of the drawing indicates the position in the spatial direction Y which is the other direction of the spatial directions of the image.

The image of the linear object of the actual world 1 includes predetermined continuity. That is to say, the image shown in FIG. 9 has continuity in that the cross-sectional shape (the change in level as to the change in position in the direction orthogonal to the length direction), at any arbitrary position in the length direction.

Figure 10:
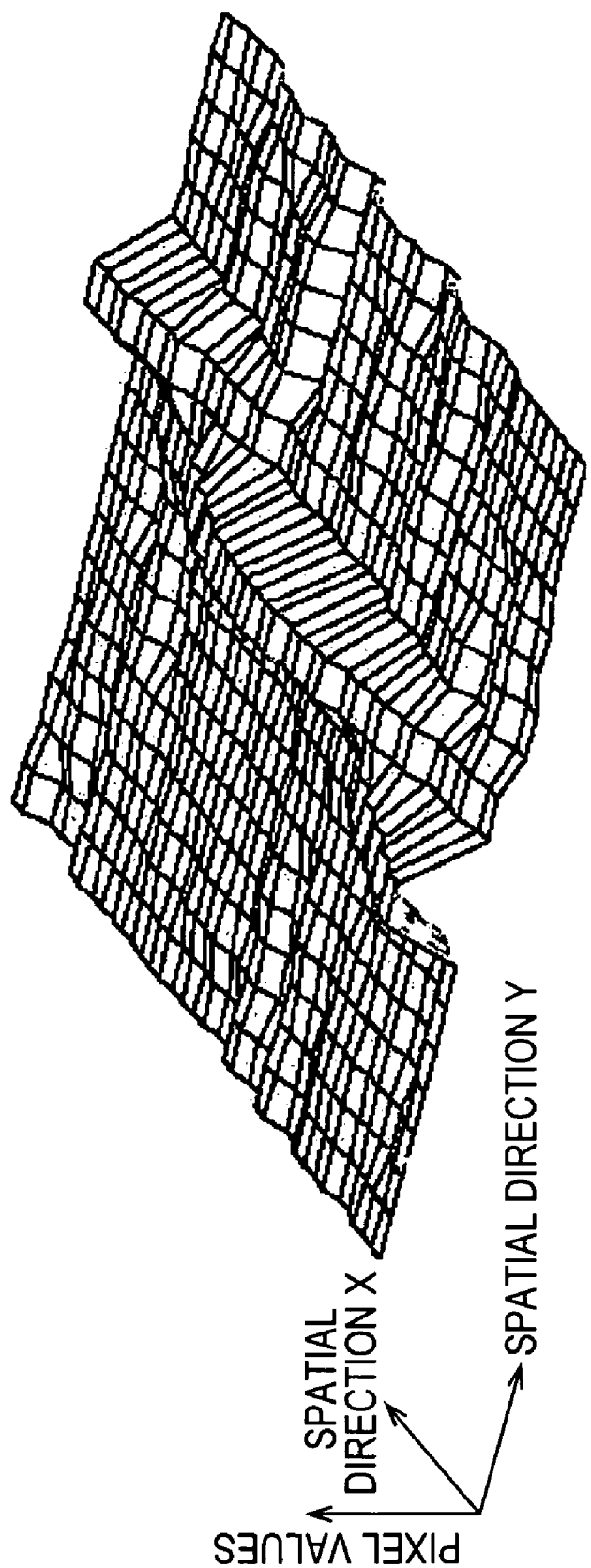
FIG. 10 is a diagram illustrating an example of pixel values of image data obtained by actual imaging.

FIG. 10 is a diagram illustrating an example of pixel values of image data obtained by actual image-taking, corresponding to the image shown in FIG. 9.

That is to say, FIG. 10 is a model diagram of the image data obtained by imaging, with the image sensor, an image of a linear object having a diameter shorter than the length L of the photoreception face of each pixel, and extending in a direction offset from the array of the pixels of the image sensor (the vertical or horizontal array of the pixels). The image cast into the image sensor at the time that the image data shown in FIG. 10 was acquired is an image of the linear object of the actual world 1 shown in FIG. 9.

In FIG. 10, the position to the upper side of the drawing indicates the pixel value, the position to the upper right side of the drawing indicates the position in the spatial direction X which is one direction of the spatial directions of the image, and the position to the right side of the drawing indicates the position in the spatial direction Y which is the other direction of the spatial directions of the image. The direction indicating the pixel value in FIG. 10 corresponds to the direction of level in FIG. 9, and the spatial direction X and spatial direction Y in FIG. 10 also are the same as the directions in FIG. 9.

In the event of taking an image of a linear object having a diameter shorter than the length L of the photoreception face of each pixel with the image sensor, the linear object is represented in the image data obtained as a result of the image-taking as multiple arc shapes (half-discs) having a predetermined length which are arrayed in a diagonally-offset fashion, in a model representation, for example. The arc shapes are of approximately the same shape. One arc shape is formed on one row of pixels vertically, or is formed on one row of pixels horizontally. For example, one arc shape shown in FIG. 10 is formed on one row of pixels vertically.

Thus, with the image data taken and obtained by the image sensor for example, the continuity in that the cross-sectional shape in the spatial direction Y at any arbitrary position in the length direction is the same, which the linear object image of the actual world 1 had, is lost. Also, it can be said that the continuity, which the linear object image of the actual world 1 had, has changed into continuity in that arc shapes of the same shape formed on one row of pixels vertically or formed on one row of pixels horizontally are arrayed at predetermined intervals.

Figure 11:
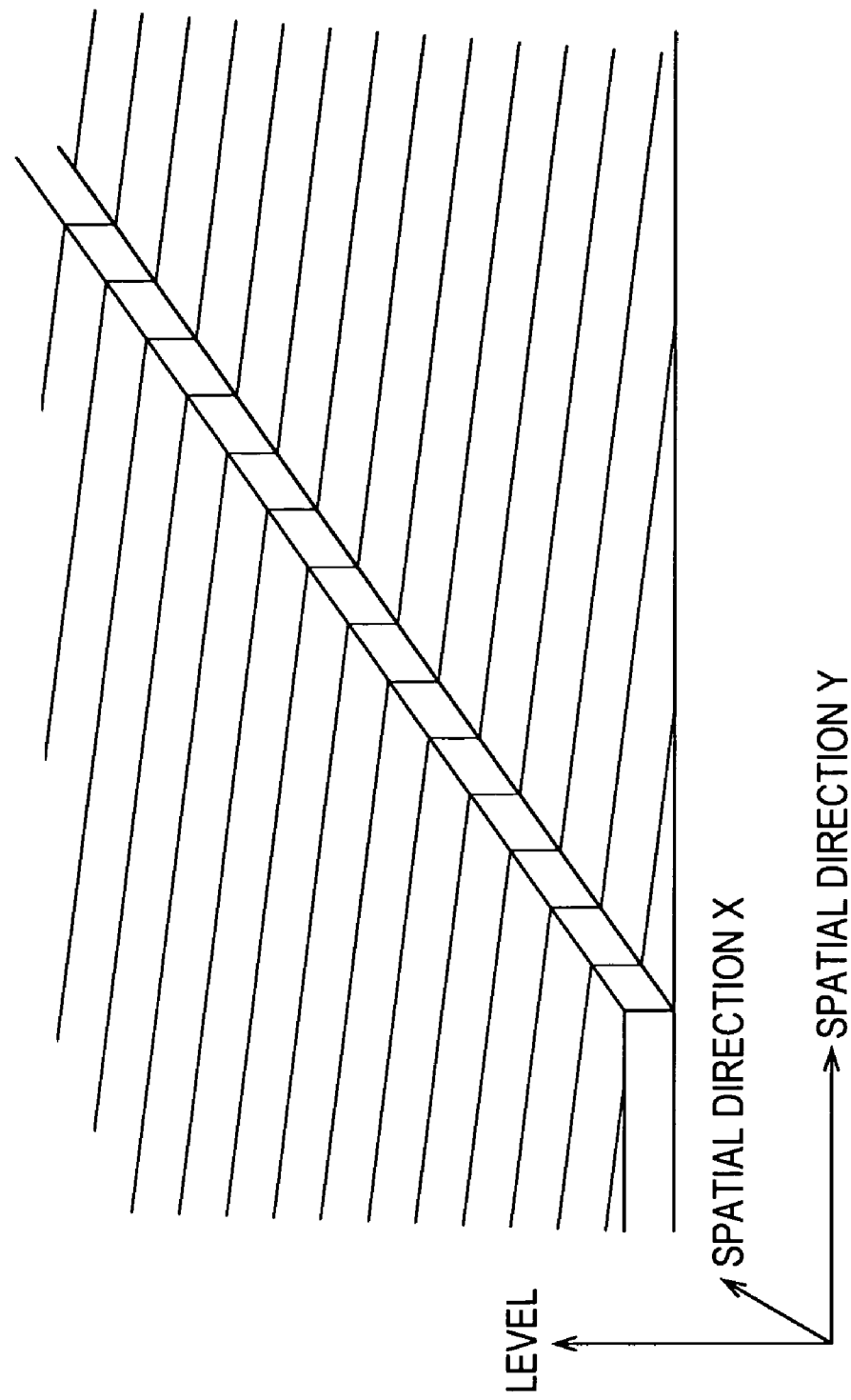
FIG. 11 is a diagram illustrating an example of an image of the actual world 1, of an object which is of a color different from that of the background, having a monotone and linear edge.

FIG. 11 is a diagram illustrating an image in the actual world 1 of an object having a straight edge, and is of a monotone color different from that of the background, i.e., an example of distribution of light intensity. In FIG. 11, the position to the upper side of the drawing indicates the intensity (level) of light, the position to the upper right side of the drawing indicates the position in the spatial direction X which is one direction of the spatial directions of the image, and the position to the right side of the drawing indicates the position in the spatial direction Y which is the other direction of the spatial directions of the image.

The image of the object of the actual world 1 which has a straight edge and is of a monotone color different from that of the background, includes predetermined continuity. That is to say, the image shown in FIG. 11 has continuity in that the cross-sectional shape (the change in level as to the change in position in the direction orthogonal to the edge) is the same at any arbitrary position in the length direction of the edge.

Figure 12:
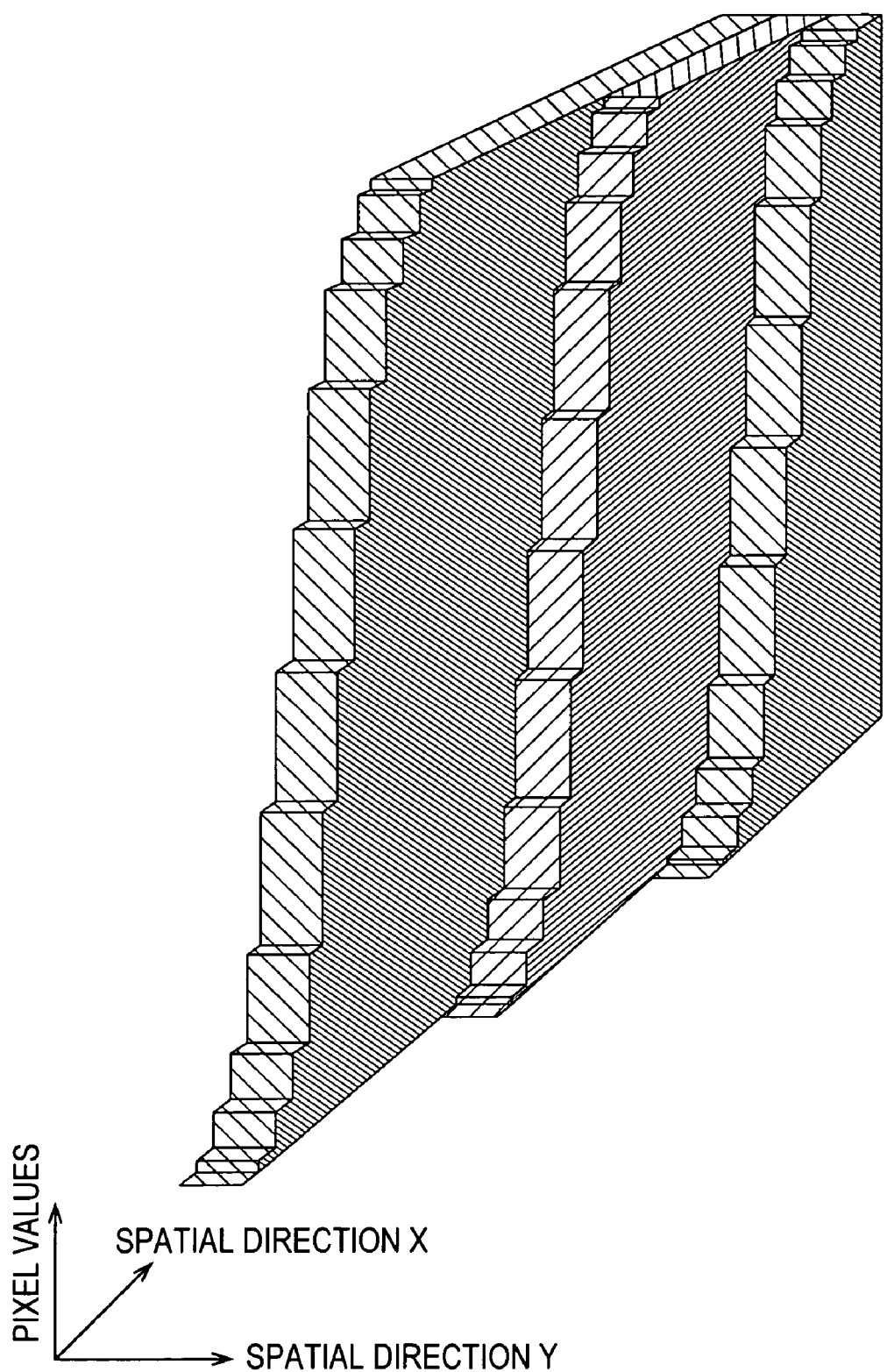
FIG. 12 is a diagram illustrating an example of pixel values of image data obtained by actual imaging.

FIG. 12 is a diagram illustrating an example of pixel values of the image data obtained by actual image-taking, corresponding to the image shown in FIG. 11. As shown in FIG. 12, the image data is in a stepped shape, since the image data is made up of pixel values in increments of pixels.

Figure 13:
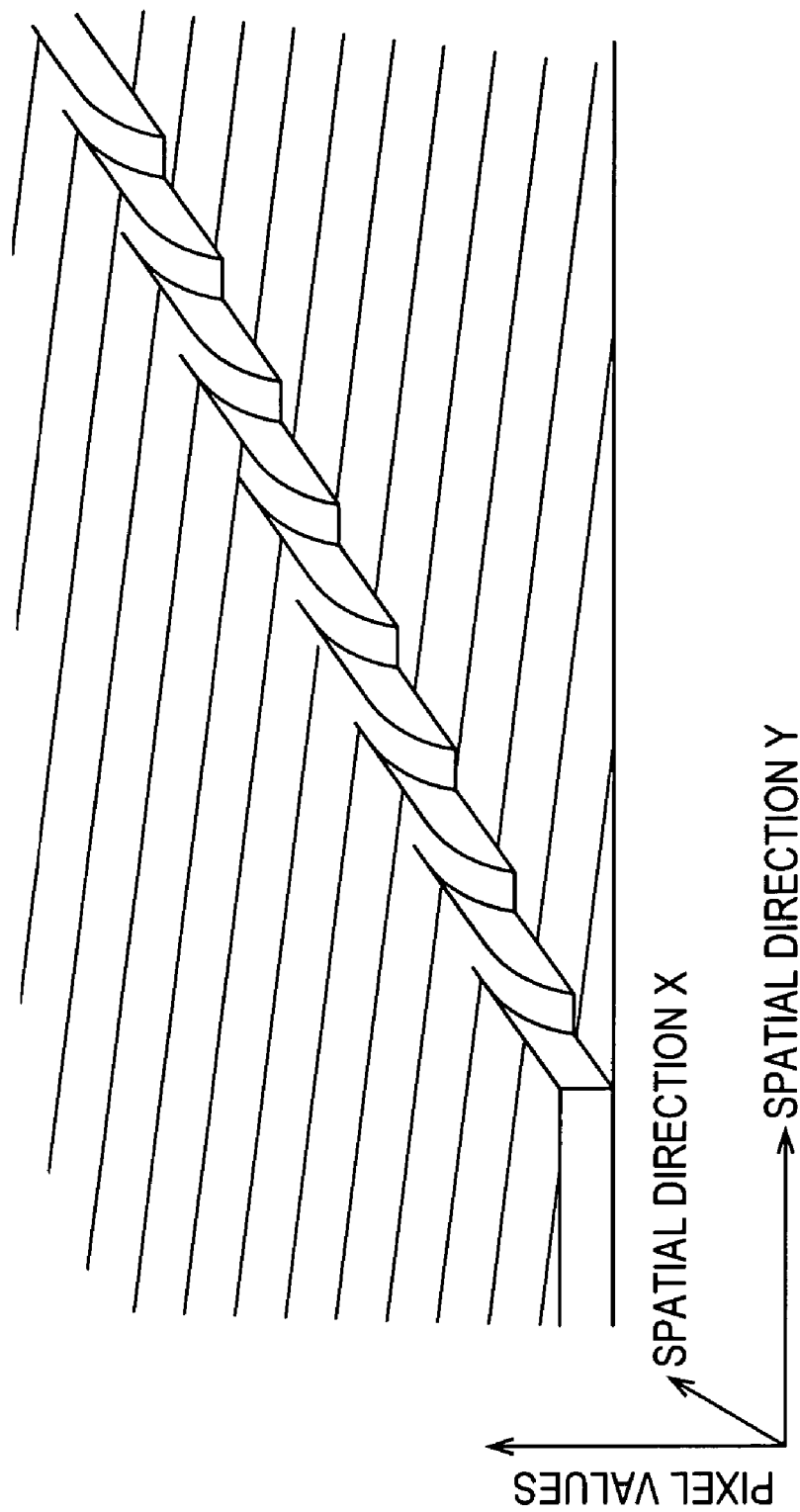
FIG. 13 is a schematic diagram of image data.

FIG. 13 is a model diagram illustrating the image data shown in FIG. 12.

The model diagram shown in FIG. 13 is a model diagram of image data obtained by taking, with the image sensor, an image of the object of the actual world 1 which has a straight edge and is of a monotone color different from that of the background, and extending in a direction offset from the array of the pixels of the image sensor (the vertical or horizontal array of the pixels). The image cast into the image sensor at the time that the image data shown in FIG. 13 was acquired is an image of the object of the actual world 1 which has a straight edge and is of a monotone color different from that of the background, shown in FIG. 11.

In FIG. 13, the position to the upper side of the drawing indicates the pixel value, the position to the upper right side of the drawing indicates the position in the spatial direction X which is one direction of the spatial directions of the image, and the position to the right side of the drawing indicates the position in the spatial direction Y which is the other direction of the spatial directions of the image. The direction indicating the pixel value in FIG. 13 corresponds to the direction of level in FIG. 11, and the spatial direction X and spatial direction Y in FIG. 13 also are the same as the directions in FIG. 11.

In the event of taking an image of an object of the actual world 1 which has a straight edge and is of a monotone color different from that of the background with an image sensor, the straight edge is represented in the image data obtained as a result of the image-taking as multiple pawl shapes having a predetermined length which are arrayed in a diagonally-off-set fashion, in a model representation, for example. The pawl shapes are of approximately the same shape. One pawl shape is formed on one row of pixels vertically, or is formed on one row of pixels horizontally. For example, one pawl shape shown in FIG. 13 is formed on one row of pixels vertically.

Thus, the continuity of image of the object of the actual world 1 which has a straight edge and is of a monotone color different from that of the background, in that the cross-sectional shape is the same at any arbitrary position in the length direction of the edge, for example, is lost in the image data obtained by imaging with an image sensor. Also, it can be said that the continuity, which the image of the object of the actual world 1 which has a straight edge and is of a monotone color different from that of the background had, has changed into continuity in that pawl shapes of the same shape formed on one row of pixels vertically or formed on one row of pixels horizontally are arrayed at predetermined intervals.

The data continuity detecting unit 101 detects such data continuity of the data 3 which is an input image, for example. For example, the data continuity detecting unit 101 detects data continuity by detecting regions having a constant characteristic in a predetermined dimensional direction. For example, the data continuity detecting unit 101 detects a region wherein the same arc shapes are arrayed at constant intervals, such as shown in FIG. 10. Also, for example, the data continuity detecting unit 101 detects a region wherein the same pawl shapes are arrayed at constant intervals, such as shown in FIG. 13.

Also, the data continuity detecting unit 101 detects continuity of the data by detecting angle (gradient) in the spatial direction, indicating an array of the same shapes.

Also, for example, the data continuity detecting unit 101 detects continuity of data by detecting angle (movement) in the space direction and time direction, indicating the array of the same shapes in the space direction and the time direction.

Further, for example, the data continuity detecting unit 101 detects continuity in the data by detecting the length of the region having constant characteristics in a predetermined dimensional direction.

Hereafter, the portion of data 3 where the sensor 2 has projected the image of the object of the actual world 1 which has a straight edge and is of a monotone color different from that of the background, will also be called a two-valued edge.

Now, with conventional signal processing, desired high-resolution data, for example, is generated from the data 3.

Conversely, with the signal processing by the signal processing device 4, the actual world 1 is estimated from the data 3, and the high-resolution data is generated based on the estimation results. That is to say, the actual world 1 is estimated from the data 3, and the high-resolution data is generated based on the estimated actual world 1, taking into consideration the data 3.

In order to generate the high-resolution data from the actual world 1, there is the need to take into consideration the relationship between the actual world 1 and the data 3. For example, how the actual world 1 is projected on the data 3 by the sensor 2 which is a CCD, is taken into consideration.

The sensor 2 which is a CCD has integration properties as described above. That is to say, one unit of the data 3 (e.g., pixel value) can be calculated by integrating a signal of the actual world 1 with a detection region (e.g., photoreception face) of a detection device (e.g., CCD) of the sensor 2.

Applying this to the high-resolution data, the high-resolution data can be obtained by applying processing, wherein a virtual high-resolution sensor projects signals of the actual world 1 to the data 3, to the estimated actual world 1.

In other words, if the signals of the actual world 1 can be estimated from the data 3, one value contained in the high-resolution data can be obtained by integrating signals of the actual world 1 for each detection region of the detecting elements of the virtual high-resolution sensor (in the time-space direction).

For example, in the event that the change in signals of the actual world 1 are smaller than the size of the detection region of the detecting elements of the sensor 2, the data 3 cannot expresses the small changes in the signals of the actual world 1. Accordingly, high-resolution data indicating small change of the signals of the actual world 1 can be obtained by integrating the signals of the actual world 1 estimated from the data 3 with each region (in the time-space direction) that is smaller in comparison with the change in signals of the actual world 1.

That is to say, integrating the signals of the estimated actual world 1 with the detection region with regard to each detecting element of the virtual high-resolution sensor enables the high-resolution data to be obtained.

With the signal processing device 4, the image generating unit 103 generates the high-resolution data by integrating the signals of the estimated actual world 1 in the time-space direction regions of the detecting elements of the virtual high-resolution sensor, for example.

Next, in order to estimate the actual world 1 from the data 3, at the signal processing device 4, the relationship between the data 3 and the actual world 1, continuity, and a spatial or temporal mixture in the data 3 (space mixture or time mixture), are used.

Here, a mixture means a value in the data 3 wherein the signals of two objects in the actual world 1 are mixed to yield a single value.

A space mixture means the mixture of the signals of two objects in the spatial direction due to the spatial integration effects of the sensor 2. Time mixture will be described later.

The actual world 1 itself is made up of countless events, and accordingly, in order to represent the actual world 1 itself with mathematical expressions, for example, there is the need to have an infinite number of variables. It is impossible to predict all events of the actual world 1 from the data 3.

In the same way, it is impossible to predict all of the signals of the actual world 1 from the data 3.

Figure 14:
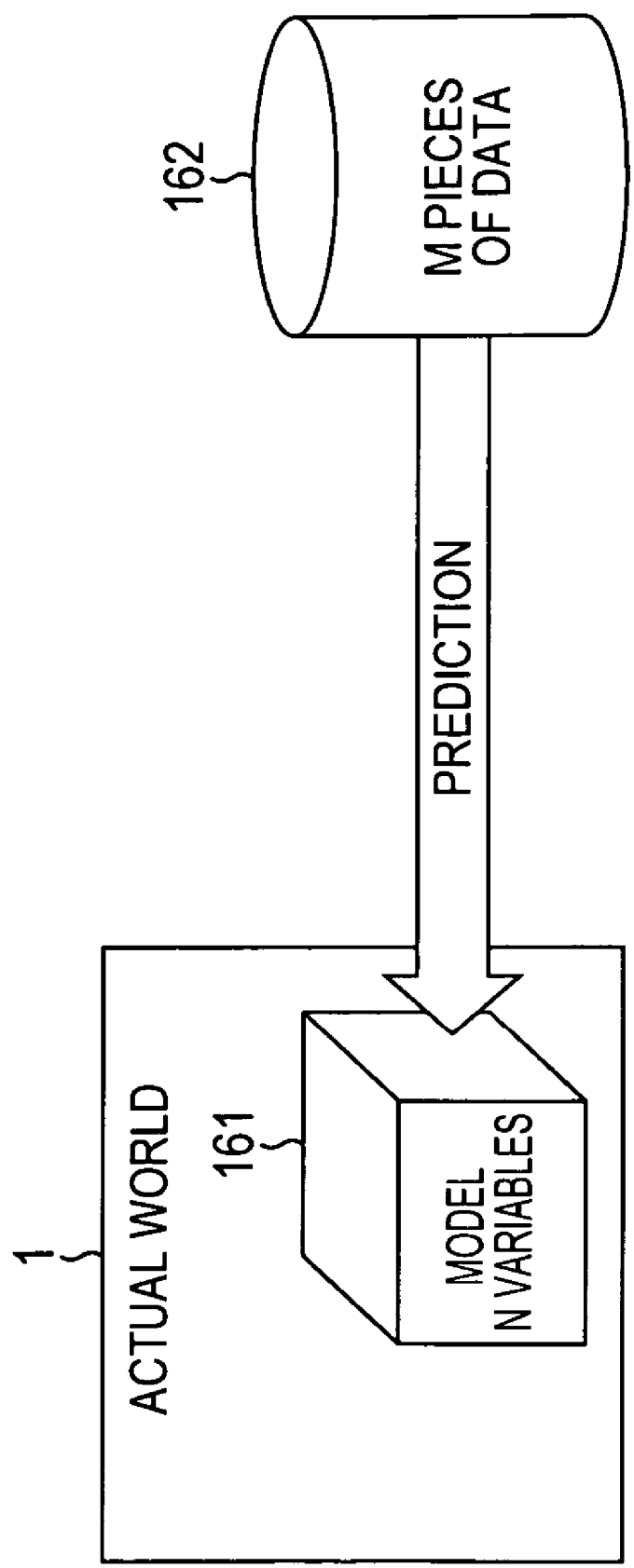
FIG. 14 is a diagram for describing estimation of a model 161 with M pieces of data 162.

Accordingly, with the signal processing device 4, of the signals of the actual world 1, a portion which has continuity and which can be expressed by the function f(x, y, z, t) is taken note of, and the portion of the signals of the actual world 1 which can be represented by the function f(x, y, z, t) and has continuity is approximated with a model 161 represented by N variables. As shown in FIG. 14, the model 161 is predicted from the M pieces of data 162 in the data 3.

In order to enable the model 161 to be predicted from the M pieces of data 162, first, there is the need to represent the model 161 with N variables based on the continuity, and second, to generate an expression using the N variables which indicates the relationship between the model 161 represented by the N variables and the M pieces of data 162 based on the integral properties of the sensor 2. Since the model 161 is represented by the N variables, based on the continuity, it can be said that the expression using the N variables that indicates the relationship between the model 161 represented by the N variables and the M pieces of data 162, describes the relationship between the part of the signals of the actual world 1 having continuity, and the part of the data 3 having data continuity.

In other words, the part of the signals of the actual world 1 having continuity, that is approximated by the model 161 represented by the N variables, generates data continuity in the data 3.

The data continuity detecting unit 101 detects the part of the data 3 where data continuity has been generated by the part of the signals of the actual world 1 having continuity, and the characteristics of the part where data continuity has been generated.

For example, as shown in FIG. 15, in an image of the object of the actual world 1 which has a straight edge and is of a monotone color different from that of the background, the edge at the position of interest indicated by A in FIG. 15, has a gradient. The arrow B in FIG. 15 indicates the gradient of the edge. A predetermined edge gradient can be represented as an angle as to a reference axis or as a direction as to a reference position. For example, a predetermined edge gradient can be represented as the angle between the coordinates axis of the spatial direction X and the edge. For example, the predetermined edge gradient can be represented as the direction indicated by the length of the spatial direction X and the length of the spatial direction Y.

At the time that the image of the object of the actual world 1 which has a straight edge and is of a monotone color different from that of the background is obtained at the sensor 2 and the data 3 is output, pawl shapes corresponding to the edge are arrayed in the data 3 at the position corresponding to the position of interest (A) of the edge in the image of the actual world 1, which is indicated by A' in FIG. 15, and pawl shapes corresponding to the edge are arrayed in the direction corresponding to the gradient of the edge of the image in the actual world 1, in the direction of the gradient indicated by B' in FIG. 15.

The model 161 represented with the N variables approximates such a portion of the signals of the actual world 1 generating data continuity in the data 3.

At the time of formulating an expression using the N variables indicating the relationship between the model 161 represented with the N variables and the M pieces of data 162, the values of part where data continuity is generated in the data 3 are used.

Figure 16:
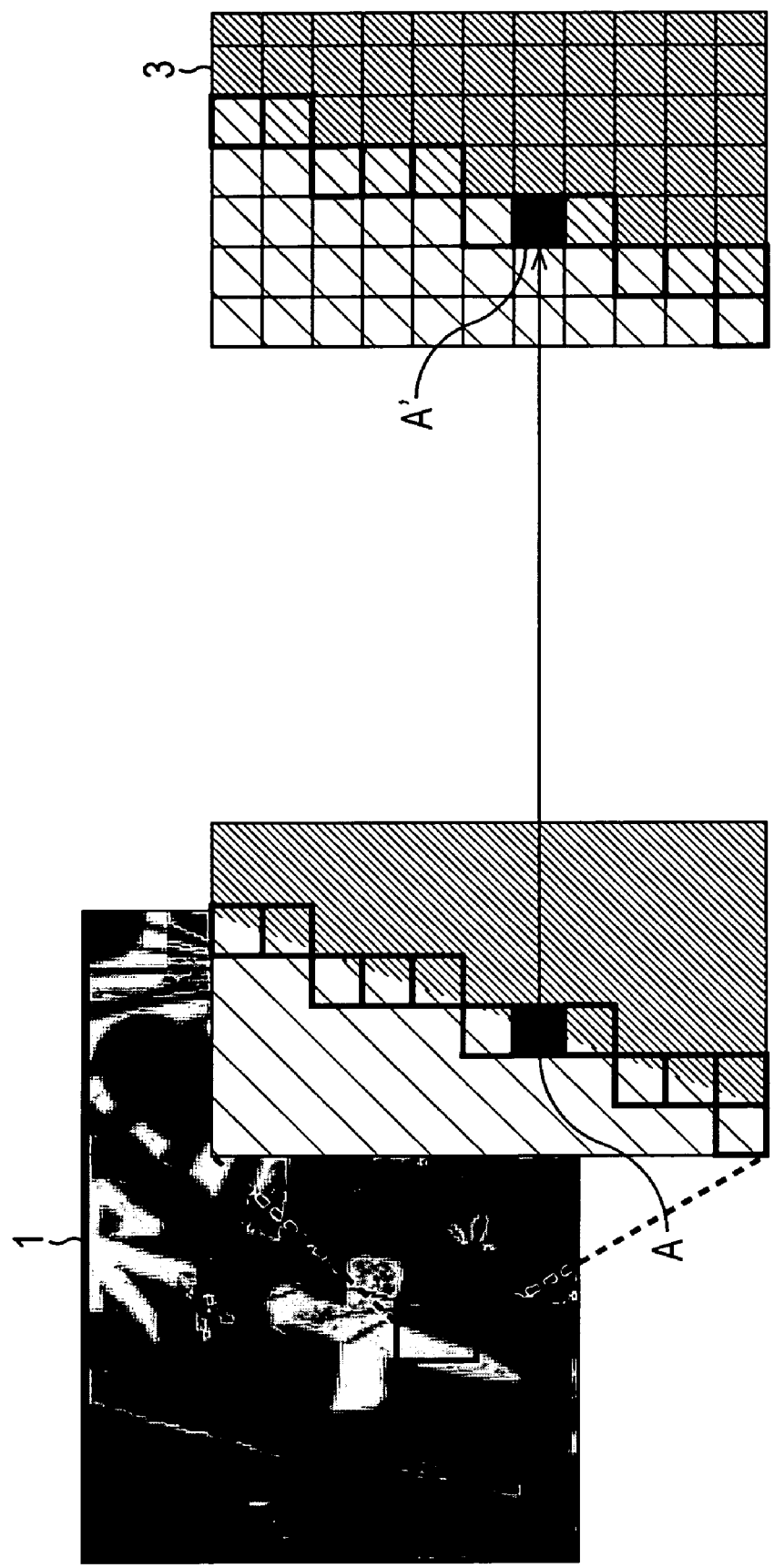
FIG. 16 is a diagram illustrating an example of data 3 of interest at the time of creating an Expression.

In this case, in the data 3 shown in FIG. 16, taking note of the values where data continuity is generated and which belong to a mixed region, an expression is formulated with a value integrating the signals of the actual world 1 as being equal to a value output by the detecting element of the sensor 2. For example, multiple expressions can be formulated regarding the multiple values in the data 3 where data continuity is generated.

In FIG. 16, A denotes the position of interest of the edge, and A' denotes (the position of) the pixel corresponding to the position (A) of interest of the edge in the image of the actual world 1.

Now, a mixed region means a region of data in the data 3 wherein the signals for two objects in the actual world 1 are mixed and become one value. For example, a pixel value wherein, in the image of the object of the actual world 1 which has a straight edge and is of a monotone color different from that of the background in the data 3, the image of the object having the straight edge and the image of the background are integrated, belongs to a mixed region.

Figure 17:
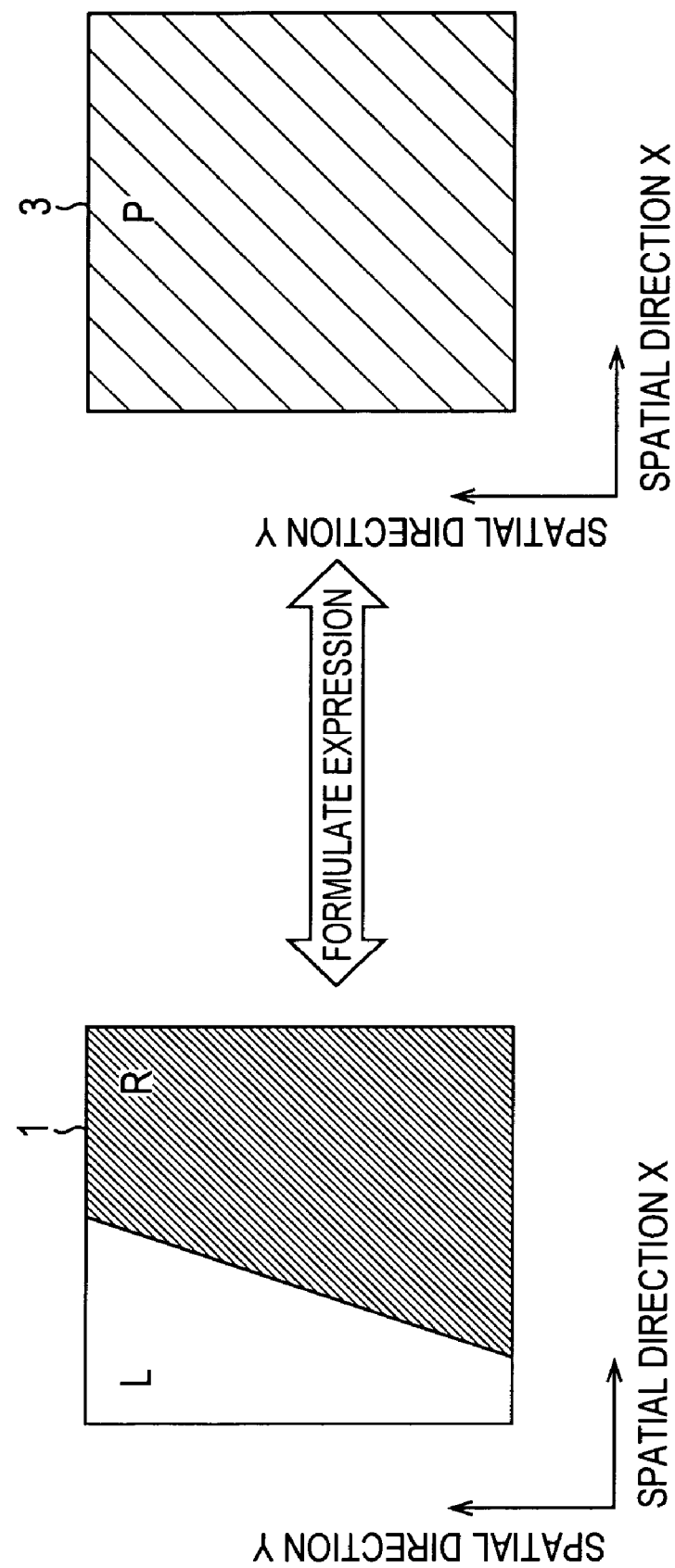
FIG. 17 is a diagram for describing signals for two objects in the actual world 1, and values belonging to a mixed region at the time of creating an expression.

FIG. 17 is a diagram describing signals for two objects in the actual world 1 and values belonging to a mixed region, in a case of formulating an expression.

FIG. 17 illustrates, to the left, signals of the actual world 1 corresponding to two objects in the actual world 1 having a predetermined expansion in the spatial direction X and the spatial direction Y, which are acquired at the detection region of a single detecting element of the sensor 2. FIG. 17 illustrates, to the right, a pixel value P of a single pixel in the data 3 wherein the signals of the actual world 1 illustrated to the left in FIG. 17 have been projected by a single detecting element of the sensor 2. That is to say, illustrates a pixel value P of a single pixel in the data 3 wherein the signals of the actual world 1 corresponding to two objects in the actual world 1 having a predetermined expansion in the spatial direction X and the spatial direction Y which are acquired by a single detecting element of the sensor 2, have been projected.

L in FIG. 17 represents the level of the signal of the actual world 1 which is shown in white in FIG. 17, corresponding to one object in the actual world 1. R in FIG. 17 represents the level of the signal of the actual world 1 which is shown hatched in FIG. 17, corresponding to the other object in the actual world 1.

Here, the mixture ratio α is the ratio of (the area of) the signals corresponding to the two objects cast into the detecting region of the one detecting element of the sensor 2 having a predetermined expansion in the spatial direction X and the spatial direction Y. For example, the mixture ratio α represents the ratio of area of the level L signals cast into the detecting region of the one detecting element of the sensor 2 having a predetermined expansion in the spatial direction X and the spatial direction Y, as to the area of the detecting region of a single detecting element of the sensor 2.

In this case, the relationship between the level L, level R, and the pixel value P, can be represented by Expression (4).

$$\alpha \times L + f(1-\alpha) \times R = P \qquad (4)$$

Note that there may be cases wherein the level R may be taken as the pixel value of the pixel in the data 3 positioned to the right side of the pixel of interest, and there may be cases wherein the level L may be taken as the pixel value of the pixel in the data 3 positioned to the left side of the pixel of interest.

Also, the time direction can be taken into consideration in the same way as with the spatial direction for the mixture ratio α and the mixed region. For example, in the event that an object in the actual world 1 which is the object of image-taking, is moving as to the sensor 2, the ratio of signals for the two objects cast into the detecting region of the single detecting element of the sensor 2 changes in the time direction. The signals for the two objects regarding which the ratio changes in the time direction, that have been cast into the detecting region of the single detecting element of the sensor 2, are projected into a single value of the data 3 by the detecting element of the sensor 2.

The mixture of signals for two objects in the time direction due to time integration effects of the sensor 2 will be called time mixture.

The data continuity detecting unit 101 detects regions of pixels in the data 3 where signals of the actual world 1 for two objects in the actual world 1, for example, have been projected. The data continuity detecting unit 101 detects gradient in the data 3 corresponding to the gradient of an edge of an image in the actual world 1, for example.

The actual world estimating unit 102 estimates the signals of the actual world 1 by formulating an expression using N variables, representing the relationship between the model 161 represented by the N variables and the M pieces of data 162, based on the region of the pixels having a predetermined mixture ratio α detected by the data continuity detecting unit 101 and the gradient of the region, for example, and solving the formulated expression.

Description will be made further regarding specific estimation of the actual world 1. of the signals of the actual world represented by the function F(x, y, z, t)let us consider approximating the signals of the actual world represented by the function F(x, y, t) at the cross-section in the spatial direction Z (the position of the sensor 2), with an approximation function f(x, y, t) determined by a position x in the spatial direction X, a position y in the spatial direction Y, and a point-in-time t.

Now, the detection region of the sensor 2 has an expanse in the spatial direction X and the spatial direction Y. In other words, the approximation function f(x, y, t) is a function approximating the signals of the actual world 1 having an expanse in the spatial direction and time direction, which are acquired with the sensor 2.

Let us say that projection of the signals of the actual world 1 from the sensor 2 yields a value P(x, y, t) of the data 3. The value P(x, y, t) of the data 3 is a pixel value which the sensor 2 which is an image sensor outputs, for example.

Now, in the event that the projection by the sensor 2 can be formulated, the value obtained by projecting the approximation function f(x, y, t) can be represented as a projection function S(x, y, t).

Obtaining the projection function S(x, y, t) has the following problems.

First, generally, the function F(x, y, z, t) representing the signals of the actual world 1 can be a function with an infinite number of orders.

Second, even if the signals of the actual world could be described as a function, the projection function S(x, y, t) via projection of the sensor 2 generally cannot be determined. That is to say, the action of projection by the sensor 2, in other words, the relationship between the input signals and output signals of the sensor 2, is unknown, so the projection function S(x, y, t) cannot be determined.

With regard to the first problem, let us consider expressing the function f(x, y, t) approximating signals of the actual world 1 with the sum of products of the function $f_i(x, y, t)$ which is a describable function(e.g., a function with a finite number of orders) and variables $w_i$.

Also, with regard to the second problem, formulating projection by the sensor 2 allows us to describe the function $S_i(x, y, t)$ from the description of the function $f_i(x, y, t)$.

That is to say, representing the function f(x, y, t) approximating signals of the actual world 1 with the sum of products of the function $f_i(x, y, t)$ and variables $w_i$, the Expression (5) can be obtained.

$$f(x, y, t) = \sum_{i=1}^{N} w_i f_i(x, y, t) \qquad (5)$$

For example, as indicated in Expression (6), the relationship between the data 3 and the signals of the actual world can be formulated as shown in Expression (7) from Expression (5) by formulating the projection of the sensor 2. actual world 1 to be estimated from the data 3.

First, the N variables are determined. That is to say, Expression (5) is determined. This enables describing the actual world 1 using continuity. For example, the signals of the actual world 1 can be described with a model 161 wherein a cross-section is expressed with a polynomial, and the same cross-sectional shape continues in a constant direction.

Second, for example, projection by the sensor 2 is formulated, describing Expression (7). For example, this is formulated such that the results of integration of the signals of the actual world 2 are data 3.

Third, M pieces of data 162 are collected to satisfy Expression (8). For example, the data 162 is collected from a region having data continuity that has been detected with the data continuity detecting unit 101. For example, data 162 of a region wherein a constant cross-section continues, which is an example of continuity, is collected.

In this way, the relationship between the data 3 and the actual world 1 is described with the Expression (5), and M pieces of data 162 are collected, thereby satisfying Expression (8), and the actual world 1 can be estimated.

More specifically, in the event of N=M, the number of variables N and the number of expressions M are equal, so the variables $w_i$ can be obtained by formulating a $$S_i(x, y, t) = \int\int\int f_i(x, y, t) dx\, dy\, dt \tag{6}$$

$$P_j(x_j, y_j, t_j) = \sum_{i=1}^{N} w_i S_i(x_j, y_j, t_j) \tag{7}$$

In Expression (7), j represents the index of the data.

In the event that M data groups (j=1 through M) common with the N variables $w_i$ (i=1 through N) exists in Expression (7), Expression (8) is satisfied, so the model 161 of the actual world can be obtained from data 3.

$$N \leq M \tag{8}$$

N is the number of variables representing the model 161 approximating the actual world 1. M is the number of pieces of data 162 include in the data 3.

Representing the function f(x, y, t) approximating the actual world 1 signals with Expression (5) allows the variable portion $w_i$ to be handled independently. At this time, i represents the number of variables. Also, the form of the function represented by $f_i$ can be handed independently, and a desired function can be used for $f_i$.

Accordingly, the number N of the variables $w_i$ can be defined without dependence on the function $f_i$, and the variables $w_i$ can be obtained from the relationship between the number N of the variables $w_i$ and the number of pieces of data M.

That is to say, using the following three allows the simultaneous equation.

Also, in the event that N<M, various solving methods can be applied. For example, the variables $w_i$ can be obtained by least-square.

Now, the solving method by least-square will be described in detail.

First, an Expression (9) for predicting data 3 from the actual world 1 will be shown according to Expression (7).

$$P'_j(x_j, y_j, t_j) = \sum_{i=1}^{N} w_i S_i(x_j, y_j, t_j) \tag{9}$$

In Expression (9), $P'_j(x_j, y_j, t_j)$ is a prediction value.

The sum of squared differences E for the prediction value P' and observed value P is represented by Expression (10).

$$E = \sum_{j=1}^{M} (P_j(x_j, y_j, t_j) - P'_j(x_j, y_j, t_j))^2 \tag{10}$$

The variables $w_i$ are obtained such that the sum of squared differences E is the smallest. Accordingly, the partial differential value of Expression (10) for each variable $w_k$ is 0. That is to say, Expression (11) holds.

$$\frac{\delta E}{\delta w_k} = \tag{11}$$

$$-2\sum_{j=1}^{M} w_i S_k(x_j, y_j, t_j)\left(P_j(x_j, y_j, t_j) - \sum_{i=1}^{N} w_i S_i(x_j, y_j, t_j)\right) = 0$$

Expression (11) yields Expression (12).

$$\sum_{j=1}^{M} \left(S_k(x_j, y_j, t_j)\sum_{i=1}^{N} w_i S_i(x_j, y_j, t_j)\right) = \tag{12}$$

$$\sum_{j=1}^{M} S_k(x_j, y_j, t_j) P_j(x_j, y_j, t_j)$$

When Expression (12) holds with K=1 through N, the solution by least-square is obtained. The normal equation thereof is shown in Expression (13).

$$\begin{pmatrix} \sum_{j=1}^{M} S_1(j)S_1(j) & \sum_{j=1}^{M} S_1(j)S_2(j) & \cdots & \sum_{j=1}^{M} S_1(j)S_N(j) \\ \sum_{j=1}^{M} S_2(j)S_1(j) & \sum_{j=1}^{M} S_2(j)S_2(j) & \cdots & \sum_{j=1}^{M} S_2(j)S_N(j) \\ \vdots & \vdots & \ddots & \vdots \\ \sum_{j=1}^{M} S_N(j)S_1(j) & \sum_{j=1}^{M} S_N(j)S_2(j) & \cdots & \sum_{j=1}^{M} S_N(j)S_N(j) \end{pmatrix} \begin{pmatrix} w_1 \\ w_2 \\ \vdots \\ w_N \end{pmatrix} = \begin{pmatrix} \sum_{j=1}^{M} S_1(j)P_j(j) \\ \sum_{j=1}^{M} S_2(j)P_j(j) \\ \vdots \\ \sum_{j=1}^{M} S_N(j)P_j(j) \end{pmatrix} \tag{13}$$

Note that in Expression (13), $S_i(x_j, y_j, t_j)$ is described as $S_i(j)$.

$$S_{MAT} = \begin{pmatrix} \sum_{j=1}^{M} S_1(j)S_1(j) & \sum_{j=1}^{M} S_1(j)S_2(j) & \cdots & \sum_{j=1}^{M} S_1(j)S_N(j) \\ \sum_{j=1}^{M} S_2(j)S_1(j) & \sum_{j=1}^{M} S_2(j)S_2(j) & \cdots & \sum_{j=1}^{M} S_2(j)S_N(j) \\ \vdots & \vdots & \ddots & \vdots \\ \sum_{j=1}^{M} S_N(j)S_1(j) & \sum_{j=1}^{M} S_N(j)S_2(j) & \cdots & \sum_{j=1}^{M} S_N(j)S_N(j) \end{pmatrix} \quad (14)$$

$$W_{MAT} = \begin{pmatrix} w_1 \\ w_2 \\ \vdots \\ w_N \end{pmatrix} \quad (15)$$

$$P_{MAT} = \begin{pmatrix} \sum_{j=1}^{M} S_1(j)P_j(j) \\ \sum_{j=1}^{M} S_2(j)P_j(j) \\ \vdots \\ \sum_{j=1}^{M} S_N(j)P_j(j) \end{pmatrix} \quad (16)$$

From Expression (14) through Expression (16), Expression (13) can be expressed as $S_{MAT}W_{MAT}=P_{MAT}$.

In Expression (13), $S_i$ represents the projection of the actual world 1. In Expression (13), $P_j$ represents the data 3. In Expression (13), $w_i$ represents variables for describing and obtaining the characteristics of the signals of the actual world 1.

Accordingly, inputting the data 3 into Expression (13) and obtaining $W_{MAT}$ by a matrix solution or the like enables the actual world 1 to be estimated. That is to say, the actual world 1 can be estimated by computing Expression (17).

$$W_{MAT}=S_{MAT}^{-1}P_{MAT} \quad (17)$$

Note that in the event that $S_{MAT}$ is not regular, a transposed matrix of $S_{MAT}$ can be used to obtain $W_{MAT}$.

The actual world estimating unit 102 estimates the actual world 1 by, for example, inputting the data 3 into Expression (13) and obtaining $W_{MAT}$ by a matrix solution or the like.

Now, an even more detailed example will be described. For example, the cross-sectional shape of the signals of the actual world 1, i.e., the change in level as to the change in position, will be described with a polynomial. Let us assume that the cross-sectional shape of the signals of the actual world 1 is constant, and that the cross-section of the signals of the actual world 1 moves at a constant speed. Projection of the signals of the actual world 1 from the sensor 2 to the data 3 is formulated by three-dimensional integration in the time-space direction of the signals of the actual world 1.

The assumption that the cross-section of the signals of the actual world 1 moves at a constant speed yields Expression (18) and Expression (19).

$$\frac{dx}{dt} = v_x \quad (18)$$

$$\frac{dy}{dt} = v_y \quad (19)$$

Here, $v_x$ and $v_y$ are constant.

Using Expression (18) and Expression (19), the cross-sectional shape of the signals of the actual world 1 can be represented as in Expression (20).

$$f(x',y')=f(x+v_xt, y+v_yt) \quad (20)$$

Formulating projection of the signals of the actual world 1 from the sensor 2 to the data 3 by three-dimensional integration in the time-space direction of the signals of the actual world 1 yields Expression (21).

$$S(x, y, t) = \int_{x_s}^{x_e} \int_{y_s}^{y_e} \int_{t_s}^{t_e} f(x', y') dx\,dy\,dt \quad (21)$$
$$= \int_{x_s}^{x_e} \int_{y_s}^{y_e} \int_{t_s}^{t_e} f(x + v_xt, y + v_yt) dx\,dy\,dt$$

In Expression (21), $S(x, y, t)$ represents an integrated value the region from position $x_s$ to position $x_e$ for the spatial direction X, from position $y_s$ to position $y_e$ for the spatial direction Y, and from point-in-time $t_s$ to point-in-time $t_e$ for the time direction t, i.e., the region represented as a space-time cuboid.

Solving Expression (13) using a desired function $f(x', y')$ whereby Expression (21) can be determined enables the signals of the actual world 1 to be estimated.

In the following, we will use the function indicated in Expression (22) as an example of the function $f(x', y')$.

$$f(x', y') = w_1 x' + w_2 y' + w_3 \quad (22)$$
$$= w_1(x + v_xt) + w_2(y + v_yt) + w_3$$

Figure 18:
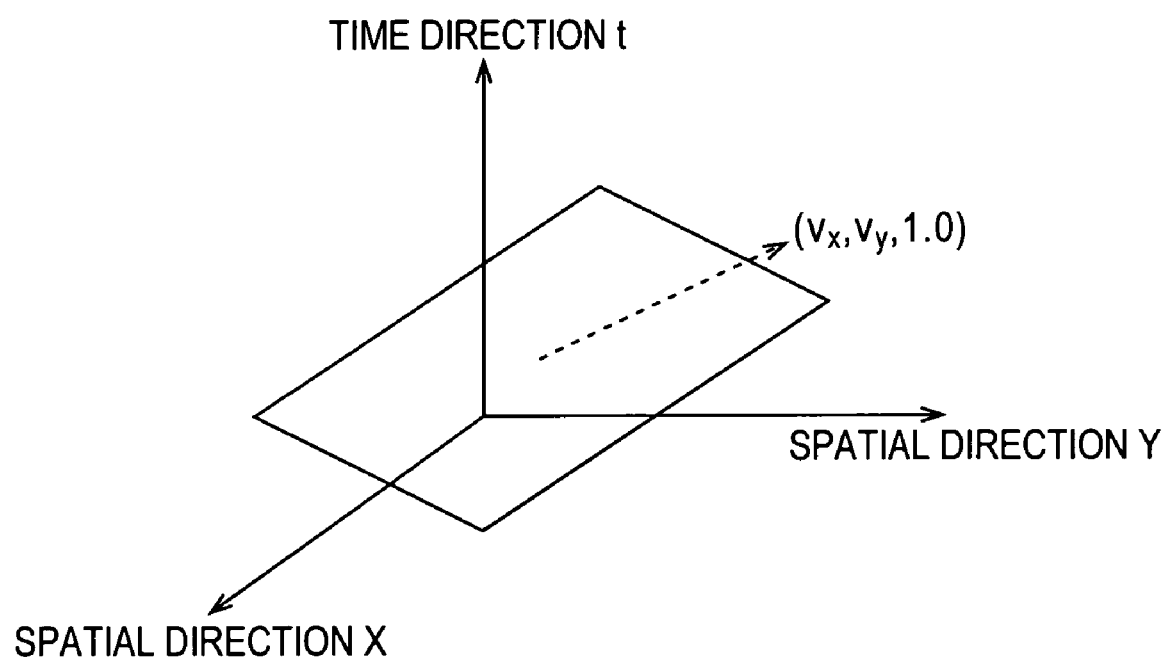
FIG. 18 is a diagram for describing continuity represented by Expression (18), Expression (19), and Expression (22).

That is to say, the signals of the actual world 1 are estimated to include the continuity represented in Expression (18), Expression (19), and Expression (22). This indicates that the cross-section with a constant shape is moving in the space-time direction as shown in FIG. 18.

Substituting Expression (22) into Expression (21) yields Expression (23).

$$S(x, y, t) = \int_{x_s}^{x_e} \int_{y_s}^{y_e} \int_{t_s}^{t_e} f(x + v_xt, y + v_yt) dx\,dy\,dt \quad (23)$$
$$= \text{Volume}\left(\frac{w_0}{2}(x_e + x_s + v_x(t_e + t_s)) + \frac{w_1}{2}(y_e + y_s + v_y(t_e + t_s)) + w_2\right)$$
$$= w_0 S_0(x, y, t) + w_1 S_1(x, y, t) + w_2 S_2(x, y, t)$$

wherein

Volume=$(x_e-x_s)(y_e-y_s)(t_e-t_s)$ $S_0(x, y, t)$=Volume/2×$(x_e+x_s+v_x(t_e+t_s))$ $S_1(x, y, t)$=Volume/2×$(y_e+y_s+v_y(t_e+t_s))$ $S_2(x, y, t)$=1 holds.

Figure 19:
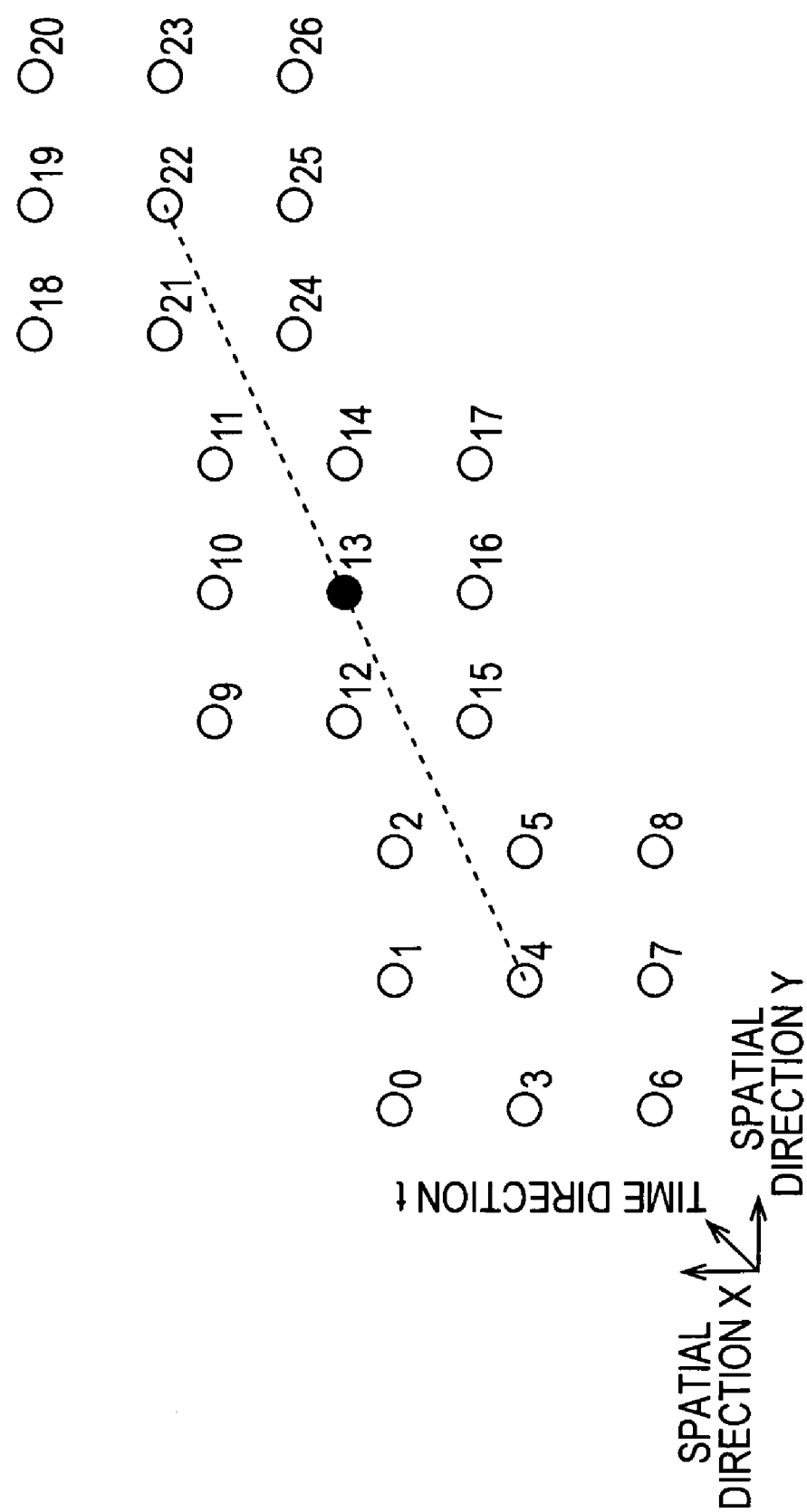
FIG. 19 is a diagram illustrating an example of M pieces of data 162 extracted from data 3.

FIG. 19 is a diagram illustrating an example of the M pieces of data 162 extracted from the data 3. For example, let us say that 27 pixel values are extracted as the data 162, and that the extracted pixel values are $P_j(x, y, t)$. In this case, j is 0 through 26.

In the example shown in FIG. 19, in the event that the pixel value of the pixel corresponding to the position of interest at the point-in-time t which is n is $P_{13}(x, y, t)$, and the direction of array of the pixels having the continuity of data (e.g., the direction in which the same-shaped pawl shapes detected by the data continuity detecting unit 101 are arrayed) is a direction connecting $P_4(x, y, t)$, $P_{13}(x, y, t)$, and $P_{22}(x, y, t)$, the pixel values $P_9(x, y, t)$ through $P_{17}(x, y, t)$ at the point-in-time t which is n, the pixel values $P_0(x, y, t)$ through $P_8(x, y, t)$ at the point-in-time t which is n−1 which is earlier in time than n, and the pixel values $P_{18}(x, y, t)$ through $P_{26}(x, y, t)$ at the point-in-time t which is n+1 which is later in time than n, are extracted.

Now, the region regarding which the pixel values, which are the data 3 output from the image sensor which is the sensor 2, have been obtained, have a time-direction and two-dimensional spatial direction expansion. Now, for example, the center of gravity of the cuboid corresponding to the pixel values (the region regarding which the pixel values have been obtained) can be used as the position of the pixel in the space-time direction.

Generating Expression (13) from the 27 pixel values $P_0(x, y, t)$ through $P_{26}(x, y, t)$ and from Expression (23), and obtaining W, enables the actual world 1 to be estimated.

In this way, the actual world estimating unit 102 generates Expression (13) from the 27 pixel values $P_0(x, y, t)$ through $P_{26}(x, y, t)$ and from Expression (23), and obtains W, thereby estimating the signals of the actual world 1.

Note that a Gaussian function, a sigmoid function, or the like, can be used for the function $f_i(x, y, t)$.

An example of processing for generating high-resolution data with even higher resolution, corresponding to the data 3, from the estimated actual world 1 signals, will be described with reference to FIG. 20 through FIG. 23.

Figure 20:
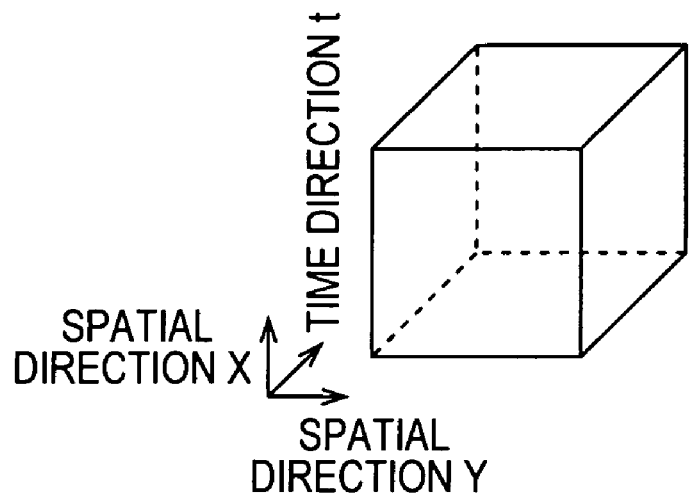
FIG. 20 is a diagram for describing integration of signals of the actual world 1 in the time direction and two-dimensional spatial direction, in the data 3.

As shown in FIG. 20, the data 3 has a value wherein signals of the actual world 1 are integrated in the time direction and two-dimensional spatial directions. For example, a pixel value which is data 3 that has been output from the image sensor which is the sensor 2 has a value wherein the signals of the actual world 1, which is light cast into the detecting device, are integrated by the shutter time which is the detection time in the time direction, and integrated by the photoreception region of the detecting element in the spatial direction.

Figure 21:
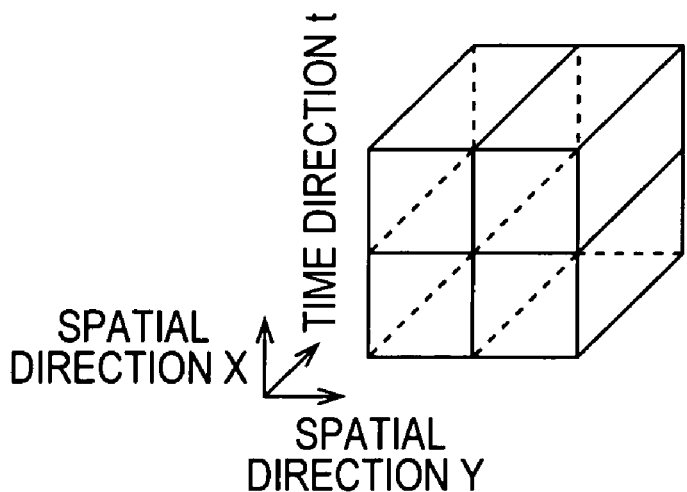
FIG. 21 is a diagram for describing an integration region at the time of generating high-resolution data with higher resolution in the spatial direction.

Conversely, as shown in FIG. 21, the high-resolution data with even higher resolution in the spatial direction is generated by integrating the estimated actual world 1 signals in the time direction by the same time as the detection time of the sensor 2 which has output the data 3, and also integrating in the spatial direction by a region narrower in comparison with the photoreception region of the detecting element of the sensor 2 which has output the data 3.

Note that at the time of generating the high-resolution data with even higher resolution in the spatial direction, the region where the estimated signals of the actual world 1 are integrated can be set completely disengaged from photoreception region of the detecting element of the sensor 2 which has output the data 3. For example, the high-resolution data can be provided with resolution which is that of the data 3 magnified in the spatial direction by an integer, of course, and further, can be provided with resolution which is that of the data 3 magnified in the spatial direction by a rational number such as 5/3 times, for example.

Figure 22:
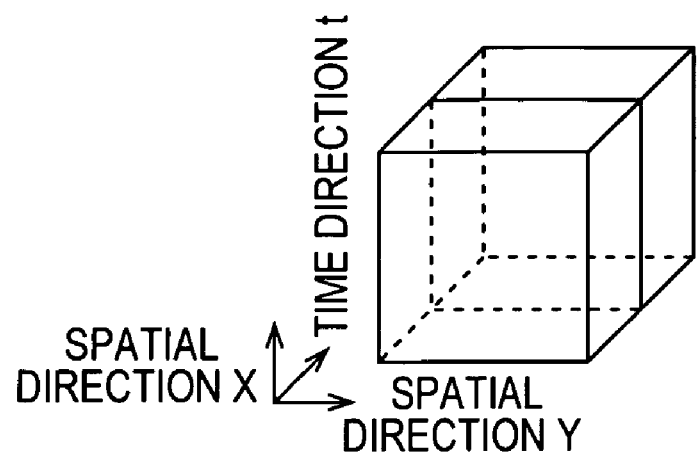
FIG. 22 is a diagram for describing an integration region at the time of generating high-resolution data with higher resolution in the time direction.

Also, as shown in FIG. 22, the high-resolution data with even higher resolution in the time direction is generated by integrating the estimated actual world 1 signals in the spatial direction by the same region as the photoreception region of the detecting element of the sensor 2 which has output the data 3, and also integrating in the time direction by a time shorter than the detection time of the sensor 2 which has output the data 3.

Note that at the time of generating the high-resolution data with even higher resolution in the time direction, the time by which the estimated signals of the actual world 1 are integrated can be set completely disengaged from shutter time of the detecting element of the sensor 2 which has output the data 3. For example, the high-resolution data can be provided with resolution which is that of the data 3 magnified in the time direction by an integer, of course, and further, can be provided with resolution which is that of the data 3 magnified in the time direction by a rational number such as 7/4 times, for example.

High-resolution data with movement blurring removed is generated by integrating the estimated actual world 1 signals only in the spatial direction and not in the time direction.

Figure 23:
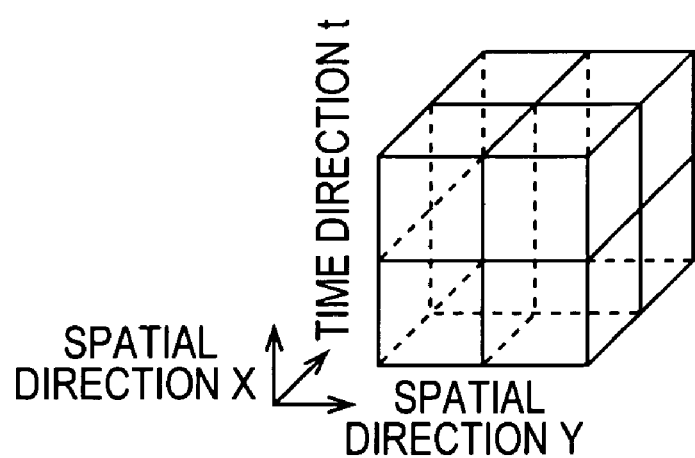
FIG. 23 is a diagram for describing an integration region at the time of generating high-resolution data with higher resolution in the time-spatial directions.

Further, as shown in FIG. 23, high-resolution data with higher resolution in the time direction and space direction is generated by integrating the estimated actual world 1 signals in the spatial direction by a region narrower in comparison with the photoreception region of the detecting element of the sensor 2 which has output the data 3, and also integrating in the time direction by a time shorter in comparison with the detection time of the sensor 2 which has output the data 3.

In this case, the region and time for integrating the estimated actual world 1 signals can be set completely unrelated to the photoreception region and shutter time of the detecting element of the sensor 2 which has output the data 3.

Thus, the image generating unit 103 generates data with higher resolution in the time direction or the spatial direction, by integrating the estimated actual world 1 signals by a desired space-time region, for example.

Accordingly, data which is more accurate with regard to the signals of the actual world 1, and which has higher resolution in the time direction or the space direction, can be generated by estimating the signals of the actual world 1.

FIG. 24 through FIG. 28 illustrate an example of an input image and an example of the results of processing with the signal processing device 4 used for signal processing.

Figure 24:
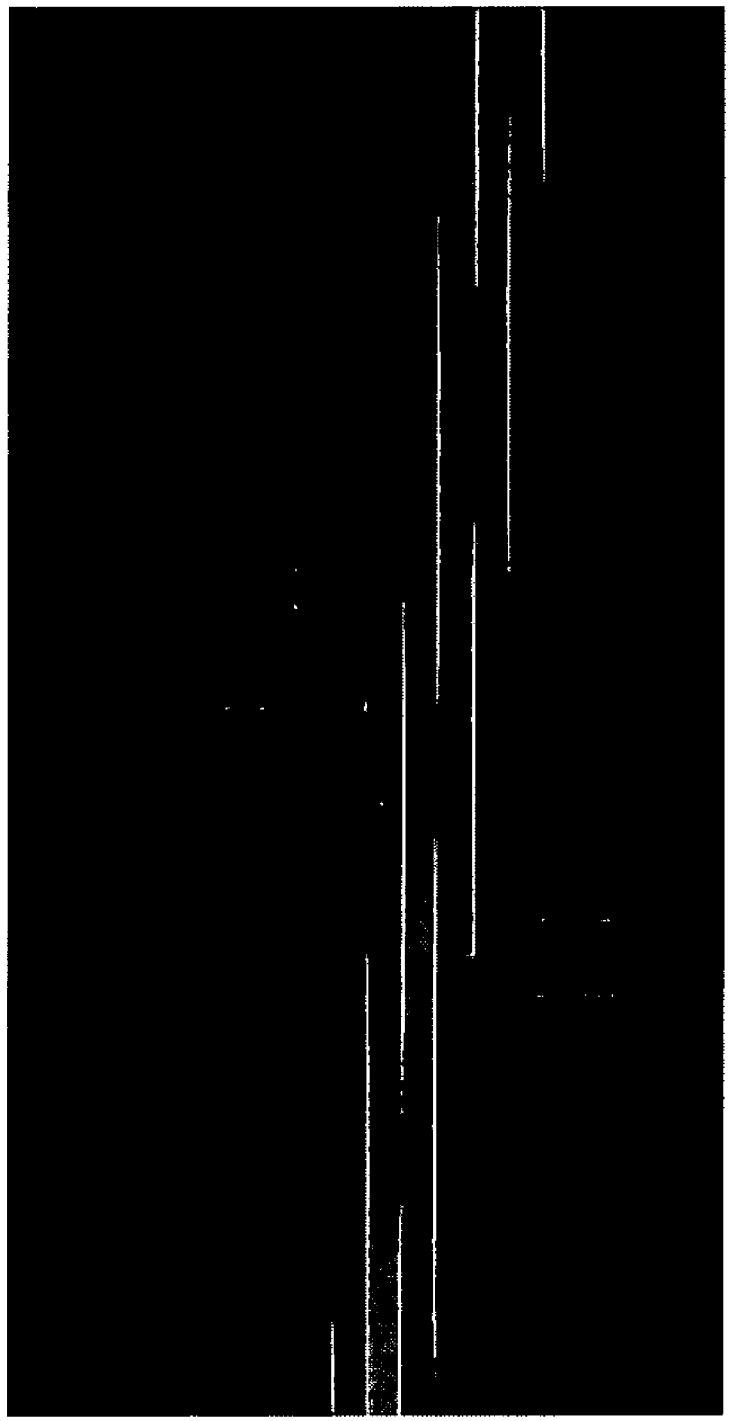
FIG. 24 is a diagram illustrating the original image of the input image.
Figure 25:
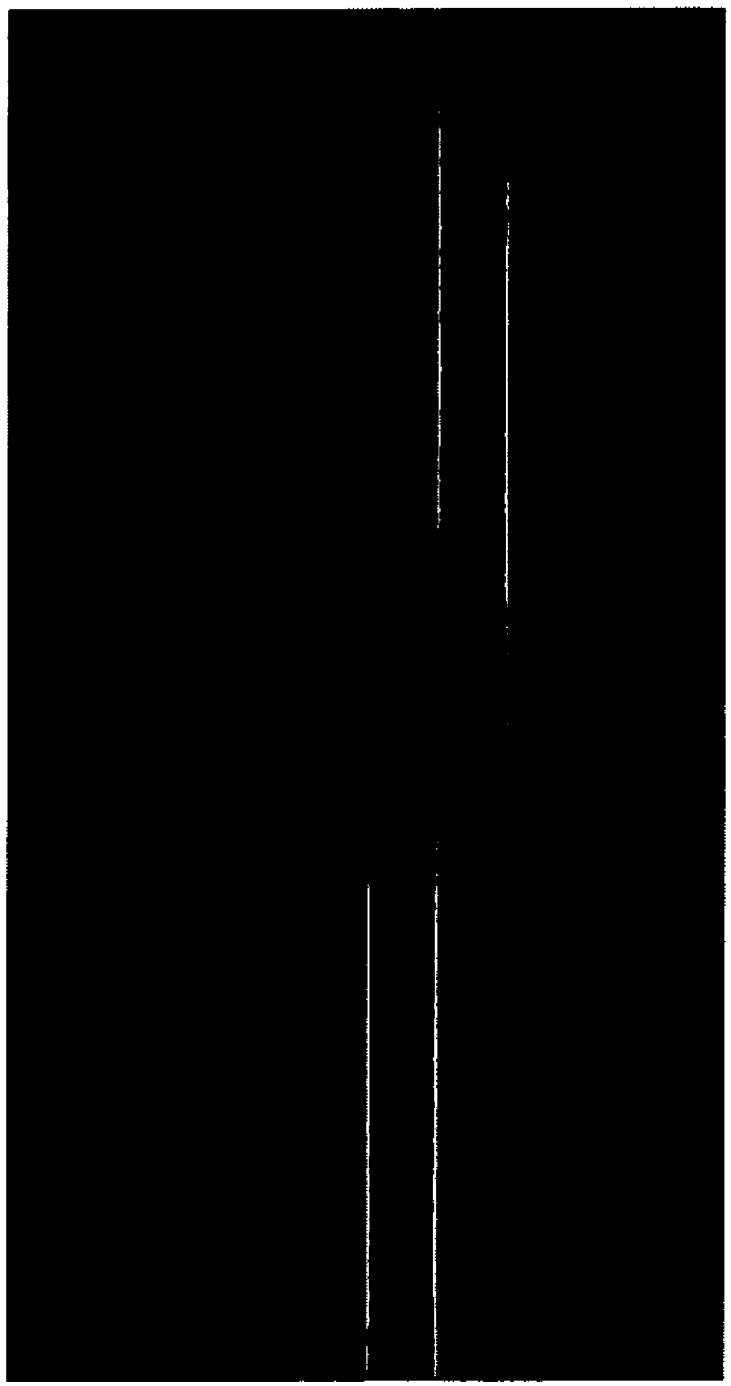
FIG. 25 is a diagram illustrating an example of an input image.

FIG. 24 is a diagram illustrating an original image of an input image (equivalent to light signals of the actual world 1). FIG. 25 is a diagram illustrating an example of an input image. The input image shown in FIG. 25 is an image generated by taking the average value of pixel values of pixels belonging to blocks made up of 2 by 2 pixels of the image shown in FIG. 24, as the pixel value of a single pixel. That is to say, the input image is an image obtained by applying spatial direction integration to the image shown in FIG. 24, imitating the integrating properties of the sensor.

The original image shown in FIG. 24 contains an image of a fine line inclined at approximately 5 degrees in the clockwise direction from the vertical direction. In the same way, the input image shown in FIG. 25 contains an image of a fine line inclined at approximately 5 degrees in the clockwise direction from the vertical direction.

Figure 26:
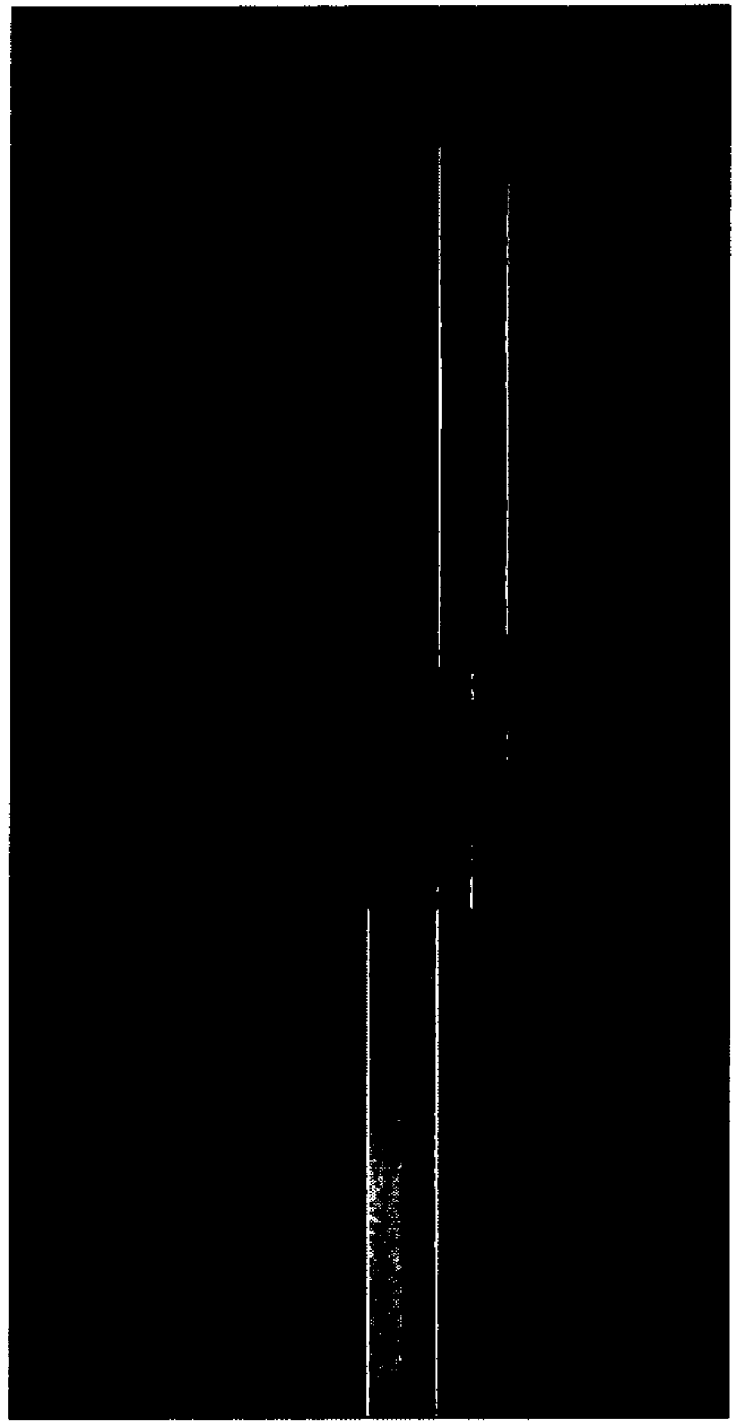
FIG. 26 is a diagram illustrating an image obtained by applying conventional class classification adaptation processing.

FIG. 26 is a diagram illustrating an image obtained by applying conventional class classification adaptation processing to the input image shown in FIG. 25. Now, class classification processing is made up of class classification processing and adaptation processing, wherein the data is classified based on the nature thereof by the class classification adaptation processing, and subjected to adaptation processing for each class. In the adaptation processing, a low-image quality or standard image quality image, for example, is converted into a high image quality image by being subjected to mapping (mapping) using a predetermined tap coefficient.

That is to say, with adaptation processing, first data is converted into second data by being mapped (mapping) using a predetermined tap coefficient.

Now, adaptation processing will be described with regard to a mapping method using the tap coefficient, wherein for example, a linear combination model is used, and also a low-resolution image or standard resolution SD (Standard Definition) image obtained by filtering a high-resolution HD (High Definition) image with a low-pass filter is used as the first data, and the HD image used for obtaining the SD image is used as the second data.

Now, under the above-described conditions, an HD pixel y making up the HD image can be obtained with the following linear expression (linear combination) using multiple SD pixels extracted from SD pixels making up the SD image, as a prediction tap for predicting the HD image, and the tap coefficient.

$$y = \sum_{n=1}^{N} w_n x_n \tag{24}$$

Wherein, in Expression (24), $x_n$ represents the pixel value of the n'th pixel in the SD image, making up a prediction tap regarding the HD pixel y, and $w_n$ represents the n'th tap coefficient to be multiplied by (the pixel value of) the n'th SD pixel. Note that in Expression (24), a prediction tap is made up of an N number of SD pixels $x_1, x_2, \ldots, x_N$.

Now, the pixel value y of the HD pixel can be obtained by a quadratic expression or higher, instead of the linear expression shown in Expression (24).

Now, in the HD image, saying that $y_k$ represents the true value of (the pixel value of) the k'th HD pixel, and $y_k'$ represents a prediction value of the true value $y_k$ obtained by the Expression (24), the prediction error $e_k$ thereof is as expressed in the following Expression, for example.

$$e_k = y_k - y_k' \tag{25}$$

The prediction value $y_k'$ in Expression (25) is obtained according to Expression (24), so substituting the $y_k'$ in Expression (25) according Expression (24) yields the following Expression.

$$e_k = y_k - \left( \sum_{n=1}^{N} w_n x_{n,k} \right) \tag{26}$$

Wherein, in Expression (26), $X_{n,k}$ represents the n'th SD pixel making up the prediction tap for the k'th HD pixel.

While a tap coefficient $w_n$ wherein the prediction error $e_k$ is 0 in Expression (26) is optimal for predicting the HD pixel, obtaining such a tap coefficient $w_n$ for all HD pixels is generally difficult.

Accordingly, as a rule representing the tap coefficient $w_n$ as being optimal, employing the least-square method for example, means that the optimal tap coefficient $w_n$ can be obtained by minimizing the summation E of squared errors represented in the following Expression for example, as a statistical error.

$$E = \sum_{k=1}^{K} e_k^2 \tag{27}$$

Wherein, in Expression (27), K represents the number of samples of sets made up of an HD pixel $y_k$ and SD pixels $X_{1,k}$, $X_{2,k}, \ldots, X_{N,k}$ making up a prediction tap regarding that HD pixel $y_k$.

The tap coefficient $w_n$ which makes the summation E of squared errors in Expression (27) smallest (the minimum) is such that the partial differentiation of the summation E by the tap coefficient $w_n$ yields 0. Accordingly, the following Expression must be satisfied.

$$\frac{\partial E}{\partial w_n} = e_1 \frac{\partial e_1}{\partial w_n} + e_2 \frac{\partial e_2}{\partial w_n} + \ldots + e_k \frac{\partial e_{k2}}{\partial w_n} = 0 \tag{28}$$

$$(n = 1, 2, \ldots, N)$$

Now, partial differentiation of the above Expression (26) by the tap coefficient $w_n$ yields the following Expression.

$$\frac{\partial e_k}{\partial w_1} = -x_{1,k}, \frac{\partial e_k}{\partial w_2} \tag{29}$$

$$= -x_{2,k}, \ldots, \frac{\partial e_k}{\partial w_N}$$

$$= -x_{N,k}, (k = 1, 2, \ldots, K)$$

Expressions (28) and (29) yield the following Expression.

$$\sum_{k=1}^{k} e_k x_{1,k} = 0, \sum_{k=1}^{k} e_k x_{2,k} = 0, \ldots \sum_{k=1}^{k} e_k x_{N,k} = 0 \tag{30}$$

Substituting Expression (26) for $e_k$ in Expression (30) allows Expression (30) to be expressed in the form of the normal equation in Expression (31).

$$\begin{bmatrix} \left(\sum_{k=1}^{k} x_{1,k} x_{1,k}\right) & \left(\sum_{k=1}^{k} x_{1,k} x_{2,k}\right) & \cdots & \left(\sum_{k=1}^{k} x_{1,k} x_{N,k}\right) \\ \left(\sum_{k=1}^{k} x_{2,k} x_{1,k}\right) & \left(\sum_{k=1}^{k} x_{2,k} x_{2,k}\right) & \cdots & \left(\sum_{k=1}^{k} x_{2,k} x_{N,k}\right) \\ \vdots & \vdots & \ddots & \vdots \\ \left(\sum_{k=1}^{k} x_{N,k} x_{1,k}\right) & \left(\sum_{k=1}^{k} x_{N,k} x_{2,k}\right) & \cdots & \left(\sum_{k=1}^{k} x_{N,k} x_{N,k}\right) \end{bmatrix} \begin{bmatrix} w_1 \\ w_2 \\ \vdots \\ w_N \end{bmatrix} = \begin{bmatrix} \left(\sum_{k=1}^{k} x_{1,k} y_k\right) \\ \left(\sum_{k=1}^{k} x_{2,k} y_k\right) \\ \vdots \\ \left(\sum_{k=1}^{k} x_{N,k} y_k\right) \end{bmatrix} \tag{31}$$

Preparing a certain number of sets of the HD pixel $y_k$ and SD pixels $x_{n,k}$ allows as many of the normal equations in Expression (31) to be formulated as the number of tap coefficients $w_n$ to be obtained, and solving Expression (31) allows optimal tap coefficients $w_n$ to be obtained. Note that sweeping (Gauss-Jordan elimination) or the like, for example, can be used for solving Expression (31).

As described above, adaptation processing involves taking a great number of HD pixels $y_1, y_2, \ldots, y_K$ as tutor data to serve as a tutor for learning for tap coefficients, and also taking SD pixels $X_{1,k}, X_{2,k}, \ldots X_{N,k}$ making up a prediction tap regarding each HD pixel $y_k$ as student data to serve as a student for learning for tap coefficients, and solving Expression (31), thereby performing learning for obtaining an optimal tap coefficient $w_n$, and further using the optimal tap coefficient $w_n$ to perform mapping (conversion) of an SD image into an HD image according to Expression (24).

Now, for the SD pixels $X_{1,k}, X_{2,k}, \ldots, X_{N,k}$ making up the prediction tap regarding the HD pixels $y_k$, an SD pixel close to a position on the SD image corresponding to the HD pixel $y_k$, either spatially or temporally, can be used.

Also, with class classification adaptation processing, learning of the tap coefficient $w_n$ and mapping using the tap coefficient $w_n$ are performed by class. With class classification adaptation processing, class classification processing is performed with regard to the HD pixel $y_k$ of interest, and learning of the tap coefficient $w_n$ and mapping using the tap coefficient $w_n$ are performed for each class obtained by the class classification processing.

An example of class classification processing with regard to the HD pixel $y_k$ is to extract multiple SD pixels from the SD image to serve as a class tap used for class classification of the HD pixel $y_k$, and to perform M-bit ADRC (Adaptive Dynamic Range Coding) using the class tap made up of the multiple SD pixels.

In M-bit ADRC processing, the maximum value MAX and minimum value MIN of the SD pixels making up the class tap are detected, DR=MAX−MIN is set as a local dynamic range, and the SD pixels making up the class tap are re-quantized into K bits, based on this dynamic range DR. That is to say, the minimum value MIN is subtracted from the SD pixels making up the class tap, and the subtraction value is divided by $DR/2^K$ (quantized). Accordingly, in the event that a class tap is subjected to 1-bit ADRC processing for example, each SD pixel making up the class tap is one bit. In this case, a bit string obtained by arraying in a predetermined order the 1-bit pixel values regarding each SD pixel making up the class tap that have been obtained as described above is output as ADRC code, and the ADRC code is taken as a class code representing the class.

Note that class classification adaptation processing differs from simple interpolation processing or the like, for example, in that components not included in the SD image but are included in the HD image are reproduced. That is to say, with class classification adaptation processing, it would seem by looking at Expression (24) alone that this is the same as interpolation processing using a so-called interpolation filter, but the tap coefficient $w_n$ which is equivalent to the tap coefficient of the interpolation filter has been obtained by learning using an HD image serving as tutor data and an SD image serving as student data, so the component contained in the HD image can be reproduced.

Now, tap coefficients $w_n$ which perform various types of conversion can be obtained in the tap coefficient $w_n$ learning, depending on what sort of combination of tutor data y and student data x is employed.

That is to say, in a case of taking a high-resolution HD image as the tutor data y and taking an SD image wherein the resolution of the HD image has been deteriorated as the student data x, for example, a tap coefficient $w_n$ for mapping an image into an image with the resolution improved, can be obtained. Further, in a case of taking an HD image as the tutor data y and taking an SD image wherein the number of pixels of the HD image has been reduced as the student data x, for example, a tap coefficient $w_n$ for mapping an image into an image with an increased number of pixels making up the image, can be obtained.

FIG. 26 is an image obtained by subjecting the input image shown in FIG. 25 to mapping by the class classification adaptation processing such as described above. It can be understood in the image shown in FIG. 26 that the image of the fine line is different to that of the original image in FIG. 24.

Figure 27:
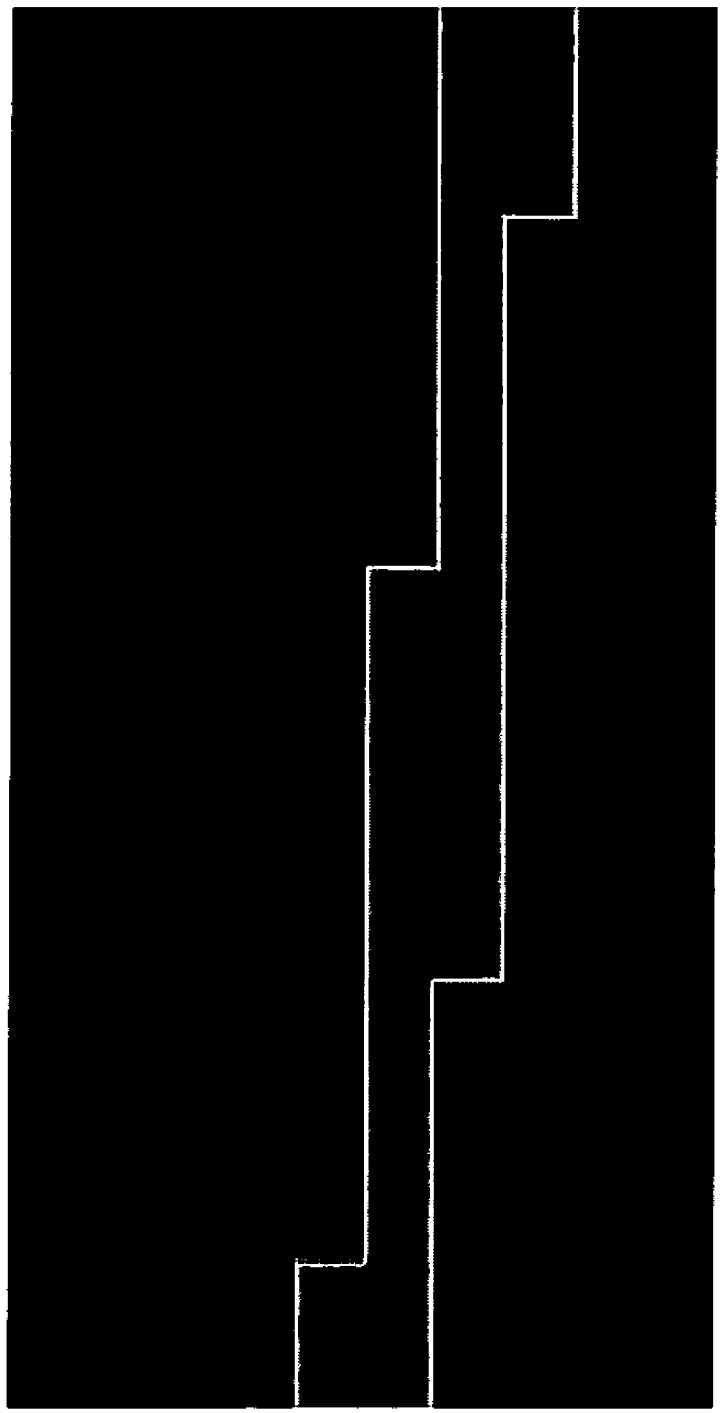
FIG. 27 is a diagram illustrating results of detecting a fine line region.

FIG. 27 is a diagram illustrating the results of detecting the fine line regions from the input image shown in the example in FIG. 25, by the data continuity detecting unit 101. In FIG. 27, the white region indicates the fine line region, i.e., the region wherein the arc shapes shown in FIG. 10 are arrayed.

Figure 28:
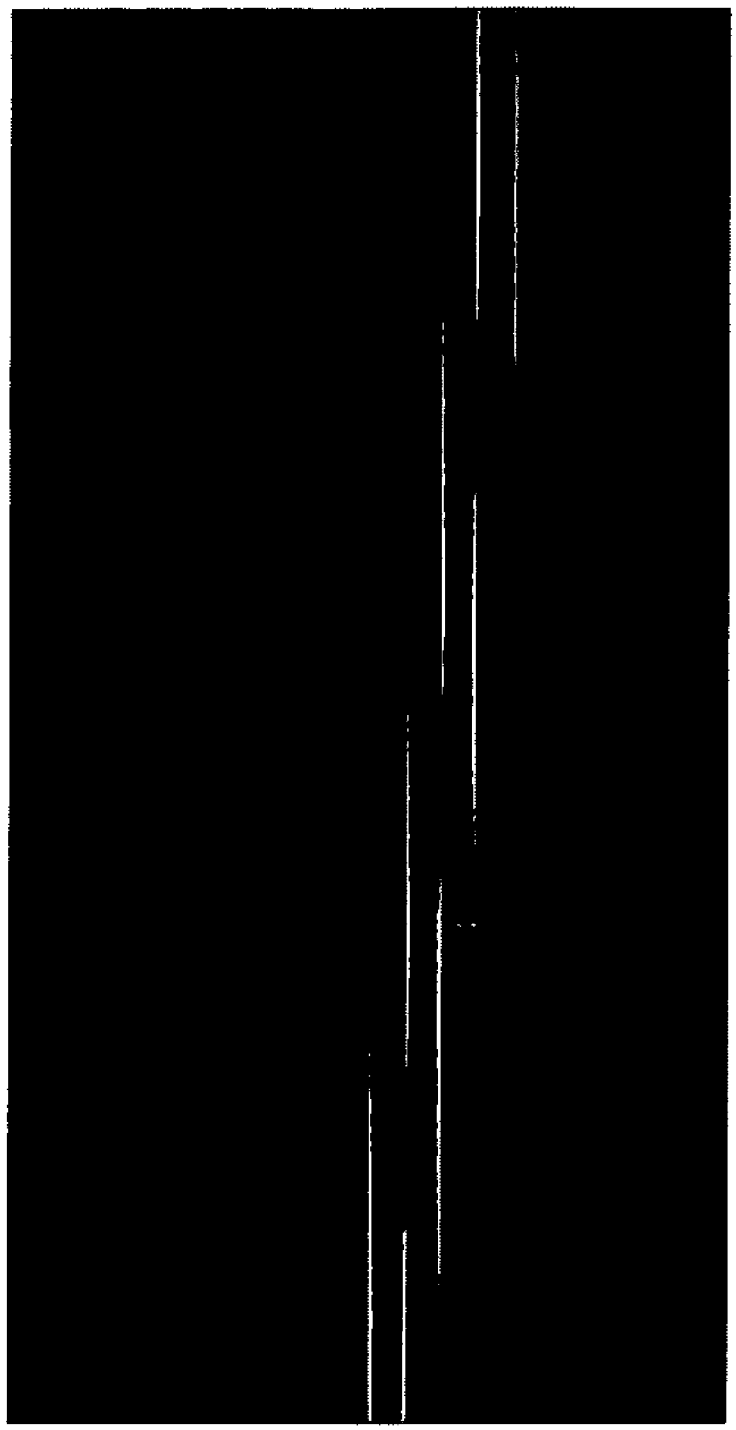
FIG. 28 is a diagram illustrating an example of an output image output from the signal processing device 4.

FIG. 28 is a diagram illustrating an example of the output image obtained by performing signal processing at the signal processing device 4, with the image shown in FIG. 25 as the input image. As shown in FIG. 28, the signals processing device 4 yields an image closer to the fine line image of the original image shown in FIG. 24.

Figure 29:
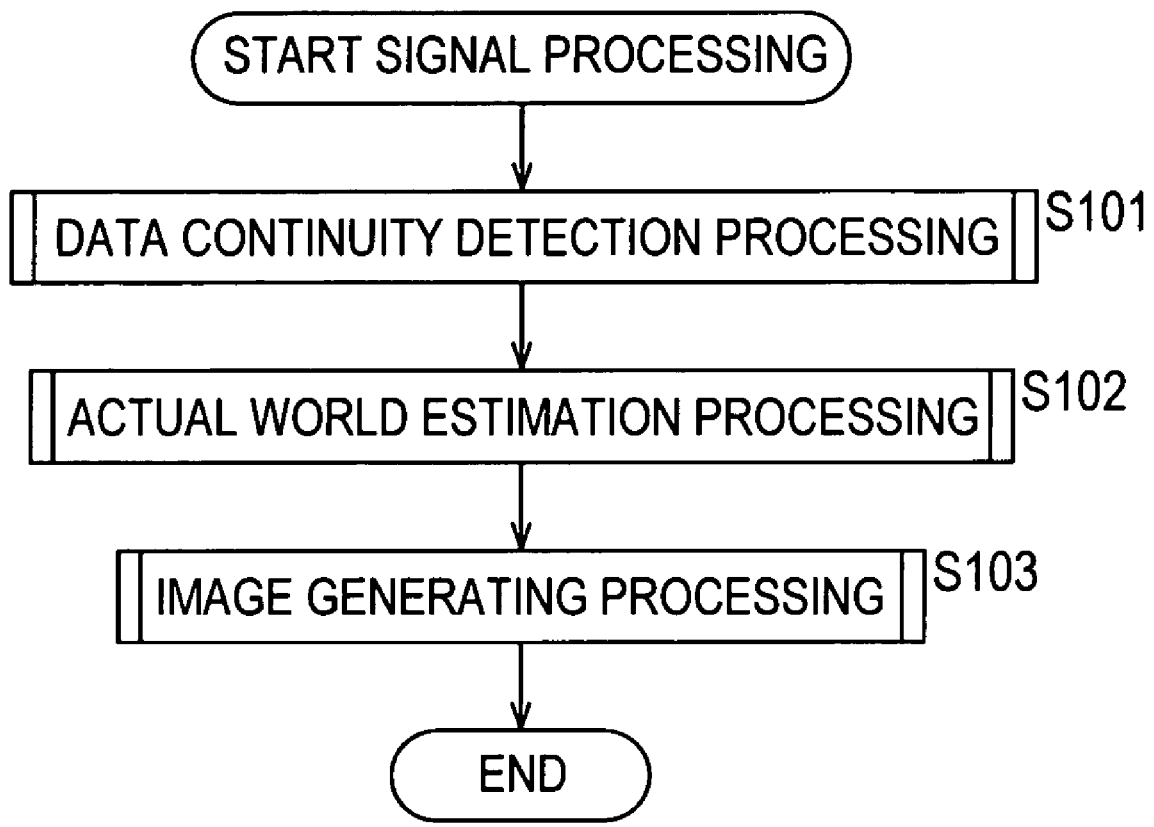
FIG. 29 is a flowchart for describing signal processing with the signal processing device 4.

FIG. 29 is a flowchart for describing the processing of signals with the signal processing device 4.

In step S101, the data continuity detecting unit 101 executes the processing for detecting continuity. The data continuity detecting unit 101 detects data continuity contained in the input image which is the data 3, and supplies the data continuity information indicating the detected data continuity to the actual world estimating unit 102 and the image generating unit 103.

The data continuity detecting unit 101 detects the continuity of data corresponding to the continuity of the signals of the actual world. In the processing in step S101, the continuity of data detected by the data continuity detecting unit 101 is either part of the continuity of the image of the actual world 1 contained in the data 3, or continuity which has changed from the continuity of the signals of the actual world 1.

For example, the data continuity detecting unit 101 detects the data continuity by detecting a region having a constant characteristic in a predetermined dimensional direction. Also, for example, the data continuity detecting unit 101 detects data continuity by detecting angle (gradient) in the spatial direction indicating the an array of the same shape.

Details of the continuity detecting processing in step S101 will be described later.

Note that the data continuity information can be used as features, indicating the characteristics of the data 3.

In step S102, the actual world estimating unit 102 executes processing for estimating the actual world. That is to say, the actual world estimating unit 102 estimates the signals of the actual world based on the input image and the data continuity information supplied from the data continuity detecting unit 101. In the processing in step S102 for example, the actual world estimating unit 102 estimates the signals of the actual world 1 by predicting a model 161 approximating (describing) the actual world 1. The actual world estimating unit 102 supplies the actual world estimation information indicating the estimated signals of the actual world 1 to the image generating unit 103.

For example, the actual world estimating unit 102 estimates the actual world 1 signals by predicting the width of the linear object. Also, for example, the actual world estimating unit 102 estimates the actual world 1 signals by predicting a level indicating the color of the linear object.

Details of processing for estimating the actual world in step S102 will be described later.

Note that the actual world estimation information can be used as features, indicating the characteristics of the data 3.

In step S103, the image generating unit 103 performs image generating processing, and the processing ends. That is to say, the image generating unit 103 generates an image based on the actual world estimation information, and outputs the generated image. Or, the image generating unit 103 generates an image based on the data continuity information and actual world estimation information, and outputs the generated image.

For example, in the processing in step S103, the image generating unit 103 integrates the estimated real world light in the spatial direction, based on the actual world estimated information, thereby generating an image with higher resolution in the spatial direction in comparison with the input image, and outputs the generated image. For example, the image generating unit 103 integrates estimated real world light in the time-space direction, based on the actual world estimated information, hereby generating an image with higher resolution in the time direction and the spatial direction in comparison with the input image, and outputs the generated image. The details of the image generating processing in step S103 will be described later.

Thus, the signal processing device 4 detects data continuity from the data 3, and estimates the actual world 1 from the detected data continuity. The signal processing device 4 then generates signals closer approximating the actual world 1 based on the estimated actual world 1.

As described above, in the event of performing the processing for estimating signals of the real world, accurate and highly-precise processing results can be obtained.

Also, in the event that first signals which are real world signals having first dimensions are projected, the continuity of data corresponding to the lost continuity of the real world signals is detected for second signals of second dimensions, having a number of dimensions fewer than the first dimensions, from which a part of the continuity of the signals of the real world has been lost, and the first signals are estimated by estimating the lost real world signals continuity based on the detected data continuity, accurate and highly-precise processing results can be obtained as to the events in the real world.

Next, the details of the configuration of the data continuity detecting unit 101 will be described.

Figure 30:
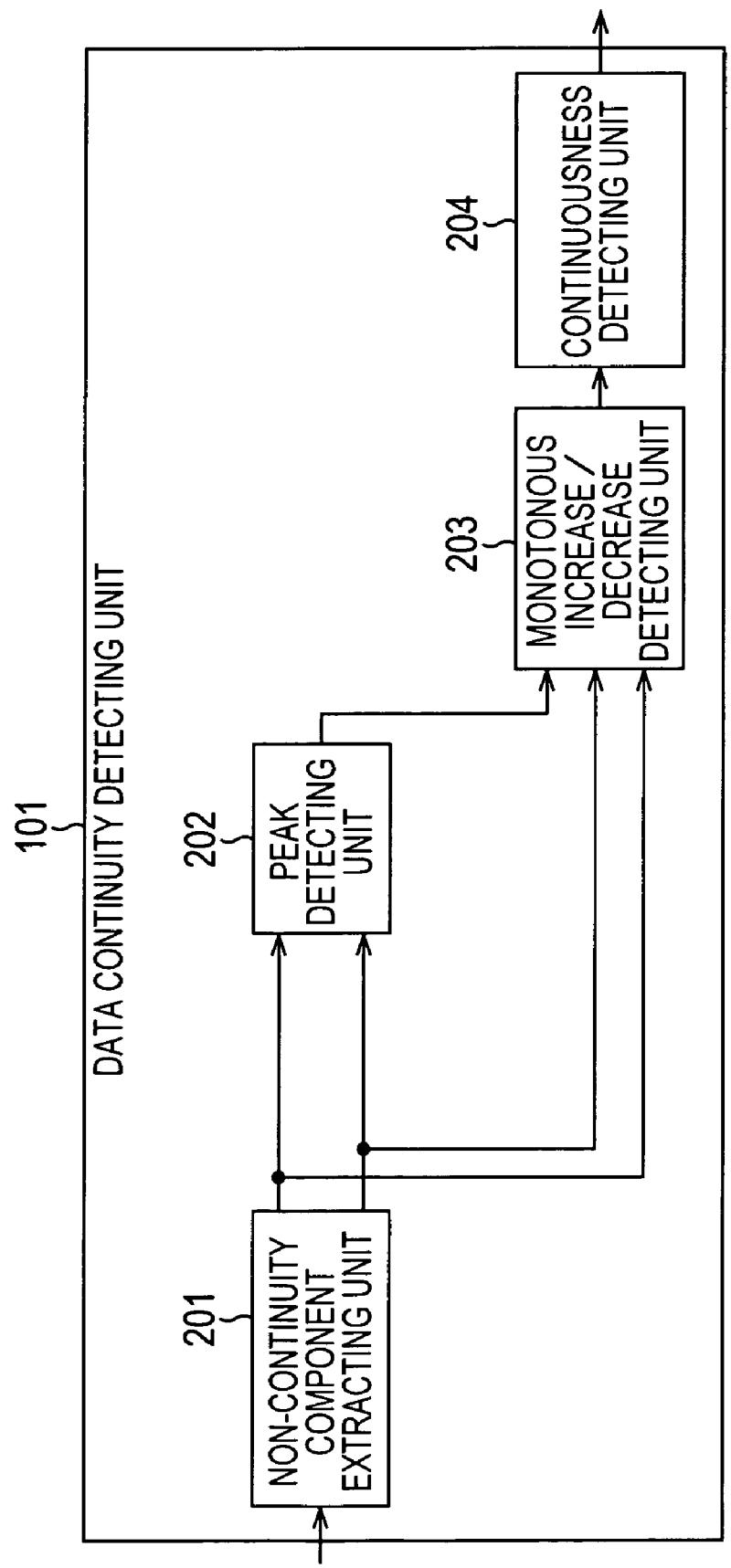
FIG. 30 is a block diagram illustrating the configuration of a data continuity detecting unit 101.

FIG. 30 is a block diagram illustrating the configuration of the data continuity detecting unit 101.

Upon taking an image of an object which is a fine line, the data continuity detecting unit 101, of which the configuration is shown in FIG. 30, detects the continuity of data contained in the data 3, which is generated from the continuity in that the cross-sectional shape which the object has is the same. That is to say, the data continuity detecting unit 101 of the configuration shown in FIG. 30 detects the continuity of data contained in the data 3, which is generated from the continuity in that the change in level of light as to the change in position in the direction orthogonal to the length-wise direction is the same at an arbitrary position in the length-wise direction, which the image of the actual world 1 which is a fine line, has.

More specifically, the data continuity detecting unit 101 of which configuration is shown in FIG. 30 detects the region where multiple arc shapes (half-disks) having a predetermined length are arrayed in a diagonally-offset adjacent manner, within the data 3 obtained by taking an image of a fine line with the sensor 2 having spatial integration effects.

The data continuity detecting unit 101 extracts the portions of the image data (hereafter referred to as con-continuity component) other than the portion of the image data where the image of the fine line having data continuity has been projected (hereafter, the portion of the image data where the image of the fine line having data continuity has been projected will also be called continuity component, and the other portions will be called non-continuity component), from an input image which is the data 3, detects the pixels where the image of the fine line of the actual world 1 has been projected, from the extracted non-continuity component and the input image, and detects the region of the input image made up of pixels where the image of the fine line of the actual world 1 has been projected.

A non-continuity component extracting unit 201 extracts the non-continuity component from the input image, and supplies the non-continuity component information indicating the extracted non-continuity component to a peak detecting unit 202 and a monotonous increase/decrease detecting unit 203 along with the input image.

Figure 31:
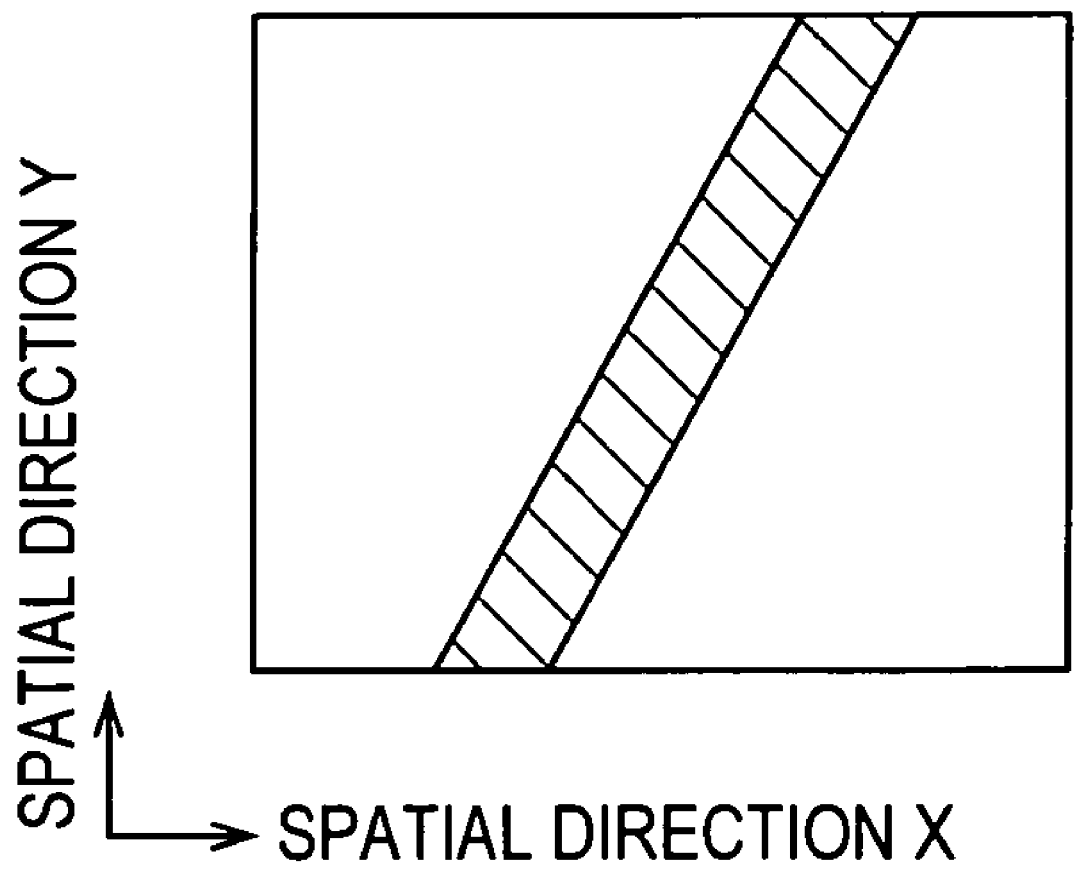
FIG. 31 is a diagram illustrating an image in the actual world 1 with a fine line in front of the background.
Figure 32:
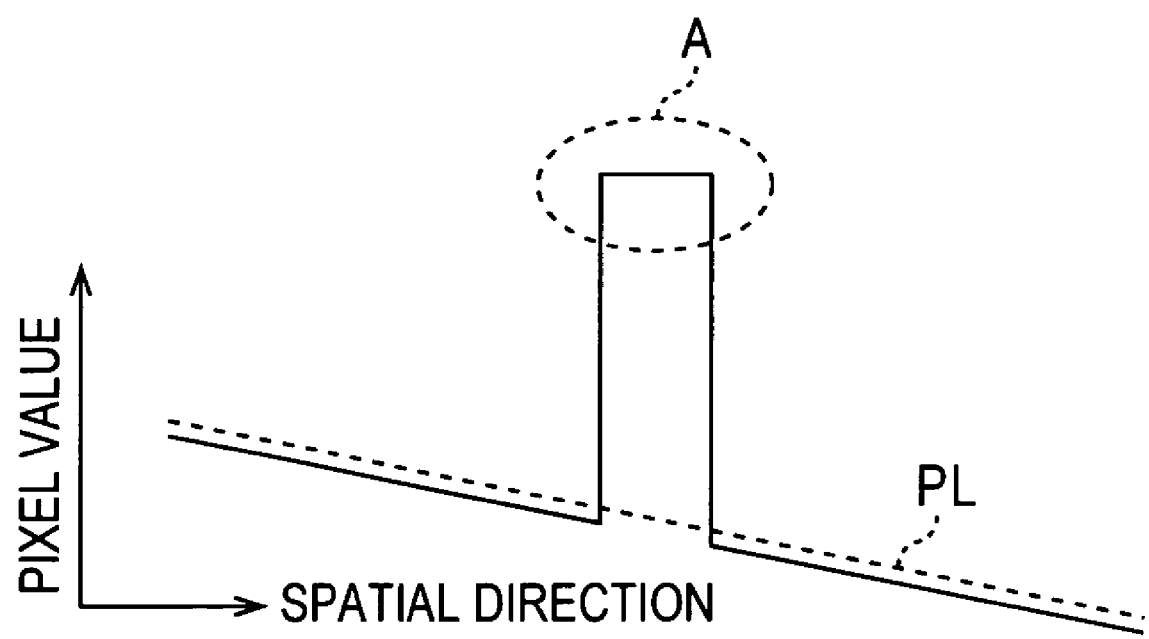
FIG. 32 is a diagram for describing approximation of a background with a plane.

For example, as shown in FIG. 31, in the event that an image of the actual world 1 wherein a fine line exists in front of a background with an approximately constant light level is projected on the data 3, the non-continuity component extracting unit 201 extracts the non-continuity component which is the background, by approximating the background in the input image which is the data 3, on a plane, as shown in FIG. 32. In FIG. 32, the solid line indicates the pixel values of the data 3, and the dotted line illustrates the approximation values indicated by the plane approximating the background. In FIG. 32, A denotes the pixel value of the pixel where the image of the fine line has been projected, and the PL denotes the plane approximating the background.

In this way, the pixel values of the multiple pixels at the portion of the image data having data continuity are discontinuous as to the non-continuity component.

The non-continuity component extracting unit 201 detects the discontinuous portion of the pixel values of the multiple pixels of the image data which is the data 3, where an image which is light signals of the actual world 1 has been projected and a part of the continuity of the image of the actual world 1 has been lost.

Details of the processing for extracting the non-continuity component with the non-continuity component extracting unit 201 will be described later.

The peak detecting unit 202 and the monotonous increase/decrease detecting unit 203 remove the non-continuity component from the input image, based on the non-continuity component information supplied from the non-continuity component extracting unit 201. For example, the peak detecting unit 202 and the monotonous increase/decrease detecting unit 203 remove the non-continuity component from the input image by setting the pixel values of the pixels of the input image where only the background image has been projected, to 0. Also, for example, the peak detecting unit 202 and the monotonous increase/decrease detecting unit 203 remove the non-continuity component from the input image by subtracting values approximated by the plane PL from the pixel values of each pixel of the input image.

Since the background can be removed from the input image, the peak detecting unit 202 through continuousness detecting unit 204 can process only the portion of the image data where the fine line has be projected, thereby further simplifying the processing by the peak detecting unit 202 through the continuousness detecting unit 204.

Note that the non-continuity component extracting unit 201 may supply image data wherein the non-continuity component has been removed from the input image, to the peak detecting unit 202 and the monotonous increase/decrease detecting unit 203.

In the example of processing described below, the image data wherein the non-continuity component has been removed from the input image, i.e., image data made up from only pixel containing the continuity component, is the object.

Now, description will be made regarding the image data upon which the fine line image has been projected, which the peak detecting unit 202 through continuousness detecting unit 204 are to detect.

Figure 33:
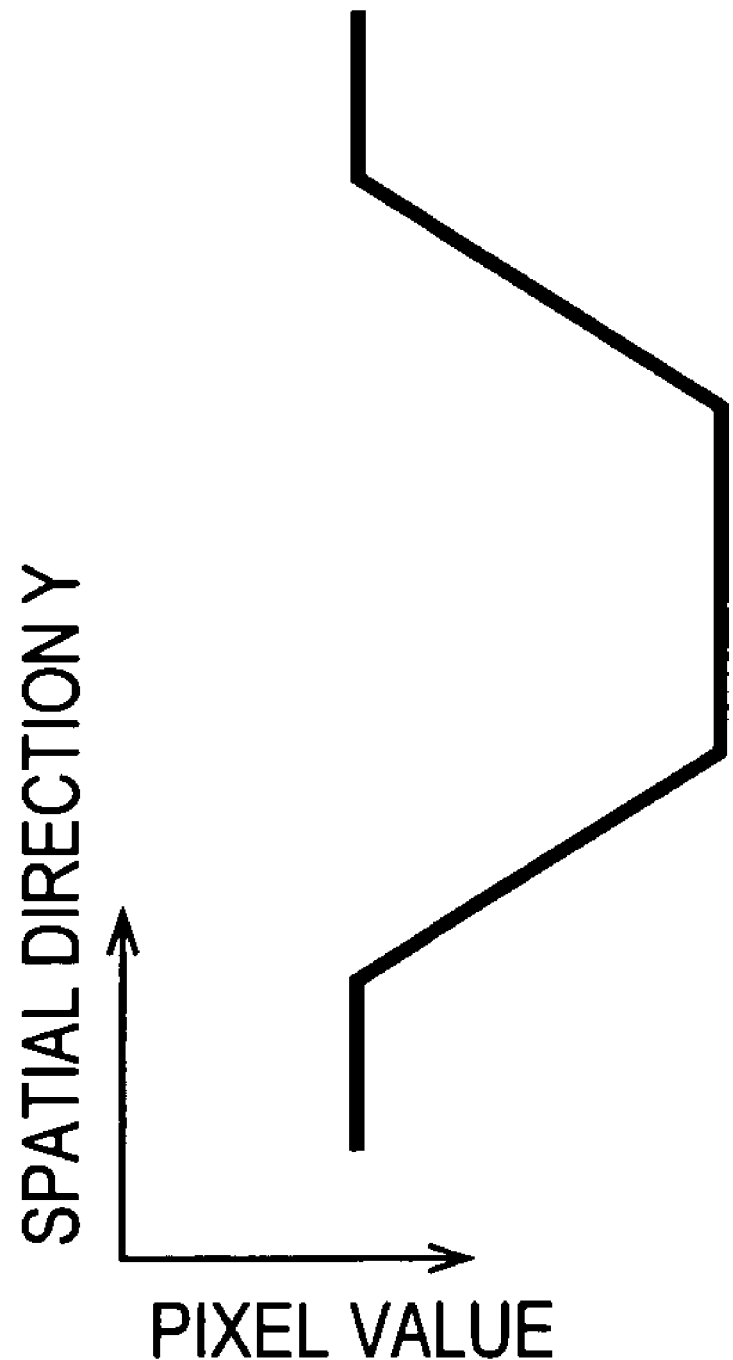
FIG. 33 is a diagram illustrating the cross-sectional shape of image data regarding which the image of a fine line has been projected.
Figure 34:
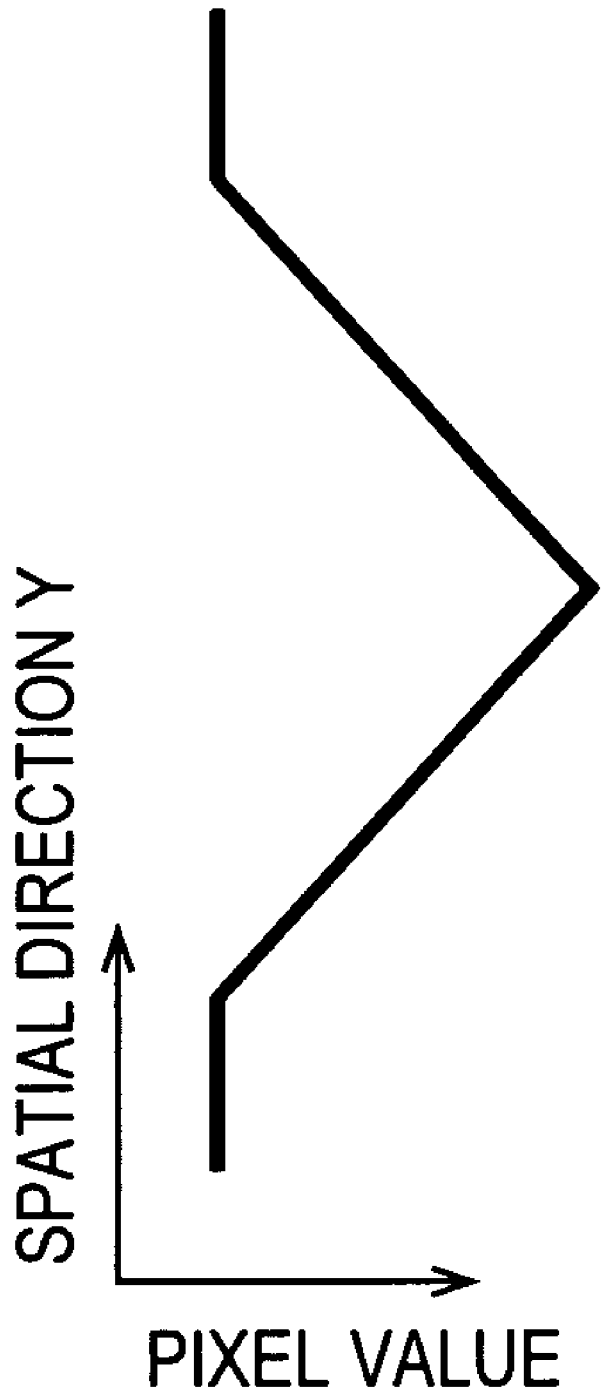
FIG. 34 is a diagram illustrating the cross-sectional shape of image data regarding which the image of a fine line has been projected.
Figure 35:
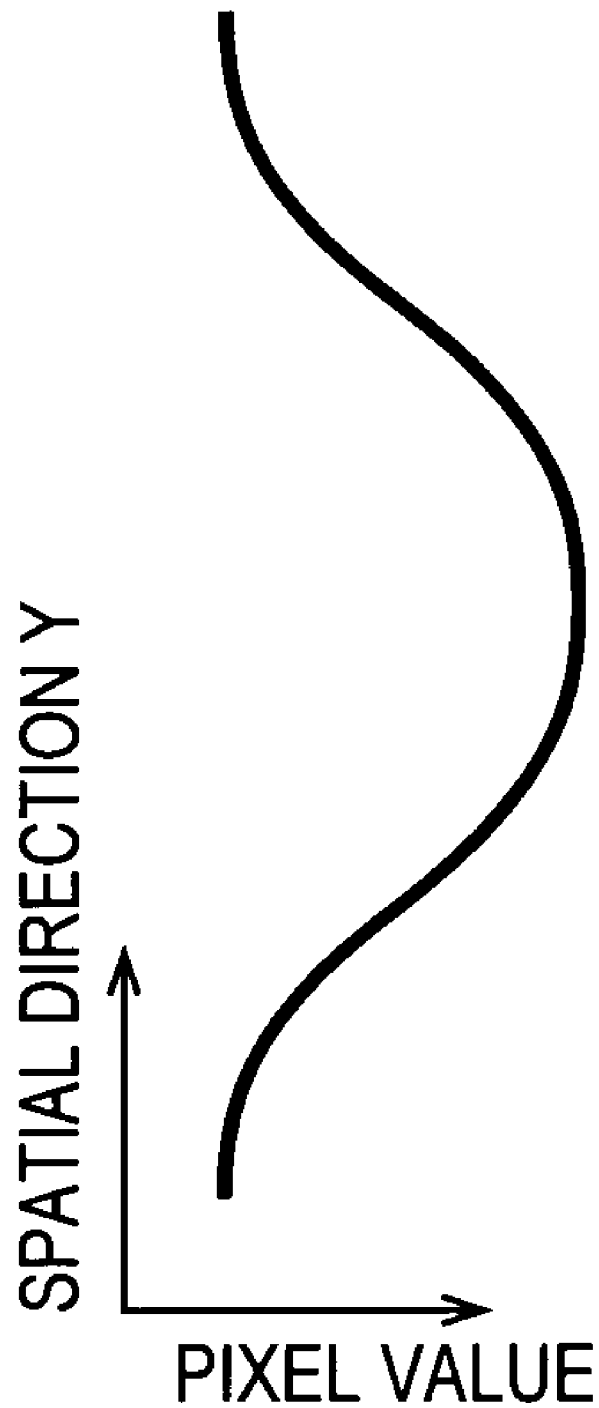
FIG. 35 is a diagram illustrating the cross-sectional shape of image data regarding which the image of a fine line has been projected.

In the event that there is no optical LPF, the cross-dimensional shape in the spatial direction Y (change in the pixel values as to change in the position in the spatial direction) of the image data upon which the fine line image has been projected as shown in FIG. 31 can be thought to be the trapezoid shown in FIG. 33, or the triangle shown in FIG. 34, from the spatial; integration effects of the image sensor which is the sensor 2. However, ordinary image sensors have an optical LPF with the image sensor obtaining the image which has passed through the optical LPF and projects the obtained image on the data 3, so in reality, the cross-dimensional shape of the image data with fine lines in the spatial direction Y has a shape resembling Gaussian distribution, as shown in FIG. 35.

The peak detecting unit 202 through continuousness detecting unit 204 detect a region made up of pixels upon which the fine line image has been projected wherein the same cross-sectional shape (change in the pixel values as to change in the position in the spatial direction) is arrayed in the vertical direction in the screen at constant intervals, and further, detect a region made up of pixels upon which the fine line image has been projected which is a region having data continuity, by detecting regional connection corresponding to the length-wise direction of the fine line of the actual world 1. That is to say, the peak detecting unit 202 through continuousness detecting unit 204 detect regions wherein arc shapes (half-disc shapes) are formed on a single vertical row of pixels in the input image, and determine whether or not the detected regions are adjacent in the horizontal direction, thereby detecting connection of regions where arc shapes are formed, corresponding to the length-wise direction of the fine line image which is signals of the actual world 1.

Also, the peak detecting unit 202 through continuousness detecting unit 204 detect a region made up of pixels upon which the fine line image has been projected wherein the same cross-sectional shape is arrayed in the horizontal direction in the screen at constant intervals, and further, detect a region made up of pixels upon which the fine line image has been projected which is a region having data continuity, by detecting connection of detected regions corresponding to the length-wise direction of the fine line of the actual world 1. That is to say, the peak detecting unit 202 through continuousness detecting unit 204 detect regions wherein arc shapes are formed on a single horizontal row of pixels in the input image, and determine whether or not the detected regions are adjacent in the vertical direction, thereby detecting connection of regions where arc shapes are formed, corresponding to the length-wise direction of the fine line image, which is signals of the actual world 1.

First, description will be made regarding processing for detecting a region of pixels upon which the fine line image has been projected wherein the same arc shape is arrayed in the vertical direction in the screen at constant intervals.

The peak detecting unit 202 detects a pixel having a pixel value greater than the surrounding pixels, i.e., a peak, and supplies peak information indicating the position of the peak to the monotonous increase/decrease detecting unit 203. In the event that pixels arrayed in a single vertical direction row in the screen are the object, the peak detecting unit 202 compares the pixel value of the pixel position upwards in the screen and the pixel value of the pixel position downwards in the screen, and detects the pixel with the greater pixel value as the peak. The peak detecting unit 202 detects one or multiple peaks from a single image, e.g., from the image of a single frame.

A single screen contains frames or fields. This holds true in the following description as well.

For example, the peak detecting unit 202 selects a pixel of interest from pixels of an image of one frame which have not yet been taken as pixels of interest, compares the pixel value of the pixel of interest with the pixel value of the pixel above the pixel of interest, compares the pixel value of the pixel of interest with the pixel value of the pixel below the pixel of interest, detects a pixel of interest which has a greater pixel value than the pixel value of the pixel above and a greater pixel value than the pixel value of the pixel below, and takes the detected pixel of interest as a peak. The peak detecting unit 202 supplies peak information indicating the detected peak to the monotonous increase/decrease detecting unit 203.

There are cases wherein the peak detecting unit 202 does not detect a peak. For example, in the event that the pixel values of all of the pixels of an image are the same value, or in the event that the pixel values decrease in one or two directions, no peak is detected. In this case, no fine line image has been projected on the image data.

The monotonous increase/decrease detecting unit 203 detects a candidate for a region made up of pixels upon which the fine line image has been projected wherein the pixels are vertically arrayed in a single row as to the peak detected by the peak detecting unit 202, based upon the peak information indicating the position of the peak supplied from the peak detecting unit 202, and supplies the region information indicating the detected region to the continuousness detecting unit 204 along with the peak information.

More specifically, the monotonous increase/decrease detecting unit 203 detects a region made up of pixels having pixel values monotonously decreasing with reference to the peak pixel value, as a candidate of a region made up of pixels upon which the image of the fine line has been projected. Monotonous decrease means that the pixel values of pixels which are farther distance-wise from the peak are smaller than the pixel values of pixels which are closer to the peak.

Also, the monotonous increase/decrease detecting unit 203 detects a region made up of pixels having pixel values monotonously increasing with reference to the peak pixel value, as a candidate of a region made up of pixels upon which the image of the fine line has been projected. Monotonous increase means that the pixel values of pixels which are farther distance-wise from the peak are greater than the pixel values of pixels which are closer to the peak.

In the following, the processing regarding regions of pixels having pixel values monotonously increasing is the same as the processing regarding regions of pixels having pixel values monotonously decreasing, so description thereof will be omitted. Also, with the description regarding processing for detecting a region of pixels upon which the fine line image has been projected wherein the same arc shape is arrayed horizontally in the screen at constant intervals, the processing regarding regions of pixels having pixel values monotonously increasing is the same as the processing regarding regions of pixels having pixel values monotonously decreasing, so description thereof will be omitted.

For example, the monotonous increase/decrease detecting unit 203 obtains pixel values of each of the pixels in a vertical row as to a peak, the difference as to the pixel value of the pixel above, and the difference as to the pixel value of the pixel below. The monotonous increase/decrease detecting unit 203 then detects a region wherein the pixel value monotonously decreases by detecting pixels wherein the sign of the difference changes.

Further, the monotonous increase/decrease detecting unit 203 detects, from the region wherein pixel values monotonously decrease, a region made up of pixels having pixel values with the same sign as that of the pixel value of the peak, with the sign of the pixel value of the peak as a reference, as a candidate of a region made up of pixels upon which the image of the fine line has been projected.

For example, the monotonous increase/decrease detecting unit 203 compares the sign of the pixel value of each pixel with the sign of the pixel value of the pixel above and sign of the pixel value of the pixel below, and detects the pixel where the sign of the pixel value changes, thereby detecting a region of pixels having pixel values of the same sign as the peak within the region where pixel values monotonously decrease.

Thus, the monotonous increase/decrease detecting unit 203 detects a region formed of pixels arrayed in a vertical direction wherein the pixel values monotonously decrease as to the peak and have pixels values of the same sign as the peak.

Figure 36:
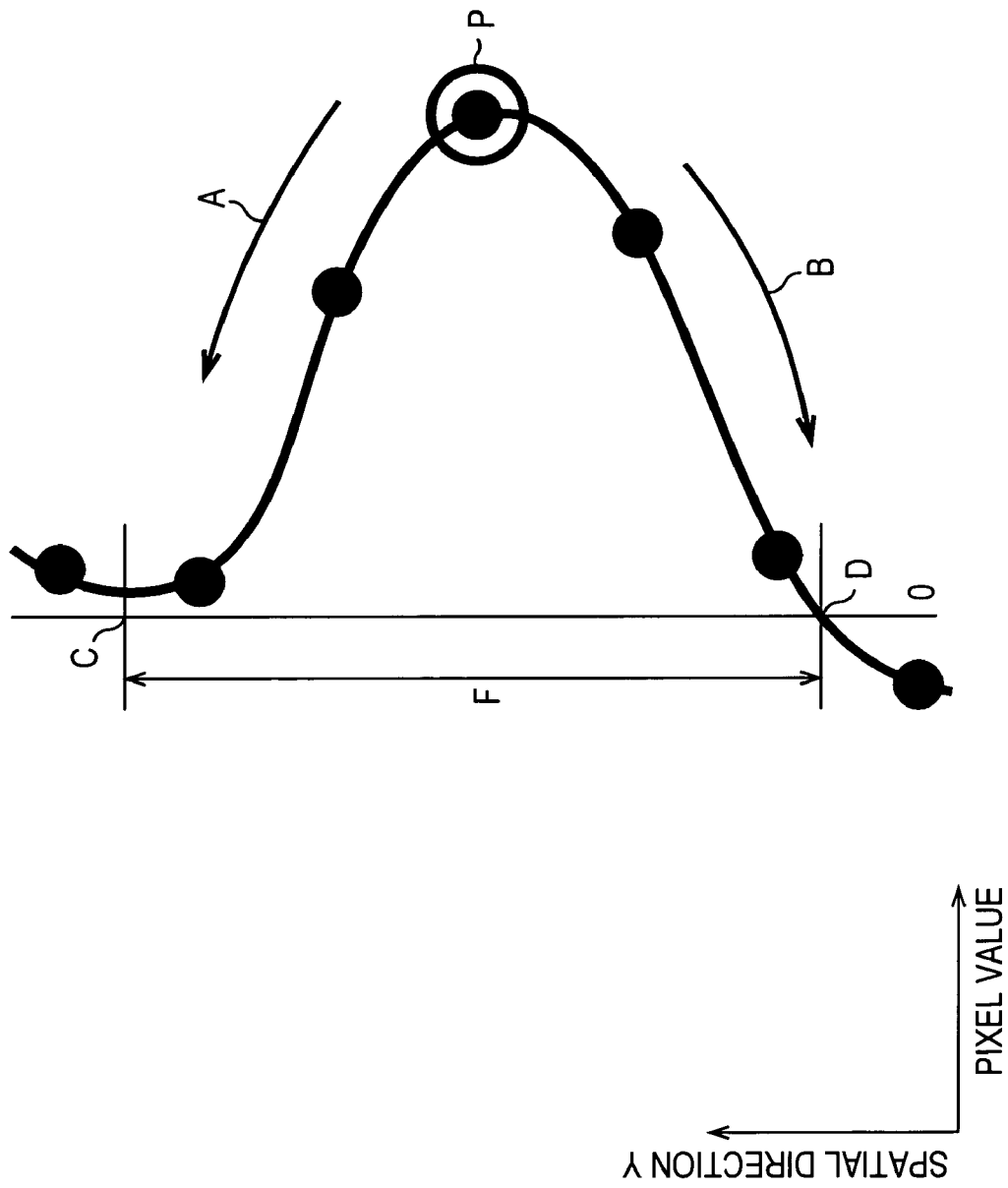
FIG. 36 is a diagram for describing the processing for detecting a peak and detecting of monotonous increase/decrease regions.

FIG. 36 is a diagram describing processing for peak detection and monotonous increase/decrease region detection, for detecting the region of pixels wherein the image of the fine line has been projected, from the pixel values as to a position in the spatial direction Y.

Figure 37:
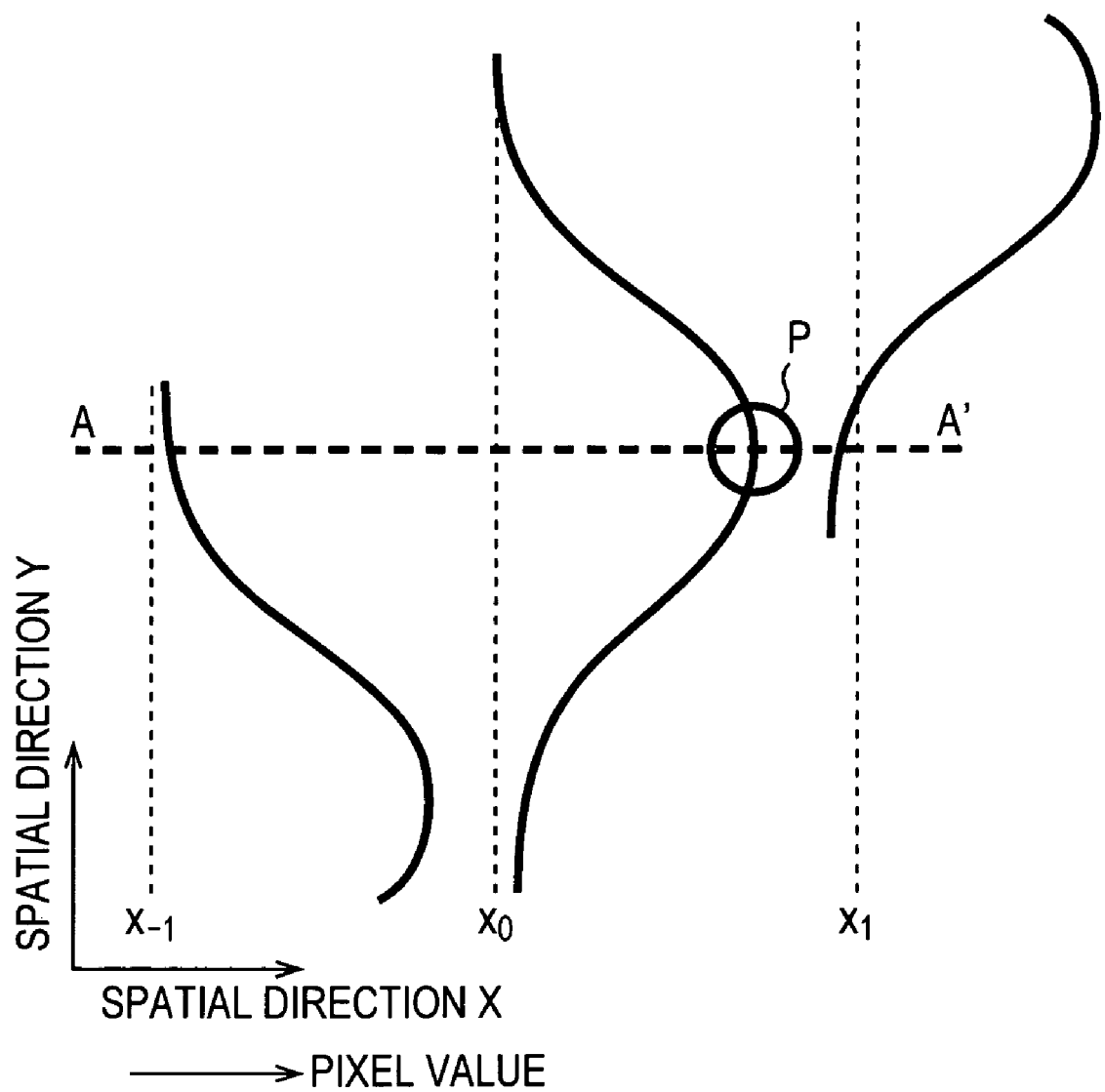
FIG. 37 is a diagram for describing the processing for detecting a fine line region wherein the pixel value of the peak exceeds a threshold, while the pixel value of the adjacent pixel is equal to or below the threshold value.
Figure 38:
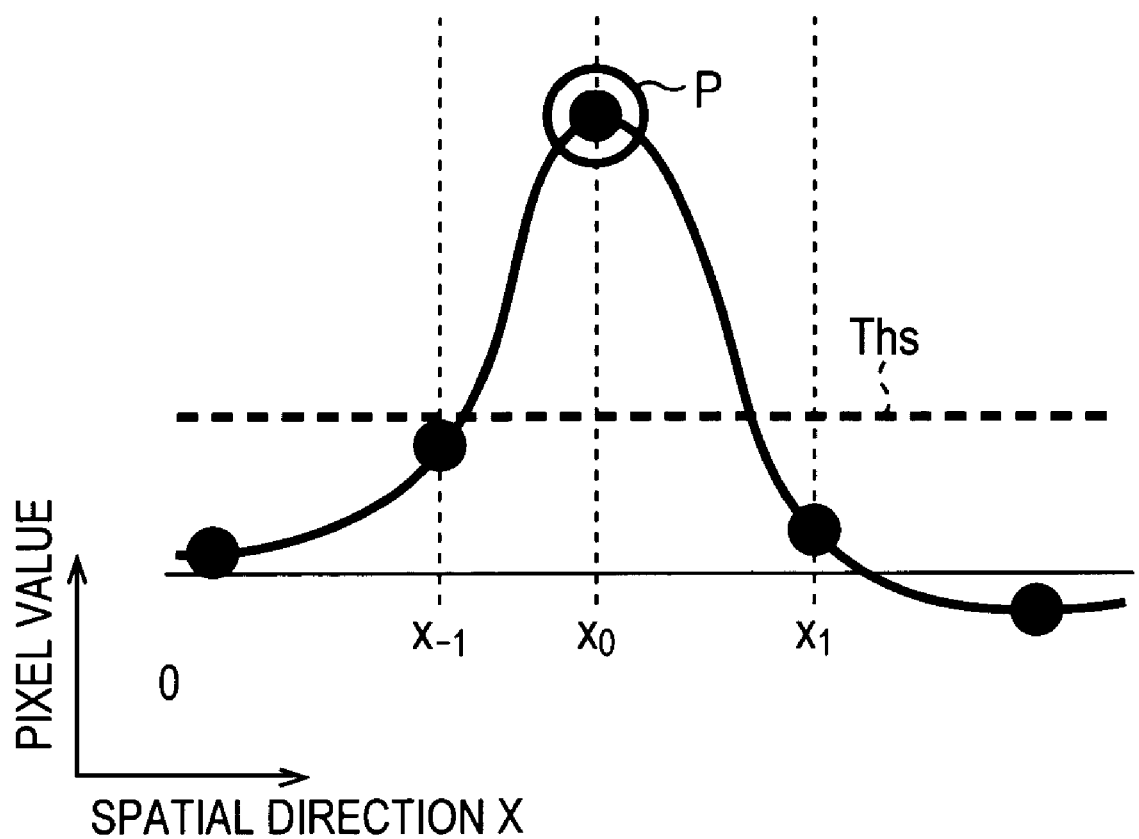
FIG. 38 is a diagram representing the pixel value of pixels arrayed in the direction indicated by dotted line AA' in FIG. 37.

In FIG. 36 through FIG. 38, P represents a peak. In the description of the data continuity detecting unit 101 of which the configuration is shown in FIG. 30, P represents a peak.

The peak detecting unit 202 compares the pixel values of the pixels with the pixel values of the pixels adjacent thereto in the spatial direction Y, and detects the peak P by detecting a pixel having a pixel value greater than the pixel values of the two pixels adjacent in the spatial direction Y.

The region made up of the peak P and the pixels on both sides of the peak P in the spatial direction Y is a monotonous decrease region wherein the pixel values of the pixels on both sides in the spatial direction Y monotonously decrease as to the pixel value of the peak P. In FIG. 36, the arrow denoted A and the arrow denoted by B represent the monotonous decrease regions existing on either side of the peak P.

The monotonous increase/decrease detecting unit 203 obtains the difference between the pixel values of each pixel and the pixel values of the pixels adjacent in the spatial direction Y, and detects pixels where the sign of the difference changes. The monotonous increase/decrease detecting unit 203 takes the boundary between the detected pixel where the sign of the difference changes and the pixel immediately prior thereto (on the peak P side) as the boundary of the fine line region made up of pixels where the image of the fine line has been projected.

In FIG. 36, the boundary of the fine line region which is the boundary between the pixel where the sign of the difference changes and the pixel immediately prior thereto (on the peak P side) is denoted by C.

Further, the monotonous increase/decrease detecting unit 203 compares the sign of the pixel values of each pixel with the pixel values of the pixels adjacent thereto in the spatial direction Y, and detects pixels where the sign of the pixel value changes in the monotonous decrease region. The monotonous increase/decrease detecting unit 203 takes the boundary between the detected pixel where the sign of the pixel value changes and the pixel immediately prior thereto (on the peak P side) as the boundary of the fine line region.

In FIG. 36, the boundary of the fine line region which is the boundary between the pixel where the sign of the pixel value changes and the pixel immediately prior thereto (on the peak P side) is denoted by D.

As shown in FIG. 36, the fine line region F made up of pixels where the image of the fine line has been projected is the region between the fine line region boundary C and the fine line region boundary D.

The monotonous increase/decrease detecting unit 203 obtains a fine line region F which is longer than a predetermined threshold value, from fine line regions F made up of such monotonous increase/decrease regions, i.e., a fine line region F having a greater number of pixels than the threshold value. For example, in the event that the threshold value is 3, the monotonous increase/decrease detecting unit 203 detects a fine line region F including 4 or more pixels.

Further, the monotonous increase/decrease detecting unit 203 compares the pixel value of the peak P, the pixel value of the pixel to the right side of the peak P, and the pixel value of the pixel to the left side of the peak P, from the fine line region F thus detected, each with the threshold value, detects a fine line pixel region F having the peak P wherein the pixel value of the peak P exceeds the threshold value, and wherein the pixel value of the pixel to the right side of the peak P is the threshold value or lower, and wherein the pixel value of the pixel to the left side of the peak P is the threshold value or lower, and takes the detected fine line region F as a candidate for the region made up of pixels containing the component of the fine line image.

In other words, determination is made that a fine line region F having the peak P, wherein the pixel value of the peak P is the threshold value or lower, or wherein the pixel value of the pixel to the right side of the peak P exceeds the threshold value, or wherein the pixel value of the pixel to the left side of the peak P exceeds the threshold value, does not contain the component of the fine line image, and is eliminated from candidates for the region made up of pixels including the component of the fine line image.

That is, as shown in FIG. 37, the monotonous increase/decrease detecting unit 203 compares the pixel value of the peak P with the threshold value, and also compares the pixel value of the pixel adjacent to the peak P in the spatial direction X (the direction indicated by the dotted line AA') with the threshold value, thereby detecting the fine line region F to which the peak P belongs, wherein the pixel value of the peak P exceeds the threshold value and wherein the pixel values of the pixel adjacent thereto in the spatial direction X are equal to or below the threshold value.

FIG. 38 is a diagram illustrating the pixel values of pixels arrayed in the spatial direction X indicated by the dotted line AA' in FIG. 37. The fine line region F to which the peak P belongs, wherein the pixel value of the peak P exceeds the threshold value $Th_s$ and wherein the pixel values of the pixel adjacent thereto in the spatial direction X are equal to or below the threshold value $Th_s$, contains the fine line component.

Note that an arrangement may be made wherein the monotonous increase/decrease detecting unit 203 compares the difference between the pixel value of the peak P and the pixel value of the background with the threshold value, taking the pixel value of the background as a reference, and also compares the difference between the pixel value of the pixels adjacent to the peak P in the spatial direction X and the pixel value of the background with the threshold value, thereby detecting the fine line region F to which the peak P belongs, wherein the difference between the pixel value of the peak P and the pixel value of the background exceeds the threshold value, and wherein the difference between the pixel value of the pixel adjacent in the spatial direction X and the pixel value of the background is equal to or below the threshold value.

The monotonous increase/decrease detecting unit 203 supplies to the continuousness detecting unit 204 monotonous increase/decrease region information indicating a region made up of pixels of which the pixel value monotonously decrease with the peak P as a reference and the sign of the pixel value is the same as that of the peak P, wherein the peak P exceeds the threshold value and wherein the pixel value of the pixel to the right side of the peak P is equal to or below the threshold value and the pixel value of the pixel to the left side of the peak P is equal to or below the threshold value.

In the event of detecting a region of pixels arrayed in a single row in the vertical direction of the screen where the image of the fine line has been projected, pixels belonging to the region indicated by the monotonous increase/decrease region information are arrayed in the vertical direction and include pixels where the image of the fine line has been projected. That is to say, the region indicated by the monotonous increase/decrease region information includes a region formed of pixels arrayed in a single row in the vertical direction of the screen where the image of the fine line has been projected.

In this way, the peak detecting unit 202 and the monotonous increase/decrease detecting unit 203 detects a continuity region made up of pixels where the image of the fine line has been projected, employing the nature that, of the pixels where the image of the fine line has been projected, change in the pixel values in the spatial direction Y approximates Gaussian distribution.

Of the region made up of pixels arrayed in the vertical direction, indicated by the monotonous increase/decrease region information supplied from the monotonous increase/decrease detecting unit 203, the continuousness detecting unit 204 detects regions including pixels adjacent in the horizontal direction, i.e., regions having similar pixel value change and duplicated in the vertical direction, as continuous regions, and outputs the peak information and data continuity information indicating the detected continuous regions. The data continuity information includes monotonous increase/decrease region information, information indicating the connection of regions, and so forth.

Arc shapes are aligned at constant intervals in an adjacent manner with the pixels where the fine line has been projected, so the detected continuous regions include the pixels where the fine line has been projected.

The detected continuous regions include the pixels where arc shapes are aligned at constant intervals in an adjacent manner to which the fine line has been projected, so the detected continuous regions are taken as a continuity region, and the continuousness detecting unit 204 outputs data continuity information indicating the detected continuous regions.

That is to say, the continuousness detecting unit 204 uses the continuity wherein arc shapes are aligned at constant intervals in an adjacent manner in the data 3 obtained by imaging the fine line, which has been generated due to the continuity of the image of the fine line in the actual world 1, the nature of the continuity being continuing in the length direction, so as to further narrow down the candidates of regions detected with the peak detecting unit 202 and the monotonous increase/decrease detecting unit 203.

Figure 39:
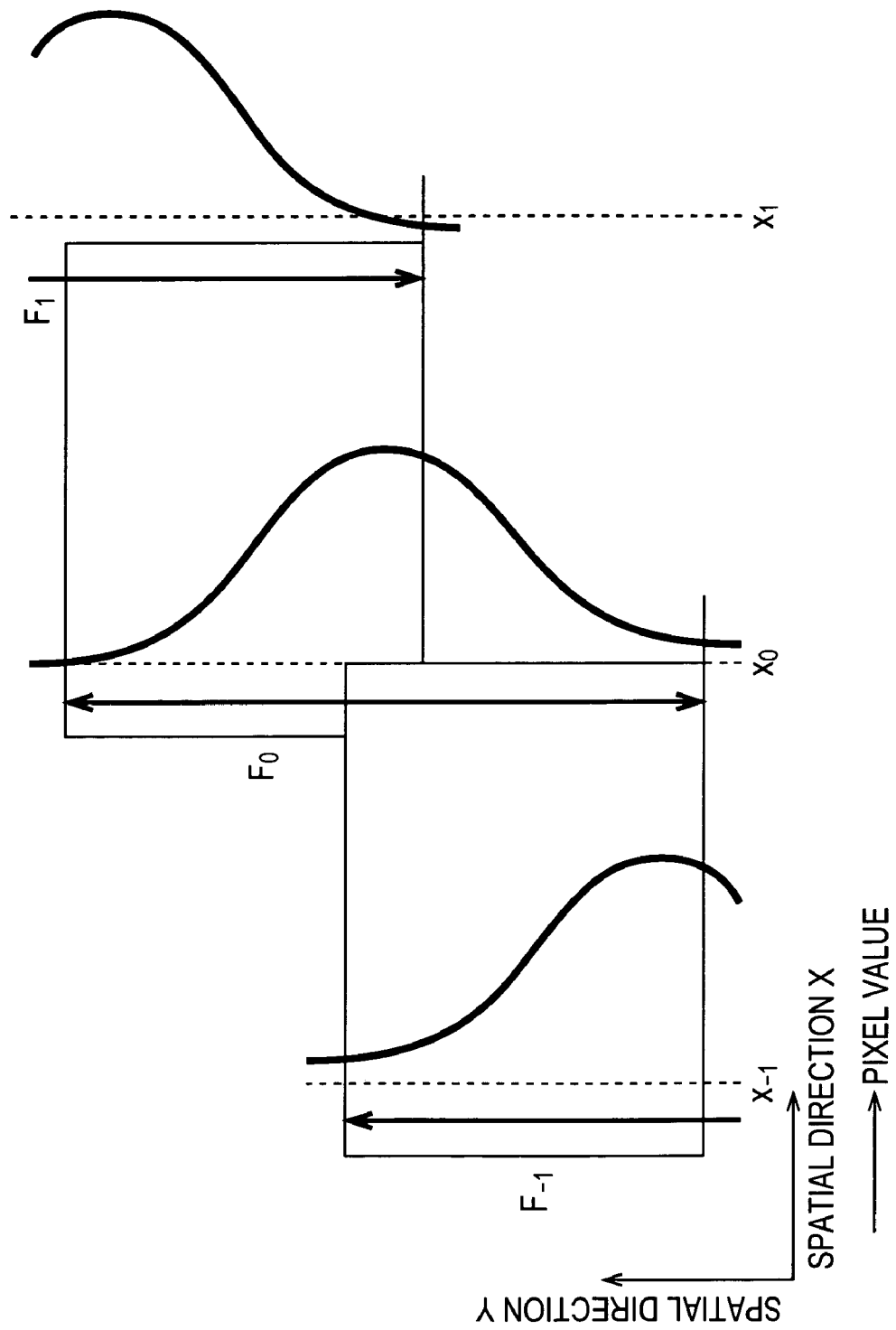
FIG. 39 is a diagram for describing processing for detecting continuity in a monotonous increase/decrease region.

FIG. 39 is a diagram describing the processing for detecting the continuousness of monotonous increase/decrease regions.

As shown in FIG. 39, in the event that a fine line region F formed of pixels aligned in a single row in the vertical direction of the screen includes pixels adjacent in the horizontal direction, the continuousness detecting unit 204 determines that there is continuousness between the two monotonous increase/decrease regions, and in the event that pixels adjacent in the horizontal direction are not included, determines that there is no continuousness between the two fine line regions F. For example, a fine line region $F_{-1}$ made up of pixels aligned in a single row in the vertical direction of the screen is determined to be continuous to a fine line region $F_0$ made up of pixels aligned in a single row in the vertical direction of the screen in the event of containing a pixel adjacent to a pixel of the fine line region $F_0$ in the horizontal direction. The fine line region $F_0$ made up of pixels aligned in a single row in the vertical direction of the screen is determined to be continuous to a fine line region $F_1$ made up of pixels aligned in a single row in the vertical direction of the screen in the event of containing a pixel adjacent to a pixel of the fine line region $F_1$ in the horizontal direction.

In this way, regions made up of pixels aligned in a single row in the vertical direction of the screen where the image of the fine line has been projected are detected by the peak detecting unit 202 through the continuousness detecting unit 204.

As described above, the peak detecting unit 202 through the continuousness detecting unit 204 detect regions made up of pixels aligned in a single row in the vertical direction of the screen where the image of the fine line has been projected, and further detect regions made up of pixels aligned in a single row in the horizontal direction of the screen where the image of the fine line has been projected.

Note that the order of processing is not particularly restricted, and may be executed in parallel, as a matter of course.

That is to say, the peak detecting unit 202, with regard to of pixels aligned in a single row in the horizontal direction of the screen, detects as a peak a pixel which has a pixel value greater in comparison with the pixel value of the pixel situated to the left side on the screen and the pixel value of the pixel situated to the right side on the screen, and supplies peak information indicating the position of the detected peak to the monotonous increase/decrease detecting unit 203. The peak detecting unit 202 detects one or multiple peaks from one image, for example, one frame image.

For example, the peak detecting unit 202 selects a pixel of interest from pixels in the one frame image which has not yet been taken as a pixel of interest, compares the pixel value of the pixel of interest with the pixel value of the pixel to the left side of the pixel of interest, compares the pixel value of the pixel of interest with the pixel value of the pixel to the right side of the pixel of interest, detects a pixel of interest having a pixel value greater than the pixel value of the pixel to the left side of the pixel of interest and having a pixel value greater than the pixel value of the pixel to the right side of the pixel of interest, and takes the detected pixel of interest as a peak. The peak detecting unit 202 supplies peak information indicating the detected peak to the monotonous increase/decrease detecting unit 203.

There are cases wherein the peak detecting unit 202 does not detect a peak.

The monotonous increase/decrease detecting unit 203 detects candidates for a region made up of pixels aligned in a single row in the horizontal direction as to the peak detected by the peak detecting unit 202 wherein the fine line image has been projected, and supplies the monotonous increase/decrease region information indicating the detected region to the continuousness detecting unit 204 along with the peak information.

More specifically, the monotonous increase/decrease detecting unit 203 detects regions made up of pixels having pixel values monotonously decreasing with the pixel value of the peak as a reference, as candidates of regions made up of pixels where the fine line image has been projected.

For example, the monotonous increase/decrease detecting unit 203 obtains, with regard to each pixel in a single row in the horizontal direction as to the peak, the pixel value of each pixel, the difference as to the pixel value of the pixel to the left side, and the difference as to the pixel value of the pixel to the right side. The monotonous increase/decrease detecting unit 203 then detects the region where the pixel value monotonously decreases by detecting the pixel where the sign of the difference changes.

Further, the monotonous increase/decrease detecting unit 203 detects, from a region wherein pixel values monotonously decrease, a region made up of pixels having pixel values with the same sign as the pixel value as the sign of the pixel value of the peak, with reference to the sign of the pixel value of the peak, as a candidate for a region made up of pixels where the fine line image has been projected.

For example, the monotonous increase/decrease detecting unit 203 compares the sign of the pixel value of each pixel with the sign of the pixel value of the pixel to the left side or with the sign of the pixel value of the pixel to the right side, and detects the pixel where the sign of the pixel value changes, thereby detecting a region made up of pixels having pixel values with the same sign as the peak, from the region where the pixel values monotonously decrease.

Thus, the monotonous increase/decrease detecting unit 203 detects a region made up of pixels aligned in the horizontal direction and having pixel values with the same sign as the peak wherein the pixel values monotonously decrease as to the peak.

From a fine line region made up of such a monotonous increase/decrease region, the monotonous increase/decrease detecting unit 203 obtains a fine line region longer than a threshold value set beforehand, i.e., a fine line region having a greater number of pixels than the threshold value.

Further, from the fine line region thus detected, the monotonous increase/decrease detecting unit 203 compares the pixel value of the peak, the pixel value of the pixel above the peak, and the pixel value of the pixel below the peak, each with the threshold value, detects a fine line region to which belongs a peak wherein the pixel value of the peak exceeds the threshold value, the pixel value of the pixel above the peak is within the threshold, and the pixel value of the pixel below the peak is within the threshold, and takes the detected fine line region as a candidate for a region made up of pixels containing the fine line image component.

Another way of saying this is that fine line regions to which belongs a peak wherein the pixel value of the peak is within the threshold value, or the pixel value of the pixel above the peak exceeds the threshold, or the pixel value of the pixel below the peak exceeds the threshold, are determined to not contain the fine line image component, and are eliminated from candidates of the region made up of pixels containing the fine line image component.

Note that the monotonous increase/decrease detecting unit 203 may be arranged to take the background pixel value as a reference, compare the difference between the pixel value of the peak and the pixel value of the background with the threshold value, and also to compare the difference between the pixel value of the background and the pixel values of the pixels adjacent to the peak in the vertical direction with the threshold value, and take a detected fine line region wherein the difference between the pixel value of the peak and the pixel value of the background exceeds the threshold value, and the difference between the pixel value of the background and the pixel value of the pixels adjacent in the vertical direction is within the threshold, as a candidate for a region made up of pixels containing the fine line image component.

The monotonous increase/decrease detecting unit 203 supplies to the continuousness detecting unit 204 monotonous increase/decrease region information indicating a region made up of pixels having a pixel value sign which is the same as the peak and monotonously decreasing pixel values as to the peak as a reference, wherein the peak exceeds the threshold value, and the pixel value of the pixel to the right side of the peak is within the threshold, and the pixel value of the pixel to the left side of the peak is within the threshold.

In the event of detecting a region made up of pixels aligned in a single row in the horizontal direction of the screen wherein the image of the fine line has been projected, pixels belonging to the region indicated by the monotonous increase/decrease region information include pixels aligned in the horizontal direction wherein the image of the fine line has been projected. That is to say, the region indicated by the monotonous increase/decrease region information includes a region made up of pixels aligned in a single row in the horizontal direction of the screen wherein the image of the fine line has been projected.

Of the regions made up of pixels aligned in the horizontal direction indicated in the monotonous increase/decrease region information supplied from the monotonous increase/decrease detecting unit 203, the continuousness detecting unit 204 detects regions including pixels adjacent in the vertical direction, i.e., regions having similar pixel value change and which are repeated in the horizontal direction, as continuous regions, and outputs data continuity information indicating the peak information and the detected continuous regions. The data continuity information includes information indicating the connection of the regions.

At the pixels where the fine line has been projected, arc shapes are arrayed at constant intervals in an adjacent manner, so the detected continuous regions include pixels where the fine line has been projected.

The detected continuous regions include pixels where arc shapes are arrayed at constant intervals in an adjacent manner wherein the fine line has been projected, so the detected continuous regions are taken as a continuity region, and the continuousness detecting unit 204 outputs data continuity information indicating the detected continuous regions.

That is to say, the continuousness detecting unit 204 uses the continuity which is that the arc shapes are arrayed at constant intervals in an adjacent manner in the data 3 obtained by imaging the fine line, generated from the continuity of the image of the fine line in the actual world 1 which is continuation in the length direction, so as to further narrow down the candidates of regions detected by the peak detecting unit 202 and the monotonous increase/decrease detecting unit 203.

Thus, the data continuity detecting unit 101 is capable of detecting continuity contained in the data 3 which is the input image. That is to say, the data continuity detecting unit 101 can detect continuity of data included in the data 3 which has been generated by the actual world 1 image which is a fine line having been projected on the data 3. The data continuity detecting unit 101 detects, from the data 3, regions made up of pixels where the actual world 1 image which is a fine line has been projected.

Figure 40:
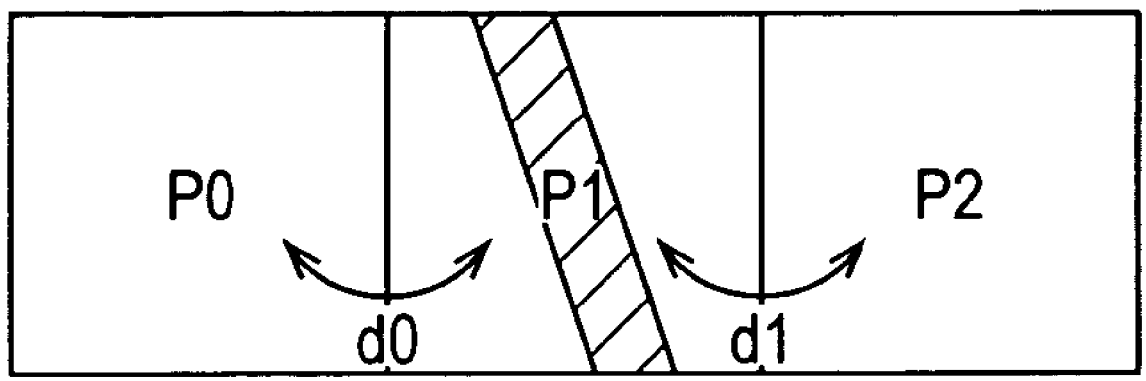
FIG. 40 is a diagram illustrating an example of other processing for detecting regions where an image of a fine line has been projected.

FIG. 40 is a diagram illustrating an example of other processing for detecting regions having continuity, where a fine line image has been projected, with the data continuity detecting unit 101.

As shown in FIG. 40, the data continuity detecting unit 101 calculates the absolute value of difference of pixel values for each pixel and adjacent pixels. The calculated absolute values of difference are placed corresponding to the pixels. For example, in a situation such as shown in FIG. 40 wherein there are pixels aligned which have respective pixel values of P0, P1, and P2, the data continuity detecting unit 101 calculates the difference d0=P0−P1 and the difference d1=P1−P2. Further, the data continuity detecting unit 101 calculates the absolute values of the difference d0 and the difference d1.

In the event that the non-continuity component contained in the pixel values P0, P1, and P2 are identical, only values corresponding to the component of the fine line are set to the difference d0 and the difference d1.

Accordingly, of the absolute values of the differences placed corresponding to the pixels, in the event that adjacent difference values are identical, the data continuity detecting unit 101 determines that the pixel corresponding to the absolute values of the two differences (the pixel between the two absolute values of difference) contains the component of the fine line. However, the data continuity detecting unit 101 does not need to detect the fine line in the event that the absolute value of difference is small. For example, in the event that the absolute value of difference is equal to or greater than a threshold value, the data continuity detecting unit 101 determines that the pixel contains a fine line component.

The data continuity detecting unit 101 can also detect fine lines with a simple method such as this.

Figure 41:
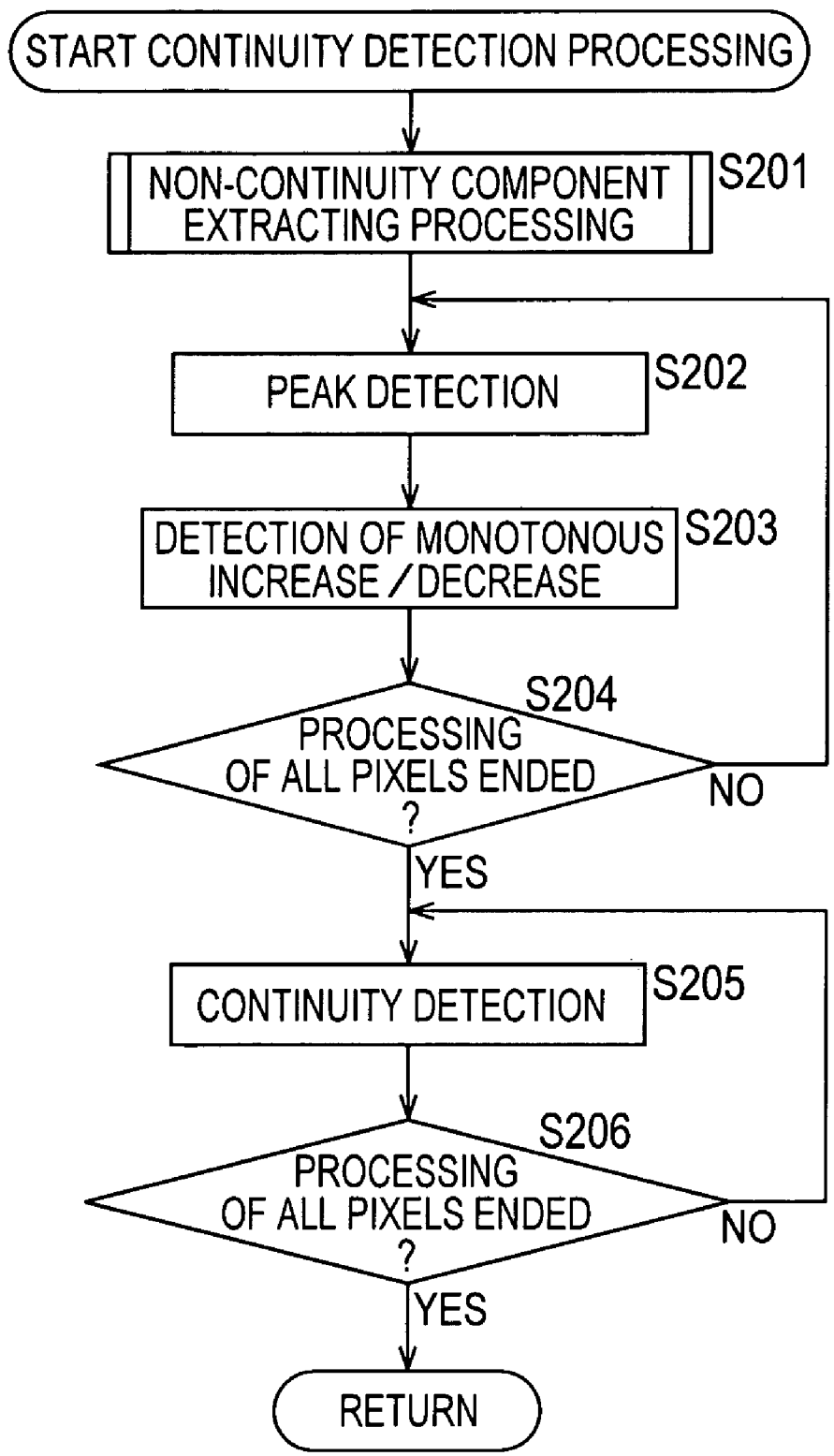
FIG. 41 is a flowchart for describing continuity detection processing.

FIG. 41 is a flowchart for describing continuity detection processing.

In step S201, the non-continuity component extracting unit 201 extracts non-continuity component, which is portions other than the portion where the fine line has been projected, from the input image. The non-continuity component extracting unit 201 supplies non-continuity component information indicating the extracted non-continuity component, along with the input image, to the peak detecting unit 202 and the monotonous increase/decrease detecting unit 203. Details of the processing for extracting the non-continuity component will be described later.

In step S202, the peak detecting unit 202 eliminates the non-continuity component from the input image, based on the non-continuity component information supplied from the non-continuity component extracting unit 201, so as to leave only pixels including the continuity component in the input image. Further, in step S202, the peak detecting unit 202 detects peaks.

That is to say, in the event of executing processing with the vertical direction of the screen as a reference, of the pixels containing the continuity component, the peak detecting unit 202 compares the pixel value of each pixel with the pixel values of the pixels above and below, and detects pixels having a greater pixel value than the pixel value of the pixel above and the pixel value of the pixel below, thereby detecting a peak. Also, in step S202, in the event of executing processing with the horizontal direction of the screen as a reference, of the pixels containing the continuity component, the peak detecting unit 202 compares the pixel value of each pixel with the pixel values of the pixels to the right side and left side, and detects pixels having a greater pixel value than the pixel value of the pixel to the right side and the pixel value of the pixel to the left side, thereby detecting a peak.

The peak detecting unit 202 supplies the peak information indicating the detected peaks to the monotonous increase/decrease detecting unit 203.

In step S203, the monotonous increase/decrease detecting unit 203 eliminates the non-continuity component from the input image, based on the non-continuity component information supplied from the non-continuity component extracting unit 201, so as to leave only pixels including the continuity component in the input image. Further, in step S203, the monotonous increase/decrease detecting unit 203 detects the region made up of pixels having data continuity, by detecting monotonous increase/decrease as to the peak, based on peak information indicating the position of the peak, supplied from the peak detecting unit 202.

In the event of executing processing with the vertical direction of the screen as a reference, the monotonous increase/decrease detecting unit 203 detects monotonous increase/decrease made up of one row of pixels aligned vertically where a single fine line image has been projected, based on the pixel value of the peak and the pixel values of the one row of pixels aligned vertically as to the peak, thereby detecting a region made up of pixels having data continuity. That is to say, in step S203, in the event of executing processing with the vertical direction of the screen as a reference, the monotonous increase/decrease detecting unit 203 obtains, with regard to a peak and a row of pixels aligned vertically as to the peak, the difference between the pixel value of each pixel and the pixel value of a pixel above or below, thereby detecting a pixel where the sign of the difference changes. Also, with regard to a peak and a row of pixels aligned vertically as to the peak, the monotonous increase/decrease detecting unit 203 compares the sign of the pixel value of each pixel with the sign of the pixel value of a pixel above or below, thereby detecting a pixel where the sign of the pixel value changes. Further, the monotonous increase/decrease detecting unit 203 compares pixel value of the peak and the pixel values of the pixels to the right side and to the left side of the peak with a threshold value, and detects a region made up of pixels wherein the pixel value of the peak exceeds the threshold value, and wherein the pixel values of the pixels to the right side and to the left side of the peak are within the threshold.

The monotonous increase/decrease detecting unit 203 takes a region detected in this way as a monotonous increase/decrease region, and supplies monotonous increase/decrease region information indicating the monotonous increase/decrease region to the continuousness detecting unit 204.

In the event of executing processing with the horizontal direction of the screen as a reference, the monotonous increase/decrease detecting unit 203 detects monotonous increase/decrease made up of one row of pixels aligned horizontally where a single fine line image has been projected, based on the pixel value of the peak and the pixel values of the one row of pixels aligned horizontally as to the peak, thereby detecting a region made up of pixels having data continuity. That is to say, in step S203, in the event of executing processing with the horizontal direction of the screen as a reference, the monotonous increase/decrease detecting unit 203 obtains, with regard to a peak and a row of pixels aligned horizontally as to the peak, the difference between the pixel value of each pixel and the pixel value of a pixel to the right side or to the left side, thereby detecting a pixel where the sign of the difference changes. Also, with regard to a peak and a row of pixels aligned horizontally as to the peak, the monotonous increase/ decrease detecting unit 203 compares the sign of the pixel value of each pixel with the sign of the pixel value of a pixel to the right side or to the left side, thereby detecting a pixel where the sign of the pixel value changes. Further, the monotonous increase/decrease detecting unit 203 compares pixel value of the peak and the pixel values of the pixels to the upper side and to the lower side of the peak with a threshold value, and detects a region made up of pixels wherein the pixel value of the peak exceeds the threshold value, and wherein the pixel values of the pixels to the upper side and to the lower side of the peak are within the threshold.

The monotonous increase/decrease detecting unit 203 takes a region detected in this way as a monotonous increase/decrease region, and supplies monotonous increase/decrease region information indicating the monotonous increase/decrease region to the continuousness detecting unit 204.

In step S204, the monotonous increase/decrease detecting unit 203 determines whether or not processing of all pixels has ended. For example, the non-continuity component extracting unit 201 detects peaks for all pixels of a single screen (for example, frame, field, or the like) of the input image, and whether or not a monotonous increase/decrease region has been detected is determined.

In the event that determination is made in step S204 that processing of all pixels has not ended, i.e., that there are still pixels which have not been subjected to the processing of peak detection and detection of monotonous increase/decrease region, the flow returns to step S202, a pixel which has not yet been subjected to the processing of peak detection and detection of monotonous increase/decrease region is selected as an object of the processing, and the processing of peak detection and detection of monotonous increase/decrease region are repeated.

In the event that determination is made in step S204 that processing of all pixels has ended, i.e., that peaks and monotonous increase/decrease regions have been detected with regard to all pixels, the flow proceeds to step S205, where the continuousness detecting unit 204 detects the continuousness of detected regions, based on the monotonous increase/decrease region information. For example, in the event that monotonous increase/decrease regions made up of one row of pixels aligned in the vertical direction of the screen, indicated by monotonous increase/decrease region information, include pixels adjacent in the horizontal direction, the continuousness detecting unit 204 determines that there is continuousness between the two monotonous increase/decrease regions, and in the event of not including pixels adjacent in the horizontal direction, determines that there is no continuousness between the two monotonous increase/decrease regions. For example, in the event that monotonous increase/decrease regions made up of one row of pixels aligned in the horizontal direction of the screen, indicated by monotonous increase/decrease region information, include pixels adjacent in the vertical direction, the continuousness detecting unit 204 determines that there is continuousness between the two monotonous increase/decrease regions, and in the event of not including pixels adjacent in the vertical direction, determines that there is no continuousness between the two monotonous increase/decrease regions.

The continuousness detecting unit 204 takes the detected continuous regions as continuity regions having data continuity, and outputs data continuity information indicating the peak position and continuity region. The data continuity information contains information indicating the connection of regions. The data continuity information output from the continuousness detecting unit 204 indicates the fine line region, which is the continuity region, made up of pixels where the actual world 1 fine line image has been projected.

In step S206, a continuity direction detecting unit 205 determines whether or not processing of all pixels has ended. That is to say, the continuity direction detecting unit 205 determines whether or not region continuation has been detected with regard to all pixels of a certain frame of the input image.

In the event that determination is made in step S206 that processing of all pixels has not yet ended, i.e., that there are still pixels which have not yet been taken as the object of detection of region continuation, the flow returns to step S205, a pixel which has not yet been subjected to the processing of detection of region continuity is selected as the pixel for processing, and the processing for detection of region continuity is repeated.

In the event that determination is made in step S206 that processing of all pixels has ended, i.e., that all pixels have been taken as the object of detection of region continuity, the processing ends.

Thus, the continuity contained in the data 3 which is the input image is detected. That is to say, continuity of data included in the data 3 which has been generated by the actual world 1 image which is a fine line having been projected on the data 3 is detected, and a region having data continuity, which is made up of pixels on which the actual world 1 image which is a fine line has been projected, is detected from the data 3.

Now, the data continuity detecting unit 101 of which the configuration is shown in FIG. 30 can detect time-directional data continuity, based on the region having data continuity detected from the frame of the data 3.

Figure 42:
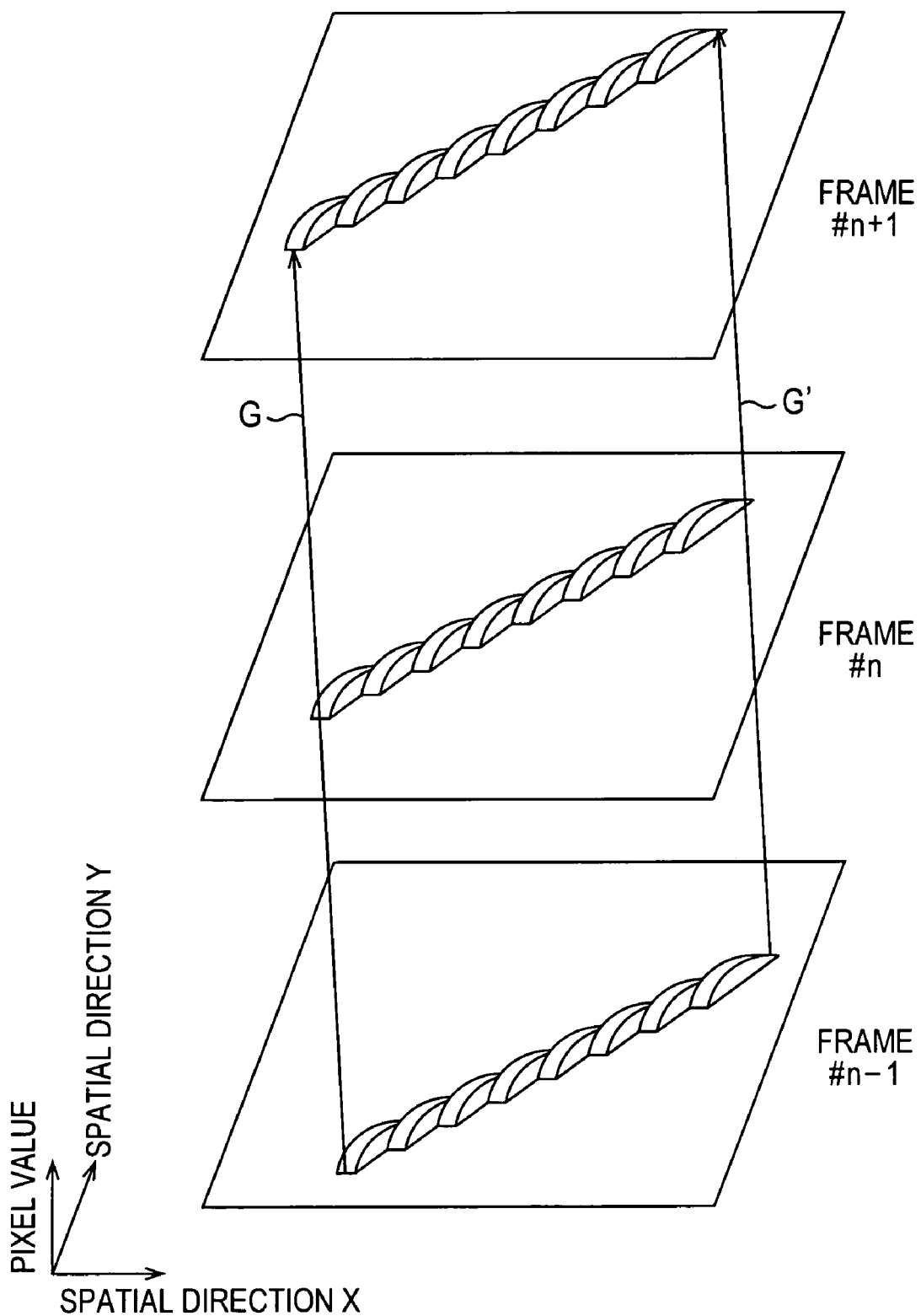
FIG. 42 is a diagram for describing processing for detecting continuity of data in the time direction.

For example, as shown in FIG. 42, the continuousness detecting unit 204 detects time-directional data continuity by connecting the edges of the region having detected data continuity in frame #n, the region having detected data continuity in frame #n−1, and the region having detected data continuity in frame #n+1.

The frame #n−1 is a frame preceding the frame #n time-wise, and the frame #n+1 is a frame following the frame #n time-wise. That is to say, the frame #n−1, the frame #n, and the frame #n+1, are displayed on the order of the frame #n−1, the frame #n, and the frame #n+1.

More specifically, in FIG. 42, G denotes a movement vector obtained by connecting the one edge of the region having detected data continuity in frame #n, the region having detected data continuity in frame #n−1, and the region having detected data continuity in frame #n+1, and G' denotes a movement vector obtained by connecting the other edges of the regions having detected data continuity. The movement vector G and the movement vector G' are an example of data continuity in the time direction.

Further, the data continuity detecting unit 101 of which the configuration is shown in FIG. 30 can output information indicating the length of the region having data continuity as data continuity information.

Figure 43:
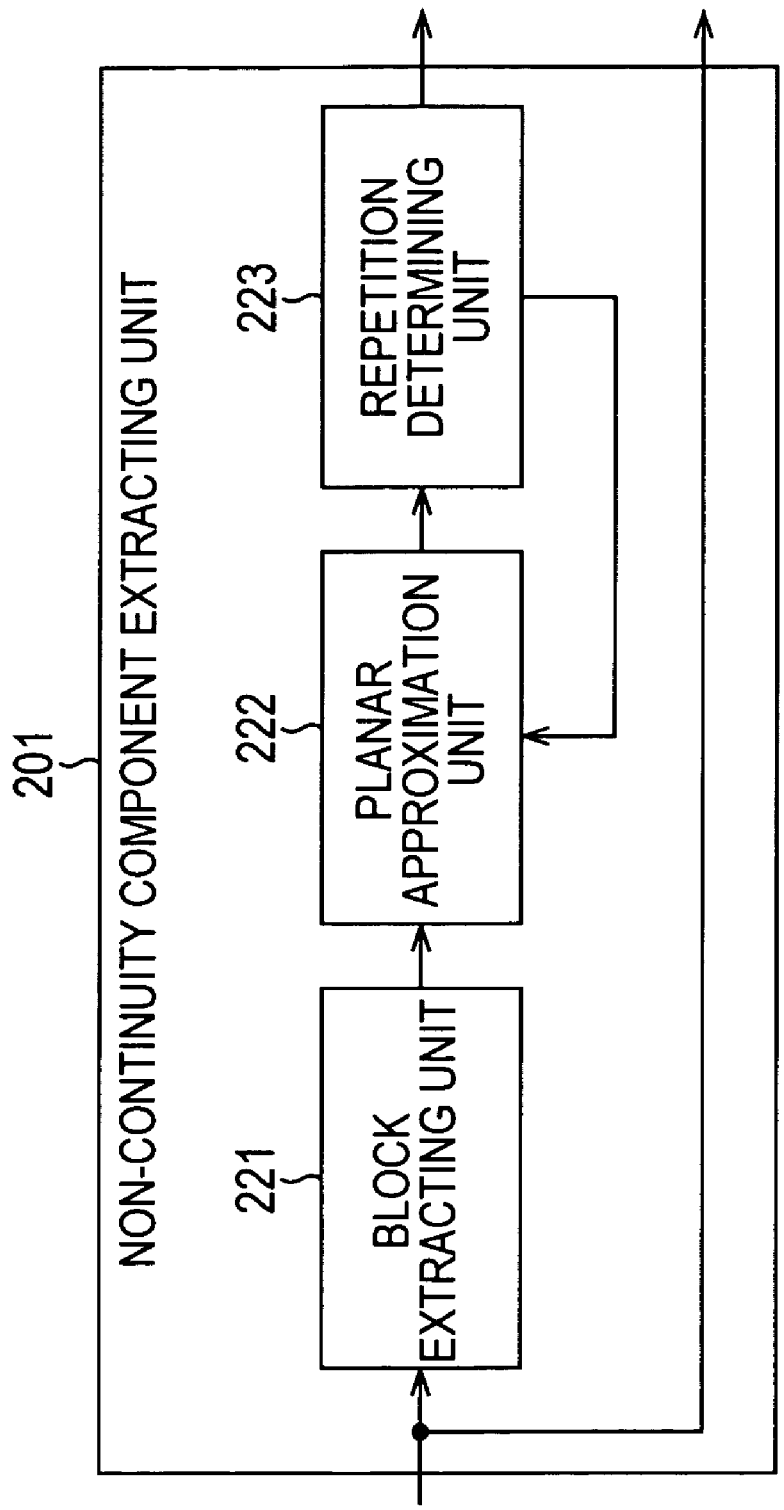
FIG. 43 is a block diagram illustrating the configuration of a non-continuity component extracting unit 201.

FIG. 43 is a block diagram illustrating the configuration of the non-continuity component extracting unit 201 which performs planar approximation of the non-continuity component which is the portion of the image data which does not have data continuity, and extracts the non-continuity component.

The non-continuity component extracting unit 201 of which the configuration is shown in FIG. 43 extracts blocks, which are made up of a predetermined number of pixels, from the input image, performs planar approximation of the blocks, so that the error between the block and a planar value is below a predetermined threshold value, thereby extracting the non-continuity component.

The input image is supplied to a block extracting unit 221, and is also output without change.

The block extracting unit 221 extracts blocks, which are made up of a predetermined number of pixels, from the input image. For example, the block extracting unit 221 extracts a block made up of 7×7 pixels, and supplies this to a planar approximation unit 222. For example, the block extracting unit 221 moves the pixel serving as the center of the block to be extracted in raster scan order, thereby sequentially extracting blocks from the input image.

The planar approximation unit 222 approximates the pixel values of a pixel contained in the block on a predetermined plane. For example, the planar approximation unit 222 approximates the pixel value of a pixel contained in the block on a plane expressed by Expression (32).

$$z = ax + by + c \tag{32}$$

In Expression (32), x represents the position of the pixel in one direction on the screen (the spatial direction X), and y represents the position of the pixel in the other direction on the screen (the spatial direction Y). z represents the application value represented by the plane. a represents the gradient of the spatial direction X of the plane, and b represents the gradient of the spatial direction Y of the plane. In Expression (32), c represents the offset of the plane (intercept).

For example, the planar approximation unit 222 obtains the gradient a, gradient b, and offset c, by regression processing, thereby approximating the pixel values of the pixels contained in the block on a plane expressed by Expression (32). The planar approximation unit 222 obtains the gradient a, gradient b, and offset c, by regression processing including rejection, thereby approximating the pixel values of the pixels contained in the block on a plane expressed by Expression (32).

For example, the planar approximation unit 222 obtains the plane expressed by Expression (32) wherein the error is least as to the pixel values of the pixels of the block using the least-square method, thereby approximating the pixel values of the pixels contained in the block on the plane.

Note that while the planar approximation unit 222 has been described approximating the block on the plane expressed by Expression (32), this is not restricted to the plane expressed by Expression (32), rather, the block may be approximated on a plane represented with a function with a higher degree of freedom, for example, an n-order (wherein n is an arbitrary integer) polynomial.

A repetition determining unit 223 calculates the error between the approximation value represented by the plane upon which the pixel values of the block have been approximated, and the corresponding pixel values of the pixels of the block. Expression (33) is an expression which shows the error ei which is the difference between the approximation value represented by the plane upon which the pixel values of the block have been approximated, and the corresponding pixel values zi of the pixels of the block.

$$e_i = z_i - \hat{z} = z_i - (\hat{a}x_i + \hat{b}y_i + \hat{c}) \tag{33}$$

In Expression (33), z-hat (A symbol with ^ over z will be described as z-hat. The same description will be used in the present specification hereafter.) represents an approximation value expressed by the plane on which the pixel values of the block are approximated, a-hat represents the gradient of the spatial direction X of the plane on which the pixel values of the block are approximated, b-hat represents the gradient of the spatial direction Y of the plane on which the pixel values of the block are approximated, and c-hat represents the offset (intercept) of the plane on which the pixel values of the block are approximated.

The repetition determining unit 223 rejects the pixel regarding which the error ei between the approximation value and the corresponding pixel values of pixels of the block is greatest, shown in Expression (33). Thus, pixels where the fine line has been projected, i.e., pixels having continuity, are rejected. The repetition determining unit 223 supplies rejection information indicating the rejected pixels to the planar approximation unit 222.

Further, the repetition determining unit 223 calculates a standard error, and in the event that the standard error is equal to or greater than threshold value which has been set beforehand for determining ending of approximation, and half or more of the pixels of the pixels of a block have not been rejected, the repetition determining unit 223 causes the planar approximation unit 222 to repeat the processing of planar approximation on the pixels contained in the block, from which the rejected pixels have been eliminated.

Pixels having continuity are rejected, so approximating the pixels from which the rejected pixels have been eliminated on a plane means that the plane approximates the non-continuity component.

At the point that the standard error below the threshold value for determining ending of approximation, or half or more of the pixels of the pixels of a block have been rejected, the repetition determining unit 223 ends planar approximation.

With a block made up of 5×5 pixels, the standard error $e_s$ can be calculated with, for example, Expression (34).

$$\begin{aligned} e_s &= \sum (z_i - \hat{z})/(n-3) \\ &= \sum \{(z_i - (\hat{a}x_i + \hat{b}y_i + \hat{c})\}/(n-3) \end{aligned} \tag{34}$$

Here, n is the number of pixels.

Note that the repetition determining unit 223 is not restricted to standard error, and may be arranged to calculate the sum of the square of errors for all of the pixels contained in the block, and perform the following processing.

Figure 44:
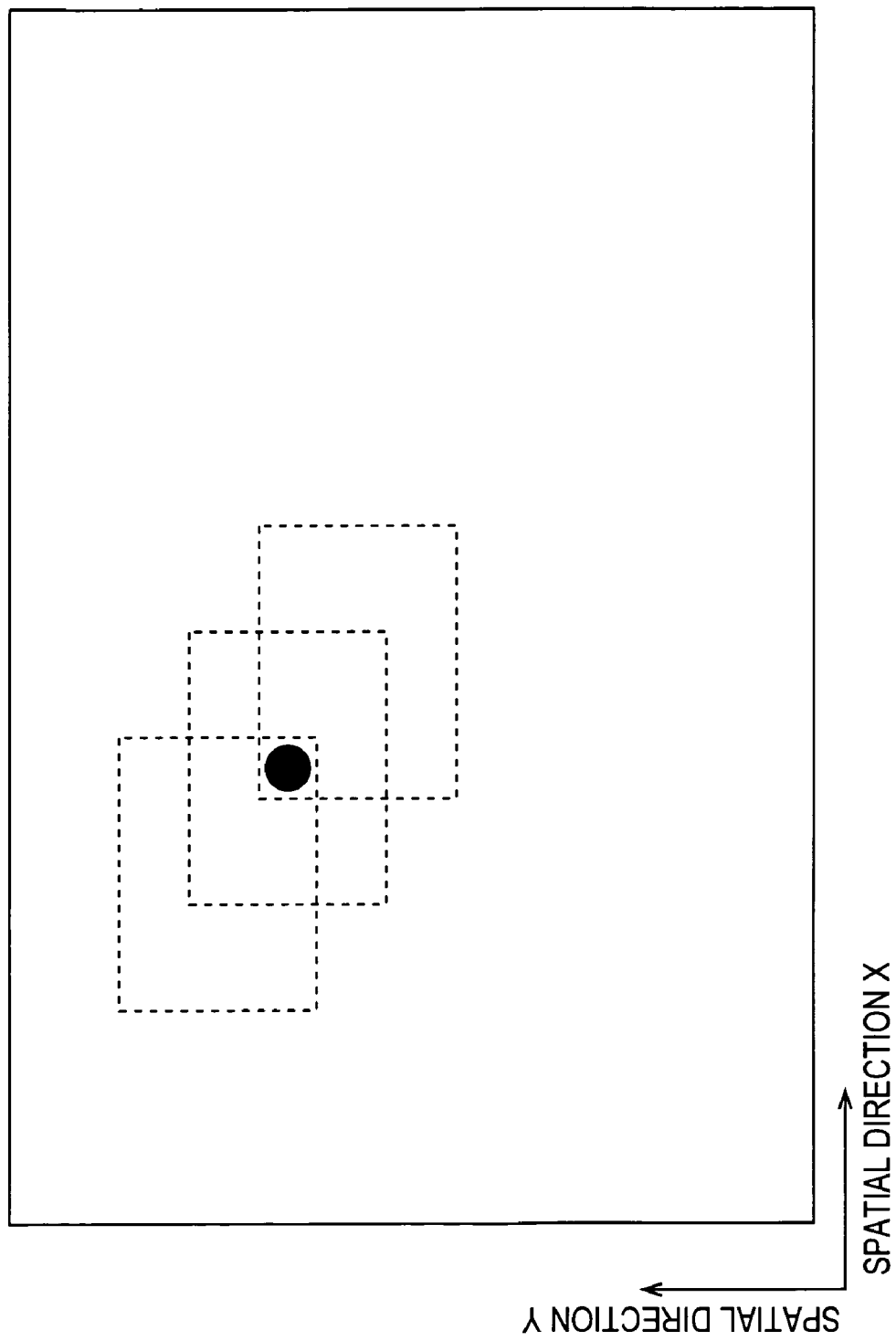
FIG. 44 is a diagram for describing the number of time of rejections.

Now, at the time of planar approximation of blocks shifted one pixel in the raster scan direction, a pixel having continuity, indicated by the black circle in the diagram, i.e., a pixel containing the fine line component, will be rejected multiple times, as shown in FIG. 44.

Upon completing planar approximation, the repetition determining unit 223 outputs information expressing the plane for approximating the pixel values of the block (the gradient and intercept of the plane of Expression 32)) as non-continuity information.

Note that an arrangement may be made wherein the repetition determining unit 223 compares the number of times of rejection per pixel with a preset threshold value, and takes a pixel which has been rejected a number of times equal to or greater than the threshold value as a pixel containing the continuity component, and output the information indicating the pixel including the continuity component as continuity component information. In this case, the peak detecting unit 202 through the continuity direction detecting unit 205 execute their respective processing on pixels containing continuity component, indicated by the continuity component information.

The number of times of rejection, the gradient of the spatial direction X of the plane for approximating the pixel values of the pixel of the block, the gradient of the spatial direction Y of the plane for approximating the pixel values of the pixel of the block, approximation values expressed by the plane approximating the pixel values of the pixels of the block, and the error ei, can be used as features of the input image.

Figure 45:
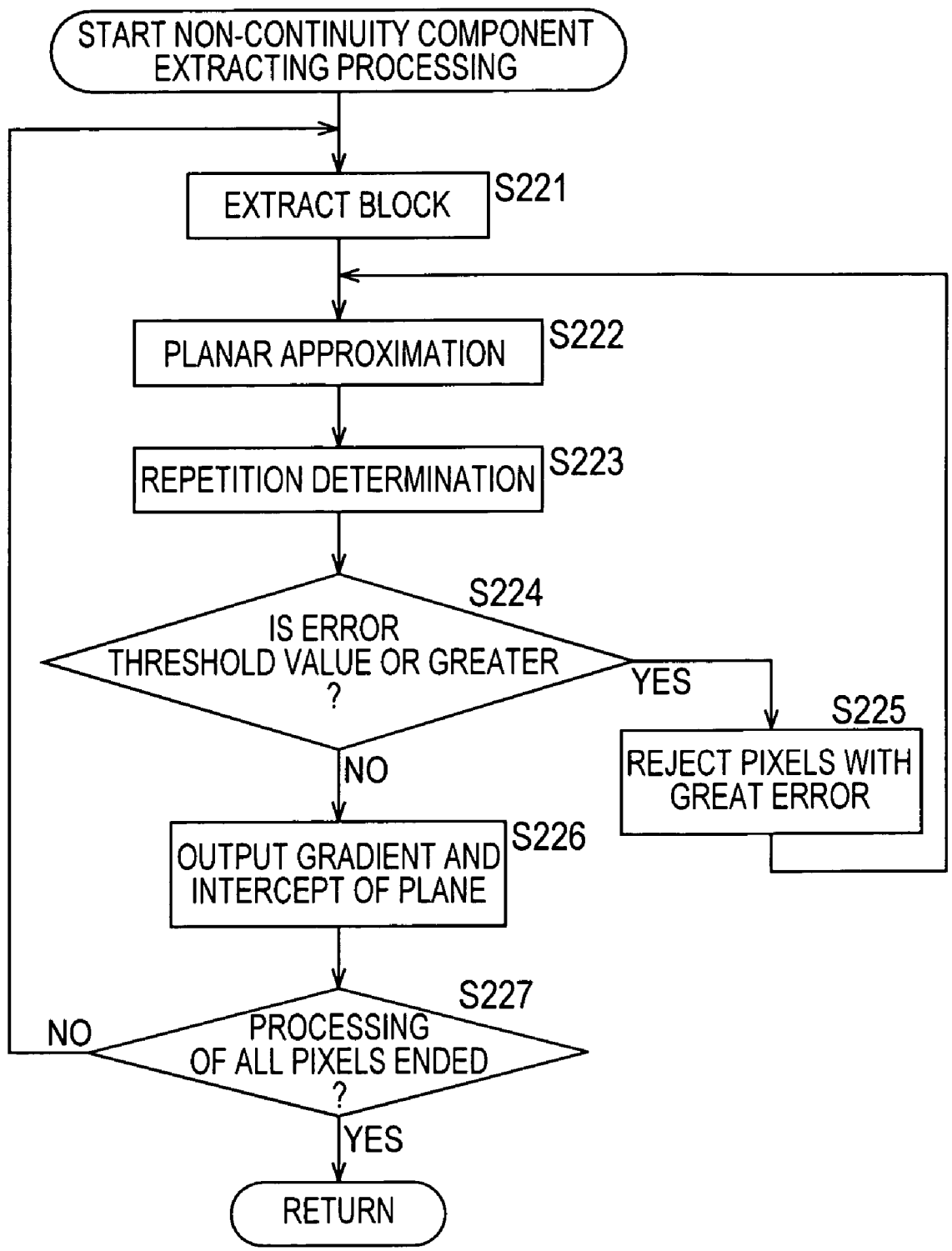
FIG. 45 is a flowchart describing the processing for extracting the non-continuity component.

FIG. 45 is a flowchart for describing the processing of extracting the non-continuity component with the non-continuity component extracting unit 201 of which the configuration is shown in FIG. 43, corresponding to step S201.

In step S221, the block extracting unit 221 extracts a block made up of a predetermined number of pixels from the input image, and supplies the extracted block to the planar approximation unit 222. For example, the block extracting unit 221 selects one pixel of the pixels of the input pixel which have not been selected yet, and extracts a block made up of 7×7 pixels centered on the selected pixel. For example, the block extracting unit 221 can select pixels in raster scan order.

In step S222, the planar approximation unit 222 approximates the extracted block on a plane. The planar approximation unit 222 approximates the pixel values of the pixels of the extracted block on a plane by regression processing, for example. For example, the planar approximation unit 222 approximates the pixel values of the pixels of the extracted block excluding the rejected pixels on a plane, by regression processing. In step S223, the repetition determining unit 223 executes repetition determination. For example, repetition determination is performed by calculating the standard error from the pixel values of the pixels of the block and the planar approximation values, and counting the number of rejected pixels.

In step S224, the repetition determining unit 223 determines whether or not the standard error is equal to or above a threshold value, and in the event that determination is made that the standard error is equal to or above the threshold value, the flow proceeds to step S225.

Note that an arrangement may be made wherein the repetition determining unit 223 determines in step S224 whether or not half or more of the pixels of the block have been rejected, and whether or not the standard error is equal to or above the threshold value, and in the event that determination is made that half or more of the pixels of the block have not been rejected, and the standard error is equal to or above the threshold value, the flow proceeds to step S225.

In step S225, the repetition determining unit 223 calculates the error between the pixel value of each pixel of the block and the approximated planar approximation value, rejects the pixel with the greatest error, and notifies the planar approximation unit 222. The procedure returns to step S222, and the planar approximation processing and repetition determination processing is repeated with regard to the pixels of the block excluding the rejected pixel.

In step S225, in the event that a block which is shifted one pixel in the raster scan direction is extracted in the processing in step S221, the pixel including the fine line component (indicated by the black circle in the drawing) is rejected multiple times, as shown in FIG. 44.

In the event that determination is made in step S224 that the standard error is not equal to or greater than the threshold value, the block has been approximated on the plane, so the flow proceeds to step S226.

Note that an arrangement may be made wherein the repetition determining unit 223 determines in step S224 whether or not half or more of the pixels of the block have been rejected, and whether or not the standard error is equal to or above the threshold value, and in the event that determination is made that half or more of the pixels of the block have been rejected, or the standard error is not equal to or above the threshold value, the flow proceeds to step S225.

In step S226, the repetition determining unit 223 outputs the gradient and intercept of the plane for approximating the pixel values of the pixels of the block as non-continuity component information.

In step S227, the block extracting unit 221 determines whether or not processing of all pixels of one screen of the input image has ended, and in the event that determination is made that there are still pixels which have not yet been taken as the object of processing, the flow returns to step S221, a block is extracted from pixels not yet been subjected to the processing, and the above processing is repeated.

In the event that determination is made in step S227 that processing has ended for all pixels of one screen of the input image, the processing ends.

Thus, the non-continuity component extracting unit 201 of which the configuration is shown in FIG. 43 can extract the non-continuity component from the input image. The non-continuity component extracting unit 201 extracts the non-continuity component from the input image, so the peak detecting unit 202 and monotonous increase/decrease detecting unit 203 can obtain the difference between the input image and the non-continuity component extracted by the non-continuity component extracting unit 201, so as to execute the processing regarding the difference containing the continuity component.

Note that the standard error in the event that rejection is performed, the standard error in the event that rejection is not performed, the number of times of rejection of a pixel, the gradient of the spatial direction X of the plane (a-hat in Expression (32)), the gradient of the spatial direction Y of the plane (b-hat in Expression (32)), the level of planar transposing (c-hat in Expression (32)), and the difference between the pixel values of the input image and the approximation values represented by the plane, calculated in planar approximation processing, can be used as features.

Figure 46:
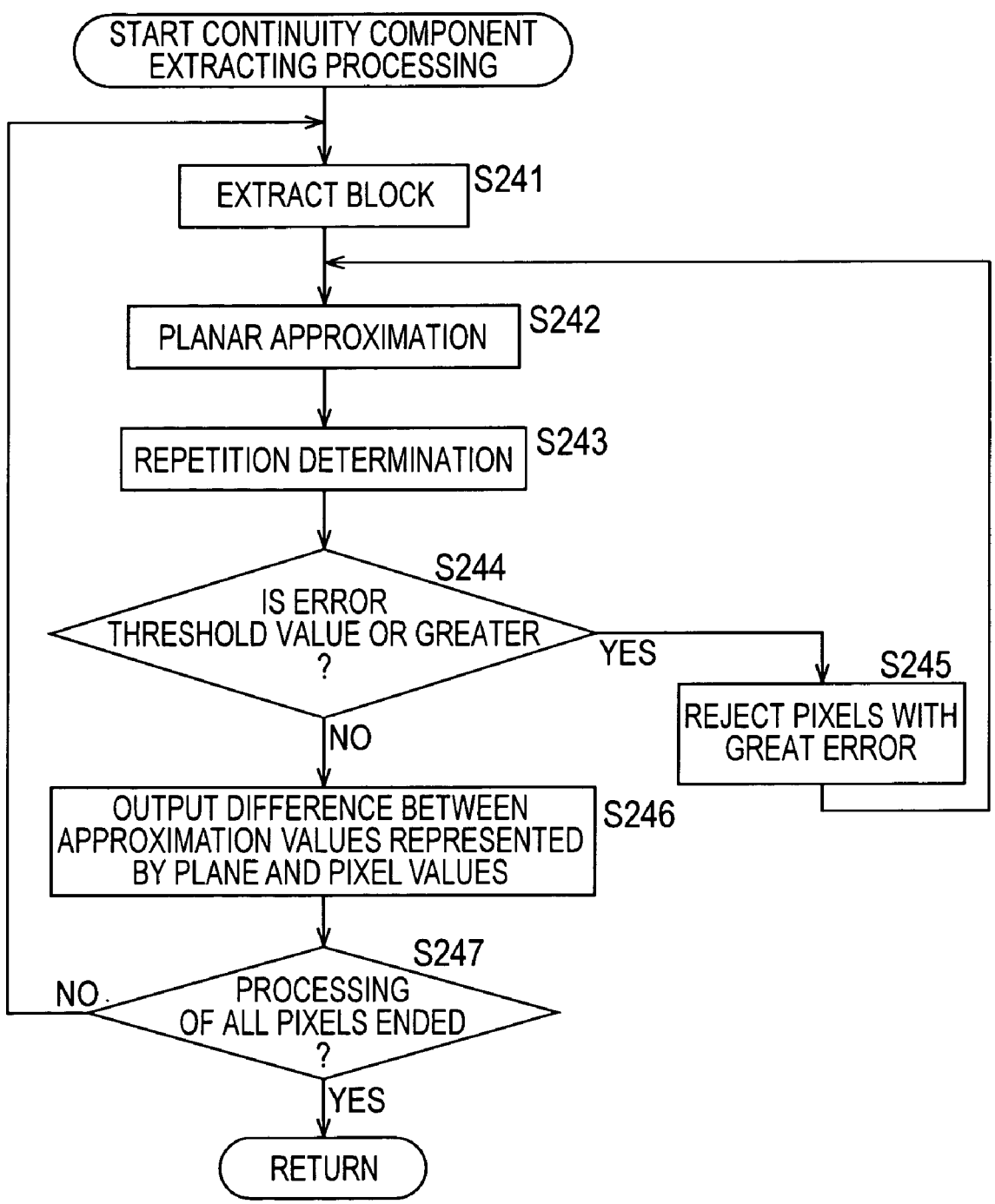
FIG. 46 is a flowchart describing the processing for extracting the continuity component.

FIG. 46 is a flowchart for describing processing for extracting the continuity component with the non-continuity component extracting unit 201 of which the configuration is shown in FIG. 43, instead of the processing for extracting the non-continuity component corresponding to step S201. The processing of step S241 through step S245 is the same as the processing of step S221 through step S225, so description thereof will be omitted.

In step S246, the repetition determining unit 223 outputs the difference between the approximation value represented by the plane and the pixel values of the input image, as the continuity component of the input image. That is to say, the repetition determining unit 223 outputs the difference between the planar approximation values and the true pixel values.

Note that the repetition determining unit 223 may be arranged to output the difference between the approximation value represented by the plane and the pixel values of the input image, regarding pixel values of pixels of which the difference is equal to or greater than a predetermined threshold value, as the continuity component of the input image.

The processing of step S247 is the same as the processing of step S227, and accordingly description thereof will be omitted.

The plane approximates the non-continuity component, so the non-continuity component extracting unit 201 can remove the non-continuity component from the input image by subtracting the approximation value represented by the plane for approximating pixel values, from the pixel values of each pixel in the input image. In this case, the peak detecting unit 202 through the continuousness detecting unit 204 can be made to process only the continuity component of the input image, i.e., the values where the fine line image has been projected, so the processing with the peak detecting unit 202 through the continuousness detecting unit 204 becomes easier.

Figure 47:
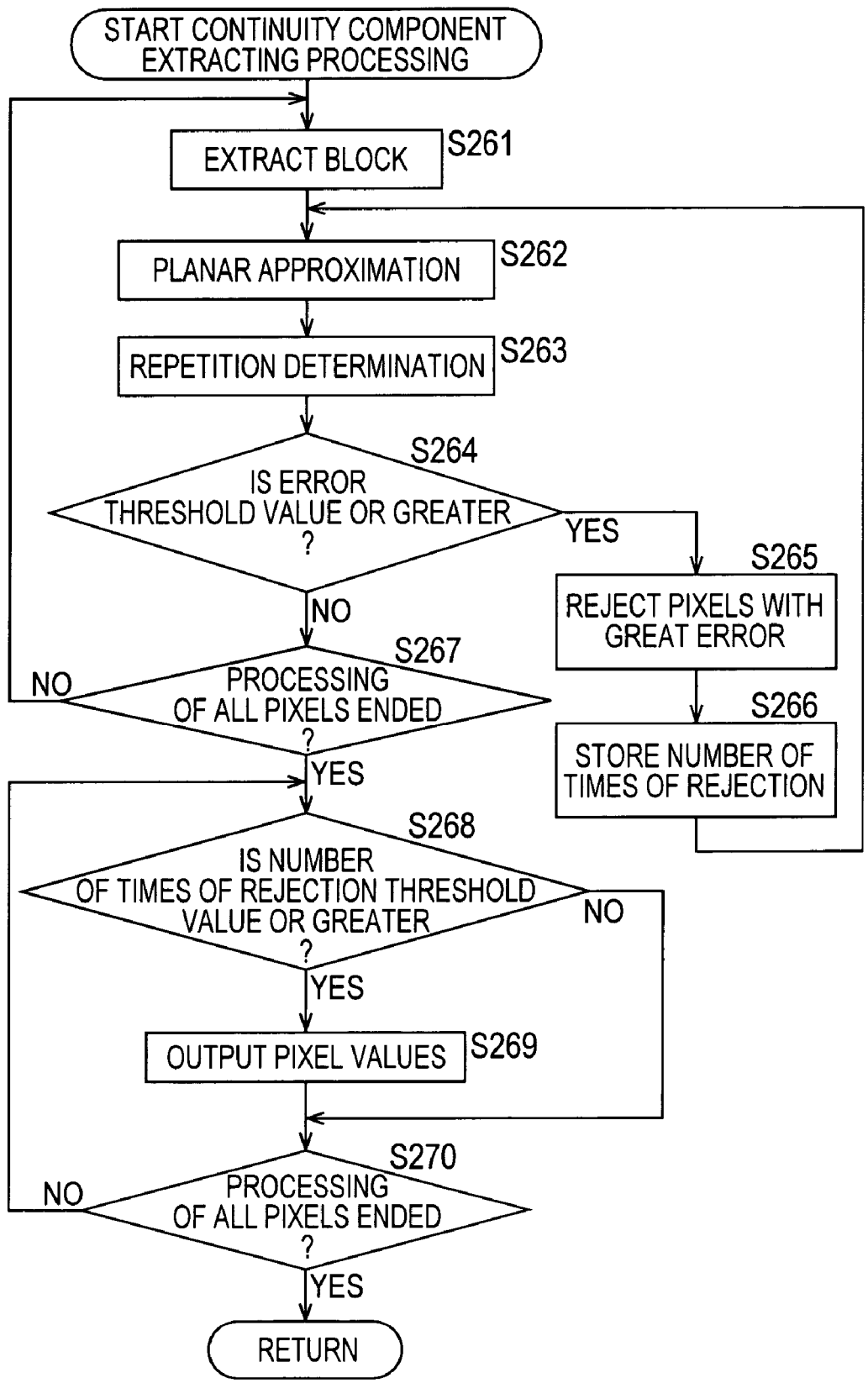
FIG. 47 is a flowchart describing other processing for extracting the continuity component.

FIG. 47 is a flowchart for describing other processing for extracting the continuity component with the non-continuity component extracting unit 201 of which the configuration is shown in FIG. 43, instead of the processing for extracting the non-continuity component corresponding to step S201. The processing of step S261 through step S265 is the same as the processing of step S221 through step S225, so description thereof will be omitted.

In step S266, the repetition determining unit 223 stores the number of times of rejection for each pixel, the flow returns to step S262, and the processing is repeated.

In step S264, in the event that determination is made that the standard error is not equal to or greater than the threshold value, the block has been approximated on the plane, so the flow proceeds to step S267, the repetition determining unit 223 determines whether or not processing of all pixels of one screen of the input image has ended, and in the event that determination is made that there are still pixels which have not yet been taken as the object of processing, the flow returns to step S261, with regard to a pixel which has not yet been subjected to the processing, a block is extracted, and the above processing is repeated.

In the event that determination is made in step S267 that processing has ended for all pixels of one screen of the input image, the flow proceeds to step S268, the repetition determining unit 223 selects a pixel which has not yet been selected, and determines whether or not the number of times of rejection of the selected pixel is equal to or greater than a threshold value. For example, the repetition determining unit 223 determines in step S268 whether or not the number of times of rejection of the selected pixel is equal to or greater than a threshold value stored beforehand.

In the event that determination is made in step S268 that the number of times of rejection of the selected pixel is equal to or greater than the threshold value, the selected pixel contains the continuity component, so the flow proceeds to step S269, where the repetition determining unit 223 outputs the pixel value of the selected pixel (the pixel value in the input image) as the continuity component of the input image, and the flow proceeds to step S270.

In the event that determination is made in step S268 that the number of times of rejection of the selected pixel is not equal to or greater than the threshold value, the selected pixel does not contain the continuity component, so the processing in step S269 is skipped, and the procedure proceeds to step S270. That is to say, the pixel value of a pixel regarding which determination has been made that the number of times of rejection is not equal to or greater than the threshold value is not output.

Note that an arrangement may be made wherein the repetition determining unit 223 outputs a pixel value set to 0 for pixels regarding which determination has been made that the number of times of rejection is not equal to or greater than the threshold value.

In step S270, the repetition determining unit 223 determines whether or not processing of all pixels of one screen of the input image has ended to determine whether or not the number of times of rejection is equal to or greater than the threshold value, and in the event that determination is made that processing has not ended for all pixels, this means that there are still pixels which have not yet been taken as the object of processing, so the flow returns to step S268, a pixel which has not yet been subjected to the processing is selected, and the above processing is repeated.

In the event that determination is made in step S270 that processing has ended for all pixels of one screen of the input image, the processing ends.

Thus, of the pixels of the input image, the non-continuity component extracting unit 201 can output the pixel values of pixels containing the continuity component, as continuity component information. That is to say, of the pixels of the input image, the non-continuity component extracting unit 201 can output the pixel values of pixels containing the component of the fine line image.

Figure 48:
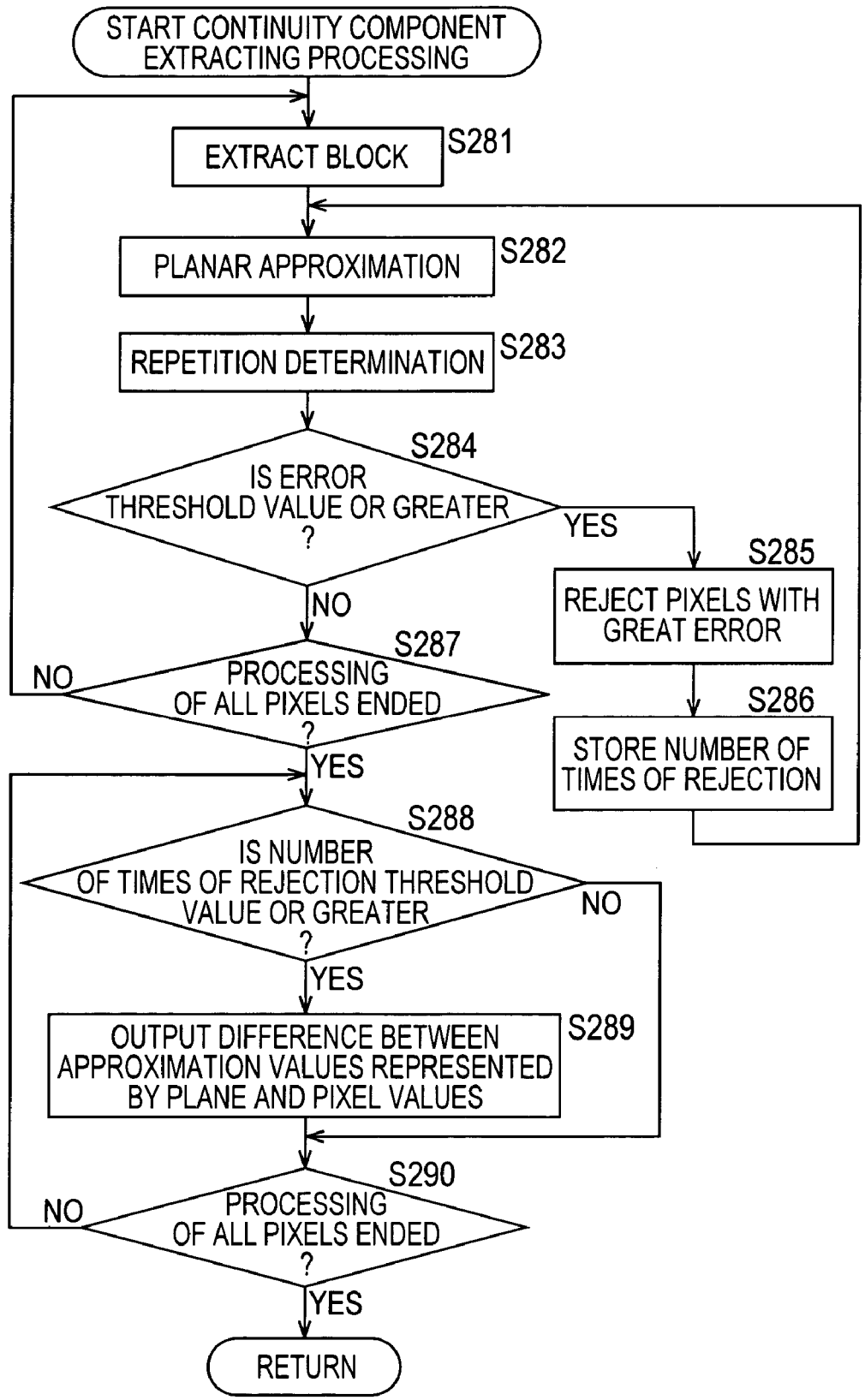
FIG. 48 is a flowchart describing still other processing for extracting the continuity component.

FIG. 48 is a flowchart for describing yet other processing for extracting the continuity component with the non-continuity component extracting unit 201 of which the configuration is shown in FIG. 43, instead of the processing for extracting the non-continuity component corresponding to step S201. The processing of step S281 through step S288 is the same as the processing of step S261 through step S268, so description thereof will be omitted.

In step S289, the repetition determining unit 223 outputs the difference between the approximation value represented by the plane, and the pixel value of a selected pixel, as the continuity component of the input image. That is to say, the repetition determining unit 223 outputs an image wherein the non-continuity component has been removed from the input image, as the continuity information.

The processing of step S290 is the same as the processing of step S270, and accordingly description thereof will be omitted.

Thus, the non-continuity component extracting unit 201 can output an image wherein the non-continuity component has been removed from the input image as the continuity information.

As described above, in a case wherein real world light signals are projected, a non-continuous portion of pixel values of multiple pixels of first image data wherein a part of the continuity of the real world light signals has been lost is detected, data continuity is detected from the detected non-continuous portions, a model (function) is generated for approximating the light signals by estimating the continuity of the real world light signals based on the detected data continuity, and second image data is generated based on the generated function, processing results which are more accurate and have higher precision as to the event in the real world can be obtained.

Figure 49:
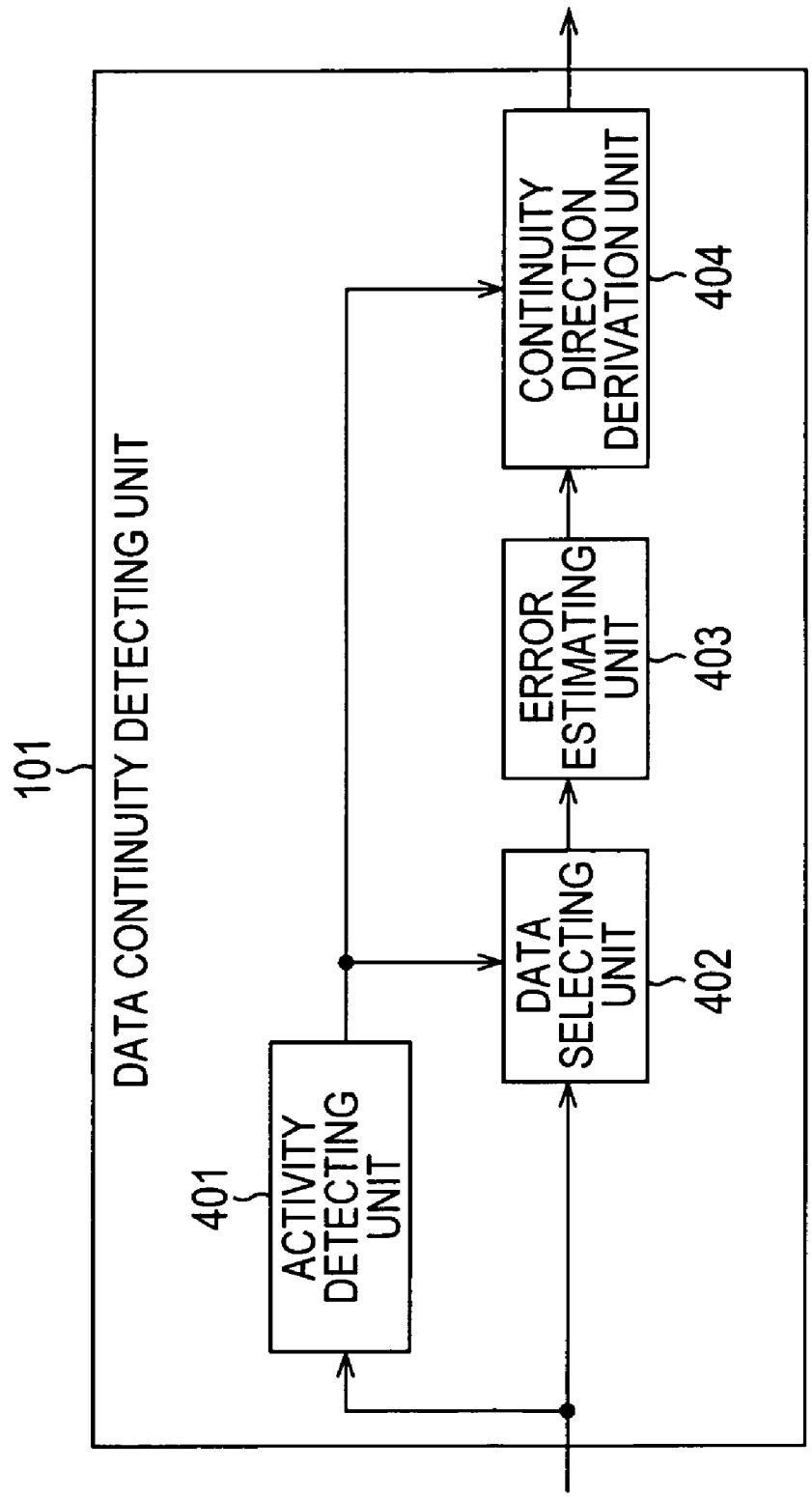
FIG. 49 is a block diagram illustrating another configuration of a continuity component extracting unit 101.

FIG. 49 is a block diagram illustrating another configuration of the data continuity detecting unit 101.

With the data continuity detecting unit 101 of which the configuration is shown in FIG. 49, change in the pixel value of the pixel of interest which is a pixel of interest in the spatial direction of the input image, i.e. activity in the spatial direction of the input image, is detected, multiple sets of pixels made up of a predetermined number of pixels in one row in the vertical direction or one row in the horizontal direction are extracted for each angle based on the pixel of interest and a reference axis according to the detected activity, the correlation of the extracted pixel sets is detected, and the angle of data continuity based on the reference axis in the input image is detected based on the correlation.

The angle of data continuity means an angle assumed by the reference axis, and the direction of a predetermined dimension where constant characteristics repeatedly appear in the data 3. Constant characteristics repeatedly appearing means a case wherein, for example, the change in value as to the change in position in the data 3, i.e., the cross-sectional shape, is the same, and so forth.

The reference axis may be, for example, an axis indicating the spatial direction X (the horizontal direction of the screen), an axis indicating the spatial direction Y (the vertical direction of the screen), and so forth.

The input image is supplied to an activity detecting unit 401 and data selecting unit 402.

The activity detecting unit 401 detects change in the pixel values as to the spatial direction of the input image, i.e., activity in the spatial direction, and supplies the activity information which indicates the detected results to the data selecting unit 402 and a continuity direction derivation unit 404.

For example, the activity detecting unit 401 detects the change of a pixel value as to the horizontal direction of the screen, and the change of a pixel value as to the vertical direction of the screen, and compares the detected change of the pixel value in the horizontal direction and the change of the pixel value in the vertical direction, thereby detecting whether the change of the pixel value in the horizontal direction is greater as compared with the change of the pixel value in the vertical direction, or whether the change of the pixel value in the vertical direction is greater as compared with the change of the pixel value in the horizontal direction.

The activity detecting unit 401 supplies to the data selecting unit 402 and the continuity direction derivation unit 404 activity information, which is the detection results, indicating that the change of the pixel value in the horizontal direction is greater as compared with the change of the pixel value in the vertical direction, or indicating that the change of the pixel value in the vertical direction is greater as compared with the change of the pixel value in the horizontal direction.

Figure 50:
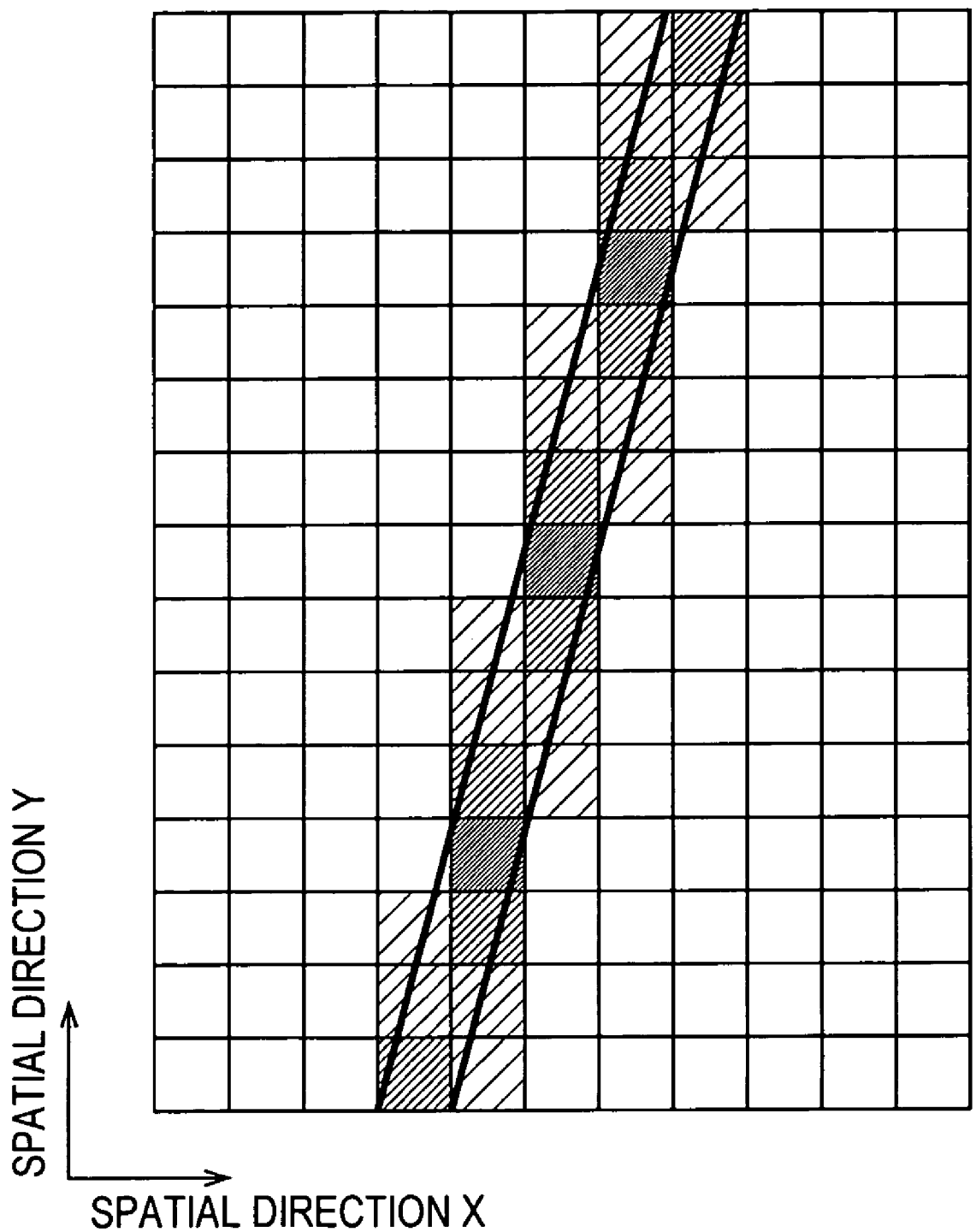
FIG. 50 is a diagram for describing the activity in an input image having data continuity.

In the event that the change of the pixel value in the horizontal direction is greater as compared with the change of the pixel value in the vertical direction, arc shapes (half-disc shapes) or pawl shapes are formed on one row of pixels in the vertical direction, as indicated by FIG. 50 for example, and the arc shapes or pawl shapes are formed repetitively more in the vertical direction. That is to say, in the event that the change of the pixel value in the horizontal direction is greater as compared with the change of the pixel value in the vertical direction, with the reference axis as the axis representing the spatial direction X, the angle of the data continuity based on the reference axis in the input image is a value of any from 45 degrees to 90 degrees.

In the event that the change of the pixel value in the vertical direction is greater as compared with the change of the pixel value in the horizontal direction, arc shapes or pawl shapes are formed on one row of pixels in the vertical direction, for example, and the arc shapes or pawl shapes are formed repetitively more in the horizontal direction. That is to say, in the event that the change of the pixel value in the vertical direction is greater as compared with the change of the pixel value in the horizontal direction, with the reference axis as the axis representing the spatial direction X, the angle of the data continuity based on the reference axis in the input image is a value of any from 0 degrees to 45 degrees.

Figure 51:
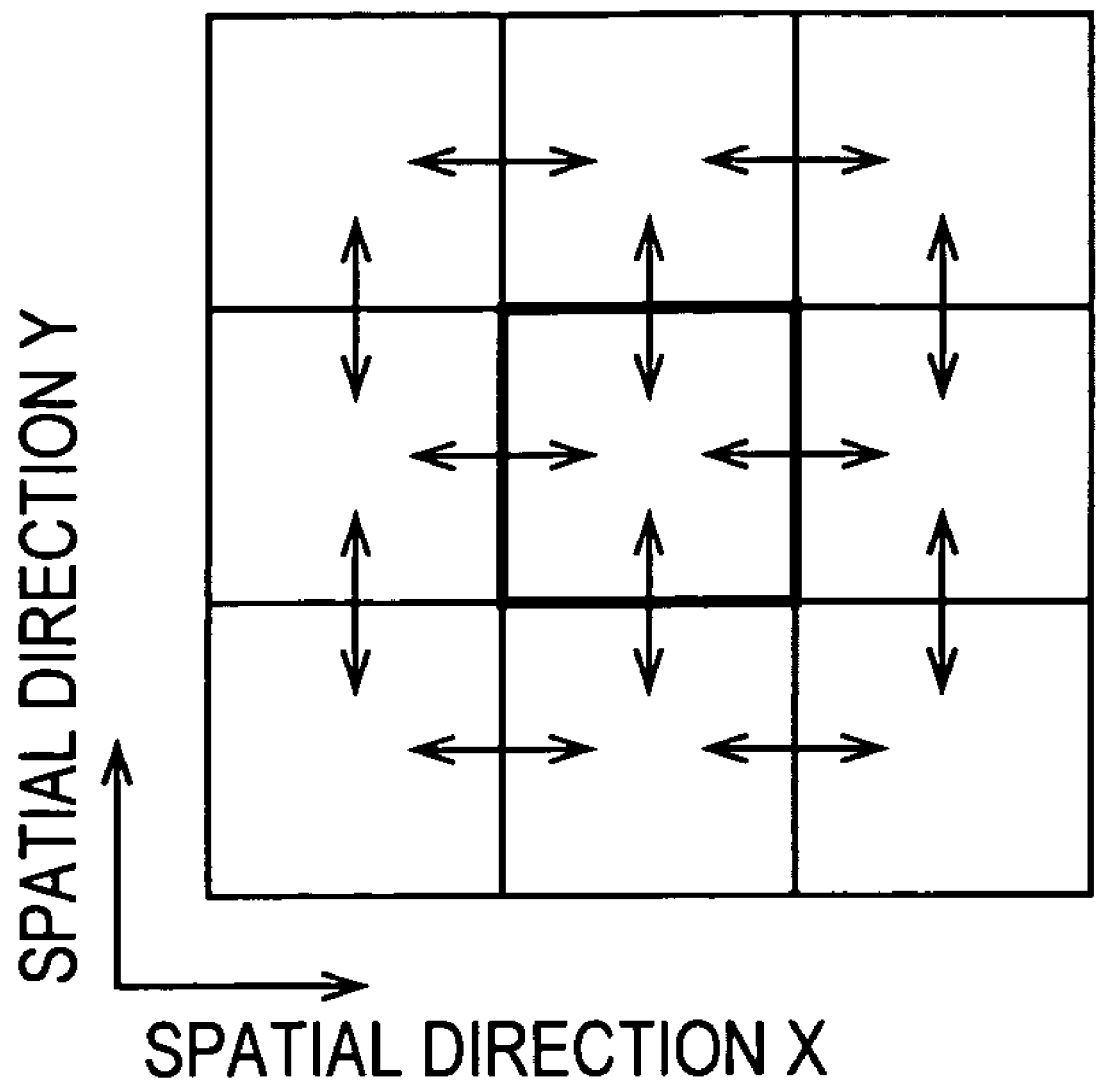
FIG. 51 is a diagram for describing a block for detecting activity.

For example, the activity detecting unit 401 extracts from the input image a block made up of the 9 pixels, 3×3 centered on the pixel of interest, as shown in FIG. 51. The activity detecting unit 401 calculates the sum of differences of the pixels values regarding the pixels vertically adjacent, and the sum of differences of the pixels values regarding the pixels horizontally adjacent. The sum of differences $h_{diff}$ of the pixels values regarding the pixels horizontally adjacent can be obtained with Expression (35).

$$h_{diff} = \Sigma(P_{i+1,j} - P_{i,j}) \tag{35}$$

In the same way, the sum of differences $v_{diff}$ of the pixels values regarding the pixels vertically adjacent can be obtained with Expression (36).

$$v_{diff} = \Sigma(P_{i,j+1} - P_{i,j}) \tag{36}$$

In Expression (35) and Expression (36), P represents the pixel value, i represents the position of the pixel in the horizontal direction, and j represents the position of the pixel in the vertical direction.

An arrangement may be made wherein the activity detecting unit 401 compares the calculated sum of differences $h_{diff}$ of the pixels values regarding the pixels horizontally adjacent with the sum of differences $v_{diff}$ of the pixels values regarding the pixels vertically adjacent, so as to determine the range of the angle of the data continuity based on the reference axis in the input image. That is to say, in this case, the activity detecting unit 401 determines whether a shape indicated by change in the pixel value as to the position in the spatial direction is formed repeatedly in the horizontal direction, or formed repeatedly in the vertical direction.

For example, change in pixel values in the horizontal direction with regard to an arc formed on pixels in one horizontal row is greater than the change of pixel values in the vertical direction, change in pixel values in the vertical direction with regard to an arc formed on pixels in one horizontal row is greater than the change of pixel values in the horizontal direction, and it can be said that the direction of data continuity, i.e., the change in the direction of the predetermined dimension of a constant feature which the input image that is the data 3 has is smaller in comparison with the change in the orthogonal direction too the data continuity. In other words, the difference of the direction orthogonal to the direction of data continuity (hereafter also referred to as non-continuity direction) is greater as compared to the difference in the direction of data continuity.

Figure 52:
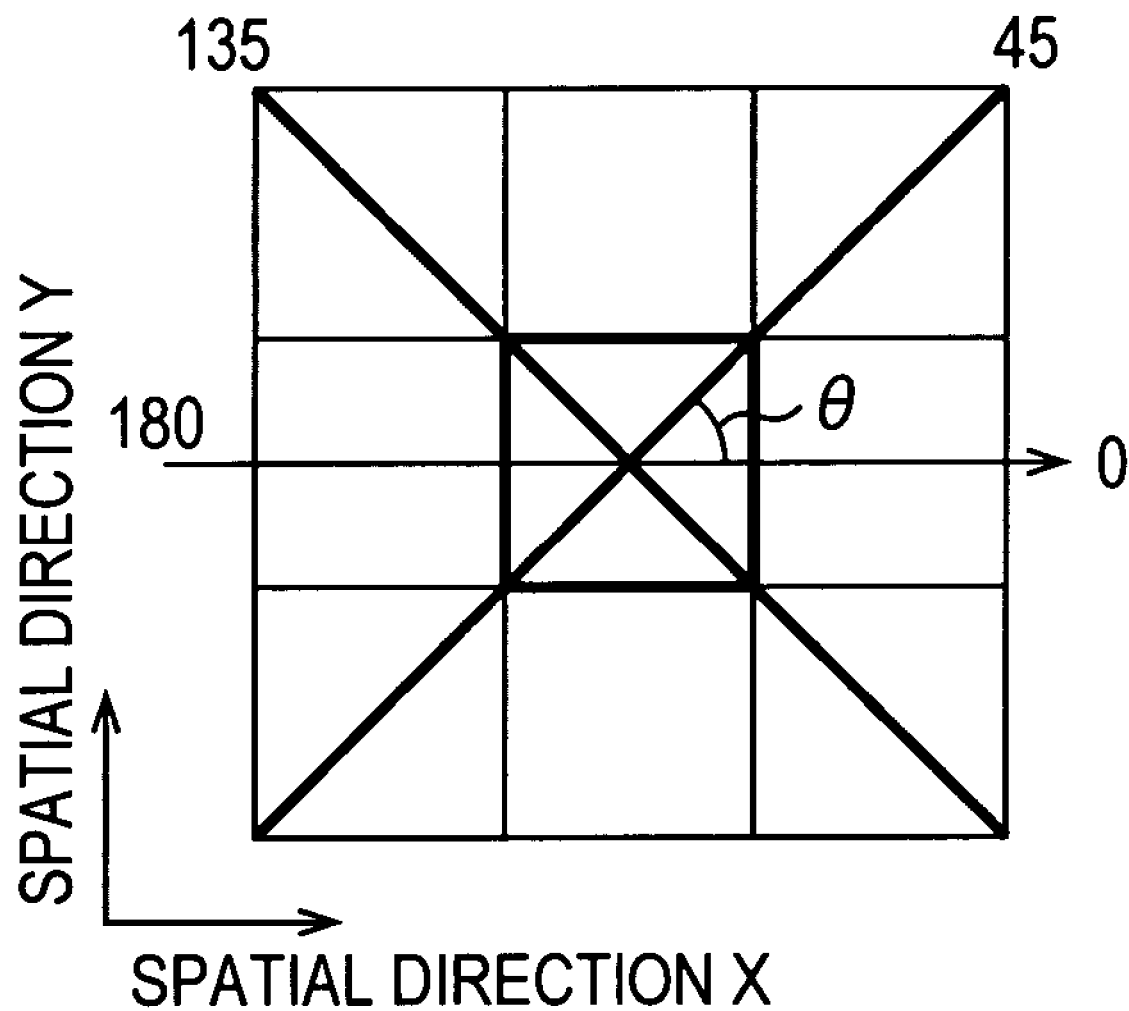
FIG. 52 is a diagram for describing the angle of data continuity as to activity.

For example, as shown in FIG. 52, the activity detecting unit 401 compares the calculated sum of differences $h_{diff}$ of the pixels values regarding the pixels horizontally adjacent with the sum of differences $v_{diff}$ of the pixels values regarding the pixels vertically adjacent, and in the event that the sum of differences $h_{diff}$ of the pixels values regarding the pixels horizontally adjacent is greater, determines that the angle of the data continuity based on the reference axis is a value of any from 45 degrees to 135 degrees, and in the event that the sum of differences $v_{diff}$ of the pixels values regarding the pixels vertically adjacent is greater, determines that the angle of the data continuity based on the reference axis is a value of any from 0 degrees to 45 degrees, or a value of any from 135 degrees to 180 degrees.

For example, the activity detecting unit 401 supplies activity information indicating the determination results to the data selecting unit 402 and the continuity direction derivation unit 404.

Note that the activity detecting unit 401 can detect activity by extracting blocks of arbitrary sizes, such as a block made up of 25 pixels of 5×5, a block made up of 49 pixels of 7×7, and so forth.

The data selecting unit 402 sequentially selects pixels of interest from the pixels of the input image, and extracts multiple sets of pixels made up of a predetermined number of pixels in one row in the vertical direction or one row in the horizontal direction for each angle based on the pixel of interest and the reference axis, based on the activity information supplied from the activity detecting unit 401.

For example, in the event that the activity information indicates that the change in pixel values in the horizontal direction is greater in comparison with the change in pixel values in the vertical direction, this means that the data continuity angle is a value of any from 45 degrees to 135 degrees, so the data selecting unit 402 extracts multiple sets of pixels made up of a predetermined number of pixels in one row in the vertical direction, for each predetermined angle in the range of 45 degrees to 135 degrees, based on the pixel of interest and the reference axis.

In the event that the activity information indicates that the change in pixel values in the vertical direction is greater in comparison with the change in pixel values in the horizontal direction, this means that the data continuity angle is a value of any from 0 degrees to 45 degrees or from 135 degrees to 180 degrees, so the data selecting unit 402 extracts multiple sets of pixels made up of a predetermined number of pixels in one row in the horizontal direction, for each predetermined angle in the range of 0 degrees to 45 degrees or 135 degrees to 180 degrees, based on the pixel of interest and the reference axis.

Also, for example, in the event that the activity information indicates that the angle of data continuity is a value of any from 45 degrees to 135 degrees, the data selecting unit 402 extracts multiple sets of pixels made up of a predetermined number of pixels in one row in the vertical direction, for each predetermined angle in the range of 45 degrees to 135 degrees, based on the pixel of interest and the reference axis.

In the event that the activity information indicates that the angle of data continuity is a value of any from 0 degrees to 45 degrees or from 135 degrees to 180 degrees, the data selecting unit 402 extracts multiple sets of pixels made up of a predetermined number of pixels in one row in the horizontal direction, for each predetermined angle in the range of 0 degrees to 45 degrees or 135 degrees to 180 degrees, based on the pixel of interest and the reference axis.

The data selecting unit 402 supplies the multiple sets made up of the extracted pixels to an error estimating unit 403.

The error estimating unit 403 detects correlation of pixel sets for each angle with regard to the multiple sets of extracted pixels.

For example, with regard to the multiple sets of pixels made up of a predetermined number of pixels in one row in the vertical direction corresponding to one angle, the error estimating unit 403 detects the correlation of the pixels values of the pixels at corresponding positions of the pixel sets. With regard to the multiple sets of pixels made up of a predetermined number of pixels in one row in the horizontal direction corresponding to one angle, the error estimating unit 403 detects the correlation of the pixels values of the pixels at corresponding positions of the sets.

The error estimating unit 403 supplies correlation information indicating the detected correlation to the continuity direction derivation unit 404. The error estimating unit 403 calculates the sum of the pixel values of pixels of a set including the pixel of interest supplied from the data selecting unit 402 as values indicating correlation, and the absolute value of difference of the pixel values of the pixels at corresponding positions in other sets, and supplies the sum of absolute value of difference to the continuity direction derivation unit 404 as correlation information.

Based on the correlation information supplied from the error estimating unit 403, the continuity direction derivation unit 404 detects the data continuity angle based on the reference axis in the input image, corresponding to the lost continuity of the light signals of the actual world 1, and outputs data continuity information indicating an angle. For example, based on the correlation information supplied from the error estimating unit 403, the continuity direction derivation unit 404 detects an angle corresponding to the pixel set with the greatest correlation as the data continuity angle, and outputs data continuity information indicating the angle corresponding to the pixel set with the greatest correlation that has been detected.

The following description will be made regarding detection of data continuity angle in the range of 0 degrees through 90 degrees (the so-called first quadrant).

Figure 53:
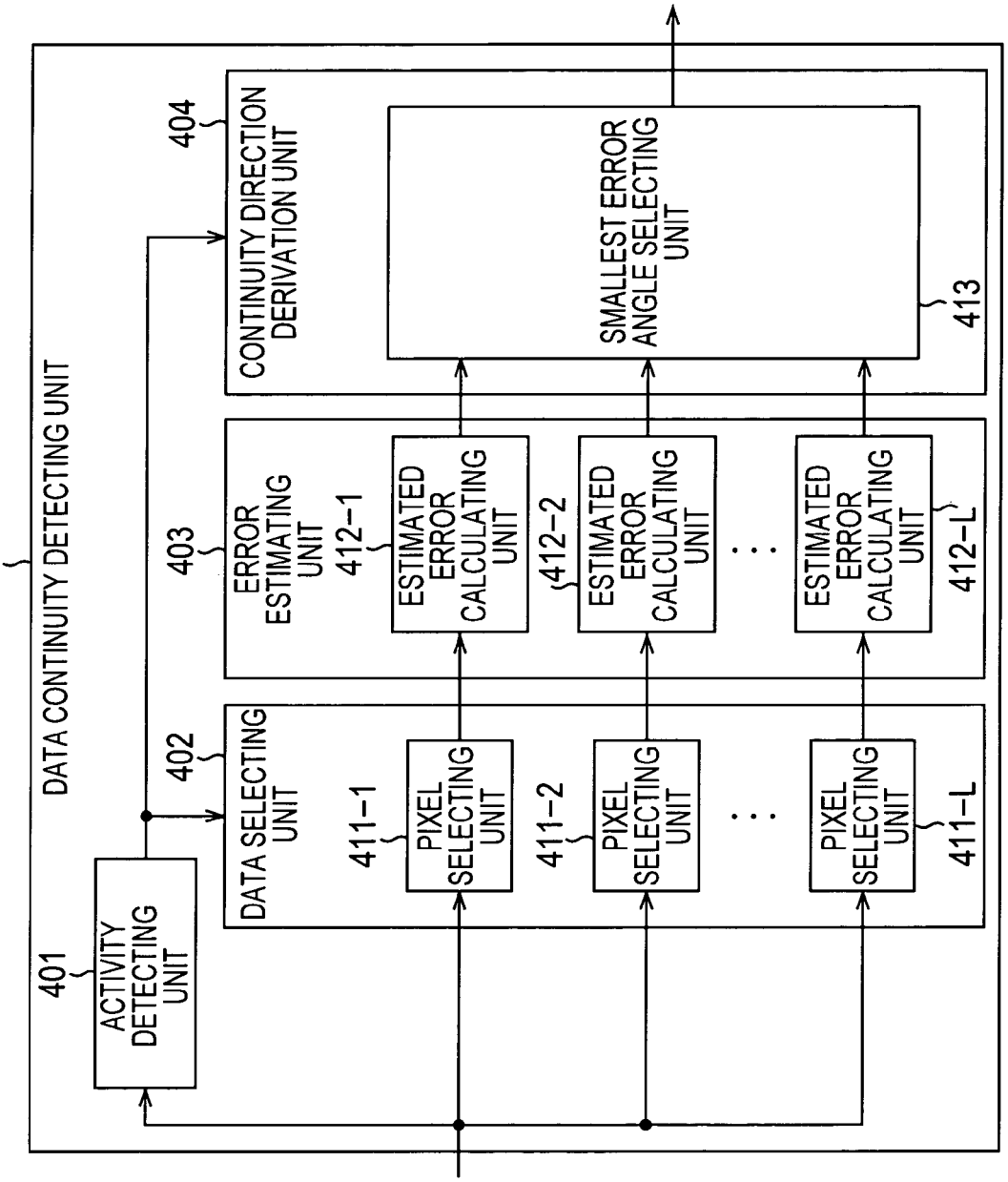
FIG. 53 is a block diagram illustrating a detailed configuration of the data continuity detecting unit 101.

FIG. 53 is a block diagram illustrating a more detailed configuration of the data continuity detecting unit 101 shown in FIG. 49.

The data selecting unit 402 includes pixel selecting unit 411-1 through pixel selecting unit 411-L. The error estimating unit 403 includes estimated error calculating unit 412-1 through estimated error calculating unit 412-L. The continuity direction derivation unit 404 includes a smallest error angle selecting unit 413.

First, description will be made regarding the processing of the pixel selecting unit 411-1 through pixel selecting unit 411-L in the event that the data continuity angle indicated by the activity information is a value of any from 45 degrees to 135 degrees.

The pixel selecting unit 411-1 through pixel selecting unit 411-L set straight lines of mutually differing predetermined angles which pass through the pixel of interest, with the axis indicating the spatial direction x as the reference axis. The pixel selecting unit 411-1 through pixel selecting unit 411-L select, of the pixels belonging to a vertical row of pixels to which the pixel of interest belongs, a predetermined number of pixels above the pixel of interest, and predetermined number of pixels below the pixel of interest, and the pixel of interest, as a set.

Figure 54:
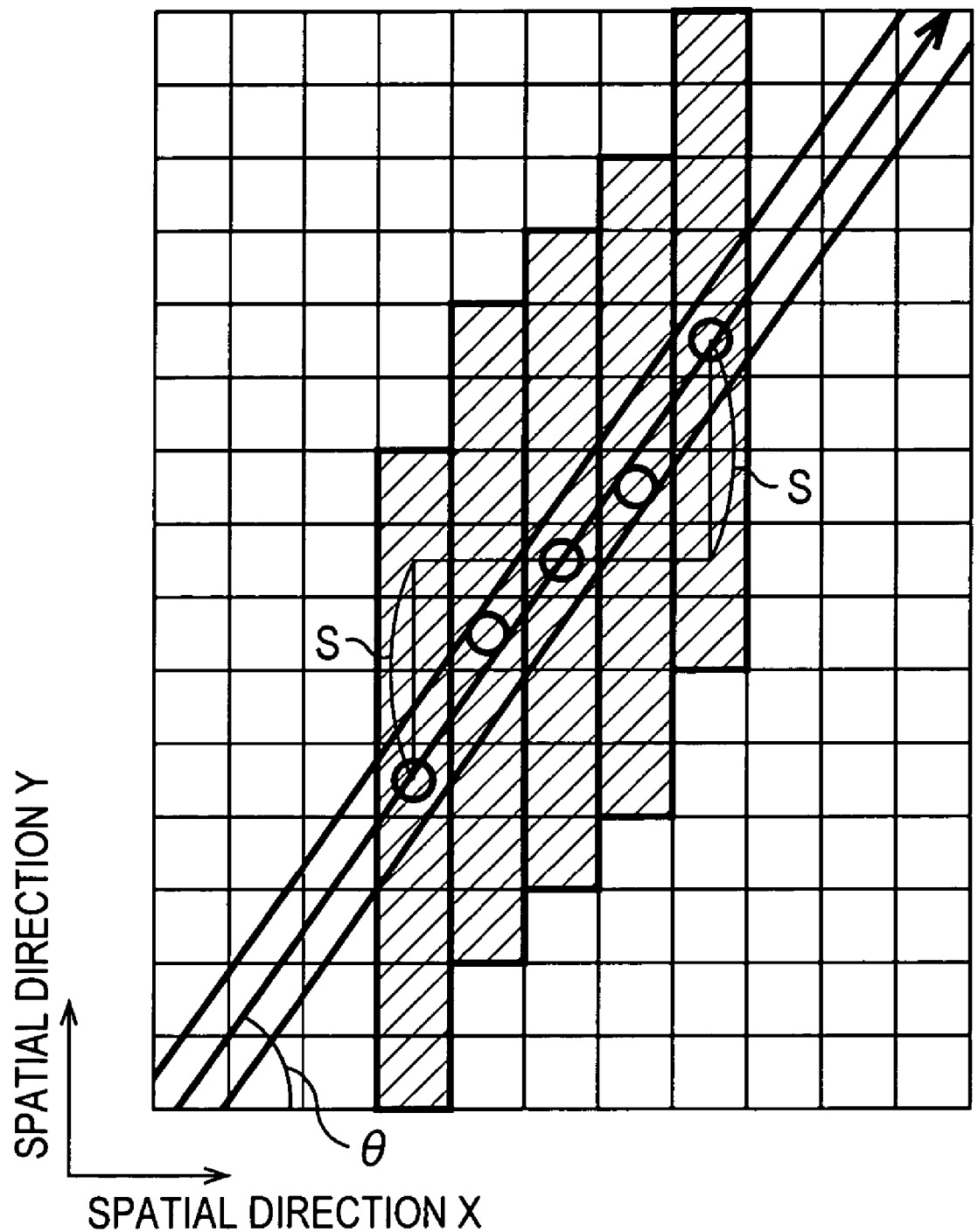
FIG. 54 is a diagram describing a set of pixels.

For example, as shown in FIG. 54, the pixel selecting unit 411-1 through pixel selecting unit 411-L select 9 pixels centered on the pixel of interest, as a set of pixels, from the pixels belonging to a vertical row of pixels to which the pixel of interest belongs.

In FIG. 54, one grid-shaped square (one grid) represents one pixel. In FIG. 54, the circle shown at the center represents the pixel of interest.

The pixel selecting unit 411-1 through pixel selecting unit 411-L select, from pixels belonging to a vertical row of pixels to the left of the vertical row of pixels to which the pixel of interest belongs, a pixel at the position closest to the straight line set for each. In FIG. 54, the circle to the lower left of the pixel of interest represents an example of a selected pixel. The pixel selecting unit 411-1 through pixel selecting unit 411-L then select, from the pixels belonging to the vertical row of pixels to the left of the vertical row of pixels to which the pixel of interest belongs, a predetermined number of pixels above the selected pixel, a predetermined number of pixels below the selected pixel, and the selected pixel, as a set of pixels.

For example, as shown in FIG. 54, the pixel selecting unit 411-1 through pixel selecting unit 411-L select 9 pixels centered on the pixel at the position closest to the straight line, from the pixels belonging to the vertical row of pixels to the left of the vertical row of pixels to which the pixel of interest belongs, as a set of pixels.

The pixel selecting unit 411-1 through pixel selecting unit 411-L select, from pixels belonging to a vertical row of pixels second left from the vertical row of pixels to which the pixel of interest belongs, a pixel at the position closest to the straight line set for each. In FIG. 54, the circle to the far left represents an example of the selected pixel. The pixel selecting unit 411-1 through pixel selecting unit 411-L then select, as a set of pixels, from the pixels belonging to the vertical row of pixels second left from the vertical row of pixels to which the pixel of interest belongs, a predetermined number of pixels above the selected pixel, a predetermined number of pixels below the selected pixel, and the selected pixel.

For example, as shown in FIG. 54, the pixel selecting unit 411-1 through pixel selecting unit 411-L select 9 pixels centered on the pixel at the position closest to the straight line, from the pixels belonging to the vertical row of pixels second left from the vertical row of pixels to which the pixel of interest belongs, as a set of pixels.

The pixel selecting unit 411-1 through pixel selecting unit 411-L select, from pixels belonging to a vertical row of pixels to the right of the vertical row of pixels to which the pixel of interest belongs, a pixel at the position closest to the straight line set for each. In FIG. 54, the circle to the upper right of the pixel of interest represents an example of a selected pixel. The pixel selecting unit 411-1 through pixel selecting unit 411-L then select, from the pixels belonging to the vertical row of pixels to the right of the vertical row of pixels to which the pixel of interest belongs, a predetermined number of pixels above the selected pixel, a predetermined number of pixels below the selected pixel, and the selected pixel, as a set of pixels.

For example, as shown in FIG. 54, the pixel selecting unit 411-1 through pixel selecting unit 411-L select 9 pixels centered on the pixel at the position closest to the straight line, from the pixels belonging to the vertical row of pixels to the right of the vertical row of pixels to which the pixel of interest belongs, as a set of pixels.

The pixel selecting unit 411-1 through pixel selecting unit 411-L select, from pixels belonging to a vertical row of pixels second right from the vertical row of pixels to which the pixel of interest belongs, a pixel at the position closest to the straight line set for each. In FIG. 54, the circle to the far right represents an example of the selected pixel. The pixel selecting unit 411-1 through pixel selecting unit 411-L then select, from the pixels belonging to the vertical row of pixels second right from the vertical row of pixels to which the pixel of interest belongs, a predetermined number of pixels above the selected pixel, a predetermined number of pixels below the selected pixel, and the selected pixel, as a set of pixels.

For example, as shown in FIG. 54, the pixel selecting unit 411-1 through pixel selecting unit 411-L select 9 pixels centered on the pixel at the position closest to the straight line, from the pixels belonging to the vertical row of pixels second right from the vertical row of pixels to which the pixel of interest belongs, as a set of pixels.

Thus, the pixel selecting unit 411-1 through pixel selecting unit 411-L each select five sets of pixels.

The pixel selecting unit 411-1 through pixel selecting unit 411-L select pixel sets for (lines set to) mutually different angles. For example, the pixel selecting unit 411-1 selects sets of pixels regarding 45 degrees, the pixel selecting unit 411-2 selects sets of pixels regarding 47.5 degrees, and the pixel selecting unit 411-3 selects sets of pixels regarding 50 degrees. The pixel selecting unit 411-1 through pixel selecting unit 411-L select sets of pixels regarding angles every 2.5 degrees, from 52.5 degrees through 135 degrees.

Note that the number of pixel sets may be an optional number, such as 3 or 7, for example, and does not restrict the present invention. Also, the number of pixels selected as one set may be an optional number, such as 5 or 13, for example, and does not restrict the present invention.

Note that the pixel selecting unit 411-1 through pixel selecting unit 411-L may be arranged to select pixel sets from pixels within a predetermined range in the vertical direction. For example, the pixel selecting unit 411-1 through pixel selecting unit 411-L can select pixel sets from 121 pixels in the vertical direction (60 pixels upward from the pixel of interest, and 60 pixels downward). In this case, the data continuity detecting unit 101 can detect the angle of data continuity up to 88.09 degrees as to the axis representing the spatial direction X.

The pixel selecting unit 411-1 supplies the selected set of pixels to the estimated error calculating unit 412-1, and the pixel selecting unit 411-2 supplies the selected set of pixels to the estimated error calculating unit 412-2. In the same way, each pixel selecting unit 411-3 through pixel selecting unit 411-L supplies the selected set of pixels to each estimated error calculating unit 412-3 through estimated error calculating unit 412-L.

The estimated error calculating unit 412-1 through estimated error calculating unit 412-L detect the correlation of the pixels values of the pixels at positions in the multiple sets, supplied from each of the pixel selecting unit 411-1 through pixel selecting unit 411-L. For example, the estimated error calculating unit 412-1 through estimated error calculating unit 412-L calculates, as a value indicating the correlation, the sum of absolute values of difference between the pixel values of the pixels of the set containing the pixel of interest, and the pixel values of the pixels at corresponding positions in other sets, supplied from one of the pixel selecting unit 411-1 through pixel selecting unit 411-L.

More specifically, based on the pixel values of the pixels of the set containing the pixel of interest and the pixel values of the pixels of the set made up of pixels belonging to one vertical row of pixels to the left side of the pixel of interest supplied from one of the pixel selecting unit 411-1 through pixel selecting unit 411-L, the estimated error calculating unit 412-1 through estimated error calculating unit 412-L calculates the difference of the pixel values of the topmost pixel, then calculates the difference of the pixel values of the second pixel from the top, and so on to calculate the absolute values of difference of the pixel values in order from the top pixel, and further calculates the sum of absolute values of the calculated differences. Based on the pixel values of the pixels of the set containing the pixel of interest and the pixel values of the pixels of the set made up of pixels belonging to one vertical row of pixels two to the left from the pixel of interest supplied from one of the pixel selecting unit 411-1 through pixel selecting unit 411-L, the estimated error calculating unit 412-1 through estimated error calculating unit 412-L calculates the absolute values of difference of the pixel values in order from the top pixel, and calculates the sum of absolute values of the calculated differences.

Then, based on the pixel values of the pixels of the set containing the pixel of interest and the pixel values of the pixels of the set made up of pixels belonging to one vertical row of pixels to the right side of the pixel of interest supplied from one of the pixel selecting unit 411-1 through pixel selecting unit 411-L, the estimated error calculating unit 412-1 through estimated error calculating unit 412-L calculates the difference of the pixel values of the topmost pixel, then calculates the difference of the pixel values of the second pixel from the top, and so on to calculate the absolute values of difference of the pixel values in order from the top pixel, and further calculates the sum of absolute values of the calculated differences. Based on the pixel values of the pixels of the set containing the pixel of interest and the pixel values of the pixels of the set made up of pixels belonging to one vertical row of pixels two to the right from the pixel of interest supplied from one of the pixel selecting unit 411-1 through pixel selecting unit 411-L, the estimated error calculating unit 412-1 through estimated error calculating unit 412-L calculates the absolute values of difference of the pixel values in order from the top pixel, and calculates the sum of absolute values of the calculated differences.

The estimated error calculating unit 412-1 through estimated error calculating unit 412-L add all of the sums of absolute values of difference of the pixel values thus calculated, thereby calculating the aggregate of absolute values of difference of the pixel values.

The estimated error calculating unit 412-1 through estimated error calculating unit 412-L supply information indicating the detected correlation to the smallest error angle selecting unit 413. For example, the estimated error calculating unit 412-1 through estimated error calculating unit 412-L supply the aggregate of absolute values of difference of the pixel values calculated, to the smallest error angle selecting unit 413.

Note that the estimated error calculating unit 412-1 through estimated error calculating unit 412-L are not restricted to the sum of absolute values of difference of pixel values, and can also calculate other values as correlation values as well, such as the sum of squared differences of pixel values, or correlation coefficients based on pixel values, and so forth.

The smallest error angle selecting unit 413 detects the data continuity angle based on the reference axis in the input image which corresponds to the continuity of the image which is the lost actual world 1 light signals, based on the correlation detected by the estimated error calculating unit 412-1 through estimated error calculating unit 412-L with regard to mutually different angles. That is to say, based on the correlation detected by the estimated error calculating unit 412-1 through estimated error calculating unit 412-L with regard to mutually different angles, the smallest error angle selecting unit 413 selects the greatest correlation, and takes the angle regarding which the selected correlation was detected as the data continuity angle based on the reference axis, thereby detecting the data continuity angle based on the reference axis in the input image.

For example, of the aggregates of absolute values of difference of the pixel values supplied from the estimated error calculating unit 412-1 through estimated error calculating unit 412-L, the smallest error angle selecting unit 413 selects the smallest aggregate. With regard to the pixel set of which the selected aggregate was calculated, the smallest error angle selecting unit 413 makes reference to a pixel belonging to the one vertical row of pixels two to the left from the pixel of interest and at the closest pixel position to the straight line, and to a pixel belonging to the one vertical row of pixels two to the right from the pixel of interest and at the closest pixel position to the straight line.

Figure 55:
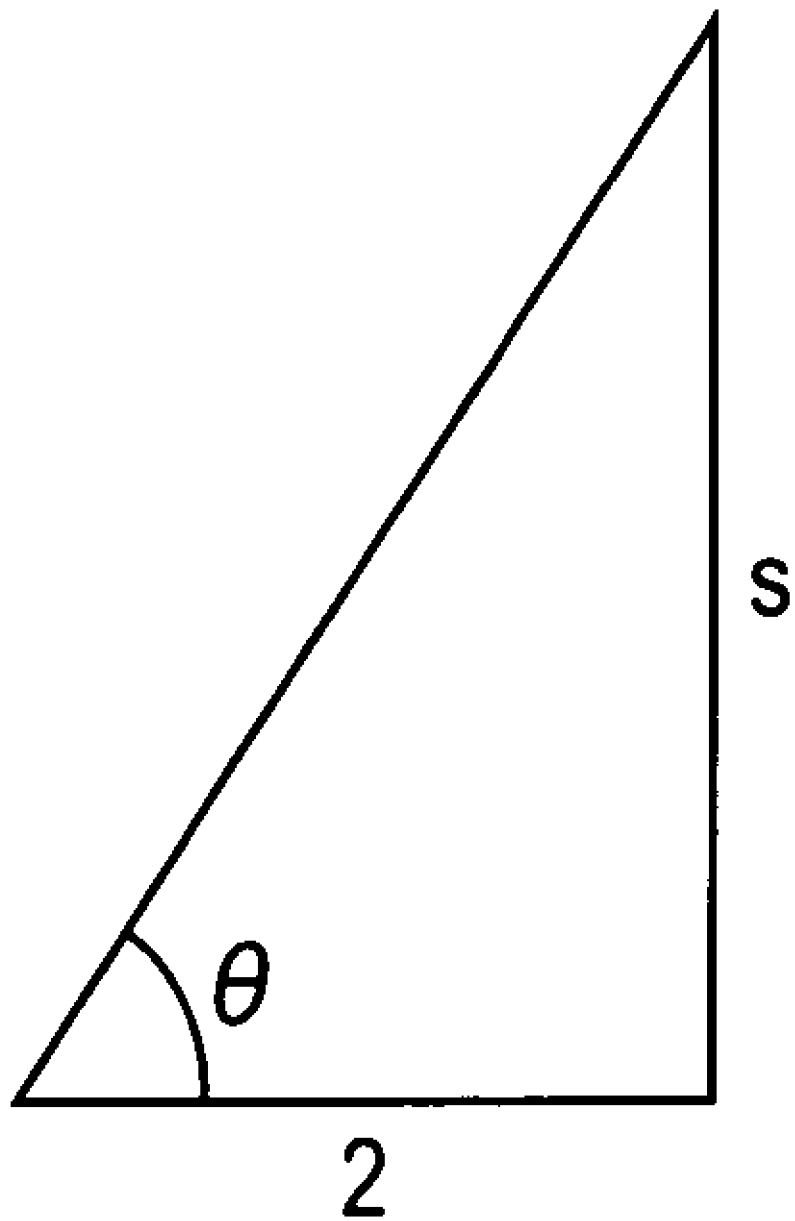
FIG. 55 is a diagram describing the relation between the position of a pixel set and the angle of data continuity.

As shown in FIG. 54, the smallest error angle selecting unit 413 obtains the distance S in the vertical direction of the position of the pixels to reference from the position of the pixel of interest. As shown in FIG. 55, the smallest error angle selecting unit 413 detects the angle θ of data continuity based on the axis indicating the spatial direction X which is the reference axis in the input image which is image data, that corresponds to the lost actual world 1 light signals continuity, from Expression (37).

$$\theta = \tan^{-1}\frac{S}{2} \tag{37}$$

Next, description will be made regarding the processing of the pixel selecting unit 411-1 through pixel selecting unit 411-L in the event that the data continuity angle indicated by the activity information is a value of any from 0 degrees to 45 degrees and 135 degrees to 180 degrees.

The pixel selecting unit 411-1 through pixel selecting unit 411-L set straight lines of predetermined angles which pass through the pixel of interest, with the axis indicating the spatial direction X as the reference axis, and select, of the pixels belonging to a horizontal row of pixels to which the pixel of interest belongs, a predetermined number of pixels to the left of the pixel of interest, and predetermined number of pixels to the right of the pixel of interest, and the pixel of interest, as a pixel set.

The pixel selecting unit 411-1 through pixel selecting unit 411-L select, from pixels belonging to a horizontal row of pixels above the horizontal row of pixels to which the pixel of interest belongs, a pixel at the position closest to the straight line set for each. The pixel selecting unit 411-1 through pixel selecting unit 411-L then select, from the pixels belonging to the horizontal row of pixels above the horizontal row of pixels to which the pixel of interest belongs, a predetermined number of pixels to the left of the selected pixel, a predetermined number of pixels to the right of the selected pixel, and the selected pixel, as a pixel set.

The pixel selecting unit 411-1 through pixel selecting unit 411-L select, from pixels belonging to a horizontal row of pixels two above the horizontal row of pixels to which the pixel of interest belongs, a pixel at the position closest to the straight line set for each. The pixel selecting unit 411-1 through pixel selecting unit 411-L then select, from the pixels belonging to the horizontal row of pixels two above the horizontal row of pixels to which the pixel of interest belongs, a predetermined number of pixels to the left of the selected pixel, a predetermined number of pixels to the right of the selected pixel, and the selected pixel, as a pixel set.

The pixel selecting unit 411-1 through pixel selecting unit 411-L select, from pixels belonging to a horizontal row of pixels below the horizontal row of pixels to which the pixel of interest belongs, a pixel at the position closest to the straight line set for each. The pixel selecting unit 411-1 through pixel selecting unit 411-L then select, from the pixels belonging to the horizontal row of pixels below the horizontal row of pixels to which the pixel of interest belongs, a predetermined number of pixels to the left of the selected pixel, a predetermined number of pixels to the right of the selected pixel, and the selected pixel, as a pixel set.

The pixel selecting unit 411-1 through pixel selecting unit 411-L select, from pixels belonging to a horizontal row of pixels two below the horizontal row of pixels to which the pixel of interest belongs, a pixel at the position closest to the straight line set for each. The pixel selecting unit 411-1 through pixel selecting unit 411-L then select, from the pixels belonging to the horizontal row of pixels two below the horizontal row of pixels to which the pixel of interest belongs, a predetermined number of pixels to the left of the selected pixel, a predetermined number of pixels to the right of the selected pixel, and the selected pixel, as a pixel set.

Thus, the pixel selecting unit 411-1 through pixel selecting unit 411-L each select five sets of pixels.

The pixel selecting unit 411-1 through pixel selecting unit 411-L select pixel sets for mutually different angles. For example, the pixel selecting unit 411-1 selects sets of pixels regarding 0 degrees, the pixel selecting unit 411-2 selects sets of pixels regarding 2.5 degrees, and the pixel selecting unit 411-3 selects sets of pixels regarding 5 degrees. The pixel selecting unit 411-1 through pixel selecting unit 411-L select sets of pixels regarding angles every 2.5 degrees, from 7.5 degrees through 45 degrees and from 135 degrees through 180 degrees.

The pixel selecting unit 411-1 supplies the selected set of pixels to the estimated error calculating unit 412-1, and the pixel selecting unit 411-2 supplies the selected set of pixels to the estimated error calculating unit 412-2. In the same way, each pixel selecting unit 411-3 through pixel selecting unit 411-L supplies the selected set of pixels to each estimated error calculating unit 412-3 through estimated error calculating unit 412-L.

The estimated error calculating unit 412-1 through estimated error calculating unit 412-L detect the correlation of the pixels values of the pixels at positions in the multiple sets, supplied from each of the pixel selecting unit 411-1 through pixel selecting unit 411-L. The estimated error calculating unit 412-1 through estimated error calculating unit 412-L supply information indicating the detected correlation to the smallest error angle selecting unit 413.

The smallest error angle selecting unit 413 detects the data continuity angle based on the reference axis in the input image which corresponds to the continuity of the image which is the lost actual world 1 light signals, based on the correlation detected by the estimated error calculating unit 412-1 through estimated error calculating unit 412-L.

Figure 56:
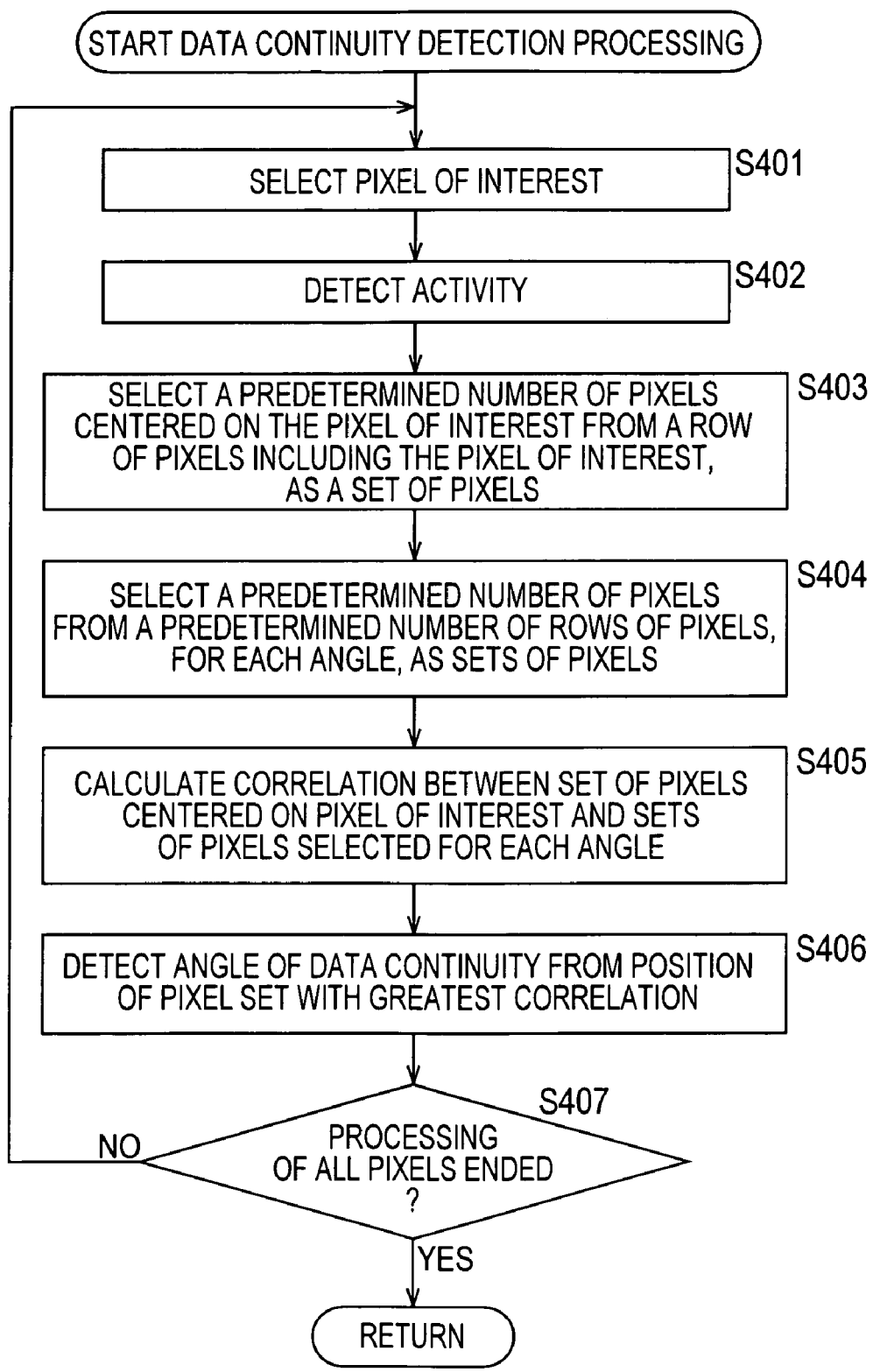
FIG. 56 is a flowchart for describing processing for detecting data continuity.

Next, data continuity detection processing with the data continuity detecting unit 101 of which the configuration is shown in FIG. 49, corresponding to the processing in step S101, will be described with reference to the flowchart in FIG. 56.

In step S401, the activity detecting unit 401 and the data selecting unit 402 select the pixel of interest which is a pixel of interest from the input image. The activity detecting unit 401 and the data selecting unit 402 select the same pixel of interest. For example, the activity detecting unit 401 and the data selecting unit 402 select the pixel of interest from the input image in raster scan order.

In step S402, the activity detecting unit 401 detects activity with regard to the pixel of interest. For example, the activity detecting unit 401 detects activity based on the difference of pixel values of pixels aligned in the vertical direction of a block made up of a predetermined number of pixels centered on the pixel of interest, and the difference of pixel values of pixels aligned in the horizontal direction.

The activity detecting unit 401 detects activity in the spatial direction as to the pixel of interest, and supplies activity information indicating the detected results to the data selecting unit 402 and the continuity direction derivation unit 404.

In step S403, the data selecting unit 402 selects, from a row of pixels including the pixel of interest, a predetermined number of pixels centered on the pixel of interest, as a pixel set. For example, the data selecting unit 402 selects a predetermined number of pixels above or to the left of the pixel of interest, and a predetermined number of pixels below or to the right of the pixel of interest, which are pixels belonging to a vertical or horizontal row of pixels to which the pixel of interest belongs, and also the pixel of interest, as a pixel set.

In step S404, the data selecting unit 402 selects, as a pixel set, a predetermined number of pixels each from a predetermined number of pixel rows for each angle in a predetermined range based on the activity detected by the processing in step S402. For example, the data selecting unit 402 sets straight lines with angles of a predetermined range which pass through the pixel of interest, with the axis indicating the spatial direction X as the reference axis, selects a pixel which is one or two rows away from the pixel of interest in the horizontal direction or vertical direction and which is closest to the straight line, and selects a predetermined number of pixels above or to the left of the selected pixel, and a predetermined number of pixels below or to the right of the selected pixel, and the selected pixel closest to the line, as a pixel set. The data selecting unit 402 selects pixel sets for each angle.

The data selecting unit 402 supplies the selected pixel sets to the error estimating unit 403.

In step S405, the error estimating unit 403 calculates the correlation between the set of pixels centered on the pixel of interest, and the pixel sets selected for each angle. For example, the error estimating unit 403 calculates the sum of absolute values of difference of the pixel values of the pixels of the set including the pixel of interest and the pixel values of the pixels at corresponding positions in other sets, for each angle.

The angle of data continuity may be detected based on the correlation between pixel sets selected for each angle.

The error estimating unit 403 supplies the information indicating the calculated correlation to the continuity direction derivation unit 404.

In step S406, from position of the pixel set having the strongest correlation based on the correlation calculated in the processing in step S405, the continuity direction derivation unit 404 detects the data continuity angle based on the reference axis in the input image which is image data that corresponds to the lost actual world 1 light signal continuity. For example, the continuity direction derivation unit 404 selects the smallest aggregate of the aggregate of absolute values of difference of pixel values, and detects the data continuity angle $\theta$ from the position of the pixel set regarding which the selected aggregate has been calculated.

The continuity direction derivation unit 404 outputs data continuity information indicating the angle of the data continuity that has been detected.

In step S407, the data selecting unit 402 determines whether or not processing of all pixels has ended, and in the event that determination is made that processing of all pixels has not ended, the flow returns to step S401, a pixel of interest is selected from pixels not yet taken as the pixel of interest, and the above-described processing is repeated.

In the event that determination is made in step S407 that processing of all pixels has ended, the processing ends.

Thus, the data continuity detecting unit 101 can detect the data continuity angle based on the reference axis in the image data, corresponding to the lost actual world 1 light signal continuity.

Note that an arrangement may be made wherein the data continuity detecting unit 101 of which the configuration is shown in FIG. 49 detects activity in the spatial direction of the input image with regard to the pixel of interest which is a pixel of interest in the frame of interest which is a frame of interest, extracts multiple pixel sets made up of a predetermined number of pixels in one row in the vertical direction or one row in the horizontal direction from the frame of interest and from each of frames before or after time-wise the frame of interest, for each angle and movement vector based on the pixel of interest and the space-directional reference axis, according to the detected activity, detects the correlation of the extracted pixel sets, and detects the data continuity angle in the time direction and spatial direction in the input image, based on this correlation.

Figure 57:
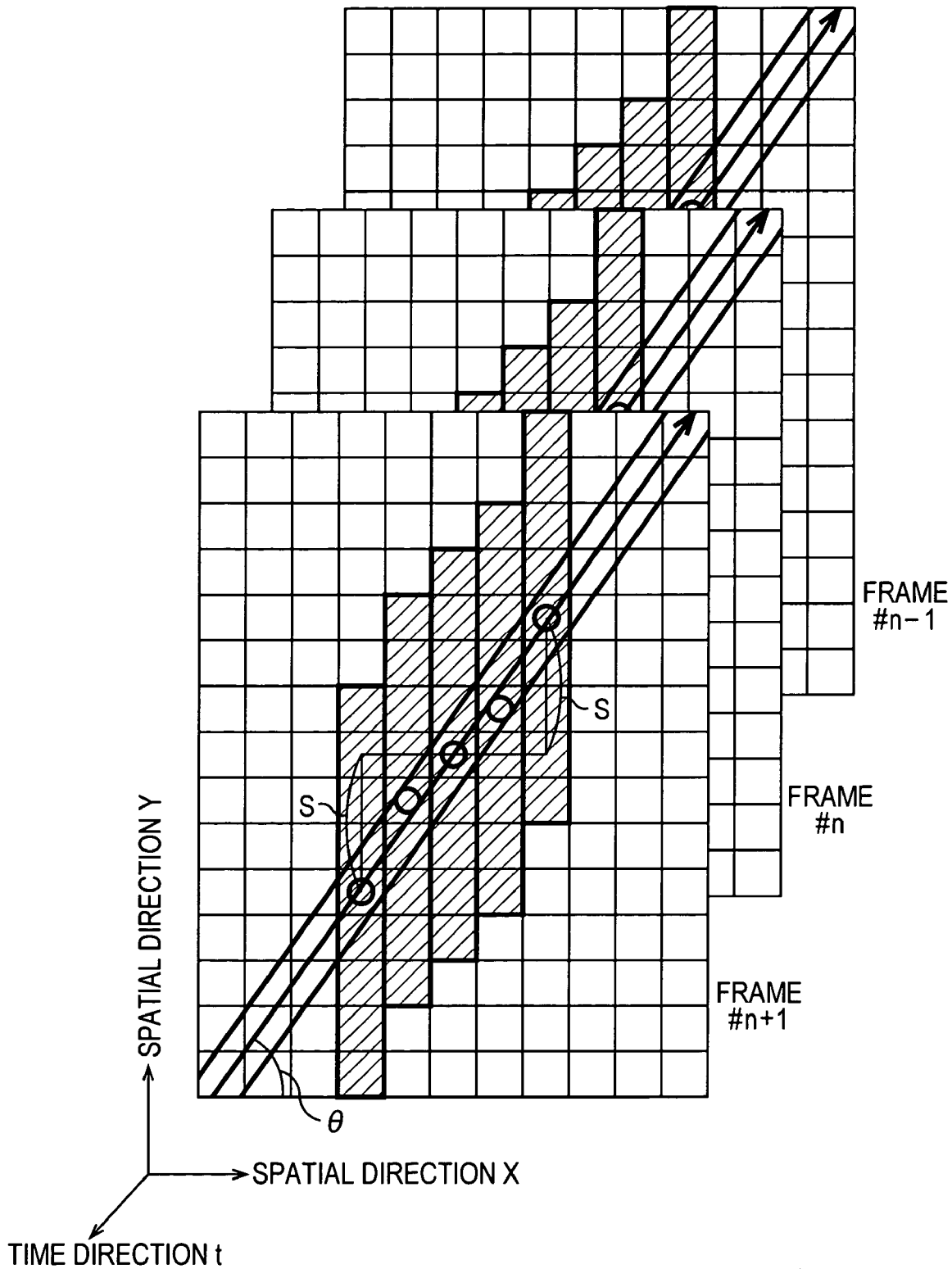
FIG. 57 is a diagram illustrating a set of pixels extracted when detecting the angle of data continuity in the time direction and space direction.

For example, as shown in FIG. 57, the data selecting unit 402 extracts multiple pixel sets made up of a predetermined number of pixels in one row in the vertical direction or one row in the horizontal direction from frame #n which is the frame of interest, frame #n−1, and frame #n+1, for each angle and movement vector based on the pixel of interest and the space-directional reference axis, according to the detected activity.

The frame #n−1 is a frame which is previous to the frame #n time-wise, and the frame #n+1 is a frame following the frame #n time-wise. That is to say, the frame #n−1, frame #n, and frame #n+1, are displayed in the order of frame #n−1, frame #n, and frame #n+1.

The error estimating unit 403 detects the correlation of pixel sets for each single angle and single movement vector, with regard to the multiple sets of the pixels that have been extracted. The continuity direction derivation unit 404 detects the data continuity angle in the temporal direction and spatial direction in the input image which corresponds to the lost actual world 1 light signal continuity, based on the correlation of pixel sets, and outputs the data continuity information indicating the angle.

Next, description will be made regarding another embodiment example of the actual world estimating unit 102 (FIG. 3) with reference to FIG. 58 through FIG. 88.

Figure 58:
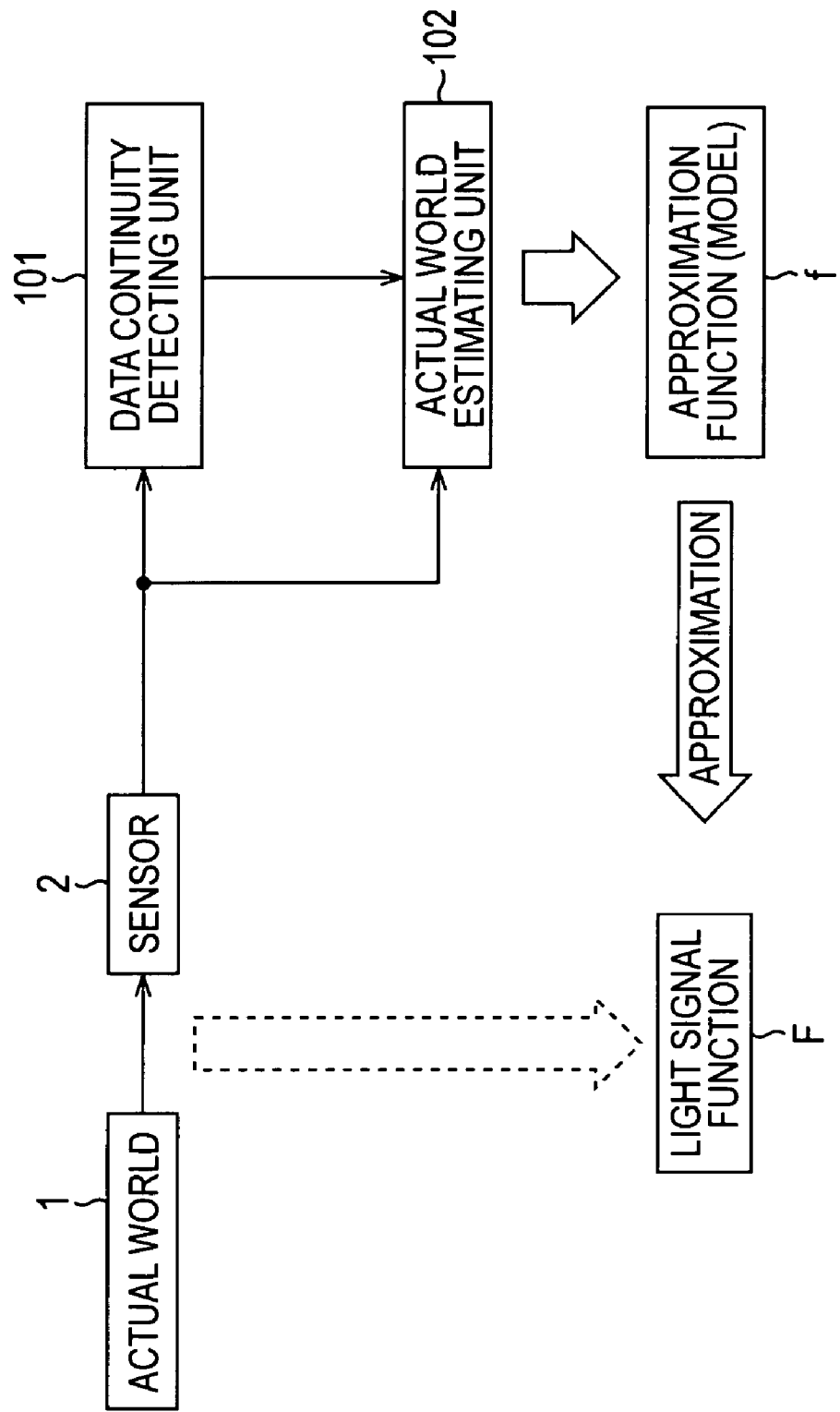
FIG. 58 is a diagram for describing the principle of function approximation, which is an example of an embodiment of the actual world estimating unit shown in FIG. 3.

FIG. 58 is a diagram for describing the principle of this embodiment example.

As shown in FIG. 58, a signal (light intensity allocation) in the actual world 1, which is an image cast on the sensor 2, is represented with a predetermined function F. Note that hereafter, with the description of this embodiment example, the signal serving as an image in the actual world 1 is particularly referred to as a light signal, and the function F is particularly referred to as a light signal function F.

With this embodiment example, in the event that the light signal in the actual world 1 represented with the light signal function F has predetermined continuity, the actual world estimating unit 102 estimates the light signal function F by approximating the light signal function F with a predetermined function f using an input image (image data including continuity of data corresponding to continuity) from the sensor 2, and data continuity information (data continuity information corresponding to continuity of the input image data) from the data continuity detecting unit 101. Note that with the description of this embodiment example, the function f is particularly referred to as an approximation function f, hereafter.

In other words, with this embodiment example, the actual world estimating unit 102 approximates (describes) the image (light signal in the actual world 1) represented with the light signal function F using a model 161 (FIG. 4) represented with the approximation function f. Accordingly, hereafter, this embodiment example is referred to as a function approximating method.

Now, description will be made regarding the background wherein the present applicant has invented the function approximating method, prior to entering the specific description of the function approximating method.

Figure 59:
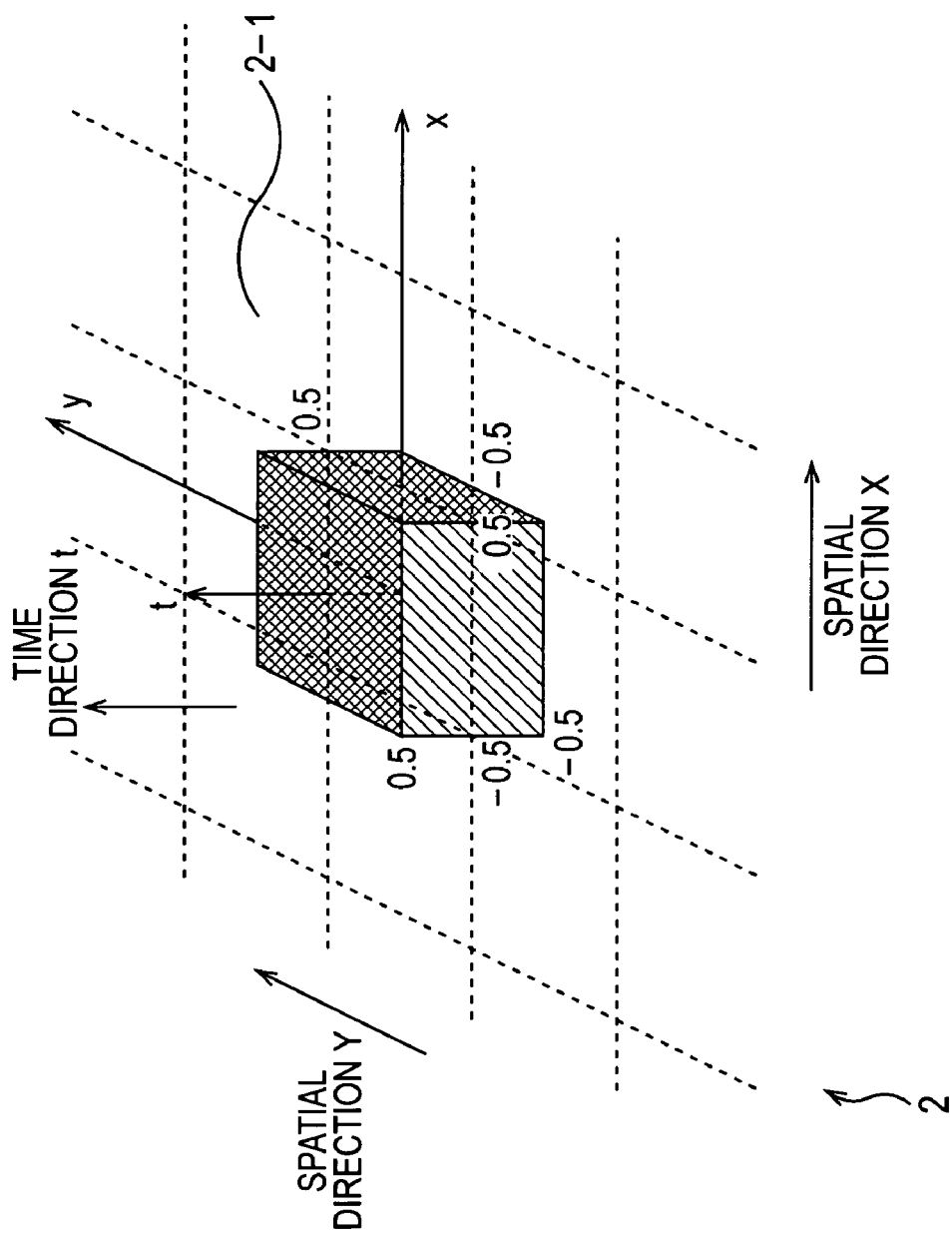
FIG. 59 is a diagram for describing integration effects in the event that the sensor is a CCD.

FIG. 59 is a diagram for describing integration effects in the case in which the sensor 2 is treated as a CCD.

As shown in FIG. 59, multiple detecting elements 2-1 are disposed on the plane of the sensor 2.

With the example in FIG. 59, a direction in parallel with a predetermined side of the detecting elements 2-1 is taken as the X direction, which is one direction in the spatial direction, and the a direction orthogonal to the X direction is taken as the Y direction, which is another direction in the spatial direction. Also, the direction perpendicular to the X-Y plane is taken as the direction t serving as the temporal direction.

Also, with the example in FIG. 59, the spatial shape of each detecting element 2-1 of the sensor 2 is represented with a square of which one side is 1 in length. The shutter time (exposure time) of the sensor 2 is represented with 1.

Further, with the example in FIG. 59, the center of one detecting element 2-1 of the sensor 2 is taken as the origin (position x=0 in the X direction, and position y=0 in the Y direction) in the spatial direction (X direction and Y direction), and the intermediate point-in-time of the exposure time is taken as the origin (position t=0 in the t direction) in the temporal direction (t direction).

In this case, the detecting element 2-1 of which the center is in the origin (x=0, y=0) in the spatial direction subjects the light signal function F(x, y, t) to integration with a range between −0.5 and 0.5 in the X direction, range between −0.5 and 0.5 in the Y direction, and range between −0.5 and 0.5 in the t direction, and outputs the integral value thereof as a pixel value P.

That is to say, the pixel value P output from the detecting element 2-1 of which the center is in the origin in the spatial direction is represented with the following Expression (38).

$$P = \int_{-0.5}^{+0.5} \int_{-0.5}^{+0.5} \int_{-0.5}^{+0.5} F(x, y, t) dx\, dy\, dt \qquad (38)$$

The other detecting elements 2-1 also output the pixel value P shown in Expression (38) by taking the center of the subject detecting element 2-1 as the origin in the spatial direction in the same way.

Figure 60:
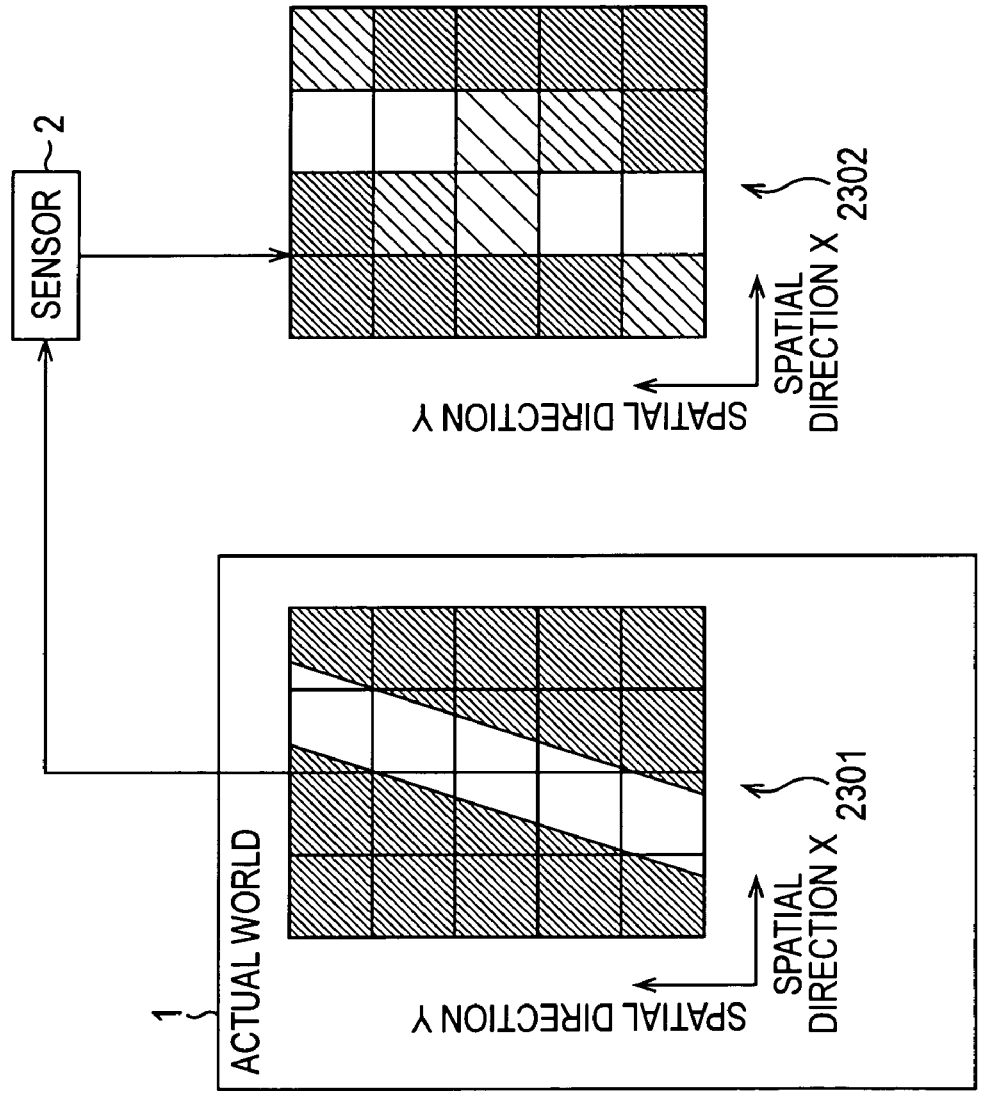
FIG. 60 is a diagram for describing a specific example of the integration effects of the sensor shown in FIG. 59.

FIG. 60 is a diagram for describing a specific example of the integration effects of the sensor 2.

In FIG. 60, the X direction and Y direction represent the X direction and Y direction of the sensor 2 (FIG. 59).

A portion 2301 of the light signal in the actual world 1 (hereafter, such a portion is referred to as a region) represents an example of a region having predetermined continuity.

Note that the region 2301 is a portion of the continuous light signal (continuous region). On the other hand, in FIG. 60, the region 2301 is shown as divided into 20 small regions (square regions) in reality. This is because of representing that the size of the region 2301 is equivalent to the size wherein the four detecting elements (pixels) of the sensor 2 in the X direction, and also the five detecting elements (pixels) of the sensor 2 in the Y direction are arrayed. That is to say, each of the 20 small regions (virtual regions) within the region 2301 is equivalent to one pixel.

Also, a white portion shown in the drawing within the region 2301 represents a light signal corresponding to a fine line. Accordingly, the region 2301 has continuity in the direction wherein a fine line continues. Hereafter, the region 2301 is referred to as the fine-line-including actual world region 2301.

In this case, when the fine-line-including actual world region 2301 (a portion of a light signal in the actual world 1) is detected by the sensor 2, region 2302 (hereafter, this is referred to as a fine-line-including data region 2302) of the input image (pixel values) is output from the sensor 2 by integration effects.

Note that each pixel of the fine-line-including data region 2302 is represented as an image in the drawing, but is data representing a predetermined value in reality. That is to say, the fine-line-including actual world region 2301 is changed (distorted) to the fine-line-including data region 2302, which is divided into 20 pixels (20 pixels in total of 4 pixels in the X direction and also 5 pixels in the Y direction) each having a predetermined pixel value by the integration effects of the sensor 2.

Figure 61:
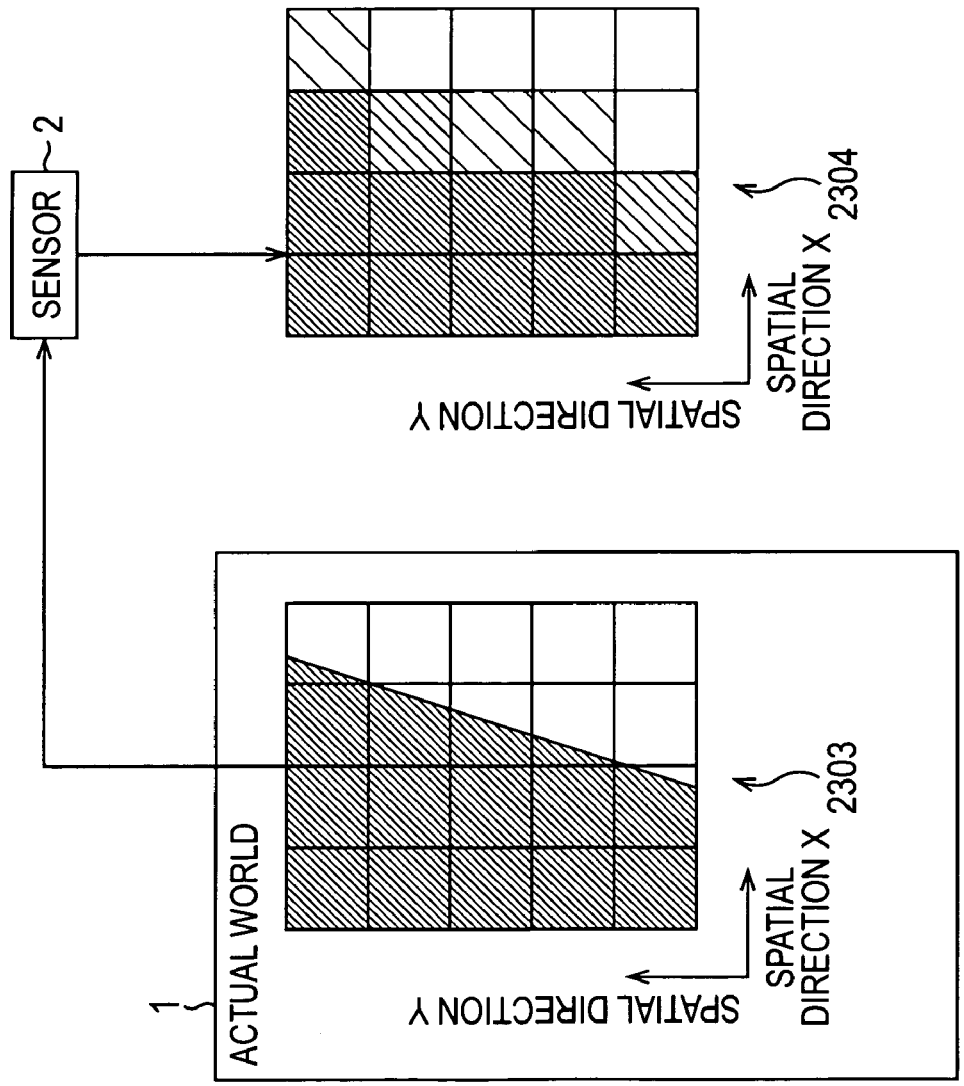
FIG. 61 is a diagram for describing another specific example of the integration effects of the sensor shown in FIG. 59.

FIG. 61 is a diagram for describing another specific example (example different from FIG. 60) of the integration effects of the sensor 2.

In FIG. 61, the X direction and Y direction represent the X direction and Y direction of the sensor 2 (FIG. 59).

A portion (region) 2303 of the light signal in the actual world 1 represents another example (example different from the fine-line-including actual world region 2301 in FIG. 60) of a region having predetermined continuity.

Note that the region 2303 is a region having the same size as the fine-line-including actual world region 2301. That is to say, the region 2303 is also a portion of the continuous light signal in the actual world 1 (continuous region) as with the fine-line-including actual world region 2301 in reality, but is shown as divided into 20 small regions (square regions) equivalent to one pixel of the sensor 2 in FIG. 61.

Also, the region 2303 includes a first portion having predetermined first light intensity (value), and a second portion edge having predetermined second light intensity (value). Accordingly, the region 2303 has continuity in the direction wherein the edges continue. Hereafter, the region 2303 is referred to as the two-valued-edge-including actual world region 2303.

In this case, when the two-valued-edge-including actual world region 2303 (a portion of the light signal in the actual world 1) is detected by the sensor 2, a region 2304 (hereafter, referred to as two-valued-edge-including data region 2304) of the input image (pixel value) is output from the sensor 2 by integration effects.

Note that each pixel value of the two-valued-edge-including data region 2304 is represented as an image in the drawing as with the fine-line-including data region 2302, but is data representing a predetermined value in reality. That is to say, the two-valued-edge-including actual world region 2303 is changed (distorted) to the two-valued-edge-including data region 2304, which is divided into 20 pixels (20 pixels in total of 4 pixels in the X direction and also 5 pixels in the Y direction) each having a predetermined pixel value by the integration effects of the sensor 2.

Conventional image processing devices have regarded image data output from the sensor 2 such as the fine-line-including data region 2302, two-valued-edge-including data region 2304, and the like as the origin (basis), and also have subjected the image data to the subsequent image processing. That is to say, regardless of that the image data output from the sensor 2 had been changed (distorted) to data different from the light signal in the actual world 1 by integration effects, the conventional image processing devices have performed image processing on assumption that the data different from the light signal in the actual world 1 is correct.

As a result, the conventional image processing devices have provided a problem wherein based on the waveform (image data) of which the details in the actual world is distorted at the stage wherein the image data is output from the sensor 2, it is very difficult to restore the original details from the waveform.

Accordingly, with the function approximating method, in order to solve this problem, as described above (as shown in FIG. 58), the actual world estimating unit 102 estimates the light signal function F by approximating the light signal function F (light signal in the actual world 1) with the approximation function f based on the image data (input image) such as the fine-line-including data region 2302, and two-valued-edge-including data region 2304 output from the sensor 2.

Thus, at a later stage than the actual world estimating unit 102 (in this case, the image generating unit 103 in FIG. 3), the processing can be performed by taking the image data wherein integration effects are taken into consideration, i.e., image data that can be represented with the approximation function f as the origin.

Hereafter, description will be made independently regarding three specific methods (first through third function approximating methods), of such a function approximating method with reference to the drawings.

First, description will be made regarding the first function approximating method with reference to FIG. 62 through FIG. 76.

Figure 62:
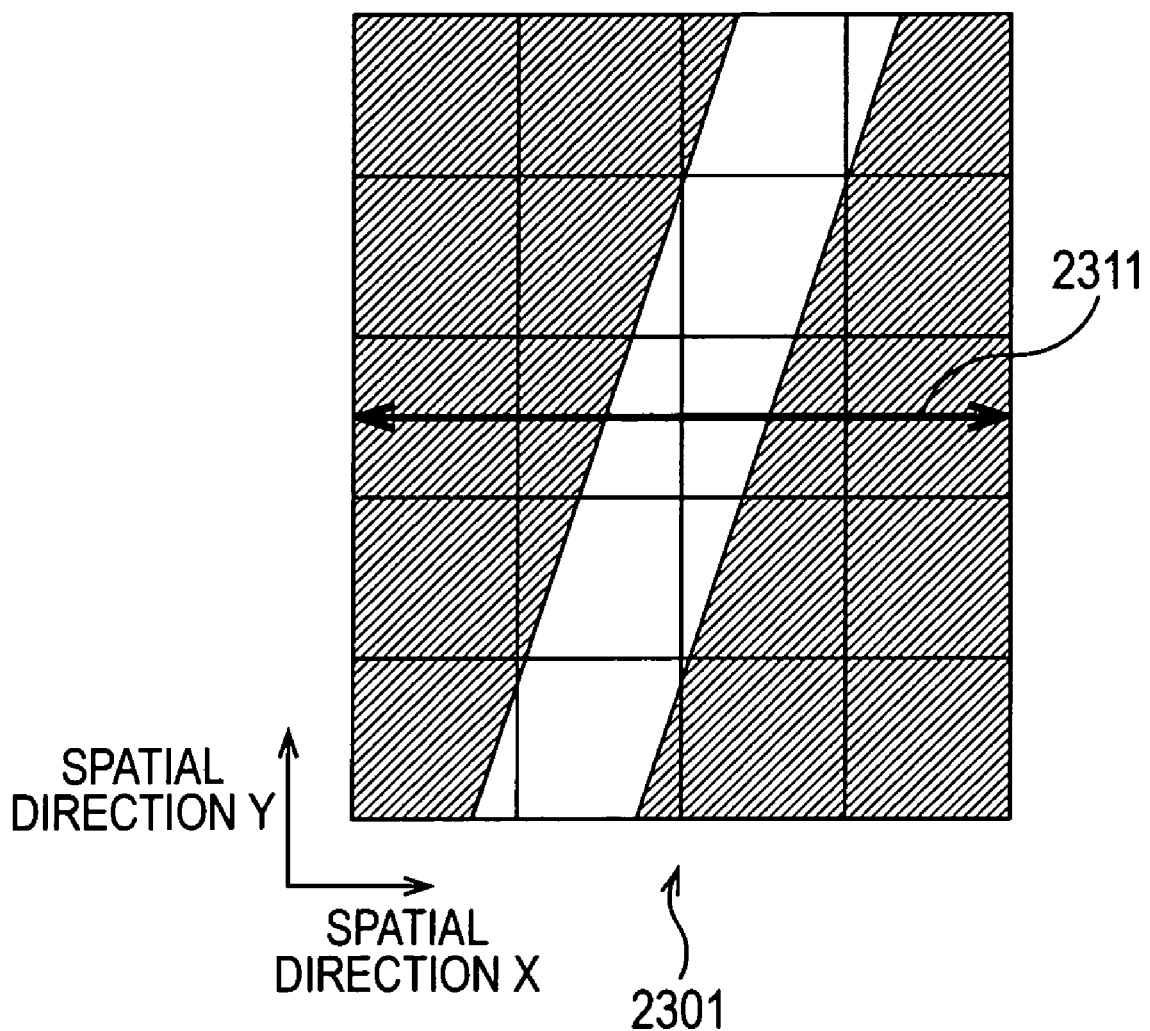
FIG. 62 is a diagram representing a fine-line-inclusive actual world region shown in FIG. 60.

FIG. 62 is a diagram representing the fine-line-including actual world region 2301 shown in FIG. 60 described above again.

In FIG. 62, the X direction and Y direction represent the X direction and Y direction of the sensor 2 (FIG. 59).

The first function approximating method is a method for approximating a one-dimensional waveform (hereafter, such a waveform is referred to as an X cross-sectional waveform $F(x)$) wherein the light signal function $F(x, y, t)$ corresponding to the fine-line-including actual world region 2301 such as shown in FIG. 62 is projected in the X direction (direction of an arrow 2311 in the drawing), with the approximation function $f(x)$ serving as an n-dimensional (n is an arbitrary integer) polynomial, for example. Accordingly, hereafter, the first function approximating method is particularly referred to as a one-dimensional approximating method.

Note that with the one-dimensional approximating method, the X cross-sectional waveform $F(x)$, which is to be approximated, is not restricted to a waveform corresponding to the fine-line-including actual world region 2301 in FIG. 62, of course. That is to say, as described later, with the one-dimensional approximating method, any waveform can be approximated as long as the X cross-sectional waveform $F(x)$ corresponds to the light signals in the actual world 1 having continuity.

Also, the direction of the projection of the light signal function $F(x, y, t)$ is not restricted to the X direction, or rather the Y direction or t direction may be employed. That is to say, with the one-dimensional approximating method, a function $F(y)$ wherein the light signal function $F(x, y, t)$ is projected in the Y direction may be approximated with a predetermined approximation function $f(y)$, or a function $F(t)$ wherein the light signal function $F(x, y, t)$ is projected in the t direction may be approximated with a predetermined approximation function $f(t)$.

More specifically, the one-dimensional approximating method is a method for approximating, for example, the X cross-sectional waveform $F(x)$ with the approximation function $f(x)$ serving as an n-dimensional polynomial such as shown in the following Expression (39).

$$f(x) = w_0 + w_1 x + w_2 x + \ldots + w_n x^n = \sum_{i=0}^{n} w_i x^i \qquad (39)$$

That is to say, with the one-dimensional approximating method, the actual world estimating unit 102 estimates the X cross-sectional waveform $F(x)$ by calculating the coefficient (features) $w_i$ of $x^i$ in Expression (39).

This calculation method of the features $w_i$ is not restricted to a particular method, for example, the following first through third methods may be employed.

That is to say, the first method is a method that has been employed so far.

On the other hand, the second method is a method that has been newly invented by the present applicant, which is a method that considers continuity in the spatial direction as to the first method.

However, as described later, with the first and second methods, the integration effects of the sensor 2 are not taken into consideration. Accordingly, an approximation function f(x) obtained by substituting the features $w_i$ calculated by the first method or the second method for the above Expression (39) is an approximation function regarding an input image, but strictly speaking, cannot be referred to as the approximation function of the X cross-sectional waveform F(x).

Consequently, the present applicant has invented the third method that calculates the features $w_i$ further in light of the integration effects of the sensor 2 as to the second method. An approximation function f(x) obtained by substituting the features $w_i$ calculated with this third method for the above Expression (39) can be referred to as the approximation function of the X cross-sectional waveform F(x) in that the integration effects of the sensor 2 are taken into consideration.

Thus, strictly speaking, the first method and the second method cannot be referred to as the one-dimensional approximating method, and the third method alone can be referred to as the one-dimensional approximating method.

Figure 63:
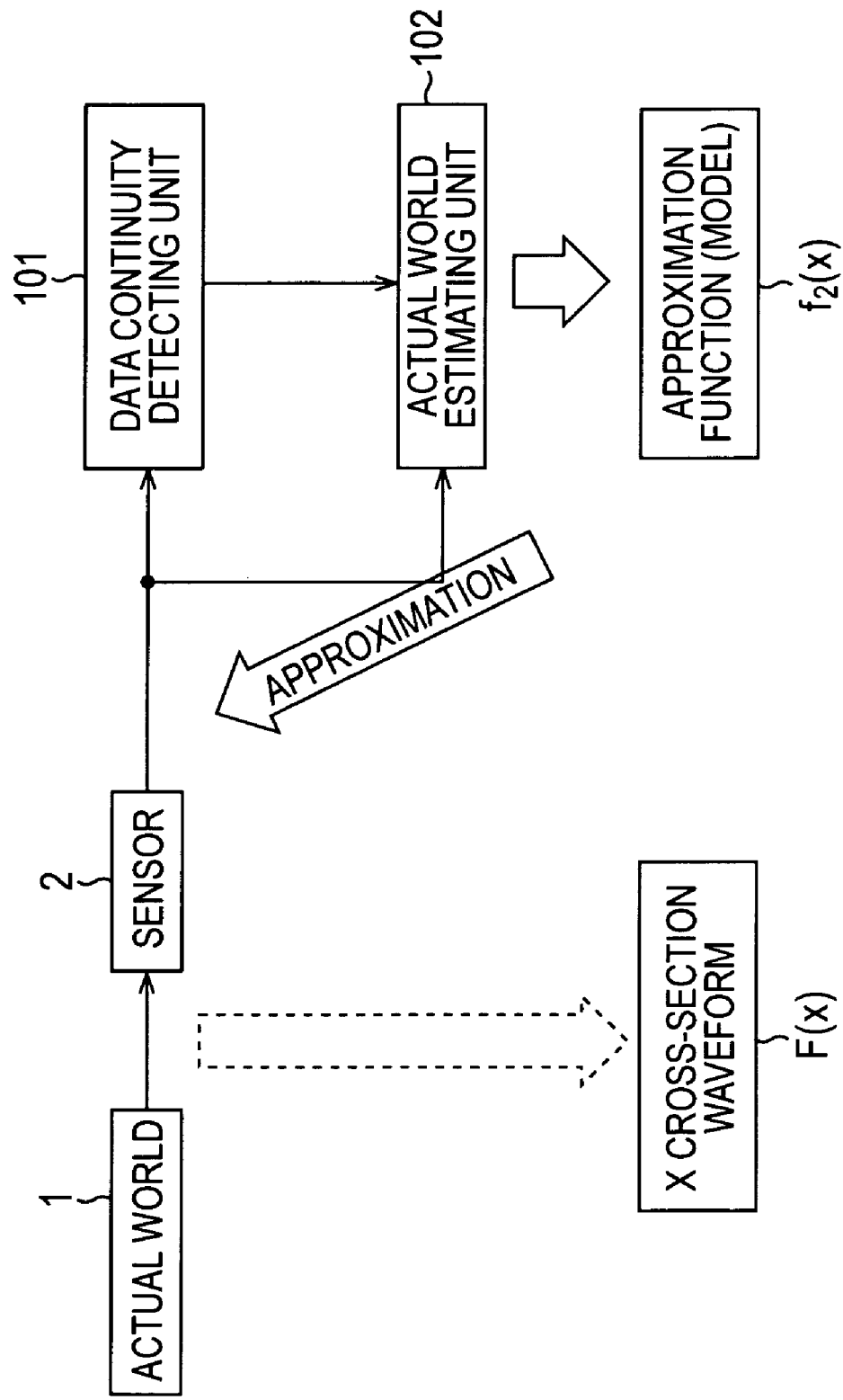
FIG. 63 is a diagram for describing the principle of an example of an embodiment of the actual world estimating unit shown in FIG. 3, in comparison with the example shown in FIG. 58.

In other words, as shown in FIG. 63, the second method is different from the one-dimensional approximating method. That is to say, FIG. 63 is a diagram for describing the principle of the embodiment corresponding to the second method.

As shown in FIG. 63, with the embodiment corresponding to the second method, in the event that the light signal in the actual world 1 represented with the light signal function F has predetermined continuity, the actual world estimating unit 102 does not approximate the X cross-sectional waveform F(x) with an input image (image data including continuity of data corresponding to continuity) from the sensor 2, and data continuity information (data continuity information corresponding to continuity of input image data) from the data continuity detecting unit 101, but approximates the input image from the sensor 2 with a predetermined approximation function $f_2(x)$.

Thus, it is hard to say that the second method is a method having the same level as the third method in that approximation of the input image alone is performed without considering the integral effects of the sensor 2. However, the second method is a method superior to the conventional first method in that the second method takes continuity in the spatial direction into consideration.

Hereafter, description will be made independently regarding the details of the first method, second method, and third method in this order.

Note that hereafter, in the event that the respective approximation functions f(x) generated by the first method, second method, and third method are distinguished from that of the other method, they are particularly referred to as approximation function $f_1(x)$, approximation function $f_2(x)$, and approximation function $f_3(x)$ respectively.

First, description will be made regarding the details of the first method.

Figure 64:
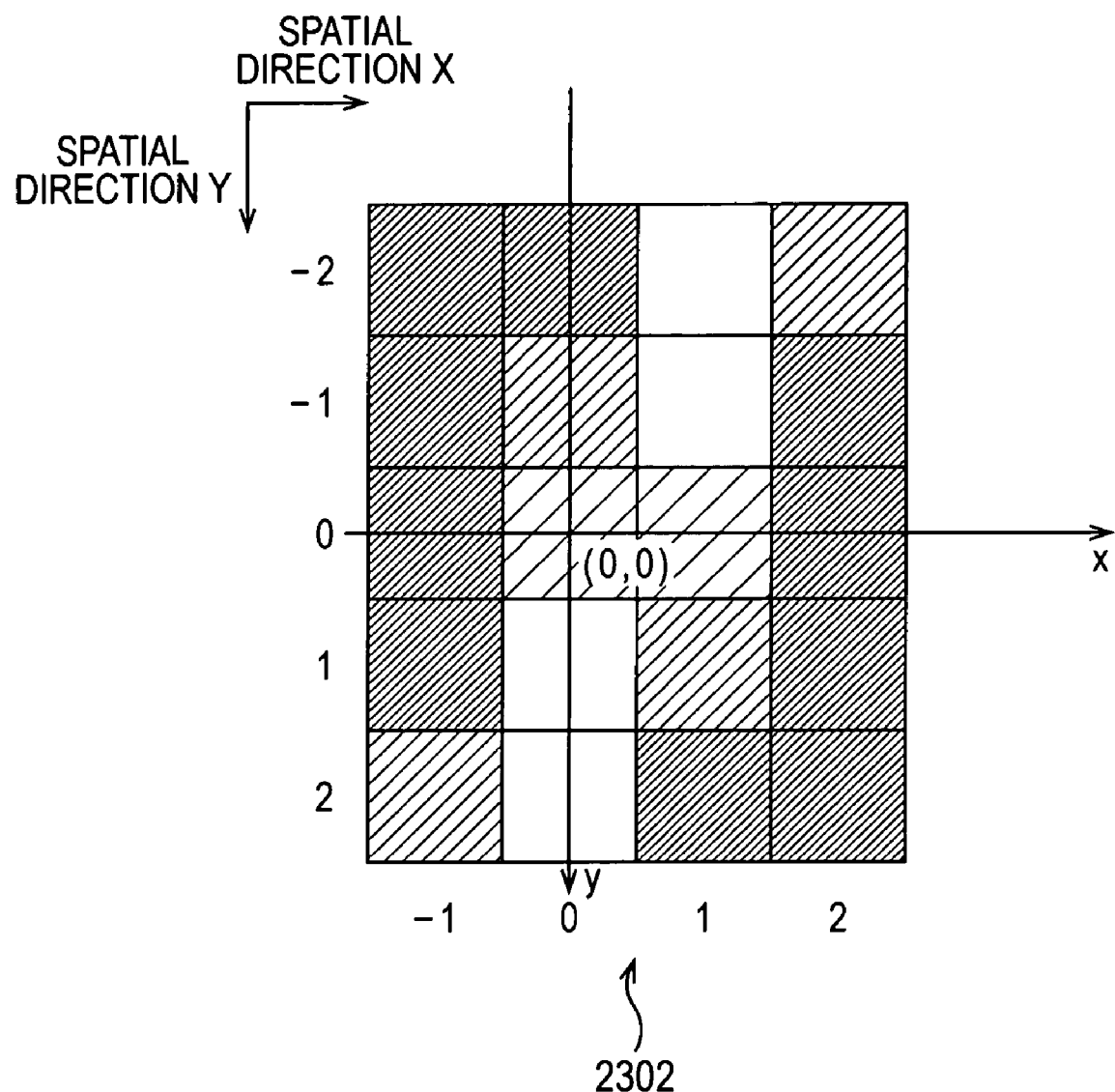
FIG. 64 is a diagram representing the fine-line-inclusive data region shown in FIG. 60.

With the first method, on condition that the approximation function $f_1(x)$ shown in the above Expression (39) holds within the fine-line-including actual world region 2301 in FIG. 64, the following prediction equation (40) is defined.

$$P(x, y) = f_1(x) + e \quad (40)$$

In Expression (40), x represents a pixel position relative as to the X direction from a pixel of interest. y represents a pixel position relative as to the Y direction from the pixel of interest. e represents a margin of error. Specifically, for example, as shown in FIG. 64, let us say that the pixel of interest is the second pixel in the X direction from the left, and also the third pixel in the Y direction from the bottom in the drawing, of the fine-line-including data region 2302 (data of which the fine-line-including actual world region 2301 (FIG. 62) is detected by the sensor 2, and output). Also, let us say that the center of the pixel of interest is the origin (0, 0), and a coordinates system (hereafter, referred to as a pixel-of-interest coordinates system) of which axes are an x axis and y axis respectively in parallel with the X direction and Y direction of the sensor 2 (FIG. 59) is set. In this case, the coordinates value (x, y) of the pixel-of-interest coordinates system represents a relative pixel position.

Also, in Expression (40), P (x, y) represents a pixel value in the relative pixel positions (x, y). Specifically, in this case, the P (x, y) within the fine-line-including data region 2302 is such as shown in FIG. 65.

Figure 65:
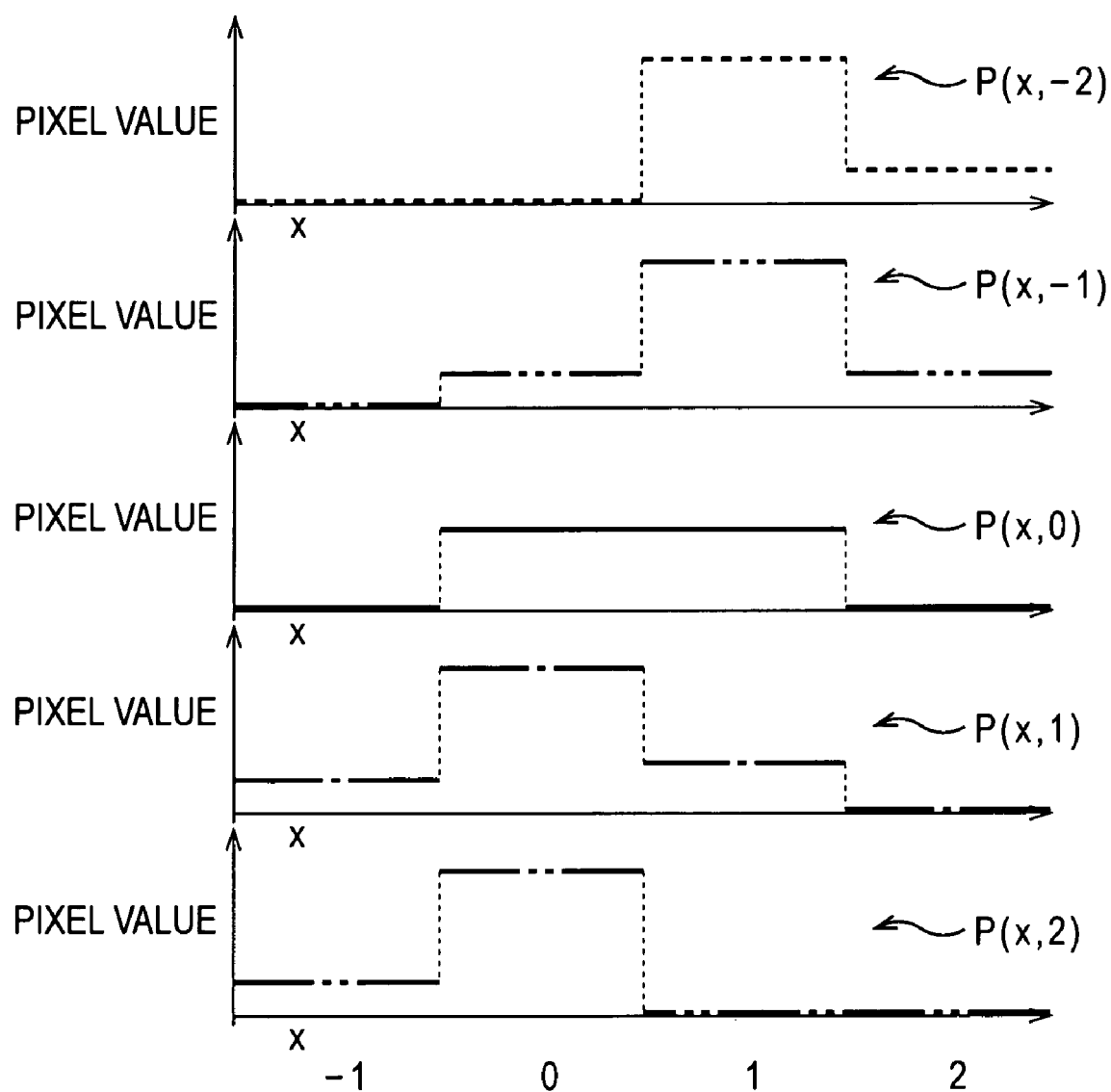
FIG. 65 is a diagram wherein each of the pixel values contained in the fine-line-inclusive data region shown in FIG. 64 are plotted on a graph.

FIG. 65 represents this pixel value P (x, y) in a graphic manner.

In FIG. 65, the respective vertical axes of the graphs represent pixel values, and the horizontal axes represent a relative position x in the X direction from the pixel of interest. Also, in the drawing, the dashed line in the first graph from the top represents an input pixel value P (x, −2), the broken triple-dashed line in the second graph from the top represents an input pixel value P (x, −1), the solid line in the third graph from the top represents an input pixel value P (x, 0), the broken line in the fourth graph from the top represents an input pixel value P (x, 1), and the broken double-dashed line in the fifth graph from the top (the first from the bottom) represents an input pixel value P (x, 2) respectively.

Upon the 20 input pixel values P (x, −2), P (x, −1), P (x, 0), P (x, 1), and P (x, 2) (however, x is any one integer value of −1 through 2) shown in FIG. 65 being substituted for the above Expression (40) respectively, 20 equations as shown in the following Expression (41) are generated. Note that each $e_k$ (k is any one of integer values 1 through 20) represents a margin of error.

$$P(-1, -2) = f_1(-1) + e_1$$

$$P(0, -2) = f_1(0) + e_2$$

$$P(1, -2) = f_1(1) + e_3$$

$$P(2, -2) = f_1(2) + e_4$$

$$P(-1, -1) = f_1(-1) + e_5$$

$$P(0, -1) = f_1(0) + e_6$$

$$P(1, -1) = f_1(1) + e_7$$

$$P(2, -1) = f_1(2) + e_8$$

$$P(-1, 0) = f_1(-1) + e_9$$

$$P(0, 0) = f_1(0) + e_{10}$$

$$P(1, 0) = f_1(1) + e_{11}$$

$$P(2, 0) = f_1(2) + e_{12}$$

$$P(-1, 1) = f_1(-1) + e_{13}$$

$$P(0, 1) = f_1(0) + e_{14}$$

$$P(1, 1) = f_1(1) + e_{15}$$

$$P(2, 1) = f_1(2) + e_{16}$$

$$P(-1, 2) = f_1(-1) + e_{17}$$

$$P(0, 2) = f_1(0) + e_{18}$$

$$P(1, 2) = f_1(1) + e_{19}$$

$$P(2, 2) = f_1(2) + e_{20} \quad (41)$$

Expression (41) is made up of 20 equations, so in the event that the number of the features $w_i$ of the approximation function $f_1(x)$ is less than 20, i.e., in the event that the approximation function $f_1(x)$ is a polynomial having the number of dimensions less than 19, the features $w_i$ can be calculated using the least square method, for example. Note that the specific solution of the least square method will be described later.

Figure 66:
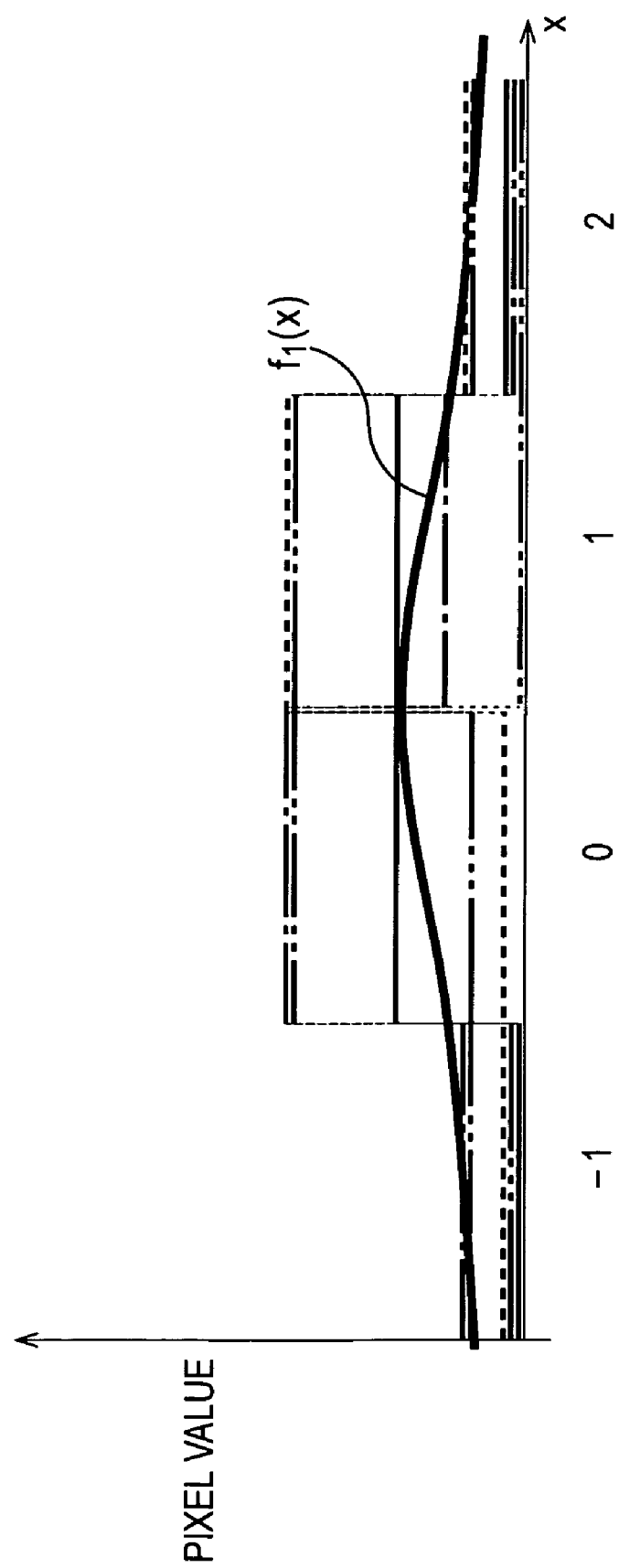
FIG. 66 is a diagram wherein an approximation function, approximating the pixel values contained in the fine-line-inclusive data region shown in FIG. 65, is plotted on a graph.

For example, if we say that the number of dimensions of the approximation function $f_1(x)$ is five, the approximation function $f_1(x)$ calculated with the least square method using Expression (41) (the approximation function $f_1(x)$ generated by the calculated features $w_i$) becomes a curve shown in FIG. 66.

Note that in FIG. 66, the vertical axis represents pixel values, and the horizontal axis represents a relative position x from the pixel of interest.

That is to say, for example, if we supplement the respective 20 pixel values P (x, y) (the respective input pixel values P (x, −2), P (x, −1), P (x, 0), P (x, 1), and P (x, 2) shown in FIG. 65) making up the fine-line-including data region 2302 in FIG. 64 along the x axis without any modification (if we regard a relative position y in the Y direction as constant, and overlay the five graphs shown in FIG. 65), multiple lines (dashed line, broken triple-dashed line, solid line, broken line, and broken double-dashed line) in parallel with the x axis, such as shown in FIG. 66, are distributed.

However, in FIG. 66, the dashed line represents the input pixel value P (x, −2), the broken triple-dashed line represents the input pixel value P (x, −1), the solid line represents the input pixel value P (x, 0), the broken line represents the input pixel value P (x, 1), and the broken double-dashed line represents the input pixel value P (x, 2) respectively. Also, in the event of the same pixel value, lines more than 2 lines are overlaid in reality, but in FIG. 66, the lines are drawn so as to distinguish each line, and so as not to overlay each line.

The respective 20 input pixel values (P (x, −2), P (x, −1), P (x, 0), P (x, 1), and P (x, 2)) thus distributed, and a regression curve (the approximation function $f_1(x)$ obtained by substituting the features $w_i$ calculated with the least square method for the above Expression (38)) so as to minimize the error of the value $f_1(x)$ become a curve (approximation function $f_1(x)$) shown in FIG. 66.

Thus, the approximation function $f_1(x)$ represents nothing but a curve connecting in the X direction the means of the pixel values (pixel values having the same relative position x in the X direction from the pixel of interest) P (x, −2), P (x, −1), P (x, 0), P (x, 1), and P (x, 2) in the Y direction. That is to say, the approximation function $f_1(x)$ is generated without considering continuity in the spatial direction included in the light signal.

Figure 67:
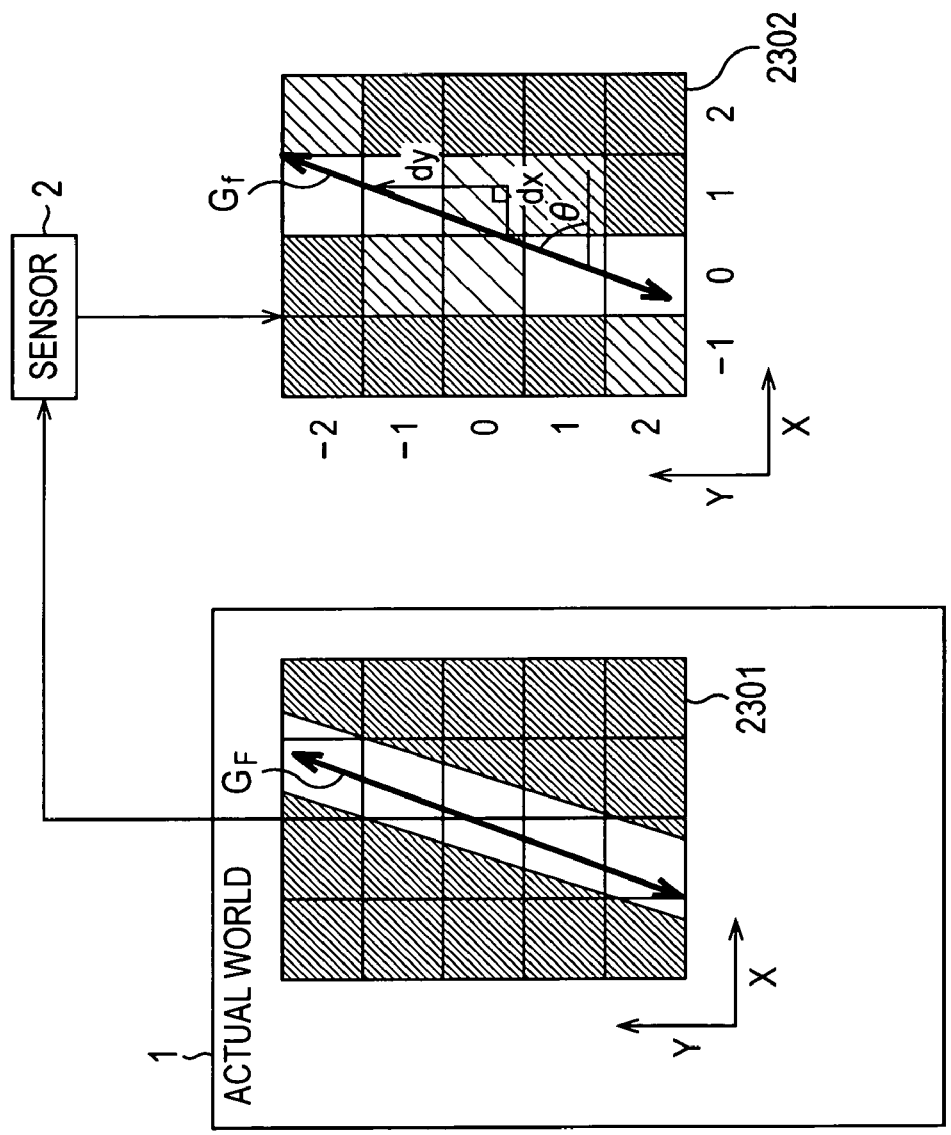
FIG. 67 is a diagram for describing the continuity in the spatial direction which the fine-line-inclusive actual world region shown in FIG. 60 has.

For example, in this case, the fine-line-including actual world region 2301 (FIG. 62) is regarded as a subject to be approximated. This fine-line-including actual world region 2301 has continuity in the spatial direction, which is represented with a gradient $G_F$, such as shown in FIG. 67. Note that in FIG. 67, the X direction and Y direction represent the X direction and Y direction of the sensor 2 (FIG. 59).

Accordingly, the data continuity detecting unit 101 (FIG. 58) can output an angle θ (angle θ generated between the direction of data continuity represented with a gradient $G_f$ corresponding to the gradient $G_F$, and the X direction) such as shown in FIG. 67 as data continuity information corresponding to the gradient $G_F$ as continuity in the spatial direction.

However, with the first method, the data continuity information output from the data continuity detecting unit 101 is not employed at all.

In other words, such as shown in FIG. 67, the direction of continuity in the spatial direction of the fine-line-including actual world region 2301 is a general angle θ direction. However, the first method is a method for calculating the features $w_i$ of the approximation function $f_1(x)$ on assumption that the direction of continuity in the spatial direction of the fine-line-including actual world region 2301 is the Y direction (i.e., on assumption that the angle θ is 90°).

Consequently, the approximation function $f_1(x)$ becomes a function of which the waveform gets dull, and the detail decreases than the original pixel value. In other words, though not shown in the drawing, with the approximation function $f_1(x)$ generated with the first method, the waveform thereof becomes a waveform different from the actual X cross-sectional waveform F(x).

To this end, the present applicant has invented the second method for calculating the features $w_i$ by further taking continuity in the spatial direction into consideration (utilizing the angle θ) as to the first method.

That is to say, the second method is a method for calculating the features $w_i$ of the approximation function $f_2(x)$ on assumption that the direction of continuity of the fine-line-including actual world region 2301 is a general angle θ direction.

Specifically, for example, the gradient $G_f$ representing continuity of data corresponding to continuity in the spatial direction is represented with the following Expression (42).

$$G_f = \tan\theta = \frac{dy}{dx} \quad (42)$$

Note that in Expression (42), dx represents the amount of fine movement in the X direction such as shown in FIG. 67, dy represents the amount of fine movement in the Y direction as to the dx such as shown in FIG. 67.

In this case, if we define the shift amount $C_x(y)$ as shown in the following Expression (43), with the second method, an equation corresponding to Expression (40) employed in the first method becomes such as the following Expression (44).

$$C_x(y) = \frac{y}{G_f} \quad (43)$$

$$P(x, y) = f_2(x - C_x(y)) + e \quad (44)$$

That is to say, Expression (40) employed in the first method represents that the position x in the X direction of the pixel center position (x, y) is the same value regarding the pixel value P (x, y) of any pixel positioned in the same position. In other words, Expression (40) represents that pixels having the same pixel value continue in the Y direction (exhibits continuity in the Y direction).

On the other hand, Expression (44) employed in the second method represents that the pixel value P (x, y) of a pixel of which the center position is (x, y) is not identical to the pixel value (approximate equivalent to $f_2(x)$) of a pixel positioned in a place distant from the pixel of interest (a pixel of which the center position is the origin (0, 0)) in the X direction by x, and is the same value as the pixel value (approximate equivalent to $f_2(x+C_x(y))$) of a pixel positioned in a place further distant from the pixel thereof in the X direction by the shift amount $C_x(y)$ (pixel positioned in a place distant from the pixel of interest in the X direction by $x+C_x(y)$). In other words, Expression (44) represents that pixels having the same pixel value continue in the angle θ direction corresponding to the shift amount $C_x$ (y) (exhibits continuity in the general angle θ direction).

Thus, the shift amount $C_x$ (y) is the amount of correction considering continuity (in this case, continuity represented with the gradient $G_F$ in FIG. 67 (strictly speaking, continuity of data represented with the gradient $G_f$)) in the spatial direction, and Expression (44) is obtained by correcting Expression (40) with the shift amount $C_X$ (y).

In this case, upon the 20 pixel values P (x, y) (however, x is any one integer value of −1 through 2, and y is any one integer value of −2 through 2) of the fine-line-including data region 2302 shown in FIG. 64 being substituted for the above Expression (44) respectively, 20 equations as shown in the following Expression (45) are generated.

$$P(-1, -2) = f_2(-1-C_x(-2)) + e_1$$

$$P(0, -2) = f_2(0-C_x(-2)) + e_2$$

$$P(1, -2) = f_2(1-C_x(-2)) + e_3$$

$$P(2, -2) = f_2(2-C_x(-2)) + e_4$$

$$P(-1, -1) = f_2(-1-C_x(-1)) + e_5$$

$$P(0, -1) = f_2(0-C_x(-1)) + e_6$$

$$P(1, -1) = f_2(1-C_x(-1)) + e_7$$

$$P(2, -1) = f_2(2-C_x(-1)) + e_8$$

$$P(-1, 0) = f_2(-1) + e_9$$

$$P(0, 0) = f_2(0) + e_{10}$$

$$P(1, 0) = f_2(1) + e_{11}$$

$$P(2, 0) = f_2(2) + e_{12}$$

$$P(-1, 1) = f_2(-1-C_x(1)) + e_{13}$$

$$P(0, 1) = f_2(0-C_x(1)) + e_{14}$$

$$P(1, 1) = f_2(1-C_x(1)) + e_{15}$$

$$P(2, 1) = f_2(2-C_x(1)) + e_{16}$$

$$P(-1, 2) = f_2(-1-C_x(2)) + e_{17}$$

$$P(0, 2) = f_2(0-C_x(2)) + e_{18}$$

$$P(1, 2) = f_2(1-C_x(2)) + e_{19}$$

$$P(2, 2) = f_2(2-C_x(2)) + e_{20} \quad (45)$$

Expression (45) is made up of 20 equations, as with the above Expression (41). Accordingly, with the second method, as with the first method, in the event that the number of the features $w_i$ of the approximation function $f_2$ (x) is less than 20, i.e., the approximation function $f_2$ (x) is a polynomial having the number of dimensions less than 19, the features $w_i$ can be calculated with the least square method, for example. Note that the specific solution regarding the least square method will be described later.

For example, if we say that the number of dimensions of the approximation function $f_2$ (x) is five as with the first method, with the second method, the features $w_i$ are calculated as follows.

Figure 68:
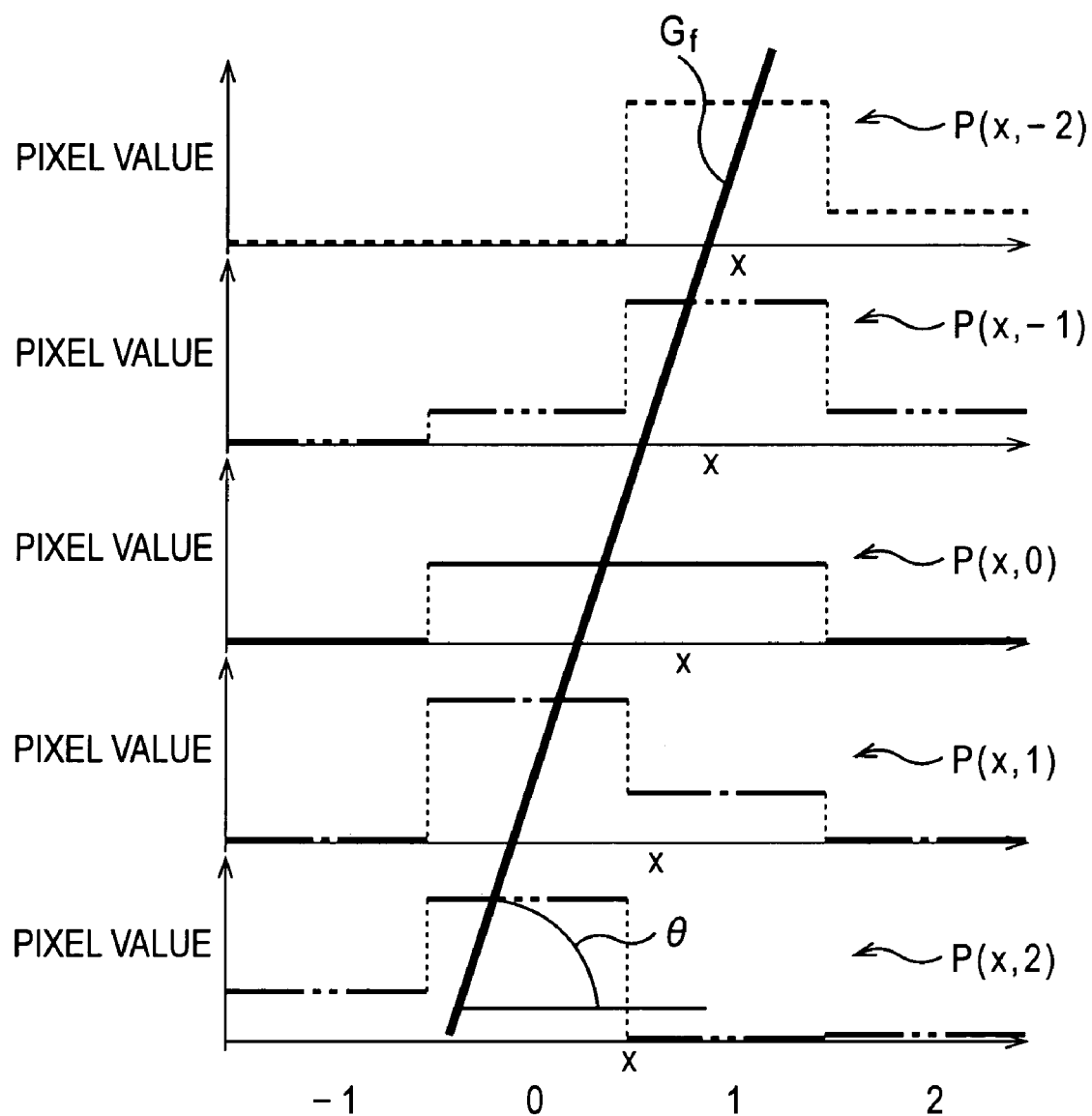
FIG. 68 is a diagram wherein each of the pixel values contained in the fine-line-inclusive data region shown in FIG. 64 are plotted on a graph.

That is to say, FIG. 68 represents the pixel value P (x, y) shown in the left side of Expression (45) in a graphic manner. The respective five graphs shown in FIG. 68 are basically the same as shown in FIG. 65.

As shown in FIG. 68, the maximal pixel values (pixel values corresponding to fine lines) are continuous in the direction of continuity of data represented with the gradient $G_f$.

Figure 69:
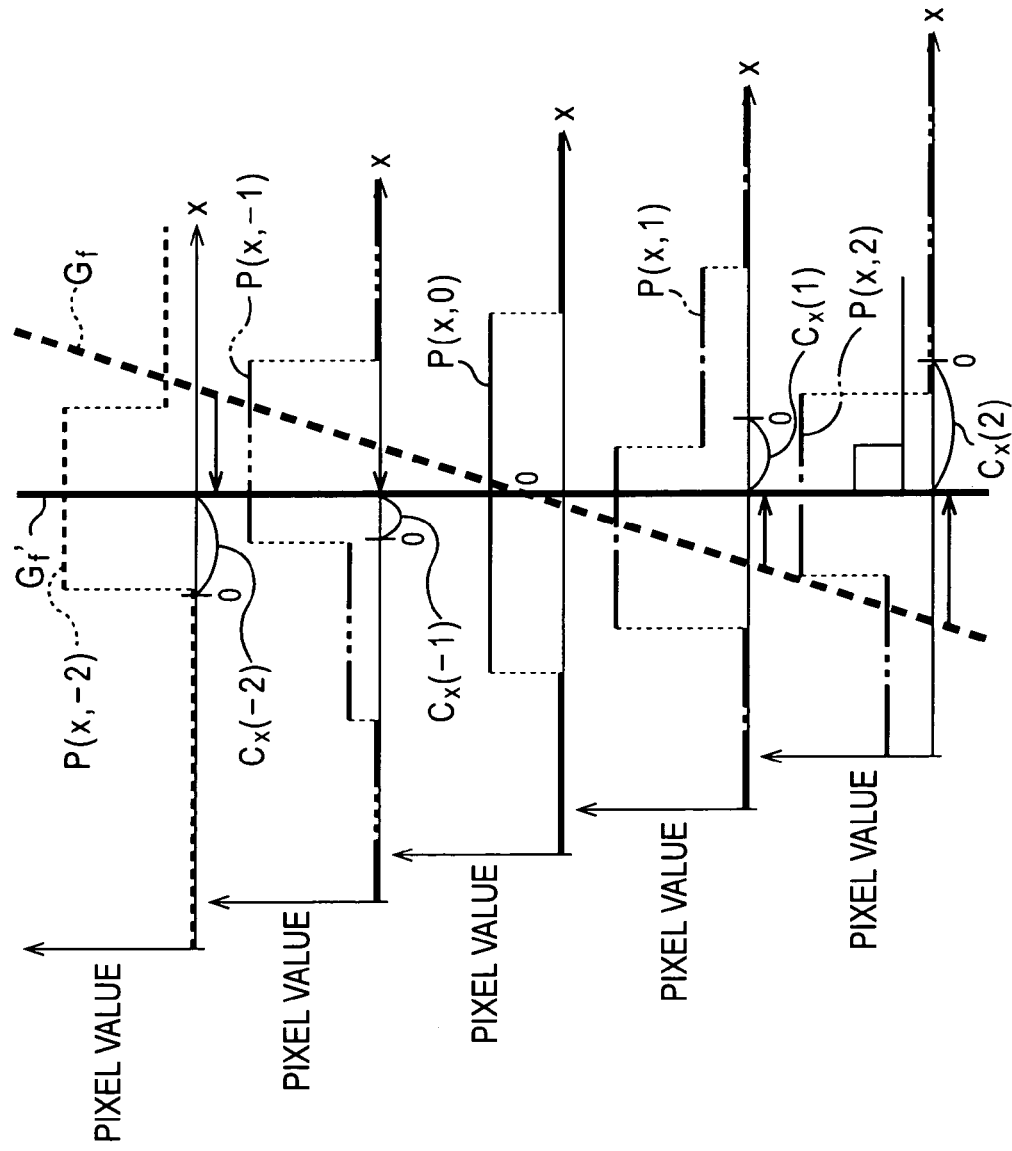
FIG. 69 is a diagram for describing a state wherein each of the input pixel values indicated in FIG. 68 are shifted by a predetermined shift amount.

Consequently, with the second method, if we supplement the respective input pixel values P (x, −2), P (x, −1), P (x, 0), P (x, 1), and P (x, 2) shown in FIG. 68, for example, along the x axis, we supplement the pixel values after the pixel values are changed in the states shown in FIG. 69 instead of supplementing the pixel values without any modification as with the first method (let us assume that y is constant, and the five graphs are overlaid in the states shown in FIG. 68).

That is to say, FIG. 69 represents a state wherein the respective input pixel values P (x, −2), P (x, −1), P (x, 0) P (x, 1), and P (x, 2) shown in FIG. 68 are shifted by the shift amount $C_x$ (y) shown in the above Expression (43). In other words, FIG. 69 represents a state wherein the five graphs shown in FIG. 68 are moved as if the gradient $G_F$ representing the actual direction of continuity of data were regarded as a gradient $G_F{}'$ (in the drawing, a straight line made up of a dashed line were regarded as a straight line made up of a solid line).

Figure 70:
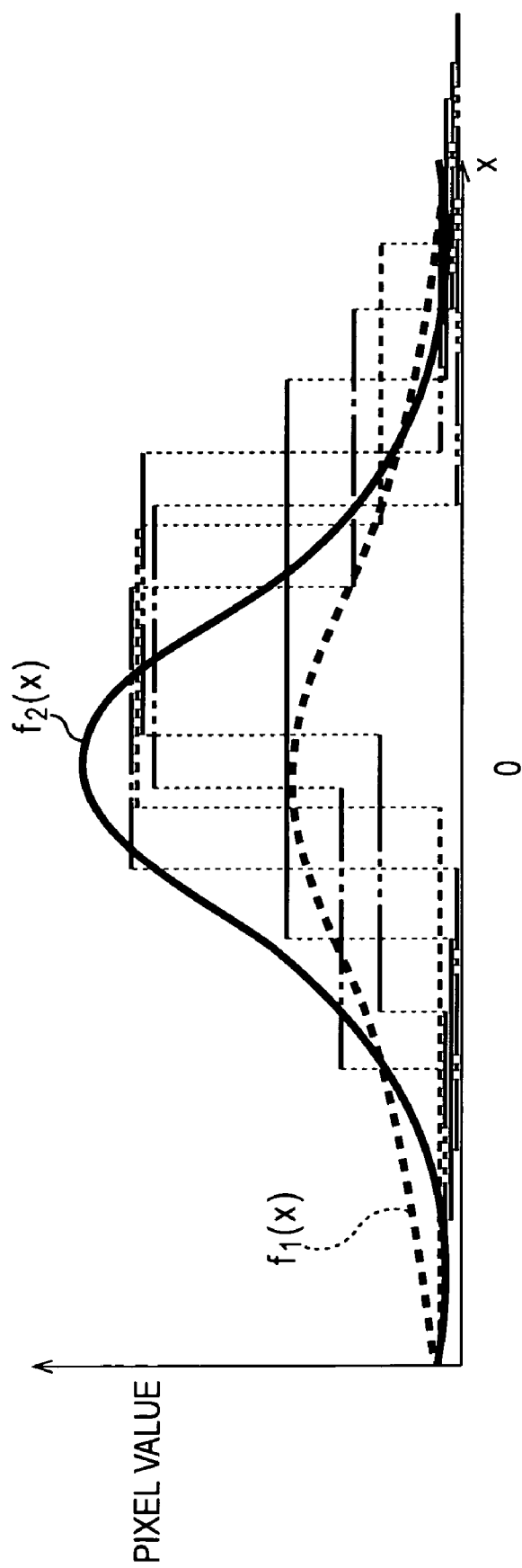
FIG. 70 is a diagram wherein an approximation function, approximating the pixel values contained in the fine-line-inclusive data region shown in FIG. 65, is plotted on a graph, taking into consideration the spatial-direction continuity.

In the states in FIG. 69, if we supplement the respective input pixel values P (x, −2), P (x, −1), P (x, 0), P (x, 1), and P (x, 2), for example, along the x axis (in the states shown in FIG. 69, if we overlay the five graphs), multiple lines (dashed line, broken triple-dashed line, solid line, broken line, and broken double-dashed line) in parallel with the x axis, such as shown in FIG. 70, are distributed.

Note that in FIG. 70, the vertical axis represents pixel values, and the horizontal axis represents a relative position x from the pixel of interest. Also, the dashed line represents the input pixel value P (x, −2), the broken triple-dashed line represents the input pixel value P (x, −1), the solid line represents the input pixel value P (x, 0), the broken line represents the input pixel value P (x, 1), and the broken double-dashed line represents the input pixel value P (x, 2) respectively. Further, in the event of the same pixel value, lines more than 2 lines are overlaid in reality, but in FIG. 70, the lines are drawn so as to distinguish each line, and so as not to overlay each line.

The respective 20 input pixel values P (x, y) (however, x is any one integer value of −1 through 2, and y is any one integer value of −2 through 2) thus distributed, and a regression curve (the approximation function $f_2$ (x) obtained by substituting the features $w_i$ calculated with the least square method for the above Expression (38)) to minimize the error of the value $f_2$ (x+$C_x$ (y)) become a curve $f_2$ (x) shown in the solid line in FIG. 70.

Thus, the approximation function $f_2$ (x) generated with the second method represents a curve connecting in the X direction the means of the input pixel values P (x, y) in the angle θ direction (i.e., direction of continuity in the general spatial direction) output from the data continuity detecting unit 101 (FIG. 58).

On the other hand, as described above, the approximation function $f_1$ (x) generated with the first method represents nothing but a curve connecting in the X direction the means of the input pixel values P (x, y) in the Y direction (i.e., the direction different from the continuity in the spatial direction).

Accordingly, as shown in FIG. 70, the approximation function $f_2$ (x) generated with the second method becomes a function wherein the degree of dullness of the waveform thereof decreases, and also the degree of decrease of the detail as to the original pixel value decreases less than the approximation function $f_1$ (x) generated with the first method. In other words, though not shown in the drawing, with the approximation function $f_2$ (x) generated with the second method, the waveform thereof becomes a waveform closer to the actual X cross-sectional waveform F(x) than the approximation function $f_1$ (x) generated with the first method.

However, as described above, the approximation function $f_2$ (x) is a function considering continuity in the spatial direction, but is nothing but a function generated wherein the input image (input pixel value) is regarded as the origin (basis). That is to say, as shown in FIG. 63 described above, the approximation function $f_2$ (x) is nothing but a function that approximated the input image different from the X cross-sectional waveform F(x), and it is hard to say that the approximation function $f_2$ (x) is a function that approximated the X cross-sectional waveform F(x). In other words, the second method is a method for calculating the features $w_i$ on assumption that the above Expression (44) holds, but does not take the relation in Expression (38) described above into consideration (does not consider the integration effects of the sensor 2).

Consequently, the present applicant has invented the third method that calculates the features $w_i$ of the approximation function $f_3$ (x) by further taking the integration effects of the sensor 2 into consideration as to the second method.

That is to say, the third method is a method that introduces the concept of a spatial mixture or time mixture. Now, considering both spatial mixture and time mixture will complicate the description, so only spatial mixture will be considered here of spatial mixture and time mixture, and time mixture will be ignored.

Description will be made regarding spatial mixture with reference to FIG. 71 prior to description of the third method.

Figure 71:
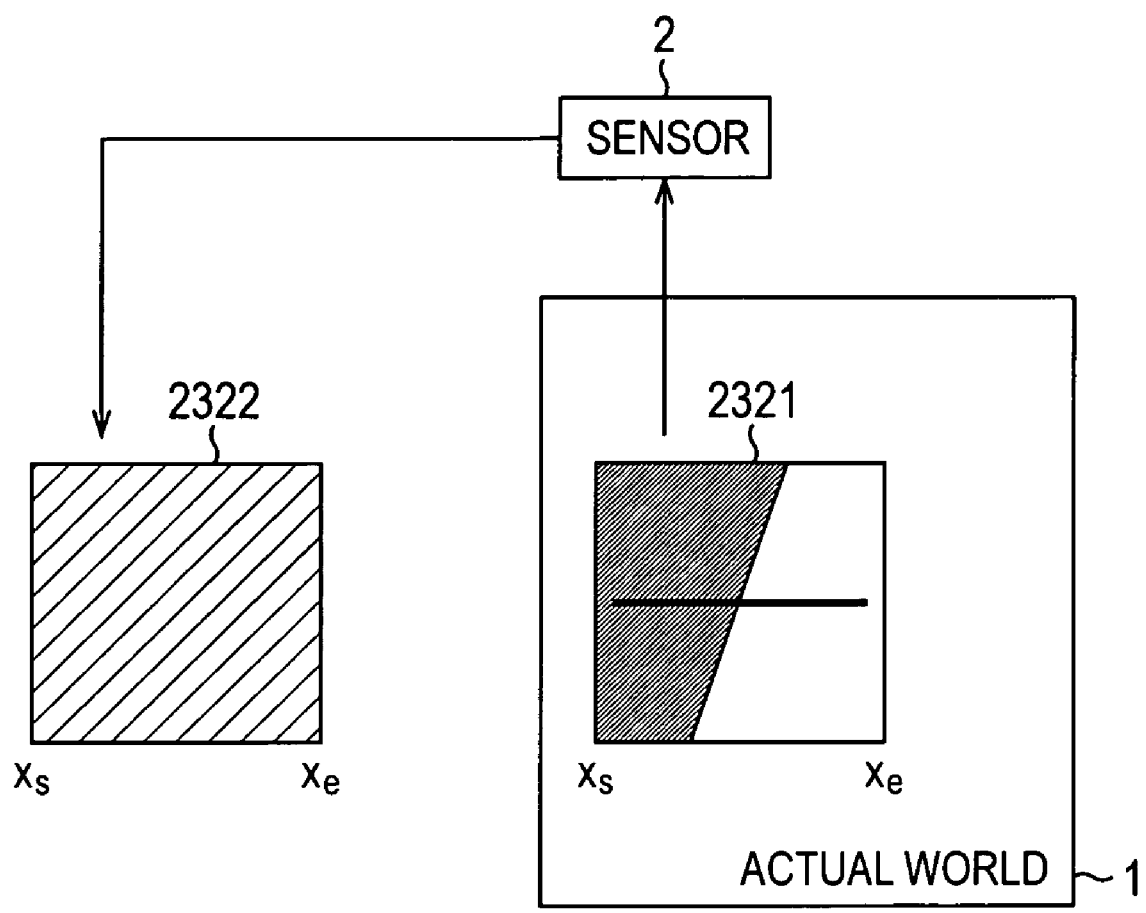
FIG. 71 is a diagram for describing space-mixed region.

In FIG. 71, a portion 2321 (hereafter, referred to as a region 2321) of a light signal in the actual world 1 represents a region having the same area as one detecting element (pixel) of the sensor 2.

Upon the sensor 2 detecting the region 2321, the sensor 2 outputs a value (one pixel value) 2322 obtained by the region 2321 being subjected to integration in the temporal and spatial directions (X direction, Y direction, and t direction). Note that the pixel value 2322 is represented as an image in the drawing, but is actually data representing a predetermined value.

The region 2321 in the actual world 1 is clearly classified into a light signal (white region in the drawing) corresponding to the foreground (the above fine line, for example), and a light signal (black region in the drawing) corresponding to the background.

On the other hand, the pixel value 2322 is a value obtained by the light signal in the actual world 1 corresponding to the foreground and the light signal in the actual world 1 corresponding to the background being subjected to integration. In other words, the pixel value 2322 is a value corresponding to a level wherein the light level corresponding to the foreground and the light level corresponding to the background are spatially mixed.

Thus, in the event that a portion corresponding to one pixel (detecting element of the sensor 2) of the light signals in the actual world 1 is not a portion where the light signals having the same level are spatially uniformly distributed, but a portion where the light signals having a different level such as a foreground and background are distributed, upon the region thereof being detected by the sensor 2, the region becomes one pixel value as if the different light levels were spatially mixed by the integration effects of the sensor 2 (integrated in the spatial direction). Thus, a region made up of pixels in which an image (light signals in the actual world 1) corresponding to a foreground, and an image (light signals in the actual world 1) corresponding to a background are subjected to spatial integration, that is, mixed as it were, which is spatial mixing, is referred to as a spatial mixed region here.

Figure 72:
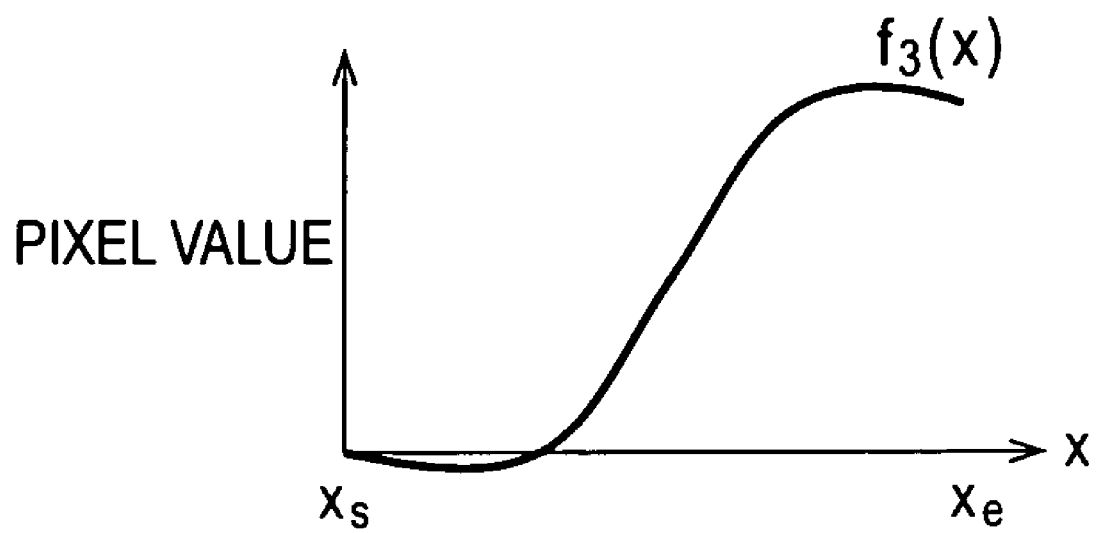
FIG. 72 is a diagram for describing an approximation function approximating actual-world signals in a space-mixed region.

Accordingly, with the third method, the actual world estimating unit 102 (FIG. 58) estimates the X cross-sectional waveform F(x) representing the original region 2321 in the actual world 1 (of the light signals in the actual world 1, the portion 2321 corresponding to one pixel of the sensor 2) by approximating the X cross-sectional waveform F(x) with the approximation function $f_3$ (x) serving as a one-dimensional polynomial such as shown in FIG. 72.

That is to say, FIG. 72 represents an example of the approximation function $f_3$ (x) corresponding to the pixel value 2322 serving as a spatial mixed region (FIG. 71), i.e., the approximation function $f_3$ (x) that approximates the X cross-sectional waveform F(x) corresponding to the solid line within the region 2331 in the actual world 1 (FIG. 71). In FIG. 72, the axis in the horizontal direction in the drawing represents an axis in parallel with the side from the upper left end $x_s$ to lower right end $x_e$ of the pixel corresponding to the pixel value 2322 (FIG. 71), which is taken as the x axis. The axis in the vertical direction in the drawing is taken as an axis representing pixel values.

In FIG. 72, the following Expression (46) is defined on condition that the result obtained by subjecting the approximation function $f_3$ (x) to integration in a range (pixel width) from the $x_s$ to the $x_e$ is generally identical with the pixel values P (x, y) output from the sensor 2 (dependent on a margin of error e alone).

$$P = \int_{x_s}^{x_e} f_3(x)dx + e \qquad (46)$$
$$= \int_{x_s}^{x_e} (w_0 + w_1 x + w_2 x^2 + \ldots + w_n x^n) dx + e$$
$$= w_0(x_e - x_s) + \ldots + w_{n-1} \frac{x_e^n - x_s^n}{n} + w_n \frac{x_e^{n+1} - x_s^{n+1}}{n+1} + e$$

In this case, the features $w_i$ of the approximation function $f_3$ (x) are calculated from the 20 pixel values P (x, y) (however, x is any one integer value of −1 through 2, and y is any one integer value of −2 through 2) of the fine-line-including data region 2302 in FIG. 67, so the pixel value P in Expression (46) becomes the pixel values P (x, y).

Also, as with the second method, it is necessary to take continuity in the spatial direction into consideration, and accordingly, each of the start position $x_s$ and end position $x_e$ in the integral range in Expression (46) is dependent upon the shift amount $C_x$ (y). That is to say, each of the start position $x_s$ and end position $x_e$ of the integral range in Expression (46) is represented such as the following Expression (47).

$$x_s = x - C_x(y) - 0.5$$

$$x_e = x - C_x(y) + 0.5 \qquad (47)$$

In this case, upon each pixel value of the fine-line-including data region 2302 shown in FIG. 67, i.e., each of the input pixel values P (x, −2), P (x, −1), P (x, 0), P (x, 1), and P (x, 2) (however, x is any one integer value of −1 through 2) shown in FIG. 68 being substituted for the above Expression (46) (the integral range is the above Expression (47)), 20 equations shown in the following Expression (48) are generated.

$$P(-1, -2) = \int_{-1-C_x(-2)-0.5}^{-1-C_x(-2)+0.5} f_3(x)dx + e_1,$$ (48)

$$P(0, -2) = \int_{0-C_x(-2)-0.5}^{0-C_x(-2)+0.5} f_3(x)dx + e_2,$$

$$P(1, -2) = \int_{1-C_x(-2)-0.5}^{1-C_x(-2)+0.5} f_3(x)dx + e_3,$$

$$P(2, -2) = \int_{2-C_x(-2)-0.5}^{2-C_x(-2)+0.5} f_3(x)dx + e_4,$$

$$P(-1, -1) = \int_{-1-C_x(-1)-0.5}^{-1-C_x(-1)+0.5} f_3(x)dx + e_5,$$

$$P(0, -1) = \int_{0-C_x(-1)-0.5}^{0-C_x(-1)+0.5} f_3(x)dx + e_6,$$

$$P(1, -1) = \int_{1-C_x(-1)-0.5}^{1-C_x(-1)+0.5} f_3(x)dx + e_7,$$

$$P(2, -1) = \int_{2-C_x(-1)-0.5}^{2-C_x(-1)+0.5} f_3(x)dx + e_8,$$

$$P(-1, 0) = \int_{-1-0.5}^{-1+0.5} f_3(x)dx + e_9,$$

$$P(0, 0) = \int_{0-0.5}^{0+0.5} f_3(x)dx + e_{10},$$

$$P(1, 0) = \int_{1-0.5}^{1+0.5} f_3(x)dx + e_{11},$$

$$P(2, 0) = \int_{2-0.5}^{2+0.5} f_3(x)dx + e_{12},$$

$$P(-1, 1) = \int_{-1-C_x(1)-0.5}^{-1-C_x(1)+0.5} f_3(x)dx + e_{13},$$

$$P(0, 1) = \int_{0-C_x(1)-0.5}^{0-C_x(1)+0.5} f_3(x)dx + e_{14},$$

$$P(1, 1) = \int_{1-C_x(1)-0.5}^{1-C_x(1)+0.5} f_3(x)dx + e_{15},$$

$$P(2, 1) = \int_{2-C_x(1)-0.5}^{2-C_x(1)+0.5} f_3(x)dx + e_{16},$$

$$P(-1, 2) = \int_{-1-C_x(2)-0.5}^{-1-C_x(2)+0.5} f_3(x)dx + e_{17},$$

$$P(0, 2) = \int_{0-C_x(2)-0.5}^{0-C_x(2)+0.5} f_3(x)dx + e_{18},$$

$$P(1, 2) = \int_{1-C_x(2)-0.5}^{1-C_x(2)+0.5} f_3(x)dx + e_{19},$$

$$P(2, 2) = \int_{2-C_x(2)-0.5}^{2-C_x(2)+0.5} f_3(x)dx + e_{20},$$

Expression (48) is made up of 20 equations as with the above Expression (45). Accordingly, with the third method as with the second method, in the event that the number of the features $w_i$ of the approximation function $f_3(x)$ is less than 20, i.e., in the event that the approximation function $f_3(x)$ is a polynomial having the number of dimensions less than 19, for example, the features $w_i$ may be calculated with the least square method. Note that the specific solution of the least square method will be described later.

Figure 73:
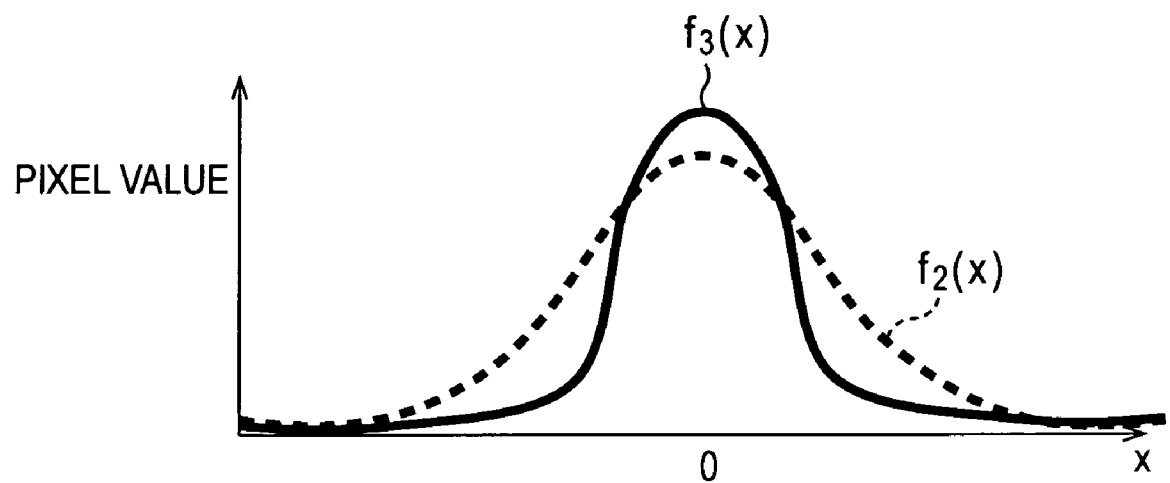
FIG. 73 is a diagram wherein an approximation function, approximating the actual world signals corresponding to the fine-line-inclusive data region shown in FIG. 65, is plotted on a graph, taking into consideration both the sensor integration properties and the spatial-direction continuity.

For example, if we say that the number of dimensions of the approximation function $f_3(x)$ is five, the approximation function $f_3(x)$ calculated with the least square method using Expression (48) (the approximation function $f_3(x)$ generated with the calculated features $w_i$) becomes a curve shown with the solid line in FIG. 73.

Note that in FIG. 73, the vertical axis represents pixel values, and the horizontal axis represents a relative position x from the pixel of interest.

As shown in FIG. 73, in the event that the approximation function $f_3(x)$ (a curve shown with a solid line in the drawing) generated with the third method is compared with the approximation function $f_2(x)$ (a curve shown with a dashed line in the drawing) generated with the second method, a pixel value at x=0 becomes great, and also the gradient of the curve creates a steep waveform. This is because details increase more than the input pixels, resulting in being unrelated to the resolution of the input pixels. That is to say, we can say that the approximation function $f_3(x)$ approximates the X cross-sectional waveform F(x). Accordingly, though not shown in the drawing, the approximation function $f_3(x)$ becomes a waveform closer to the X cross-sectional waveform F(x) than the approximation function $f_2(x)$ FIG. 74 represents an configuration example of the actual world estimating unit 102 employing such a one-dimensional approximating method.

Figure 74:
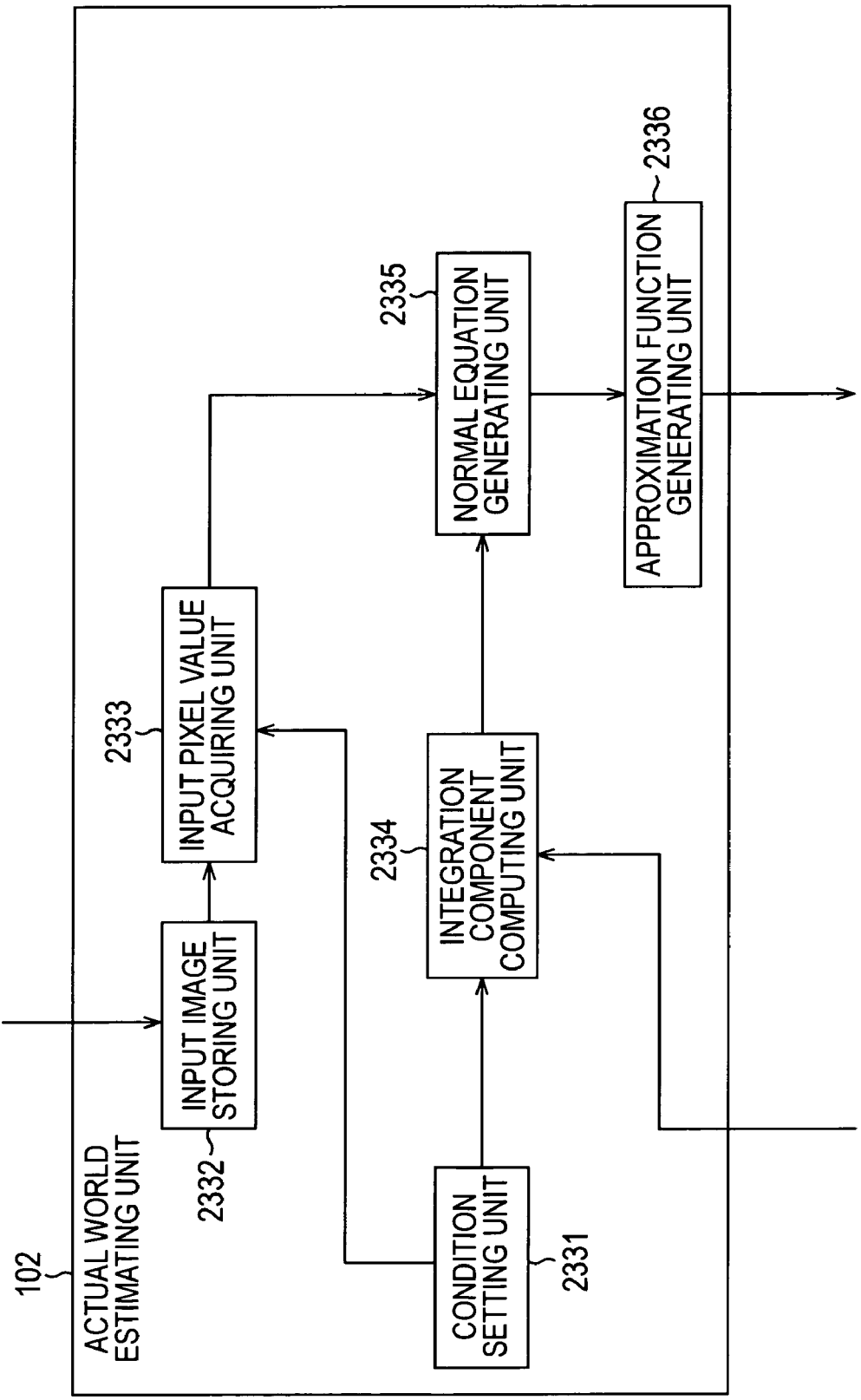
FIG. 74 is a block diagram for describing a configuration example of the actual world estimating unit using, of function approximation techniques having the principle shown in FIG. 58, primary polynomial approximation.

In FIG. 74, the actual world estimating unit 102 estimates the X cross-sectional waveform F(x) by calculating the features $w_i$ using the above third method (least square method) for example, and generating the approximation function f(x) of the above Expression (39) using the calculated features $w_i$.

As shown in FIG. 74, the actual world estimating unit 102 includes a conditions setting unit 2331, input image storage unit 2332, input pixel value acquiring unit 2333, integral component calculation unit 2334, normal equation generating unit 2335, and approximation function generating unit 2336.

The conditions setting unit 2331 sets a pixel range (hereafter, referred to as a tap range) used for estimating the X cross-sectional waveform F(x) corresponding to a pixel of interest, and the number of dimensions n of the approximation function f(x).

The input image storage unit 2332 temporarily stores an input image (pixel values) from the sensor 2.

The input pixel value acquiring unit 2333 acquires, of the input images stored in the input image storage unit 2332, an input image region corresponding to the tap range set by the conditions setting unit 2231, and supplies this to the normal equation generating unit 2335 as an input pixel value table. That is to say, the input pixel value table is a table in which the respective pixel values of pixels included in the input image region are described. Note that a specific example of the input pixel value table will be described later.

Now, the actual world estimating unit 102 calculates the features $w_i$ of the approximation function f(x) with the least square method using the above Expression (46) and Expression (47) here, but the above Expression (46) can be represented such as the following Expression (49).

$$P(x, y) = \sum_{i=0}^{n} w_i \times \frac{(x - C_x(y) + 0.5)^{i+1} - (x - C_x(y) - 0.5)^{i+1}}{i+1} + e$$ (49)

$$= \sum_{i=0}^{n} w_i \times S_i(x_s, x_e) + e$$

In Expression (49), $S_i(x_s, x_e)$ represents the integral components of the i-dimensional term. That is to say, the integral components $S_i(x_s, x_e)$ are shown in the following Expression (50).

$$S_i(x_s, x_e) = \frac{x_e^{i+1} - x_s^{i+1}}{i+1} \qquad (50)$$

The integral component calculation unit 2334 calculates the integral components $S_i(x_s, x_e)$. Specifically, the integral components $S_i(x_s, x_e)$ (however, the value $x_s$ and value $x_e$ are values shown in the above Expression (46)) shown in Expression (50) may be calculated as long as the relative pixel positions (x, y), shift amount $C_x(y)$, and i of the i-dimensional terms are known. Also, of these, the relative pixel positions (x, y) are determined by the pixel of interest and the tap range, the shift amount $C_x(y)$ is determined by the angle θ (by the above Expression (41) and Expression (43)), and the range of i is determined by the number of dimensions n, respectively.

Accordingly, the integral component calculation unit 2334 calculates the integral components $S_i(x_s, x_e)$ based on the tap range and the number of dimensions set by the conditions setting unit 2331, and the angle θ of the data continuity information output from the data continuity detecting unit 101, and supplies the calculated results to the normal equation generating unit 2335 as an integral component table.

The normal equation generating unit 2335 generates the above Expression (46), i.e., a normal equation in the case of obtaining the features $w_i$ of the right side of Expression (49) with the least square method using the input pixel value table supplied from the input pixel value acquiring unit 2333, and the integral component table supplied from the integral component calculation unit 2334, and supplies this to the approximation function generating unit 2336 as a normal equation table. Note that a specific example of a normal equation will be described later.

The approximation function generating unit 2336 calculates the respective features $w_i$ of the above Expression (49) (i.e., the respective coefficients $w_i$ of the approximation function f(x) serving as a one-dimensional polynomial) by solving a normal equation included in the normal equation table supplied from the normal equation generating unit 2335 using the matrix solution, and outputs these to the image generating unit 103.

Next, description will be made regarding the actual world estimating processing (processing in step S102 in FIG. 29) of the actual world estimating unit 102 (FIG. 74) which employs the one-dimensional approximating method with reference to the flowchart in FIG. 75.

For example, let us say that an input image, which is a one-frame input image output from the sensor 2, including the fine-line-including data region 2302 in FIG. 60 described above has been already stored in the input image storage unit 2332. Also, let us say that the data continuity detecting unit 101 has subjected, at the continuity detection processing in step S101 (FIG. 29), the fine-line-including data region 2302 to the processing thereof, and has already output the angle θ as data continuity information.

Figure 75:
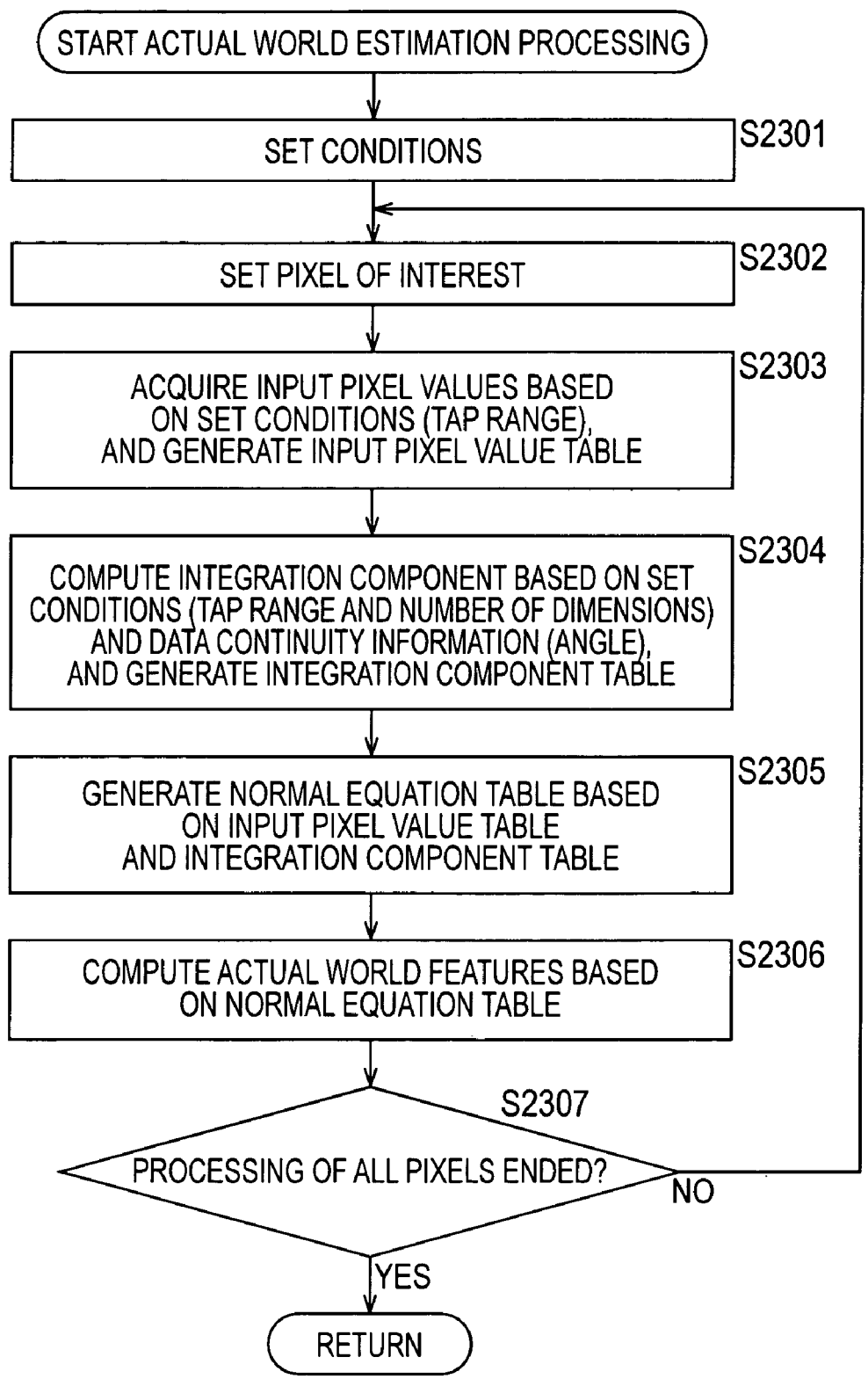
FIG. 75 is a flowchart for describing actual world estimation processing which the actual world estimating unit of the configuration shown in FIG. 74 executes.

In this case, the conditions setting unit 2331 sets conditions (a tap range and the number of dimensions) in step S2301 in FIG. 75.

Figure 76:
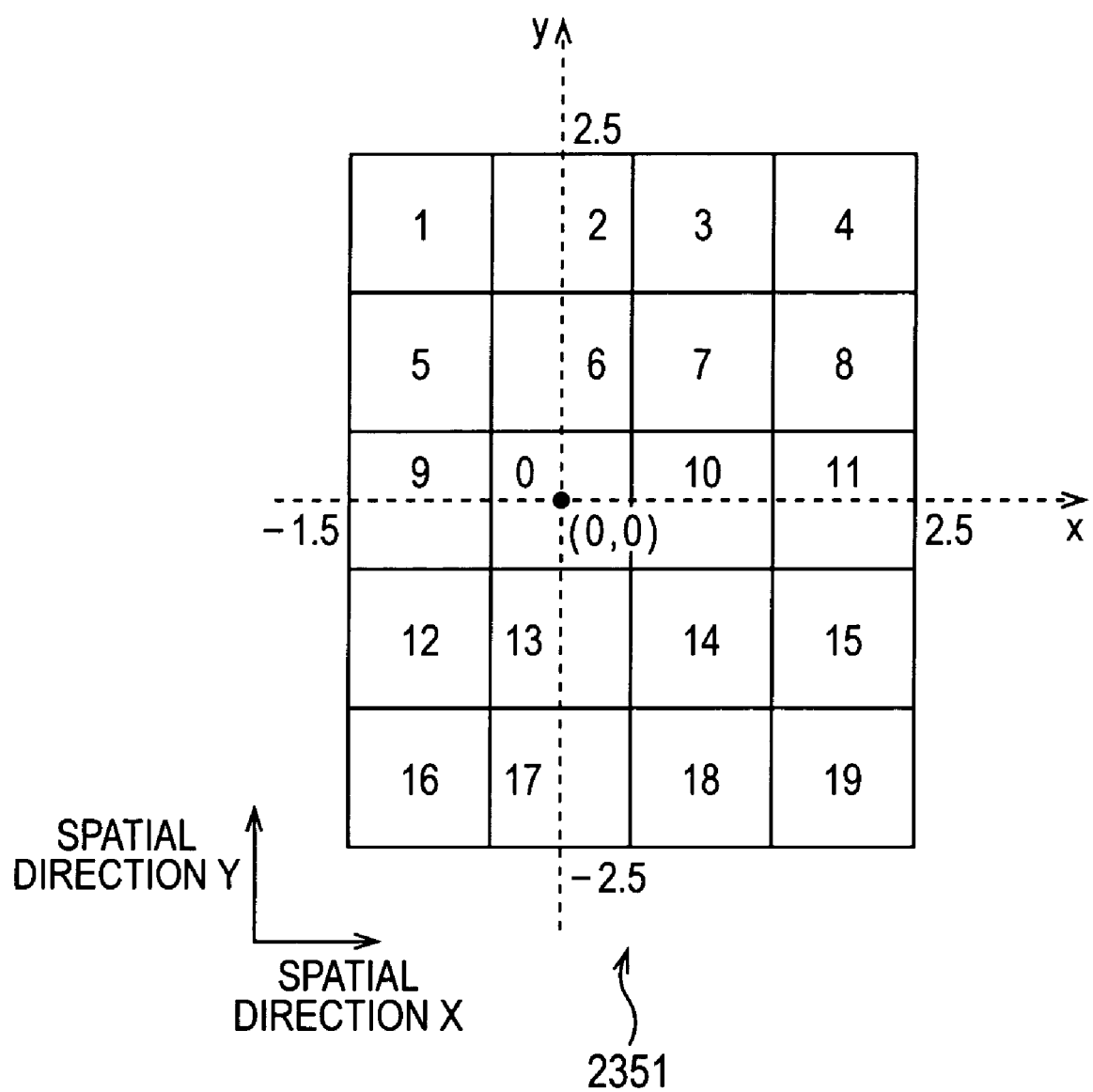
FIG. 76 is a diagram for describing a tap range.

For example, let us say that a tap range 2351 shown in FIG. 76 is set, and 5 dimensions are set as the number of dimensions.

That is to say, FIG. 76 is a diagram for describing an example of a tap range. In FIG. 76, the X direction and Y direction are the X direction and Y direction of the sensor 2 (FIG. 59) respectively. Also, the tap range 2351 represents a pixel group made up of 20 pixels in total (20 squares in the drawing) of 4 pixels in the X direction, and also 5 pixels in the Y direction.

Further, as shown in FIG. 76, let us say that a pixel of interest is set at the second pixel from the left and also the third pixel from the bottom in the drawing, of the tap range 2351. Also, let us say that each pixel is denoted with a number l such as shown in FIG. 76 (l is any integer value of 0 through 19) according to the relative pixel positions (x, y) from the pixel of interest (a coordinate value of a pixel-of-interest coordinates system wherein the center (0, 0) of the pixel of interest is taken as the origin).

Now, description will return to FIG. 75, wherein in step S2302, the conditions setting unit 2331 sets a pixel of interest.

In step S2303, the input pixel value acquiring unit 2333 acquires an input pixel value based on the condition (tap range) set by the conditions setting unit 2331, and generates an input pixel value table. That is to say, in this case, the input pixel value acquiring unit 2333 acquires the fine-line-including data region 2302 (FIG. 64), and generates a table made up of 20 input pixel values P (l) as an input pixel value table.

Note that in this case, the relation between the input pixel values P (l) and the above input pixel values P (x, y) is a relation shown in the following Expression (51). However, in Expression (51), the left side represents the input pixel values P (l), and the right side represents the input pixel values P (x, y).

$P(0)=P(0, 0)$ $P(1)=P(-1, 2)$ $P(2)=P(0, 2)$ $P(3)=P(1, 2)$ $P(4)=P(2, 2)$ $P(5)=P(-1, 1)$ $P(6)=P(0, 1)$ $P(7)=P(1, 1)$ $P(8)=P(2, 1)$ $P(9)=P(-1, 0)$ $P(10)=P(1, 0)$ $P(11)=P(2, 0)$ $P(12)=P(-1, -1)$ $P(13)=P(0, -1)$ $P(14)=P(1, -1)$ $P(15)=P(2, -1)$ $P(16)=P(-1, -2)$ $P(17)=P(0, -2)$ $P(18)=P(1, -2)$ $P(19)=P(2, -2)$ \qquad (51)

In step S2304, the integral component calculation unit 2334 calculates integral components based on the conditions (a tap range and the number of dimensions) set by the conditions setting unit 2331, and the data continuity information (angle θ) supplied from the data continuity detecting unit 101, and generates an integral component table.

In this case, as described above, the input pixel values are not P (x, y) but P (l), and are acquired as the value of a pixel number l, so the integral component calculation unit 2334 calculates the above integral components $S_i(x_s, x_e)$ in Expression (50) as a function of l such as the integral components $S_i(l)$ shown in the left side of the following Expression (52).

$$S_i(l) = S_i(x_s, x_e) \quad (52)$$

Specifically, in this case, the integral components $S_i(l)$ shown in the following Expression (53) are calculated.

$S_i(0) = S_i(-0.5, 0.5)$ $S_i(1) = S_i(-1.5 - C_x(2), -0.5 - C_x(2))$ $S_i(2) = S_i(-0.5 - C_x(2), 0.5 - C_x(2))$ $S_i(3) = S_i(0.5 - C_x(2), 1.5 - C_x(2))$ $S_i(4) = S_i(1.5 - C_x(2), 2.5 - C_x(2))$ $S_i(5) = S_i(-1.5 - C_x(1), -0.5 - C_x(1))$ $S_i(6) = S_i(-0.5 - C_x(1), 0.5 - C_x(1))$ $S_i(7) = S_i(0.5 - C_x(1), 1.5 - C_x(1))$ $S_i(8) = S_i(1.5 - C_x(1), 2.5 - C_x(1))$ $S_i(9) = S_i(-1.5, -0.5)$ $S_i(10) = S_i(0.5, 1.5)$ $S_i(11) = S_i(1.5, 2.5)$ $S_i(12) = S_i(-1.5 - C_x(-1), -0.5 - C_x(-1))$ $S_i(13) = S_i(-0.5 - C_x(-1), 0.5 - C_x(-1))$ $S_i(14) = S_i(0.5 - C_x(-1), 1.5 - C_x(-1))$ $S_i(15) = S_i(1.5 - C_x(-1), 2.5 - C_x(-1))$ $S_i(16) = S_i(-1.5 - C_x(-2), -0.5 - C_x(-2))$ $S_i(17) = S_i(-0.5 - C_x(-2), 0.5 - C_x(-2))$ $S_i(18) = S_i(0.5 - C_x(-2), 1.5 - C_x(-2))$ $S_i(19) = S_i(1.5 - C_x(-2), 2.5 - C_x(-2))$ (53)

Note that in Expression (53), the left side represents the integral components $S_i(l)$, and the right side represents the integral components $S_i(x_s, x_e)$. That is to say, in this case, i is 0 through 5, and accordingly, the 20 $S_i(l)$ in total of the 20 $S_0(l)$, 20 $S_1(l)$, 20 $S_2(l)$ 20 $S_3(l)$, 20 $S_4(l)$, and 20 $S_5(l)$ are calculated.

More specifically, first the integral component calculation unit 2334 calculates each of the shift amounts $C_x(-2)$, $C_x(-1)$, $C_x(1)$, and $C_x(2)$ using the angle θ supplied from the data continuity detecting unit 101. Next, the integral component calculation unit 2334 calculates each of the 20 integral components $S_i(x_s, x_e)$ shown in the right side of Expression (52) regarding each of i=0 through 5 using the calculated shift amounts $C_x(-2)$, $C_x(-1)$, $C_x(1)$, and $C_x(2)$. That is to say, the 120 integral components $S_i(x_s, x_e)$ are calculated. Note that with this calculation of the integral components $S_i(x_s, x_e)$, the above Expression (50) is used. Subsequently, the integral component calculation unit 2334 converts each of the calculated 120 integral components $S_i(x_s, x_e)$ into the corresponding integral components $S_i(l)$ in accordance with Expression (53), and generates an integral component table including the converted 120 integral components $S_i(l)$.

Note that the sequence of the processing in step S2303 and the processing in step S2304 is not restricted to the example in FIG. 75, the processing in step S2304 may be executed first, or the processing in step S2303 and the processing in step S2304 may be executed simultaneously.

Next, in step S2305, the normal equation generating unit 2335 generates a normal equation table based on the input pixel value table generated by the input pixel value acquiring unit 2333 at the processing in step S2303, and the integral component table generated by the integral component calculation unit 2334 at the processing in step S2304.

Specifically, in this case, the features $w_i$ of the following Expression (54) corresponding to the above Expression (49) are calculated using the least square method. A normal equation corresponding to this is represented as the following Expression (55).

$$P(l) = \sum_{i=0}^{n} w_i \times S_i(l) + e \quad (54)$$

$$\begin{pmatrix} \sum_{l=0}^{L} S_0(l)S_0(l) & \sum_{l=0}^{L} S_0(l)S_1(l) & \cdots & \sum_{l=0}^{L} S_0(l)S_n(l) \\ \sum_{l=0}^{L} S_1(l)S_0(l) & \sum_{l=0}^{L} S_1(l)S_1(l) & \cdots & \sum_{l=0}^{L} S_1(l)S_n(l) \\ \vdots & \vdots & \ddots & \vdots \\ \sum_{l=0}^{L} S_n(l)S_0(l) & \sum_{l=0}^{L} S_n(l)S_1(l) & \cdots & \sum_{l=0}^{L} S_n(l)S_n(l) \end{pmatrix} \begin{pmatrix} w_0 \\ w_1 \\ \vdots \\ w_n \end{pmatrix} = \begin{pmatrix} \sum_{l=0}^{L} S_0(l)P(l) \\ \sum_{l=0}^{L} S_1(l)P(l) \\ \vdots \\ \sum_{l=0}^{L} S_n(l)P(l) \end{pmatrix} \quad (55)$$

Note that in Expression (55), L represents the maximum value of the pixel number l in the tap range. n represents the number of dimensions of the approximation function f(x) serving as a polynomial. Specifically, in this case, n=5, and L=19.

If we define each matrix of the normal equation shown in Expression (55) as the following Expressions (56) through (58), the normal equation is represented as the following Expression (59).

$$S_{MAT} = \begin{pmatrix} \sum_{l=0}^{L} S_0(l)S_0(l) & \sum_{l=0}^{L} S_0(l)S_1(l) & \cdots & \sum_{l=0}^{L} S_0(l)S_n(l) \\ \sum_{l=0}^{L} S_1(l)S_0(l) & \sum_{l=0}^{L} S_1(l)S_1(l) & \cdots & \sum_{l=0}^{L} S_1(l)S_n(l) \\ \vdots & \vdots & \ddots & \cdots \\ \sum_{l=0}^{L} S_n(l)S_0(l) & \sum_{l=0}^{L} S_n(l)S_1(l) & \cdots & \sum_{l=0}^{L} S_n(l)S_n(l) \end{pmatrix} \quad (56)$$

$$W_{MAT} = \begin{pmatrix} w_0 \\ w_1 \\ \vdots \\ w_n \end{pmatrix} \quad (57)$$

$$P_{MAT} = \begin{pmatrix} \sum_{l=0}^{L} S_0(l)P(l) \\ \sum_{l=0}^{L} S_1(l)P(l) \\ \vdots \\ \sum_{l=0}^{L} S_n(l)P(l) \end{pmatrix} \quad (58)$$

$$S_{MAT} W_{MAT} = P_{MAT} \quad (59)$$

As shown in Expression (57), the respective components of the matrix $W_{MAT}$ are the features $w_i$ to be obtained. Accordingly, in Expression (59), if the matrix $S_{MAT}$ of the left side and the matrix $P_{MAT}$ of the right side are determined, the matrix $W_{MAT}$ (i.e., features $w_i$) may be calculated with the matrix solution.

Specifically, as shown in Expression (56), the respective components of the matrix $S_{MAT}$ may be calculated as long as the above integral components $S_i(l)$ are known. The integral components $S_i(l)$ are included in the integral component table supplied from the integral component calculation unit 2334, so the normal equation generating unit 2335 can calculate each component of the matrix $S_{MAT}$ using the integral component table.

Also, as shown in Expression (58), the respective components of the matrix $P_{MAT}$ may be calculated as long as the integral components $S_i(l)$ and the input pixel values P (l) are known. The integral components $S_i(l)$ is the same as those included in the respective components of the matrix $S_{MAT}$, also the input pixel values P (l) are included in the input pixel value table supplied from the input pixel value acquiring unit 2333, so the normal equation generating unit 2335 can calculate each component of the matrix $P_{MAT}$ using the integral component table and input pixel value table.

Thus, the normal equation generating unit 2335 calculates each component of the matrix $S_{MAT}$ and matrix $P_{MAT}$, and outputs the calculated results (each component of the matrix $S_{MAT}$ and matrix $P_{MAT}$) to the approximation function generating unit 2336 as a normal equation table.

Upon the normal equation table being output from the normal equation generating unit 2335, in step S2306, the approximation function generating unit 2336 calculates the features $w_i$ (i.e., the coefficients $w_i$ of the approximation function f(x) serving as a one-dimensional polynomial) serving as the respective components of the matrix $W_{MAT}$ in the above Expression (59) based on the normal equation table.

Specifically, the normal equation in the above Expression (59) can be transformed as the following Expression (60).

$$W_{MAT} = S_{MAT}^{-1} P_{MAT} \quad (60)$$

In Expression (60), the respective components of the matrix $W_{MAT}$ in the left side are the features $w_i$ to be obtained. The respective components regarding the matrix $S_{MAT}$ and matrix $P_{MAT}$ are included in the normal equation table supplied from the normal equation generating unit 2335. Accordingly, the approximation function generating unit 2336 calculates the matrix $W_{MAT}$ by calculating the matrix in the right side of Expression (60) using the normal equation table, and outputs the calculated results (features $w_i$) to the image generating unit 103.

In step S2307, the approximation function generating unit 2336 determines regarding whether or not the processing of all the pixels has been completed.

In step S2307, in the event that determination is made that the processing of all the pixels has not been completed, the processing returns to step S2302, wherein the subsequent processing is repeatedly performed. That is to say, the pixels that have not become a pixel of interest are sequentially taken as a pixel of interest, and the processing in step S2302 through S2307 is repeatedly performed.

In the event that the processing of all the pixels has been completed (in step S2307, in the event that determination is made that the processing of all the pixels has been completed), the estimating processing of the actual world 1 ends.

Note that the waveform of the approximation function f(x) generated with the coefficients (features) $w_i$ thus calculated becomes a waveform such as the approximation function $f_3(x)$ in FIG. 73 described above.

Thus, with the one-dimensional approximating method, the features of the approximation function f(x) serving as a one-dimensional polynomial are calculated under the assumption, for example, that a waveform having the same form as the one-dimensional X cross-sectional waveform F(x) is continuous in the direction of continuity. Accordingly, with the one-dimensional approximating method, the features of the approximation function f(x) can be calculated with less amount of calculation processing than other function approximating methods.

Next, description will be made regarding the second function approximating method with reference to FIG. 77 through FIG. 83.

Figure 77:
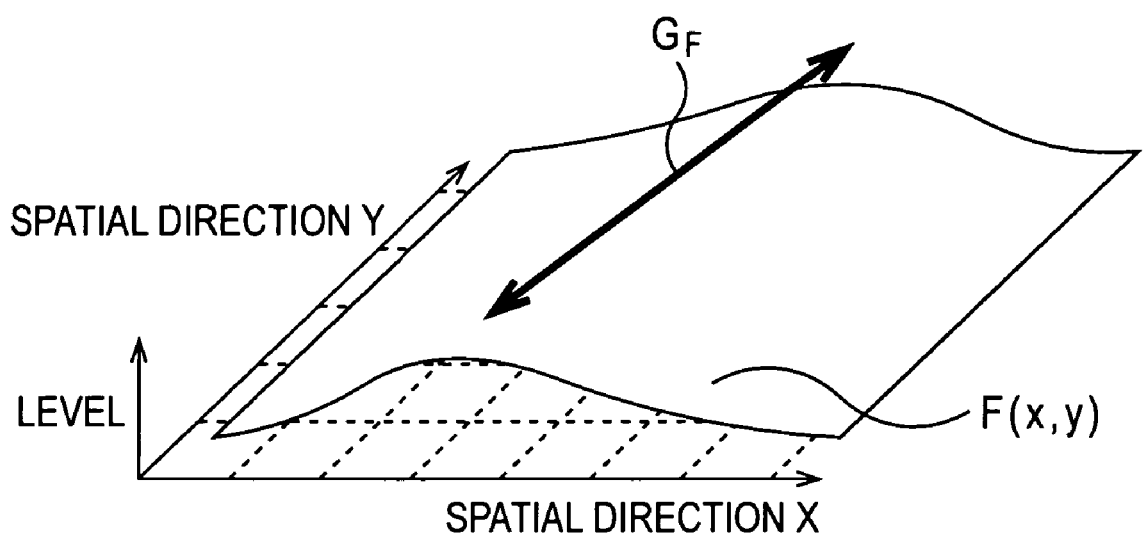
FIG. 77 is a diagram for describing actual world signals having continuity in the spatial direction.

That is to say, the second function approximating method is a method wherein the light signal in the actual world 1 having continuity in the spatial direction represented with the gradient $G_F$ such as shown in FIG. 77 for example is regarded as a waveform F(x, y) on the X-Y plane (on the plane level in the X direction serving as one direction of the spatial directions, and in the Y direction orthogonal to the X direction), and the waveform F(x, y) is approximated with the approximation function f(x, y) serving as a two-dimensional polynomial, thereby estimating the waveform F(x, y). Accordingly, hereafter, the second function approximating method is referred to as a two-dimensional polynomial approximating method.

Note that in FIG. 77, the horizontal direction represents the X direction serving as one direction of the spatial directions, the upper right direction represents the Y direction serving as the other direction of the spatial directions, and the vertical direction represents the level of light respectively. $G_F$ represents the gradient as continuity in the spatial direction.

Figure 78:
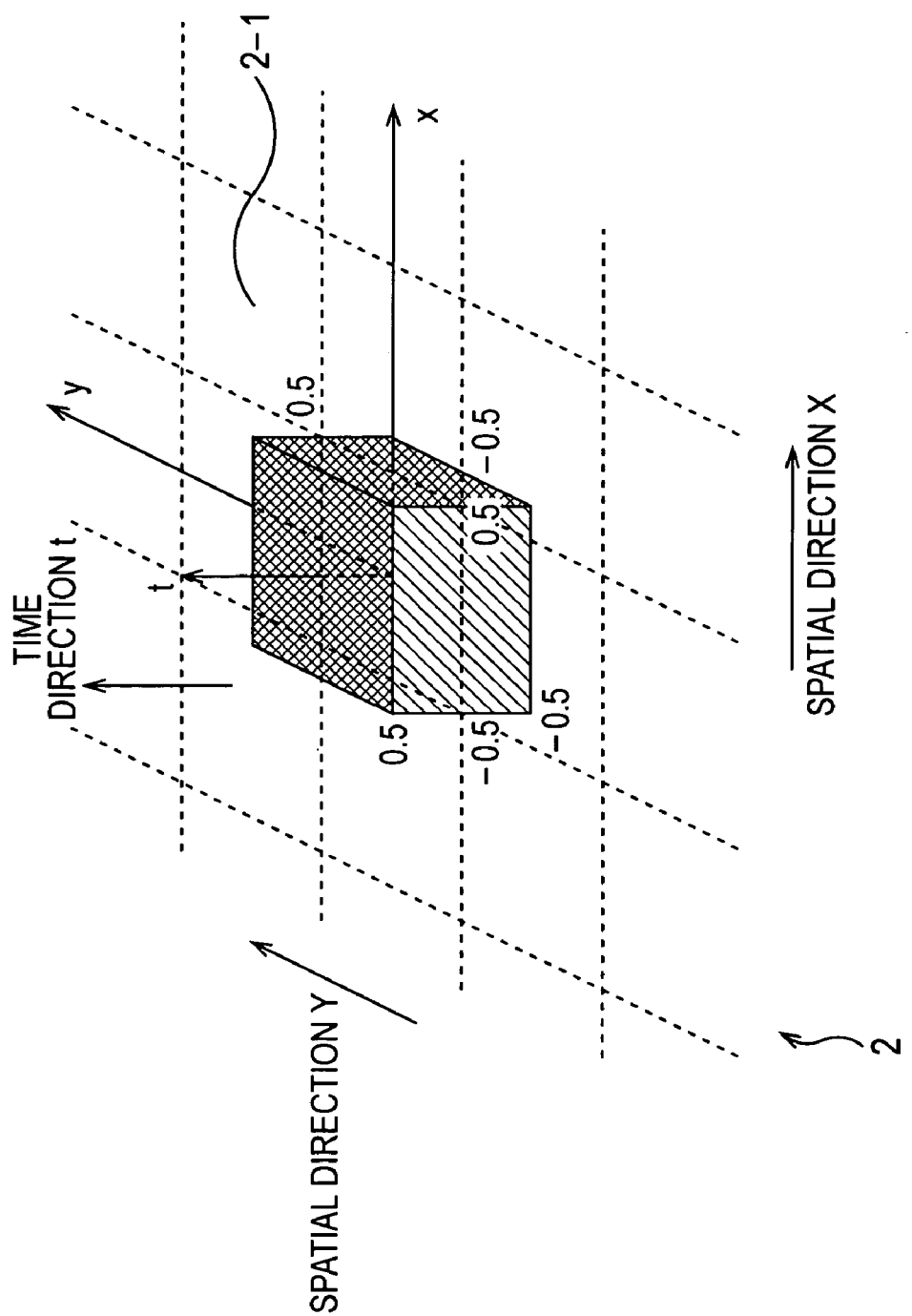
FIG. 78 is a diagram for describing integration effects in the event that the sensor is a CCD.

Also, with description of the two-dimensional polynomial approximating method, let us say that the sensor 2 is a CCD made up of the multiple detecting elements 2-1 disposed on the plane thereof, such as shown in FIG. 78.

With the example in FIG. 78, the direction in parallel with a predetermined side of the detecting elements 2-1 is taken as the X direction serving as one direction of the spatial directions, and the direction orthogonal to the X direction is taken as the Y direction serving as the other direction of the spatial directions. The direction orthogonal to the X-Y plane is taken as the t direction serving as the temporal direction.

Also, with the example in FIG. 78, the spatial shape of the respective detecting elements 2-1 of the sensor 2 is taken as a square of which one side is 1 in length. The shutter time (exposure time) of the sensor 2 is taken as 1.

Further, with the example in FIG. 78, the center of one certain detecting element 2-1 of the sensor 2 is taken as the origin (the position in the X direction is x=0, and the position in the Y direction is y=0) in the spatial directions (X direction and Y direction), and also the intermediate point-in-time of the exposure time is taken as the origin (the position in the t direction is t=0) in the temporal direction (t direction).

In this case, the detecting element 2-1 of which the center is in the origin (x=0, y=0) in the spatial directions subjects the light signal function F(x, y, t) to integration with a range of −0.5 through 0.5 in the X direction, with a range of −0.5 through 0.5 in the Y direction, and with a range of −0.5 through 0.5 in the t direction, and outputs the integral value as the pixel value P.

That is to say, the pixel value P output from the detecting element 2-1 of which the center is in the origin in the spatial directions is represented with the following Expression (61).

$$P = \int_{-0.5}^{+0.5} \int_{-0.5}^{+0.5} \int_{-0.5}^{+0.5} F(x, y, t) dx dy dt \quad (61)$$

Similarly, the other detecting elements 2-1 output the pixel value P shown in Expression (61) by taking the center of the detecting element 2-1 to be processed as the origin in the spatial directions.

Incidentally, as described above, the two-dimensional polynomial approximating method is a method wherein the light signal in the actual world 1 is handled as a waveform F(x, y) such as shown in FIG. 77 for example, and the two-dimensional waveform F(x, y) is approximated with the approximation function f(x, y) serving as a two-dimensional polynomial.

First, description will be made regarding a method representing such the approximation function f(x, y) with a two-dimensional polynomial.

As described above, the light signal in the actual world 1 is represented with the light signal function F(x, y, t) of which variables are the position on the three-dimensional space x, y, and z, and point-in-time t. This light signal function F(x, y, t), i.e., a one-dimensional waveform projected in the X direction at an arbitrary position y in the Y direction is referred to as an X cross-sectional waveform F(x), here.

When paying attention to this X cross-sectional waveform F(x), in the event that the signal in the actual world 1 has continuity in a certain direction in the spatial directions, it can be conceived that a waveform having the same form as the X cross-sectional waveform F(x) continues in the continuity direction. For example, with the example in FIG. 77, a waveform having the same form as the X cross-sectional waveform F(x) continues in the direction of the gradient $G_F$. In other words, it can be said that the waveform F(x, y) is formed by a waveform having the same form as the X cross-sectional waveform F(x) continuing in the direction of the gradient $G_F$.

Accordingly, the approximation function f(x, y) can be represented with a two-dimensional polynomial by considering that the waveform of the approximation function f(x, y) approximating the waveform F(x, y) is formed by a waveform having the same form as the approximation function f(x) approximating the X cross-sectional F (x) continuing.

Description will be made in more detail regarding the representing method of the approximation function f(x, y).

For example, let us say that the light signal in the actual world 1 such as shown in FIG. 77 described above, i.e., a light signal having continuity in the spatial direction represented with the gradient $G_F$ is detected by the sensor 2 (FIG. 78), and output as an input image (pixel value).

Figure 79:
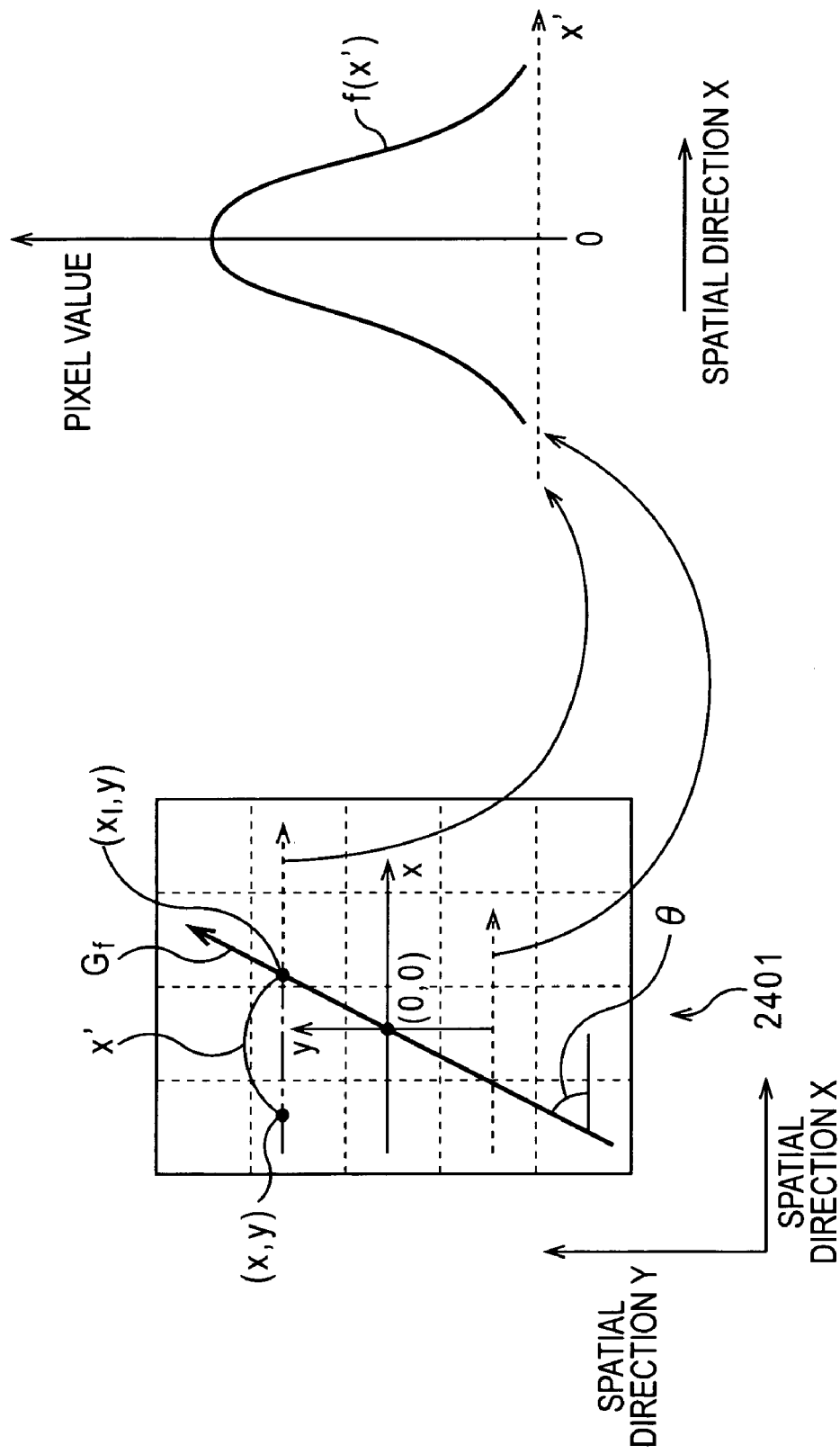
FIG. 79 is a diagram for describing distance in the cross-sectional direction.

Further, let us say that as shown in FIG. 79, the data continuity detecting unit 101 (FIG. 3) subjects an input image region 2401 made up of 20 pixels (in the drawing, 20 squares represented with dashed line) in total of 4 pixels in the X direction and also 5 pixels in the Y direction, of this input image, to the processing thereof, and outputs an angle θ (angle θ generated between the direction of data continuity represented with the gradient $G_f$ corresponding to the gradient $G_F$, and the X direction) as one of the data continuity information.

Note that with the input image region 2401, the horizontal direction in the drawing represents the X direction serving as one direction in the spatial directions, and the vertical direction in the drawing represents the Y direction serving as the other direction of the spatial directions.

Also, in FIG. 79, an (x, y) coordinates system is set such that a pixel in the second pixel from the left, and also the third pixel from the bottom is taken as a pixel of interest, and the center of the pixel of interest is taken as the origin (0, 0). A relative distance (hereafter, referred to as a cross-sectional direction distance) in the x direction as to the straight line (straight line having the gradient $G_f$ representing the direction of data continuity) having an angle θ passing through the origin (0, 0) is described as x'.

Further, in FIG. 79, the graph on the right side is a function wherein an X cross-sectional waveform F(x') is approximated, which represents an approximation function f(x') serving as an n-dimensional (n is an arbitrary integer) polynomial. Of the axes in the graph on the right side, the axis in the horizontal direction in the drawing represents a cross-sectional direction distance, and the axis in the vertical direction in the drawing represents pixel values.

In this case, the approximation function f(x') shown in FIG. 79 is an n-dimensional polynomial, so is represented as the following Expression (62).

$$f(x') = w_0 + w_1 x' + w_2 x' + \ldots + w_n x'^n = \sum_{i=0}^{n} w_i x'^i \quad (62)$$

Also, since the angle θ is determined, the straight line having angle θ passing through the origin (0, 0) is uniquely determined, and a position $x_1$ in the X direction of the straight line at an arbitrary position y in the Y direction is represented as the following Expression (63). However, in Expression (63), s represents cot θ(=1/tan θ).

$$x_1 = s \times y \quad (63)$$

That is to say, as shown in FIG. 79, a point on the straight line corresponding to continuity of data represented with the gradient $G_f$ is represented with a coordinate value $(x_1, y)$.

The cross-sectional direction distance x' is represented as the following Expression (64) using Expression (63).

$$x' = x - x_1 = x - s \times y \quad (64)$$

Accordingly, the approximation function f(x, y) at an arbitrary position (x, y) within the input image region 2401 is represented as the following Expression (65) using Expression (62) and Expression (64).

$$f(x, y) = \sum_{i=0}^{n} w_i (x - s \times y)^i \qquad (65)$$

Note that in Expression (65), $w_i$ represents coefficients of the approximation function f(x, y). Note that the coefficients $w_i$ of the approximation function f including the approximation function f(x, y) can be evaluated as the features of the approximation function f. Accordingly, the coefficients $w_i$ of the approximation function f are also referred to as the features $w_i$ of the approximation function f.

Thus, the approximation function f(x, y) having a two-dimensional waveform can be represented as the polynomial of Expression (65) as long as the angle θ is known.

Accordingly, if the actual world estimating unit 102 can calculate the features $w_i$ of Expression (65), the actual world estimating unit 102 can estimate the waveform F(x, y) such as shown in FIG. 77.

Consequently, hereafter, description will be made regarding a method for calculating the features $w_i$ of Expression (65).

That is to say, upon the approximation function f(x, y) represented with Expression (65) being subjected to integration with an integral range (integral range in the spatial direction) corresponding to a pixel (the detecting element 2-1 of the sensor 2 (FIG. 78)), the integral value becomes the estimated value regarding the pixel value of the pixel. It is the following Expression (66) that this is represented with an equation. Note that with the two-dimensional polynomial approximating method, the temporal direction t is regarded as a constant value, so Expression (66) is taken as an equation of which variables are the positions x and y in the spatial directions (X direction and Y direction).

$$P(x, y) = \int_{y-0.5}^{y+0.5} \int_{x-0.5}^{x+0.5} \sum_{i=0}^{n} w_i (x - s \times y)^i + e \qquad (66)$$

In Expression (66), P (x, y) represents the pixel value of a pixel of which the center position is in a position (x, y) (relative position (x, y) from the pixel of interest) of an input image from the sensor 2. Also, e represents a margin of error.

Thus, with the two-dimensional polynomial approximating method, the relation between the input pixel value P (x, y) and the approximation function f(x, y) serving as a two-dimensional polynomial can be represented with Expression (66), and accordingly, the actual world estimating unit 102 can estimate the two-dimensional function F(x, y) (waveform F(x, y) wherein the light signal in the actual world 1 having continuity in the spatial direction represented with the gradient $G_F$ (FIG. 77) is represented focusing attention on the spatial direction) by calculating the features $w_i$ with, for example, the least square method or the like using Expression (66) (by generating the approximation function f(x, y) by substituting the calculated features $w_i$ for Expression (64)).

Figure 80:
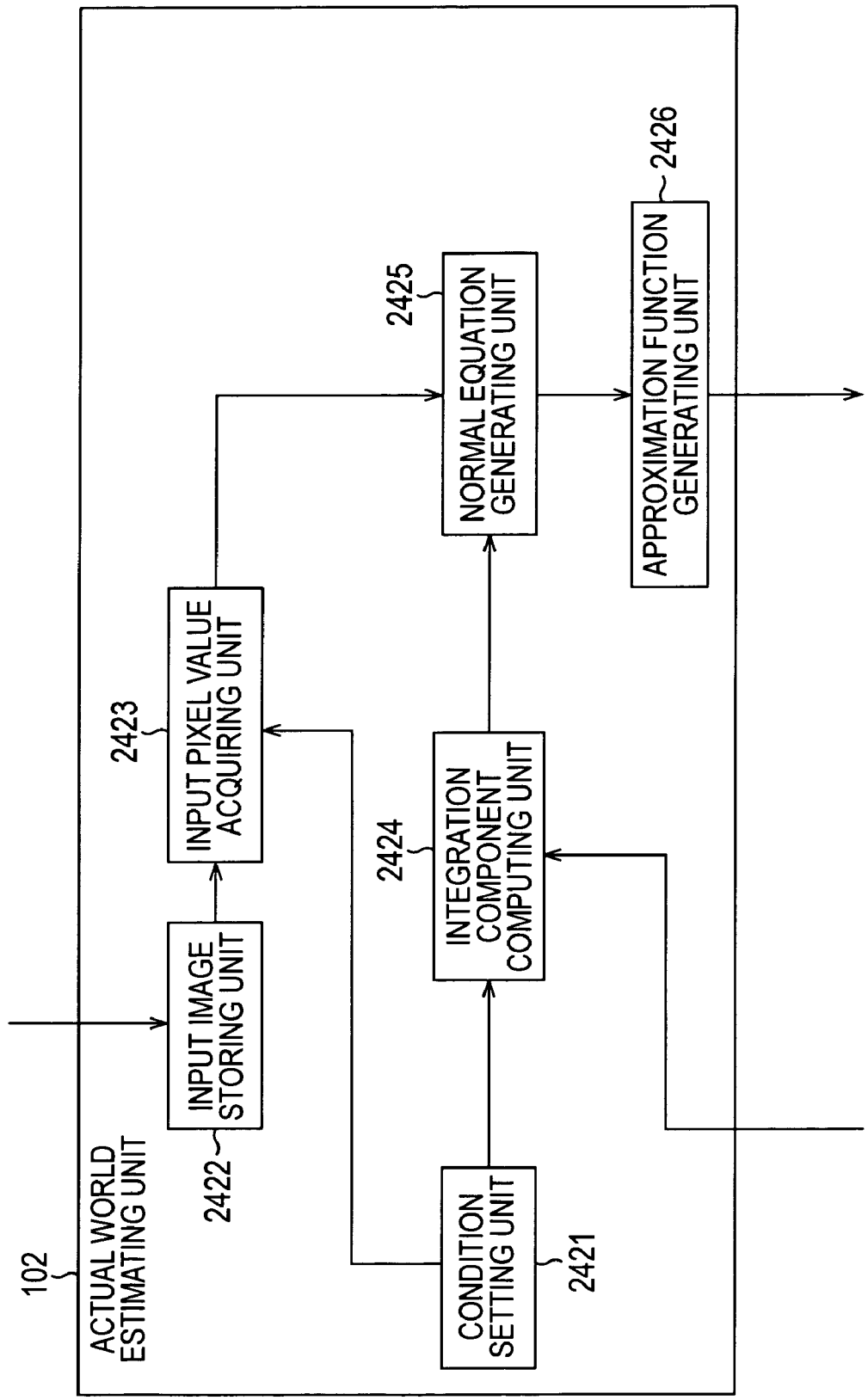
FIG. 80 is a block diagram for describing a configuration example of the actual world estimating unit using, of function approximation techniques having the principle shown in FIG. 58, quadratic polynomial approximation.

FIG. 80 represents a configuration example of the actual world estimating unit 102 employing such a two-dimensional polynomial approximating method.

As shown in FIG. 80, the actual world estimating unit 102 includes a conditions setting unit 2421, input image storage unit 2422, input pixel value acquiring unit 2423, integral component calculation unit 2424, normal equation generating unit 2425, and approximation function generating unit 2426.

The conditions setting unit 2421 sets a pixel range (tap range) used for estimating the function F(x, y) corresponding to a pixel of interest, and the number of dimensions n of the approximation function f(x, y).

The input image storage unit 2422 temporarily stores an input image (pixel values) from the sensor 2.

The input pixel value acquiring unit 2423 acquires, of the input images stored in the input image storage unit 2422, an input image region corresponding to the tap range set by the conditions setting unit 2421, and supplies this to the normal equation generating unit 2425 as an input pixel value table. That is to say, the input pixel value table is a table in which the respective pixel values of pixels included in the input image region are described. Note that a specific example of the input pixel value table will be described later.

Incidentally, as described above, the actual world estimating unit 102 employing the two-dimensional approximating method calculates the features $w_i$ of the approximation function f(x, y) represented with the above Expression (65) by solving the above Expression (66) using the least square method.

Expression (66) can be represented as the following Expression (71) by using the following Expression (70) obtained by the following Expressions (67) through (69).

$$\int x^i dx = \frac{x^{i+1}}{i+1} \qquad (67)$$

$$\int (x - s \times y)^i dx = \frac{(x - s \times y)^{i+1}}{(i+1)} \qquad (68)$$

$$\int (x - s \times y)^i dy = \frac{(x - s \times y)^{i+1}}{s(i+1)} \qquad (69)$$

$$\int_{y-0.5}^{y+0.5} \int_{x-0.5}^{x+0.5} (x - s \times y)^i dx dy = \int_{y-0.5}^{y+0.5} \left[ \frac{(x - s \times y)^{i+1}}{(i+1)} \right]_{x-0.5}^{x+0.5} dy \qquad (70)$$

$$= \int_{y-0.5}^{y+0.5} \frac{(x+0.5 - s \times y)^{i+1} - (x-0.5 - s \times y)^{i+1}}{i+1} dy$$

$$= \frac{\left[ \frac{(x+0.5 - s \times y)^{i+2}}{s(i+1)(i+2)} \right]_{y-0.5}^{y+0.5} - \left[ \frac{(x-0.5 - s \times y)^{i+2}}{s(i+1)(i+2)} \right]_{y-0.5}^{y+0.5}}{}$$

$$= \frac{(x+0.5 - s \times y + 0.5s)^{i+2} - (x+0.5 - s \times y - 0.5s)^{i+2} - (x-0.5 - s \times y + 0.5s)^{i+2} + (x-0.5 - s \times y - 0.5s)^{i+2}}{s(i+1)(i+2)}$$

$$P(x, y) = \sum_{i=0}^{n} \frac{w_i}{s(i+1)(i+2)} \{(x+0.5 - s \times y + 0.5s)^{i+2} - \qquad (71)$$

$$(x+0.5 - s \times y - 0.5s)^{i+2} - (x-0.5 - s \times y + 0.5s)^{i+2} +$$

$$(x-0.5 - s \times y - 0.5s)^{i+2}\} + e$$

$$= \sum_{i=0}^{n} w_i s_i (x-0.5, x+0.5, y-0.5, y+0.5) + e$$

In Expression (71), $S_i$ (x−0.5, x+0.5, y−0.5, y+0.5) represents the integral components of i-dimensional terms. That is to say, the integral components $S_i$ (x−0.5, x+0.5, y−0.5, y+0.5) are as shown in the following Expression (72).

$$s_i(x-0.5,\ x+0.5,\ y-0.5,\ y+0.5) = \\ \frac{(x+0.5-s\times y+0.5s)^{i+2} - (x+0.5-s\times y-0.5s)^{i+2} - (x-0.5-s\times y+0.5s)^{i+2} + (x-0.5-s\times y-0.5s)^{i+2}}{s(i+1)(i+2)} \quad (72)$$

The integral component calculation unit 2424 calculates the integral components $S_i$ (x−0.5, x+0.5, y−0.5, y+0.5).

Specifically, the integral components $S_i$ (x−0.5, x+0.5, y−0.5, y+0.5) shown in Expression (72) can be calculated as long as the relative pixel positions (x, y), the variable s and i of i-dimensional terms in the above Expression (65) are known. Of these, the relative pixel positions (x, y) are determined with a pixel of interest, and a tap range, the variable s is cot θ, which is determined with the angle θ, and the range of i is determined with the number of dimensions n respectively.

Accordingly, the integral component calculation unit 2424 calculates the integral components $S_i$ (x−0.5, x+0.5, y−0.5, y+0.5) based on the tap range and the number of dimensions set by the conditions setting unit 2421, and the angle θ of the data continuity information output from the data continuity detecting unit 101, and supplies the calculated results to the normal equation generating unit 2425 as an integral component table.

The normal equation generating unit 2425 generates a normal equation in the case of obtaining the above Expression (66), i.e., Expression (71) by the least square method using the input pixel value table supplied from the input pixel value acquiring unit 2423, and the integral component table supplied from the integral component calculation unit 2424, and outputs this to the approximation function generating unit 2426 as a normal equation table. Note that a specific example of a normal equation will be described later.

The approximation function generating unit 2426 calculates the respective features $w_i$ of the above Expression (66) (i.e., the coefficients $w_i$ of the approximation function f(x, y) serving as a two-dimensional polynomial) by solving the normal equation included in the normal equation table supplied from the normal equation generating unit 2425 using the matrix solution, and output these to the image generating unit 103.

Next, description will be made regarding the actual world estimating processing (processing in step S102 in FIG. 29) to which the two-dimensional polynomial approximating method is applied, with reference to the flowchart in FIG. 81.

For example, let us say that the light signal in the actual world 1 having continuity in the spatial direction represented with the gradient $G_F$ has been detected by the sensor 2 (FIG. 78), and has been stored in the input image storage unit 2422 as an input image corresponding to one frame. Also, let us say that the data continuity detecting unit 101 has subjected the region 2401 shown in FIG. 79 described above of the input image to processing in the continuity detecting processing in step S101 (FIG. 29), and has output the angle θ as data continuity information.

In this case, in step S2401, the conditions setting unit 2421 sets conditions (a tap range and the number of dimensions).

Figure 82:
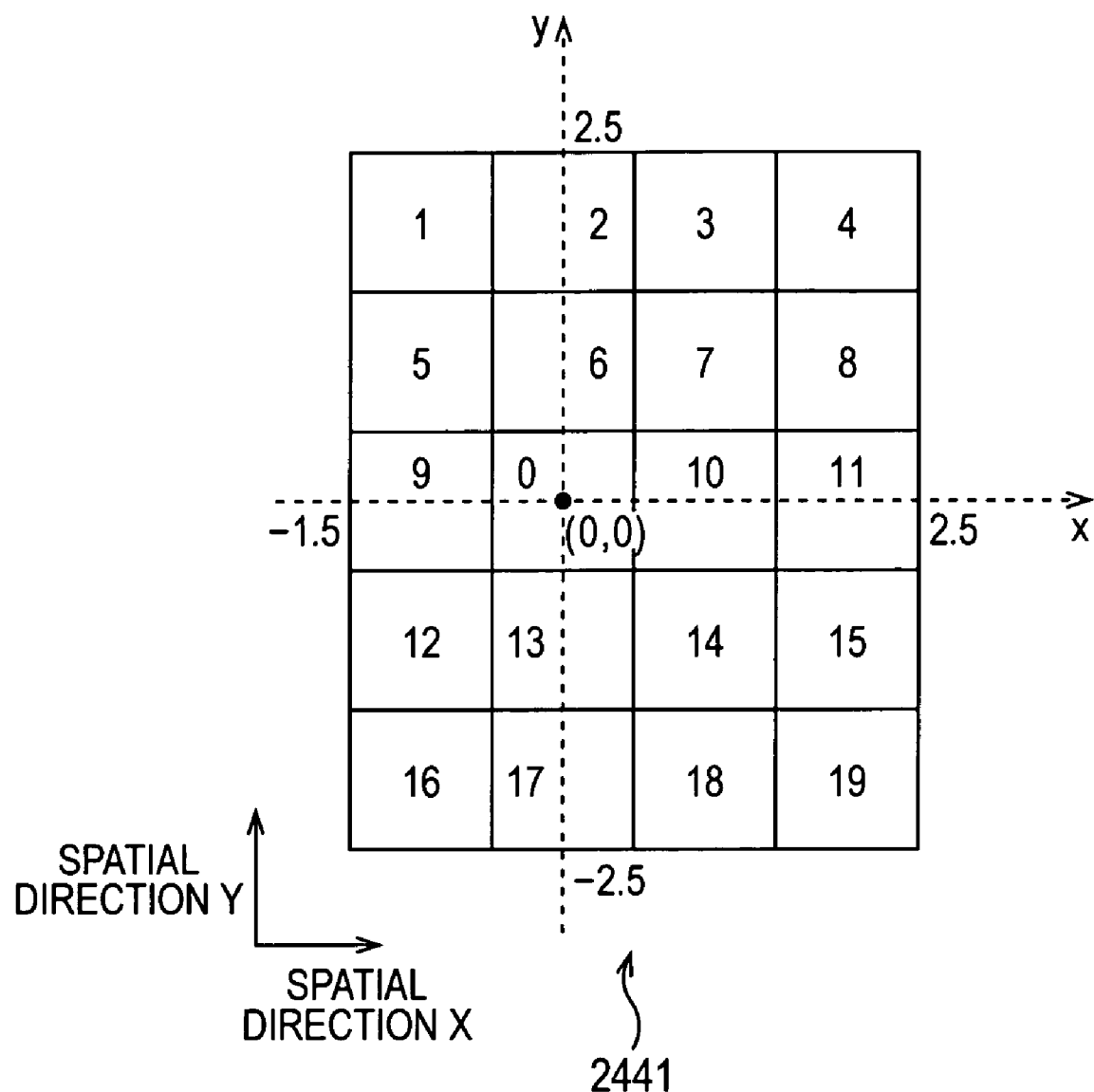
FIG. 82 is a diagram for describing a tap range.

For example, let us say that a tap range 2441 shown in FIG. 82 has been set, and also 5 has been set as the number of dimensions.

FIG. 82 is a diagram for describing an example of a tap range. In FIG. 82, the X direction and Y direction represent the X direction and Y direction of the sensor 2 (FIG. 78). Also, the tap range 2441 represents a pixel group made up of 20 pixels (20 squares in the drawing) in total of 4 pixels in the X direction and also 5 pixels in the Y direction.

Further, as shown in FIG. 82, let us say that a pixel of interest has been set to a pixel, which is the second pixel from the left and also the third pixel from the bottom in the drawing, of the tap range 2441. Also, let us say that each pixel is denoted with a number l such as shown in FIG. 82 (l is any integer value of 0 through 19) according to the relative pixel positions (x, y) from the pixel of interest (a coordinate value of a pixel-of-interest coordinates system wherein the center (0, 0) of the pixel of interest is taken as the origin).

Now, description will return to FIG. 81, wherein in step S2402, the conditions setting unit 2421 sets a pixel of interest.

In step S2403, the input pixel value acquiring unit 2423 acquires an input pixel value based on the condition (tap range) set by the conditions setting unit 2421, and generates an input pixel value table. That is to say, in this case, the input pixel value acquiring unit 2423 acquires the input image region 2401 (FIG. 79), generates a table made up of 20 input pixel values P (l) as an input pixel value table.

Note that in this case, the relation between the input pixel values P (l) and the above input pixel values P (x, y) is a relation shown in the following Expression (73). However, in Expression (73), the left side represents the input pixel values P (l), and the right side represents the input pixel values P (x, y).

$P(0)=P(0, 0)$ $P(1)=P(-1, 2)$ $P(2)=P(0, 2)$ $P(3)=P(1, 2)$ $P(4)=P(2, 2)$ $P(5)=P(-1, 1)$ $P(6)=P(0, 1)$ $P(7)=P(1, 1)$ $P(8)=P(2, 1)$ $P(9)=P(-1, 0)$ $P(10)=P(1, 0)$ $P(11)=P(2, 0)$ $P(12)=P(-1, -1)$ $P(13)=P(0, -1)$ $P(14)=P(1, -1)$ $P(15)=P(2, -1)$ $P(16)=P(-1, -2)$ $P(17)=P(0, -2)$ $P(18)=P(1, -2)$ $P(19)=P(2, -2)$ \hfill (73)

In step S2404, the integral component calculation unit 2424 calculates integral components based on the conditions (a tap range and the number of dimensions) set by the conditions setting unit 2421, and the data continuity information (angle θ) supplied from the data continuity detecting unit 101, and generates an integral component table.

In this case, as described above, the input pixel values are not P (x, y) but P (l), and are acquired as the value of a pixel number l, so the integral component calculation unit 2424 calculates the integral components $S_i$ (x−0.5, x+0.5, y−0.5, y+0.5) in the above Expression (72) as a function of l such as the integral components $S_i$ (l) shown in the left side of the following Expression (74).

$$S_i(l) = S_i(x-0.5, x+0.5, y-0.5, y+0.5) \quad (74)$$

Specifically, in this case, the integral components $S_i$ (l) shown in the following Expression (75) are calculated.

$$S_i(0) = S_i(0)(-0.5, 0.5, -0.5, 0.5)$$

$$S_i(1) = S_i(-1.5, -0.5, 1.5, 2.5)$$

$$S_i(2) = S_i(-0.5, 0.5, 1.5, 2.5)$$

$$S_i(3) = S_i(0.5, 1.5, 1.5, 2.5)$$

$$S_i(4) = S_i(1.5, 2.5, 1.5, 2.5)$$

$$S_i(5) = S_i(-1.5, -0.5, 0.5, 1.5)$$

$$S_i(6) = S_i(-0.5, 0.5, 0.5, 1.5)$$

$$S_i(7) = S_i(0.5, 1.5, 0.5, 1.5)$$

$$S_i(8) = S_i(1.5, 2.5, 0.5, 1.5)$$

$$S_i(9) = S_i(-1.5, -0.5, -0.5, 0.5)$$

$$S_i(10) = S_i(0.5, 1.5, -0.5, 0.5)$$

$$S_i(11) = S_i(1.5, 2.5, -0.5, 0.5)$$

$$S_i(12) = S_i(-1.5, -0.5, -1.5, -0.5)$$

$$S_i(13) = S_i(-0.5, 0.5, -1.5, -0.5)$$

$$S_i(14) = S_i(0.5, 1.5, -1.5, -0.5)$$

$$S_i(15) = S_i(1.5, 2.5, -1.5, -0.5)$$

$$S_i(16) = S_i(-1.5, -0.5, -2.5, -1.5)$$

$$S_i(17) = S_i(-0.5, 0.5, -2.5, -1.5)$$

$$S_i(18) = S_i(0.5, 1.5, -2.5, -1.5)$$

$$S_i(19) = S_i(1.5, 2.5, -2.5, -1.5) \quad (75)$$

Note that in Expression (75), the left side represents the integral components $S_i$ (l), and the right side represents the integral components $S_i$ (x−0.5, x+0.5, y−0.5, y+0.5). That is to say, in this case, i is 0 through 5, and accordingly, the 120 $S_i$ (l) in total of the 20 $S_0$ (l), 20 $S_1$ (l), 20 $S_2$ (l), 20 $S_3$ (l), 20 $S_4$ (l), and 20 $S_5$ (l) are calculated.

More specifically, first the integral component calculation unit 2424 calculates cot θ corresponding to the angle θ supplied from the data continuity detecting unit 101, and takes the calculated result as a variable s. Next, the integral component calculation unit 2424 calculates each of the 20 integral components $S_i$ (x−0.5, x+0.5, y−0.5, y+0.5) shown in the right side of Expression (74) regarding each of i=0 through 5 using the calculated variable s. That is to say, the 120 integral components $S_i$ (x−0.5, x+0.5, y−0.5, y+0.5) are calculated.

Note that with this calculation of the integral components $S_i$ (x−0.5, x+0.5, y−0.5, y+0.5), the above Expression (72) is used. Subsequently, the integral component calculation unit 2424 converts each of the calculated 120 integral components $S_i$ (x−0.5, x+0.5, y−0.5, y+0.5) into the corresponding integral components $S_i$ (l) in accordance with Expression (75), and generates an integral component table including the converted 120 integral components $S_i$ (l).

Figure 81:
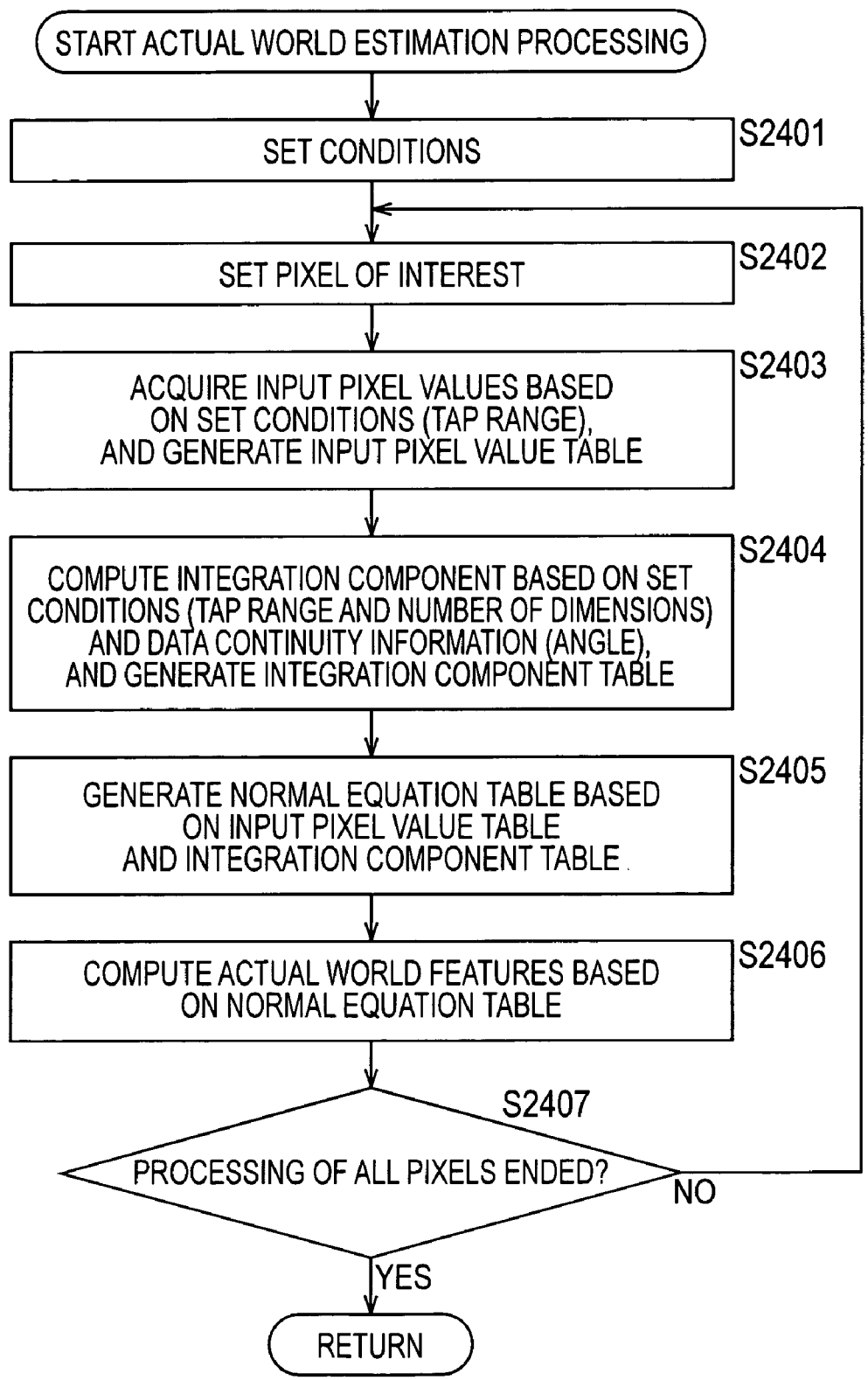
FIG. 81 is a flowchart for describing actual world estimation processing which the actual world estimating unit of the configuration shown in FIG. 81 executes.

Note that the sequence of the processing in step S2403 and the processing in step S2404 is not restricted to the example in FIG. 81, the processing in step S2404 may be executed first, or the processing in step S2403 and the processing in step S2404 may be executed simultaneously.

Next, in step S2405, the normal equation generating unit 2425 generates a normal equation table based on the input pixel value table generated by the input pixel value acquiring unit 2423 at the processing in step S2403, and the integral component table generated by the integral component calculation unit 2424 at the processing in step S2404.

Specifically, in this case, the features $w_i$ are calculated with the least square method using the above Expression (71) (however, in Expression (70), the $S_i$ (l) into which the integral components $S_i$ (x−0.5, x+0.5, y−0.5, y+0.5) are converted using Expression (74) is used), so a normal equation corresponding to this is represented as the following Expression (76).

$$\begin{pmatrix} \sum_{l=0}^{L} S_0(l)S_0(l) & \sum_{l=0}^{L} S_0(l)S_1(l) & \cdots & \sum_{l=0}^{L} S_0(l)S_n(l) \\ \sum_{l=0}^{L} S_1(l)S_0(l) & \sum_{l=0}^{L} S_1(l)S_1(l) & \cdots & \sum_{l=0}^{L} S_1(l)S_n(l) \\ \vdots & \vdots & \ddots & \vdots \\ \sum_{l=0}^{L} S_n(l)S_0(l) & \sum_{l=0}^{L} S_n(l)S_1(l) & \cdots & \sum_{l=0}^{L} S_n(l)S_n(l) \end{pmatrix} \begin{pmatrix} w_0 \\ w_1 \\ \vdots \\ w_n \end{pmatrix} = \begin{pmatrix} \sum_{l=0}^{L} S_0(l)P(l) \\ \sum_{l=0}^{L} S_1(l)P(l) \\ \vdots \\ \sum_{l=0}^{L} S_n(l)P(l) \end{pmatrix} \quad (76)$$

Note that in Expression (76), L represents the maximum value of the pixel number l in the tap range. n represents the number of dimensions of the approximation function f(x) serving as a polynomial. Specifically, in this case, n=5, and L=19.

If we define each matrix of the normal equation shown in Expression (76) as the following Expressions (77) through (79), the normal equation is represented as the following Expression (80).

$$S_{MAT} = \begin{pmatrix} \sum_{l=0}^{L} S_0(l)S_0(l) & \sum_{l=0}^{L} S_0(l)S_1(l) & \cdots & \sum_{l=0}^{L} S_0(l)S_n(l) \\ \sum_{l=0}^{L} S_1(l)S_0(l) & \sum_{l=0}^{L} S_1(l)S_1(l) & \cdots & \sum_{l=0}^{L} S_1(l)S_n(l) \\ \vdots & \vdots & \ddots & \vdots \\ \sum_{l=0}^{L} S_n(l)S_0(l) & \sum_{l=0}^{L} S_n(l)S_1(l) & \cdots & \sum_{l=0}^{L} S_n(l)S_n(l) \end{pmatrix} \quad (77)$$

-continued $$W_{MAT} = \begin{pmatrix} w_0 \\ w_1 \\ \vdots \\ w_n \end{pmatrix} \quad (78)$$

$$P_{MAT} = \begin{pmatrix} \sum_{l=0}^{L} S_0(l)P(l) \\ \sum_{l=0}^{L} S_1(l)P(l) \\ \vdots \\ \sum_{l=0}^{L} S_n(l)P(l) \end{pmatrix} \quad (79)$$

$$S_{MAT} W_{MAT} = P_{MAT} \quad (80)$$

As shown in Expression (78), the respective components of the matrix $W_{MAT}$ are the features $w_i$ to be obtained. Accordingly, in Expression (80), if the matrix $S_{MAT}$ of the left side and the matrix $P_{MAT}$ of the right side are determined, the matrix $W_{MAT}$ may be calculated with the matrix solution.

Specifically, as shown in Expression (77), the respective components of the matrix $S_{MAT}$ may be calculated with the above integral components $S_i$ (l). That is to say, the integral components $S_i$ (l) are included in the integral component table supplied from the integral component calculation unit 2424, so the normal equation generating unit 2425 can calculate each component of the matrix $S_{MAT}$ using the integral component table.

Also, as shown in Expression (79), the respective components of the matrix $P_{MAT}$ may be calculated with the integral components $S_i$ (l) and the input pixel values P (l). That is to say, the integral components $S_i$ (l) is the same as those included in the respective components of the matrix $S_{MAT}$, also the input pixel values P (l) are included in the input pixel value table supplied from the input pixel value acquiring unit 2423, so the normal equation generating unit 2425 can calculate each component of the matrix $P_{MAT}$ using the integral component table and input pixel value table.

Thus, the normal equation generating unit 2425 calculates each component of the matrix $S_{MAT}$ and matrix $P_{MAT}$, and outputs the calculated results (each component of the matrix $S_{MAT}$ and matrix $P_{MAT}$) to the approximation function generating unit 2426 as a normal equation table.

Upon the normal equation table being output from the normal equation generating unit 2425, in step S2406, the approximation function generating unit 2426 calculates the features $w_i$ (i.e., the coefficients $w_i$ of the approximation function f(x, y) serving as a two-dimensional polynomial) serving as the respective components of the matrix $W_{MAT}$ in the above Expression (80) based on the normal equation table.

Specifically, the normal equation in the above Expression (80) can be transformed as the following Expression (81).

$$W_{MAT} = S_{MAT}^{-1} P_{MAT} \quad (81)$$

In Expression (81), the respective components of the matrix $W_{MAT}$ in the left side are the features $w_i$ to be obtained. The respective components regarding the matrix $S_{MAT}$ and matrix $P_{MAT}$ are included in the normal equation table supplied from the normal equation generating unit 2425. Accordingly, the approximation function generating unit 2426 calculates the matrix $W_{MAT}$ by calculating the matrix in the right side of Expression (81) using the normal equation table, and outputs the calculated results (features $w_i$) to the image generating unit 103.

In step S2407, the approximation function generating unit 2426 determines regarding whether or not the processing of all the pixels has been completed.

In step S2407, in the event that determination is made that the processing of all the pixels has not been completed, the processing returns to step S2402, wherein the subsequent processing is repeatedly performed. That is to say, the pixels that have not become a pixel of interest are sequentially taken as a pixel of interest, and the processing in step S2402 through S2407 is repeatedly performed.

In the event that the processing of all the pixels has been completed (in step S2407, in the event that determination is made that the processing of all the pixels has been completed), the estimating processing of the actual world 1 ends.

As description of the two-dimensional polynomial approximating method, an example for calculating the coefficients (features) $w_i$ of the approximation function f(x, y) corresponding to the spatial directions (X direction and Y direction) has been employed, but the two-dimensional polynomial approximating method can be applied to the temporal and spatial directions (X direction and t direction, or Y direction and t direction) as well.

That is to say, the above example is an example in the case of the light signal in the actual world 1 having continuity in the spatial direction represented with the gradient $G_F$ (FIG. 77), and accordingly, the equation including two-dimensional integration in the spatial directions (X direction and Y direction), such as shown in the above Expression (66). However, the concept regarding two-dimensional integration can be applied not only to the spatial direction but also to the temporal and spatial directions (X direction and t direction, or Y direction and t direction).

In other words, with the two-dimensional polynomial approximating method, even in the case in which the light signal function F(x, y, t), which needs to be estimated, has not only continuity in the spatial direction but also continuity in the temporal and spatial directions (however, X direction and t direction, or Y direction and t direction), this can be approximated with a two-dimensional approximation function f.

Figure 83:
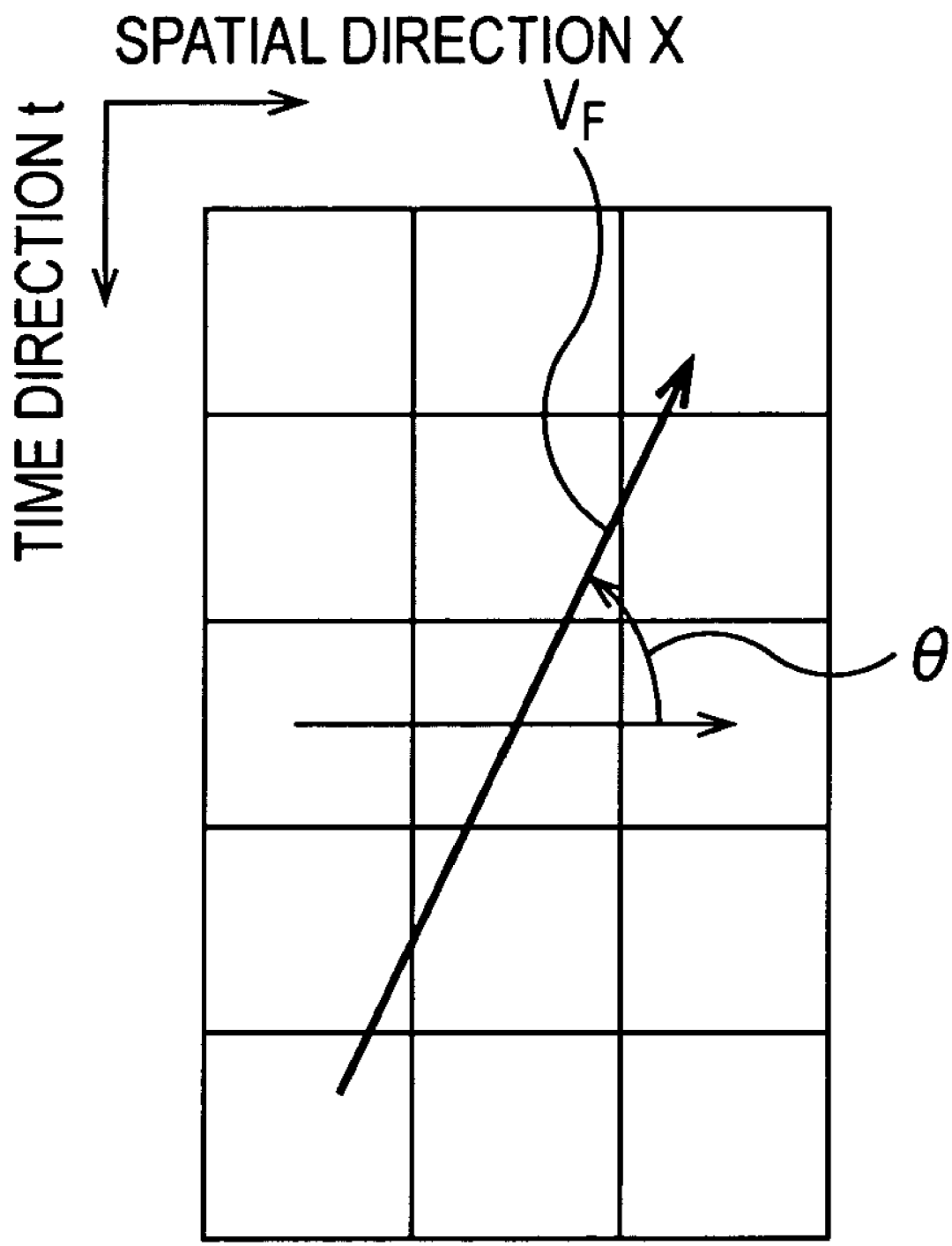
FIG. 83 is a diagram for describing direction of continuity in the time-spatial direction.

Specifically, for example, in the event that there is an object moving horizontally in the X direction at uniform velocity, the direction of movement of the object is represented with like a gradient $V_F$ in the X-t plane such as shown in FIG. 83. In other words, it can be said that the gradient $V_F$ represents the direction of continuity in the temporal and spatial directions in the X-t plane. Accordingly, the data continuity detecting unit 101 can output movement θ such as shown in FIG. 83 (strictly speaking, though not shown in the drawing, movement θ is an angle generated by the direction of data continuity represented with the gradient $V_f$ corresponding to the gradient $V_F$ and the X direction in the spatial direction) as data continuity information corresponding to the gradient $V_F$ representing continuity in the temporal and spatial directions in the X-t plane as well as the above angle θ (data continuity information corresponding to continuity in the spatial directions represented with the gradient $G_F$ in the X-Y plane).

Accordingly, the actual world estimating unit 102 employing the two-dimensional polynomial approximating method can calculate the coefficients (features) $w_i$ of an approximation function f(x, t) in the same method as the above method by employing the movement θ instead of the angle θ. However, in this case, the equation to be employed is not the above Expression (66) but the following Expression (82).

$$P(x, t) = \int_{t-0.5}^{t+0.5} \int_{x-0.5}^{x+0.5} \sum_{i=0}^{n} w_i (x - s \times t)^i \, dx \, dt + e \qquad (82)$$

Note that in Expression (82), s is cot θ (however, θ is movement).

Also, an approximation function f(y, t) focusing attention on the spatial direction Y instead of the spatial direction X can be handled in the same way as the above approximation function f(x, t).

Thus, the two-dimensional polynomial approximating method takes not one-dimensional but two-dimensional integration effects into consideration, so can estimate the light signals in the actual world 1 more accurately than the one-dimensional approximating method.

Next, description will be made regarding the third function approximating method with reference to FIG. 84 through FIG. 88.

That is to say, the third function approximating method is a method for estimating the light signal function F(x, y, t) by approximating the light signal function F(x, y, t) with the approximation function f(x, y, t) focusing attention on that the light signal in the actual world 1 having continuity in a predetermined direction of the temporal and spatial directions is represented with the light signal function F(x, y, t), for example. Accordingly, hereafter, the third function approximating method is referred to as a three-dimensional function approximating method.

Figure 84:
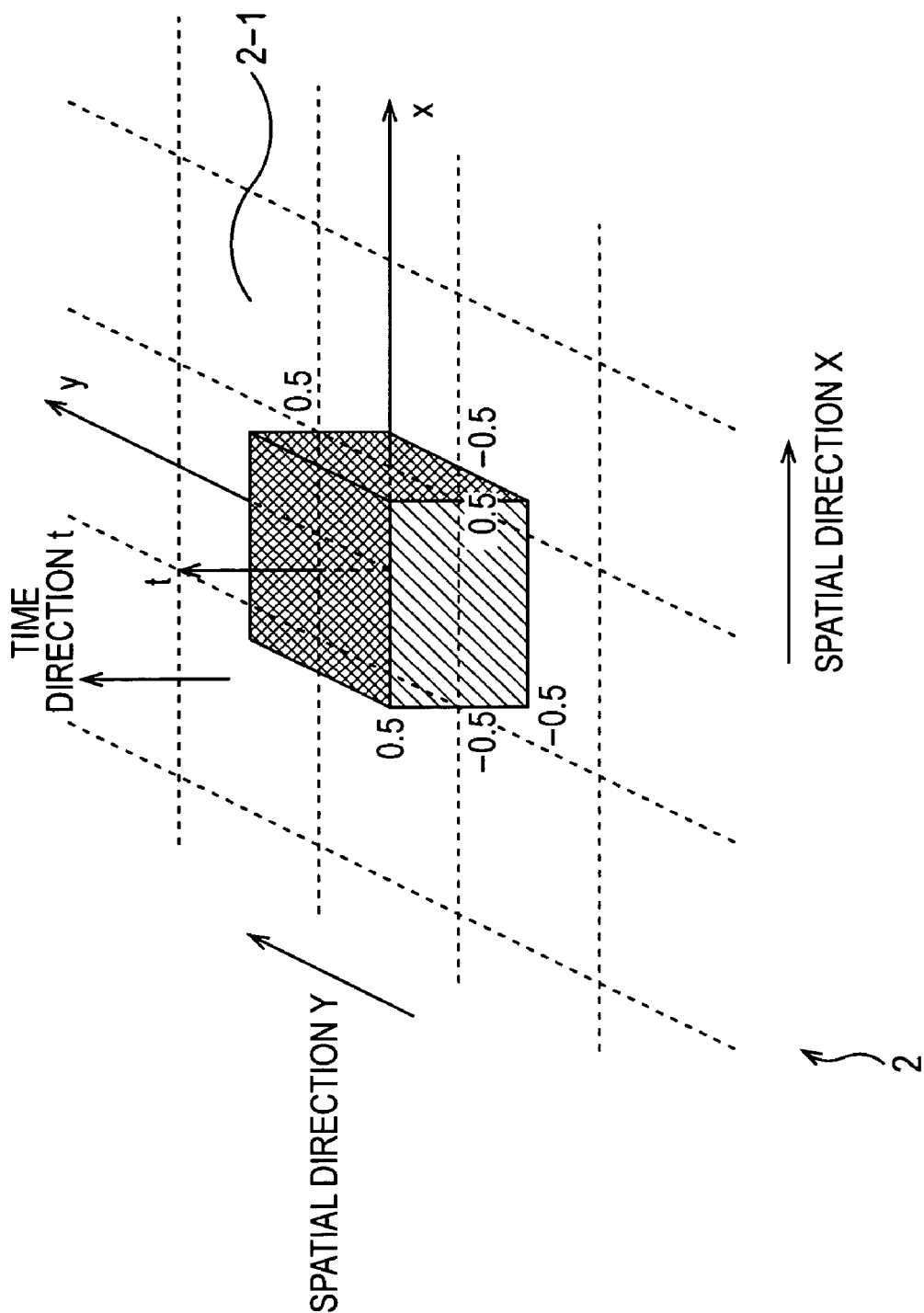
FIG. 84 is a diagram for describing integration effects in the event that the sensor is a CCD.

Also, with description of the three-dimensional function approximating method, let us say that the sensor 2 is a CCD made up of the multiple detecting elements 2-1 disposed on the plane thereof, such as shown in FIG. 84.

With the example in FIG. 84, the direction in parallel with a predetermined side of the detecting elements 2-1 is taken as the X direction serving as one direction of the spatial directions, and the direction orthogonal to the X direction is taken as the Y direction serving as the other direction of the spatial directions. The direction orthogonal to the X-Y plane is taken as the t direction serving as the temporal direction.

Also, with the example in FIG. 84, the spatial shape of the respective detecting elements 2-1 of the sensor 2 is taken as a square of which one side is 1 in length. The shutter time (exposure time) of the sensor 2 is taken as 1.

Further, with the example in FIG. 84, the center of one certain detecting element 2-1 of the sensor 2 is taken as the origin (the position in the X direction is x=0, and the position in the Y direction is y=0) in the spatial directions (X direction and Y direction), and also the intermediate point-in-time of the exposure time is taken as the origin (the position in the t direction is t=0) in the temporal direction (t direction).

In this case, the detecting element 2-1 of which the center is in the origin (x=0, y=0) in the spatial directions subjects the light signal function F(x, y, t) to integration with a range of −0.5 through 0.5 in the X direction, with a range of −0.5 through 0.5 in the Y direction, and with a range of −0.5 through 0.5 in the t direction, and outputs the integral value as the pixel value P.

That is to say, the pixel value P output from the detecting element 2-1 of which the center is in the origin in the spatial directions is represented with the following Expression (83).

$$P = \int_{-0.5}^{+0.5} \int_{-0.5}^{+0.5} \int_{-0.5}^{+0.5} F(x, y, t) \, dx \, dy \, dt \qquad (83)$$

Similarly, the other detecting elements 2-1 output the pixel value P shown in Expression (83) by taking the center of the detecting element 2-1 to be processed as the origin in the spatial directions.

Incidentally, as described above, with the three-dimensional function approximating method, the light signal function F(x, y, t) is approximated to the three-dimensional approximation function f(x, y, t).

Specifically, for example, the approximation function f(x, y, t) is taken as a function having N variables (features), a relational expression between the input pixel values P (x, y, t) corresponding to Expression (83) and the approximation function f(x, y, t) is defined. Thus, in the event that M input pixel values P (x, y, t) more than N are acquired, N variables (features) can be calculated from the defined relational expression. That is to say, the actual world estimating unit 102 can estimate the light signal function F(x, y, t) by acquiring M input pixel values P (x, y, t), and calculating N variables (features).

In this case, the actual world estimating unit 102 extracts (acquires) M input images P (x, y, t), of the entire input image by using continuity of data included in an input image (input pixel values) from the sensor 2 as a constraint (i.e., using data continuity information as to an input image to be output from the data continuity detecting unit 101). As a result, the approximation function f(x, y, t) is constrained by continuity of data.

Figure 85:
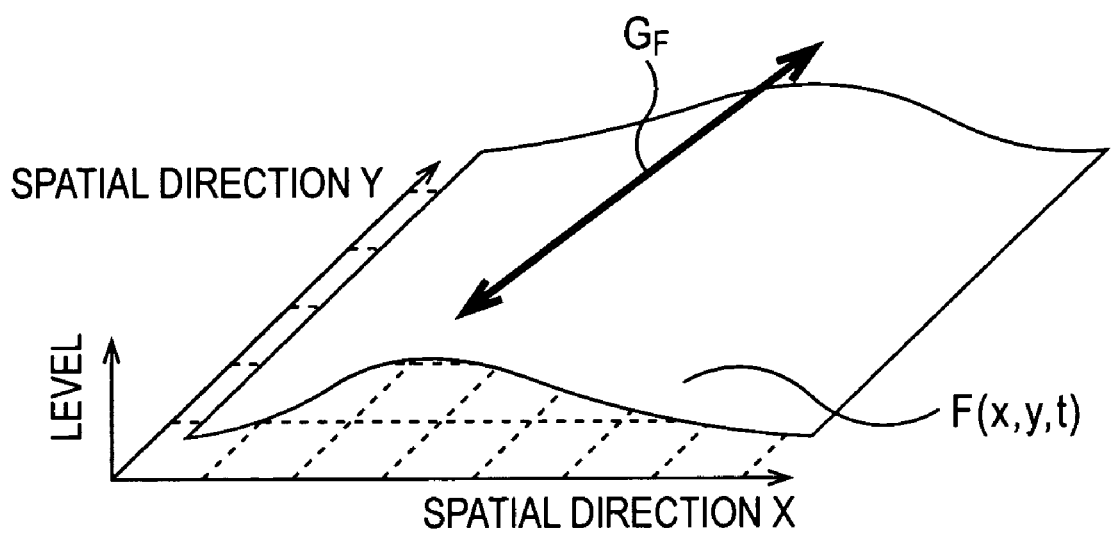
FIG. 85 is a diagram for describing actual world signals having continuity in the spatial direction.

For example, as shown in FIG. 85, in the event that the light signal function F(x, y, t) corresponding to an input image has continuity in the spatial direction represented with the gradient $G_F$, the data continuity detecting unit 101 results in outputting the angle θ (the angle θ generated between the direction of continuity of data represented with the gradient $G_f$ (not shown) corresponding to the gradient $G_F$, and the X direction) as data continuity information as to the input image.

In this case, let us say that a one-dimensional waveform wherein the light signal function F(x, y, t) is projected in the X direction (such a waveform is referred to as an X cross-sectional waveform here) has the same form even in the event of projection in any position in the Y direction.

That is to say, let us say that there is an X cross-sectional waveform having the same form, which is a two-dimensional (spatial directional) waveform continuous in the direction of continuity (angle θ direction as to the X direction), and a three-dimensional waveform wherein such a two-dimensional waveform continues in the temporal direction t, is approximated with the approximation function f(x, y, t).

In other words, an X cross-sectional waveform, which is shifted by a position y in the Y direction from the center of the pixel of interest, becomes a waveform wherein the X cross-sectional waveform passing through the center of the pixel of interest is moved (shifted) by a predetermined amount (amount varies according to the angle θ) in the X direction. Note that hereafter, such an amount is referred to as a shift amount.

This shift amount can be calculated as follows.

That is to say, the gradient $V_f$ (for example, gradient $V_f$ representing the direction of data continuity corresponding to the gradient $V_F$ in FIG. 85) and angle θ are represented as the following Expression (84).

$$G_f = \tan\theta = \frac{dy}{dx} \qquad (84)$$

Note that in Expression (84), dx represents the amount of fine movement in the X direction, and dy represents the amount of fine movement in the Y direction as to the dx.

Accordingly, if the shift amount as to the X direction is described as $C_x(y)$, this is represented as the following Expression (85).

$$C_x(y) = \frac{y}{G_f} \qquad (85)$$

If the shift amount $C_x(y)$ is thus defined, a relational expression between the input pixel values $P(x, y, t)$ corresponding to Expression (83) and the approximation function $f(x, y, t)$ is represented as the following Expression (86).

$$P(x, y, t) = \int_{t_s}^{t_e} \int_{y_s}^{y_e} \int_{x_s}^{x_e} f(x, y, t) \, dx \, dy \, dt + e \qquad (86)$$

In Expression (86), e represents a margin of error. $t_s$ represents an integration start position in the t direction, and $t_e$ represents an integration end position in the t direction. In the same way, $y_s$ represents an integration start position in the Y direction, and $y_e$ represents an integration end position in the Y direction. Also, $x_s$ represents an integration start position in the X direction, and $x_e$ represents an integration end position in the X direction. However, the respective specific integral ranges are as shown in the following Expression (87).

$t_s = t - 0.5$ $t_e = t + 0.5$ $y_s = y - 0.5$ $y_e = y + 0.5$ $x_s = x - C_x(y) - 0.5$ $x_e = x - C_x(y) + 0.5 \qquad (87)$ As shown in Expression (87), it can be represented that an X cross-sectional waveform having the same form continues in the direction of continuity (angle θ direction as to the X direction) by shifting an integral range in the X direction as to a pixel positioned distant from the pixel of interest by (x, y) in the spatial direction by the shift amount $C_x(Y)$.

Thus, with the three-dimensional approximating method, the relation between the pixel values $P(x, y, t)$ and the three-dimensional approximation function $f(x, y, t)$ can be represented with Expression (86) (Expression (87) for the integral range), and accordingly, the light signal function $F(x, y, t)$ (for example, a light signal having continuity in the spatial direction represented with the gradient $V_F$ such as shown in FIG. 85) can be estimated by calculating the N features of the approximation function $f(x, y, t)$, for example, with the least square method using Expression (86) and Expression (87).

Note that in the event that a light signal represented with the light signal function $F(x, y, t)$ has continuity in the spatial direction represented with the gradient $V_F$ such as shown in FIG. 85, the light signal function $F(x, y, t)$ may be approximated as follows.

That is to say, let us say that a one-dimensional waveform wherein the light signal function $F(x, y, t)$ is projected in the Y direction (hereafter, such a waveform is referred to as a Y cross-sectional waveform) has the same form even in the event of projection in any position in the X direction.

In other words, let us say that there is a two-dimensional (spatial directional) waveform wherein a Y cross-sectional waveform having the same form continues in the direction of continuity (angle θ direction as to in the X direction), and a three-dimensional waveform wherein such a two-dimensional waveform continues in the temporal direction t is approximated with the approximation function $f(x, y, t)$.

Accordingly, the Y cross-sectional waveform, which is shifted by x in the X direction from the center of the pixel of interest, becomes a waveform wherein the Y cross-sectional waveform passing through the center of the pixel of interest is moved by a predetermined shift amount (shift amount changing according to the angle θ) in the Y direction.

This shift amount can be calculated as follows.

That is to say, the gradient $G_F$ is represented as the above Expression (84), so if the shift amount as to the Y direction is described as $C_y(x)$, this is represented as the following Expression (88).

$$C_y(x) = G_f \times x \qquad (88)$$

If the shift amount $C_x(y)$ is thus defined, a relational expression between the input pixel values $P(x, y, t)$ corresponding to Expression (83) and the approximation function $f(x, y, t)$ is represented as the above Expression (86), as with when the shift amount $C_x(y)$ is defined.

However, in this case, the respective specific integral ranges are as shown in the following Expression (89).

$t_s = t - 0.5$ $t_e = t + 0.5$ $y_s = y - C_y(x) - 0.5$ $y_e = y - C_y(x) + 0.5$ $x_s = x - 0.5$ $x_e = x + 0.5 \qquad (89)$ As shown in Expression (89) (and the above Expression (86)), it can be represented that a Y cross-sectional waveform having the same form continues in the direction of continuity (angle θ direction as to the X direction) by shifting an integral range in the Y direction as to a pixel positioned distant from the pixel of interest by (x, y), by the shift amount $C_x(y)$.

Thus, with the three-dimensional approximating method, the integral range of the right side of the above Expression (86) can be set to not only Expression (87) but also Expression (89), and accordingly, the light signal function $F(x, y, t)$ (light signal in the actual world 1 having continuity in the spatial direction represented with the gradient $G_F$) can be estimated by calculating the n features of the approximation function $f(x, y, t)$ with, for example, the least square method or the like using Expression (86) in which Expression (89) is employed as an integral range.

Thus, Expression (87) and Expression (89), which represent an integral range, represent essentially the same with only a difference regarding whether perimeter pixels are shifted in the X direction (in the case of Expression (87)) or shifted in the Y direction (in the case of Expression (89)) in response to the direction of continuity.

However, in response to the direction of continuity (gradient $G_F$), there is a difference regarding whether the light signal function $F(x, y, t)$ is regarded as a group of X cross-sectional waveforms, or is regarded as a group of Y cross-sectional waveforms. That is to say, in the event that the direction of continuity is close to the Y direction, the light signal function $F(x, y, t)$ is preferably regarded as a group of X cross-sectional waveforms. On the other hand, in the event that the direction of continuity is close to the X direction, the light signal function F(x, y, t) is preferably regarded as a group of Y cross-sectional waveforms.

Accordingly, it is preferable that the actual world estimating unit 102 prepares both Expression (87) and Expression (89) as an integral range, and selects any one of Expression (87) and Expression (89) as the integral range of the right side of the appropriate Expression (86) in response to the direction of continuity.

Figure 86:
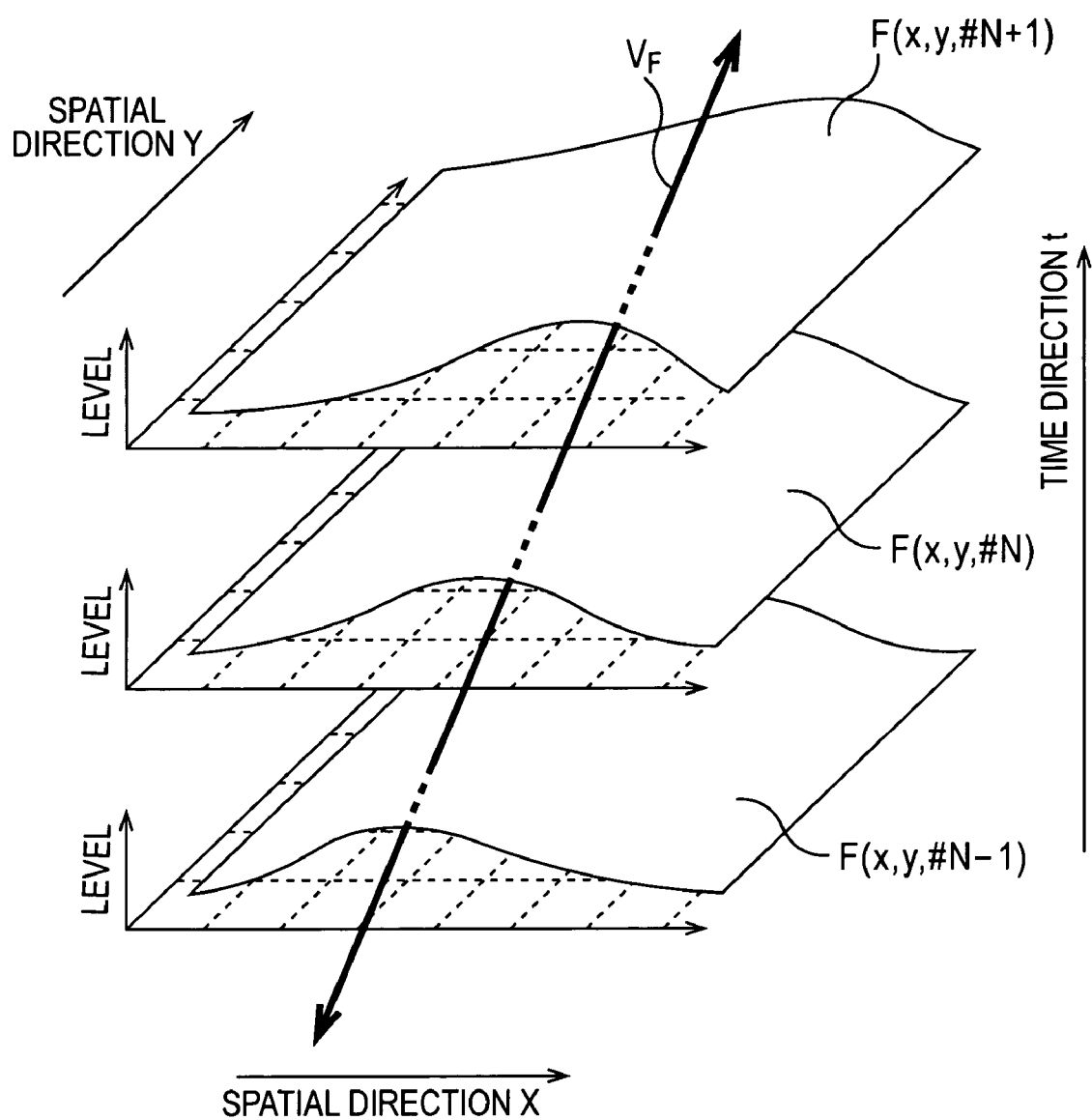
FIG. 86 is a diagram for describing actual world signals having continuity in the space-time directions.

Description has been made regarding the three-dimensional approximation method in the case in which the light signal function F(x, y, t) has continuity (for example, continuity in the spatial direction represented with the gradient $G_F$ in FIG. 85) in the spatial directions (X direction and Y direction), but the three-dimensional approximation method can be applied to the case in which the light signal function F(x, y, t) has continuity (continuity represented with the gradient $V_F$) in the temporal and spatial directions (X direction, Y direction, and t direction), as shown in FIG. 86.

That is to say, in FIG. 86, a light signal function corresponding to a frame #N−1 is taken as F (x, y, #N−1), a light signal function corresponding to a frame #N is taken as F (x, y, #N), and a light signal function corresponding to a frame #N+1 is taken as F (x, y, #N+1).

Note that in FIG. 86, the horizontal direction is taken as the X direction serving as one direction of the spatial directions, the upper right diagonal direction is taken as the Y direction serving as the other direction of the spatial directions, and also the vertical direction is taken as the t direction serving as the temporal direction in the drawing.

Also, the frame #N−1 is a frame temporally prior to the frame #N, the frame #N+1 is a frame temporally following the frame #N. That is to say, the frame #N−1, frame #N, and frame #N+1 are displayed in the sequence of the frame #N−1, frame #N, and frame #N+1.

With the example in FIG. 86, a cross-sectional light level along the direction shown with the gradient $V_F$ (upper right inner direction from lower left near side in the drawing) is regarded as generally constant. Accordingly, with the example in FIG. 86, it can be said that the light signal function F(x, y, t) has continuity in the temporal and spatial directions represented with the gradient $V_F$.

In this case, in the event that a function C (x, y, t) representing continuity in the temporal and spatial directions is defined, and also the integral range of the above Expression (86) is defined with the defined function C (x, y, t), N features of the approximation function f(x, y, t) can be calculated as with the above Expression (87) and Expression (89).

The function C (x, y, t) is not restricted to a particular function as long as this is a function representing the direction of continuity. However, hereafter, let us say that linear continuity is employed, and $C_x$ (t) and $C_y$ (t) corresponding to the shift amount $C_x$ (y) (Expression (85)) and shift amount $C_y$ (x) (Expression (87)), which are functions representing continuity in the spatial direction described above, are defined as a function C (x, y, t) corresponding thereto as follows.

That is to say, if the gradient as continuity of data in the temporal and spatial directions corresponding to the gradient $G_f$ representing continuity of data in the above spatial direction is taken as $V_f$, and if this gradient $V_f$ is divided into the gradient in the X direction (hereafter, referred to as $V_{fx}$) and the gradient in the Y direction (hereafter, referred to as $V_{fy}$), the gradient $V_{fx}$ is represented with the following Expression (90), and the gradient $V_{fy}$ is represented with the following Expression (91), respectively.

$$V_{fx} = \frac{dx}{dt} \quad (90)$$

$$V_{fy} = \frac{dy}{dt} \quad (91)$$

In this case, the function $C_x$ (t) is represented as the following Expression (92) using the gradient $V_{fx}$ shown in Expression (90).

$$C_x(t) = V_{fx} \times t \quad (92)$$

Similarly, the function $C_y$ (t) is represented as the following Expression (93) using the gradient $V_{fy}$ shown in Expression (91).

$$C_y(t) = V_{fy} \times t \quad (93)$$

Thus, upon the function $C_x$ (t) and function $C_y$ (t), which represent continuity 2511 in the temporal and spatial directions, being defined, the integral range of Expression (86) is represented as the following Expression (94).

$$t_s = t - 0.5$$

$$t_e = t + 0.5$$

$$y_s = y - C_y(t) - 0.5$$

$$y_e = y - C_y(t) + 0.5$$

$$x_s = x - C_x(t) - 0.5$$

$$x_e = x - C_x(t) + 0.5 \quad (94)$$

Thus, with the three-dimensional approximating method, the relation between the pixel values P (x, y, t) and the three-dimensional approximation function f(x, y, t) can be represented with Expression (86), and accordingly, the light signal function F(x, y, t) (light signal in the actual world 1 having continuity in a predetermined direction of the temporal and spatial directions) can be estimated by calculating the n+1 features of the approximation function f(x, y, t) with, for example, the least square method or the like using Expression (94) as the integral range of the right side of Expression (86).

Figure 87:
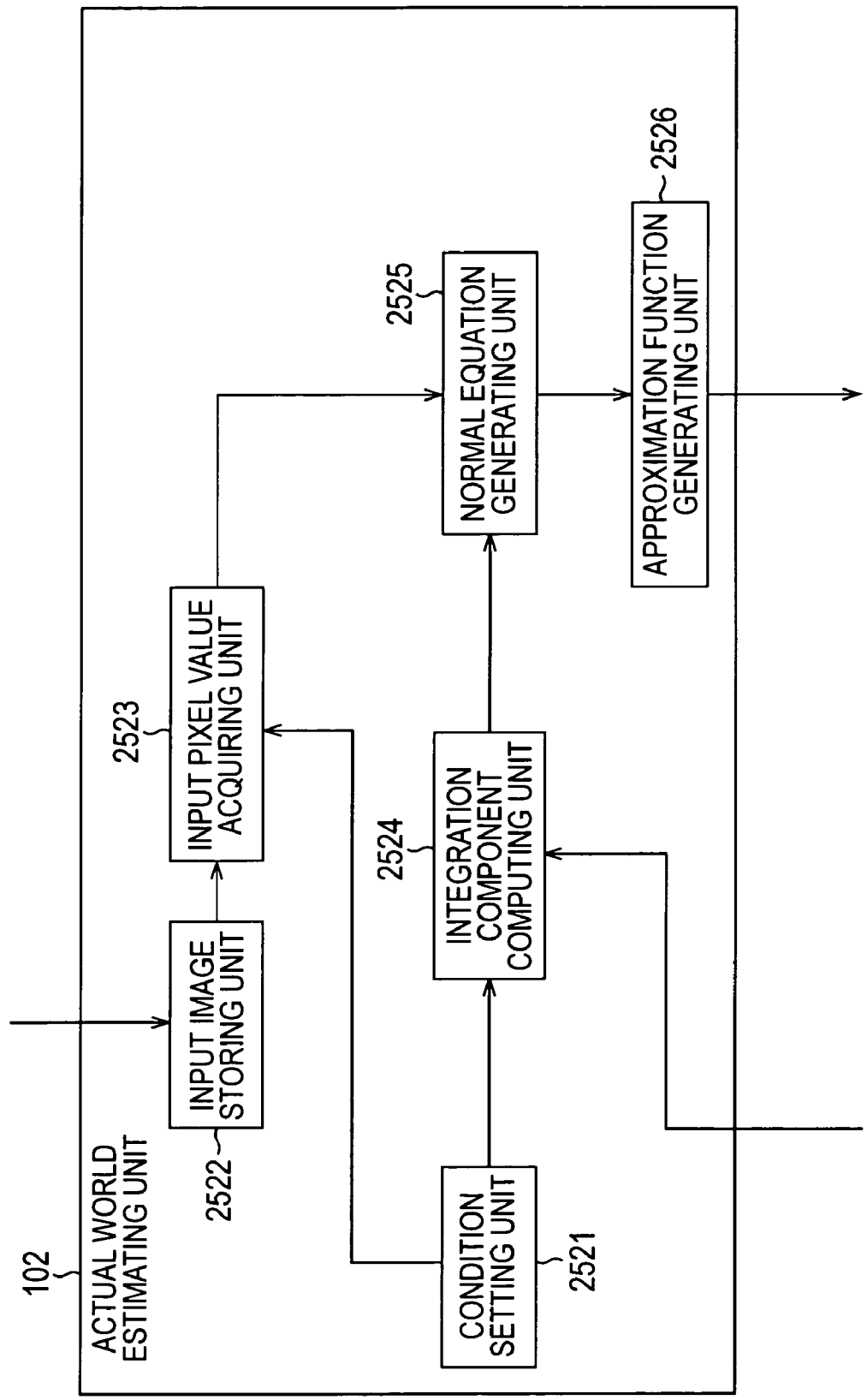
FIG. 87 is a block diagram for describing a configuration example of the actual world estimating unit using, of function approximation techniques having the principle shown in FIG. 58, cubic polynomial approximation.

FIG. 87 represents a configuration example of the actual world estimating unit 102 employing such a three-dimensional approximating method.

Note that the approximation function f(x, y, t) (in reality, the features (coefficients) thereof) calculated by the actual world estimating unit 102 employing the three-dimensional approximating method is not restricted to a particular function, but an n (n=N−1)-dimensional polynomial is employed in the following description.

As shown in FIG. 87, the actual world estimating unit 102 includes a conditions setting unit 2521, input image storage unit 2522, input pixel value acquiring unit 2523, integral component calculation unit 2524, normal equation generating unit 2525, and approximation function generating unit 2526.

The conditions setting unit 2521 sets a pixel range (tap range) used for estimating the light signal function F(x, y, t) corresponding to a pixel of interest, and the number of dimensions n of the approximation function f(x, y, t).

The input image storage unit 2522 temporarily stores an input image (pixel values) from the sensor 2.

The input pixel acquiring unit 2523 acquires, of the input images stored in the input image storage unit 2522, an input image region corresponding to the tap range set by the conditions setting unit 2521, and supplies this to the normal equation generating unit 2525 as an input pixel value table. That is to say, the input pixel value table is a table in which the respective pixel values of pixels included in the input image region are described.

Incidentally, as described above, the actual world estimating unit 102 employing the three-dimensional approximating method calculates the N features (in this case, coefficient of each dimension) of the approximation function f(x, y, t) with the least square method using the above Expression (86) (however, Expression (87), Expression (90), or Expression (94) for the integral range).

The right side of Expression (86) can be represented as the following Expression (95) by calculating the integration thereof.

$$P(x, y, t) = \sum_{i=0}^{n} w_i S_i(x_s, x_e, y_s, y_e, t_s, t_e) + e \qquad (95)$$

In Expression (95), $w_i$ represents the coefficients (features) of the i-dimensional term, and also $S_i(x_s, x_e, y_s, Y_e, t_s, t_e)$ represents the integral components of the i-dimensional term. However, $x_s$ represents an integral range start position in the X direction, $x_e$ represents an integral range end position in the X direction, $y_s$ represents an integral range start position in the Y direction, $y_e$ represents an integral range end position in the Y direction, $t_s$ represents an integral range start position in the t direction, $t_e$ represents an integral range end position in the t direction, respectively.

The integral component calculation unit 2524 calculates the integral components $S_i(x_s, x_e, y_s, y_e, t_s, t_e)$.

That is to say, the integral component calculation unit 2524 calculates the integral components $S_i(x_s, x_e, y_s, y_e, t_s, t_e)$ based on the tap range and the number of dimensions set by the conditions setting unit 2521, and the angle or movement (as the integral range, angle in the case of using the above Expression (87) or Expression (90), and movement in the case of using the above Expression (94)) of the data continuity information output from the data continuity detecting unit 101, and supplies the calculated results to the normal equation generating unit 2525 as an integral component table.

The normal equation generating unit 2525 generates a normal equation in the case of obtaining the above Expression (95) with the least square method using the input pixel value table supplied from the input pixel value acquiring unit 2523, and the integral component table supplied from the integral component calculation unit 2524, and outputs this to the approximation function generating unit 2526 as a normal equation table. An example of a normal equation will be described later.

The approximation function generating unit 2526 calculates the respective features $w_i$ (in this case, the coefficients $w_i$ of the approximation function f(x, y, t) serving as a three-dimensional polynomial) by solving the normal equation included in the normal equation table supplied from the normal equation generating unit 2525 with the matrix solution, and output these to the image generating unit 103.

Next, description will be made regarding the actual world estimating processing (processing in step S102 in FIG. 29) to which the three-dimensional approximating method is applied, with reference to the flowchart in FIG. 88.

First, in step S2501, the conditions setting unit 2521 sets conditions (a tap range and the number of dimensions).

For example, let us say that a tap range made up of L pixels has been set. Also, let us say that a predetermined number l (l is any one of integer values 0 through L−1) is appended to each of the pixels.

Next, in step S2502, the conditions setting unit 2521 sets a pixel of interest.

In step S2503, the input pixel value acquiring unit 2523 acquires an input pixel value based on the condition (tap range) set by the conditions setting unit 2521, and generates an input pixel value table. In this case, a table made up of L input pixel values P (x, y, t) is generated. Here, let us say that each of the L input pixel values P (x, y, t) is described as P (l) serving as a function of the number l of the pixel thereof. That is to say, the input pixel value table becomes a table including L P (l).

In step S2504, the integral component calculation unit 2524 calculates integral components based on the conditions (a tap range and the number of dimensions) set by the conditions setting unit 2521, and the data continuity information (angle or movement) supplied from the data continuity detecting unit 101, and generates an integral component table.

However, in this case, as described above, the input pixel values are not P (x, y, t) but P (l), and are acquired as the value of a pixel number l, so the integral component calculation unit 2524 results in calculating the integral components $S_i(x_s, x_e, y_s, y_e, t_s, t_e)$ in the above Expression (95) as a function of l such as the integral components $S_i$ (l). That is to say, the integral component table becomes a table including L×i $S_i$ (l).

Figure 88:
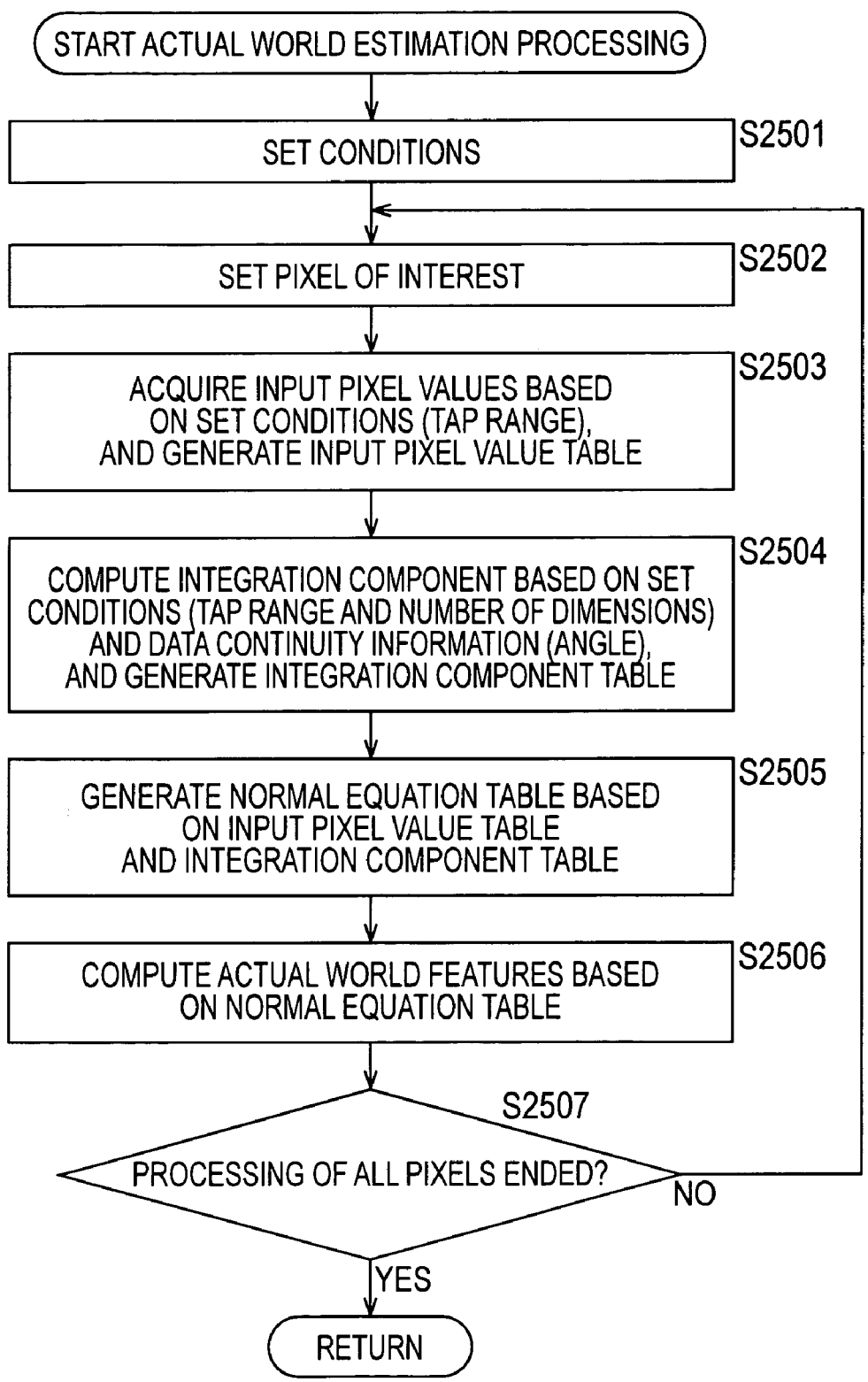
FIG. 88 is a flowchart for describing actual world estimation processing which the actual world estimating unit of the configuration shown in FIG. 87 executes.

Note that the sequence of the processing in step S2503 and the processing in step S2504 is not restricted to the example in FIG. 88, so the processing in step S2504 may be executed first, or the processing in step S2503 and the processing in step S2504 may be executed simultaneously.

Next, in step S2505, the normal equation generating unit 2525 generates a normal equation table based on the input pixel value table generated by the input pixel value acquiring unit 2523 at the processing in step S2503, and the integral component table generated by the integral component calculation unit 2524 at the processing in step S2504.

Specifically, in this case, the features $w_i$ of the following Expression (96) corresponding to the above Expression (95) are calculated using the least square method. A normal equation corresponding to this is represented as the following Expression (97).

$$P(l) = \sum_{i=0}^{n} w_i S_i(l) + e \qquad (96)$$

$$\begin{pmatrix} \sum_{l=0}^{L} S_0(l)S_0(l) & \sum_{l=0}^{L} S_0(l)S_1(l) & \cdots & \sum_{l=0}^{L} S_0(l)S_n(l) \\ \sum_{l=0}^{L} S_1(l)S_0(l) & \sum_{l=0}^{L} S_1(l)S_1(l) & \cdots & \sum_{l=0}^{L} S_1(l)S_n(l) \\ \vdots & \vdots & \ddots & \vdots \\ \sum_{l=0}^{L} S_n(l)S_0(l) & \sum_{l=0}^{L} S_n(l)S_1(l) & \cdots & \sum_{l=0}^{L} S_n(l)S_n(l) \end{pmatrix} \begin{pmatrix} w_0 \\ w_1 \\ \vdots \\ w_n \end{pmatrix} = \begin{pmatrix} \sum_{l=0}^{L} S_0(l)P(l) \\ \sum_{l=0}^{L} S_1(l)P(l) \\ \vdots \\ \sum_{l=0}^{L} S_n(l)P(l) \end{pmatrix} \qquad (97)$$

If we define each matrix of the normal equation shown in Expression (97) as the following Expressions (98) through (100), the normal equation is represented as the following Expression (101).

$$S_{MAT} = \begin{pmatrix} \sum_{l=0}^{L} S_0(l)S_0(l) & \sum_{l=0}^{L} S_0(l)S_1(l) & \cdots & \sum_{l=0}^{L} S_0(l)S_n(l) \\ \sum_{l=0}^{L} S_1(l)S_0(l) & \sum_{l=0}^{L} S_1(l)S_1(l) & \cdots & \sum_{l=0}^{L} S_1(l)S_n(l) \\ \vdots & \vdots & \ddots & \vdots \\ \sum_{l=0}^{L} S_n(l)S_0(l) & \sum_{l=0}^{L} S_n(l)S_1(l) & \cdots & \sum_{l=0}^{L} S_n(l)S_n(l) \end{pmatrix} \quad (98)$$

$$W_{MAT} = \begin{pmatrix} w_0 \\ w_1 \\ \vdots \\ w_n \end{pmatrix} \quad (99)$$

$$P_{MAT} = \begin{pmatrix} \sum_{l=0}^{L} S_0(l)P(l) \\ \sum_{l=0}^{L} S_1(l)P(l) \\ \vdots \\ \sum_{l=0}^{L} S_n(l)P(l) \end{pmatrix} \quad (100)$$

$$S_{MAT}W_{MAT} = P_{MAT} \quad (101)$$

As shown in Expression (99), the respective components of the matrix $W_{MAT}$ are the features $w_i$ to be obtained. Accordingly, in Expression (101), if the matrix $S_{MAT}$ of the left side and the matrix $P_{MAT}$ of the right side are determined, the matrix $W_{MAT}$ (i.e., features $w_i$) may be calculated with the matrix solution.

Specifically, as shown in Expression (98), the respective components of the matrix $S_{MAT}$ may be calculated as long as the above integral components $S_i(l)$ are known. The integral components $S_i(l)$ are included in the integral component table supplied from the integral component calculation unit 2524, so the normal equation generating unit 2525 can calculate each component of the matrix $S_{MAT}$ using the integral component table.

Also, as shown in Expression (100), the respective components of the matrix $P_{MAT}$ may be calculated as long as the integral components $S_i(l)$ and the input pixel values P (l) are known. The integral components $S_i(l)$ is the same as those included in the respective components of the matrix $S_{MAT}$, also the input pixel values P (l) are included in the input pixel value table supplied from the input pixel value acquiring unit 2523, SO the normal equation generating unit 2525 can calculate each component of the matrix $P_{MAT}$ using the integral component table and input pixel value table.

Thus, the normal equation generating unit 2525 calculates each component of the matrix $S_{MAT}$ and matrix $P_{MAT}$, and outputs the calculated results (each component of the matrix $S_{MAT}$ and matrix $P_{MAT}$) to the approximation function generating unit 2526 as a normal equation table.

Upon the normal equation table being output from the normal equation generating unit 2526, in step S2506, the approximation function generating unit 2526 calculates the features $w_i$ (i.e., the coefficients $w_i$ of the approximation function f(x, y, t)) serving as the respective components of the matrix $W_{MAT}$ in the above Expression (101) based on the normal equation table.

Specifically, the normal equation in the above Expression (101) can be transformed as the following Expression (102).

$$W_{MAT} = S_{MAT}^{-1} P_{MAT} \quad (102)$$

In Expression (102), the respective components of the matrix $W_{MAT}$ in the left side are the features $w_i$ to be obtained. The respective components regarding the matrix $S_{MAT}$ and matrix $P_{MAT}$ are included in the normal equation table supplied from the normal equation generating unit 2525. Accordingly, the approximation function generating unit 2526 calculates the matrix $W_{MAT}$ by calculating the matrix in the right side of Expression (102) using the normal equation table, and outputs the calculated results (features $w_i$) to the image generating unit 103.

In step S2507, the approximation function generating unit 2526 determines regarding whether or not the processing of all the pixels has been completed.

In step S2507, in the event that determination is made that the processing of all the pixels has not been completed, the processing returns to step S2502, wherein the subsequent processing is repeatedly performed. That is to say, the pixels that have not become a pixel of interest are sequentially taken as a pixel of interest, and the processing in step S2502 through S2507 is repeatedly performed.

In the event that the processing of all the pixels has been completed (in step S5407, in the event that determination is made that the processing of all the pixels has been completed), the estimating processing of the actual world 1 ends.

As described above, the three-dimensional approximating method takes three-dimensional integration effects in the temporal and spatial directions into consideration instead of one-dimensional or two-dimensional integration effects, and accordingly, can estimate the light signals in the actual world 1 more accurately than the one-dimensional approximating method and two-dimensional polynomial approximating method.

Next, description will be made regarding an embodiment of the image generating unit 103 (FIG. 3) with reference to FIG. 89 through FIG. 110.

Figure 89:
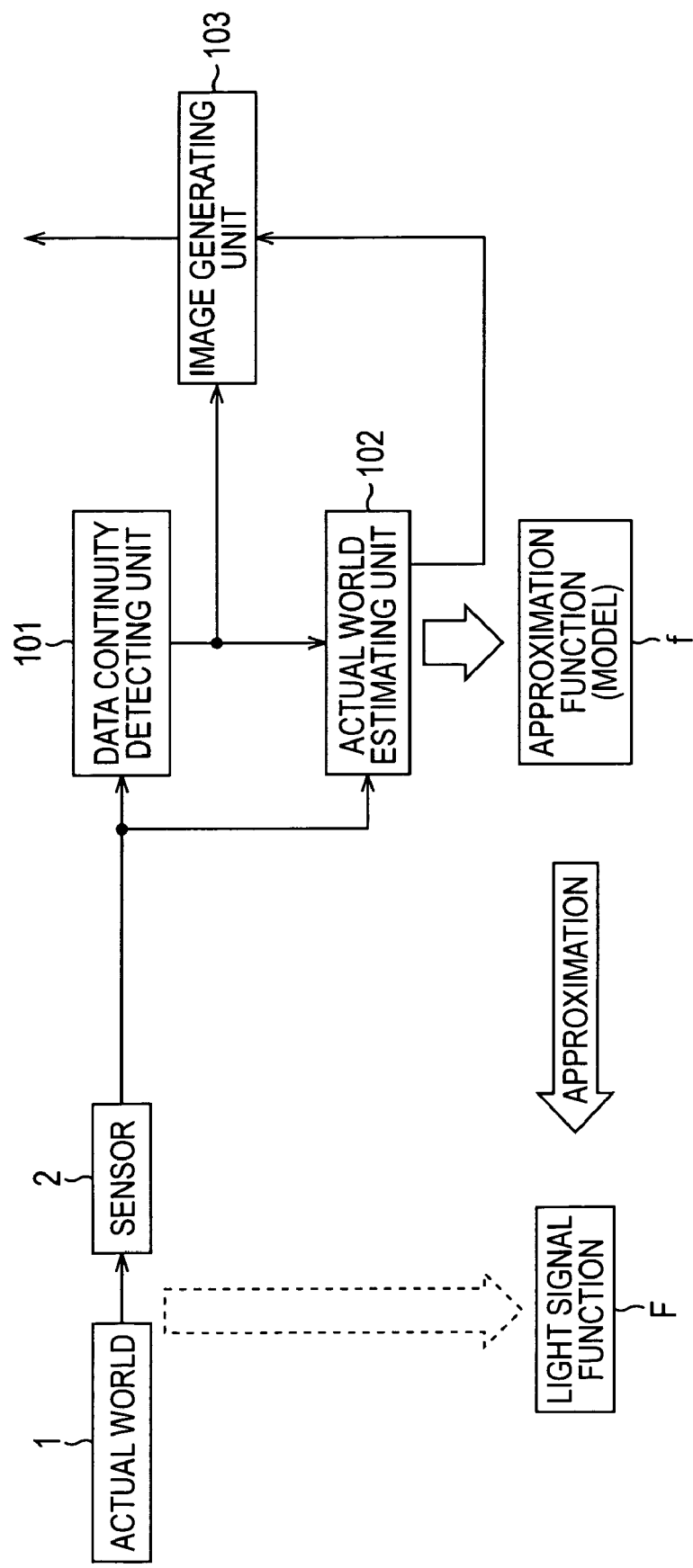
FIG. 89 is a diagram for describing the principle of re-integration, which is an example of an embodiment of the image generating unit shown in FIG. 3.

FIG. 89 is a diagram for describing the principle of the present embodiment.

As shown in FIG. 89, the present embodiment is based on condition that the actual world estimating unit 102 employs a function approximating method. That is to say, let us say that the signals in the actual world 1 (distribution of light intensity) serving as an image cast in the sensor 2 are represented with a predetermined function F, it is an assumption for the actual world estimating unit 102 to estimate the function F by approximating the function F with a predetermined function f using the input image (pixel value P) output from the sensor 2 and the data continuity information output from the data continuity detecting unit 101.

Note that hereafter, with description of the present embodiment, the signals in the actual world 1 serving as an image are particularly referred to as light signals, and the function F is particularly referred to as a light signal function F. Also, the function f is particularly referred to as an approximation function f.

With the present embodiment, the image generating unit 103 integrates the approximation function f with a predetermined time-space range using the data continuity information output from the data continuity detecting unit 101, and actual world estimating information (in the example in FIG. 89, the features of the approximation function f or approximation function f of which the features are identified) output from the actual world estimating unit 102 based on such an assumption, and outputs the integral value as an output pixel value M (output image). Note that with the present embodiment, an input pixel value is described as P, and an output pixel value is described as M in order to distinguish an input image pixel from an output image pixel.

In other words, upon the light signal function F being integrated once, the light signal function F becomes an input pixel value P, the light signal function F is estimated from the input pixel value P (approximated with the approximation function f), the estimated light signal function F(i.e., approximation function f) is integrated again, and an output pixel value M is generated. Accordingly, hereafter, integration of the approximation function f executed by the image generating unit 103 is referred to as reintegration. Also, the present embodiment is referred to as a reintegration method.

Note that as described later, with the reintegration method, the integral range of the approximation function f in the event that the output pixel value M is generated is not restricted to the integral range of the light signal function F in the event that the input pixel value P is generated (i.e., the vertical width and horizontal width of the detecting element of the sensor 2 for the spatial direction, the exposure time of the sensor 2 for the temporal direction), an arbitrary integral range may be employed.

For example, in the event that the output pixel value M is generated, varying the integral range in the spatial direction of the integral range of the approximation function f enables the pixel pitch of an output image according to the integral range thereof to be varied. That is to say, creation of spatial resolution is available.

In the same way, for example, in the event that the output pixel value M is generated, varying the integral range in the temporal direction of the integral range of the approximation function f enables creation of temporal resolution.

Hereafter, description will be made individually regarding three specific methods of such a reintegration method with reference to the drawings.

That is to say, three specific methods are reintegration methods corresponding to three specific methods of the function approximating method (the above three specific examples of the embodiment of the actual world estimating unit 102) respectively.

Specifically, the first method is a reintegration method corresponding to the above one-dimensional approximating method (one method of the function approximating method). Accordingly, with the first method, one-dimensional reintegration is performed, so hereafter, such a reintegration method is referred to as a one-dimensional reintegration method.

The second method is a reintegration method corresponding to the above two-dimensional polynomial approximating method (one method of the function approximating method). Accordingly, with the second method, two-dimensional reintegration is performed, so hereafter, such a reintegration method is referred to as a two-dimensional reintegration method.

The third method is a reintegration method corresponding to the above three-dimensional approximating method (one method of the function approximating method). Accordingly, with the third method, three-dimensional reintegration is performed, so hereafter, such a reintegration method is referred to as a three-dimensional reintegration method.

Hereafter, description will be made regarding each details of the one-dimensional reintegration method, two-dimensional reintegration method, and three-dimensional reintegration method in this order.

First, the one-dimensional reintegration method will be described.

With the one-dimensional reintegration method, it is assumed that the approximation function f(x) is generated using the one-dimensional approximating method.

That is to say, it is an assumption that a one-dimensional waveform (with description of the reintegration method, a waveform projected in the X direction of such a waveform is referred to as an X cross-sectional waveform F(x)) wherein the light signal function F(x, y, t) of which variables are positions x, y, and z on the three-dimensional space, and a point-in-time t is projected in a predetermined direction (for example, X direction) of the X direction, Y direction, and Z direction serving as the spatial direction, and t direction serving as the temporal direction, is approximated with the approximation function f(x) serving as an n-dimensional (n is an arbitrary integer) polynomial.

In this case, with the one-dimensional reintegration method, the output pixel value M is calculated such as the following Expression (103).

$$M = G_e \times \int_{x_s}^{x_e} f(x)dx \tag{103}$$

Note that in Expression (103), $x_s$ represents an integration start position, $x_e$ represents an integration end position. Also, $G_e$ represents a predetermined gain.

Figure 90:
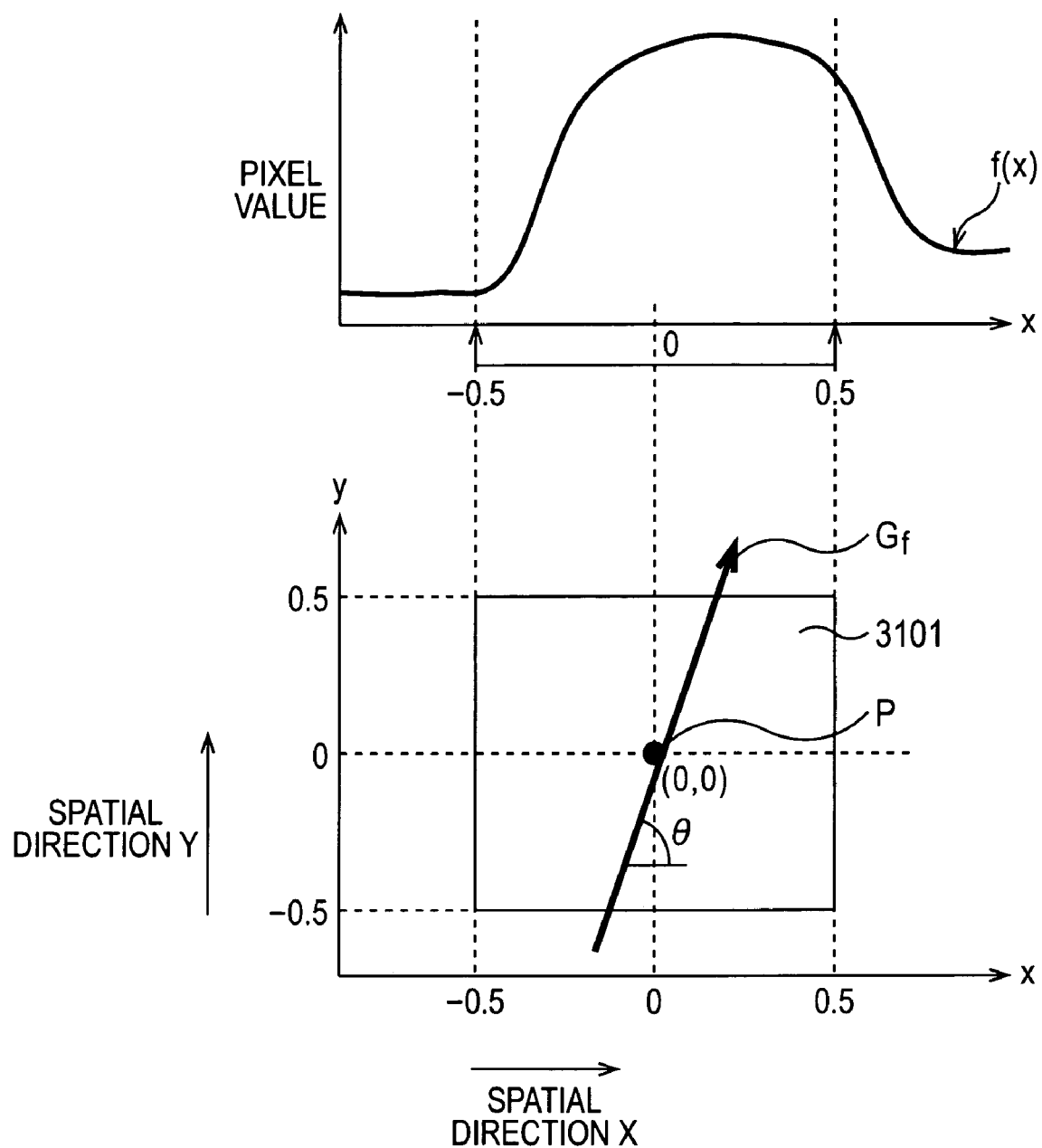
FIG. 90 is a diagram for describing an example of an input pixel and an approximation function for approximation of an actual world signal corresponding to the input pixel.

Specifically, for example, let us say that the actual world estimating unit 102 has already generated the approximation function f(x) (the approximation function f(x) of the X cross-sectional waveform F(x)) such as shown in FIG. 90 with a pixel 3101 (pixel 3101 corresponding to a predetermined detecting element of the sensor 2) such as shown in FIG. 90 as a pixel of interest.

Note that with the example in FIG. 90, the pixel value (input pixel value) of the pixel 3101 is taken as P, and the shape of the pixel 3101 is taken as a square of which one side is 1 in length. Also, of the spatial directions, the direction in parallel with one side of the pixel 3101 (horizontal direction in the drawing) is taken as the X direction, and the direction orthogonal to the X direction (vertical direction in the drawing) is taken as the Y direction.

Also, on the lower side in FIG. 90, the coordinates system (hereafter, referred to as a pixel-of-interest coordinates system) in the spatial directions (X direction and Y direction) of which the center of the pixel 3101 is taken as the origin, and the pixel 3101 in the coordinates system are shown.

Further, on the upward direction in FIG. 90, a graph representing the approximation function f(x) at y=0 (y is a coordinate value in the Y direction in the pixel-of-interest coordinates system shown on the lower side in the drawing) is shown. In this graph, the axis in parallel with the horizontal direction in the drawing is the same axis as the x axis in the X direction in the pixel-of-interest coordinates system shown on the lower side in the drawing (the origin is also the same), and also the axis in parallel with the vertical direction in the drawing is taken as an axis representing pixel values.

In this case, the relation of the following Expression (104) holds between the approximation function f(x) and the pixel value P of the pixel 3101.

$$P = \int_{-0.5}^{0.5} f(x)dx + e \quad (104)$$

Also, as shown in FIG. 90, let us say that the pixel 3101 has continuity of data in the spatial direction represented with the gradient $G_f$. Further, let us say that the data continuity detecting unit 101 (FIG. 89) has already output the angle θ such as shown in FIG. 90 as data continuity information corresponding to continuity of data represented with the gradient $G_f$.

Figure 91:
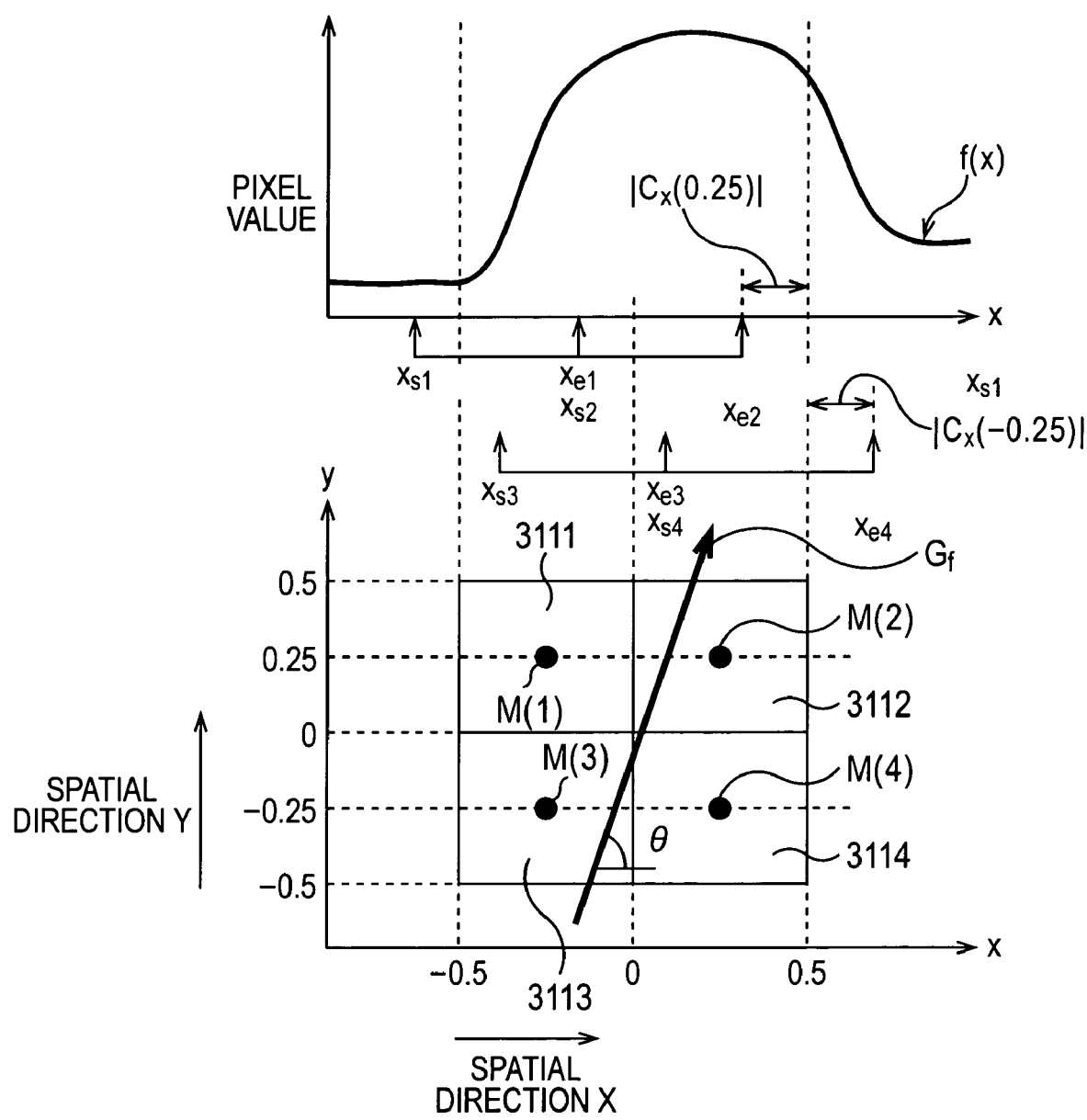
FIG. 91 is a diagram for describing an example of creating four high-resolution pixels in the one input pixel shown in FIG. 90, from the approximation function shown in FIG. 90.

In this case, for example, with the one-dimensional reintegration method, as shown in FIG. 91, four pixels 3111 through 3114 can be newly created in a range of −0.5 through 0.5 in the X direction, and also in a range of −0.5 through 0.5 in the Y direction (in the range where the pixel 3101 in FIG. 90 is positioned).

Note that on the lower side in FIG. 91, the same pixel-of-interest coordinates system as that in FIG. 90, and the pixels 3111 through 3114 in the pixel-of-interest coordinates system thereof are shown. Also, on the upper side in FIG. 91, the same graph (graph representing the approximation function f(x) at y=0) as that in FIG. 90 is shown.

Specifically, as shown in FIG. 91, with the one-dimensional reintegration method, calculation of the pixel value M (1) of the pixel 3111 using the following Expression (105), calculation of the pixel value M (2) of the pixel 3112 using the following Expression (106), calculation of the pixel value M (3) of the pixel 3113 using the following Expression (107), and calculation of the pixel value M (4) of the pixel 3114 using the following Expression (108) are available respectively.

$$M(1) = 2 \times \int_{x_{s1}}^{x_{e1}} f(x)dx \quad (105)$$

$$M(2) = 2 \times \int_{x_{s2}}^{x_{e2}} f(x)dx \quad (106)$$

$$M(3) = 2 \times \int_{x_{s3}}^{x_{e3}} f(x)dx \quad (107)$$

$$M(4) = 2 \times \int_{x_{s4}}^{x_{e4}} f(x)dx \quad (108)$$

Note that $x_{s1}$ in Expression (105), $x_{s2}$ in Expression (106), $x_{s3}$ in Expression (107), and $x_{s4}$ in Expression (108) each represent the integration start position of the corresponding expression. Also, $x_{e1}$ in Expression (105), $x_{e2}$ in Expression (106), $x_{e3}$ in Expression (107), and $x_{e4}$ in Expression (108) each represent the integration end position of the corresponding expression.

The integral range in the right side of each of Expression (105) through Expression (108) becomes the pixel width (length in the X direction) of each of the pixel 3111 through pixel 3114. That is to say, each of $x_{e1}-x_{s1}$, $x_{e2}-x_{s2}$, $x_{e3}-x_{s3}$, and $x_{e4}-x_{s4}$ becomes 0.5.

However, in this case, it can be conceived that a one-dimensional waveform having the same form as that in the approximation function f(x) at y=0 continues not in the Y direction but in the direction of data continuity represented with the gradient $G_f$ (i.e., angle θ direction) (in fact, a waveform having the same form as the X cross-sectional waveform F(x) at y=0 continues in the direction of continuity). That is to say, in the case in which a pixel value f (0) in the origin (0, 0) in the pixel-of-interest coordinates system in FIG. 91 (center of the pixel 3101 in FIG. 90) is taken as a pixel value f1, the direction where the pixel value f1 continues is not the Y direction but the direction of data continuity represented with the gradient $G_f$ (angle θ direction).

In other words, in the case of conceiving the waveform of the approximation function f(x) in a predetermined position y in the Y direction (however, y is a numeric value other than zero), the position corresponding to the pixel value f1 is not a position (0, y) but a position ($C_x$ (y), y) obtained by moving in the X direction from the position (0, y) by a predetermined amount (here, let us say that such an amount is also referred to as a shift amount. Also, a shift amount is an amount depending on the position y in the Y direction, so let us say that this shift amount is described as $C_x$ (Y)).

Accordingly, as the integral range of the right side of each of the above Expression (105) through Expression (108), the integral range needs to be set in light of the position y in the Y direction where the center of the pixel value M (l) to be obtained (however, l is any integer value of 1 through 4) exists, i.e., the shift amount $C_x$ (y).

Specifically, for example, the position y in the Y direction where the centers of the pixel 3111 and pixel 3112 exist is not y=0 but y=0.25.

Accordingly, the waveform of the approximation function f(x) at y=0.25 is equivalent to a waveform obtained by moving the waveform of the approximation function f(x) at y=0 by the shift amount $C_x$ (0.25) in the X direction.

In other words, in the above Expression (105), if we say that the pixel value M (1) as to the pixel 3111 is obtained by integrating the approximation function f(x) at y=0 with a predetermined integral range (from the start position $x_{s1}$ to the end position $x_{e1}$), the integral range thereof becomes not a range from the start position $x_{s1}$=−0.5 to the end position $x_{e1}$=0 (a range itself where the pixel 3111 occupies in the X direction) but the range shown in FIG. 91, i.e., from the start position $x_{s1}$=−0.5+$C_x$ (0.25) to the end position $x_{e1}$=0+$C_x$ (0.25) (a range where the pixel 3111 occupies in the X direction in the event that the pixel 3111 is tentatively moved by the shift amount $C_x$ (0.25)).

Similarly, in the above Expression (106), if we say that the pixel value M (2) as to the pixel 3112 is obtained by integrating the approximation function f(x) at y=0 with a predetermined integral range (from the start position $x_{s2}$ to the end position $x_{e2}$), the integral range thereof becomes not a range from the start position $x_{s2}$=0 to the end position $x_{e2}$=0.5 (a range itself where the pixel 3112 occupies in the X direction) but the range shown in FIG. 91, i.e., from the start position $x_{s2}$=0+$C_x$ (0.25) to the end position $x_{e1}$=0.5+$C_x$ (0.25) (a range where the pixel 3112 occupies in the X direction in the event that the pixel 3112 is tentatively moved by the shift amount $C_x$ (0.25)).

Also, for example, the position y in the Y direction where the centers of the pixel 3113 and pixel 3114 exist is not y=0 but y=−0.25.

Accordingly, the waveform of the approximation function f(x) at y=−0.25 is equivalent to a waveform obtained by moving the waveform of the approximation function f(x) at y=0 by the shift amount $C_x$ (−0.25) in the X direction.

In other words, in the above Expression (107), if we say that the pixel value M (3) as to the pixel 3113 is obtained by integrating the approximation function f(x) at y =0 with a predetermined integral range (from the start position $x_{s3}$ to the end position $x_{e3}$), the integral range thereof becomes not a range from the start position $x_{s3}=-0.5$ to the end position $x_{e3}=0$ (a range itself where the pixel 3113 occupies in the X direction) but the range shown in FIG. 91, i.e., from the start position $x_{s3}=-0.5+C_x$ (−0.25) to the end position $x_{e3}=0+C_x$ (−0.25) (a range where the pixel 3113 occupies in the X direction in the event that the pixel 3113 is tentatively moved by the shift amount $C_x$ (−0.25)).

Similarly, in the above Expression (108), if we say that the pixel value M (4) as to the pixel 3114 is obtained by integrating the approximation function f(x) at y=0 with a predetermined integral range (from the start position $x_{s4}$ to the end position $x_{e4}$), the integral range thereof becomes not a range from the start position $x_{s4}=0$ to the end position $x_{e4}=0.5$ (a range itself where the pixel 3114 occupies in the X direction) but the range shown in FIG. 91, i.e., from the start position $x_{s4}=0+C_x$ (−0.25) to the end position $x_{e1}=0.5+C_x$ (−0.25) (a range where the pixel 3114 occupies in the X direction in the event that the pixel 3114 is tentatively moved by the shift amount $C_x$ (−0.25)).

Accordingly, the image generating unit 102 (FIG. 89) calculates the above Expression (105) through Expression (108) by substituting the corresponding integral range of the above integral ranges for each of these expressions, and outputs the calculated results of these as the output pixel values M (1) through M (4).

Thus, the image generating unit 102 can create four pixels having higher spatial resolution than that of the output pixel 3101, i.e., the pixel 3111 through pixel 3114 (FIG. 91) by employing the one-dimensional reintegration method as a pixel at the output pixel 3101 (FIG. 90) from the sensor 2 (FIG. 89). Further, though not shown in the drawing, as described above, the image generating unit 102 can create a pixel having an arbitrary powered spatial resolution as to the output pixel 3101 without deterioration by appropriately changing an integral range, in addition to the pixel 3111 through pixel 3114.

Figure 92:
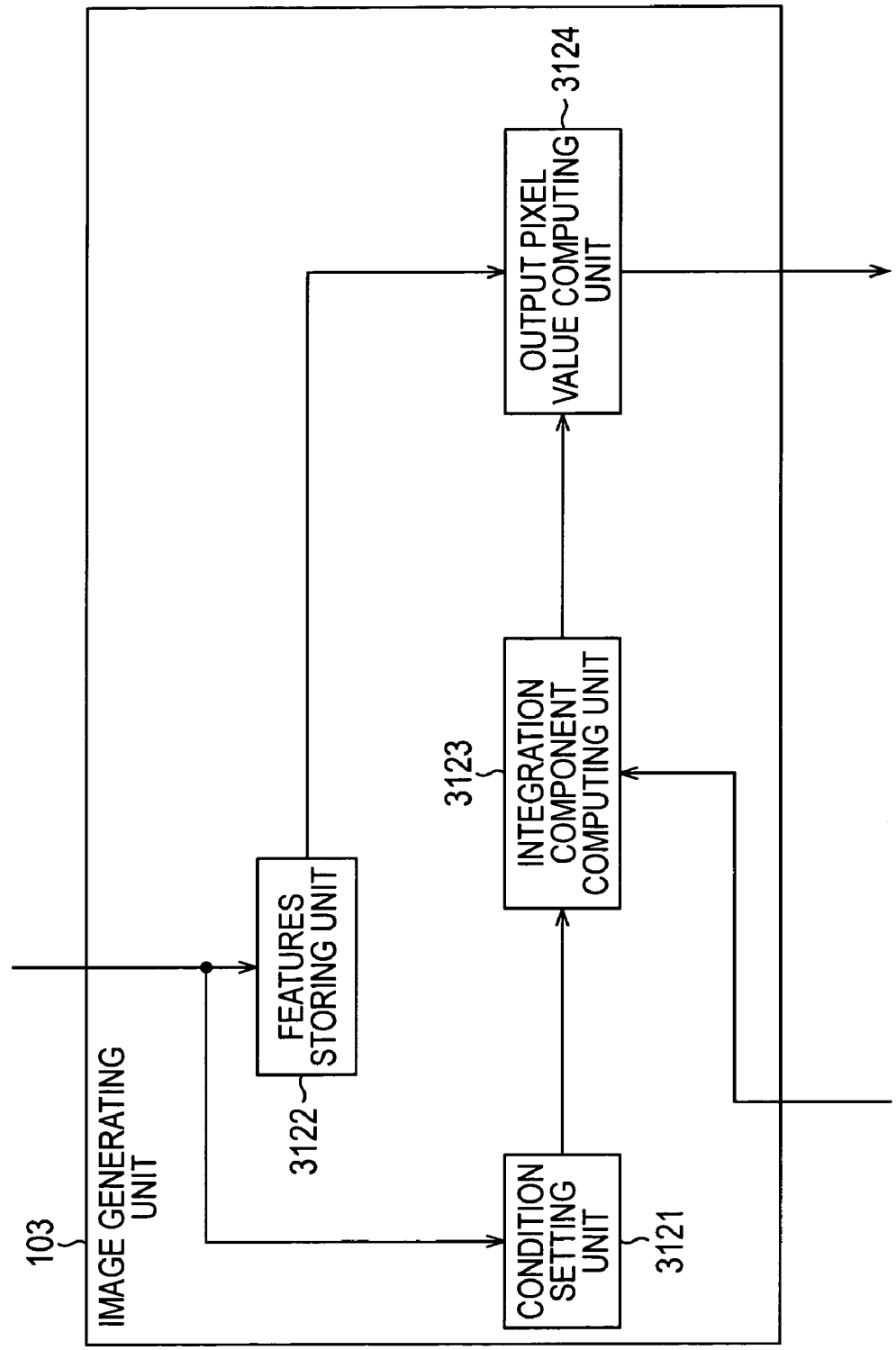
FIG. 92 is a block diagram for describing a configuration example of an image generating unit using, of re-integration techniques having the principle shown in FIG. 89, one-dimensional re-integration technique.

FIG. 92 represents a configuration example of the image generating unit 103 employing such a one-dimensional reintegration method.

As shown in FIG. 92, the image generating unit 103 shown in this example includes a conditions setting unit 3121, features storage unit 3122, integral component calculation unit 3123, and output pixel value calculation unit 3124.

The conditions setting unit 3121 sets the number of dimensions n of the approximation function f(x) based on the actual world estimating information (the features of the approximation function f(x) in the example in FIG. 92) supplied from the actual world estimating unit 102.

The conditions setting unit 3121 also sets an integral range in the case of reintegrating the approximation function f(x) (in the case of calculating an output pixel value). Note that an integral range set by the conditions setting unit 3121 does not need to be the width of a pixel. For example, the approximation function f(x) is integrated in the spatial direction (X direction), and accordingly, a specific integral range can be determined as long as the relative size (power of spatial resolution) of an output pixel (pixel to be calculated by the image generating unit 103) as to the spatial size of each pixel of an input image from the sensor 2 (FIG. 89) is known. Accordingly, the conditions setting unit 3121 can set, for example, a spatial resolution power as an integral range.

The features storage unit 3122 temporally stores the features of the approximation function f(x) sequentially supplied from the actual world estimating unit 102. Subsequently, upon the features storage unit 3122 storing all of the features of the approximation function f(x), the features storage unit 3122 generates a features table including all of the features of the approximation function f(x), and supplies this to the output pixel value calculation unit 3124.

Incidentally, as described above, the image generating unit 103 calculates the output pixel value M using the above Expression (103), but the approximation function f(x) included in the right side of the above Expression (103) is represented as the following Expression (109) specifically.

$$f(x) = \sum_{i=0}^{n} w_i \times x^i dx \qquad (109)$$

Note that in Expression (109), $w_i$ represents the features of the approximation function f(x) supplied from the actual world estimating unit 102.

Accordingly, upon the approximation function f(x) of Expression (109) being substituted for the approximation function f(x) of the right side of the above Expression (103) so as to expand (calculate) the right side of Expression (103), the output pixel value M is represented as the following Expression (110).

$$M = G_e \times \sum_{i=0}^{n} w_i \times \frac{x_e^{i+1} - x_s^{i+1}}{i+1} \qquad (110)$$
$$= \sum_{i=0}^{n} w_i \times k_i(x_s, x_e)$$

In Expression (110), $K_i(x_s, x_e)$ represent the integral components of the i-dimensional term. That is to say, the integral components $K_i(x_s, x_e)$ are such as shown in the following Expression (111).

$$k_i(x_s, x_e) = G_e \times \frac{x_e^{i+1} - x_s^{i+1}}{i+1} \qquad (111)$$

The integral component calculation unit 3123 calculates the integral components $K_i(x_s, x_e)$.

Specifically, as shown in Expression (111), the integral components $K_i(x_s, x_e)$ can be calculated as long as the start position $x_s$ and end position $x_e$ of an integral range, gain $G_e$, and i of the i-dimensional term are known.

Of these, the gain $G_e$ is determined with the spatial resolution power (integral range) set by the conditions setting unit 3121.

The range of i is determined with the number of dimensions n set by the conditions setting unit 3121.

Also, each of the start position $x_s$ and end position $x_e$ of an integral range is determined with the center pixel position (x, y) and pixel width of an output pixel to be generated from now, and the shift amount $C_x$ (y) representing the direction of data continuity. Note that (x, y) represents the relative position from the center position of a pixel of interest when the actual world estimating unit 102 generates the approximation function f(x).

Further, each of the center pixel position (x, y) and pixel width of an output pixel to be generated from now is determined with the spatial resolution power (integral range) set by the conditions setting unit 3121.

Also, with the shift amount $C_x$ (y), and the angle θ supplied from the data continuity detecting unit 101, the relation such as the following Expression (112) and Expression (113) holds, and accordingly, the shift amount $C_x$ (y) is determined with the angle θ.

$$G_f = \tan\theta = \frac{dy}{dx} \quad (112)$$

$$C_x(y) = \frac{y}{G_f} \quad (113)$$

Note that in Expression (112), $G_f$ represents a gradient representing the direction of data continuity, θ represents an angle (angle generated between the X direction serving as one direction of the spatial directions and the direction of data continuity represented with a gradient $G_f$) of one of the data continuity information output from the data continuity detecting unit 101 (FIG. 89). Also, dx represents the amount of fine movement in the X direction, and dy represents the amount of fine movement in the Y direction (spatial direction perpendicular to the X direction) as to the dx.

Accordingly, the integral component calculation unit 3123 calculates the integral components $K_i$ ($x_s$, $x_e$) based on the number of dimensions and spatial resolution power (integral range) set by the conditions setting unit 3121, and the angle θ of the data continuity information output from the data continuity detecting unit 101, and supplies the calculated results to the output pixel value calculation unit 3124 as an integral component table.

The output pixel value calculation unit 3124 calculates the right side of the above Expression (110) using the features table supplied from the features storage unit 3122 and the integral component table supplied from the integral component calculation unit 3123, and outputs the calculation result as an output pixel value M.

Next, description will be made regarding image generating processing (processing in step S103 in FIG. 29) by the image generating unit 103 (FIG. 92) employing the one-dimensional reintegration method with reference to the flowchart in FIG. 93.

For example, now, let us say that the actual world estimating unit 102 has already generated the approximation function f(x) such as shown in FIG. 90 while taking the pixel 3101 such as shown in FIG. 90 described above as a pixel of interest at the processing in step S102 in FIG. 29 described above.

Also, let us say that the data continuity detecting unit 101 has already output the angle θ such as shown in FIG. 90 as data continuity information at the processing in step S101 in FIG. 29 described above.

Figure 93:
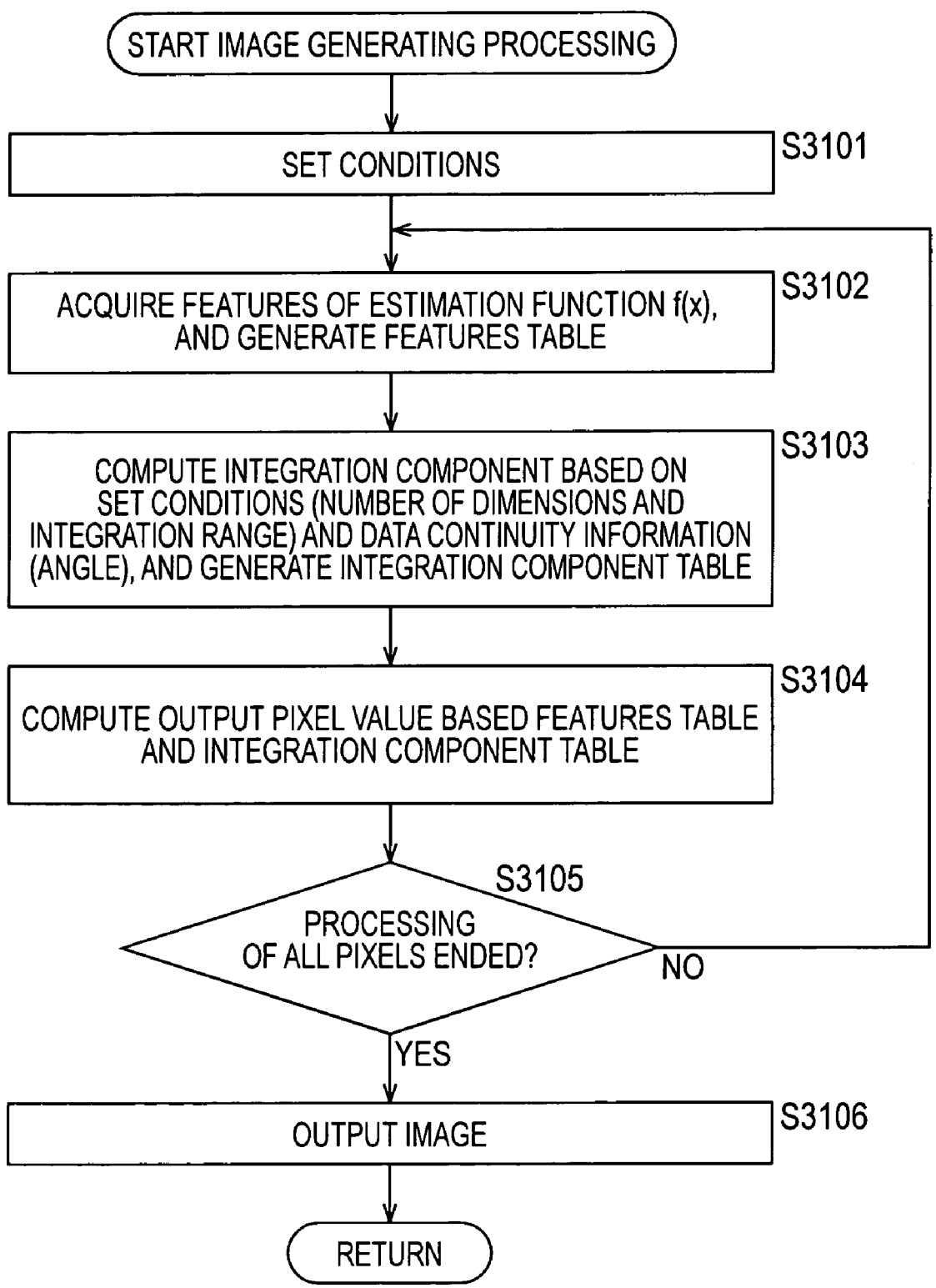
FIG. 93 is a flowchart for describing the image generating processing which the image generating unit of the configuration shown in FIG. 92 executes.

In this case, the conditions setting unit 3121 sets conditions (the number of dimensions and an integral range) at step S3101 in FIG. 93.

For example, now, let us say that 5 has been set as the number of dimensions, and also a spatial quadruple density (spatial resolution power to cause the pitch width of a pixel to become half power in the upper/lower/left/right sides) has been set as an integral range.

That is to say, in this case, consequently, it has been set that the four pixel 3111 through pixel 3114 are created newly in a range of −0.5 through 0.5 in the X direction, and also a range of −0.5 through 0.5 in the Y direction (in the range of the pixel 3101 in FIG. 90), such as shown in FIG. 91.

In step S3102, the features storage unit 3122 acquires the features of the approximation function f(x) supplied from the actual world estimating unit 102, and generates a features table. In this case, coefficients $w_0$ through $w_5$ of the approximation function f(x) serving as a five-dimensional polynomial are supplied from the actual world estimating unit 102, and accordingly, ($w_0$, $w_1$, $w_2$, $w_3$, $w_4$, $w_5$) is generated as a features table.

In step S3103, the integral component calculation unit 3123 calculates integral components based on the conditions (the number of dimensions and integral range) set by the conditions setting unit 3121, and the data continuity information (angle θ) supplied from the data continuity detecting unit 101, and generates an integral component table.

Specifically, for example, if we say that the respective pixels 3111 through 3114, which are to be generated from now, are appended with numbers (hereafter, such a number is referred to as a mode number) 1 through 4, the integral component calculation unit 3123 calculates the integral components $K_i$ ($x_s$, $x_e$) of the above Expression (111) as a function of l (however, l represents a mode number) such as integral components $K_i$ (l) shown in the left side of the following Expression (114).

$$K_i(l) = K_i(x_s, x_e) \quad (114)$$

Specifically, in this case, the integral components $K_i$ (l) shown in the following Expression (115) are calculated.

$$k_i(1) = k_i(-0.5 - C_x(-0.25), 0 - C_x(-0.25))$$

$$k_i(2) = k_i(0 - C_x(-0.25), 0.5 - C_x(-0.25))$$

$$k_i(3) = k_i(-0.5 - C_x(0.25), 0 - C_x(0.25))$$

$$k_i(4) = k_i(0 - C_x(0.25), 0.5 - C_x(0.25)) \quad (115)$$

Note that in Expression (115), the left side represents the integral components $K_i$ (l), and the right side represents the integral components $K_i$ ($x_s$, $x_e$). That is to say, in this case, l is any one of 1 through 4, and also i is any one of 0 through 5, and accordingly, 24 $K_i$ (l) in total of 6 $K_i$ (1), 6 $K_i$ (2), 6 $K_i$ (3), and 6 $K_i$ (4) are calculated.

More specifically, first, the integral component calculation unit 3123 calculates each of the shift amounts $C_x$ (−0.25) and $C_x$ (0.25) from the above Expression (112) and Expression (113) using the angle θ supplied from the data continuity detecting unit 101.

Next, the integral component calculation unit 3123 calculates the integral components $K_i$ ($x_s$, $x_e$) of each right side of the four expressions in Expression (115) regarding i =0 through 5 using the calculated shift amounts $C_x$ (−0.25) and $C_x$ (0.25). Note that with this calculation of the integral components $K_i$ ($x_s$, $x_e$), the above Expression (111) is employed.

Subsequently, the integral component calculation unit 3123 converts each of the 24 integral components $K_i$ ($x_s$, $x_e$) calculated into the corresponding integral components $K_i$ (l) in accordance with Expression (115), and generates an integral component table including the 24 integral components $K_i$ (l) converted (i.e., 6 $K_i$ (1), 6 $K_i$ (2), 6 $K_i$ (3), and 6 $K_i$ (4)).

Note that the sequence of the processing in step S3102 and the processing in step S3103 is not restricted to the example in FIG. 93, the processing in step S3103 may be executed first, or the processing in step S3102 and the processing in step S3103 may be executed simultaneously.

Next, in step S3104, the output pixel value calculation unit 3124 calculates the output pixel values M (1) through M (4) respectively based on the features table generated by the features storage unit 3122 at the processing in step S3102, and the integral component table generated by the integral component calculation unit 3123 at the processing in step S3103.

Specifically, in this case, the output pixel value calculation unit 3124 calculates each of the pixel value M (1) of the pixel 3111 (pixel of mode number 1), the pixel value M (2) of the pixel 3112 (pixel of mode number 2), the pixel value M (3) of the pixel 3113 (pixel of mode number 3), and the pixel value M (4) of the pixel 3114 (pixel of mode number 4) by calculating the right sides of the following Expression (116) through Expression (119) corresponding to the above Expression (110).

$$M(1) = \sum_{i=0}^{5} w_i k_i(1) \tag{116}$$

$$M(2) = \sum_{i=0}^{5} w_i k_i(2) \tag{117}$$

$$M(3) = \sum_{i=0}^{5} w_i k_i(3) \tag{118}$$

$$M(4) = \sum_{i=0}^{5} w_i k_i(4) \tag{119}$$

In step S3105, the output pixel value calculation unit 3124 determines regarding whether or not the processing of all the pixels has been completed.

In step S3105, in the event that determination is made that the processing of all the pixels has not been completed, the processing returns to step S3102, wherein the subsequent processing is repeatedly performed. That is to say, the pixels that have not become a pixel of interest are sequentially taken as a pixel of interest, and the processing in step S3102 through S3104 is repeatedly performed.

In the event that the processing of all the pixels has been completed (in step S3105, in the event that determination is made that the processing of all the pixels has been completed), the output pixel value calculation unit 3124 outputs the image in step S3106. Then, the image generating processing ends.

Next, description will be made regarding the differences between the output image obtained by employing the one-dimensional reintegration method and the output image obtained by employing another method (conventional classification adaptation processing) regarding a predetermined input image with reference to FIG. 94 through FIG. 101.

Figure 94:
FIG. 94 is a diagram illustrating an example of the original image of the input image.
Figure 95:
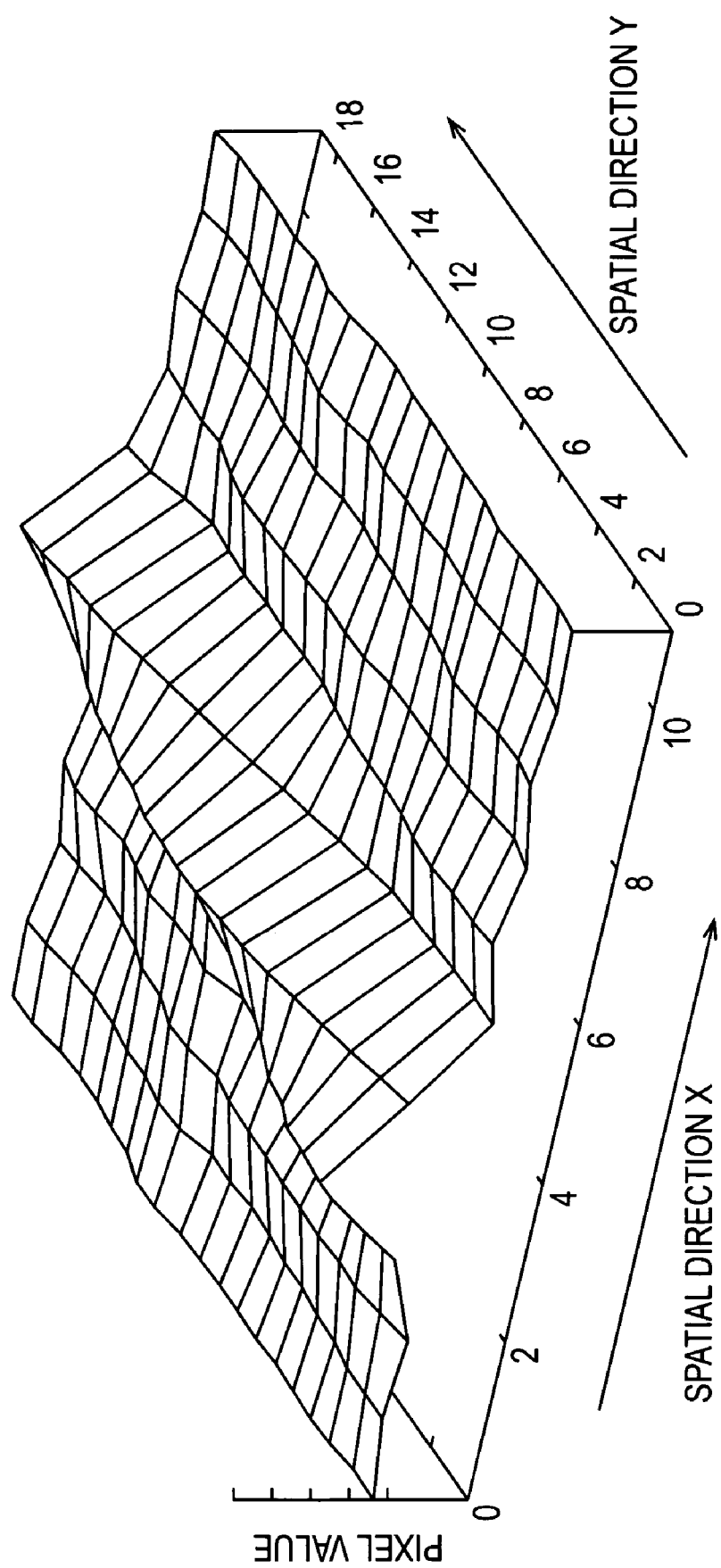
FIG. 95 is a diagram illustrating an example of image data corresponding to the image shown in FIG. 94.

FIG. 94 is a diagram illustrating the original image of the input image, and FIG. 95 illustrates image data corresponding to the original image in FIG. 94. In FIG. 95, the axis in the vertical direction in the drawing represents pixel values, and the axis in the lower right direction in the drawing represents the X direction serving as one direction of the spatial directions of the image, and the axis in the upper right direction in the drawing represents the Y direction serving as the other direction of the spatial directions of the image. Note that the respective axes in later-described FIG. 97, FIG. 99, and FIG. 101 corresponds to the axes in FIG. 95.

Figure 96:
FIG. 96 is a diagram representing an example of an input image.
Figure 97:
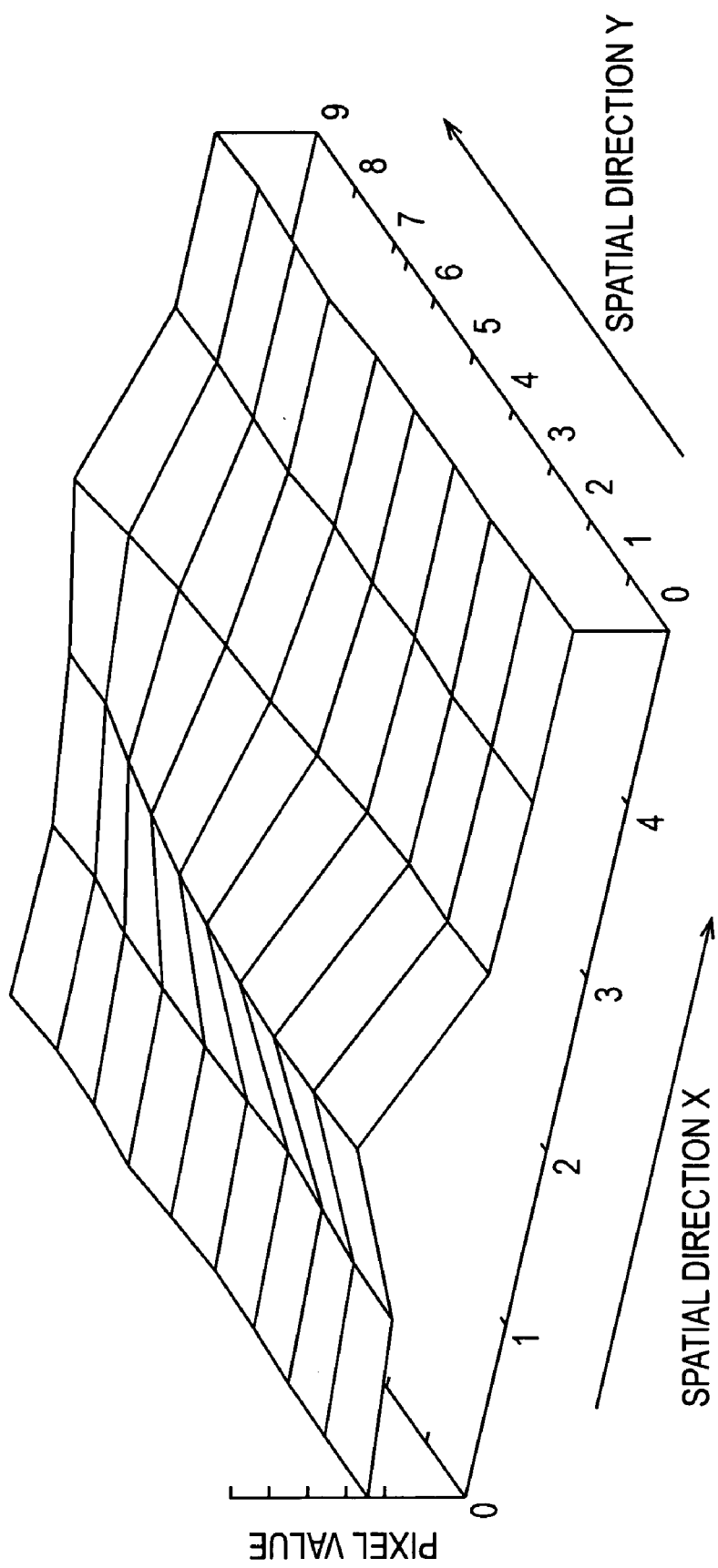
FIG. 97 is a diagram representing an example of image data corresponding to the image shown in FIG. 96.

FIG. 96 is a diagram illustrating an example of an input image. The input image illustrated in FIG. 96 is an image generated by taking the mean of the pixel values of the pixels belonged to a block made up of 2×2 pixels shown in FIG. 94 as the pixel value of one pixel. That is to say, the input image is an image obtained by integrating the image shown in FIG. 94 in the spatial direction, which imitates the integration property of a sensor. Also, FIG. 97 illustrates image data corresponding to the input image in FIG. 96.

The original image illustrated in FIG. 94 includes a fine-line image inclined almost 5° clockwise from the vertical direction. Similarly, the input image illustrated in FIG. 96 includes a fine-line image inclined almost 5° clockwise from the vertical direction.

Figure 98:
FIG. 98 is a diagram illustrating an example of an image obtained by subjecting an input image to conventional class classification adaptation processing.
Figure 99:
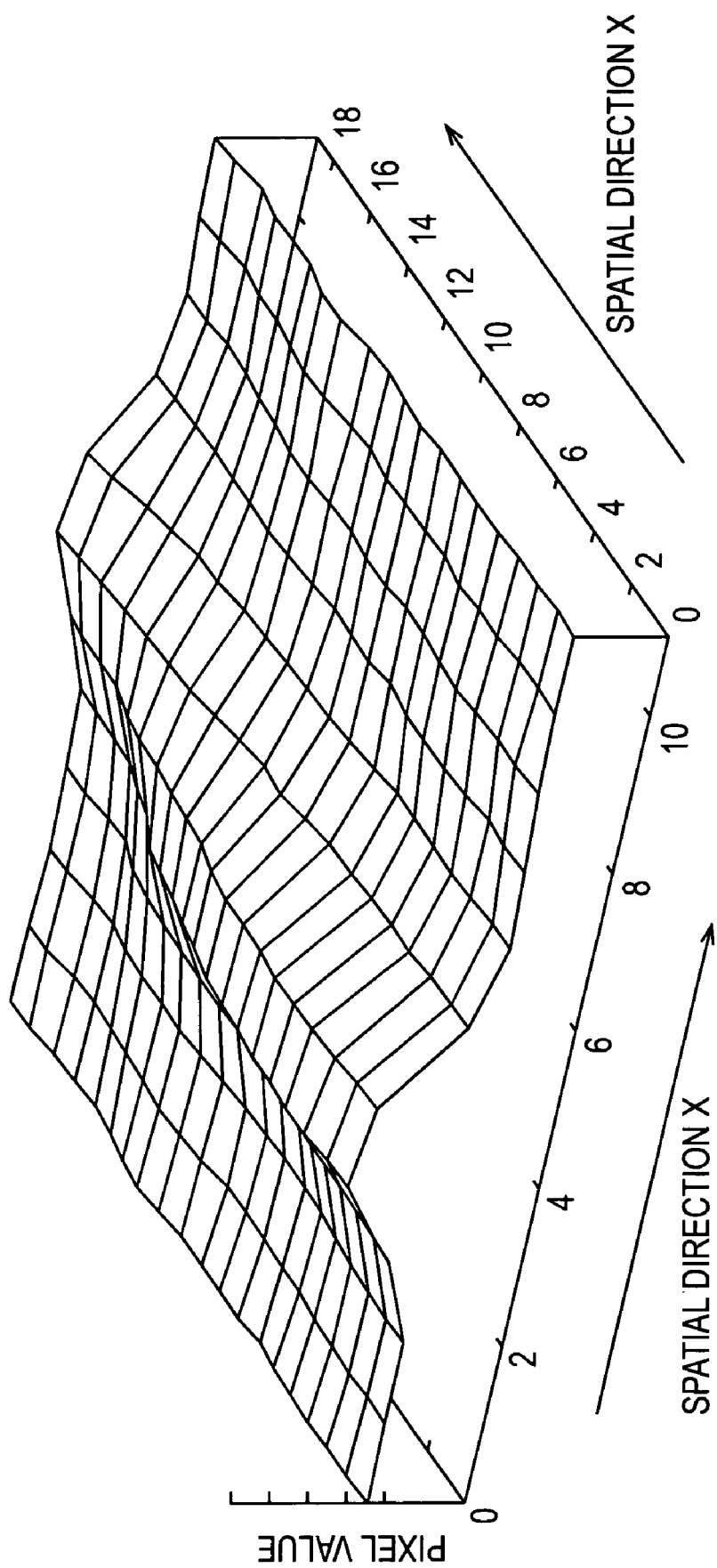
FIG. 99 is a diagram representing an example of image data corresponding to the image shown in FIG. 98.

FIG. 98 is a diagram illustrating an image (hereafter, the image illustrated in FIG. 98 is referred to as a conventional image) obtained by subjecting the input image illustrated in FIG. 96 to conventional class classification adaptation processing. Also, FIG. 99 illustrates image data corresponding to the conventional image.

Note that the class classification adaptation processing is made up of classification processing and adaptation processing, data is classified based on the property thereof by the class classification processing, and is subjected to the adaptation processing for each class, as described above. With the adaptation processing, for example, a low-quality or standard-quality image is subjected to mapping using a predetermined tap coefficient so as to be converted into a high-quality image.

Figure 100:
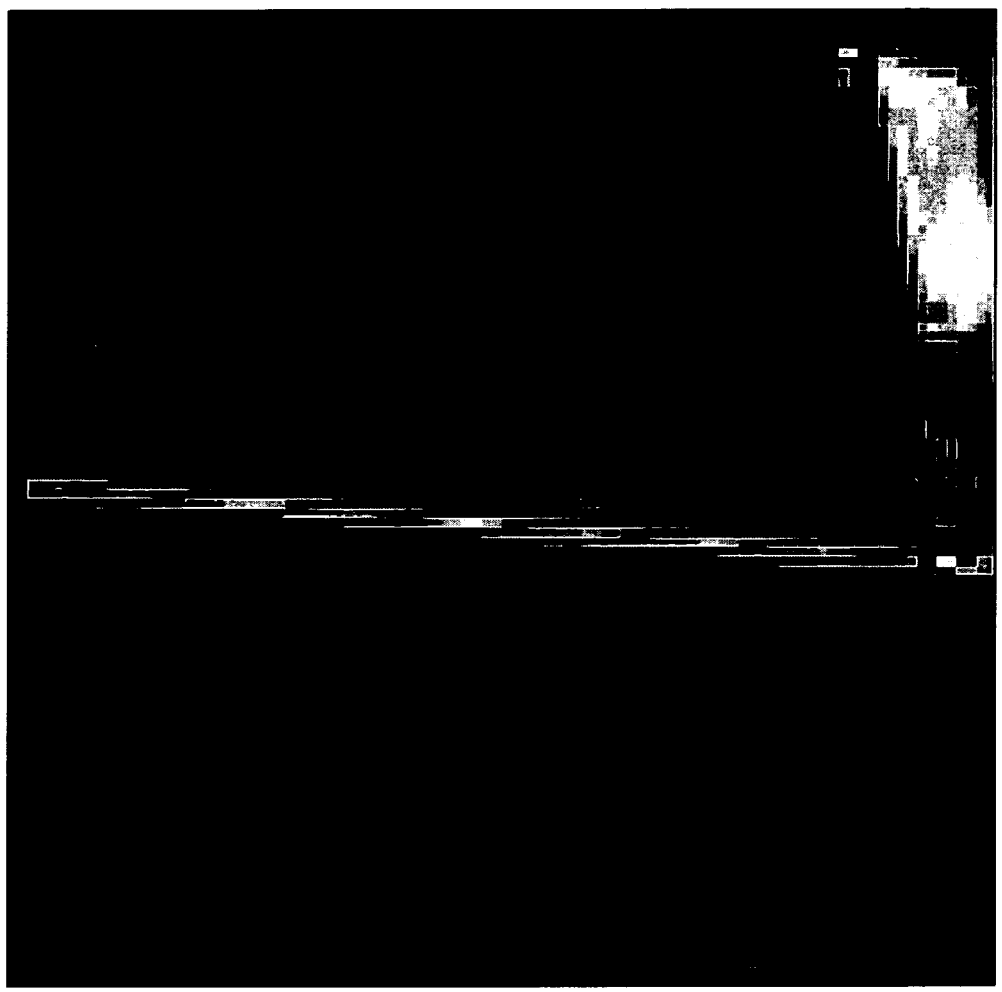
FIG. 100 is a diagram illustrating an example of an image obtained by subjecting an input image to the one-dimensional re-integration technique according to the present invention.
Figure 101:
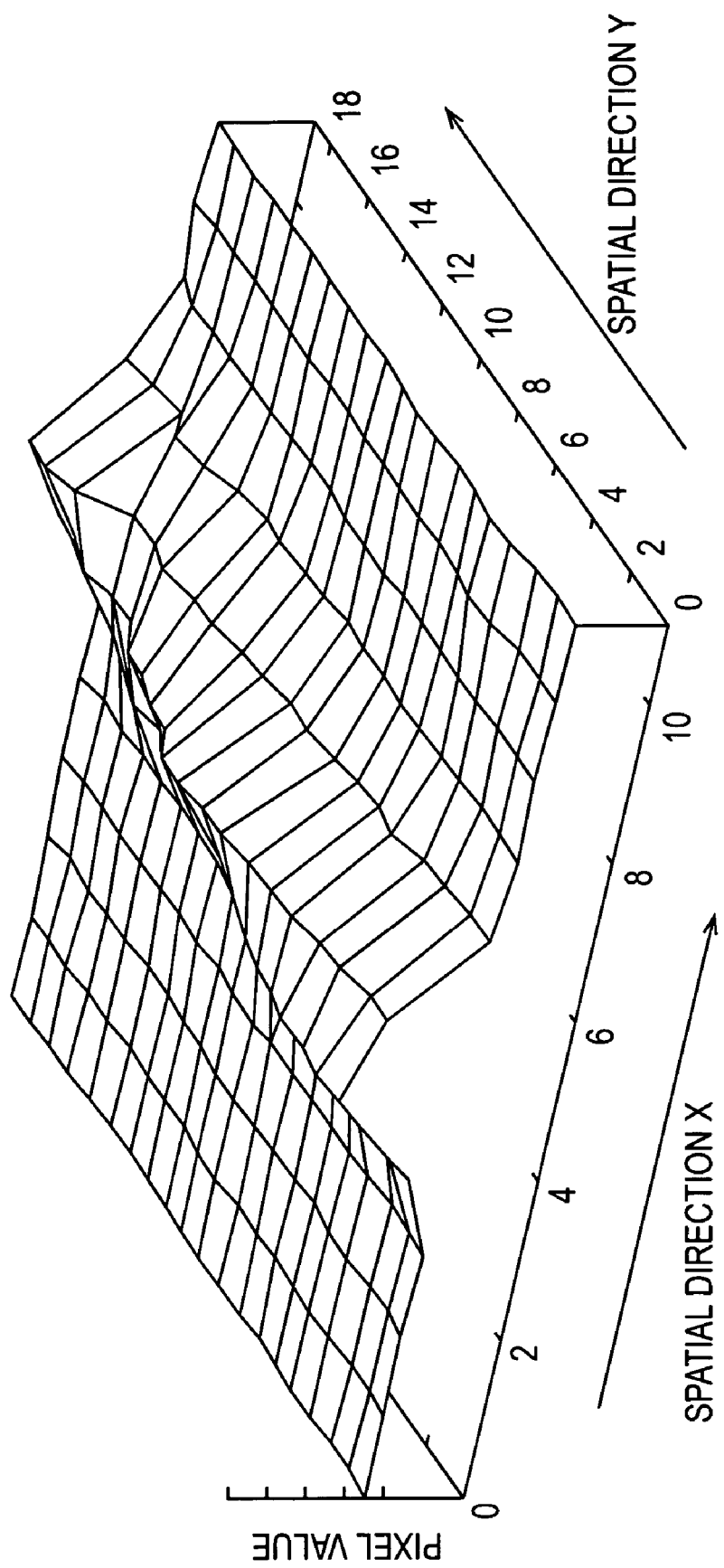
FIG. 101 is a diagram illustrating an example of image data corresponding to the image shown in FIG. 100.

FIG. 100 is a diagram illustrating a reintegration image (hereafter, the image illustrated in FIG. 100 is referred to as an image) obtained by applying the one-dimensional reintegration method, to the input image illustrated in FIG. 96. Also, FIG. 101 illustrates image data corresponding to the reintegration image.

It can be understood that upon the conventional image in FIG. 98 being compared with the reintegration image in FIG. 100, a fine-line image is different from that in the original image in FIG. 94 in the conventional image, but on the other hand, the fine-line image is almost the same as that in the original image in FIG. 94 in the reintegration image.

This difference is caused by a difference wherein the conventional class classification adaptation processing is a method for performing processing on the basis (origin) of the input image in FIG. 96, but on the other hand, the one-dimensional reintegration method is a method for estimating the original image in FIG. 94 (generating the approximation function f(x) corresponding to the original image) in light of continuity of a fine line, and performing processing (performing reintegration so as to calculate pixel values) on the basis (origin) of the original image estimated.

Thus, with the one-dimensional reintegration method, an output image (pixel values) is generated by integrating the approximation function f(x) in an arbitrary range on the basis (origin) of the approximation function f(x) (the approximation function f(x) of the X cross-sectional waveform F(x) in the actual world) serving as the one-dimensional polynomial generated with the one-dimensional approximating method.

Accordingly, with the one-dimensional reintegration method, it becomes possible to output an image more similar to the original image (the light signal in the actual world 1 which is to be cast in the sensor 2) in comparison with the conventional other methods.

Also, with the one-dimensional reintegration method, as described above, the integral range is arbitrary, and accordingly, it becomes possible to create resolution (temporal resolution or spatial resolution) different from the resolution of an input image by varying the integral range. That is to say, it becomes possible to generate an image having arbitrary powered resolution as well as an integer value as to the resolution of the input image.

Further, the one-dimensional reintegration method enables calculation of an output image (pixel values) with less calculation processing amount than other reintegration methods.

Next, description will be made regarding a two-dimensional reintegration method with reference to FIG. 102 through FIG. 108.

The two-dimensional reintegration method is based on condition that the approximation function f(x, y) has been generated with the two-dimensional polynomial approximating method.

Figure 102:
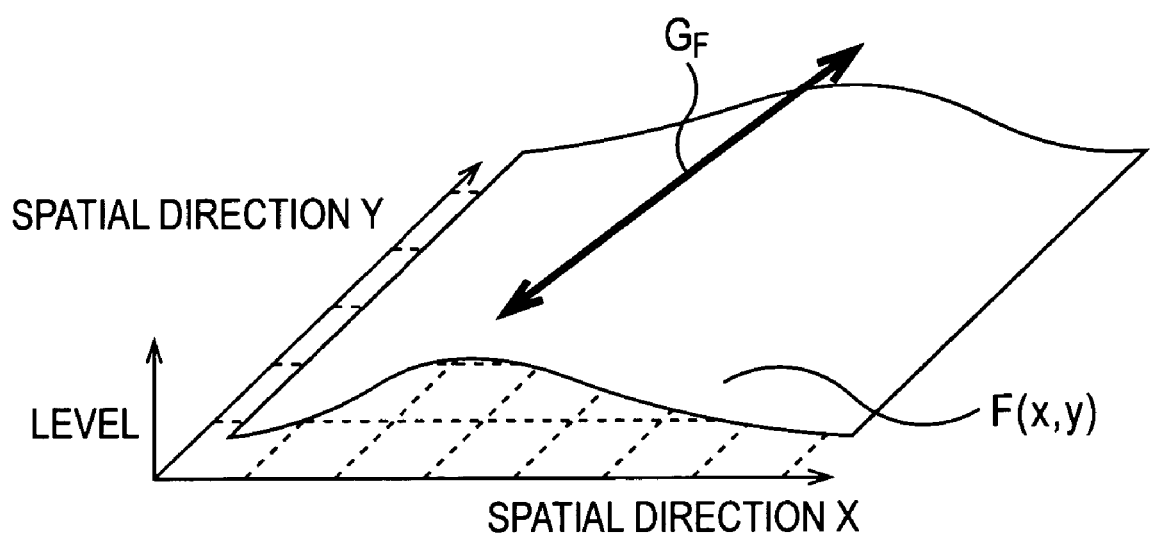
FIG. 102 is a diagram for describing actual-world signals having continuity in the spatial direction.

That is to say, for example, it is an assumption that the image function F(x, y, t) representing the light signal in the actual world 1 (FIG. 89) having continuity in the spatial direction represented with the gradient $G_F$ has been approximated with a waveform projected in the spatial directions (X direction and Y direction), i.e., the waveform F(x, y) on the X-Y plane has been approximated with the approximation function f(x, y) serving as a n-dimensional (n is an arbitrary integer) polynomial, such as shown in FIG. 102.

In FIG. 102, the horizontal direction represents the X direction serving as one direction in the spatial directions, the upper right direction represents the Y direction serving as the other direction in the spatial directions, and the vertical direction represents light levels, respectively in the drawing. $G_F$ represents gradient as continuity in the spatial directions.

Note that with the example in FIG. 102, the direction of continuity is taken as the spatial directions (X direction and Y direction), so the projection function of a light signal to be approximated is taken as the function F(x, y), but as described later, the function F(x, t) or function F(y, t) may be a target of approximation according to the direction of continuity.

In the case of the example in FIG. 102, with the two-dimensional reintegration method, the output pixel value M is calculated as the following Expression (120).

$$M = G_e \times \int_{y_s}^{y_e} \int_{x_s}^{x_e} f(x, y) dx dy \qquad (120)$$

Note that in Expression (120), $y_s$ represents an integration start position in the Y direction, and $y_e$ represents an integration end position in the Y direction. Similarly, $x_s$ represents an integration start position in the X direction, and $x_e$ represents an integration end position in the X direction. Also, $G_e$ represents a predetermined gain.

In Expression (120), an integral range can be set arbitrarily, and accordingly, with the two-dimensional reintegration method, it becomes possible to create pixels having an arbitrary powered spatial resolution as to the original pixels (the pixels of an input image from the sensor 2 (FIG. 89)) without deterioration by appropriately changing this integral range.

Figure 103:
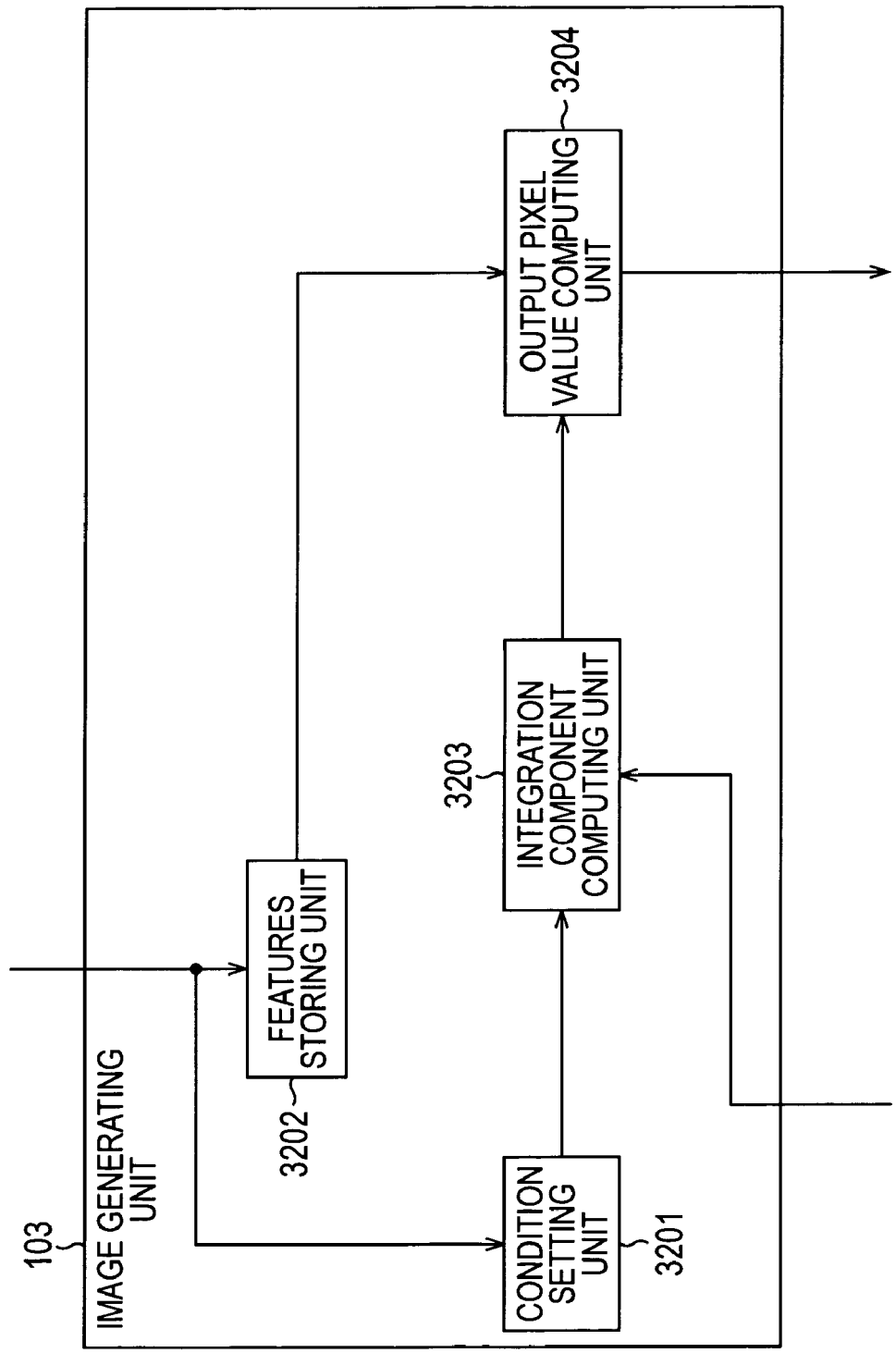
FIG. 103 is a block diagram for describing a configuration example of an image generating unit which uses, of the re-integration techniques having the principle shown in FIG. 89, a two-dimensional re-integration technique.

FIG. 103 represents a configuration example of the image generating unit 103 employing the two-dimensional reintegration method.

As shown in FIG. 103, the image generating unit 103 in this example includes a conditions setting unit 3201, features storage unit 3202, integral component calculation unit 3203, and output pixel value calculation unit 3204.

The conditions setting unit 3201 sets the number of dimensions n of the approximation function f(x, y) based on the actual world estimating information (with the example in FIG. 103, the features of the approximation function f(x, y)) supplied from the actual world estimating unit 102.

The conditions setting unit 3201 also sets an integral range in the case of reintegrating the approximation function f(x, y) (in the case of calculating an output pixel value). Note that an integral range set by the conditions setting unit 3201 does not need to be the vertical width or the horizontal width of a pixel. For example, the approximation function f(x, y) is integrated in the spatial directions (X direction and Y direction), and accordingly, a specific integral range can be determined as long as the relative size (power of spatial resolution) of an output pixel (pixel to be generated from now by the image generating unit 103) as to the spatial size of each pixel of an input image from the sensor 2 is known. Accordingly, the conditions setting unit 3201 can set, for example, a spatial resolution power as an integral range.

The features storage unit 3202 temporally stores the features of the approximation function f(x, y) sequentially supplied from the actual world estimating unit 102. Subsequently, upon the features storage unit 3202 storing all of the features of the approximation function f(x, y), the features storage unit 3202 generates a features table including all of the features of the approximation function f(x, y), and supplies this to the output pixel value calculation unit 3204.

Now, description will be made regarding the details of the approximation function f(x, y).

For example, now, let us say that the light signals (light signals represented with the wave F (x, y)) in the actual world 1 (FIG. 89) having continuity in the spatial directions represented with the gradient $G_F$ shown in FIG. 102 described above have been detected by the sensor 2 (FIG. 89), and have been output as an input image (pixel values).

Figure 104:
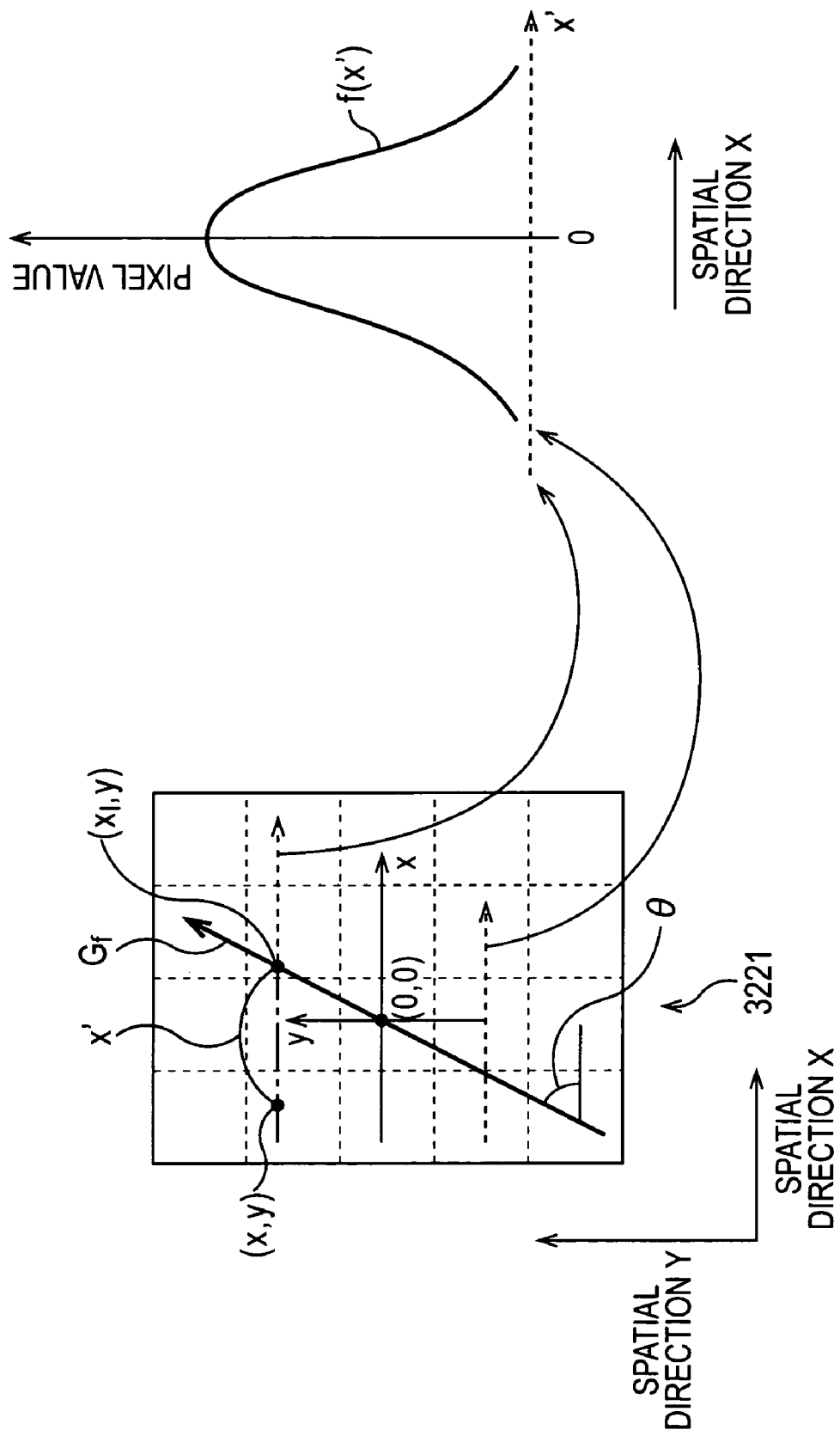
FIG. 104 is a diagram for describing distance in the cross-sectional direction.

Further, for example, let us say that the data continuity detecting unit 101 (FIG. 3) has subjected a region 3221 of an input image made up of 20 pixels in total (20 squares represented with a dashed line in the drawing) of 4 pixels in the X direction and also 5 pixels in the Y direction of this input image to the processing thereof, and has output an angle θ (angle θ generated between the direction of data continuity represented with the gradient $G_f$ corresponding to the gradient $G_F$ and the X direction) as one of data continuity information, as shown in FIG. 104.

Note that as viewed from the actual world estimating unit 102, the data continuity detecting unit 101 should simply output the angle θ at a pixel of interest, and accordingly, the processing region of the data continuity detecting unit 101 is not restricted to the above region 3221 in the input image.

Also, with the region 3221 in the input image, the horizontal direction in the drawing represents the X direction serving as one direction of the spatial directions, and the vertical direction in the drawing represents the Y direction serving the other direction of the spatial directions.

Further, in FIG. 104, a pixel, which is the second pixel from the left, and also the third pixel from the bottom, is taken as a pixel of interest, and an (x, y) coordinates system is set so as to take the center of the pixel of interest as the origin (0, 0). A relative distance (hereafter, referred to as a cross-sectional direction distance) in the X direction as to a straight line (straight line of the gradient $G_f$ representing the direction of data continuity) having an angle θ passing through the origin (0, 0) is taken as x'.

Further, in FIG. 104, the graph on the right side represents the approximation function f(x') serving as a n-dimensional (n is an arbitrary integer) polynomial, which is a function approximating a one-dimensional waveform (hereafter, referred to as an X cross-sectional waveform F(x')) wherein the image function F(x, y, t) of which variables are positions x, y, and z on the three-dimensional space, and point-in-time t is projected in the X direction at an arbitrary position y in the Y direction. Of the axes in the graph on the right side, the axis in the horizontal direction in the drawing represents a cross-sectional direction distance, and the axis in the vertical direction in the drawing represents pixel values.

In this case, the approximation function f(x') shown in FIG. 104 is a n-dimensional polynomial, so is represented as the following Expression (121).

$$f(x') = w_0 + w_1 x' + w_2 x' + \ldots + w_n x'^n = \sum_{i=0}^{n} w_i x'^i \quad (121)$$

Also, since the angle θ is determined, the straight line having angle θ passing through the origin (0, 0) is uniquely determined, and a position $x_1$ in the X direction of the straight line at an arbitrary position y in the Y direction is represented as the following Expression (122). However, in Expression (122), s represents cot θ.

$$x_1 = s \times y \quad (122)$$

That is to say, as shown in FIG. 104, a point on the straight line corresponding to continuity of data represented with the gradient $G_f$ is represented with a coordinate value $(x_1, y)$.

The cross-sectional direction distance x' is represented as the following Expression (123) using Expression (122).

$$x' = x - x_1 = x - s \times y \quad (123)$$

Accordingly, the approximation function f(x, y) at an arbitrary position (x, y) within the input image region 3221 is represented as the following Expression (124) using Expression (121) and Expression (123).

$$f(x, y) = \sum_{i=0}^{n} w_i (x - s \times y)^i \quad (124)$$

Note that in Expression (124), $w_i$ represents the features of the approximation function f(x, y).

Now, description will return to FIG. 103, wherein the features $w_i$ included in Expression (124) are supplied from the actual world estimating unit 102, and stored in the features storage unit 3202. Upon the features storage unit 3202 storing all of the features $w_i$ represented with Expression (124), the features storage unit 3202 generates a features table including all of the features $w_i$, and supplies this to the output pixel value calculation unit 3204.

Also, upon the right side of the above Expression (120) being expanded (calculated) by substituting the approximation function f(x, y) of Expression (124) for the approximation function f(x, y) in the right side of Expression (120), the output pixel value M is represented as the following Expression (125).

$$M = G_e \times \sum_{i=0}^{n} w_i \times$$
$$\frac{\left\{ \begin{array}{l}(x_e - s \times y_e)^{i+2} - (x_e - s \times y_s)^{i+2} - \\ (x_s - s \times y_e)^{i+2} + (x_s - s \times y_s)^{i+2}\end{array}\right\}}{s(i+1)(i+2)} \quad (125)$$
$$= \sum_{i=0}^{n} w_i \times k_i(x_s, x_e, y_s, y_e)$$

In Expression (125), $K_i(x_s, x_e, y_s, y_e)$ represent the integral components of the i-dimensional term. That is to say, the integral components $K_i(x_s, x_e, y_s, y_e)$ are such as shown in the following Expression (126).

$$k_i(x_s, x_e, y_s, y_e) = G_e \times \quad (126)$$
$$\frac{\left\{ \begin{array}{l}(x_e - s \times y_e)^{i+2} - \\ (x_e - s \times y_s)^{i+2} - \\ (x_s - s \times y_e)^{i+2} + \\ (x_s - s \times y_s)^{i+2}\end{array}\right\}}{s(i+1)(i+2)}$$

The integral component calculation unit 3203 calculates the integral components $K_i(x_s, x_e, y_s, y_e)$.

Specifically, as shown in Expression (125) and Expression (126), the integral components $K_i(x_s, x_e, y_s, y_e)$ can be calculated as long as the start position $x_s$ in the X direction and end position $x_e$ in the X direction of an integral range, the start position $y_s$ in the Y direction and end position $y_e$ in the Y direction of an integral range, variable s, gain $G_e$, and i of the i-dimensional term are known.

Of these, the gain $G_e$ is determined with the spatial resolution power (integral range) set by the conditions setting unit 3201.

The range of i is determined with the number of dimensions n set by the conditions setting unit 3201.

A variable s is, as described above, cot θ, so is determined with the angle θ output from the data continuity detecting unit 101.

Also, each of the start position $x_s$ in the X direction and end position $x_e$ in the X direction of an integral range, and the start position $y_s$ in the Y direction and end position $y_e$ in the Y direction of an integral range is determined with the center pixel position (x, y) and pixel width of an output pixel to be generated from now. Note that (x, y) represents a relative position from the center position of the pixel of interest when the actual world estimating unit 102 generates the approximation function f(x).

Further, each of the center pixel position (x, y) and pixel width of an output pixel to be generated from now is determined with the spatial resolution power (integral range) set by the conditions setting unit 3201.

Accordingly, the integral component calculation unit 3203 calculates integral components $K_i(x_s, x_e, y_s, y_e)$ based on the number of dimensions and the spatial resolution power (integral range) set by the conditions setting unit 3201, and the angle θ of the data continuity information output from the data continuity detecting unit 101, and supplies the calculated result to the output pixel value calculation unit 3204 as an integral component table.

The output pixel value calculation unit 3204 calculates the right side of the above Expression (125) using the features table supplied from the features storage unit 3202, and the integral component table supplied from the integral component calculation unit 3203, and outputs the calculated result to the outside as the output pixel value M.

Next, description will be made regarding image generating processing (processing in step S103 in FIG. 29) by the image generating unit 103 (FIG. 104) employing the two-dimensional reintegration method with reference to the flowchart in FIG. 105.

Figure 106:
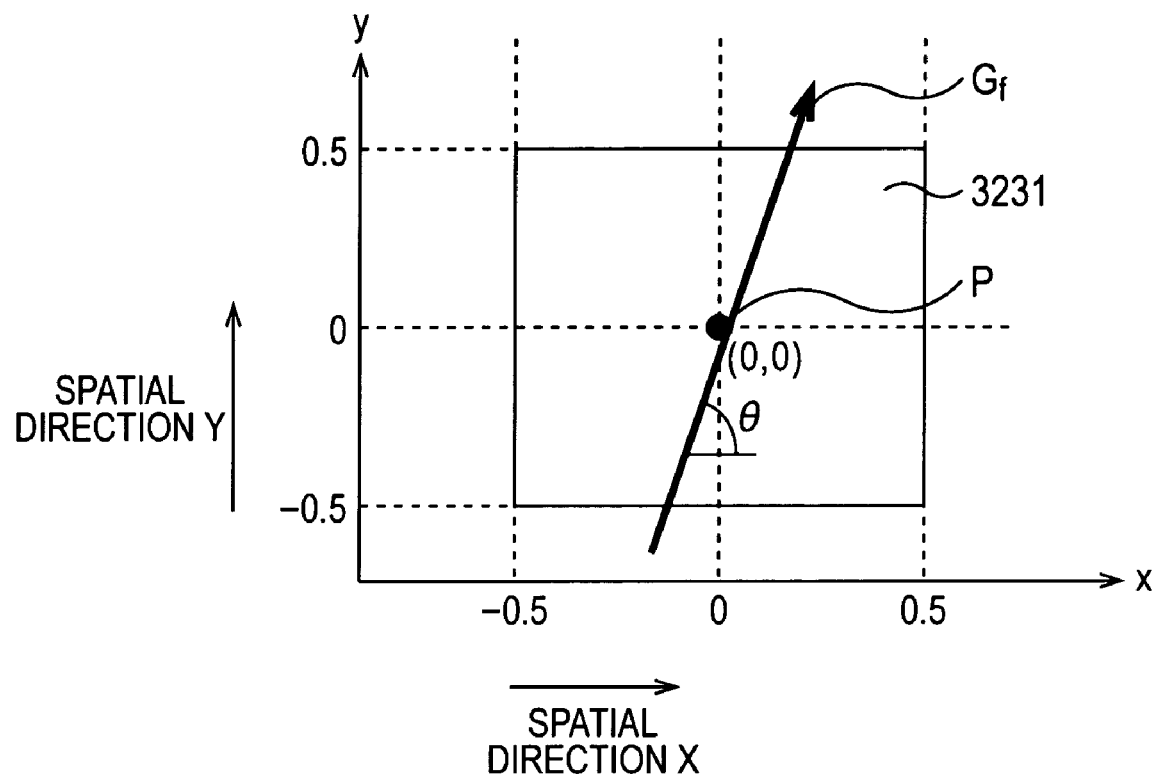
FIG. 106 is a diagram for describing an example of an input pixel.

For example, let us say that the light signals represented with the function F(x, y) shown in FIG. 102 have been cast in the sensor 2 so as to become an input image, and the actual world estimating unit 102 has already generated the approximation function f(x, y) for approximating the function F(x, y)

with one pixel 3231 such as shown in FIG. 106 as a pixel of interest at the processing in step S102 in FIG. 29 described above.

Note that in FIG. 106, the pixel value (input pixel value) of the pixel 3231 is taken as P, and the shape of the pixel 3231 is taken as a square of which one side is 1 in length. Also, of the spatial directions, the direction in parallel with one side of the pixel 3231 is taken as the X direction, and the direction orthogonal to the X direction is taken as the Y direction. Further, a coordinates system (hereafter, referred to as a pixel-of-interest coordinates system) in the spatial directions (X direction and Y direction) of which the origin is the center of the pixel 3231 is set.

Also, let us say that in FIG. 106, the data continuity detecting unit 101, which takes the pixel 3231 as a pixel of interest, has already output the angle θ as data continuity information corresponding to continuity of data represented with the gradient $G_f$ at the processing in step S101 in FIG. 29 described above.

Description will return to FIG. 105, and in this case, the conditions setting unit 3201 sets conditions (the number of dimensions and an integral range) at step S3201.

For example, now, let us say that 5 has been set as the number of dimensions, and also spatial quadruple density (spatial resolution power to cause the pitch width of a pixel to become half power in the upper/lower/left/right sides) has been set as an integral range.

Figure 107:
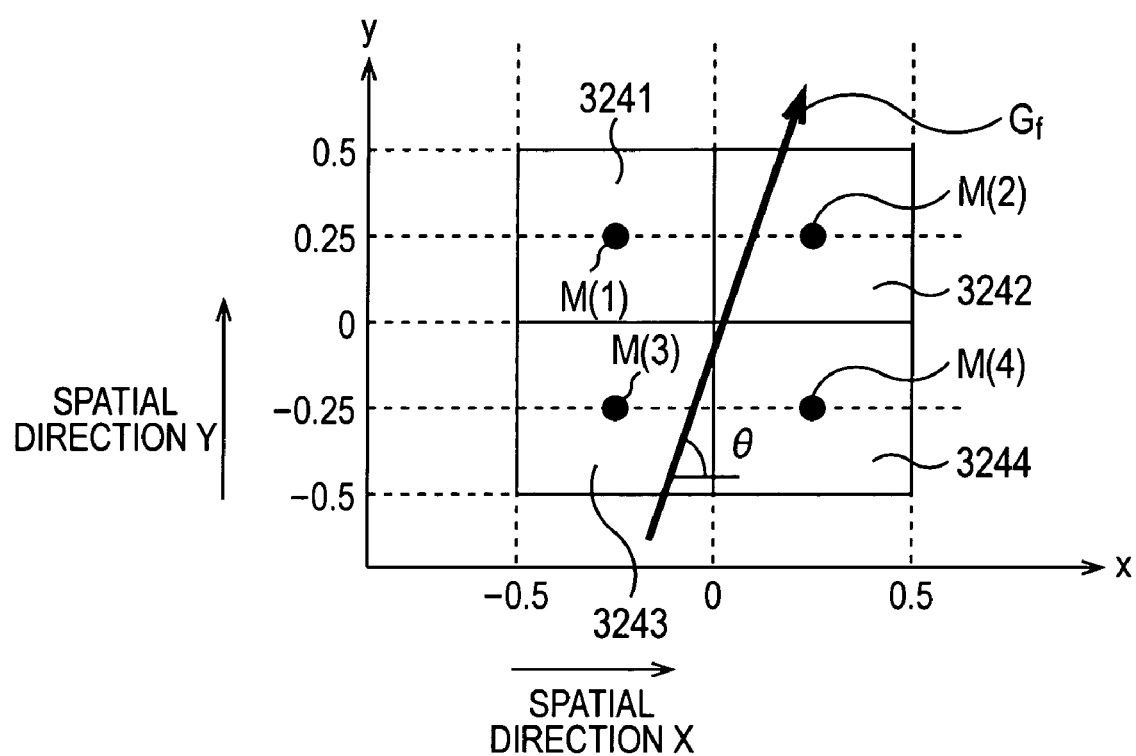
FIG. 107 is a diagram for describing an example of creating four high-resolution pixels in the one input pixel shown in FIG. 106, with the two-dimensional re-integration technique.

That is to say, in this case, it has been set that the four pixel 3241 through pixel 3244 are created newly in a range of −0.5 through 0.5 in the X direction, and also a range of −0.5 through 0.5 in the Y direction (in the range of the pixel 3231 in FIG. 106), such as shown in FIG. 107. Note that in FIG. 107 as well, the same pixel-of-interest coordinates system as that in FIG. 106 is shown.

Also, in FIG. 107, M (1) represents the pixel value of the pixel 3241 to be generated from now, M (2) represents the pixel value of the pixel 3242 to be generated from now, M (3) represents the pixel value of the pixel 3243 to be generated from now, and M (4) represents the pixel value of the pixel 3244 to be generated from now.

Description will return to FIG. 105, in step S3202, the features storage unit 3202 acquires the features of the approximation function f(x, y) supplied from the actual world estimating unit 102, and generates a features table. In this case, the coefficients $w_0$ through $w_5$ of the approximation function f(x) serving as a 5-dimensional polynomial are supplied from the actual world estimating unit 102, and accordingly, ($w_0, w_1, w_2, w_3, w_4, w_5$) is generated as a features table.

In step S3203, the integral component calculation unit 3203 calculates integral components based on the conditions (the number of dimensions and an integral range) set by the conditions setting unit 3201, and the data continuity information (angle θ) supplied from the data continuity detecting unit 101, and generates an integral component table.

Specifically, for example, let us say that numbers (hereafter, such a number is referred to as a mode number) 1 through 4 are respectively appended to the pixel 3241 through pixel 3244 to be generated from now, the integral component calculation unit 3203 calculates the integral components $K_i$ ($x_s$, $x_e$, $y_s$, $y_e$) of the above Expression (125) as a function of l (however, l represents a mode number) such as the integral components $K_i$ (l) shown in the left side of the following Expression (127).

$$K_i(l) = K_i(x_s, x_e, y_s, y_e) \tag{127}$$

Specifically, in this case, the integral components $K_i$ (l) shown in the following Expression (128) are calculated.

$$k_i(1) = k_i(-0.5, 0, 0, 0.5)$$

$$k_i(2) = k_i(0, 0.5, 0, 0.5)$$

$$k_i(3) = k_i(-0.5, 0, -0.5, 0)$$

$$k_i(4) = k_i(0, 0.5, -0.5, 0) \tag{128}$$

Note that in Expression (128), the left side represents the integral components $K_i$ (l), and the right side represents the integral components $K_i$ ($x_s$, $x_e$, $y_s$, $y_e$). That is to say, in this case, l is any one of 1 thorough 4, and also i is any one of 0 through 5, and accordingly, 24 $K_i$ (l) in total of 6 $K_i$ (1), 6 $K_i$ (2), 6 $K_i$ (3), and 6 $K_i$ (4) are calculated.

More specifically, first, the integral component calculation unit 3203 calculates the variable s (s=cot θ) of the above Expression (122) using the angle θ supplied from the data continuity detecting unit 101.

Next, the integral component calculation unit 3203 calculates the integral components $K_i$ ($x_s$, $x_e$, $y_s$, $y_e$) of each right side of the four expressions in Expression (128) regarding i=0 through 5 using the calculated variable s. Note that with this calculation of the integral components $K_i$ ($x_s$, $x_e$, $y_s$, $y_e$), the above Expression (125) is employed.

Subsequently, the integral component calculation unit 3203 converts each of the 24 integral components $K_i$ ($x_s$, $x_e$, $y_s$, $y_e$) calculated into the corresponding integral components $K_i$ (l) in accordance with Expression (128), and generates an integral component table including the 24 integral components $K_i$ (l) converted (i.e., 6 $K_i$ (1), 6 $K_i$ (2), 6 $K_i$ (3), and 6 $K_i$ (4)).

Figure 105:
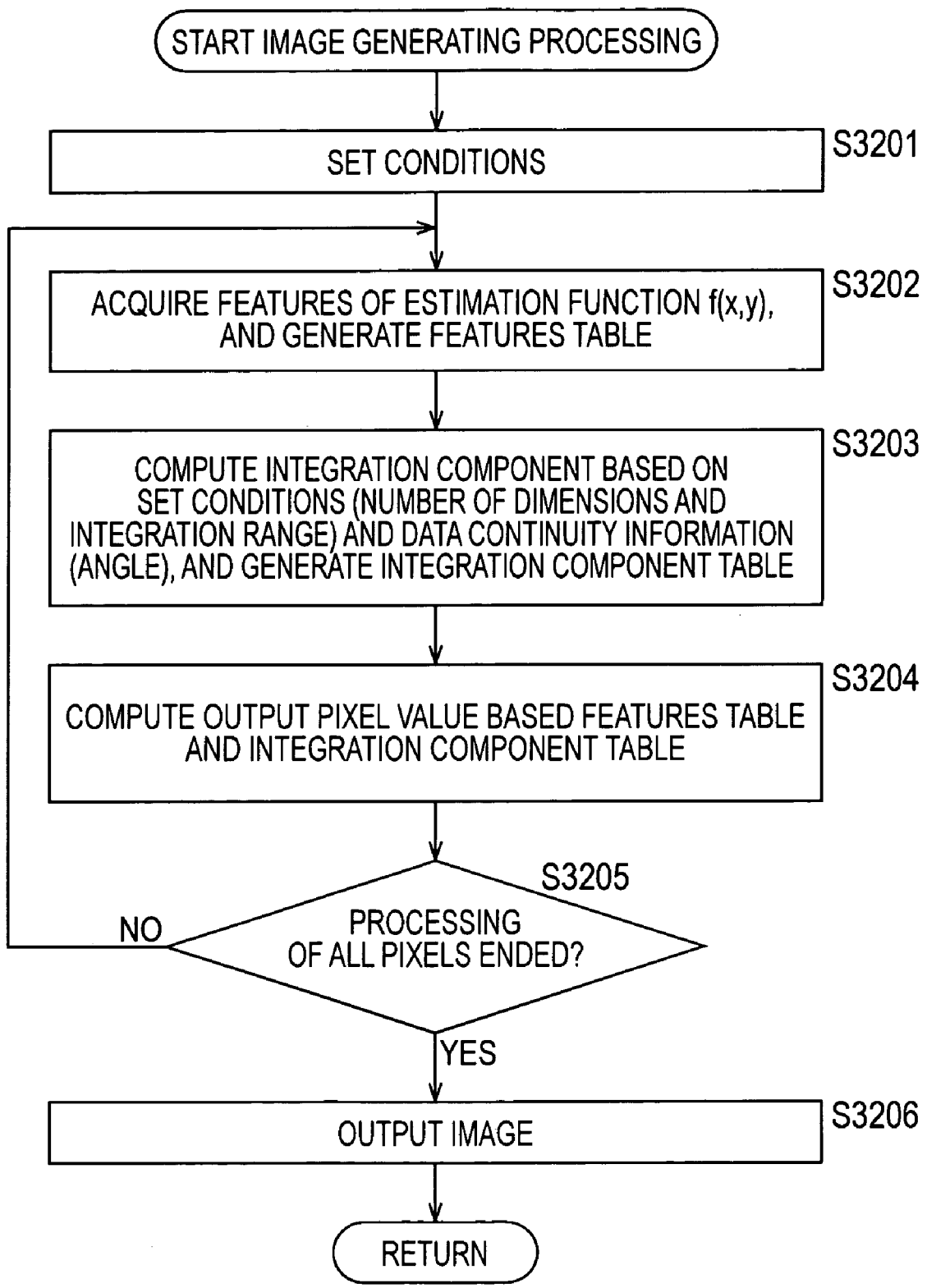
FIG. 105 is a flowchart for describing the image generating processing which the image generating unit of the configuration shown in FIG. 103 executes.

Note that the sequence of the processing in step S3202 and the processing in step S3203 is not restricted to the example in FIG. 105, the processing in step S3203 may be executed first, or the processing in step S3202 and the processing in step S3203 may be executed simultaneously.

Next, in step S3204, the output pixel value calculation unit 3204 calculates the output pixel values M (1) through M (4) respectively based on the features table generated by the features storage unit 3202 at the processing in step S3202, and the integral component table generated by the integral component calculation unit 3203 at the processing in step S3203.

Specifically, in this case, the output pixel value calculation unit 3204 calculates each of the pixel value M (1) of the pixel 3241 (pixel of mode number 1), the pixel value M (2) of the pixel 3242 (pixel of mode number 2), the pixel value M (3) of the pixel 3243 (pixel of mode number 3), and the pixel value M (4) of the pixel 3244 (pixel of mode number 4) shown in FIG. 107 by calculating the right sides of the following Expression (129) through Expression (132) corresponding to the above Expression (125).

$$M(1) = \sum_{i=0}^{n} w_i \times k_i(1) \tag{129}$$

$$M(2) = \sum_{i=0}^{n} w_i \times k_i(2) \tag{130}$$

$$M(3) = \sum_{i=0}^{n} w_i \times k_i(3) \tag{131}$$

$$M(4) = \sum_{i=0}^{n} w_i \times k_i(4) \tag{132}$$

However, in this case, each n of Expression (129) through Expression (132) becomes 5.

In step S3205, the output pixel value calculation unit 3204 determines regarding whether or not the processing of all the pixels has been completed.

In step S3205, in the event that determination is made that the processing of all the pixels has not been completed, the processing returns to step S3202, wherein the subsequent processing is repeatedly performed. That is to say, the pixels that have not become a pixel of interest are sequentially taken as a pixel of interest, and the processing in step S3202 through S3204 is repeatedly performed.

In the event that the processing of all the pixels has been completed (in step S3205, in the event that determination is made that the processing of all the pixels has been completed), the output pixel value calculation unit 3204 outputs the image in step S3206. Then, the image generating processing ends.

Thus, four pixels having higher spatial resolution than the input pixel 3231, i.e., the pixel 3241 through pixel 3244 (FIG. 107) can be created by employing the two-dimensional reintegration method as a pixel at the pixel 3231 of the input image (FIG. 106) from the sensor 2 (FIG. 89). Further, though not shown in the drawing, as described above, the image generating unit 103 can create a pixel having an arbitrary powered spatial resolution as to the input pixel 3231 without deterioration by appropriately changing an integral range, in addition to the pixel 3241 through pixel 3244.

As described above, as description of the two-dimensional reintegration method, an example for subjecting the approximation function f(x, y) as to the spatial directions (X direction and Y direction) to two-dimensional integration has been employed, but the two-dimensional reintegration method can be applied to the time-space directions (X direction and t direction, or Y direction and t direction).

That is to say, the above example is an example in the case in which the light signals in the actual world 1 (FIG. 89) have continuity in the spatial directions represented with the gradient $G_F$ such as shown in FIG. 102, and accordingly, an expression including two-dimensional integration in the spatial directions (X direction and Y direction) such as shown in the above Expression (120) has been employed. However, the concept regarding two-dimensional integration can be applied not only to the spatial direction but also the time-space directions (X direction and t direction, or Y direction and t direction).

In other words, with the two-dimensional polynomial approximating method serving as an assumption of the two-dimensional reintegration method, it is possible to perform approximation using a two-dimensional approximation function f even in the case in which the image function F(x, y, t) representing the light signals has continuity in the time-space directions (however, X direction and t direction, or Y direction and t direction) as well as continuity in the spatial directions.

Figure 108:
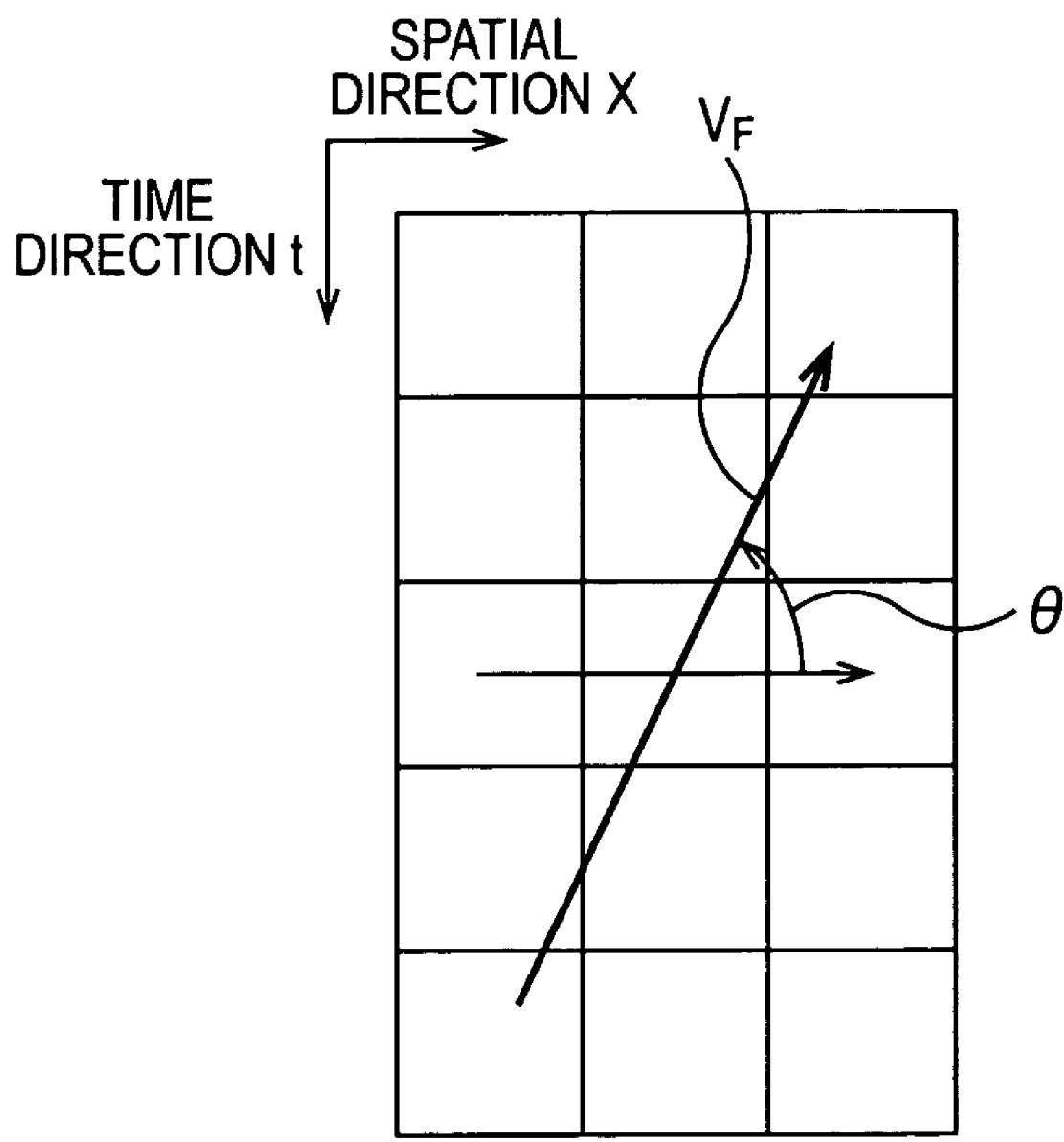
FIG. 108 is a diagram for describing the direction of continuity in the space-time directions.

Specifically, for example, in the event that there is an object moving horizontally in the X direction at uniform velocity, the direction of movement of the object is represented with like a gradient $V_F$ in the X-t plane such as shown in FIG. 108. In other words, it can be said that the gradient $V_F$ represents the direction of continuity in the time-space directions in the X-t plane. Accordingly, the data continuity detecting unit 101 (FIG. 89) can output movement θ such as shown in FIG. 108 (strictly speaking, though not shown in the drawing, movement θ is an angle generated by the direction of data continuity represented with the gradient $V_f$ corresponding to the gradient $V_F$ and the X direction in the spatial direction) as data continuity information corresponding to the gradient $V_F$ representing continuity in the time-space directions in the X-t plane as well as the above angle θ (data continuity information corresponding to the gradient $G_F$ representing continuity in the spatial directions in the X-Y plane).

Also, the actual world estimating unit 102 (FIG. 89) employing the two-dimensional polynomial approximating method can calculate the coefficients (features) $w_i$ of an approximation function f(x, t) with the same method as the above method by employing the movement θ instead of the angle θ described above. However, in this case, the equation to be employed is not the above Expression (124) but the following Expression (133).

$$f(x, y) = \sum_{i=0}^{n} w_i (x - s \times t) \tag{133}$$

Note that in Expression (133), s is cot θ (however, θ is movement).

Accordingly, the image generating unit 103 (FIG. 89) employing the two-dimensional reintegration method can calculate the pixel value M by substituting the f(x, t) of the above Expression (133) for the right side of the following Expression (134), and calculating this.

$$M = G_e \times \int_{t_s}^{t_e} \int_{x_s}^{x_e} f(x, t) \, dx \, dt \tag{134}$$

Note that in Expression (134), $t_s$ represents an integration start position in the t direction, and $t_e$ represents an integration end position in the t direction. Similarly, $x_s$ represents an integration start position in the X direction, and $x_e$ represents an integration end position in the X direction. $G_e$ represents a predetermined gain.

Alternately, an approximation function f(y, t) focusing attention on the spatial direction Y instead of the spatial direction X can be handled as the same way as the above approximation function f(x, t).

Incidentally, in Expression (133), it becomes possible to obtain data not integrated in the temporal direction, i.e., data without movement blurring by regarding the t direction as constant, i.e., by performing integration while ignoring integration in the t direction. In other words, this method may be regarded as one of two-dimensional reintegration methods in that reintegration is performed on condition that one certain dimension of the two-dimensional approximation function f is constant, or in fact, may be regarded as one of one-dimensional reintegration methods in that one-dimensional reintegration in the X direction is performed.

Also, in Expression (134), an integral range may be set arbitrarily, and accordingly, with the two-dimensional reintegration method, it becomes possible to create a pixel having an arbitrary powered resolution as to the original pixel (pixel of an input image from the sensor 2 (FIG. 89)) without deterioration by appropriately changing this integral range.

That is to say, with the two-dimensional reintegration method, it becomes possible to create temporal resolution by appropriately changing an integral range in the temporal direction t. Also, it becomes possible to create spatial resolution by appropriately changing an integral range in the spatial direction X (or spatial direction Y). Further, it becomes possible to create both temporal resolution and spatial resolution by appropriately changing each integral range in the temporal direction t and in the spatial direction X.

Note that as described above, creation of any one of temporal resolution and spatial resolution may be performed even with the one-dimensional reintegration method, but creation of both temporal resolution and spatial resolution cannot be performed with the one-dimensional reintegration method in theory, which becomes possible only by performing two-dimensional or more reintegration. That is to say, creation of both temporal resolution and spatial resolution becomes possible only by employing the two-dimensional reintegration method and a later-described three-dimensional reintegration method.

Also, the two-dimensional reintegration method takes not one-dimensional but two-dimensional integration effects into consideration, and accordingly, an image more similar to the light signal in the actual world 1 (FIG. 89) may be created.

Next, description will be made regarding a three-dimensional reintegration method with reference to FIG. 109 and FIG. 110.

With the three-dimensional reintegration method, the approximation function f(x, y, t) has been created using the three-dimensional approximating method, which is an assumption.

In this case, with the three-dimensional reintegration method, the output pixel value M is calculated as the following Expression (135).

$$M = G_e \times \int_{t_s}^{t_e} \int_{y_s}^{y_e} \int_{x_s}^{x_e} f(x, y, t) dx dy dt \quad (135)$$

Note that in Expression (135), $t_s$ represents an integration start position in the t direction, and $t_e$ represents an integration end position in the t direction. Similarly, $y_s$ represents an integration start position in the Y direction, and $y_e$ represents an integration end position in the Y direction. Also, $x_s$ represents an integration start position in the X direction, and $x_e$ represents an integration end position in the X direction. $G_e$ represents a predetermined gain.

Also, in Expression (135), an integral range may be set arbitrarily, and accordingly, with the three-dimensional reintegration method, it becomes possible to create a pixel having an arbitrary powered time-space resolution as to the original pixel (pixel of an input image from the sensor 2 (FIG. 89)) without deterioration by appropriately changing this integral range. That is to say, upon the integral range in the spatial direction being reduced, a pixel pitch can be reduced without restraint. On the other hand, upon the integral range in the spatial direction being enlarged, a pixel pitch can be enlarged without restraint. Also, upon the integral range in the temporal direction being reduced, temporal resolution can be created based on an actual waveform.

Figure 109:
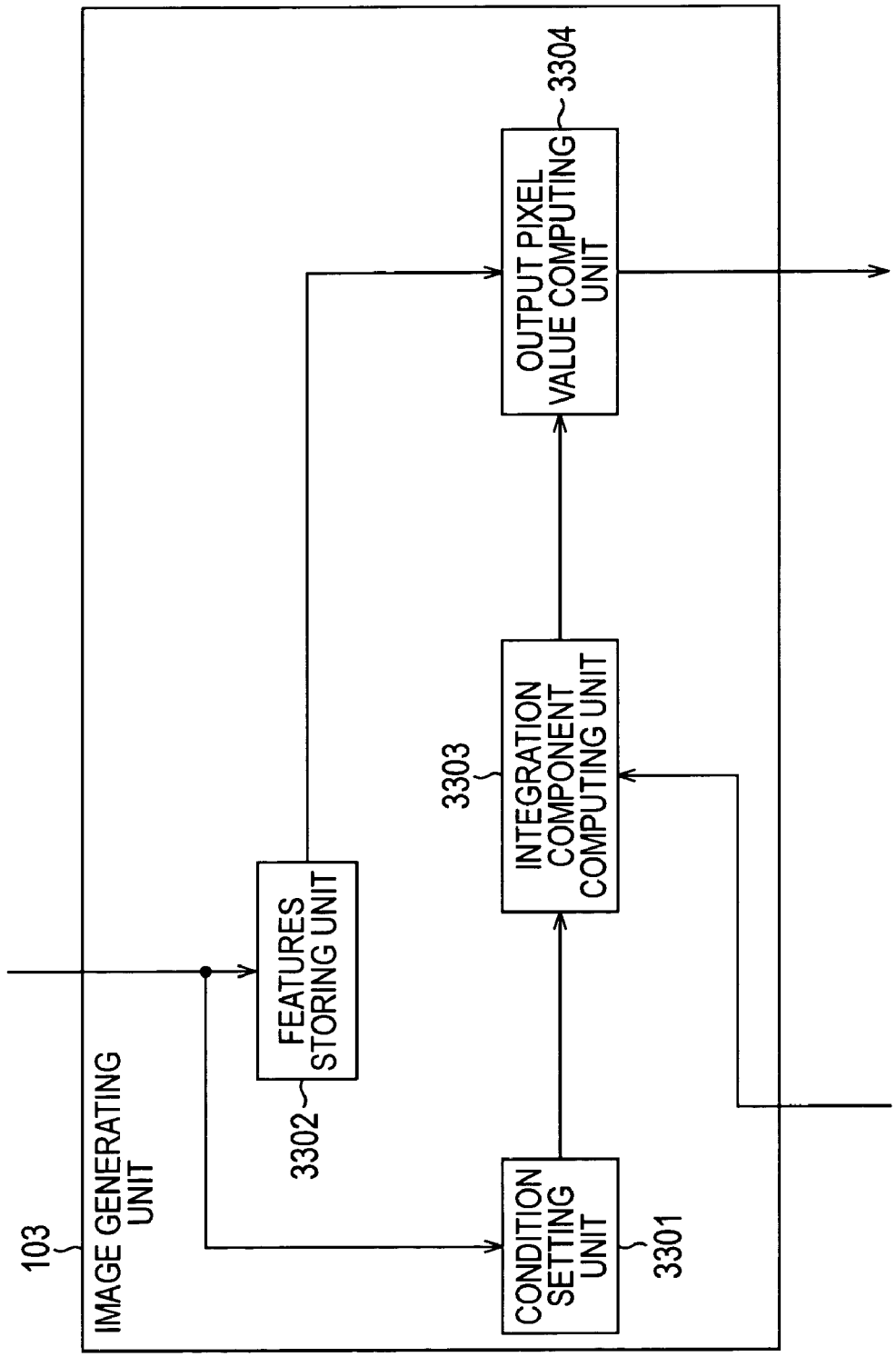
FIG. 109 is a block diagram for describing a configuration example of the image generating unit which uses, of the re-integration techniques having the principle shown in FIG. 89, a three-dimensional re-integration technique.

FIG. 109 represents a configuration example of the image generating unit 103 employing the three-dimensional reintegration method.

As shown in FIG. 109, this example of the image generating unit 103 includes a conditions setting unit 3301, features storage unit 3302, integral component calculation unit 3303, and output pixel value calculation unit 3304.

The conditions setting unit 3301 sets the number of dimensions n of the approximation function f(x, y, t) based on the actual world estimating information (with the example in FIG. 109, features of the approximation function f(x, y, t)) supplied from the actual world estimating unit 102.

The conditions setting unit 3301 sets an integral range in the case of reintegrating the approximation function f(x, y, t) (in the case of calculating output pixel values). Note that an integral range set by the conditions setting unit 3301 needs not to be the width (vertical width and horizontal width) of a pixel or shutter time itself. For example, it becomes possible to determine a specific integral range in the spatial direction as long as the relative size (spatial resolution power) of an output pixel (pixel to be generated from now by the image generating unit 103) as to the spatial size of each pixel of an input image from the sensor 2 (FIG. 89) is known. Similarly, it becomes possible to determine a specific integral range in the temporal direction as long as the relative time (temporal resolution power) of an output pixel value as to the shutter time of the sensor 2 (FIG. 89) is known. Accordingly, the conditions setting unit 3301 can set, for example, a spatial resolution power and temporal resolution power as an integral range.

The features storage unit 3302 temporally stores the features of the approximation function f(x, y, t) sequentially supplied from the actual world estimating unit 102. Subsequently, upon the features storage unit 3302 storing all of the features of the approximation function f(x, y, t), the features storage unit 3302 generates a features table including all of the features of the approximation function f(x, y, t), and supplies this to the output pixel value calculation unit 3304.

Incidentally, upon the right side of the approximation function f(x, y) of the right side of the above Expression (135) being expanded (calculated), the output pixel value M is represented as the following Expression (136).

$$M = \sum_{i=0}^{n} w_i \times k_i(x_s, x_e, y_s, y_e, t_s, t_e) \quad (136)$$

In Expression (136), $K_i(x_s, x_e, y_s, y_e, t_s, t_e)$ represents the integral components of the i-dimensional term. However, $x_s$ represents an integration range start position in the X direction, $x_e$ represents an integration range end position in the X direction, $y_s$ represents an integration range start position in the Y direction, $y_e$ represents an integration range end position in the Y direction, $t_s$ represents an integration range start position in the t direction, and $t_e$ represents an integration range end position in the t direction, respectively.

The integral component calculation unit 3303 calculates the integral components $K_i(x_s, x_e, y_s, y_e, t_s, t_e)$.

Specifically, the integral component calculation unit 3303 calculates the integral components $K_i(x_s, x_e, y_s, y_e, t_s, t_e)$ based on the number of dimensions and the integral range (spatial resolution power or temporal resolution power) set by the conditions setting unit 3301, and the angle θ or movement θ of the data continuity information output from the data continuity detecting unit 101, and supplies the calculated results to the output pixel value calculation unit 3304 as an integral component table.

The output pixel value calculation unit 3304 calculates the right side of the above Expression (136) using the features table supplied from the features storage unit 3302, and the integral component table supplied from the integral component calculation unit 3303, and outputs the calculated result to the outside as the output pixel value M.

Next, description will be made regarding image generating processing (processing in step S103 in FIG. 29) by the image generating unit 103 (FIG. 109) employing the three-dimensional reintegration method with reference to the flowchart in FIG. 110.

For example, let us say that the actual world estimating unit 102 (FIG. 89) has already generated an approximation function f(x, y, t) for approximating the light signals in the actual world 1 (FIG. 89) with a predetermined pixel of an input image as a pixel of interest at the processing in step S102 in FIG. 29 described above.

Also, let us say that the data continuity detecting unit 101 (FIG. 89) has already output the angle θ or movement θ as data continuity information with the same pixel as the actual world estimating unit 102 as a pixel of interest at the processing in step S101 in FIG. 29.

Figure 110:
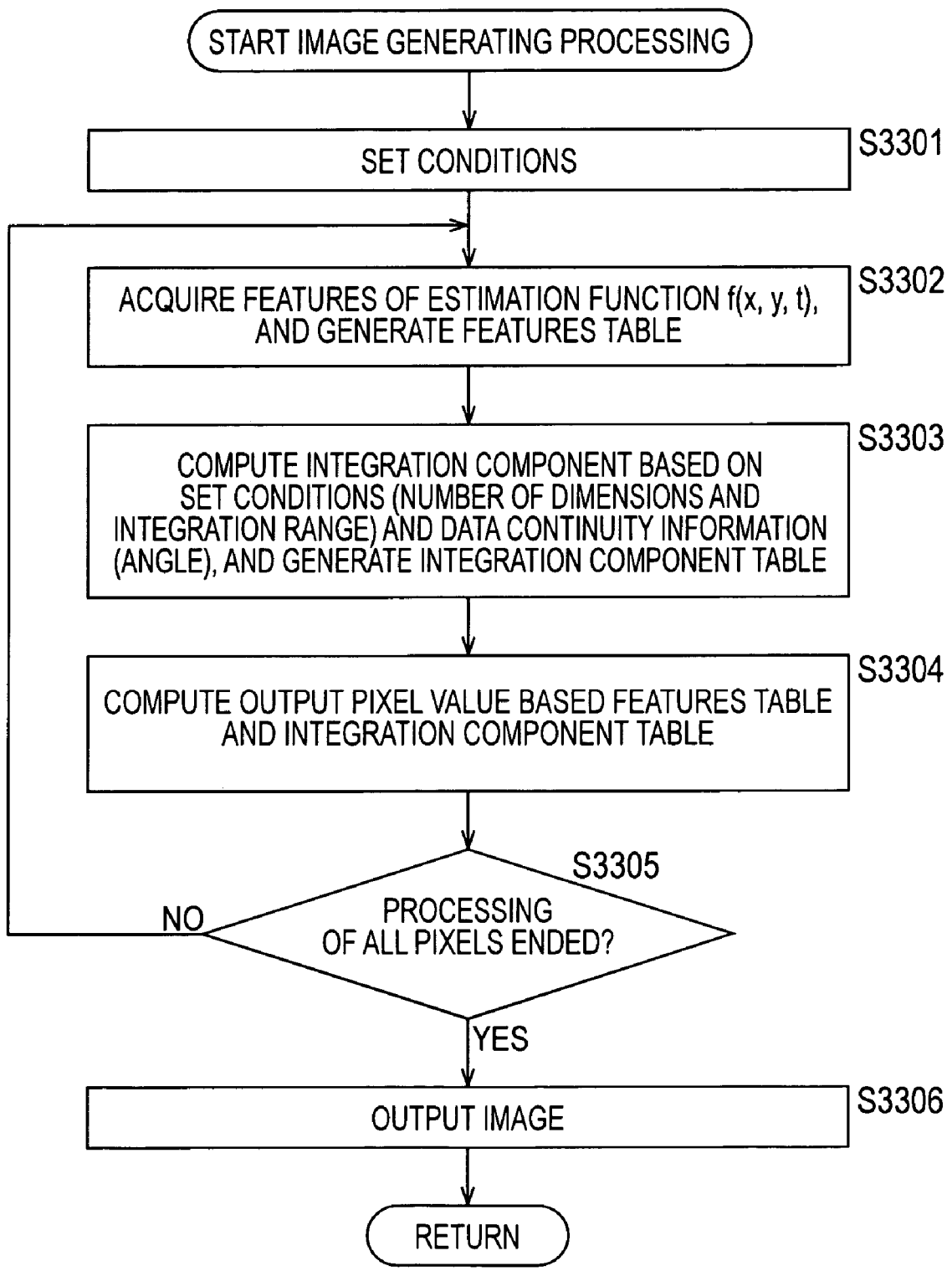
FIG. 110 is a flowchart for describing the image generating processing which the image generating unit of the configuration shown in FIG. 109 executes.

In this case, the conditions setting unit 3301 sets conditions (the number of dimensions and an integral range) at step S3301 in FIG. 110.

In step S3302, the features storage unit 3302 acquires the features $w_i$ of the approximation function f(x, y, t) supplied from the actual world estimating unit 102, and generates a features table.

In step S3303, the integral component calculation unit 3303 calculates integral components based on the conditions (the number of dimensions and an integral range) set by the conditions setting unit 3301, and the data continuity information (angle θ or movement θ) supplied from the data continuity detecting unit 101, and generates an integral component table.

Note that the sequence of the processing in step S3302 and the processing in step S3303 is not restricted to the example in FIG. 110, the processing in step S3303 may be executed first, or the processing in step S3302 and the processing in step S3303 may be executed simultaneously.

Next, in step S3304, the output pixel value calculation unit 3304 calculates each output pixel value based on the features table generated by the features storage unit 3302 at the processing in step S3302, and the integral component table generated by the integral component calculation unit 3303 at the processing in step S3303.

In step S3305, the output pixel value calculation unit 3304 determines regarding whether or not the processing of all the pixels has been completed.

In step S3305, in the event that determination is made that the processing of all the pixels has not been completed, the processing returns to step S3302, wherein the subsequent processing is repeatedly performed. That is to say, the pixels that have not become a pixel of interest are sequentially taken as a pixel of interest, and the processing in step S3302 through S3304 is repeatedly performed.

In the event that the processing of all the pixels has been completed (in step S3305, in the event that determination is made that the processing of all the pixels has been completed), the output pixel value calculation unit 3304 outputs the image in step S3306. Then, the image generating processing ends.

Thus, in the above Expression (135), an integral range may be set arbitrarily, and accordingly, with the three-dimensional reintegration method, it becomes possible to create a pixel having an arbitrary powered resolution as to the original pixel (pixel of an input image from the sensor 2 (FIG. 89)) without deterioration by appropriately changing this integral range.

That is to say, with the three-dimensional reintegration method, appropriately changing an integral range in the temporal direction enables temporal resolution to be created. Also, appropriately changing an integral range in the spatial direction enables spatial resolution to be created. Further, appropriately changing each integral range in the temporal direction and in the spatial direction enables both temporal resolution and spatial resolution to be created.

Specifically, with the three-dimensional reintegration method, approximation is not necessary when degenerating three dimension to two dimension or one dimension, thereby enabling high-precision processing. Also, movement in an oblique direction may be processed without degenerating to two dimension. Further, no degenerating to two dimension enables process at each dimension. For example, with the two-dimensional reintegration method, in the event of degenerating in the spatial directions (X direction and Y direction), process in the t direction serving as the temporal direction cannot be performed. On the other hand, with the thee-dimensional reintegration method, any process in the time-space directions may be performed.

Note that as described above, creation of any one of temporal resolution and spatial resolution may be performed even with the one-dimensional reintegration method, but creation of both temporal resolution and spatial resolution cannot be performed with the one-dimensional reintegration method in theory, which becomes possible only by performing two-dimensional or more reintegration. That is to say, creation of both temporal resolution and spatial resolution becomes possible only by employing the above two-dimensional reintegration method and the three-dimensional reintegration method.

Also, the three-dimensional reintegration method takes not one-dimensional and two-dimensional but three-dimensional integration effects into consideration, and accordingly, an image more similar to the light signal in the actual world 1 (FIG. 89) may be created.

Next, with the signal processing device 4 shown in FIG. 3, data continuity is detected at the data continuity detecting unit 101, and estimation of actual world 1 signal waveforms, i.e., for example, an approximation function approximating the X-cross-section waveform F(x), is obtained at the actual world estimating unit 102, based on the continuity.

Thus, waveform estimation of actual world 1 signals is performed at the signal processing device 4 based on continuity, so in the event that the continuity detected by the data continuity detecting unit 101 is incorrect or detection precision thereof is poor, the estimation precision of the waveform of the actual world 1 signals is also poor.

Also, the signal processing device 4 performs signal processing based on continuity which actual world 1 signals, which is an image in this case, for example, have, signal processing with better precision than signal processing with other signal processing devices can be performed for the parts of the actual world 1 signals where continuity exists, and consequently, an image closer to the image corresponding to the actual world 1 signals can be output.

However, the signal processing device 4 cannot perform signal processing for parts of the actual world 1 signals where no clear continuity exists at the same level of precision as four parts were continuity does exist, since the signal processing is being performed based on continuity, and consequently, an image including error with regard to the image corresponding to the actual world 1 signals is output.

Accordingly, in order to obtain an image closer to the image corresponding to the actual world 1 signals with the signal processing device 4, processing regions where signal processing with the signal processing device 4 is to be performed, precision of the continuity used with the signal processing device 4, and so forth, are issues.

Here, FIG. 111 illustrates the configuration example of another embodiment of the signal processing device 4.

In FIG. 111, the signal processing device 4 comprises a processing region setting unit 10001, a continuity setting unit 10002, an actual world estimating unit 10003, an image generating unit 10004, an image display unit 10005, and a user I/F (Interface) 10006.

With the signal processing device 4 of which the configuration is shown in FIG. 111, image data (input image) which is an example of the data 3, is input from the sensor 2 (FIG. 1), and the input image is supplied to the processing region setting unit 10001, the continuity setting unit 10002, the actual world estimating unit 10003, the image generating unit 10004, and the image display unit 10005.

The processing region setting unit 1001 sets the processing region for the input image, and supplies processing region information identifying the processing region to the continuity setting unit 10002, the actual world estimating unit 10003, and the image generating unit 10004.

The continuity setting unit 10002 recognizes the processing region in the input image from the processing region information supplied from the processing regions setting unit 10001, sets the continuity of the actual world 1 signals lost from the image data at that processing region, and supplies continuity information representing that continuity to the actual world estimating unit 10003 and the image generating unit 10004.

The actual world estimating unit 10003 is configured of a model generating unit 10011, equation generating unit 10012, and actual world waveform estimating unit 10013, and estimates the actual world 1 signals from the image data within the processing region, according to the continuity of the corresponding actual world 1 signals.

That is to say, the model generating unit 10011 recognizes the processing region in the input image from the processing region information supplied from the processing region setting unit 10001, generates a function serving as a model which models the relation between the pixel values of the pixels within the processing region and the actual world 1 signals, according to the pixels making up the processing region and the continuity of the actual world 1 signals corresponding to the image data in the processing region, and supplies this to the equation generating unit 10012.

The question generating unit 10012 recognizes the processing region in the input image from the processing region information supplied from the processing regions setting unit 10001. Further, the equation generating unit 10012 substitutes the pixel values of each of the pixels making up the processing region into the function serving as a model that has been supplied from the model generating unit 10011, thereby generating an equation, which is supplied to the actual world waveform estimating unit 10013.

The actual world waveform estimating unit 10013 estimates the waveform of the actual world 1 signals, by computing the equation supplied from the equation generating unit 10012. That is to say, the actual world waveform estimating unit 10013 obtains an approximation function approximating the actual world 1 signals by solving the equation supplied from the equation generating unit 10012, and supplies the approximation function to the image generating unit 10004, as estimation results of the waveform of the actual world 1 signals. Note that approximation function approximating the actual world 1 signals include functions with constant function values, regardless of argument value.

The image generating unit 10004 generates signals closer approximating the actual world 1 signals, based on the approximation function representing the waveform of the actual world 1 signals estimated at the actual world estimating unit 10003, and the continuity information supplied from the continuity setting unit 10002. That is to say, the image generating unit 10004 recognizes the processing region in the input image from the processing region information supplied from the processing region setting unit 10001, and generates image data closer approximating the image corresponding to the actual world 1 signals with regard to the processing region, based on the approximation function supplied from (the actual world waveform estimating unit 10013) of the actual world estimating unit 10003, and the continuity information supplied from the continuity setting unit 10002.

Further, the image generating unit 10004 synthesizes the input image and image data generated based on the approximation function (hereafter referred to as approximation image as appropriate), generates an image wherein the portion of the processing region of the input image has been substituted with the approximation image, and supplies the image as an output image to the image display unit 10005.

The image display unit 10005 is configured of a CRT (Cathode Ray Tube) or an LCD (Liquid Crystal Display), and displays input images, or output images supplied from the image generating unit 10004.

Note that the image display unit 10005 can be configured of single or multiple CRTs or LCDs. In the event of configuring the image display unit 10005 with a single CRT or LCD, an arrangement maybe made wherein the screen of the single CRT or LCD is divided into multiple screens, with input images displayed on one screen and output images displayed on another screen. Further, in the event of configuring the image display unit 10005 of multiple CRTs or LCDs, an arrangement may be made wherein input images are displayed on one CRT or LCD, and outputs images are displayed on another CRT or LCD.

Also, the image display unit 10005 performs display of various types in accordance with the output of the user I/F 10006. That is to say, the image display unit 10005 displays a cursor, for example, and in the event that the user operates the user I/F 10006 so as to move the cursor, the cursor is moved in accordance with the operations thereof. Also, in the event that the user operates the user I/F 10006 so as to select a predetermined range, the image display unit 10005 displays a frame surrounding the range selected on the screen in accordance with the operations thereof.

The user I/F 10006 is operated by the user, and in accordance with the user operations, supplies information relating to at least one of, for example, processing range, continuity, and real world signals, to the processing region setting unit 10001, continuity setting unit 10002, or actual world estimating unit 10003.

That is to say, the user views an input image or output image displayed on the image display unit 10005, and operates the user I/F 10006 so as to provide input with regard to the input image or output image. The user I/F 10006 is operated by the user, and in accordance with the user operations, supplies information relating to processing range, continuity, or real world signals, to the processing region setting unit 10001, continuity setting unit 10002, or actual world estimating unit 10003, as assisting information for assisting the processing of the processing region setting unit 10001, continuity setting unit 10002, or actual world estimating unit 10003.

Upon assisting information being supplied from the user I/F 10006, the processing region setting unit 10001, continuity setting unit 10002, or actual world estimating unit 10003 each perform setting of processing region, setting of continuity, or estimation of actual world 1 signals, based on the assisting information.

Note however, that the processing region setting unit 10001, continuity setting unit 10002, or actual world estimating unit 10003, can each perform the setting of processing region, setting of continuity, or estimation of actual world 1 signals, even without using the assisting information, i.e., even without the user operating the user I/F 10006.

Specifically, with the processing region setting unit 10001, processing can be performed in the same way as with the data continuity detecting unit 101 shown in FIG. 3, as described with reference to FIG. 30 to FIG. 48, wherein a continuity region is detected from the input image, and a rectangular (oblong) region surrounding the continuity region is set as a processing region.

Also, with the continuity setting unit 10002, processing can be performed in the same way as with the data continuity detecting unit 101 shown in FIG. 3, as described with reference to FIG. 49 through FIG. 57, wherein data continuity is detected from the input image, and the continuity of the corresponding actual world 1 signals is set based on the continuity of that data, i.e., for example, the data continuity is set as continuity of the actual world 1 signals with no change.

Further, with the actual world estimating unit 10003, processing may be performed in the same way as with the actual world estimating unit 102 shown in FIG. 3, as described with reference to FIG. 58 through FIG. 88, where actual world 1 signals are estimated from the image data of the processing region set by the processing region setting-unit 10001, corresponding to the continuity set by the continuity setting unit 10002. Note that while the data continuity has been used for estimating actual world 1 signals that the actual world estimating unit 102 in FIG. 3, an arrangement may be made wherein the continuity of corresponding actual world 1 signals is used instead of the data continuity for estimating actual world 1 signals.

Figure 112:
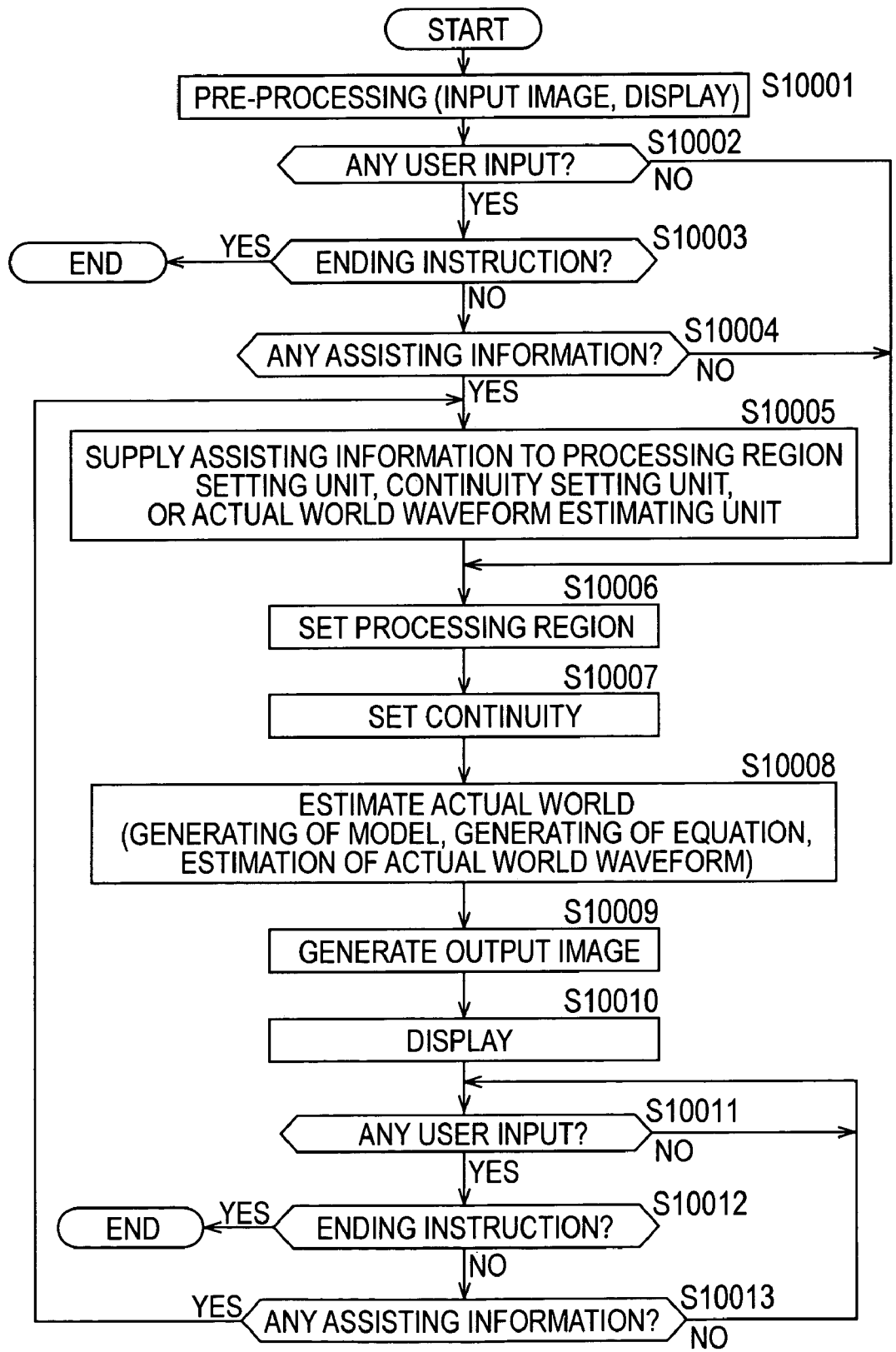
FIG. 112 is a flowchart for describing the processing of the signal processing device 4 shown in FIG. 111.

Next, the processing of the signal processing device 4 shown in FIG. 111 will be described with reference to the flowchart in FIG. 112.

First, in step S10001, the signal processing device 4 performs pre-processing, and the flow proceeds to step S10002. That is to say, the signal processing device 4 supplies one frame or one field, for example, of the input image, supplied from the sensor 2 (FIG. 1) as data 3, to the processing region setting unit 10001, continuity setting unit 10002, actual world estimating unit 10003, image generating unit 10004, and image display unit 10005. Further, the signal processing unit 4 causes the image display unit 10005 to display the input image.

In step S10002, the user I/F 10006 determines whether or not there has been some sort of user input, by the user operating the user I/F 10006. In step S10002, in the event that determination is made that there is no user input, i.e., in the event that the user has made no operations, step S10003 through step S10005 are skipped, and the flow proceeds to step S10006.

Also, in the event that determination is made in step S10002 that there has been user input, i.e., in the event that the user has viewed the input image displayed on the image display unit 10005 and operated the user I/F 10006, thereby making user input indicating some sort of instruction or information, the flow proceeds to step S10003, where the user I/F 10006 determines whether or not the user input is ending instructions for instructing ending of the processing of the signal processing device 4.

In the event that determination is made in step S10003 that the user input is ending instructions, the signal processing device for ends processing.

Also, in the event that determination is made in step S10003 that the user input is not ending instructions, the flow proceeds to step S10004, where the user I/F 10006 determines whether or not the user input is assisting information. In the event that determination is made in step S10004 that the user input is not assisting information, the flow skips step S10005, and proceeds to step S10006.

Also, in the event that determination is made in step S10004 that the user input is assisting information, the flow proceeds to step S10005, where the user I/F 10006 supplies the assisting information to the processing region setting unit 10001, continuity setting unit 10002, or actual world estimating unit 10006, and the flow proceeds to step S10006.

In step S10006, the processing region setting unit 10001 sets the processing region based on the input image, and supplies the processing region information identifying the processing region to the continuity setting unit 10002, actual world estimating unit 10003, and image generating unit 10004, and the flow proceeds to step S10007. Now, in the event that assisting information has been supplied from the user I/F 10006 in that immediately-preceding step S10005, the processing region setting unit 10001 performs setting of the processing region using that assisting information.

In step S10007, the continuity setting unit 10002 recognizes the processing region in the input image, from the processing region information supplied from the processing region setting unit 10001. Further, the continuity setting unit 10002 sets continuity of the actual world 1 signals that has been lost in the image data of the processing region, and supplies continuity information indicating the continuity thereof to the actual world estimating unit 10003, and the flow proceeds to step S10008. Now, in the event that assisting information has been supplied from the user I/F 10006 in that immediately-preceding step S10005, the continuity setting unit 10002 performs setting of continuity using that assisting information.

In step S10008, the actual world estimating unit 10003 estimates actual world 1 signals regarding to the image data with in the processing region of the input image, according to the continuity of the corresponding actual world 1 signals.

That is to say, at the actual world estimating unit 10003, the model generating unit 10011 recognizes the processing region in the input image, from the processing region information supplied from the processing region setting unit 10001, and also recognizes continuity of the actual world 1 signals corresponding to the image data in the processing region, from the continuity information supplied from the continuity setting unit 10002. Further the model generating unit 10011 generates a function serving as a model modeling the relation between the pixel values of each of the pixels within the processing region and the actual world 1 signals, according to the pixels making up the processing region in the input image, and the continuity of actual world 1 signals corresponding to the image data of the processing region, and supplies this to the equation generating unit 10012.

The equation generating unit 10012 recognizes the processing region in the input image from the processing region information supplied from the processing region setting unit 10001, and substitutes the pixel values of each of the pixels of the input image making up the processing region into the function serving as the model which is supplied from the model generating unit 10011, thereby generating an equation for obtaining an approximation function approximating the actual world 1 signals, which is supplied to the actual world waveform estimating unit 10013.

The actual world waveform estimating unit 10013 estimates the waveform of the actual world 1 signals by computing the equation supplied from the equation generating unit 10012. That is, the actual world waveform estimating unit 10013 obtains the approximation function serving as a model modeling the actual world 1 signals by solving the equation supplied from the equation generating unit 10012, and supplies the approximation function to the image generating unit 10004 as estimation results of the waveform of the actual world 1 signals.

Note that with the actual world estimating unit 10003, in the event that assisting information has been supplied from the user I/F 10006 in the immediately-preceding step S10005, at the model generating unit 10011 and equation generating unit 10012, processing is performed using that assisting information.

Following processing of step S10008, the flow proceeds to step S10009, where the image generating unit 10004 generates signals closer approximating the actual world 1 signals based on the approximation function approximating the waveform of the actual world 1 signals supplied from (the actual world waveform estimating unit 10013 of) the actual world estimating unit 10003. That is to say, the image generating unit 10004 recognizes the processing region in the input image from the processing region information supplied from the processing region setting unit 10001, and with regard to this processing region, generates an approximation image which is image data closer approximating the image corresponding to the actual world 1 signals, based on the approximation function supplied from the actual world estimating unit 10003. Further the image generating unit 10004 generates, as an output image, an image wherein the portion of the processing region of the input image has been replaced with the approximation image, and supplies this to the image display 10005, and the flow proceeds from step S10009 to step S10010.

In step S10010, the image display unit 10005 displays the output image supplied from the image generating unit 10004 instead of the input image displayed in step S10001, or along with the input image, and the flow proceeds to step S10011.

In step S10011, the user I/F 10006 determines whether or not there has been user input of some sort by the user operating the user I/F 10006, in the same way as with step S10002, and in the event that determination is made that there has been no user input, i.e., in the event that the user has made no operations, the flow returns to step S10011, and awaits user input.

Also, in the event that determination is made in step S10011 that there has been user input, i.e., in the event that the user has viewed the input image or output image displayed on the image display unit 10005 and operated the user I/F 10006, thereby making some sort of user input indicating instruction or information, the flow proceeds to step S10012, where the user I/F 10006 determines whether or not the user input is ending instructions instructing ending of the processing of the signal processing device 4.

In the event that determination is made in step S10012 that the user input is ending instructions, the signal processing device 4 ends processing.

Also, in the event that determination is made in step S10012 that the user input is not ending instructions, the flow proceeds to step S10013, where the user I/F 10006 determines whether or not the user input is assisting information. In the event that determination is made in step S10013 that the user input is not assisting information, the flow returns to step S10011, and the same processing is repeated thereafter.

Also, in step S10013, in the event that determination is made that the user input is assisting information, the flow returns to step S10005, and as described above, the user I/F 10006 supplies the assisting information to the processing region setting unit 10001, the continuity setting unit 10002, or the actual world estimating unit 10006. The flow then proceeds from step S10005 to step S10006, and hereafter the same processing is repeated.

As described above, with the signal processing device 4 shown in FIG. 111, assisting information for assisting the processing region setting unit 10001, the continuity setting unit 10002, or the actual world estimating unit 10006, is supplied from the user I/F 10006 to the processing region setting unit 10001, the continuity setting unit 10002, or the actual world estimating unit 10003 and processing region setting, continuity setting, or actual world 1 signals estimation is performed at the processing region setting unit 10001, the continuity setting unit 10002, or the actual world estimating unit 10003 based on the assisting information from the user I/F 10006, thereby improving the processing precision of the processing region setting unit 10001, the continuity setting unit 10002, or the actual world estimating unit 10003, and enabling, for example, a high-quality output image meeting user preferences.

Next, various types of application examples of the signal processing device 4 shown in FIG. 111 will be described.

Figure 113:
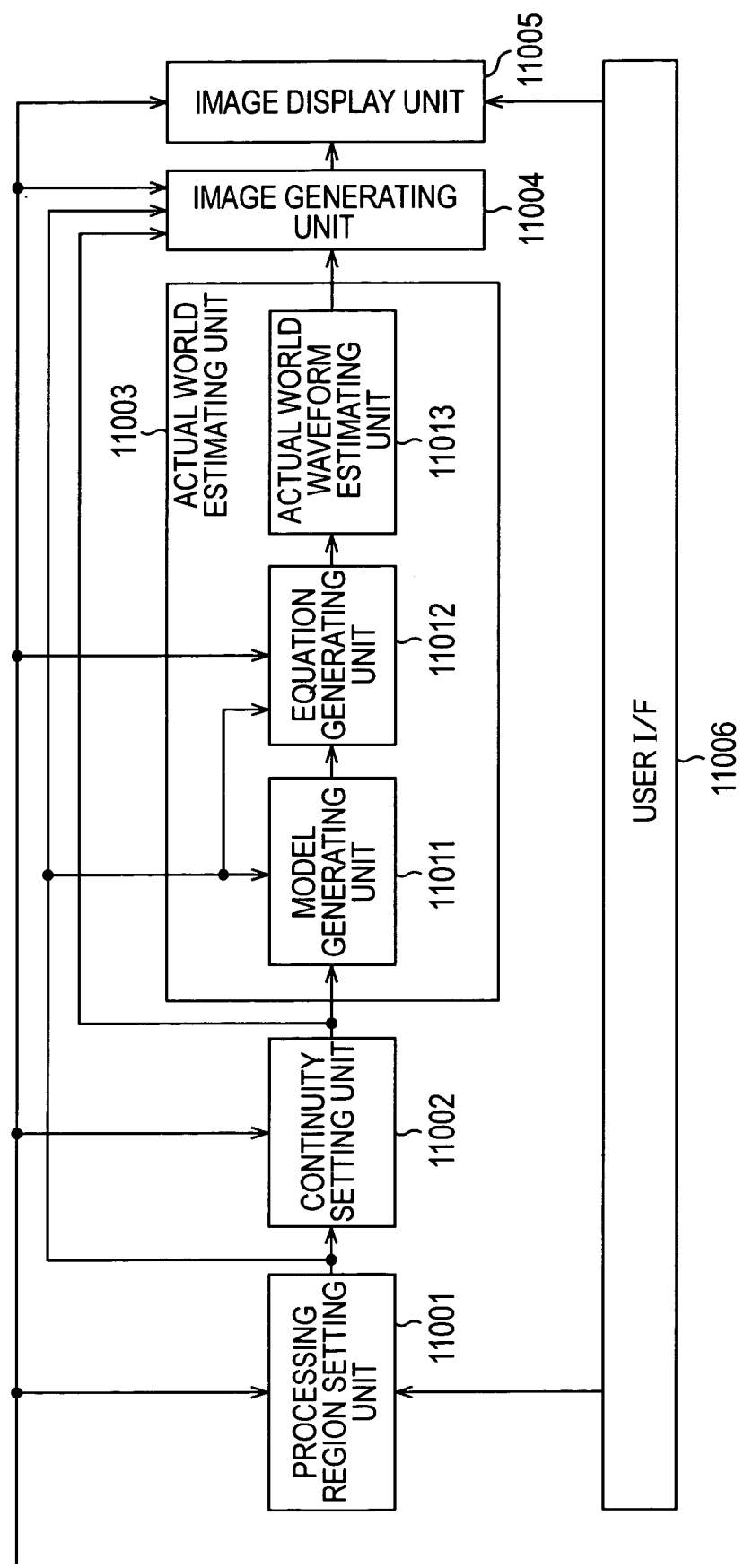
FIG. 113 is a block diagram illustrating a configuration example of an applied embodiment of the signal processing device 4 shown in FIG. 111.
Figure 114:
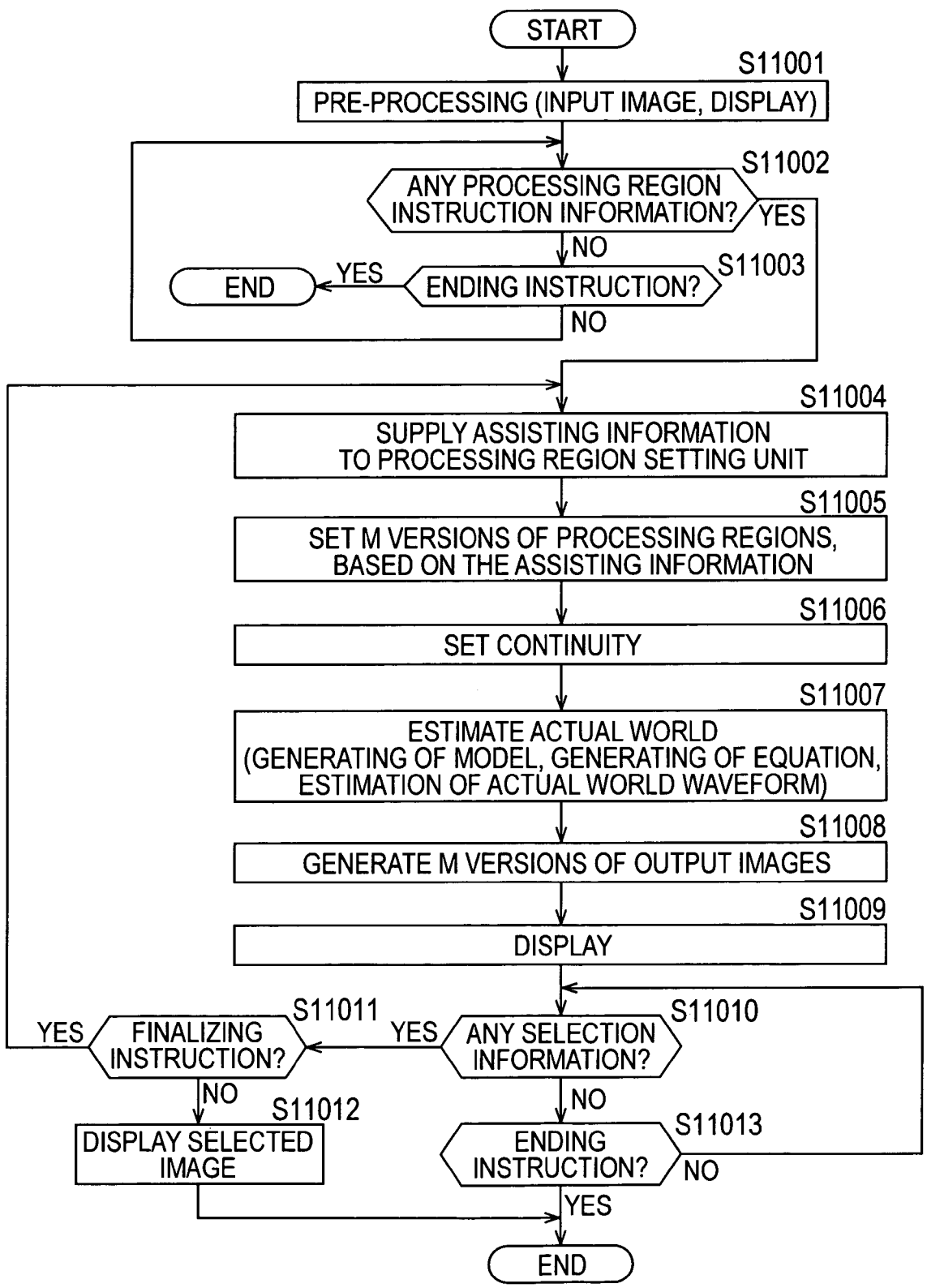
FIG. 114 is a flowchart for describing the processing of the signal processing device 4 shown in FIG. 113.

FIG. 113 illustrates a configuration example of an embodiment of an application example of the signal processing device 4 shown in FIG. 111.

In FIG. 113, the processing region setting unit 11001, the continuity setting unit 11002, the actual world estimating unit 11003, image generating unit 11004, image display unit 11005, and user I/F 11006, each correspond to the processing region setting unit 10001, the continuity setting unit 10002, the actual world estimating unit 10003, image generating unit 10004, image display unit 10005, and user I/F 10006 shown in FIG. 111, and basically perform the same processing as the processing region setting unit 10001, the continuity setting unit 10002, the actual world estimating unit 10003, image generating unit 10004, image display unit 10005, and user I/F 10006. Further, in FIG. 113, the actual world estimating unit 11003 comprises a model generating unit 11011, an equation generating unit 11012, and actual world waveform estimating unit 11013. The model generating unit 11011, equation generating unit 11012, and actual world waveform estimating unit 11013 correspond to each of the model generating unit 10011, equation generating unit 10012, and actual world waveform estimating unit 10013 in FIG. 111, and basically perform the same functions as each of the model generating unit 10011, equation generating unit 10012, and actual world waveform estimating unit 10013.

Note however, that in FIG. 113, the assisting information which the user I/F 11006 outputs by the user operating the user I/F 11006, is supplied only to the processing region setting unit 11001.

That is to say, in FIG. 113, the user can instruct the region to be taken as the processing region with regard to the image displayed on the image display unit 11005, by operating the user I/F 11006, and upon the user performing operations to instruct the processing region, the user I/F 11006 supplies processing region instruction Information representing the processing region to be taken as the region specified by the operation to the processing region setting unit 11001 as assisting information. Further, in FIG. 113, multiple output images are displayed on the image display unit 11005, as described later, and an output image displayed on the image display unit 11005 can be selected by the user operating the user I/F 11006, and upon the user making an operation to select an output image, the user I/F 11006 supplies selection information representing the output image selected by the operation to the processing region setting unit 11001, as assisting information.

Now, examples of the method for instructing the processing region by operating the user I/F 11006 include, for example, the method by instructing with the rectangle surrounding the processing region, a method for instructing by trimming (trim) the processing region, a method for instructing by pointing 1 or more arbitrary points within the processing region, and so forth; here, the user instructs the processing region by pointing one arbitrary point in the processing region, for example, by operating the user I/F 11006. In this case, the user I/F 11006 supplies coordinates on the image of that point, for example, as information representing the point where the user pointed, to the processing region setting unit 11001, as processing region instructing information.

Next, the signal processing device 4 shown in FIG. 113 will be described with reference to the flowchart shown in 114.

First, in step S11001, the signal processing device 4 performs pre-processing, and the flow proceeds to step S11002. That is to say, the signal processing device 4 supplies one frame or one field, for example, of the input image, supplied from the sensor 2 (FIG. 1) as data 3, to the processing region setting unit 11001, continuity setting unit 11002, actual world estimating unit 11003, image generating unit 11004, and image display unit 11005. Further, the signal processing unit 4 causes the image display unit 11005 to display the input image.

In step S11002, the user I/F 11006 determines whether or not there has been some sort of user input of precession region instruction information, by the user operating the user I/F 11006. In step S11002, in the event that determination is made that there is no user input of precession region instruction information, the flow proceeds to step S11003, where the user I/F 11006 determines whether or not there has been input of ending instructions instructing ending of the processing of the signal processing device 4, by the user operating the user I/F 11006.

In the event that determination is made that there has been input of ending instructions in step S11003, that is to say, for example, in the event that the user who has viewed the input image displayed on the image display unit 11005, operates the user I/F 11006 so as to end the processing of the signal processing device 4 with no need for performing signal processing with regard to the input image, since the user did not find the image quality of the input image unsatisfactory, the processing ends.

Also, in the event that determination is made in step S11003 that there has been no input of ending instructions, the flow returns to step S11002, and hereafter the same processing is repeated.

On the other hand, in the event that determination is made in step S11002, that there has been input of processing region instructing information, that is to say, in the event that the user who has viewed the input image displayed on the image display unit 11005 and found the image quality of the input image unsatisfactory, and therefore operated the user I/F 11006 so as to point the unsatisfactory portion, the flow proceeds to step S11004, where the user I/F 11006 supplies region instructing information representing the point which the user has pointed by operating the user I/F 11006 to the processing region setting unit 11001, as assisting information, and the flow proceeds to step S11005.

In step S11005, the processing region setting unit 11001 sets M, which is multiple, versions of processing region, and supplies to the continuity setting unit 11002, the actual world estimating unit 11003, and the image generating unit 11004, M versions of processing region information representing the M versions of processing regions, and the flow proceeds to step S11006 based on the region instruction information as assisting information supplied from the user I/F 10006. Now, in the event that the processing region setting unit 1101 has been supplied with assisting information from the user I/F 11006 in the immediately-preceding step S11004, setting of the processing region is performed using that assisting information.

In step S11006, the continuity setting unit 11002 recognizes M versions of processing regions in the input image, from the M versions of processing region information supplied from the processing region setting unit 11001. Further, the continuity setting unit 11002 sets the continuity of the actual world 1 signals lost in each of the M versions of processing region image data, and supplies continuity information representing the continuity for the M versions of processing regions to the actual world estimating unit 11003, and the flow proceeds to step S11007.

In step S11007, the actual world estimating unit 11003 estimates the actual world 1 signals with regard to the image data within the processing regions of the input image, according to the continuity of the corresponding actual world 1 signals.

That is to say, at the actual world estimating unit 11003, the model generating unit 11011 recognizes the M versions of processing regions in the input image from the M versions of processing region information supplied from the processing region setting unit 11001, and recognizes the continuity of the actual world 1 signals corresponding to each of the M versions of processing region image data, based on the continuity information for each of the M versions of processing region supplied from the continuity setting unit 11002. Further, the model generating unit 11011 generates a function serving as a model modeling the relation between the pixel values of each of the pixels within the processing region, corresponding to the pixels making up each of the processing regions and the continuity of the actual world 1 signals corresponding to the image data of the processing region for each of the M versions of processing regions in the input image, and the actual world 1 signals, and thereby supplies M versions of functions obtained with regard to each of the M versions of processing regions, to the equation generating unit 11012.

The equation generating unit 11012 recognizes the M versions of processing regions in the input image from the M versions of processing region information supplied from the processing region setting unit 11001, and for each of the M versions of processing regions, substitutes pixel values of pixels necessary to make up the input image into the function serving as a model which has been supplied from the model generating unit 11011, thereby generating an equation for obtaining an approximation function approximating the actual world 1 signals, which is then supplied to the actual world waveform estimating unit 11013.

The actual world waveform estimating unit 11013 solves the equations for the M versions a processing region supplied from the equation generating unit 11012, thereby estimating waveforms of the actual world 1 signals for each of the M versions of processing regions, i.e., obtains approximation function serving as models modeling a the actual world 1 signals, and supplies the approximation functions for each of the M versions of processing regions, to the image generating unit 11004.

Following the processing in step S11007, the flow proceeds to step S11008, where the image generating unit 11004 generates signals closer approximating the actual world 1 signals, based on the approximation functions regarding each of the M versions of processing region supplied from (the actual world waveform estimating unit 11013 of) the actual world estimating unit 11003. That is to say, the image generating unit 11004 recognizes the M versions of processing regions in the input image from the M versions of processing region information supplied from the processing region setting unit 11001, and generates an approximation image which is the image data closer approximating the actual world 1 signals, based on the approximation functions regarding the corresponding processing regions supplied from the actual world estimating unit 11003 for each of the M versions of processing regions.

Further the image generating unit 11004 generates, as output images, M versions of images wherein the M versions of processing region portions in the input image have been replaced with the approximation images obtained regarding the corresponding processing regions, which are then supplied to the image display unit 11005, and the flow proceeds from step S11008 to step S11009.

In step S11009, the image display unit 11005 displays the M versions of output image supplied from the image generating unit 11004 instead of the input image displayed in step S11001, or along with the input image, and the flow proceeds to step S11010.

In step S11010, the user I/F 11006 determines whether or not there has been input of selection information by the user operating the user I/F 11006. That is to say, the M versions of output images are displayed on the image display unit 11005 in step S11009, and determination is made in step S11010 regarding whether or not the user, who has viewed the M versions of output images has input selection information for selecting an image with desired quality or an image having closer quality to the desired image from the M versions of output images, by operating the user I/F 11006.

In the event that determination is made in step S11010 that there has been no input of selection information, the flow proceeds to step S11013, and as with the case in step S11003, determination is made by the user I/F 11006 regarding whether there has been input of ending instructions.

In the event that determination is made in step S11010 that there has been input of ending instructions, the signal processing device 4 ends processing.

Also, in the event that determination is made that there has been no input of ending instructions in step S11013, the flow returns to step S11010, and hereafter the same processing is repeated.

On the other hand, in the event that determination is made in step S11010 that there has been input of selection information, i.e., in the event that the user, who has viewed the M versions of output images displayed on the image display unit 11005 has selected a desired image or an image closer to the desired image from the M versions of output images, the flow proceeds to step S11011, where the user I/F 11006 determines whether or not there has been input of finalizing instructions for finalizing the output image which the user has selected as a final output image, by the user operating the user I/F 11006.

In the event that determination is made in step S11011 that there has been input of finalizing instructions, the flow proceeds to step S11012, where the image display unit 11005 displays the output image which the user has selected on the entire screen thereof, for example, and the processing ends.

Also, in the event that determination is made that there has been no input of finalizing instructions in step S11011, i.e., in the event that the user has found the image quality of the selected output image to be unsatisfactory, and has not made input of finalizing instructions in order to perform processing once again, the flow returns to step S11004, where the user I/F 11006 supplies selection information representing the output image which the user has selected to the processing region setting unit 11001, as the assisting information, and the flow proceeds to step S11005.

In step S11005, the processing region setting unit 11001 newly sets M, which is multiple, processing regions, based on the selection information serving as the assisting information supplied from the user I/F 11006. That is to say, in this case, in step S11005, the processing region setting unit 11001 newly sets M versions of processing regions, based on the processing regions of the input image used for obtaining the output image represented by the selection information serving as assisting information that has been supplied from the user I/F 11006. Further, in step S11005, the processing region setting unit 11001 supplies the M versions of processing region information representing the new M versions of processing regions, to the continuity setting unit 11002, the actual world estimating unit 1103, and the image generating unit 11004. The flow then proceeds from step S11005 to step S11006, where the same processing is repeated hereafter.

That is to say, accordingly, this processing of steps S11004 through S110013 is repeated, ultimately a processing region is set whereby an output image of image quality which the user desires is obtained, and consequently, the user obtains an output image of the desired image quality.

As described above, with the signal processing device 4 shown in FIG. 113, M versions of the output images which are processing results of the input image are presented to the user, for the user to select the desired one from the M versions of output images, and processing is performed again based upon the selection results, so high-quality output images, meeting the user's preferences, can be easily obtained. That is to say, the signal processing device 4 presents the user with M versions of output images which are processing results of the input image. On the other hand, the user recognizes and judges the image quality of each of the M versions of output images, and gives feedback to the signal processing device 4. The signal processing device 4 processes the input image again based upon the feedback from the user, and hereafter the same processing is repeated. Accordingly, high-quality output images, meeting user preferences, can be easily obtained.

Now, it can be said that the signal processing device 4 receiving feedback from the user and performing processing on the input image means that the signal processing device 4 is performing processing in cooperation with the user.

Figure 115:
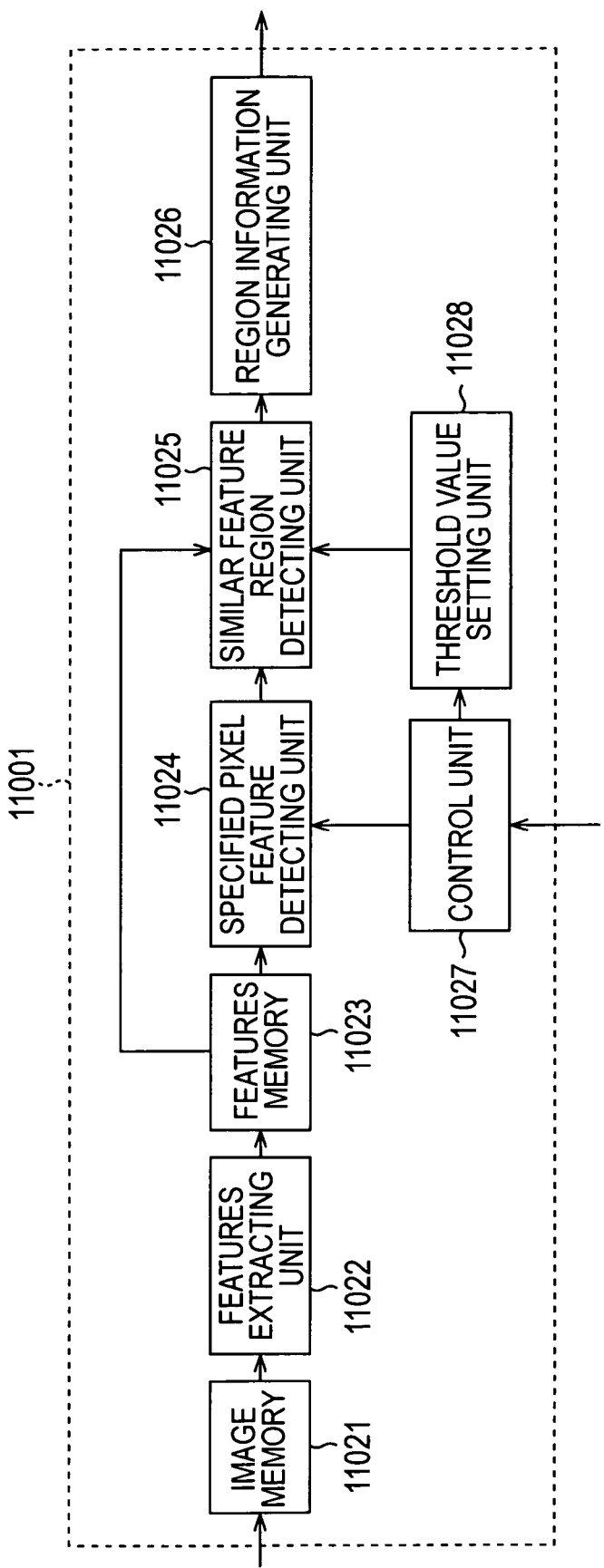
FIG. 115 is a block diagram illustrating a configuration example of a processing region setting unit 11001.

Next, FIG. 115 illustrates a detailed configuration example of the processing region setting unit 11001 shown in FIG. 113.

The input image is supplied to image memory 11021, and the image memory 11021 stores the input image supplied thereto. A features extracting unit 11022 extracts the features of each of the pixels making up the input image stored in the image memory 11021, and supplies this to features memory 11023.

Note that the features extracting unit 11022 is capable of extracting, as pixel features, for example, color component, spatial activity representing the presence or absence of an edge or the steepness (or smoothness) in change between pixel values, the absolute value of difference in spatial and activity between the horizontal direction and vertical direction, combinations of multiple types of features, and so forth.

Now, in the event that a certain object (object), for example, is moving in the horizontal direction in an input image, there is movement blurring in the horizontal direction at the portion where the object is displayed. At pixels where such movement blurring in the horizontal direction occurs, the spatial activity in the horizontal direction is greater in comparison with the spatial activity in the vertical direction. Accordingly, in this case, in the event that the absolute value of difference of spatial activity between the horizontal direction and vertical direction is employed as a pixel features, the features value is great.

The features memory 11023 stores the features for each pixel making up the input image supplied from the features extracting unit 11022.

A specified pixel features detecting unit 11024 detects, from the features stored in the features memory 11023, the features of a pixel at a point represented by processing region specifying information supplied from the user I/F 11006 (FIG. 113) (hereafter referred to as specified pixel as appropriate) under control of a control unit 11027, and supplies this to approximation features region detecting unit 11025 as specified pixel features.

The approximation features region detecting unit 11025 detects M versions of input image regions made up of pixels having a features approximating the specified pixel features supplied from the specified pixel features detecting unit 11024, and supplies these to the region information generating unit 11026 as processing regions.

That is to say, the approximation features region detecting unit 11025 obtains the features of each of the pixels making up the input image stored in the features memory 11023, and the distance to the specified pixels features supplied from specified pixel features detecting unit 11024, using a predetermined identifying function. Further, the approximation features region detecting unit 11025 detects, from the pixels making up the input image, pixels having features wherein the distance to the specified pixels features supplied from the specified pixel features detecting unit 11024 is equal to or within a threshold value (hereafter referred to as approximation feature pixel as appropriate), and detects, for example, a smallest rectangular region surrounding the approximation feature pixels, as an approximation feature region.

The approximation features region detecting unit 11025 detects an approximation feature region for each of the M threshold value supplied from a later-described a threshold value setting unit 11028, and supplies the M versions of approximation feature regions obtained as the result thereof, to the region information generating unit 11026 as processing regions.

The region information generating unit 11026 generates M versions of processing region information representing the M versions of processing regions supplied from the approximation features region detecting unit 11025, and outputs.

A control unit 11027 receives processing region instruction information or selection information serving as assisting information supplied from the user I/F 11006 (FIG. 113), and controls the specified pixel feature detecting unit 11024 or the threshold value setting unit 11028, according to this processing region instruction information or selection information.

The threshold value setting unit 11028 sets M threshold values used by the approximation features region detecting unit 11025, under control of the control unit 11027, and supplies these to the approximation features region detecting unit 11025.

Figure 116:
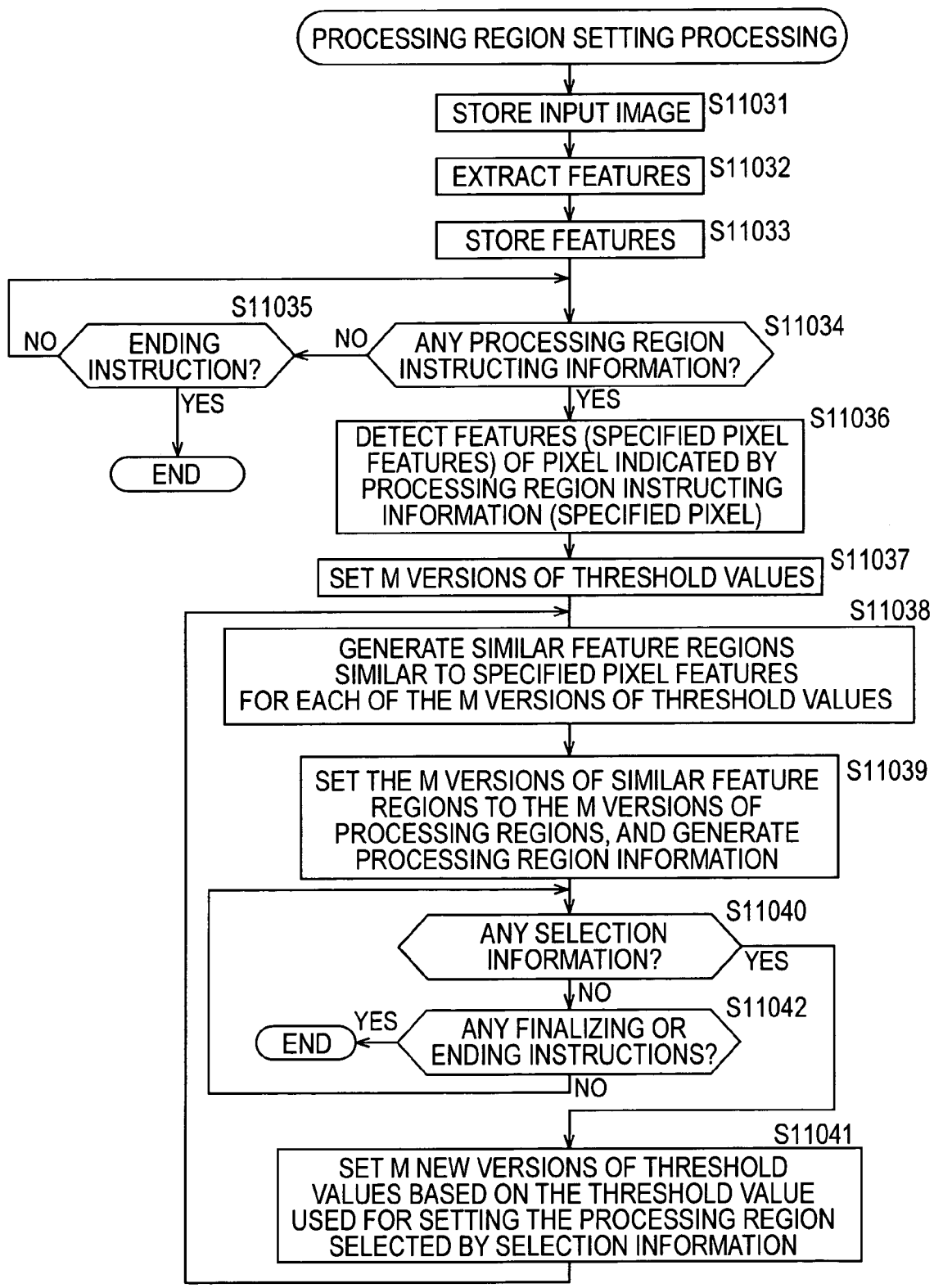
FIG. 116 is a flowchart for describing the processing of the processing region setting unit 11001.
Figure 117:
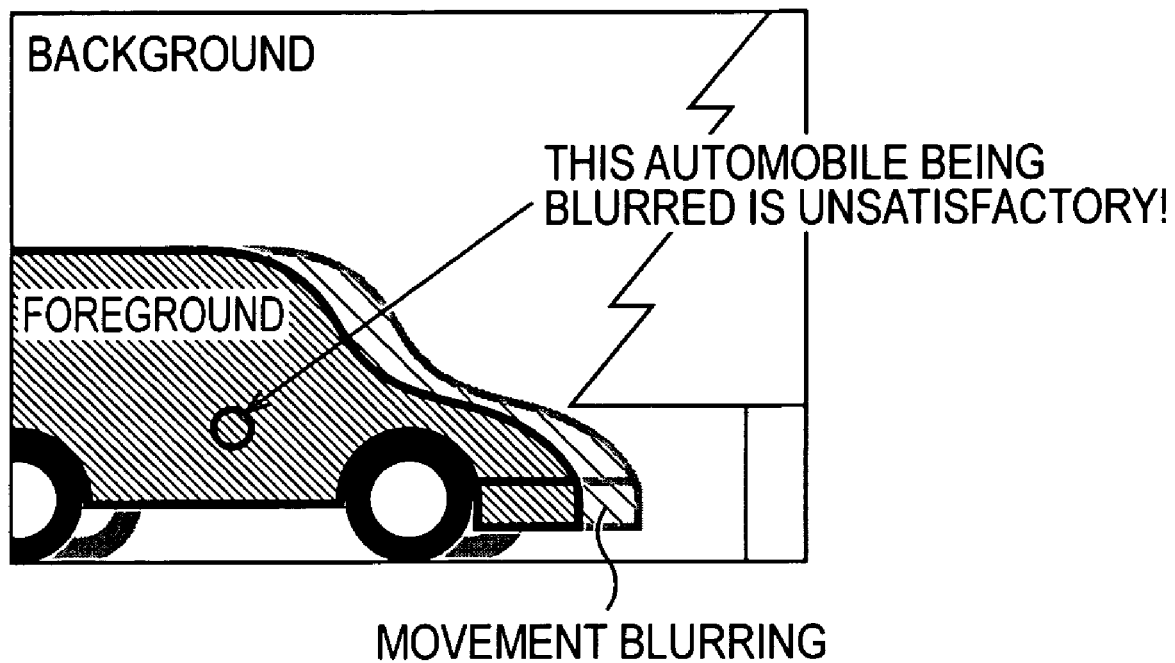
FIG. 117 is a diagram illustrating an input image in which movement blurring has occurred.

Next, the processing which the processing region setting unit 11001 shown in FIG. 115 performs (processing region setting processing) will be described with reference to the flowchart shown in FIG. 116.

The processing region setting processing is started upon an input image, for example, being supplied to the processing region setting unit 11001.

That is to say, in the processing region setting processing, first, in step S11031, the image memory 11021 stores the input image supplied to the processing region setting unit 11001, and the flow proceeds to step S11032. In step S11032, the features extracting unit 11022 extracts the features for each of the pixels making up the input image stored in the image memory 11021, supplies this to the features memory 11023, and the flow proceeds to step S11033. In step S11033, the features memory 11023 stores the features for each of the pixels making up the input image supplied from the features extracting unit 11022, and the flow proceeds to step S11034.

In step S11034, the control unit 11027 determines whether or not there has been input of processing region instruction information from the user I/F 11006. In the event that determination is made in step S11034 that there has been no input of processing region instruction information, the flow proceeds to step S11035, where the control unit 11027 determines whether or not there has been input of ending instruction instructing ending of the processing of the signal processing device 4, by the user operating the user I/F 11006.

In the event that determination is made in step S11035 that there has been input of ending instructions, the processing region setting unit 11001 ends the processing region setting processing.

Also, in the event that determination has been made in step S11035 that there has been no input of ending instructions, the flow returns to step S11034, and hereafter the same processing is repeated.

In the event that determination is made in step S11034 that there has been input of processing region instruction information, the control unit supplies the processing region instruction Information to the specified pixel feature detecting unit 11024, and the flow proceeds to step S11036.

In step S11036, the specified pixel feature detecting unit 11024 detects, from the features stored in the features memory 11023, the features of the pixel at the point represented by the processing region instruction information supplied from the control unit 11027 (specified pixel), and supplies this to the approximation feature region detecting unit 11025 as specified pixel features, and the flow proceeds to step S11037.

In step S11037, the threshold value setting unit 11028 sets M threshold values, which are supplied to the approximation feature region detecting unit 11025, and the flow proceeds to step S11038. Now, M different default values, for example, are stored in the threshold value setting unit 11028, and the M different default values are set as the M threshold values in step S11037. Another arrangement maybe made wherein the threshold value setting unit 11028 sets M variable threshold values in step S11037 based on the specified pixel features, i.e., for example, M values in ascending order obtained by equally dividing, by M+1 or greater, the difference between the features stored in the features memory 1102 which has the greatest (magnitude of) difference as to the specified pixel features, and the specified pixel features, as M threshold values.

In step S11038, the approximation feature region detecting unit 11025 detects an approximation feature region which is the smallest rectangular region surrounding pixels having a features approximating the specified pixel features supplied from the specified pixel features detecting unit 11024, for each of the M threshold value supplied from the threshold value setting unit 11028.

That is to say, the approximation feature region detecting unit 11025 obtains the distance between the features of each of the pixels making up the input image stored in the features memory 11023, and the specified pixel features supplied from the specified pixel features detecting unit 11024, using a predetermined identifying function. Further, the approximation feature region detecting unit 11025 takes an arbitrary threshold value from the M threshold value supplied from the threshold value setting unit 11028 as a threshold value of interest, detects from the pixels making up the input image approximation feature pixels which are pixels having features of distances to the specified pixel features within the threshold value of interest, and detects the smallest rectangular region surrounding the approximation feature pixels as the approximation features region corresponding to the threshold value of interest. The approximation features region detecting unit 11025 takes all of the M threshold value supplied from the threshold value setting unit 11028 as a threshold value of interest, and detects approximation feature regions corresponding to each of the M threshold value. Note that an arrangement maybe made wherein pixels to be detected as approximation feature pixels are restricted to those only within a predetermined range from the position of the specified pixel.

The approximation feature region detecting unit 11025 then proceeds from step S11038 to S11039, and sets approximation feature regions detected with regard to each of the M threshold values, as processing regions, which are supplied to the region information generating unit 11026. Further, in step S11039, the region information generating unit 11026 generates and outputs M versions of processing region information representing the M versions of processing region supplied from the approximation feature region detecting unit 11025, and the flow proceeds to step S11040.

In step S11040, the control unit 11027 determines whether or not selection information has been supplied from the user I/F 11006, and in the event that determination is made that selection information has not been supplied, the flow proceeds to step S11042. In step S11042, the control unit 11027 determines whether or not there has been input of finalizing instructions or ending instructions, by the user operating the user I/F 11006.

In step S11042, in the event that determination has been made that there has been input of finalizing instructions or ending instruction, the processing region setting unit ends processing.

Also, in step S11042, in the event that determination has been made that there has been neither input of finalizing instructions nor ending instructions, the flow returns to step S11040, and hereafter the same processing is repeated.

In the event that determination is made in step S11040 that selection information has been supplied from the user I/F 11006 to the control unit 11027, the control unit 11027 controls the threshold value setting unit 11028 so as to set M new threshold values, and the flow proceeds to step S11041.

In step S11041, the threshold value setting unit 11028 sets M new threshold values according to the control of the control unit 11027. That is to say, in this case, the threshold value setting unit 11028 sets M new threshold values based on the threshold values from the M threshold value set the previous time which were used for setting the processing region regarding the output image, selected by the selection information supplied from the user I/F 11006.

Specifically, the threshold value setting unit 11028 takes the threshold value used for setting the processing region for the output image selected by the selection information supplied from the user I/F 11006 as a center, and sets M values with intervals closer than the intervals between adjacent threshold values in the previously-set M threshold values, as M new threshold values.

The threshold value setting unit 11028 then supplies the M new threshold values to the approximation feature region detecting unit 11025, and the flow returns from step S11041 to S11038.

In step S11038, the approximation feature region detecting unit 11025 detects approximation feature regions which are the smallest rectangular regions surrounding pixels having features approximating the specified pixel features supplied from the specified pixel feature detecting unit 11024, with regard to each of the new M threshold values supplied from the threshold value setting unit 11028, and hereafter the same processing is repeated.

According to the processing region setting processing described above, M processing regions which are multiple are set based on processing region instructing information from the user, and subsequent processing is performed based on each of the M processing regions. Further, the M versions of the output images which are the results of the processing, are displayed, and upon a user selecting an output image therefrom, M versions of new processing regions are set based on the selection results, and hereafter, the same processing is repeated. Accordingly, appropriate processing regions are set by the user, by the user selecting from the M versions of output images that which is the closest to the desired image quality, for example, and consequently, the user can obtain an output image with the desired image quality.

Note that while in the above described the arrangement, first, the user inputs processing region instructing information represented in the specified pixel, and the specified pixel is set at the processing region setting unit 11001 based on the processing region instructing information; an arrangement maybe made wherein the specified pixel is set without processing region instructions information from the user. That is to say, with the processing region setting unit 11001, a continuity region is detected in the same way as with the data continuity detecting unit 101 shown in FIG. 3, for example, and a predetermined pixel in the continuity region can be set as the specified pixel. In this case, there's no need for the user to input processing region instructing information, and only needs to select from the M versions of output images that which is closest to the desired image quality.

Also, while in the above described arrangement, M versions of processing regions are set, output images are displayed for each of these M processing regions, and the user selects a desired output image from these; an arrangement may be made wherein, for example, a frame or the like presenting each of the M versions of processing regions is displayed on the input image, and the user directly selects processing regions.

Figure 118:
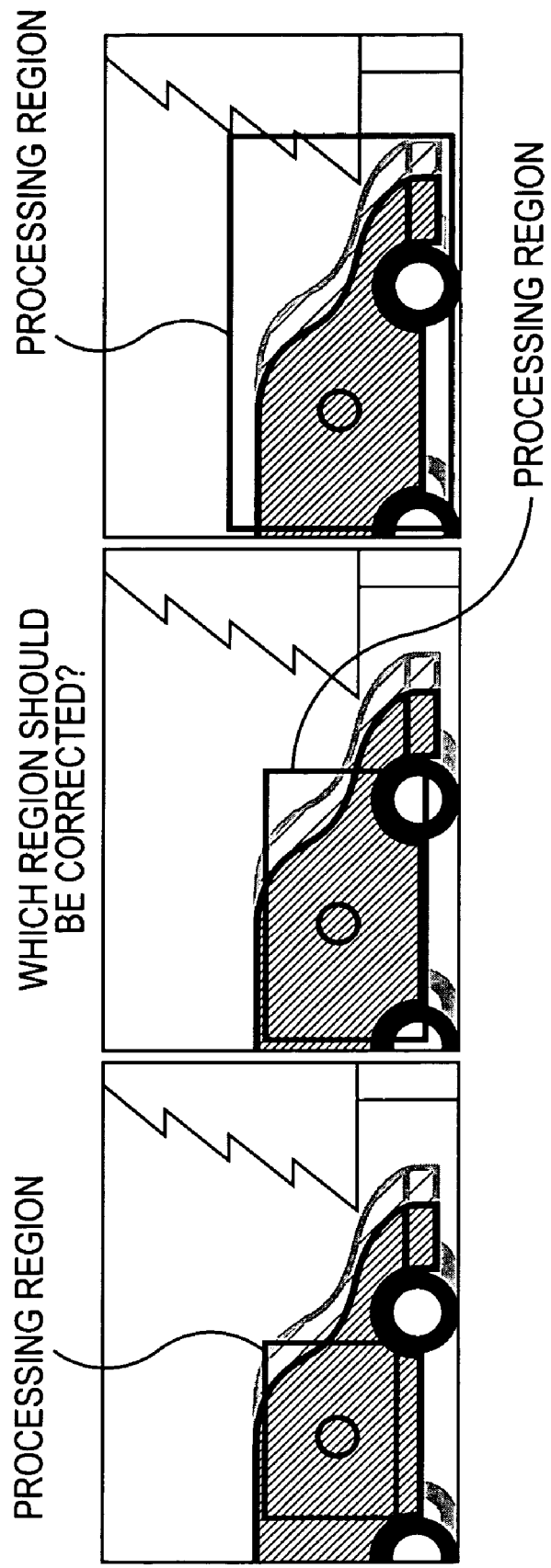
FIG. 118 is a diagram illustrating a display example of a frame displaying M versions of processing regions set by the processing region setting unit 11001.

In this case, in the event that an image obtained by taking a scene wherein an object such as an automobile or the like is moving at a constant speed in the horizontal direction with the sensor 2 (FIG. 1) which is an image sensor, and is displayed on the image display unit 11005 (as an input image), M versions of processing regions are set by the processing region setting unit 11001 upon performing instructions of the portion which has movement blurring due to the object moving, by operating the user I/F 11006. Further, with the image display unit 11005, as shown in FIG. 118, frames presenting each of the M versions of processing regions are displayed on the input image. Now, in FIG. 118, frames presenting each of three processing regions are displayed. Upon the user operating the user I/F 11006 so as to select one of the M versions of processing regions, the actual world estimating unit 11003 and the image generating unit 11004 performs processing regarding the processing region selected by the user and an output image which is the result of processing thereof is displayed on the image display unit 11005.

Accordingly, in this case, a processing region to be processed by the actual world estimating unit 11003 and image generating unit 11004 can be easily selected by the user.

Figure 119:
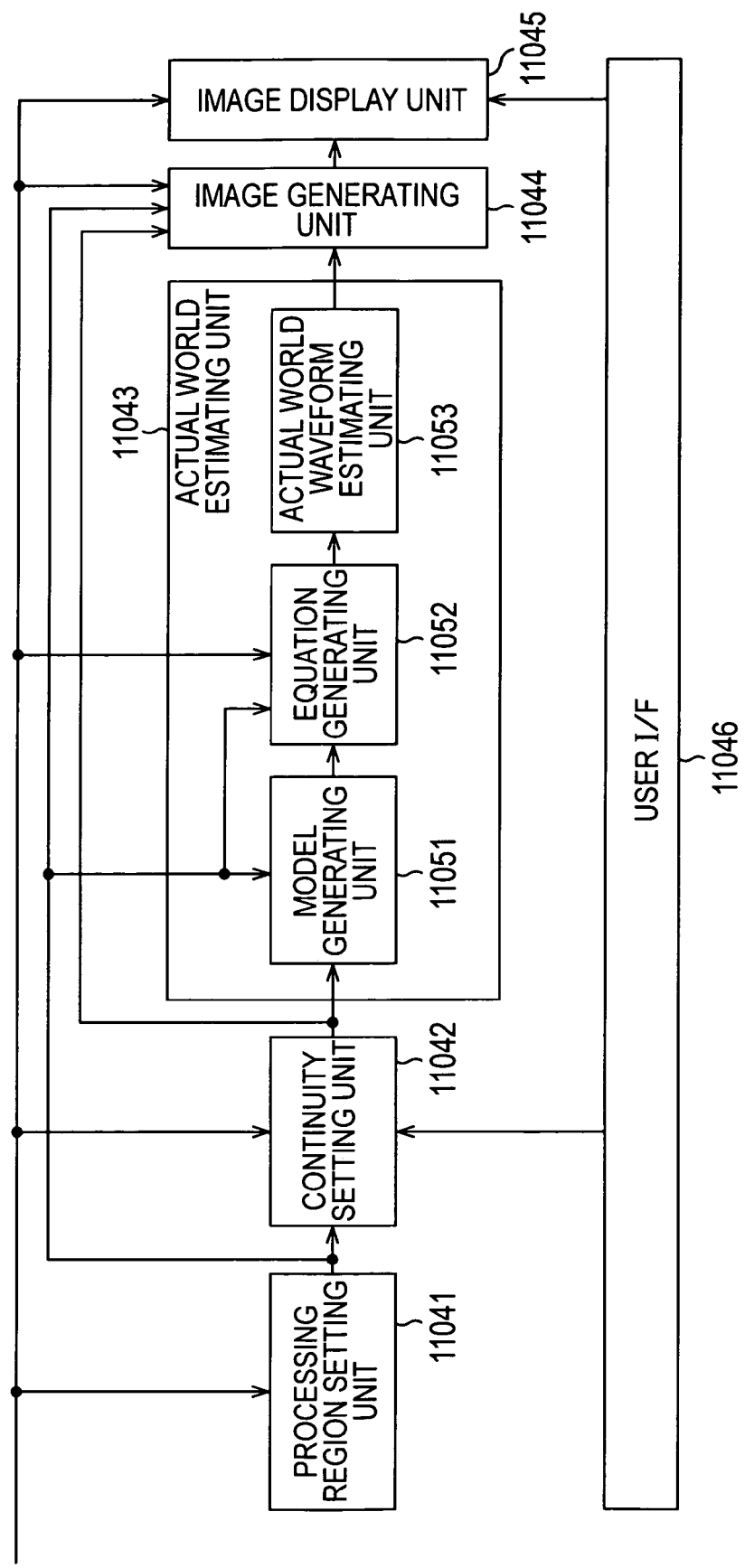
FIG. 119 is a block diagram illustrating a configuration example of another applied embodiment of the signal processing device 4 shown in FIG. 111.

Next, FIG. 119 illustrates another configuration example of an application of the signal processing device 4 shown in FIG. 111.

In FIG. 119, the processing region setting unit 11041, the continuity setting unit 11042, the actual world estimating unit 11043, image generating unit 11044, image display unit 11045, and user I/F 11046, each correspond to the processing region setting unit 10001, the continuity setting unit 10002, the actual world estimating unit 10003, image generating unit 10004, image display unit 10005, and user I/F 10006 shown in FIG. 111, and basically perform the same processing as the processing region setting unit 10001, the continuity setting unit 10002, the actual world estimating unit 10003, image generating unit 10004, image display unit 10005, and user I/F 10006. Further, in FIG. 119, the actual world estimating unit 11043 comprises a model generating unit 11051, an equation generating unit 11052, and actual world waveform estimating unit 11053. The model generating unit 11051, equation generating unit 11052, and actual world waveform estimating unit 11053 correspond to each of the model generating unit 10011, equation generating unit 10012, and actual world waveform estimating unit 10013 in FIG. 111, and basically perform the same functions as each of the model generating unit 10011, equation generating unit 10012, and actual world waveform estimating unit 10013.

Note however, that in FIG. 119, the assisting information which the user I/F 11046 outputs by the user operating the user I/F 11046, is supplied only to the continuity setting unit 11042.

That is to say, in FIG. 119, the user can instruct information relating to actual world 1 continuity with regard to the image displayed on the image display unit 11045, by operating the user I/F 11046, and upon the user performing operations to instruct information relating to continuity of the actual world 1, continuity instruction information representing information relating to continuity instructed by that operation is supplied to the continuity setting unit 11042 as assisting information by the user I/F 11046. Further, in FIG. 119, multiple output images are displayed on the image display unit 11045, as described later, and an output image displayed on the image display unit 11045 can be selected by the user operating the user I/F 11046, and upon the user making an operation to select an output image, the user I/F 11046 supplies selection information representing the output image selected by the operation to the continuity setting unit 11042, as assisting information.

Note that the amount of movement, for example, as continuity instructions information, is to be input by the user operating the user I/F 11046.

That is to say, for example, let us say that an image obtained by taking a scene wherein an object such as an automobile in the actual world 1 is moving at a constant speed in the horizontal direction is taken with the sensor 2 (FIG. 1) which is an image sensor, is input to the signal processing device 4 shown in FIG. 119 as an input image.

In this case, the image of the actual world 1 corresponding to the input image has continuity in that an object of a certain shape (an automobile in this case) is moving at a constant speed in the horizontal direction, and the user views the input image and inputs continuity instruction information instructing the continuity of the actual world 1 corresponding to the input image, by operating the user I/F 11046. Specifically, here, the user I/F 11046 is configured of a rotating or sliding volume (variable resistor) or the like, for example, and upon the user operating the user I/F 11046, the user I/F 11046 supplies continuous values representing the amount of movement corresponding to the operation thereof, to the continuity setting unit 11042, as continuity instruction information.

Figure 120A:
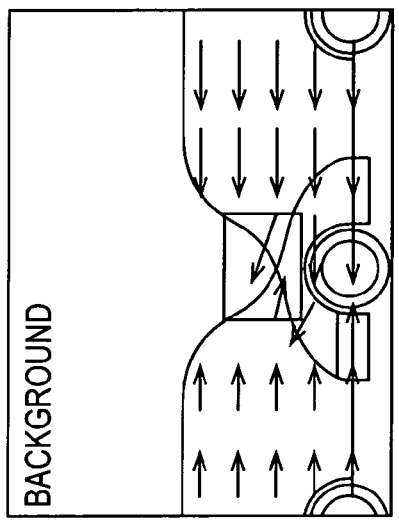

As for the amount of movement here, a movement vector may be detected using so-called block matching, for example, and the magnitude of the movement vector employed. However, in cases of images (input images) wherein the difference movement components for the foreground and background intersect, such as shown in FIG. 120A, for example, wherein scenery over which an automobile moves from the left to the right direction is the background, and a different automobile moving from the right to the left direction is the foreground, obtaining the movement vector at the portion where the movement components of the foreground and background intersect, indicated by a rectangle in FIG. 120B, with precision, is particularly difficult.

Figure 120B:
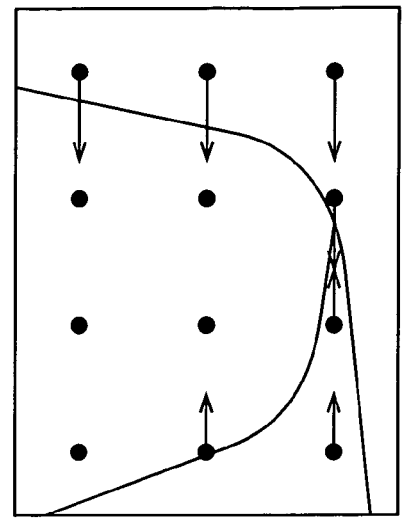
Figure 120C:
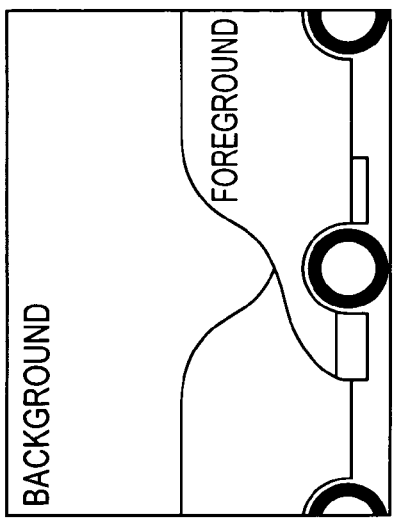
Figure 120D:
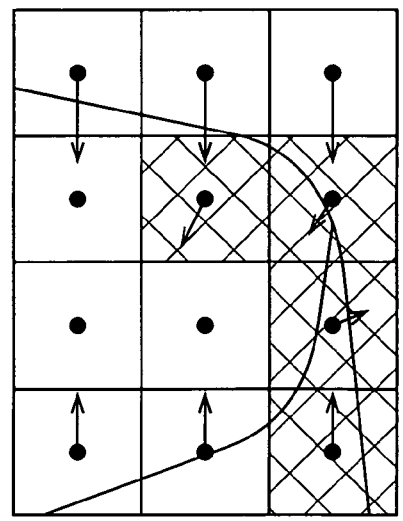

That is to say, FIG. 120C illustrates movement vectors of each of the blocks obtained by block matching with regard to the portion indicated by the rectangle in FIG. 120B (movement vectors (enlarged) at the portion of the obtained movement vectors indicated by the rectangle in FIG. 120B, shown in FIG. 120B). With block matching, matching is made for each block without distinguishing between foreground and background, so it may be difficult to precisely obtain movement vectors for blocks at the boundary portions between objects (in this case, the foreground automobile and the background automobile). In the case of taking the movement vector at the center of the block (center-of-gravity position) as the movement vector of that block as shown in FIG. 120D, for example, in the blocks indicated by hatching in FIG. 120C, block matching will obtain inaccurate movement vector which is different from the movement vector at the center point of the block, in comparison with the true movement vectors shown in FIG. 120.

Accordingly, with the signal processing device 4 shown in FIG. 119, the user input the amount of movement of the object in the input image as continuity instructions information, and continuity is set at the continuity setting unit 11042, based on the continuity instruction information.

Figure 121:
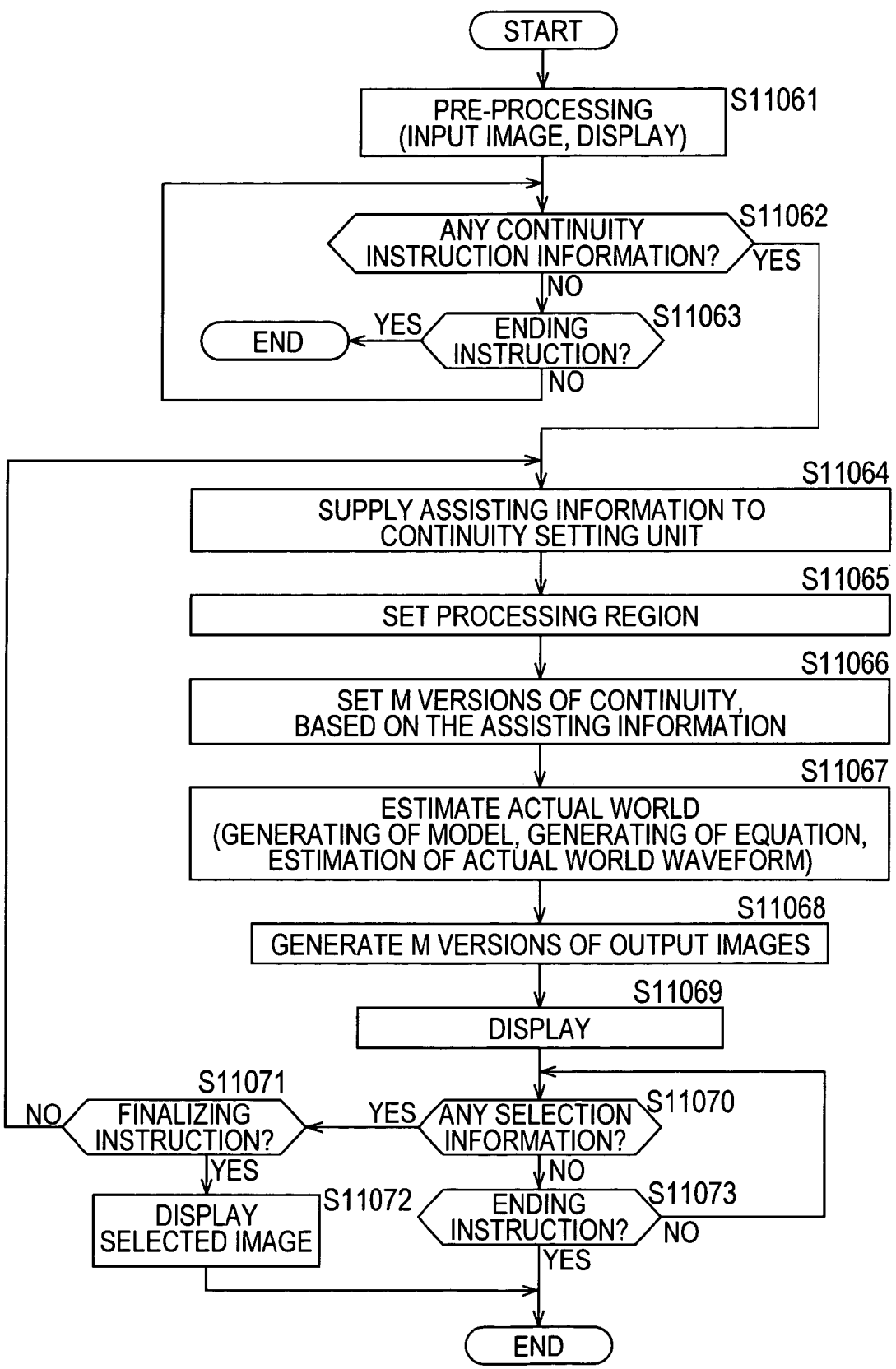

Next, the processing of the signal processing device 4 shown in FIG. 119 will be described with reference to the flowchart in FIG. 121.

With the signal processing device 4 in FIG. 119, the actual world is estimated based on continuity, and accordingly, processing for removing movement blurring which occurs due to temporal-direction mixing (temporal mixing) of the signals of objects, due to temporal integration effects of the sensor 2, is performed.

That is to say, in an input image obtained by a taking an image in the actual world 1 wherein an object such as an automobile or the like is moving, with the sensor 2 which is an image sensor, the object moves over time, so light signals of that object and light signals of portions other than that object are mixed (temporal mixing) due to temporal integration effects of the sensor 2, thereby causing so-called movement blurring at the boundary portions of the object and the like, for example. The signal processing device 4 shown in FIG. 119 generates high-quality output images wherein movement blurring occurring due to such temporal mixing has been removed from the input image.

With the signal processing device 4 shown in FIG. 119, first, in step S11061, pre-processing is performed, and the flow proceeds to step S11062. That is to say, the signal processing device 4 supplies one frame or one field of input image for example, supplied from the sensor 2 (FIG. 1) as data 3, to the processing region setting unit 11041, continuity setting unit 11042, actual world estimating unit 11043, image generating unit 11044, and image display unit 11045. Further, the signal processing unit 4 displays an input image on the image display unit 11045.

Note here that an image with movement blurring due to temporal mixing, obtained by the taking a scene wherein an object such as the automobile moves in the horizontal direction at a constant speed with the sensor 2, is input to the signal processing device 4 as an input image.

In step S11062, the user I/F 11046 determines whether or not there has been input of continuity instruction information by the user operating the user I/F 11046. In the event that determination is made in step S11062 that there has been no input of continuity instructing information, the flow proceeds to step S11063, where the user I/F 11046 determines whether or not there has been input of ending instructions instructing ending of the processing of the signal processing device 4 by the user operating the user I/F 11046.

In the event that determination is made in step S11063, that there has been input of ending instructions, i.e., for example, in the event that the user who has viewed the input image displayed on the image display unit 11045 does not feel that the image quality of the input image is unsatisfactory, and operates the user I/F 11046 so as to end the processing of the signal processing device 4 since there is no need to subject the input image to signal processing, the processing ends.

Also, in the event that determination is made in step S11063 that there has been no input of ending instructions, the flow returns to step S11062, and hereafter the same processing is repeated.

On the other hand, in the event that determination is made in step S11062 that there has been input of continuity instruction information, that is to say, in the event that the user who has viewed the input image displayed on the image display unit 11045 feels the image quality of the input image (in this case, that there is movement blurring) to be unsatisfactory, and operates the user I/F 11046 to instruct the movement amount of the object in the input image, the flow proceeds to step S11064, where the user I/F 11046 supplies continuity instruction information representing the movement amount which the user has instructed by operating the user I/F 11046, to the continuity setting unit 11042 as assisting information, and the flow proceeds to step S11065.

In step S11065, the processing region setting unit 11041 sets the processing region and supplies processing region information representing the processing region to the continuity setting unit 11042, actual world estimating unit 11043, and image generating unit 11044, and the flow proceeds to step S11066.

Now accommodating an arrangement may be made wherein the setting of the processing region in step S11065 is performed based on processing region instruction information input by the user, or an arrangement may be made wherein this is carried out without processing region instruction information from the user. An example setting of the processing region without processing region instruction information from the user is to perform block matching using an input image and an image from the previous to or following frame to detect movement vectors from the input image, and carry out the setting based on the movement vectors. That is to say, for example, the smallest rectangular region surrounding blocks wherein movement vectors of a predetermined magnitude or greater, can be set as a processing region.

In step S11066, the continuity setting unit 11042 recognizes the processing region in the input image, from the processing region information supplied from the processing region setting unit 11041. Further, the continuity setting unit 11042 sets M versions of actual world 1 signals lost in the image data at the processing region, and supplies continuity information representing M versions of continuity to the actual world estimating unit 11043, and the flow proceeds to step S11067.

Now, in the event that continuity instruction information has been supplied from the user I/F 11046 in the immediately-preceding step S 11064 as assisting information, the continuity setting unit 11042 sets the M versions of continuity based on the continuity instruction information. That is to say, the continuity setting unit 11042 sets M versions of movement amount centered on the movement amount which the continuity instruction information supplied from the user I/F 11076 in the immediately-preceding step S11064, as M versions of continuity information.

In step S11067, the actual world estimating unit 11043 estimates the actual world 1 signals for the image data within the processing region in the input image, corresponding to the continuity of the corresponding actual world 1 signals.

That is to say, at the actual world estimating unit 11043, the model generating unit 11051 recognizes the processing region in the input image from the processing region information supplied from the processing region setting unit 11041, and recognizes the M versions of continuity of the actual world 1 signals corresponding to the image data in the processing region, from the M versions of continuity information supplied from the continuity setting unit 11042. Further, the model generating unit 11051 generates M versions of functions as models modeling the relation between the pixel values of each of the pixels within the processing region and the actual world 1 signals, according to the pixels making up the processing region in the input image and the continuity of the actual world 1 signals corresponding to the image data in the processing region, for each of the M versions of continuity, thereby supplying to the equation generating unit 11052 the M versions of functions obtained with regard to the M versions of continuity.

The equation generating unit 11052 recognizes the processing region in the input image from the processing region information supplied from the processing region setting unit 11041, and substitutes the pixel values of pixels necessary in the input image into each of the M versions of function serving as models that are supplied from the model generating unit 11051, with regard to the pixels making up the processing region, thereby generating M versions of equations for obtaining an approximation functions approximating actual world 1 signals, which are supplied to the actual world waveform estimating unit 11053.

The actual world waveform estimating unit 11053 solves the M versions of equations supplied from the equation generating unit 11052, thereby estimating the M versions of actual world 1 signal waveforms, i.e., obtaining approximation functions serving as models modeling the actual world 1 signals, and supplies the M versions of approximation functions to the image generating unit 11044.

Following the processing in step S11067, the flow proceeds to step S11068, where the image generating unit 11044 generates just M versions of signals closer approximating the actual world 1 signals based owned the M versions of approximation function supplied from (the actual world waveform estimating unit 11053 of) the actual world estimating unit 11043. That is to say, the image generating unit 11044 recognizes the processing region in the input image from the processing region information supplied from a processing region setting unit 11041, and generates just M versions of approximation images which is image data closer approximating an image corresponding to the actual world 1 signals, based on the M versions of approximation function supplied from the actual world estimating unit 11043 with regard to the processing region. Further, the image generating unit 11044 generates as output images M versions of images where in the processing region part of the input image has been replaced with the M versions of approximation images, which are supplied to the image display unit 11045, and the flow proceeds from step S11068 to S11069.

In step S11069, the image display unit 11045 displays the M versions of output images supplied from the image generating unit 11044 instead of the input image displayed in step S11061, or along with the input image, and the flow proceeds to step S11070.

In step S11070, the user I/F 11046 determines whether or not there has been input of selection information by the user operating the user I/F 11046. That is to say, in step S11069, M versions of the output images are displayed on the image display unit 11045, and determination is made in step S11070 regarding whether or not the user who has viewed the M versions of output images has input selection information for selecting an image from the M versions of the output images which is of the desired image quality or close to the desired image quality (in this case, an image from which movement blurring have been removed) by operating the user I/F 11046.

In step S11070, in the event that determination is made that there has been no input of selection information, the flow proceeds to step S11073, where determination is made by the user I/F 11046 regarding whether or not there has been input of ending instructions, in the same way as in step S11063.

In the event that determination is made in step S11073 that there has been input of ending instruction, the signal processing device 4 ends the processing.

Also, in the event that determination is made in step S11073 that there has been no input of ending information, the flow returns to step S11070, and hereafter the same processing is repeated.

On the other hand, in the event that determination is made in step S11070 that there has been input of selection information, that is to say, the user who has viewed the M versions of output images displayed on the image display unit 11045 has selected an image from the M versions of the output images which is of the desired image quality or close to the desired image quality, the flow proceeds to step S11071, where the user I/F 11046 determines whether there has been input of finalizing information for finalizing the output image which the user has selected as the final output image, by the user operating the user I/F 11046.

In step S11071, in the event that determination is made that there has been input of finalizing instructions, the flow proceeds to step S11072, where the image display unit 11045 displays the output image which the user has selected on the entire screen thereof, and the processing ends.

Also, in step S11071, in the event that determination is made that there has been no input of finalizing instruction, that is to say, in the event that the user feels the image quality of the selected output image is unsatisfactory, and therefore does not input finalizing instruction so as to perform the processing again, the flow returns to step S11064, where the user I/F 11046 supplies selection information representing the output image which the user has selected to the continuity setting unit 11042 as assisting information, and the flow proceeds to step S11065.

In step S11065, the processing region setting unit 11041 sets the processing region in the same way as described above, supplies processing region information representing the processing region to the continuity setting unit 11042, actual world estimating unit 11043, and image generating unit 11044, and the flow proceeds to step S11066. Now, in the event that the processing region to be set here is the same as that set in the processing of the previous step S11065, for example, and accordingly the loop processing of step S11064 through S11076 is to be performed, all the processing of step S11065 from the second time on can be skipped.

In step S11066, the continuity setting unit 11042 newly sets M, which is a plurality, versions of continuity, based on the selection information serving as assisting information supplied from the user I/F 11046. That is to say, in this case, in step S11066, the continuity setting unit 11042 sets M new versions of continuity, based on the continuity set with regard to the input image used for obtaining the output image which the selection information, serving as assisting information supplied from the user I/F 11046, represents. Further, in step S11066, the continuity setting unit 11042 supplies the M versions of continuity information representing the new M versions of continuity, to the actual world estimating unit 11043 and the image generating unit 11044. The flow then proceeds from step S11066 to S11067, and hereafter the same processing is repeated.

That is to say, the processing from step S11064 through S11073 is thus repeated, to where finally, continuity is set whereby the image quality which the user desires, specifically, in this case, an output image where of movement blurring has been (sufficiently) removed, is obtained, and consequently the user obtains an output image with desired image quality.

As described above, with the signal processing device 4 shown in FIG. 119, the user is presented with M versions of output images which are the results of processing on the input image, the user selects a desired one from the M versions of output images, and reprocessing is performed based upon the selection results, so a high-quality output image which meets the preference of the user can easily be obtained. That is to say, the signal processing device 4 presents the user with M versions of output images as processing results as to the input image. On the other hand, the user recognizes the image quality of each of the M versions of output images, passes judgment, and gives the signal processing device 4 feedback on an output image with good image quality. The signal processing device 4 processes the input image again based on the feedback from the user, and hereafter the same processing is repeated. Accordingly, a high-quality output image which meets the preference of the user can easily be obtained.

Note that an arrangement may be made with the signal processing device 4 shown in FIG. 119, as with the case of the signal processing device 4 shown in FIG. 113, wherein $M_1$, which is a plurality, of processing regions are set, the user selects a desired one from the $M_1$ versions of processing regions, following which $M_2$, which is a plurality, versions of continuity are set, with regard to only the processing region which the user has selected, so as to obtain $M_2$ versions of output images.

Further, note that an arrangement may be made with the signal processing device 4 shown in FIG. 119, as with the case of the signal processing device 4 shown in FIG. 113, wherein the processing region setting unit 11041 sets $M_1$, which is a plurality, versions of processing regions, and the continuity setting unit 11042 sets $M_2$, which is a plurality, versions of continuity, with regard to each of the $M_1$ versions of processing regions, thereby generating $M_1 \times M_2$ versions of the output images, so that the user can select the desired one therefrom.

Figure 122:
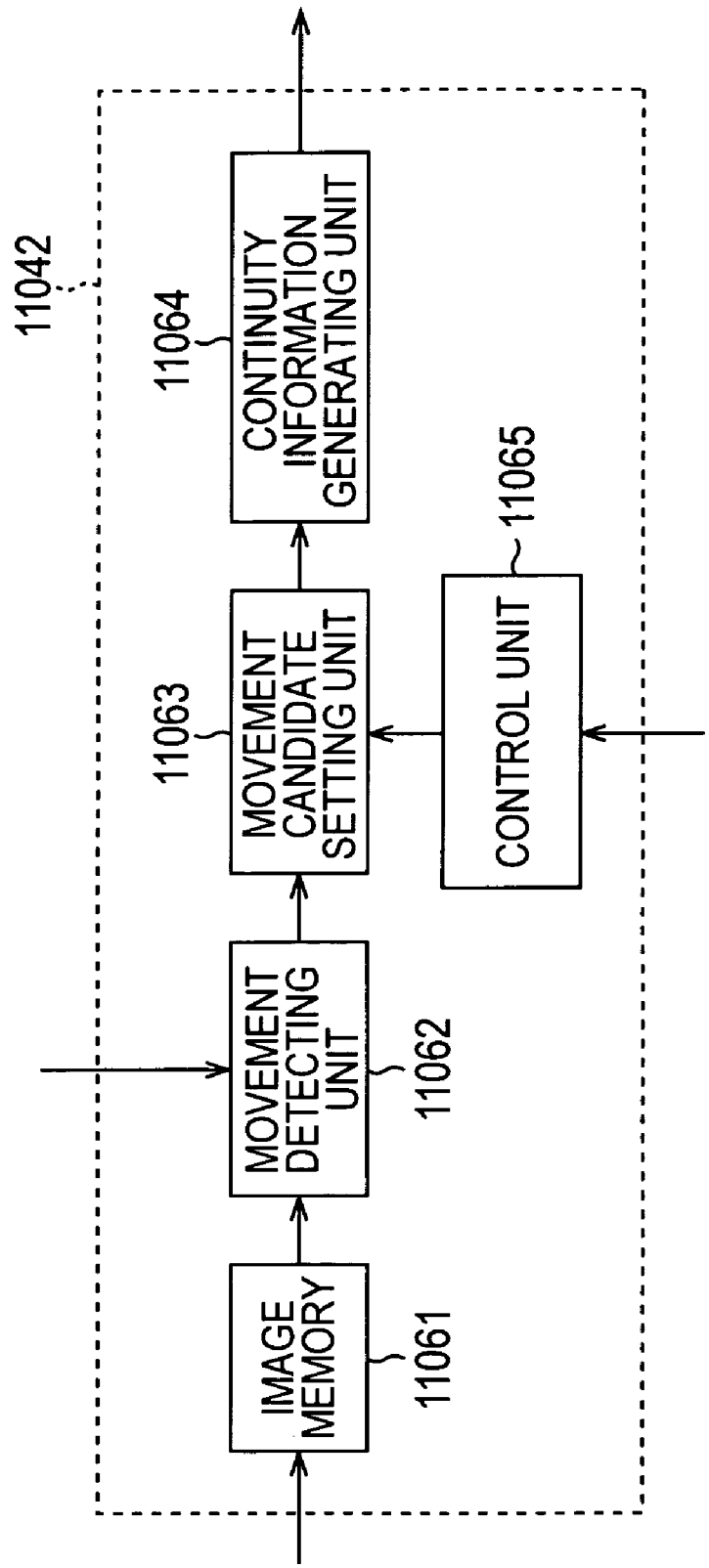

Next, FIG. 122 illustrates a detailed configuration example of the continuity setting unit 11042 shown in FIG. 119.

Image memory 11061 is supplied with an input image, and if necessary, the image of frame before or following the input image, and the image memory 11061 stores images supplied thereto.

A movement detecting unit 11062 is supplied with a processing region information from the processing region setting unit 11041, with the movement detecting unit 11062 reading out image data and the like of the processing region in the input image which is identified by the processing region information, from that image memory 11061, detecting movement which represents continuity of data in the processing region, and supplying this to a movement candidate setting unit 11063.

Note that the movement detecting unit 11062 is capable of detecting movement by block matching, for example or may detect movement by other techniques. Other techniques will be described later.

Now, while FIG. 122 illustrates the configuration of the continuity setting unit 11042 comprising image memory 11061 and the movement detecting unit 11062, an arrangement may be made wherein the continuity setting unit 11042 is configured only of a later-described movement candidate setting unit 11063, continuity information generating unit 10064, and control unit 11065, without the image memory 11061 and movement detecting unit 11062, in the event that just the continuity of the actual world 1 corresponding to the input image is to be set without detecting movement from the input image (processing region), i.e., for example, in the event that only the continuity of the actual world 1 is to be set based on continuity instruction information input from the user.

The movement candidate setting unit 11063 sets M versions of candidates of movement representing the continuity of the corresponding actual world 1, based upon movement representing data continuity in the processing region supplied from the movement detecting unit 11062, and supplies these to the continuity information generating unit 11064. Or, the movement candidate setting unit 11063 follows the control of the control unit 11065 to set M versions of candidates for movement representing a actual world 1 continuity in the processing region of the input image, which are supplied to the continuity information generating unit 11064.

The continuity information generating unit 11064 generates continuity information representing each of the M version of movement candidates supplied from the movement candidates setting unit 11063, and outputs the M versions of continuity information to the actual world estimating unit 11046 (FIG. 119).

The control unit 11065 receives continuity instruction information or selection information serving as assisting information supplied from the user I/F 11046 (FIG. 119), and controls the movement candidates setting unit 11063 according to the continuity instruction information or selection information.

Figure 123:
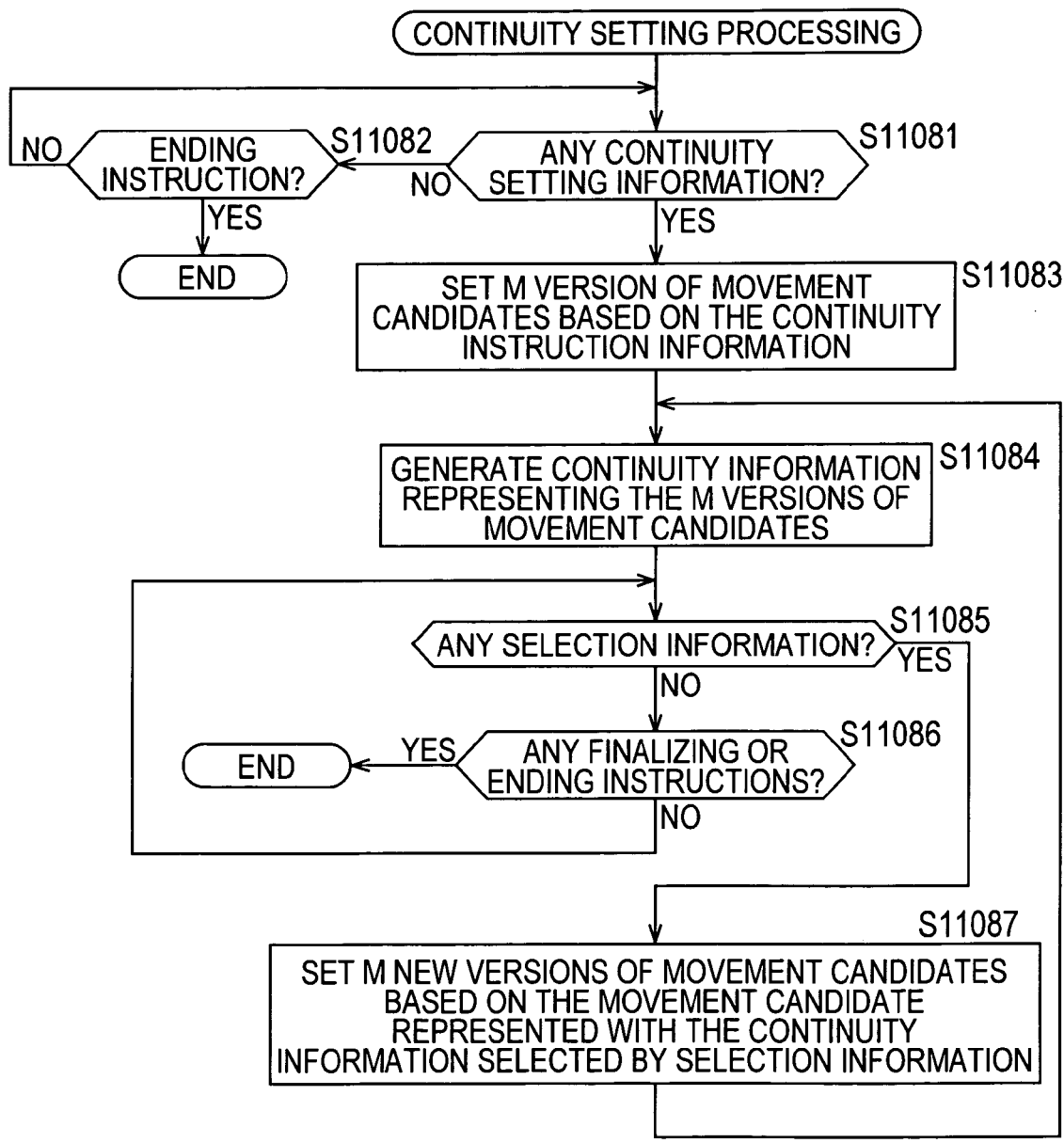

Next, the processing which the continuity setting unit 11042 shown in FIG. 122 performs (continuity setting processing) will be described with reference to the flowchart shown in FIG. 123.

Continuity setting processing is started up on an input image being supplied to the signal processing device 4 shown in FIG. 119, for example.

That is to say, with continuity setting processing, first, in step S11081, the control unit 11065 determines whether or not there has been input of continuity instruction information from the user I/F 11046 (FIG. 119). In the event that determination is made in step S11081 that there has been no input of continuity instruction information, the flow proceeds to step S11082, where the control unit 11065 determines whether or not there has been input of ending instructions for instruction of ending of the processing of the signal processing device 4, by the user operating the user I/F 11046.

In step S11082, in the event that determination is made that there has been input of the ending instructions, the continuity setting unit 11042 ends the continuity setting processing.

Also, in the event that determination is made in step S11082 that there has been no input of the ending instructions, the flow returns to step S11081, and hereafter the same processing is repeated.

In the event that determination is made in step S11082 that there has been input of continuity instruction information, the control unit 11065 supplies the continuity instruction information to the movement candidates setting unit 11063, and the flow proceeds to step S11083.

In step S11083, the movement candidate setting unit 11063 sets M versions of candidates of the amount of movement of the object (movement candidates) in the processing region of the input image, based on the movement amount which the continuity instruction information supplied from the control unit 11065 represents, supplies the M versions of movement candidates to the continuity information generating unit 11064, and the flow proceeds to step S11084. Now, an arrangement maybe made wherein, in step S11083, M values at predetermined intervals centered on the movement amount which the continuity instruction information represents, for example, are set as the M versions of movement amount candidates. Note that the predetermined intervals in this case may be of a constant value, or may increase or decrease the farther away from the movement amount which the continuity instruction information represents.

In step S11084, the continuity information generating unit 11064 generates and outputs M versions of continuity information representing the M versions of movement amount candidates supplied from the movement candidates setting unit 11063, and the flow proceeds to step S11085.

In step S11085, the control unit 11065 determines whether or not selection information has been supplied from the user I/F 11046, and in the event that determination is made that selection information has not been supplied, the flow proceeds to step S11086. In step S11086, the control unit 11065 determines whether or not there has been input of finalizing instruction or ending instructions, by the user operating the user I/F 11046.

In the event that determination is made in step S11086, that there has been an input of finalizing instructions or ending instructions, the continuity setting unit 11042 ends the continuity setting processing.

Also, in the event that determination is made in step S11086 that there has been input of neither finalizing instruction nor ending instructions, the flow returns to step S11085, and hereafter the same processing is repeated.

In the event that determination is made in step S11085 that selection information has been supplied from the user I/F 11046 to the control unit 11065, the control unit 11065 controls the movement candidates setting unit 11063 so as to set M new movement amount candidates, and the flow proceeds to step S11087.

In step S11041, the movement candidate setting unit 11063 sets the M new movement amount candidates, under the control of the control unit 11065. That is to say, in this case, the movement candidates setting unit 11063 sets M new movement amount candidates, based on the movement amount candidate serving as continuity information used to obtain the output image selected from the previously-set M movement amount candidates, by the selection information supplied from the user I/F 11046.

Specifically, the movement candidates setting unit 11063 sets values at intervals shorter than the intervals between adjacent movement amount candidates in the previously-set M movement amount candidates as M new movement amount candidates, centered on the movement amount candidate used to obtain the output image selected by the selection information supplied from the user I/F 11046.

The movement candidate setting unit 11063 supplies the M new movement candidates to the continuity information generating unit 11064, and the flow returns from step S11087 to S11084.

In step S11084, the continuity information generating unit 11064 generates and outputs M versions of continuity information representing the M new movement amount candidates supplied from the movement candidates setting unit 11063, the flow proceeds to step S11085, and hereafter the same processing is repeated.

According to the above continuity setting processing, M, which is a plurality, versions of continuity are set based on continuity instruction information from the user, and subsequent processing is performed for each of the M versions of continuity. Further, M versions of the output images are displayed as the processing results thereof, and upon the user selecting an output image therefrom, M new versions of continuity are set based on the selection results, and hereafter the same processing is repeated. Accordingly, appropriate continuity setting thus performed by the user selecting from the M versions of the output images that which is closest to a desired image quality, for example, thereby enabling the user to obtain an output image with image quality close to that desired.

Now, while the case described above is an arrangement wherein, first, the user inputs continuity instruction information representing the movement amount of the object in the input image, and the continuity setting unit 11042 sets the first M versions of movement amount candidates based on the continuity instruction information, an arrangement may be made wherein the first M versions of movement candidates are set without continuity instruction information from the user. That is to say, an arrangement maybe made wherein, at the continuity setting unit 11042, the input image is stored in image memory 11061, the amount of movement in the processing region of the input image stored in the image memory 11061 is detected by the movement detecting unit 11062, and the first M versions of movement amount candidates are set based on the detected movement amount, for example.

Also, an arrangement maybe made wherein, at the continuity setting unit 11042, the first M versions of movement amount candidates are set based on a certain movement amount range centered on a movement amount represented by the continuity instruction information or the movement amount detected by the movement detecting unit 11062, or a certain movement amount range which is unrelated to the amount of movement which the continuity instruction information represents or is detected by the movement detecting unit 11062.

Figure 124:
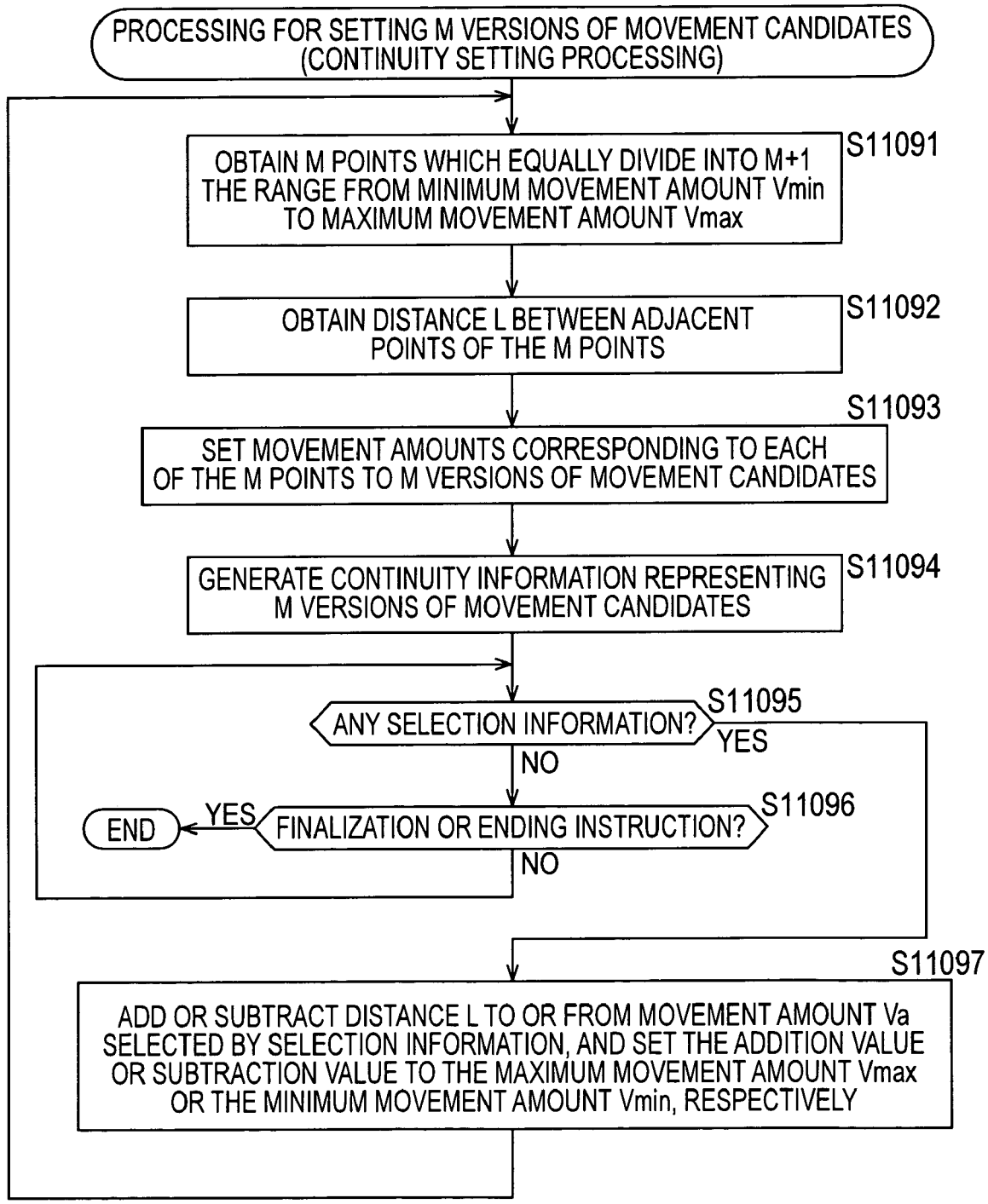

Now, the processing of the continuity setting unit 11042 in the case of setting the first M versions of movement amount candidates based on a certain movement amount range, and subsequently setting M new versions of movement amount according to selection of an output image by the user, will be described with reference to the flowchart in FIG. 124. Note that the minimum value and maximum value of the range of movement amount used for setting the M versions of movement amount candidates will respectively be referred to as minimum movement amount $V_{min}$ and maximum movement amount $V_{max}$, as appropriate.

In this case, first, in step S11091, the control unit 11065 obtains M points by equally dividing the range from minimal movement amount $V_{min}$ to maximum movement amount $V_{max}$ into M+1, supplies these to the movement candidates setting unit 11063, and the flow proceeds to step S11092. In step S11092, the control unit 11065 obtains the distance L between adjacent points of the M points equally dividing the range from the minimum movement amount $V_{min}$ to the maximum movement amount $V_{max}$ into M+1, and the flow proceeds to step S11093.

In step S11093, the movement candidates setting unit 11063 sets the values of the M points supplied from the control unit 11065 as M movement amount candidates and supplies the M movement amount candidates to the continuity information generating unit 11064, and the flow proceeds to step S11094.

In step S11094, the continuity information generating unit 11064 generates and outputs M versions of continuity information representing the M movement amount candidates supplied from the movement candidates setting unit 11063, and the flow proceeds to step S11095.

In step S11095, the control unit 11065 determines whether or not selection information has been supplied from the user I/F 11046, and in the event that determination is made that selection information has not been supplied, the flow proceeds to step S11096. In step S11096, the control unit 11065 determines whether or not there has been input of finalizing instructions or ending instructions, by the user operating the user I/F 11046.

In the event that determination is made that there has been input of finalizing instructions or ending instructions in step S11096, the continuity setting unit 11042 ends the continuity setting processing.

Also, in the event that determination is made that there has been no input of finalizing instructions or ending instruction in step S11096, the flow returns to step S11095, and hereafter the same processing is repeated.

In the event that determination is made in step S11095 that selection information has been supplied from the user I/F 11046 to the control unit 11065, the flow proceeds to step S11097, where the control unit 11065 adds or subtracts the distance L obtained in the immediately-preceding step S11092 to or from a movement amount candidate $V_a$, serving as continuity information obtained for yielding to the output image selected by the selection information supplied from the user I/F 11046, of the M versions of movement amount candidates previously set, and newly sets the addition value or subtraction value thereof to the maximum movement amount $V_{max}$ or minimum movement amount $V_{min}$, respectively.

Subsequently, the flow returns from step S11097 to S11091, and hereafter, the same processing is repeated.

Figure 125:
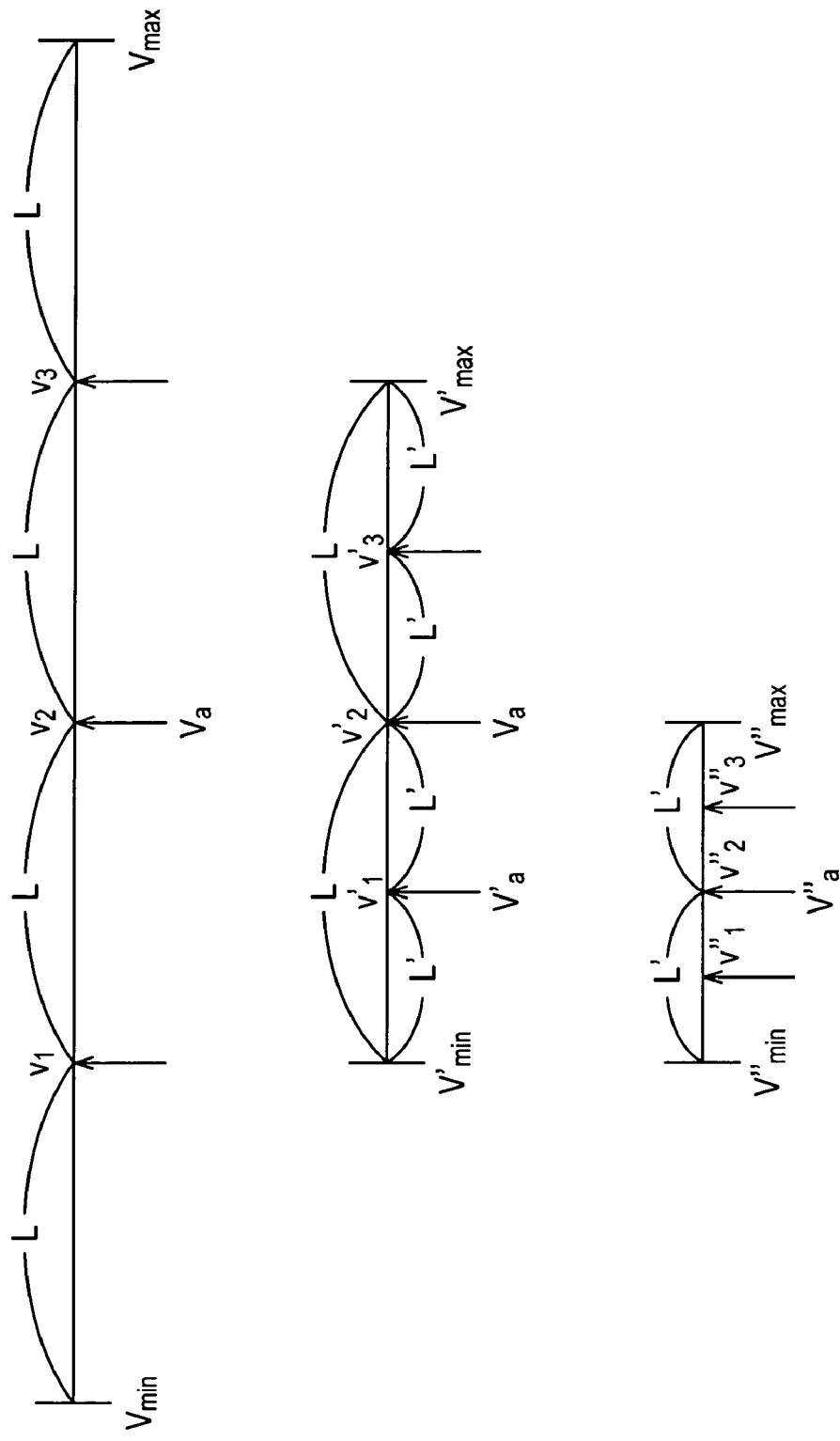

Accordingly, with M as 3, for example, the continuity setting unit 11042 first obtains 3 points $v_1$, $v_2$, and $v_3$, which equally divide the range from the minimal movement amount $V_{min}$ to the maximum movement amount $V_{max}$ into 4, as shown in FIG. 125, so that the values of the 3 points are set to the 3 movement amount candidates $v_1$, $v_2$, and $v_3$, and also the distance L between the adjacent 3 movement amount candidates $v_1$, $v_2$, and $v_3$ ($v_1$ and $v_2$, and $v_2$ and $v_3$) is obtained.

Further, if we say that the user has selected the output image obtained with regard to the movement amount candidate $v_2$ for example, from the output images obtained with regard to the three versions of movement amount candidates $v_1$, $v_2$, and $v_3$, the continuity setting unit 11042 sets values obtained by adding or subtracting the distance L to or from the movement amount candidate $v_a$ ($v_2$ in this case) used for obtaining the selected output image as the new maximal movement amount $V_{max}'$ or minimum movement amount $V_{min}'$ respectively, as shown in FIG. 125, obtains 3 points $v_1'$, $v_2'$, and $v_3'$, which equally divide the range from the minimal movement amount $V_{min}'$ to the maximum movement amount $V_{max}'$ into 4, so that the values of the 3 points are set to the 3 movement amount candidates $v_1'$, $v_2'$, and $v_3'$, and also the distance L' between the adjacent 3 movement amount candidates $v_1'$, $v_2'$, and $v_3'$ ($v_1'$ and $v_2'$, and $v_2'$ and $v_3'$) is obtained.

Then, if we say that the user has selected the output image obtained with regard to the movement amount candidate $v_1'$ for example, from the output image obtained with regard to the three movement amount candidates $v_1'$, $v_2'$, and $V_3'$, the continuity setting unit 11042 sets values obtained by adding or subtracting the distance L' to or from the movement amount candidate $v_a'$ ($v_1'$ in this case) used for obtaining the selected output image as the new maximal movement amount $V_{max}''$ or minimum movement amount $V_{min}''$ respectively, as shown in FIG. 125, obtains 3 points $v_1''$, $v_2''$, and $v_3''$, which equally divide the range from the minimal movement amount $V_{min}''$ to the maximum movement amount $V_{max}''$ into 4, so that the values of the 3 points are set to the 3 movement amount candidates $v_1''$, $v_2''$, and $v_3''$, and also the distance $L''$ between the adjacent 3 movement amount candidates $v_1''$, $v_2''$, and $v_3''$ ($v_1''$ and $v_2''$, and $v_2''$ and $v_3''$) is obtained.

Hereafter, the range of movement amount candidates is narrowed down in the same way, until finally, an output image is obtained having the true value (work extremely close to the true value) as continuity information.

That is to say, for example, let us say that M is 3, and that the minimum movement amount of $V_{min}$ and the maximum movement amount $V_{max}$ are 0 and 50, respectively. Further, let us say that the image employed as an input image has movement blurring such as obtained by taking an object such as an automobile or the like moving at a constant speed in the horizontal direction, as shown in FIG. 126 A, for example, and that the speed at which the object is moving, i.e., the true value of the movement amount, is 20.

In this case, the continuity setting unit obtains 3 points equally dividing the range from the minimum movement amount 0 to the maximum movement amount 50 into four, and the values of the 3 points are set as 3 movement amount candidates. Accordingly, 13 (=1×50/4), 25 (=2×50/4), 37 (=3×50/4) are set as the 3 movement amount candidates. Note that into your values are used for the values of the movement amount candidates by rounding off values smaller than the decimal point as appropriate.

Subsequently, input images are processed regarding the 3 movement amount candidates 13, 25, and 37, at the actual world estimating unit 11043 and image generating unit 11044, so that the three versions of the output images, which are the results of processing the input image with regard to the 3 movement amount candidates 13, 25, and 37, are displayed on the image display unit 11045, as shown in FIG. 126B.

The user selects the one of these three output images where the outline of the object is the clearest, i.e., that wherein the movement blurring in the input image has been most reduced. In this case, the true movement value is 20, so of the output images obtained regarding the three movement amount candidates 13, 25, and 37, the output image obtained regarding the movement amount candidate 25 closest to the true movement amount 20, for example, has the greatest reduction in movement blurring. Accordingly, the user selects the output image obtained regarding the movement amount candidate 25.

On the other hand, the distance L between the three points which equally divided the range from the minimum movement amount zero to the maximum movement amount 50 into four is 50/4, so upon the user selecting the output image, the continuity setting unit 11042 sets values wherein the distance 50/4 has been added or subtracted to or from the movement amount candidate 25 used for obtaining the selected output image, takes these each as the new maximum movement amount or minimum movement amount, and sets the three points equally dividing the range from the minimum movement amount to the maximum movement amount into four, as the three new movement amount candidates.

Accordingly, in this case, 19((=1×50/4+25))/2, 25(=2×50/4), 31(=3×50/4−25)/2) are set as the 3 movement amount candidates.

Subsequently, input images are processed regarding the 3 movement amount candidates 19, 25, and 31, at the actual world estimating unit 11043 and image generating unit 11044, so that the three versions of the output images, which are the results of processing the input image with regard to the 3 movement amount candidates 19, 25, and 31, are displayed on the image display unit 11045, as shown in FIG. 126C.

The same processing is repeated hereafter, whereby the true value of the movement amount is set as the movement amount candidate, and an output image is obtained regarding the true movement amount.

That is to say, of the three output images which are the processing results of the input image with regard to the three movement amount candidates 19, 25, and 31, the output image obtained regarding the movement amount candidate 19 closest to the true movement amount 20, for example, has the greatest reduction in movement blurring (the clearest). Accordingly, the user selects the output image obtained regarding the movement amount candidate 19.

In this case, the continuity setting unit 11042 sets three new movement amount candidates 16, 19, 22, in the same way as described above, and thereby 3 output images which are the processing results of the input image with regard to the three movement amount candidates 16, 19, and 22, are displayed on the image display unit 11045, as shown in FIG. 126D.

Of the three output images which are the processing results of the input image with regard to the three movement amount candidates 16, 19, and 22, the output image obtained regarding the movement amount candidate 19 closest to the true movement amount 20, for example, has the greatest reduction in movement blurring (the clearest). Accordingly, the user selects the output image obtained regarding the movement amount candidate 19.

In this case, the continuity setting unit 11042 sets three new movement amount candidates 18, 19, 20, in the same way as described above, and thereby 3 output images which are the processing results of the input image with regard to the three movement amount candidates 18, 19, and 20, are displayed on the image display unit 11045, as shown in FIG. 126E.

The movement amount candidate 20 is the true movement amount, and accordingly the output image obtained regarding the movement amount candidate 20 has the greatest reduction in movement blurring from the input image (the clearest).

Setting the true value as the movement amount representing the continuity of the actual world 1 enables an output image to be obtained by the actual world estimating unit 11043 and the image generating unit 11044 wherein the movement blurring, occurring due to time mixture, is removed (reduced). However, there may be cases wherein obtaining the true value of the continuity of the actual world 1 from the input image alone with the signal processing device 4 is difficult. Accordingly, there is a method wherein the user inputs the true value of the actual world 1 continuity, but it is difficult for the user to input the true value of the actual world 1 continuity and such as movement amount or the like, represented with numerical values.

On the other hand the user can readily determine or recognize whether or not the image quality has been improved in an output image, such as whether or not movement blurring has been reduced, simply by looking at the output image which is the results of processing.

Thus, movement blurring can be removed in an extremely efficient manner by the signal processing device 4 processing an input image with regard to M movement amount candidates so as to obtain M versions of output images, having the user to select from the M output images of that which has the most improvement in movement blurring, setting M new movement amount candidates according to the selection results thereof, obtaining M output images with regard to the M output amount candidates, and repeating this processing, as described above.

That is to say, the signal processing device 4 presents the user with processing results, and has the user to perform image quality recognition and judgment, which humans excel at. The signal processing device 4 receives feedback according to the recognition and judgment, and performs reprocessing. Thus, an image with image quality closer approximating the image corresponding to the actual world 1 signals can be easily obtained by cooperation between the user and the signal processing device 4, wherein the user performs recognition and judgment which humans excel at, and the signal processing device 4 receives the recognition and judgment feedback and performs processing (the signal processing) which it excels at.

Now, of the M output images which are the processing results on the input image with regard to the M movement amount candidates, basically, the output image obtained with regard to the movement amount candidate which is closest to the true movement amount will have the greatest reduction in movement blurring, but there may be cases wherein the user errs in image quality recognition and judgment of the output image, and selects an output image other than the output image obtained with regard to the movement amount candidate closest to the true movement amount. In such a case, basically, the image quality of the output image obtained regarding each of the new M movement amount candidates subsequently set will deteriorate over the image quality of the previous output images, so the user can recognize that the previous selection of output image was mistaken. In order to deal with such a case, the image display unit 11045 preferably displays a "return" button, for example, whereby the state of the signal processing device 4 can be returned to the state immediately prior to the previous output image selection, so that in a case that the user operates the "return" button, the state of the signal processing device 4 is returned to the state immediately prior to the previous output image selection.

Also, while the description made here has used an image obtained by taking a moving object as the input image, other examples include using as the input image an image wherein movement blurring has occurred due to the camera having the sensor 2 for taking the object moving, such as with an image taken with hands moving. In the event that the input image has camera shake blurring, an image wherein the camera shake blurring has been corrected can be obtained as an output image. Accordingly, the signal processing device 4 in FIG. 119 can be used as a movement blurring removing device or camera shake blurring correction device.

FIG. 127 illustrates a configuration example of an embodiment of an application example of the signal processing device 4 shown in FIG. 111.

In FIG. 127, the processing region setting unit 11071, the continuity setting unit 11072, the actual world estimating unit 11073, image generating unit 11074, image display unit 11075, and user I/F 11076, each correspond to the processing region setting unit 10001, the continuity setting unit 10002, the actual world estimating unit 10003, image generating unit 10004, image display unit 10005, and user I/F 10006 shown in FIG. 111, and basically perform the same processing as the processing region setting unit 10001, the continuity setting unit 10002, the actual world estimating unit 10003, image generating unit 10004, image display unit 10005, and user I/F 10006. Further, in FIG. 127, the actual world estimating unit 11073 comprises a model generating unit 11081, an equation generating unit 11082, and actual world waveform estimating unit 11083. The model generating unit 11081, equation generating unit 11082, and actual world waveform estimating unit 11083 correspond to each of the model generating unit 10011, equation generating unit 10012, and actual world waveform estimating unit 10013 in FIG. 111, and basically perform the same processing as each of the model generating unit 10011, equation generating unit 10012, and actual world waveform estimating unit 10013.

Note however, that in FIG. 127, the assisting information which the user I/F 11076 outputs by the user operating the user I/F 11076, is supplied only to the actual world estimating unit 11073.

That is to say, in FIG. 127, the user can instruct the model information regarding the model to be used for estimating the actual world 1 signal, by the user operating the user I/F 11076, and upon the user perform operations to instruct the model information, the user I/F 11076 supplies model information instructions representing the model information instructed by the operation to the actual world estimating unit 11073 as assisting information. Further, in FIG. 127, multiple output images are displayed on the image display unit 11075, as described later, and an output image displayed on the image display unit 11075 can be selected by the user operating the user I/F 11076, and upon the user making an operation to select an output image, the user I/F 11076 supplies selection information representing the output image selected by the operation to the actual world estimating unit 11073, as assisting information.

Now, models used for estimating actual world 1 signals include an approximation function serving as a model modeling actual world 1 light signal waveforms (e.g., the polynomial $f_3(x)$ ($=w_0+w_1x+w_2x^2+\ldots w_nx^n$) shown in Expression (46) and so forth), and a function (expression) serving as a model modeling the relation between the pixel values of each of the pixels within the image data obtained by the sensor 2 and the actual world 1 light signals, using the approximation function (e.g., Expression (103) (or Expression (104) and so forth). Hereafter, a model modeling actual world 1 light signal waveforms will be referred to as an approximation model, and a model modeling the relation between the pixel values of each of the pixels within the image data obtained by the sensor 2 and the actual world 1 light signals will be referred to as a relation model, as appropriate.

Information which instructs the order n of the approximation function $f_3(x)$ which is the polynomial shown in Expression (46) for example, can be used as the model instruction information. Also, while various functions such as spline functions, trigonometric functions, sigmoid functions, Gaussian functions, linear functions (linear expressions), functions with constant function values, and so forth, can be used for the approximation function, information instructing the type of approximation function to be used for estimating the actual world 1 signals can also be used for the model instructing information.

In this case, however, the approximation function $f_3(x)$ of the polynomial shown in Expression (46) for example, is used as the approximation model, and the information instructing the order n of the approximation function $f_3(x)$ which is the polynomial shown in Expression (46) for example is supplied from the user I/F 11076 to the actual world estimating unit 11073 as the model instruction information upon the user operating the user I/F 11076.

Next, the signal processing device 4 shown in FIG. 127 will be described with reference to the flowchart shown in FIG. 128.

First, in step S11101, the signal processing device 4 in FIG. 127 performs pre-processing, and the flow proceeds to step S11072. That is to say, the signal processing device 4 supplies one frame or one field, for example, of the input image, supplied from the sensor 2 (FIG. 1) as data 3, to the processing region setting unit 11071, continuity setting unit 11072, actual world estimating unit 11073, image generating unit 11074, and image display unit 11075. Further, the signal processing unit 4 causes the image display unit 10075 to display the input image.

In step S11102, the user I/F 11076 determines whether or not there has been input of model instruction information, by the user operating the user I/F 11076. In step S11102, in the event that determination is made that there is no input of model instruction information, the flow proceeds to step S11103, where the user I/F 11076 determines whether or not there has been input of ending instructions instructing ending of the processing of the signal processing device 4, by the user operating the user I/F 11076.

In the event that determination is made that there has been input of ending instructions in step S11103, that is to say, for example, in the event that the user who has viewed the input image displayed on the image display unit 11075, operates the user I/F 11076 so as to end the processing of the signal processing device 4 with no need for performing signal processing with regard to the input image, since the user did not find the image quality of the input image unsatisfactory, the processing ends.

Also, in the event that determination is made in step S11103 that there has been no input of ending instructions, the flow returns to step S11102, and hereafter the same processing is repeated.

On the other hand, in the event that determination is made in step S11102, that there has been input of model instruction information, that is to say, in the event that the user who has viewed the input image displayed on the image display unit 10075 and found the image quality of the input image unsatisfactory, and therefore operated the user I/F 11076 so as to instruct the order of the approximation function serving as the approximation models, the flow proceeds to step S11104, where the user I/F 11076 supplies model instruction information representing the order instructed by the user operating the user I/F 11076 to the actual world estimating unit 11073 as assisting information, and the flow proceeds to step S11105.

In step S11105, the processing region setting unit 11071 sets a processing region, and supplies to the continuity setting unit 11072, the actual world estimating unit 11073, and the image generating unit 11074, the processing region information representing the processing region, and the flow proceeds to step S11106. Now, an arrangement maybe made wherein the setting of the processing region in step S11105 is performed by the user inputting processing region instruction information, so as to be carried out based on the processing region instruction information, or, this may be carried out without processing region instruction information from the user.

In step S11106, the continuity setting unit 11072 recognizes the processing region in the input image from the processing region information supplied from the processing region setting unit 11071. Further, the continuity setting unit 11072 sets the continuity of the actual world 1 signals lost in the processing region image data, and supplies continuity information representing the continuity for the processing region to the actual world estimating unit 11073, and the flow proceeds to step S11107. Now, an arrangement maybe made wherein the setting of the continuity in step S11106 is performed by the user inputting continuity instruction information, so as to be carried out based on the continuity instruction information, or, this may be carried out without continuity instruction information from the user.

In step S11107, the actual world estimating unit 11073 estimates the actual world 1 signals with regard to the image data within the processing regions of the input image, according to the continuity of the corresponding actual world 1 signals.

That is to say, at the actual world estimating unit 11073, the model generating unit 11081 recognizes the processing region in the input image from the processing region information supplied from the processing region setting unit 11071, and recognizes the continuity of the actual world 1 signals corresponding to the processing region image data, based on the continuity information supplied from the continuity setting unit 11072. Further, the model generating unit 11081 generates M functions serving as relation models modeling the relation between the pixel values of each of the pixels within the processing region and the actual world 1 signals, corresponding to the pixels making up the processing region in the input image and the continuity of the actual world 1 signals corresponding to the image data of the processing region thereof, and supplies the M versions of functions to the equation generating unit 11082.

Now, in the event that model instruction information has been supplied as assisting information from the user I/F in the immediately-preceding step S11104, the model generating unit 11081 generates functions as M versions of relation models. That is to say, the model generating unit 11081 takes polynomials of M versions of orders including the order represented by the model instruction information supplied from the user I/F 11076 in the immediately-preceding step S11104 as approximation functions, and generates M versions of functions which are relation models using the M versions of approximation functions.

The equation generating unit 11082 recognizes the processing region in the input image from the processing region information supplied from the processing region setting unit 11071, and substitutes pixel values of pixels necessary to make up the input image into each of the M functions serving as relation models supplied from the model generating unit 11081, for each of the pixels in the processing region, thereby generating M equations for obtaining approximation functions approximating the actual world 1 signals, which are then supplied to the actual world waveform estimating unit 11083.

The actual world waveform estimating unit 11083 solves the equations for the M equations supplied from the equation generating unit 11082, thereby estimating waveforms of the actual world 1 signals, i.e., obtains approximation functions serving as models modeling the actual world 1 signals, and supplies the M versions of approximation functions to the image generating unit 11074.

Following the processing in step S11107, the flow proceeds to step S11108, where the image generating unit 11074 generates M signals closer approximating the actual world 1 signals, based on the M approximation functions supplied from (the actual world waveform estimating unit 11083 of) the actual world estimating unit 11073. That is to say, the image generating unit 11074 recognizes the processing region in the input image from the processing region information supplied from the processing region setting unit 11071, and generates M approximation images which are image data closer approximating the image corresponding to the actual world 1 signals, based on the M versions of approximation functions supplied from the actual world estimating unit 11073 for the processing region. Further, the image generating unit 11074 generates, as output images, M versions of images wherein the processing region portion in the input image has been replaced with the M approximation images, which are then supplied to the image display unit 11075, and the flow proceeds from step S11108 to step S11109.

In step S11109, the image display unit 11075 displays the M versions of output images supplied from the image generating unit 11074 instead of the input image displayed in step S11101, or along with the input image, and the flow proceeds to step S11110.

In step S11110, the user I/F 11076 determines whether or not there has been input of selection information by the user operating the user I/F 11076. That is to say, the M versions of output images are displayed on the image display unit 11075 in step S11109, and determination is made in step S11110 regarding whether or not the user, who has viewed the M versions of output images has input selection information for selecting an image with desired image quality or an image with image quality closer to the desired image quality from the M versions of output images, by operating the user I/F 11076.

In the event that determination is made in step S11110 that there has been no input of selection information, the flow proceeds to step S11113, and this with the case in step S11113, determination is made by the user I/F 11076 regarding whether there has been input of ending instructions.

In the event that determination is made in step S11113 that there has been input of ending instructions, the signal processing device 4 ends processing.

Also, in the event that determination is made that there has been no input of ending instructions in step S11113, the flow returns to step S11110, and hereafter the same processing is repeated.

On the other hand, in the event that determination is made in step S11110 that there has been input of selection information, i.e., in the event that the user, who has viewed the M versions of output images displayed on the image display unit 11075 has selected a desired image or an image with image quality closer to the desired image quality from the M versions of output images, the flow proceeds to step S11111, where the user I/F 11076 determines whether or not there has been input of finalizing instructions for finalizing the output image which the user has selected as a final output image, by the user operating the user I/F 11076.

In the event that determination is made in step S11111 that there has been input of finalizing instructions, the flow proceeds to step S11112, where the image display unit 11075 displays the output image which the user has selected on the entire screen thereof, for example, and the processing ends.

Also, in the event that determination is made that there has been no input of finalizing instructions in step S11111, i.e., in the event that the user has found the image quality of the selected output image to be unsatisfactory, and has not made input of finalizing instructions in order to perform processing once again, the flow returns to step S11104, where the user I/F 11076 supplies selection information representing the output image which the user has selected to the actual world estimating unit 11073, as the assisting information, and the flow proceeds to step S11105.

In step S11105, the processing region setting unit 11071 sets a processing region, in the same way as above, and supplies this processing region information representing the processing region to the continuity setting unit 11072, the actual world estimating unit 11073, and the image generating unit 11074, and the flow proceeds to step S11106. In step S11106, the continuity setting unit 11072 recognizes the processing region in the input image from the processing region information supplied from the processing region setting unit 11071, as in the same way as described above, sets the continuity of the actual world 1 signals lost in the image data at the processing region, and supplies continuity information representing that continuity to the actual world estimating unit 11073, and the flow proceeds to step S11107.

Note that in the event that the loop processing of steps S11104 through S11113 is to be performed, the processing regions set in step S11105 from the second time on for example, is the same as that that in the processing in step S11105 the previous time, and also, the continuity said in step S11106 the second time on is the same as that set in the previous step S11106. Accordingly, in the event that the loop processing of steps S11104 through S11113 is to be performed, the processing of steps S11105 and S11106 from the second time on may be skipped.

In step S11107, the actual world estimating unit 11073 estimates the actual world 1 signals of the image data within the processing region of the input image, according to the continuity of the corresponding actual world 1 signals.

That is to say, at the actual world estimating unit 11073, the model generating unit 11081 recognizes the processing region in the input image from the processing region information supplied from the processing region setting unit 11071, and recognizes the continuity of actual world 1 signals corresponding to the processing region image data from the continuity information supplied from the continuity setting unit 11072. Further, the model generating unit 11081 generates M versions of function serving a as relation models, based on the selection information serving as assisting information that has been supplied from the user I/F 11076 in the immediately-preceding step S11104, and supplies the M functions to the equation generating unit 11082.

Specifically, the model generating unit 11081 newly generates M functions which are relation models using M versions of approximation functions, wherein the approximation functions are polynomials of M versions of orders, including the order of the approximation function used to obtain the output image indicated by the selection information serving as assisting information supplied from the user I/F 11076 in the immediately-proceeding step S11104.

The equation generating unit 11082 recognizes the processing region in the input image from the processing region information supplied from the processing region setting unit 11071, and substitutes pixel values of pixels necessary for the input image into each of the function serving as the M versions relation models supplied from the model generating unit 11081, for each of the pixels in the processing region, thereby newly generating M equations for obtaining approximation function approximating the actual world 1 signals, which are supplied to the actual world waveform estimating unit 11083.

The actual world waveform estimating unit 11083 solves the M equation supplied from the equation generating unit 11082, thereby estimating the M versions of actual world 1 signal waveforms call i.e., newly obtains approximation function serving as models modeling of the actual world 1 signals, and supplies the M versions of approximations functions to the image generating unit 11074.

Following the processing in step S11107, the flow proceeds to step S11108, where the same processing is repeated hereafter.

That is to say, accordingly, the processing of steps S11104 through S11113 is repeated, and ultimately an order of an approximation function whereby a high-quality output image is obtained, i.e., an order of an approximation function approximating the actual world 1 light signals in a true manner is set, and consequently, a high-quality output image is obtained.

As described above, with the signal processing device 4 shown in FIG. 127 as well, M versions of the output images which are processing results of the input image are presented to the user, for the user to select the desired one from the M versions of output images, and processing is performed again based upon the selection results, so high-quality output images, meeting the user's preferences, can be easily obtained. That is to say, the signal processing device 4 presents the user with M versions of output images which are processing results of the input image. On the other hand, the user recognizes and judges the image quality of each of the M versions of output images, and gives feedback with the output images with excellent image quality to the signal processing device 4. The signal processing device 4 processes the input image again based upon the feedback from the user, and hereafter the same processing is repeated. Accordingly, high-quality output images, meeting user preferences, can be easily obtained.

Now, with the signal processing device 4 in FIG. 127, M actual world estimating units 11073 may be provided for estimation of the M versions of actual world 1 signals (calculating M approximation functions). Further, with the signal processing device 4 in FIG. 127, M image generating units 11074 may be provided for generating M output images from the M approximation functions.

FIG. 129 illustrates a configuration example of an embodiment of an application example of the signal processing device 4 shown in FIG. 111.

In FIG. 129, the processing region setting unit 11091, the continuity setting unit 11092, the actual world estimating unit 11093, image generating unit 11094, image display unit 11095, and user I/F 11096, each correspond to the processing region setting unit 10001, the continuity setting unit 10002, the actual world estimating unit 10003, image generating unit 10004, image display unit 10005, and user I/F 10006 shown in FIG. 111, and basically perform the same processing as the processing region setting unit 10001, the continuity setting unit 10002, the actual world estimating unit 10003, image generating unit 10004, image display unit 10005, and user I/F 10006. Further, in FIG. 129, the actual world estimating unit 11093 comprises a model generating unit 11101, an equation generating unit 11102, and actual world waveform estimating unit 11103. The model generating unit 11101, equation generating unit 11102, and actual world waveform estimating unit 11103 correspond to each of the model generating unit 10011, equation generating unit 10012, and actual world waveform estimating unit 10013, and basically perform the same functions as each of the model generating unit 10011, equation generating unit 10012, and actual world waveform estimating unit 10013.

In FIG. 129, the user operates the user I/F 11096, and processing region instruction information, continuity instruction information, or model instruction information, serving as assisting information output from the user I/F 11096, is supplied to the processing region setting unit 11091, continuity setting unit 11092, or actual world estimating unit 11093.

Next, the signal processing device 4 shown in FIG. 129 will be described with reference to the flowchart shown in FIG. 130 and FIG. 131.

First, in step S11121, the signal processing device 4 performs pre-processing, and the flow proceeds to step S11122. That is to say, the signal processing device 4 supplies one frame or one field, for example, of the input image, supplied from the sensor 2 (FIG. 1) as data 3, to the processing region setting unit 11091, continuity setting unit 11092, actual world estimating unit 11093, image generating unit 11094, and image display unit 11095. Further, the signal processing unit 4 causes the image display unit 10005 to display the input image.

In step S11122, the user I/F 11096 determines whether or not there has been input of processing region instruction information, by the user operating the user I/F 11096. In step S11122, in the event that determination is made that there has been user input of processing region instruction information, the flow proceeds to step S11123, where the user I/F 11096 supplies the processing region instruction information to the processing region setting unit 11091 as assisting information, and the flow proceeds to step S11124.

Also, in step S11122, in the event that determination is made that there has been no input of processing region instruction information, step S11123 is skipped and the flow proceeds to step S11124, where the user I/F 11096 determines whether or not there has been input of continuity instruction information by the user operating the user I/F 11096. In step S11124, in the event that determination is made that there has been user input of continuity instruction information, the flow proceeds to step S11125, where the user I/F 11096 supplies the continuity instruction information to the continuity setting unit 11092 as assisting information, and the flow proceeds to step S11126.

Also, in step S11124, in the event that determination is made that there has been no input of continuity instruction information, step S11125 is skipped and the flow proceeds to step S11126, where the user I/F 11096 determines whether or not there has been input of model instruction information by the user operating the user I/F 11096. In step S11126, in the event that determination is made that there has been user input of model instruction information, the flow proceeds to step S11127, where the user I/F 11096 supplies the model instruction information to the actual world setting unit 11093 as assisting information, and the flow proceeds to step S11128.

In step S11126, in the event that determination is made that there is no input of model instruction information, step S11127 is skipped and the flow proceeds to step S11128, where the user I/F 11096 determines whether or not there has been input of ending instructions instructing ending of the processing of the signal processing device 4, by the user operating the user I/F 11096.

In the event that determination is made that there has been input of ending instructions in step S11128, that is to say, for example, in the event that the user who has viewed the input image displayed on the image display unit 11095, operates the user I/F 11096 so as to end the processing of the signal processing device 4 with no need for performing signal processing with regard to the input image, since the user did not find the image quality of the input image unsatisfactory, the processing ends.

Also, in step S11128, in the event that determination is made that there has been no input of ending instructions, the flow proceeds to step S11129, where the user I/F 11096 determines whether or not all of supplying processing region instruction information to the processing region setting unit 11091, supplying continuity instruction information to the continuity setting unit 11092, and supplying model instruction information to the actual world setting unit 11093, has been performed. In the event that determination is made in step S11129 that not all of the supplying processing region instruction information to the processing region setting unit 11091, supplying continuity instruction information to the continuity setting unit 11092, or supplying model instruction information to the actual world setting unit 11093, has been performed, that is to say, in the event that the user has not input any one of processing region instruction information, continuity instruction information, or model instruction information, as assisting information, a message prompting the user to input the information which has not been input is displayed on the image display unit 11095 for example, and the flow returns to step S11122 and the hereafter the same processing is repeated.

On the other hand, in the event that determination is made in step S11129 that all of the supplying processing region instruction information to the processing region setting unit 11091, supplying continuity instruction information to the continuity setting unit 11092, or supplying model instruction information to the actual world setting unit 11093, has been performed, the flow proceeds to step S11130, the processing region setting unit 11091 sets the processing region based on processing region instruction information supplied from the user I/F immediately before, and supplies the processing region instruction information to the continuity setting unit 11092, actual world setting unit 11093, and image generating unit 11094, and the flow proceeds to step S11131.

In step S11131, the continuity setting unit 11092 recognizes the processing region in the input image, from the processing region information supplied from the processing region setting unit 11091. Further, the continuity setting unit 11092 sets the continuity of the actual world 1 signals lost in the image data at a processing region, based on the continuity instruction information supplied from the user I/F 11096 immediately before, and supplies the continuity information representing that continuity to the actual world estimating unit 11093, and the flow proceeds to step S11132.

In step S11132, the actual world estimating unit 11093 estimates the actual world 1 signals as for the image data within the processing region in the input image, according to the continuity of the actual world 1 signals.

That is to say, at the actual world estimating unit 11093, the model generating unit 11101 recognizes the processing region in the input image from the processing region information supplied from the processing region setting unit 11091, and also recognizes the continuity of the actual world 1 signals corresponding to the processing region image data, from the continuity information supplied from the continuity setting unit 11092. Further, the model generating unit 11101 generates a function serving as the relational model modeling the relation between the pixel values of each of the pixels within the processing region and the actual world 1 signals, corresponding to the pixels making up the processing region in the input image, and the continuity of the actual world 1 signals corresponding to the image data at the processing region, based on the model instruction information supplied from the user I/F 11096 immediately before, and supplies this to the equation generating unit 11102.

The equation generating unit 11102 recognizes the processing region in the input image from the processing region information supplied from the processing region setting unit 11091, and substitutes the pixel values of the pixels necessary for the input image into the function serving as thereof relation model supplied from the model generating unit 11101, for the pixels of the processing region, thereby generating an equation for obtaining an approximation function approximating the actual world 1 signals, which is supplied to the actual world waveform estimating unit 11103.

The actual world waveform estimating unit 11103 solves the equation supplied from the equation generating unit 11102 so as to estimate the actual world 1 signals, i.e., obtain an approximation function serving as a model modeling the actual world 1 signals, which is supplied to the image generating unit 11094.

Following the processing in step S11132, the flow proceeds to step S11133, where the image generating unit 11094 generates signals closer approximating the actual world 1 signals, based on the approximation function regarding the processing region supplied from (the actual world waveform estimating unit 11103 of) the actual world estimating unit 11093. That is to say, the image generating unit 11094 recognizes the processing region in the input image from the processing region information supplied from the processing region setting unit 11091, and generates an approximation image closer approximating the actual world 1 signals, based on the approximation function supplied from the actual world estimating unit 11093 for the processing region. Further, the image generating unit 11094 generates, as an output image, an image wherein the processing region portion in the input image has been replaced with the approximation image obtained, which is then supplied to the image display unit 11095, and the flow proceeds from step S11133 to step S11134.

In step S11134, the image display unit 11095 displays the output image supplied from the image generating unit 11094 instead of the input image displayed in step S11121, or along with the input image, and the flow proceeds to step S11141.

In step S11141, the user I/F 11096 determines whether or not there has been input of processing region instruction information from the user, in the same way as with step S11122. In the event that determination is made in step S11141, i.e., in the event that the user who has reviewed the output image displayed in the immediately-preceding step S11134 feels that the image quality there of is unsatisfactory and newly inputs processing region instruction information by a operating the user I/F 11096 to improve the image quality, for example, the flow proceeds to step S1142, the user I/F 11096 supplies the processing region instruction information to the processing region setting unit 11091 as assisting information, and the flow returns to step S11130 in FIG. 130.

In this case, in step S11130, the processing region setting unit 11091 sets a new processing region based on the processing region instruction information supplied from the user I/F 11096 immediately before, and supplies processing region information representing the processing region to the continuity setting unit 11092, actual world estimating unit 11093, and the image generating unit 11094, and the flow sequentially proceeds through step S11131 through S11133. In step S11131 through S11133, processing the same as that described above is performed regarding the new processing region, thereby generating a new output image, and the flow proceeds to step S11134. In step S11134, the image display unit 11095 displays the output image generated regarding the new processing region, and the flow proceeds to step S11141 in FIG. 131, and hereafter the same processing is repeated.

Also, in the event that determination is made in step is 11141 that there has been no input of processing region instruction information, the flow skips the step S11142, proceeds to step is 11143, and the user I/F 11096 determines whether or not there has been new input of continuity instruction information from the user, in the same way as with the case in step S11124. In step is 11143, in the event that determination is made that there has been input of continuity instruction information, i.e., for example, in the event that the user who has reviewed the output image displayed in the immediately-preceding step S11134 feels that the image quality there of is unsatisfactory and inputs new continuity instruction information by operating the user I/F 11096 in order to improve the image quality, the flow proceeds to step this 1144, where the user I/F 11096 supplies that continuity instruction information to the continuity setting unit 11096 as assisting information, and the flow returns to step S11131 in FIG. 130.

In this case, in step S11131, the continuity setting unit 11092 newly sets continuity of the actual world 1 signals lost in the image data that the processing region recognized by the processing region information supplied the previous time from the processing region setting unit 11092, based shown the continuity instruction information supplied from the user I/F 11096 immediately before, and supplies the continuity information representing the continuity newly set thereto to the actual world estimating unit 11093, and sequentially proceeds to step S11132 and S11133. In step S11132 and S11133, processing the same as that described above is performed regarding the newly set continuity, thereby generating a new image, and the flow proceeds to step S11134. In step this 11134, the image display unit 11095 displays the output image generated with regard to the newly set continuity, the flow proceeds to step as 11141 in FIG. 131, and hereafter the same processing is repeated.

Also, in step S11143, in the event that determination is made that there has not been input of continuity instruction information step S11144 is skipped and the flow proceeds to step is 11145, where the user I/F 11096 determines whether or not there has been new input of model instruction information from the user, in the same way as with the case in step S11126. In the event that determination is made in step S11145 that there has been input of model instruction information, i.e., in the event that the user who has reviewed the output image displayed in the immediately-preceding step S11134 feels that the image quality thereof is unsatisfactory and inputs new model instruction information by operating the user I/F 11096 in order to improve the image quality, the flow proceeds to step S11146, where the user I/F 11096 supplies that model instruction information to the continuity setting unit 11096 as assisting information, and the flow returns to step S11132 in FIG. 130.

In this case, in step S11132, the actual world estimating unit 11093 newly estimates the actual world 1 signals as for the image data within the processing region in the input image, according to the model instruction information input from the user I/F immediately before.

That is to say, at the actual world estimating unit 11093, the model generating unit 11101 newly generates a function serving as the relational model modeling the relation between the pixel values of each of the pixels within the processing region and the actual world 1 signals, corresponding to the pixels making up the processing region recognized by the processing region information supplied the previous time from the processing region setting unit 11091, and the continuity of the actual world 1 signals corresponding to the image data at the processing region, recognized by the continuity information supplied from the continuity setting unit 111092 the previous time, based on the model instruction information supplied from the user I/F 11096 immediately before, and supplies this to the equation generating unit 11102.

The equation generating unit 11102 substitutes the pixel values of the pixels necessary for the input image into the function serving as a relation model supplied from the model generating unit 11101, for the pixels of the processing region recognized by the processing region in the input image from the processing region information supplied from the processing region setting unit 11091 the previous time, thereby newly generating an equation for obtaining an approximation function approximating the actual world 1 signals, which is supplied to the actual world waveform estimating unit 11103.

Following the processing in step S11132, the flow proceeds to step S11133, where the image generating unit 11094 newly generates signals closer approximating the actual world 1 signals, based on the approximation function newly supplied from (the actual world waveform estimating unit 11103 of) the actual world estimating unit 11093. That is to say, the image generating unit 11094 generates an approximation image closer approximating the actual world 1 signals, regarding the processing region recognized from the processing region information supplied from the processing region setting unit 11091 the previous time, based on the approximation function newly supplied from the actual world estimating unit 11093. Further, the image generating unit 11094 newly generates, as an output image, an image wherein the processing region portion in the input image has been replaced with the approximation image, which is then supplied to the image display unit 11095, and the flow proceeds from step S11133 to step S11134.

In step S11134, the image display unit 11095 displays the output image generated with regard to the function serving as a new relation model, the flow proceeds to step S11141 in FIG. 131, and hereafter the same processing is repeated.

On the other hand, in the event that determination is made in step S11145 that there has been no input of model instruction information, the flow proceeds to step S11147, where the user I/F 11096 determines whether or not there has been input of ending instructions for ending the processing of the signals processing device by operating the user I/F 11096.

In the event that determination is made in step S11147 that there has been no input of ending instructions, i.e., in the event that the user who has reviewed the output image displayed on the image display unit 11095 for example feels that the image quality thereof is unsatisfactory and is attempting to obtain an output image with better image quality by inputting processing region instruction information, continuity instruction information, or model instruction information, the flow returns to step S11141, and hereafter the same processing is repeated.

Also, in the event that determination is made in step S11147 that there has been input of ending instructions, i.e., in the event that the user who has viewed the output image displayed on the image display unit 11095 for example feels that the image quality thereof is satisfactory and has operated the user I/F 11096 to end the processing of the signal processing device 4, the processing ends.

As described above, with the signal processing device 4 in FIG. 129, a processing region and continuity are set based on input from the user, and also a relation model to be employed for estimation of the actual world 1 signals is generated. Further, the actual world 1 signals are estimated using the processing region, continuity, and the relation model, and an output image is generated using the actual world 1 signals. Subsequently, the output image is presented to the user, and in the event that the user is not satisfied with the image quality thereof, upon the user performing input for changing the processing region, continuity, or relation model, a new processing region, continuity, or relation model is set (generated) based on the input, and generation of a new output image is repeated.

That is to say, for example, as shown in FIG. 132, in a state wherein an input image is displayed on the image display unit 11095, the user instructs the region having the dissatisfied image quality as a processing region by operating the user interface 11096 made up of the buttons, knob, and mouse.

Note that as for a method for a user instructing a processing region, for example, a method for clicking two points on an input image by operating the mouse serving as the user interface 11096 is provided. In this case, the processing region setting unit 11091 sets the rectangular region of which the diagonal line is made up of the two clicked pointes as a processing region.

Also, examples of the region having an image quality unsatisfactory to the user include a region wherein movement blurring occurs due to time mixture as described above, and a region wherein resolution is deteriorated due to mixture in the spatial direction (space mixture) of the signal as to two objects due to the spatial integration effects of the sensor 2.

Now, in this case, let us say that with an input image, for example, a fine linear object such as a faraway rope is displayed, and space mixture occurs between the rope and the background signal at the boundary portion of the rope, and consequently, the user instructs the region of which resolution is deteriorated due to the space mixture as a processing region. In the event that the user instructs the processing region by clicking two points on the input image, the image display unit 11095 can display (present) a frame surrounding the rectangular processing region with the clicked two points as the diagonal line thereof, and the user can confirm regarding whether or not an appropriate processing region is set with reference to this frame. Note that the processing region can be differently instructed again by clicking two points on the input image again.

Further, as shown in FIG. 132, the user instructs the actual world 1 continuity corresponding to the image displayed on the processing region by operating the buttons, knob, or mouse making up the user interface 11096, for example. In this case, the continuity setting unit 11092 sets the instructed continuity without any change.

As for a method for instructing continuity by the user, a method for instructing the direction of the actual world continuity corresponding to the image displayed on the processing region is provided by operating the knob serving as the user interface 11096, for example. That is to say, in this case, as described above, the fine linear object such as a rope is displayed on the input image, but the user instructs the direction where the linear object extends (the gradient of the straight line representing the linear object) as the continuity direction. In this case, the image display unit 11095 can display an arrow (of the image) which rotates according to operations of the knob serving as the user interface 11096, and the user can confirm regarding whether or not appropriate continuity is set by this arrow.

Also, the user instructs a model to be employed for estimation of the actual world 1 signal by operating the user interface 11096. That is to say, now, if we say that with the actual world estimating unit 11093, for example, a polynomial f3(x) (=$w_0+w_1x+w_2x^2+\ldots+w_nx^n$) shown in Expression (46) is employed as an approximation function, the user instructs the number of dimensions n of the approximation function by operating the user interface 11096. In this case, the actual world estimating unit 11093 generates a relation model using the instructed polynomial of the number of dimensions n as an approximation function.

As described above, the signal processing device 4 in FIG. 129 estimates the actual world 1 signal using the processing region, continuity, and relation model to be obtained based on input from the user, and generates an output image using the actual world 1 signal. Subsequently, the output image is presented to the user, and in the event that the user is not satisfied with the image quality thereof, upon the user performing input for changing the processing region, continuity, or relation model, the input is fed back to the signal processing device 4, and the signal processing device 4 generates a new output image using the new processing region, continuity, or relation model obtained based on the input.

Accordingly, the user can obtain an output image having high image quality by operating the user interface 11096 while viewing the output image.

Next, description will be made with reference to the flowchart in FIG. 133 regarding the details of the actual world estimating processing by the actual world estimating unit 11093 (processing in step S11132 in FIG. 130) and the generating processing of an output image by the image generating unit 11094 (processing in step S11133 in FIG. 130), in the event that a fine linear object such as a faraway rope is displayed as described above, and an input image wherein space mixture between the rope and the background signal occurs at the boundary portion of the rope is input to the signal processing device 4 in FIG. 129, for example.

Now, let us say that with the processing region setting unit 11091, as shown in FIG. 134, a region having resolution deteriorated due to space mixture in an input image is set as a processing region, and the processing region information representing the processing region is output. Further, let us say that with the continuity setting unit 11092, as shown in FIG. 134, the continuity of the linear object in the input image is set, and the continuity direction thereof, i.e., the continuity information representing the direction where the linear object extends is output. Also, let us say that with the actual world estimating unit 11093, a polynomial f(x) shown in Expression (137) identical to Expression (46) is employed as an approximation function. That is to say, here, let us say that when estimating the actual world 1 signal, a first function approximating method (one-dimensional approximating method) is employed.

$$f(x) = w_0 + w_1 x + w_2 x_2 + \ldots + w_N x^N = \sum_{n=0}^{N} w_n x^n \quad (137)$$

Here, in Expression (137), x represents a position (coordinate) in the x direction on a pixel making up a processing region, and $w_n$ represents coefficients characterizing the approximation function f(x).

Also, let us say that model instruction information representing the number of dimensions N of the approximation function f(x) is supplied to the actual world estimating unit 11093 from the user interface 11096.

Returning to FIG. 133, in step S11161, the model generating unit 11101 of the actual world estimating unit 11096 generates a function (expression) serving as a function model based on the model instruction information supplied from the user interface 11096, and the continuity information supplied from the continuity setting unit 11092.

That is to say, in this case, the model generating unit 11101 generates a function serving as a function model shown in Expression (138) identical to the above Expression (46) using the approximation function f(x) in Expression (137).

$$P = \int_{x_s}^{x_e} f(x) dx \quad (138)$$
$$= \int_{x_s}^{x_e} (w_0 + w_1 x^1 + w_2 x^2 + \ldots + w_N x^N) dx$$
$$= w_0(x_e - x_s) + \ldots + w_{n-1} \frac{x_e^N - x_s^N}{N} + w_n \frac{x_e^{N+1} - x_s^{N+1}}{N+1}$$

Here, in Expression (138), a variable P in the left side represents the pixel value of a pixel making up the input image.

The relation model of Expression (138) is for modeling the relation between the pixel value of a pixel in the input image which the sensor 2 outputs and the actual world 1 light signal assuming that the pixel value P obtained at a certain pixel of the sensor 2 is a value obtained by integrating the approximation function f(x) representing the actual world signals (model approximating the actual world signals) in a range between a position $x_s$ at the left end and a position $x_e$ at the right end on the pixel P.

That is to say, the one-dimensional approximating method is for modeling the relation between the pixel value of a pixel making up the processing region and the actual world 1 light signal assuming that the pixel value of each pixel corresponding to a certain position in the one-dimensional direction in the time-space directions x, y, and t of an approximation model is obtained by integrating the approximation model in the one-dimensional direction. With the relation model of Expression(138), the pixel value of a pixel making up the processing region is correlated with the actual world 1 light signal assuming that the pixel value of each pixel corresponding to a certain position in the x direction in the time-space directions x, y, and t of the approximation model is obtained by integrating the approximation model in the x direction.

Note that the number of dimensions N of the approximation function f(x) in Expression (138) is determined based on the model instruction information supplied from the user interface 11096.

Also, in Expression (138), the start point $x_s$ and the end point $x_e$ in the integration range are determined based on the continuity information supplied from the continuity setting unit 11092. That is to say, here, the start point $x_s$ and the end point $x_e$ in the integration range are represented with the following expression.

$$x_s = x - C_x(y) - 0.5$$

$$x_e = x - C_x(y) + 0.5 \quad (139)$$

In Expression (139), let us say that as shown in FIG. 82, the widths in the x direction and in the y direction of a pixel are both 1, and the origin (0, 0) is taken at the center (center of gravity) of a pixel of interest to be set in step S11162 described later. Also, in Expression (139), if we say that as with the cases described with Expression (42) and Expression (43), $C_x(y)$ represents the shift amount of the integration range, and an angle made up of the direction extended from the linear object and the x axis is represented with θ in the input image, $C_x(y)$ is represented with the following expression.

$$C_x(y) = \frac{y}{\tan\theta} \quad (140)$$

With the model generating unit 11101, the angle θ in Expression (140) is recognized based on the continuity information.

In step S11161, the model generating unit 11101 generates a relation model represented with Expression (138) regarding each pixel making up the processing region to be identified by the processing region information supplied from the processing region setting unit 11091, supplies this to the equation generating unit 11102, and the flow proceeds to step S11162.

In step S11162, the equation generating unit 11102 selects a pixel, which has not been taken as a pixel of interest of pixels making up the processing region to be identified from the processing region information supplied from the processing region setting unit 11091, as a pixel of interest, and the flow proceeds to step S11163. In step S11163, the equation generating unit 11102 sets a region of the input image to be employed for an equation to be formulated for obtaining an approximation model representing the actual world light signal integrated with the pixel of interest regarding the pixel of interest (hereafter, referred to as "equation region" as appropriate). That is to say, the equation generating unit 11102 sets, for example, $x_a \times y_a$ pixels, i.e., horizontal (x) direction×vertical (y) direction including the pixel of interest in the input image to the equation region. Here, the number of pixels $x_a$ and $y_a$ in the horizontal and vertical directions making up the equation region may be preset, or may be input by the user operating the user interface 11096. Also, in the above case, the M versions of output images of which the processing region, continuity, or approximation model differs have been generated, but an arrangement may be made wherein the M versions of output images of which the combinations of the number of pixels $x_a$ and $y_a$ in the horizontal and vertical directions making up the equation region differs are generated. In this case, an arrangement may be made wherein one of the M versions of output images which is selected by the user is fed back to the equation generating unit 11102, the M versions of new equation regions are set, and an output image is generated again regarding each of the M versions of equation regions.

Following the processing in step S11163, the flow proceeds to step S11164, where the equation generating unit 11102 generates an equation for obtaining an approximation model representing the actual world 1 light signal integrated with the pixel of interest by acquiring the pixel value of each pixel of the equation region regarding the pixel of interest, and substituting this for the relation model of Expression (138) generated regarding the pixel of interest.

That is to say, now, let us say that a region of 3×3 pixels with the pixel of interest as a center is employed as an equation region. Further, let us say that the coordinates system shown in FIG. 82 wherein the horizontal and vertical widths of a pixel are both 1, and the center position of the pixel of interest is taken as the origin is installed, and each pixel value of 3×3 pixels in the equation region is represented as P(x, y) using the coordinate (x, y) of the center of the pixel. In this case, the pixel value of the pixel of interest is represented as P(0, 0). Also, the pixel value of the pixel lower left of the pixel of interest is represented as P(−1, −1), and the pixel value of the pixel lower of the pixel of interest is represented as P(0, −1). Hereinafter, similarly, the pixel values of the pixels lower right, left, right, upper left, upper, and upper right of the pixel of interest are represented as P(1, −1), P(−1, 0), P(1, 0), P(−1, 1), P(0, 1), and P(1, 1) respectively.

In this case, the equation generating unit 11102 generates an equation made up of nine expressions shown in Expression (141) regarding the pixel of interest by substituting the pixel values of nine pixels in the equation region for the relation model of Expression (138).

$$P(-1,-1) = \int_{-1-C_x(-1)-0.5}^{-1-C_x(-1)+0.5} f(x)dx$$

$$P(0,-1) = \int_{0-C_x(-1)-0.5}^{0-C_x(-1)+0.5} f(x)dx \quad (141)$$

$$P(1,-1) = \int_{1-C_x(-1)-0.5}^{1-C_x(-1)+0.5} f(x)dx$$

-continued $$P(-1, 0) = \int_{-1-0.5}^{-1+0.5} f(x)dx$$

$$P(0, 0) = \int_{0-0.5}^{0+0.5} f(x)dx$$

$$P(1, 0) = \int_{1-0.5}^{1+0.5} f(x)dx$$

$$P(-1, 1) = \int_{-1-C_x(1)-0.5}^{-1-C_x(1)+0.5} f(x)dx$$

$$P(0, 1) = \int_{0-C_x(1)-0.5}^{0-C_x(1)+0.5} f(x)dx$$

$$P(1, 1) = \int_{1-C_x(1)-0.5}^{1-C_x(1)+0.5} f(x)dx$$

Here, with the equation generating unit 11102, the number of equations to be formulated regarding the pixel of interest is equal to the number of pixels making up the equation region. Accordingly, the number dimensions N of the approximation function f(x) in Expression (137) to be obtained by solving the equations to be formulated regarding the pixel of interest (number of unknowns $w_n$) is restricted to the number of the pixels making up the equation region. Speaking inversely, the number of pixels making up the equation region needs to be determined according to the number of dimensions N of the approximation function f(x) of Expression (137).

Upon the equation generating unit 11102 generating the equations regarding the pixel of interest, the equation generating unit 11102 supplies the equations to the actual world waveform estimating unit 11103, and the flow proceeds to step S11165 from step S11164.

In step S11165, the actual world waveform estimating unit 11103 estimates the waveform of the actual world 1 light signal integrated with the pixel of interest by solving the equations regarding the pixel of interest supplied from the equation generating unit 11102, for example, with the least-square method, or the like. That is to say, in step S11165, the actual world waveform estimating unit 11103 obtains variables $w_n$ serving as a parameter stipulating the approximation function f(x) of Expression (137) by solving the equations regarding the pixel of interest supplied from the equation generating unit 11102, and thus, obtains (identifies) the approximation function f(x) stipulated with the variables $w_n$.

The actual world waveform estimating unit 11103 supplies the approximation function f(x) obtained regarding the pixel of interest to the image generating unit 11094, and the flow proceeds to step S11166 from step S11165.

In step S11166, the equation generating unit 11102 determines regarding whether or not all the pixels making up the processing region to be identified from the processing region information supplied from the processing region setting unit 11091 have been taken as a pixel of interest. In step S11166, in the event that determination is made that all the pixels making up the processing region have not been taken as a pixel of interest, the flow returns to step S11162, where the equation generating unit 11102 selects, as a new pixel of interest, one of the pixels which have not been taken as a pixel of interest from the pixels making up the processing region, and hereinafter, the same processing is repeated.

Here, the above processing in steps S11161 through S11166 is performed in step S11132 in FIG. 130 (estimation of the actual world).

On the other hand, in the event that determination is made in step S11166 that all the pixels making up the processing region have been taken as a pixel of interest, the flow proceeds to step S11167, where the image generating unit 11094 selects as a pixel of interest one of the pixels, which have not been taken as a pixel of interest, making the processing region to be identified from the processing region information supplied from the processing region setting unit 11091, the flow proceeds to step S11168.

In step S11168, the image generating unit 11094 obtains a pixel value Q having a high image quality regarding the pixel of interest by integrating (reintegrating) the approximation function (hereinafter, referred to as "approximation function of interest" as appropriate) f(x) regarding the pixel of interest, of the approximation functions supplied from the actual world waveform estimating unit 11103, in the x direction in accordance with Expression (142) identical with the relation model of Expression (138).

$$Q = G \int_{x_s}^{x_e} f(x)dx \qquad (142)$$

However, in Expression (142), G represents a predetermined gain. Also, in Expression (142), the start point $x_s$ and the end point $x_e$ of the integration range are determined based on the continuity information supplied from the continuity setting unit 11092. That is to say, here, the start point $x_s$ and the end point $x_e$ of the integration range are, for example, represented with the following expression identical with Expression (139).

$$x_s = x - C_x(y) - 0.5$$

$$x_e = x - C_x(Y) + 0.5 \qquad (143)$$

Subsequently, the flow proceeds to step S11169 from step S11168, where the image generating unit 11094 determines regarding whether or not all the pixels making up the processing region have been taken as a pixel of interest. In the event that determination is made in step S11169 that all the pixels making up the processing region have not been taken as a pixel of interest, the flow returns to step S11167, where the image generating unit 11094 selects as a pixel of interest one of the pixels which have not been taken as a pixel of interest, making up the processing region, and hereinafter, the same processing is repeated.

Also, in the event that determination is made in step S11169 that all the pixels making up the processing region have been taken as a pixel of interest, i.e., in the event that an image (approximation image) made up of pixel values having a high image quality is generated regarding the processing region, the flow proceeds to step S11170, where the image generating unit 11094 synthesizes the input image with the approximation image generated based on the approximation function, and thus, generates an image wherein the processing region portion of the input image is substituted with the approximation image, supplies the image to the image display unit 10005 as an output image, and the processing ends.

Here, the above processing in steps S11167 through S11170 is performed in step S11133 in FIG. 130 (generation of an output image).

According to the start point $x_s$ and the end point $x_e$ of the integration range shown in Expression (143), one pixel of the processing region is taken as one pixel of the approximation image, and the pixel value Q of the one pixel is obtained by performing reintegration of Expression (142). Accordingly, in this case, the approximation image identical with the number of pixels of the processing region is generated, but an image having more the number of pixels than the processing region may be obtained as an approximation image.

That is to say, the image generating unit 11094 can obtain an approximation image having double the number of pixels in the x direction of the processing region by calculating reintegration of Expression (142) employing Expression (144) and Expression (145) as the start point $x_s$ and the end point $x_e$ of the integration range.

$$x_s = x - C_x(y) - 0.5$$

$$x_e = x - C_x(y) \quad (144)$$

$$x_s = x - C_x(y)$$

$$x_e = x - C_x(y) + 0.5 \quad (145)$$

Here, the integration ranges represented with Expression (144) and Expression (145) are ranges obtained by equally dividing the integration range represented with Expression (143) into two portions. Accordingly, in the event of employing the integration ranges represented with Expression (144) and Expression (145), one pixel of the processing region is taken as an approximation image of two pixels, and the pixel value Q of the two pixels are obtained by performing reintegration of Expression (142) regarding the integration ranges represented with Expression (144) and Expression (145) respectively.

That is to say, the integration range of Expression (144) represents a range from the left end position $x_s$ of the pixel of interest in the processing region to the center thereof, and the integration range of Expression (145) represents a range from the center of the pixel of interest to the right end position $x_e$ thereof.

Accordingly, for example, now, if we say that the pixel of interest is divided into left side and right side from the center thereof, and the pixel on the left side and the pixel on the right side are referred to as a first pixel of interest, and a second pixel of interest respectively, the pixel value of the first pixel of interest is obtained by performing reintegration of Expression (142) regarding the integration range represented with Expression (144), and the pixel value of the second pixel of interest is obtained by performing reintegration of Expression (142) regarding the integration range represented with Expression (145). In this case, an approximation image having high quality image of which the spatial resolution in the x direction is improved can be obtained.

Note that the integration range of reintegration of Expression (142) is not restricted to those shown in Expression (143), Expression (144), and Expression (145).

Also, the integration ranges shown in Expression (144) and Expression (145) are for dividing the pixel of interest into two pixels, but an approximation image having high quality image of which the spatial resolution is further improved can be obtained by employing an integration range for dividing the pixel of interest more finely. Note that in the event of dividing the pixel of interest more finely, the number of pixels making up an approximation image increases, but this enables improvement of the spatial resolution, and realization of zoom with high magnification.

Here, the estimating processing of the actual world, and the generating processing of an output image such as shown in the flowchart in FIG. 133 are collectively referred to as the present processing as appropriate, hereinafter.

According to the present processing, an output image wherein the image quality of an input image deteriorated due to time mixture or space mixture is improved can be obtained.

That is to say, for example, now, if we explain about space mixture, the actual world 1 light signals are clearly classified into the light signal corresponding to the foreground (e.g., fine line or the like) (portion shown with white color in the drawing), and the light signal corresponding to the background (portion shown with black color in the drawing), as shown in FIG. 135A.

In the event that the same level portions of the actual world 1 light signals are not uniformly distributed, and the light signals having a different level such as the foreground and the background are distributed respectively on a pixel of the image sensor serving as the sensor 2, different light levels make up one pixel value as if they were spatially mixed (integrated in the spatial direction) at the pixel due to the integration effects of the sensor 2. Thus, space mixture is a phenomenon wherein different level portions are mixed by being spatially integrated with the pixel of the sensor 2, such as the foreground portion and the background portion of the actual world 1 light signal.

The input image to be output from the sensor 2 comprises pixel values obtained by the actual world 1 light signal being integrated with a pixel having a certain finite size making up the sensor 2, and further being quantized with a pixel having a certain finite size, and accordingly, for example, becomes a distorted image due to space mixture and quantization, as shown in FIG. 135B.

Consequently, with the present processing, an approximation image is generated by estimating the actual world 1 signal based on the continuity of the actual world 1 signal corresponding to the processing region in the input image, and removing (reducing) distortion in the input image using the estimated actual world 1 signal.

That is to say, for example, with the present processing employing the one-dimensional approximating method, a relation model is generated based on the continuity information, and a region made up of $x_a \times y_a$ pixels in the vicinity of the pixel of interest in the processing region is taken as an equation region. Further, an equation for obtaining the approximation model f(x) of the actual world 1 light signal in the pixel of interest is generated by substituting the pixel value of a pixel of the equation region for the relation model. Subsequently, the approximation model f(x) representing the actual world 1 signal in the pixel of interest is obtained by solving the equation, and an approximation image having high image quality is obtained by reintegrating the approximation model f(x).

Specifically, for example, as shown in FIG. 136A, a region made up of $x_a \times y_a$ pixels in the vicinity of the pixel of interest in the input image (region having 3×3 pixels in FIG. 136A) is taken as an equation region. In FIG. 136A, the x axis is taken in the horizontal direction, the y axis is taken in the depth direction respectively, and also (the levels of) pixel values are taken in the vertical direction, thereby representing the pixel value of the pixel at each position (x, y) of the sensor 2. In FIG. 136A, a pixel value is represented with a rectangular parallelepiped, and the bottom face of this rectangular parallelepiped is equivalent to a pixel of the sensor 2.

With the present processing, the pixel value of each pixel of the equation region is further acquired, as shown in FIG. 136B. In FIG. 136B, the x axis is taken in the horizontal direction, and also pixel values are taken in the vertical direction, thereby representing the pixel value of each pixel in the equation region. This can be applied to later-described FIG. 136C and FIG. 136D as well.

With the present processing, an equation is generated by substituting the pixel value of each pixel in the equation region for the relation model, and further, the approximation model f(x) representing the actual world 1 light signal at the pixel of interest is obtained by solving the equation, but this is equivalent to performing the following.

That is to say, the pixel value of the pixel at each position (x, y) in the equation region shown in FIG. 136B is shifted in the x axial direction in accordance with the continuity information, as shown in FIG. 136C. Here, if we say that the continuity information represents the direction where a fine line serving as the foreground extends, as described with FIG. 135A and FIG. 135B, the waveform of the actual world 1 light signal is represented as a waveform wherein the above X cross-sectional waveform continues in the direction represented with the continuity information. Accordingly, in order to accurately estimate the approximation model f(x) representing the actual world 1 light signal, as described with FIG. 91 and FIG. 92, the phase of the actual world 1 light signal waveform needs to be conformed to the phase of the pixel value of each pixel in the equation region obtained by integrating the actual world 1 light signal, by shifting the pixel value of the pixel at each position (x, y) in the equation region in the x axial direction in accordance with the direction represented with the continuity information. FIG. 136C illustrates the pixel value of each pixel in the equation region of which the phase is conformed to that in the actual world 1 light signal waveform.

Conforming the phase of the pixel value of each pixel in the equation region to the phase of the actual world 1 light signal waveform is equivalent to shifting the start point $x_s$ and the end point $x_e$ in the integration range of Expression (138) represented with Expression (139) in accordance with the shift amount $C_x(y)$ represented with Expression (140) using the angle θ serving as the direction represented with the continuity information.

The actual world 1 light signal is integrated at each pixel in the equation region, thereby obtaining the pixel value thereof. Accordingly, as described above, the pixel value of each pixel in the equation region of which the phase is conformed to the phase of the actual world 1 light signal waveform approximates the actual world 1 light signal waveform, as shown in FIG. 136D.

Consequently, for example, the polynomial of Expression (137), which approximates the pixel value of each pixel in the equation region of which the phase is conformed to the phase of the actual world 1 light signal waveform, is obtained as the approximation model f(x) representing the actual world 1 light signal.

When generating an approximation image, as shown in FIG. 136E, if we say that the approximation model f(x) is a cross-sectional waveform, and a waveform wherein the X cross-sectional waveform continues in the direction represented with the continuity information is an estimated waveform of the actual world 1 light signal, the pixel value of a pixel of the approximation image is obtained by reintegrating the estimated waveform. Here, in FIG. 136E, the x axis is taken in the horizontal direction, the y axis is taken in the depth direction, and also the level of the actual world 1 light signal is taken in the vertical direction, thereby representing the level of the actual world 1 light signal at each position (x, y) of the sensor 2. In FIG. 136E unlike with FIG. 136A, the level (pixel value) is represented as a constant amount, which is because the actual world 1 light signal is a constant amount.

Note that with the above case, the relation model has been employed wherein the relation between the pixel value of each pixel in the processing region and the actual world 1 light signal is subjected to modeling, and the actual world 1 light signal has been estimated using the one-dimensional approximating method, assuming that the pixel value of each pixel corresponding to a position in the x direction in the time-space directions of the approximation model is acquired by integrating the approximation model in the x direction, but the actual world 1 light signal may be estimated using the above two-dimensional approximating method, or the above three-dimensional approximating method other than the one-dimensional approximating method.

That is to say, in the event of estimating the actual world 1 light signal, the relation model may be employed wherein the relation between the pixel value of each pixel in the processing region and the actual world 1 light signal is subjected to modeling assuming that the pixel value of each pixel corresponding to a position in the x and y directions in the time-space directions of the approximation model is acquired by integrating the approximation model in the x and y directions, or the relation model may be employed wherein the relation between the pixel value of each pixel in the processing region and the actual world 1 light signal is subjected to modeling assuming that the pixel value of each pixel corresponding to a position in the x (or y) and t directions in the time-space directions of the approximation model is acquired by integrating the approximation model in the x and t directions.

Further, in the event of estimating the actual world 1 light signal, the relation model may be employed wherein the relation between the pixel value of each pixel in the processing region and the actual world 1 light signal is subjected to modeling assuming that the pixel value of each pixel corresponding to a position in the x, y, and t directions in the time-space directions of the approximation model is acquired by integrating the approximation model in the x, y, and t directions.

In the event of considering the spatial direction (x and y directions) as the integration direction of the approximation model, the image quality deteriorated due to space mixture can be improved, and in the event of considering the time direction (t direction), the image quality deteriorated due to time mixture can be improved. Further, in the event of considering the time-space directions (both of the spatial direction and the time direction) as the integration direction of the approximation model, the image quality deteriorated due to both of space mixture and time mixture can be improved.

Next, description will be made regarding a method for detecting movements in the movement detecting unit 11062 in FIG. 122.

In the event that a certain object is moving in an input image, as for a method for detecting movement vector serving as the movement of the object for example, the so-called block matching method has been known.

However, with the block matching method, matching is performed between the frame of interest and the frames before and after the frame of interest, so that movements cannot be detected easily with the frame of interest alone.

To this end, the movement detecting unit 11062 is configured so as to detect movements from an input image having one frame alone.

FIG. 137 illustrates a configuration example of the movement detecting unit 11062 in FIG. 122.

With the movement detecting unit 11062 of which the configuration is shown in FIG. 137, the movement direction of an object in the processing region of the an input image is detected, and the input image is corrected such that the movement direction becomes the horizontal direction. Subsequently, the features subjected to the one-dimensional differentiation in the movement direction of the object in the input image, which are the differential value of the pixel values of pixels adjacent in the movement direction, are detected.

Further, the correlation is detected between the features of the pixel of interest and the features of the corresponding pixel with a predetermined distance in the movement direction, and the movement amount of the object is detected according to the distance between the corresponding pixel and the pixel of interest, which exhibits the maximum detected correlation.

The movement detecting unit 11062 of which the configuration is shown in FIG. 137 includes a movement direction detecting unit 11201, a movement direction correcting unit 11202, a features detecting unit 11203, and a movement amount detecting unit 11204.

Further, the movement direction detecting unit 11201 includes an activity computing unit 11211, and an activity evaluating unit 11212. The movement direction correcting unit 11202 includes an affine transformation unit 11213.

The features detecting unit 11203 includes a difference computing unit 11214, a difference evaluating unit 11215, an intermediate image creating unit 11216, an intermediate image creating unit 11217, frame memory 11218, a sign inverting unit 11219, and frame memory 11220.

Further, the movement amount detecting unit 11204 includes a correlation detecting unit 11221, and a correlation evaluating unit 11222.

With the movement detecting unit 11062 of which the configuration is shown in FIG. 137, the input image stored in the image memory 11061 in FIG. 122 is supplied to the movement direction detecting unit 11201 and the movement direction correcting unit 11202. Further, the processing region information that is output from the processing region setting unit 11041 in FIG. 119 is also supplied to the movement direction detecting unit 11201 and the movement direction correcting unit 11202.

The movement direction detecting unit 11201 acquires the input image and the processing region information, and detects the movement direction in the processing region from the acquired input image.

When capturing a moving object, movement blurring occurs on the image of the object. This is caused by actions of the image sensor of a camera or video camera serving as the sensor 2 for capturing the image of an object.

That is to say, an image sensor such as a CCD (Charge Coupled Device) or CMOS (Complementary Metal-Oxide Semiconductor) sensor consecutively converts the incident light into electric charge for each pixel during exposure time (shutter time), and further converts the electric charge into one pixel value. When an object to be captured is in a stationary state, the image (light) of the same portion of the object is converted into one pixel value during exposure time. The image thus captured includes no movement blurring.

On the other hand, when an object is moving, the image of the portion of the object to be cast into one pixel changes during exposure time, and the images of different portions of the object are converted into one pixel value by accident. Speaking inversely, the image of one portion of the object is cast into multiple pixel values, which is movement blurring.

Movement blurring occurs in the movement direction of the object.

Upon focusing on the pixel values of pixels arrayed in the movement direction of the portion where movement blurring occurs (region including movement blurring), the image of generally the same range portion of the object is projected to the pixel values of the pixels arrayed in the movement direction. Accordingly, we can say that change in the pixel values of the pixels arrayed in the movement direction at the portion where movement blurring occurs is further reduced.

The movement direction detecting unit 11201 detects a movement direction based on such change, i.e., activity in the pixel value of a pixel in the processing region of an input image.

More specifically, the activity computing unit 11211 of the movement direction detecting unit 11201 computes change (activity) in the pixel values of pixels arrayed in various directions for each predetermined direction. For example, the activity computing unit 11211 computes the difference between the pixel values of the pixels positioned corresponding to each direction for each predetermine direction as activity. The activity computing unit 11211 supplies information indicating change in the computed pixel values to the activity evaluating unit 11212.

The activity evaluating unit 11212 selects the minimum change in the pixel value, of change in the pixel values of the pixels for each predetermined direction supplied from the activity computing unit 11211, and takes the direction corresponding to the selected change in the pixel value as the movement direction.

The movement direction detecting unit 11201 supplies movement direction information indicating the movement direction thus detected to the movement direction correcting unit 11202.

The movement direction correcting unit 11202 is supplied with processing region information as well. The movement direction correcting unit 11202 converts the image data within the processing region in the input image based on the movement direction information supplied from the movement direction detecting unit 11201 such that the movement direction becomes the horizontal direction of the image.

For example, the affine transformation unit 11213 of the movement direction correcting unit 11202 subjects the image data within the processing region in the input image to affine transformation based on the movement direction information supplied from the movement direction detecting unit 11201 such that the movement direction shown in the movement direction information becomes the horizontal direction of the image.

The movement direction correcting unit 11202 supplies the image data within the processing region in the input image converted such that the movement direction becomes the horizontal direction of the image to the features detecting unit 11203.

The features detecting unit 11203 detects the features of the image supplied from the movement direction correcting unit 11202.

That is to say, the difference computing unit 11214 of the features detecting unit 11203 sets a pixel selected by selecting one pixel from the pixels in the processing region of the input image, as a pixel of interest. Subsequently, the difference computing unit 11214 of the features detecting unit 11203 obtains a difference value by subtracting the pixel value of the pixel adjacent to the pixel of interest on the right side from the pixel value of the pixel of interest.

The difference computing unit 11214 obtains difference values by taking the pixels in the processing region of the input image as a pixel of interest in order. That is to say, the difference computing unit 11214 obtains difference values regarding all of the pixels in the processing region of the input image. The difference computing unit 11214 supplies the difference values thus computed to the difference evaluating unit 11215 along with information indicating the position of the pixel of interest corresponding to each obtained difference value (positional information indicating the position on the screen of each difference value).

The difference evaluating unit 11215 determines regarding whether or not the difference values are 0 or more, supplies the difference values equal to or greater than 0 to the intermediate image creating unit 11216 along with the positional information indicating the position on the screen of each difference value, and supplies the difference values less than 0 to the intermediate image creating unit 11217 along with the positional information indicating the position on the screen of each difference value.

The intermediate image creating unit 11216 creates, based on the difference values equal to or greater than 0 supplied from the difference evaluating unit 11215 along with the positional information indicating the position on the screen of the difference values, an intermediate image made up of each difference value. That is to say, the intermediate image creating unit 11216 creates an intermediate image by setting the difference values equal to or greater than 0 supplied from the difference evaluating unit 11215 to the pixels at the positions on the screen indicated by the positional information, and setting 0 to the pixels at the positions where no difference value is supplied from the difference evaluating unit 11215. The intermediate image creating unit 11216 supplies the intermediate image thus created (hereafter, referred to as non-inverted intermediate image) to the frame memory 11218.

The intermediate image creating unit 11217 creates, based on the difference values less than 0 (negative values) supplied from the difference evaluating unit 11215 along with the positional information indicating the positions on the screen of the difference values, an intermediate image made up of the difference values. That is to say, the intermediate image creating unit 11217 creates an intermediate image by setting the difference values less than 0 supplied from the difference evaluating unit 11215 to the pixels at the positions on the screen indicated by the positional information, and setting 0 to the pixels at the positions where no difference value is supplied from the difference evaluating unit 11215. The intermediate image creating unit 11216 supplies the intermediate image thus created to the sign inverting unit 11219.

The sign inverting unit 11219 inverts the signs of the difference values less than 0 set to the pixels of the intermediate image supplied from the intermediate image creating unit 11217. The signs of the value 0 set to the pixels of the intermediate image are not inverted. That is to say, the sign inverting unit 11219 selects the difference values less than 0 set to the pixels of the intermediate image supplied from the intermediate image creating unit 11217, and converts the selected difference values less than 0 into the values greater than 0 having the same absolute values as the difference values. For example, the difference value, which is −15, is converted into 15 by inverting the sign thereof. The sign inverting unit 11219 supplies the intermediate image thus sign-inverted (hereafter referred to as inverted intermediate image) to the frame memory 11220.

The frame memory 11218 supplies the non-inverted intermediate image made up of the difference values equal to or greater than 0 and 0 to the movement amount detecting unit 11204 as features. The frame memory 11220 supplies the inverted intermediate image made up of the difference values greater than 0 of which the signs are inverted and 0 to the movement amount detecting unit 11204 as features.

The movement detecting unit 11204 detects movements based on the features supplied from the features detecting unit 11203. That is to say, the movement detecting unit 11204 detects the correlation between the features of at least the pixel of interest, of the pixels of the image of the object in the processing region of the input image, and the features of the corresponding pixel allocated in the movement direction as to the pixel of interest, and detects the movement amount of the image of the object in the processing region of the input image according to the detected correlation.

The correlation detecting unit 11221 of the movement amount detecting unit 11204 detects the correlation between the non-inverted intermediate image serving as features supplied from the frame memory 11218 of the features detecting unit 11203, and the inverted intermediate image serving as features supplied from the frame memory 11220 of the features detecting unit 11203. The correlation detecting unit 11221 supplies the detected correlation to the correlation evaluating unit 11222.

More specifically describing, for example, the correlation detecting unit 11221 of the movement amount detecting unit 11204 moves (shifts) the inverted intermediate image made up of the difference values of which the signs are inverted so as to be greater than 0, and 0 supplied from the frame memory 11220 of the features detecting unit 11203, in the horizontal direction of the screen in units of pixel as to the non-inverted intermediate image made up of the difference values equal to or greater than 0, and 0 supplied from the frame memory 11218 of the features detecting unit 11203. That is to say, the correlation detecting unit 11221 moves the positions on the screen of the pixels making up the inverted intermediate image in the horizontal direction.

The positional relation on the screen between the pixels of the non-inverted intermediate image and the pixels of the inverted intermediate image changes by moving (the pixels of) the inverted intermediate image in the horizontal direction on the screen. For example, the corresponding pixel of the inverted intermediate image positioned on the screen corresponding to the pixel of interest of the non-inverted intermediate image before movement results in departing from the position corresponding to the pixel of interest of the non-inverted intermediate image by the movement distance after movement. More specifically, when the non-inverted intermediate image is moved to the right by 20 pixels, the corresponding pixel of the inverted intermediate image departs from the position corresponding to the pixel of interest of the non-inverted intermediate image to the right by 20 pixels. Speaking inversely, the corresponding pixel of the inverted intermediate image positioned on the screen corresponding to the pixel of interest of the non-inverted intermediate image after movement departs from the position corresponding to the pixel of interest by the movement distance before movement.

The correlation detecting unit 11221 computes the difference between the pixel values of the pixels corresponding to the non-inverted intermediate image and the inverted intermediate image moved, and takes the sum of the differential absolute values as a correlation value.

For example, the correlation detecting unit 11221 moves (shifts) the inverted intermediate image in the horizontal direction of the screen in increments of one pixel in a range of 70 pixels in the left direction of the screen through 70 pixels in the right direction of the screen as to the non-inverted intermediate image, computes the difference between the pixel values of the pixels to be positioned at the same position on the screen regarding the non-inverted intermediate image and the inverted intermediate image moved for each moved position (each movement distance), and takes the sum of the differential absolute values as a correlation value.

For example, when the inverted intermediate image is moved to the left direction of the screen as to the non-inverted intermediate image, the movement distance is represented with a negative (minus). When the inverted intermediate image is moved to the right direction of the screen as to the non-inverted intermediate image, the movement distance is represented with a positive (plus). The correlation detecting unit 11221 computes the difference between the pixel values of the pixels to be positioned at the same position on the screen regarding the non-inverted intermediate image and the inverted intermediate image moved for each movement distance of −70 pixels through +70 pixels, and takes the sum of the differential absolute values as a correlation value.

The correlation detecting unit 11221 supplies the correlation value corresponding to the movement distance to the correlation evaluating unit 11222. That is to say, the correlation detecting unit 11221 supplies a pair of the movement distance and the correlation value to the correlation evaluating unit 11222.

The correlation evaluating unit 11222 detects the movement amount of the image of the object in the processing region of the input image according to the correlation. More specifically, the correlation evaluating unit 11222 takes, of the correlations supplied from the correlation detecting unit 11221, the movement distance corresponding to the maximum (strongest) correlation as a movement amount.

For example, the correlation evaluating unit 11222 selects the minimum value, of the sum of the differential absolute values serving as the correlation value supplied from the correlation detecting unit 11221, and sets the movement distance corresponding to the selected minimum value to the movement amount.

The correlation evaluating unit 11222 outputs the detected movement amount.

FIG. 138 through FIG. 140 are diagrams for describing the principle for detecting movements by the movement detecting unit 11062 in FIG. 137.

Now, let us say that a white foreground object serving as an object to be captured is disposed in front of a black background object serving as another object to be captured, and is moving from the left side to the right side, and a camera having an image sensor such as a CCD or CMOS sensor captures the foreground object along with the background object with a predetermined exposure time (shutter time).

In this case, upon focusing on one frame of the image to be output from the camera, the background object is black, so that the camera outputs, for example, a pixel value 0 as to the background object image. The foreground object is white, so that the camera outputs, for example, a pixel value 255 as to the foreground object image. Note that here, let us say that the camera outputs a pixel value in a range of 0 through $2^8-1$.

The diagram in the upper side of FIG. 138 is a diagram illustrating the pixel values of the image to be output by the camera when the foreground object is in a stationary state at the position at the moment that the shutter of the camera opens (moment of starting exposure).

The diagram in the lower side of FIG. 138 is a diagram illustrating the pixel values of the image to be output by the camera when the foreground object is in a stationary state at the position at the moment that the shutter of the camera closes (moment of ending exposure).

As shown in FIG. 138, the movement amount of the image of the foreground object is a distance wherein the image of the foreground object moves from the moment that the shutter of the camera opens until the moment that the shutter of the camera closes.

FIG. 139 is a diagram illustrating the pixel values of the image to be output from the camera when the foreground object moving in front of the background object is captured by the camera. The image sensor of the camera consecutively converts the image (light) of the object into electric charge during exposure time (shutter time) for each pixel, and further converts the electric charge into one pixel value, and accordingly, the image of the foreground object 11251 is projected into the pixel values of the multiple pixels. The maximum pixel value of the image shown in FIG. 139 is small as compared with the maximum pixel value of the image shown in FIG. 138.

The slope width of the pixel values shown in FIG. 139 corresponds to the width of the image of the background object.

Upon the difference value as to the adjacent pixel on the right side being computed, and set to the pixel regarding each pixel of the image shown in FIG. 139, the image made up of the difference values shown in FIG. 140 is obtained.

That is to say, one pixel is selected from the pixels of the image shown in FIG. 139, and set to as a pixel of interest to which attention is paid. Subsequently, the difference value is obtained by subtracting the pixel value of the pixel adjacent to the pixel of interest on the right side from the pixel value of the pixel of interest. The difference value is set to the pixel at the position corresponding to the pixel of interest. The pixels of the image shown in FIG. 139 are taken as a pixel of interest in order, and the image made up of the difference values shown in FIG. 140 is obtained.

The difference value having a negative (minus) sign emerges on the one-pixel left side as to the position of the foreground object at the moment that the shutter of the camera opens shown in the diagram on the upper side of FIG. 138, and the difference value having a positive (plus) sign emerges on the one-pixel left side as to the position of the foreground object at the moment that the shutter of the camera closes shown in the diagram on the lower side of FIG. 138.

Accordingly, upon matching being performed between a value obtained by inverting the sign of the difference value having a negative (minus) sign and the difference value having a positive (plus) sign shown in FIG. 140, the movement distance of the value obtained by inverting the sign of the difference value having a negative (minus) sign is the same as the movement amount on the basis of the difference value having a positive (plus) sign when performing matching, for example.

For example, on the basis of the difference value having a positive (plus) sign, the value obtained by inverting the sign of the difference value having a negative (minus) sign is moved in the horizontal direction, the correlation between the value obtained by inverting the negative difference value and the positive difference value is detected for each movement distance thereof, thereby detecting the maximum (strongest) correlation. The movement distance when the maximum correlation is detected is the same as the movement amount.

More specifically, for example, on the basis of the difference value having a positive (plus) sign, the value obtained by inverting the sign of the difference value having a negative (minus) sign is moved in the horizontal direction, as the correlation between the value obtained by inverting the negative difference value and the positive difference value for each movement distance thereof, the positive difference value is subtracted from the inverted value for each pixel. Subsequently, the minimum value within the subtracted results, i.e., the maximum correlation is detected. The movement distance corresponding to the detected maximum correlation is the same as the movement amount.

As described above, the movement amount, which is the amount wherein the image of the object moves, can be detected from one frame of the image during exposure time (shutter time).

That is to say, the difference computing unit 11214 of the features detecting unit 11203 selects one pixel from pixels in the processing region of the input image, sets this as a pixel of interest, and subtracts the pixel value of the pixel adjacent to the pixel of interest on the right side from the pixel value of the pixel of interest, thereby computing the difference values shown in FIG. 140, for example. The difference evaluating unit 11215 classifies the difference values into the positive difference values and the negative difference values based on the signs of the difference values.

The intermediate image creating unit 11216 creates, from the classified positive difference values, a non-inverted intermediate image made up of the positive difference values thereof. The intermediate image creating unit 11217 creates, from the classified negative difference values, a intermediate image made up of the negative difference values thereof. The sign inverting unit 11219 creates a non-inverted intermediate image by inverting the signs of the negative pixel values of the intermediate image made up of the negative difference values.

The movement amount detecting unit 11204 obtains the movement distance of the non-inverted intermediate image and the inverted intermediate image, which have the strongest correlation, and takes the obtained movement distance as the movement amount.

When the features detecting unit 11203 detects the image of the moving object, and detects the features of the image of the moving object, the movement amount detecting unit 11204 detects a correlation based on the features, and detects the movement amount of the image of the object within the input image according to the detected correlation.

Also, when the features amount detecting unit 11203 selects the pixel of interest to which attention is paid from the pixels belonged to the image of the moving object, and detects the features of the pixel of interest, the movement amount detecting unit 11204 detects the correlation between the features of the pixel of interest and the features of the corresponding pixel to be allocated in the movement direction as to the pixel of interest, and detects the movement amount of the image of the object in the processing region of the input image according to the detected correlation.

FIG. 141 is a flowchart for describing the processing for detecting a movement amount by the movement detecting unit 11062 in FIG. 137.

In step S11201, the movement direction detecting unit 11201 and the movement direction correcting unit 11202 acquire the input image and the processing region information, and the flow proceeds to step S11202.

In step S11202, the activity computing unit 11211 of the movement direction detecting unit 112011 computes activity regarding the pixels of the processing region in the input image acquired in the processing in step S11201, and the flow proceeds to step S11203.

For example, the activity computing unit 11211 selects the pixel of interest to which attention is paid, of the pixels of the processing region in the input image. The activity computing unit 11211 extracts a predetermined number of perimeter pixels in the vicinity of the pixel of interest. For example, the activity computing unit 11211 extracts perimeter pixels made up of 5×5 pixels (5 pixels by 5 pixels) centered on the pixel of interest.

Subsequently, the activity computing unit 11211 detects activity corresponding to the predetermined direction on the image from the extracted perimeter pixels.

With the following description, a pixel array in the horizontal direction is referred to as a row, and a pixel array in the vertical direction is referred to as a column.

Regarding 5×5 perimeter pixels for example, the activity computing unit 11211 detects activity as to the angle of 90 degrees (vertical direction of the screen) on the basis of the horizontal direction of the screen by computing the differences between the pixel values of the adjacent pixels in the up-and-down (vertical) direction on the screen, dividing the sum of the differential absolute values computed by the number of differences, and taking the result as activity.

For example, the difference of pixel values is computed regarding the two pixels adjacent in the up-to-down direction on the screen of 20 pairs, the sum of the differential absolute values computed is divided by 20, and the result (quotient) is set to the activity as to the angle of 90 degrees.

Regarding 5×5 perimeter pixels for example, the activity computing unit 11211 detects activity as to the angle of 76 degrees ($\tan^{-1}(4/1)$) on the basis of the horizontal direction of the screen by computing the differences between the respective pixel values of the leftmost pixel through the fourth pixel from the left in the lowest row, and the respective pixel values of the pixels on the four-pixel upper side and also on one-pixel right side as to the respective pixels, dividing the sum of the differential absolute values computed by the number of differences, and taking the result as activity.

For example, the difference of pixel values is computed regarding the two pixels in the upper right direction having a distance of four pixels in the vertical direction, and one pixel in the horizontal direction of four pairs, the sum of the differential absolute values computed is divided by four, and the result (quotient) is set to the activity as to the angle of 76 degrees.

The activity computing unit 11211 detects activity as to the angle in a range of 90 degrees through 180 degrees on the basis of the horizontal direction of the screen with the same processing. In the event of detecting activity as to the angle in a range of 90 degrees through 180 degrees, activity is calculated based on the difference of the pixel values of the pixels positioned in the upper left direction.

The activity thus detected is taken as the activity as to the pixel of interest.

Note that the detected activity may be the activity as to the perimeter pixels.

Also, description has been made that the perimeter pixels are made up of 5×5 pixels (5 pixels by 5 pixels), but pixels having a desired range may be employed regardless of 5×5 pixels. In the event of employing a great number of perimeter pixels, angular resolution improves.

The activity computing unit 11211 supplies information indicating activity corresponding to multiple directions to the activity evaluating unit 11212.

Returning to FIG. 141, in step S11203, the activity evaluating unit 11212 obtains the movement direction by selecting the minimum activity based on the activity corresponding to a predetermined direction calculated in the processing in step S11202, and taking the selected direction as the movement direction, and the flow proceeds to step S11204.

In step S11204, the movement direction correcting unit 11202 converts the image data in the processing region of the input image based on the movement direction obtained in the processing in step S11203 such that the movement direction becomes the horizontal direction of the image, and the flow proceeds to step S11205. For example, in step S11204, the affine transformation unit 11213 of the movement direction correcting unit 11202 subjects the image data in the processing region of the input image to affine transformation based on the movement direction obtained in the processing in step S11203 such that the movement direction becomes the horizontal direction of the image. More specifically, for example, the affine transformation unit 11213 subjects the image data in the processing region of the input image to affine transformation so as to rotate 18 degrees in the clockwise direction on the basis of the horizontal direction of the screen when the movement direction is the angle of 18 degrees.

In step S11205, the difference computing unit 11214 of the features detecting unit 11203 computes the difference value of the pixel value as to the pixel adjacent in the horizontal direction regarding each pixel in the processing region of the input image converted such that the movement direction becomes the horizontal direction of the screen in the processing in step S11204, and the flow proceeds to step S11206.

For example, in step S11205, the difference computing unit 11214 sets a pixel of interest to which attention is paid by selecting one pixel from the pixels in the processing region of the input image. Subsequently, the difference computing unit 11214 obtains the difference value by subtracting the pixel value of the pixel adjacent to the pixel of interest on the right side from the pixel value of the pixel of interest.

In step S11206, the difference evaluating unit 11215 of the features detecting unit 11203 allocates the difference values based on the signs of the difference values, and the flow proceeds to step 511207. That is to say, the difference evaluating unit 11215 supplies the difference values equal to or greater than 0 to the intermediate image creating unit 11216, and supplies the difference values less than 0 to the intermediate image creating unit 11217. In this case, the difference evaluating unit 11215 supplies the difference values to the intermediate image creating unit 11216 or the intermediate image creating unit 11217 along with the positional information indicating the position of each difference value on the screen.

In step S11207, the intermediate image creating unit 11216 of the features detecting unit 11203 creates an intermediate image made up of the positive difference values based on the difference values equal to or greater than 0 (positive difference values) allocated in the processing in step S11206, and the flow proceeds to step S11208. That is to say, in step S11207, the intermediate image creating unit 11216 creates an intermediate image by setting the positive difference values to the pixels at the positions on the screen indicated with the positional information, and setting 0 to the pixels at the positions where no difference value was supplied.

Thus, a non-inverted intermediate image is created in the processing in step S11207. In step S11208, the intermediate image creating unit 11217 of the features detecting unit 11203 creates an intermediate image made up of the negative difference values based on the difference values less than 0 (negative difference values) allocated in the processing in step S11206, and the flow proceeds to step S11209. That is to say, in step S11208, the intermediate image creating unit 11217 creates an intermediate image by setting the negative difference values to the pixels at the positions on the screen indicated with the positional information, and setting 0 to the pixels at the positions where no difference value was supplied.

In step S11209, the sign inverting unit 11219 of the features detecting unit 11203 inverts the signs of the negative difference values of the intermediate image made up of the negative difference values created in the processing in step S11208. That is to say, in step S11209, the negative difference values set to the pixels of the negative intermediate image are converted into the positive values having the same absolute values.

Thus, in step S11209, a non-inverted intermediate image is created, and then the flow proceeds to step S11210.

In step S11210, the movement amount detecting unit 11204 executes correlation detecting processing. The details of the processing in step S11210 will be described later with reference to the flowchart in FIG. 142.

In step S11211, the correlation evaluating unit 11222 selects the strongest correlation, of the correlations detected in the processing in step S11210, and the flow proceeds to step S11212.

For example, in step S11211, of the correlation values serving as the sum of the differential absolute values of the pixel values, the minimum correlation value is selected.

In step S11212, the correlation evaluating unit 11222 sets the movement distance corresponding to the strongest correlation selected in the processing in step S11211 to the movement amount, and the flow proceeds to step S11213. For example, in step S11212, of the correlation values serving as the sum of the differential absolute values of the pixel values, the movement distance of the inverted intermediate image stored in the processing in step S11223 described later corresponding to the selected minimum correlation value is set to the movement amount.

In step S11213, the movement amount detecting unit 11204 outputs the movement amount detected in the processing in step S11210, and the processing ends.

FIG. 142 is a flowchart for describing correlation detecting processing corresponding to the processing in step S11210.

In step S11221, the correlation detecting unit 11221 of the movement amount detecting unit 11204 moves the positions of the pixels of the inverted intermediate image created in the processing in step S11209 in the horizontal direction in increments of pixel, and the flow proceeds to step S11222.

In step S11222, the correlation detecting unit 11221 detects the correlation between the non-inverted intermediate image and the inverted intermediate image of which the positions of the pixels are moved in the processing in step S11221, and the flow proceeds to step S11223. For example, in step S11222, the differences are computed between the pixel values of the pixels of the non-inverted intermediate image and the pixel values of the pixels of the inverted intermediate image at the corresponding positions on the screen, and the sum of the computed differential absolute values is detected as a correlation value. The correlation detecting unit 11221 supplies correlation information indicating the detected correlation to the correlation evaluating unit 11222 along with the movement distance of the pixels of the inverted intermediate image in the processing in step S11221.

In step S11223, the correlation evaluating unit 11222 stores the correlation detected in the processing in step S11222 along with the movement distance of the pixels of the inverted intermediate image in the processing in step S11221, and the flow proceeds to step S11224. For example, the correlation evaluating unit 11222 stores the correlation value serving as the sum of the differential absolute values of the pixel values along with the movement distance of the pixels of the inverted intermediate image in the processing in step S11221.

In step S11224, the correlation detecting unit 11221 determines regarding whether or not correlation as to all of the movement distances has been detected, and in the event that determination is made that correlation has not been detected with some movement distances, the flow returns to step S11221, where the processing for detecting correlation as to the next movement distance is repeated.

For example, in step S11224, the correlation detecting unit 11221 determines whether or not all correlations have been detected in a case of moving pixels of the inverted intermediate image in the range of 70 pixels in the left direction in the image through 70 pixels in the right direction in the image.

In the event that determination is made in step S11224 that the correlations for all movements amount have been detected, the processing ends (returns).

Thus, the correlation detecting unit 11221 can detect correlation.

As described above, the movement detecting unit 11062 of which the configuration is shown in FIG. 137 can detect movement amount from one frame in an image.

Now, while movement has been detected here with regard to a processing region, an arrangement may be made wherein movement over the entire screen due to hand shaking, for example, can be detected, by processing the entire screen.

Also, even in the event that there are a great amount of repetitive patterns of the same design in the input image, these can be detected in an accurate manner so long as the movement distance and movement direction of the processing region in the input image to be processed is constant.

While movement distance detection from one frame in an image has been described above, it is needless to say that an arrangement may be made wherein movement distance is detected from one field.

Also, an arrangement may be made wherein the movement amount is detected regarding only the perimeter of the selected pixel of interest.

FIG. 143 illustrates a configuration example of another embodiment of an application example of the signal processing device 4 shown in FIG. 111.

Note that FIG. 143 illustrates the configuration example of an embodiment of the signal processing device 4 for estimating actual world 1 light signals from image data wherein movement blurring has occurred (hereafter referred to as movement blurring image data as appropriate), which is an example of data 3 having continuity of moving in a predetermined direction at a predetermined speed, for example. That is to say, this signal processing device 4 estimates an image without blurring (hereafter referred to as image without movement blurring as appropriate) from an image wherein a subject is taken in a blurred manner due to the subject (object) moving at the time of photography, for example (hereafter referred to as movement blurring image as appropriate). Accordingly, with the embodiment shown in FIG. 143, a movement blurring image, wherein movement blurring has occurred due to taking a moving object, is input to the signal processing device 4 as the input image. Note that here, an image obtained by imaging an object moving in the horizontal direction (from the left to right direction) at a constant speed (movement amount) is employed as the input image.

In FIG. 143, the processing region setting unit 12001, the continuity setting unit 12002, the actual world estimating unit 12003, image generating unit 12004, image display unit 12005, and user I/F 12006, each correspond to the processing region setting unit 10001, the continuity setting unit 10002, the actual world estimating unit 10003, image generating unit 10004, image display unit 10005, and user I/F 10006 shown in FIG. 111, and basically perform the same processing as the processing region setting unit 10001, the continuity setting unit 10002, the actual world estimating unit 10003, image generating unit 10004, image display unit 10005, and user I/F 10006. Further, in FIG. 143, the actual world estimating unit 12003 comprises a model generating unit 12011, an equation generating unit 12012, and actual world waveform estimating unit 12013. The model generating unit 12011, equation generating unit 12012, and actual world waveform estimating unit 12013 correspond to each of the model generating unit 10011, equation generating unit 10012, and actual world waveform estimating unit 10013 shown in FIG. 111, and basically perform the same processing as each of the model generating unit 10011, equation generating unit 10012, and actual world waveform estimating unit 10013.

Note however, that in FIG. 143, the assisting information which the user I/F 12006 outputs by the user operating the user I/F 12006, is supplied only to the processing region setting unit 12001.

That is to say, in FIG. 143, the user can instruct the region to be taken as the processing region with regard to the image displayed on the image display unit 12005, by operating the user I/F 12006, and upon the user performing operations to instruct the processing region, the user I/F 12006 supplies processing region instruction Information representing the processing region to be taken as the region specified to the processing region setting unit 12001.

Now, examples of the method for instructing the processing region by operating the user I/F 12006 include, for example, a method for instructing with a rectangle surrounding the processing region, a method for instructing by trimming (trim) the processing region, a method for instructing by pointing one or more arbitrary points within the processing region, and so forth; here, let us say that the user instructs the processing region by pointing one arbitrary point in the processing region, for example, by operating the user I/F 12006. In this case, the user I/F 12006 supplies coordinates on the image of that point, for example, as information representing the point where the user pointed, to the processing region setting unit 12001, as processing region instructing information.

Next, the processing of the signal processing device 4 shown in FIG. 143 will be described with reference to the flowchart shown in FIG. 144.

First, in step S12001, the signal processing device 4 performs pre-processing, and the flow proceeds to step S12002. That is to say, the signal processing device 4 supplies one frame or one field, for example, of the input image, supplied from the sensor 2 (FIG. 1) as data 3, to the processing region setting unit 12001, continuity setting unit 12002, actual world estimating unit 12003, image generating unit 12004, and image display unit 12005. Further, the signal processing unit 4 causes the image display unit 12005 to display the input image.

In step S12002, the user I/F 12006 determines whether or not there has been some sort of user input, by the user operating the user I/F 12006. In step S12002, in the event that determination is made that there is no user input, i.e., in the event that the user has made no operations, the flow skips steps S12003 through S12005, and proceeds to step S12006.

Also, in step S12002, in the event that determination is made that there has been user input, i.e., in the event that the user has viewed the input image displayed on the image display unit 12005 and operated the user I/F 12006, thereby making user input indicating some sort of instruction or information, the flow proceeds to step S12003, where the user I/F 12006 determines whether or not the user input is user instructions instructing ending of the processing of the signal processing device 4.

In the event that determination is made in step S12003 that the user input is ending instructions, that is to say, for example, in the event that the user who has viewed the input image displayed on the image display unit 12005, operates the user I/F 12006 so as to end the processing of the signal processing device 4 with no need for performing signal processing with regard to the input image, since the user did not find the image quality of the input image unsatisfactory, the signal processing device 4 ends the processing.

Also, in the event that determination is made in step S12003 that the user input is not ending instructions, the flow proceeds to step S12004, where the user I/F 12006 determines whether or not the user input is processing region instruction information. In the event that determination is made in step S12004 that the user input is not processing region instruction information, step S12005 is skipped, and the flow proceeds to step S12006.

On the other hand, in the event that determination is made in step S12004 that there has been input of processing region instructing information, that is to say, in the event that the user who has viewed the input image displayed on the image display unit 12005 and found the image quality of the input image unsatisfactory, and therefore operated the user I/F 12006 so as to point the unsatisfactory portion, the flow proceeds to step S12005, where the user I/F 12006 supplies processing region instructing information representing the point which the user has pointed by operating the user I/F 12006 to the processing region setting unit 12001, and the flow proceeds to step S12006.

In step S12006, the processing region setting unit 12001 sets a processing region based on the processing region instructing information supplied from the user I/F 12006, and supplies to the continuity setting unit 12002, the actual world estimating unit 12003, and the image generating unit 12004, the processing region information thereof, and the flow proceeds to step S12007. However, in the event that processing region instructing information is not supplied from the user I/F 12006 to the processing region setting unit 12001 (in the event that the processing of step S12006 is performed immediately following step S12002 or step S12004), the processing region setting unit 12001 automatically sets a processing region by performing predetermined processing (for example, processing for detecting a region in the input image where movement blurring has occurred).

In step S12007, the continuity setting unit 12002 recognizes the processing region in the input image, from the processing region information supplied from the processing region setting unit 12001. Further, the continuity setting unit 12002 sets the movement amount of the object displayed in the processing region, as information representing the continuity of the actual world 1 signals lost in each of the processing region image data, and supplies continuity information representing the continuity to the actual world estimating unit 12003, and the flow proceeds to step S12008. Note that this movement amount may be input by the user operating the user I/F 12006. Also, here, the continuity setting unit 12002 sets movement amount representing the magnitude of movement of the object in the input image as the continuity information, since it is assumed that the object is moving in the horizontal direction, but an arrangement may be made wherein a movement vector representing the magnitude and direction of movement of the object is set as the continuity information.

In step S12008, the actual world estimating unit 12003 estimates the actual world 1 signals (image without movement blurring) from the image data within the processing region of the input image (data of movement blurring image), based on the movement amount of the corresponding actual world 1 signals, according to the processing region information supplied from the processing region setting unit 12001.

That is to say, with the actual world estimating unit 12003, the model generating unit 12011 recognizes the processing region in the input image from the processing region information supplied from the processing region setting unit 12001, and also recognizes the movement amount of the actual world 1 signals corresponding to the processing region image data, based on the continuity information supplied from the continuity setting unit 12002, i.e., in this case, recognizes the amount of movement of the object displayed in the processing region. Further, the model generating unit 12011 generates a model modeling the relation between the pixel values of the pixels in each horizontal line within the processing region and the actual world 1 light signals (hereafter referred to as relation models as appropriate), corresponding to the pixels making up each horizontal line in the processing region of the input image and the movement amount of the actual world 1 signals corresponding to the image data of the processing region, for each of the horizontal lines in the processing region, which are supplied to the equation generating unit 12012.

The equation generating unit 12012 recognizes the processing region in the input image from the processing region information supplied from the processing region setting unit 12001, and substitutes the pixel value of each pixel of the input image into the relation model according to the processing region which has been supplied from the model generating unit 12011 for each horizontal line of ht processing region, thereby generating an equation for obtaining an approximation function approximating the actual world 1 signals, which is then supplied to the actual world waveform estimating unit 12013. Further, the equation generating unit 12012 generates a constraint condition expression constraining the approximation function, based on the processing region information, and supplies this to the actual world waveform estimating unit 12013.

The actual world waveform estimating unit 12013 solves the equation supplied from the equation generating unit 12012, thereby estimating waveforms of the actual world 1 light signals. That is to say, the actual world waveform estimating unit 12013 obtains an approximation function serving as a model modeling the actual world 1 light signals, by solving the equation supplied from the equation generating unit, and supplies the approximation function to the image generating unit 12004 as estimation results of the actual world 1 light signals.

Now, the processing in step S12008 which such an actual world estimating unit 12003 executes will be called "actual world estimation processing". Details of "actual world estimation processing" will be described later with reference to the flowchart in FIG. 149.

Following the processing in step S12008, the flow proceeds to step S12009, where the image generating unit 12004 generates signals approximated by the actual world 1 light signals, based on the approximation function closer approximating the waveform of the actual world 1 light signals, supplied from (the actual world waveform estimating unit 12013 of) the actual world estimating unit 12003. That is to say, the image generating unit 12004 recognizes the processing region in the input image from the processing region information supplied from the processing region setting unit 12001, and generates an approximation image closer approximating the actual world 1 light signals (an image without movement blurring in this case, for example), based on the approximation function regarding the corresponding processing region supplied from the actual world estimating unit 12003.

Further, the image generating unit 12004 generates, as an output image, an image wherein the processing region portion in the input image has been replaced with the approximation image (image without movement blurring), which is then supplied to the image display unit 12005, and the flow proceeds from step S12009 to step S12010.

In step S12010, the image display unit 12005 displays the output image supplied from the image generating unit 12004 instead of the input image displayed in step S12001, or along with the input image, and the flow proceeds to step S12011.

In step S12011, as with the case of step S12002, the user I/F 12006 determines whether or not there has been some sort of user input by the user operating the user I/F 12006, and in the event that determination is made that there has been no user input, i.e., in the event that the user has made no operations, the flow returns to step S12011, and awaits some sort of user input.

Also, in the event that determination is made in step S12011 that there has been user input, i.e., in the event that the user has viewed the input image or output image displayed on the image display unit 12005 and operated the user I/F 12006, thereby making user input representing some sort of instructions or information, the flow proceeds to step S12012, where the user I/F 12006 determines whether or not the user input is ending instructions instructing ending of the processing of the signal processing device 4.

In the event that determination is made in step S12012 that the user input is ending instructions, that is to say, for example, in the event that the user who has viewed the output image displayed on the image display unit 12005, operates the user I/F 12006 so as to end the processing of the signal processing device 4 with no need for performing signal processing with regard to the input image, since the user did not find the image quality of the input image unsatisfactory, the signal processing device 4 ends the processing.

Also, in the event that determination is made in step S12012 that the user input is not ending instructions, the flow proceeds to step S12013, where the user I/F 12006 determines whether or not the user input is processing region instruction information. In the event that determination is made in step S12013 that the user input is not processing region instruction information, the flow returns to step S12011, and hereafter the same processing is repeated.

Also, in the event that determination is made in step S12013 that the user input is processing region instructing information, that is to say, in the event that the user who has viewed the output image displayed on the image display unit 12005 and found the image quality of the output image unsatisfactory, and therefore operated the user I/F 12006 so as to point the unsatisfactory portion as to the output image, the flow returns to step S12005, where the user I/F 12006 supplies region instructing information representing the point which the user has pointed by operating the user I/F 12006 to the processing region setting unit 12001, as described above, and the flow proceeds to step S12006 from step S12005, and hereafter the same processing is repeated.

That is to say, accordingly, this processing of steps S12005 through S12013 is repeated, the dissatisfaction of the user with the output image is resolved, and consequently, the user obtains an output image of the desired image quality.

As described above, with the signal processing device 4 an output image which is a processing result of the input image is presented to the user, for the user to select a new processing region from the output image, and processing is performed again based upon the processing region, so high-quality output images, meeting the user's preferences, can be easily obtained. That is to say, the signal processing device 4 presents the user with an output image which is processing results of the input image. On the other hand, the user recognizes the image quality of the output image, and gives feedback to the signal processing device 4 regarding judgment of whether the output image is an image of desired image quality or close to desired image quality. The signal processing device 4 processes the input image again considering the feedback from the user, and hereafter the same processing is repeated. Accordingly, high-quality output images, meeting user preferences, can be easily obtained.

Now, it can be said that the signal processing device 4 receiving feedback from the user and performing processing on the input image means that the signal processing device 4 is performing processing in cooperation with the user.

Now, before starting specific description of the actual world estimating unit 12003, the relation model modeling the relation between the pixel values of each of the pixels within the processing region and the actual world 1 light signals, will be described.

FIG. 145 is a diagram for describing the integration effects in the event that the sensor 2 is a CCD.

As shown in FIG. 145, multiple detecting elements 2-1 (pixels) are arrayed on a plane of the sensor 2.

In the example shown in FIG. 145, the direction parallel to 1 predetermined side of the detecting element 2-1 is the X direction which is one direction in the spatial direction, and the direction perpendicular to the X direction is the Y direction, which is the other direction in the spatial directions. The direction perpendicular to the X-Y plane is the t direction, which is the time direction.

Also, in the example shown in FIG. 145, the spatial shape of each of the detecting elements 2-1 of the sensor 2 is a square, where the length of each side is 1. Also, the shutter time (exposure time) of the sensor 2 is 1.

Further, in the example in FIG. 145, the center of 1 predetermined detecting element 2-1 of the sensor 2 is the origin (position x=0 in the X direction, and position y=0 in the Y direction) of the spatial directions (X direction Y direction), and also, the middle point-in-time of the exposure time is the origin (position t=0 in the t direction) of this in the time direction (t direction).

In this case, the detecting element 2-1 of which the center exists at the origin (x=0, y=0) in the spatial direction integrates a light signal function F (x, y, t) representing actual world 1 light signals over the range of −0.5 through 0.5 in the X direction, the range of −0.5 through 0.5 in the Y direction, and the range of −0.5 through 0.5 in the t direction, and outputs the integrated value thereof as a pixel value P.

That is to say, the pixel value P output from the detecting element 2-1 of which the center exists at the origin in the spatial direction is represented with the following Expression (146).

$$P = \int_{-0.5}^{+0.5} \int_{-0.5}^{+0.5} \int_{-0.5}^{+0.5} F(x, y, t) dx dy dt \qquad (146)$$

The other detecting elements 2-1 are also the same in that the center of an object detecting element 2-1 is the origin in the spatial direction, thereby outputting the pixel value P represented by Expression (146).

Next, movement blurring which occurs due to the integration effects of the sensor 2 will be described with reference to FIG. 146, FIG. 147A through FIG. 147C, and FIG. 148A through FIG. 148C. In this example, we will say that there is no space mixture in the image data output from the sensor 2. That is to say, we will say that light signals of the same level are uniformly distributed spatially at the portion corresponding to one pixel of the actual world 1 light signals (detecting element of the sensor 2).

FIG. 146 is a diagram describing the movement amount of movement in a case wherein there is continuity in that the subject (object) serving as actual world 1 light signals taken by the sensor 1 is moving in the horizontal direction (X direction) at a constant speed.

In FIG. 146, the X direction and t direction represent the X direction and t direction of the sensor 2 (FIG. 145). Also, all the point-in-time of exposure start is the origin in the t direction (position t=0 in the t direction), and a certain position of the subject in the X direction at the point of starting exposure is the origin in the X direction (position X=0 in the X direction).

In the event that is subject is moving at a constant speed in the horizontal direction (X direction), the relation between the time t and the position of the subject in the X direction is represented by the straight line indicated by the dotted line in FIG. 146. Note that the gradient of this dotted straight line represents the speed at which the subject is moving.

Now in this case, let us say that the subject is stopped at a certain point-in-time Δt, and subsequently repeats moving by one pixel over infinitesimally small time, thereby is equivalently moving at a constant speed of 1/Δt. as indicated by the solid line in FIG. 146.

As described above, assuming that the portion of the actual world 1 light signals corresponding to one pixel are the constant level, and that the movement thereof is performed in increments of one pixel, there is no spatial mixture occurring of the spatial mixture and time mixture which occur due to integrating effects of the sensor 2, and accordingly we only need to consider time mixture. Here, description will be made with regard to movement blurring due to only time mixture occurring wing to the integrating effects of the sensor 2, in order to simplify description.

Now, movement amount will be represented by numbers of pixels of the sensor 2 which the subject traverses during the exposure time, for example. In the event that the exposure time in FIG. 146 is 5Δt, for example, this means that the number of pixels over which the subject moves during the exposure time is 5, and accordingly, the movement amount is also 5.

FIG. 147A through FIG. 147C are diagrams for describing an X-cross-section waveform F(x) wherein y and t are fixed in a light signal function F(x, y, t) in a case of the subject (object) moving at an equal speed with the movement amount of 5 in the X direction during the exposure time, i.e., an approximation function f(x) approximating the X-cross-section waveform F(x) of the light signal function F(x, y, t) projected in a certain horizontal line in the processing region.

In the example of FIG. 147A through FIG. 147C, the number of pixels in the X direction of the processing region (number of pixels in the horizontal line), is eight.

In FIG. 147A through FIG. 147C, the X direction represents the X direction of the sensor 2 (FIG. 145). Also, let us say that the center of the pixel at the left edge of the processing region is the origin in the X direction (position x=0 in the X direction).

FIG. 147A represents the relation between the approximation function f(x) at the point of starting exposure, and the position in the X direction of the sensor 2. The approximation function f(x) in FIG. 147A is represented with the following Expression (147).

$$f(x) = \begin{cases} Q_0 & (-0.5 \leq x < 0.5) \\ Q_1 & (0.5 \leq x < 1.5) \\ Q_2 & (1.5 \leq x < 2.5) \\ Q_3 & (2.5 \leq x < 3.5) \\ Q_4 & (3.5 \leq x < 4.5) \\ Q_5 & (4.5 \leq x < 5.5) \\ Q_6 & (5.5 \leq x < 6.5) \\ Q_7 & (6.5 \leq x < 7.5) \end{cases} \quad (147)$$

Now, as described above, light signals of the same level are uniformly distributed spatially at the portion corresponding to one pixel of the actual world 1 light signals approximated by the approximation function f(x), so in Expression (147), $Q_0$ through $Q_7$ are each constant values.

Now, the subject is moving at equal speed at a movement amount of 5. Accordingly, for example, with the exposure time at 1, the time for the subject to move one pixel again after the previous movement of one pixel, is exposure time/movement amount, i.e., ⅕.

Accordingly, with the point-in-time for starting exposure at 0, the relation between the approximation function f(x) and the position in the X direction of the sensor 2, is as shown in FIG. 147B at the point-in-time ⅕. Accordingly, the approximation function f(x) is a function shifted by a one pixel in the X direction from the state shown in FIG. 147A. Accordingly, the approximation function f(x) at this time is as represented with the following Expression (148).

$$f(x) = \begin{cases} Q_0 & (0.5 \leq x < 1.5) \\ Q_1 & (1.5 \leq x < 2.5) \\ Q_2 & (2.5 \leq x < 3.5) \\ Q_3 & (3.5 \leq x < 4.5) \\ Q_4 & (4.5 \leq x < 5.5) \\ Q_5 & (5.5 \leq x < 6.5) \\ Q_6 & (6.5 \leq x < 7.5) \\ Q_7 & (7.5 \leq x < 8.5) \end{cases} \quad (148)$$

The subject keeps moving in increments of one pixel in the X direction in the same way, and at the point-in-time ⅘, for example, the relation between the approximation function f(x) and the position in the X direction of the sensor 2, is as shown in FIG. 147C. That is to say, the subject has moved four pixels in the X direction at the point-in-time ⅘, so the approximation function f(x) is a function shifted by four pixels in the X direction from the state in FIG. 147A. Accordingly, the approximation function f(x) at this time is as represented with the following Expression (149).

$$f(x) = \begin{cases} Q_0 & (3.5 \leq x < 4.5) \\ Q_1 & (4.5 \leq x < 5.5) \\ Q_2 & (5.5 \leq x < 6.5) \\ Q_3 & (6.5 \leq x < 7.5) \\ Q_4 & (7.5 \leq x < 8.5) \\ Q_5 & (8.5 \leq x < 9.5) \\ Q_6 & (9.5 \leq x < 10.5) \\ Q_7 & (10.5 \leq x < 11.5) \end{cases} \quad (149)$$

Now, as described above in FIG. 145, the pixel value obtained from the sensor 2 is a value wherein actual world 1 light signals at the time of starting exposure through actual world 1 light signals and the time of ending exposure, have been integrated. In other words, the pixel value is a value corresponding to a level obtained by temporal mixing of the level of light at the time of starting exposure through the level of light at the time of ending exposure.

Accordingly, in the event that the portion corresponding to one pixel of the actual world 1 light signals (detecting element of the sensor 2) is not a portion where light signals of the same level are uniformly distributed over time, but rather a case wherein light signals which differ in level over time are distributed, as in a case of the subject moving, detection of that portion by the sensor 2 results in the different levels of light being temporarily mixed by the integration effects of the sensor 2 (integrated (added) in the time direction), and becoming one pixel value. A region comprising a pixel wherein the level differs over time for an image (actual world 1 light signal) of a subject corresponding to one pixel, such as in the case wherein the subject moves or the camera shakes due to hand shaking at the time of photography of the subject, will be called a time mixture region. A time mixture region occurring due to the subject moving will be called a movement blurring region. Accordingly the pixel value of a movement blurring region will be of value wherein the image of the subject (actual world 1 light signal) at the time of starting the exposure through the image of the subject (actual world 1 light signal) at the time of ending the exposure, is temporally integrated (added). The actual world estimating unit 12003 shown in FIG. 143 estimates the actual world 1 light signals from the pixel value in the movement blurring region. That is to say, the actual world estimating unit 12003 generates a relation model modeling the relation between the pixel values of the movement blurring region and the approximation function f(x) with the understanding that a pixel value in the movement blurring region is a value obtained by the approximation function f(x) approximating the actual world 1 light signals being integrated while moving corresponding to the movement amount from the time of starting exposure to the time of it ending exposure, and obtains the approximation function f(x) based on the relation model.

Here, saying that the movement amount is 5 as described above, the subject moves one pixel in the X correction at the point-in-time 1 of ending exposure, and reaches the position of having moved 5 pixels in the X direction from the position at the starting time of exposure. However, at that instant, the exposure at the sensor 2 ends. Accordingly, with the point-in-time of starting exposure as 0, the subject of exposure at the sensor 2 during 1, which is the exposure time, is the approximation function f(x) at point-in-times 0, ⅕, ⅖, ⅗, and ⅘.

FIG. 148A through FIG. 148C are diagrams for describing the relation (relation model) between the image data output from the sensor 2 in the movement blurring region, and the approximation function f(x) approximating the X-cross-section waveform F(x) wherein the light signal function F(x, y, t) representing the actual world 1 light signals has been projected in the X direction.

In FIG. 148A through FIG. 148C, the X direction and t direction represent the X direction and t direction of the sensor 2 (FIG. 145). Region 12031 represents the region corresponding to the multiple pixels arrayed in the X direction of the sensor 2. Here, the region 12031 is sectioned into eight small regions (rectangular regions long in the vertical direction), each of the small regions corresponding to one pixel. Note that here, the number of small regions of the region 12031, i.e., the number of pixels, matches the number of pixels in the X direction in each horizontal line of the processing region. The length of one side in the X direction of a small region represents the length of a pixel of the sensor 2 in the X direction, and the length of one side in the t direction represents the exposure time of the sensor 2. Accordingly, the region 12031 can be understood as a region of pixels making up a certain horizontal line in the processing region.

FIG. 148A represents an example of image data (pixel values) $Q_0$ through $Q_7$, output from the sensor 2 upon actual world 1 light signals represented with the approximation function f(x) which are stationary, being input to the region 12031 of the sensor 2.

Now, let us say that $x_0$ through $x_7$ are each the center coordinate values in the X direction of the eight pixels in the region 12031. Also, the relation of $x_0 < x_1 < \ldots < x_7$ holds, and also in this case, the width in the X direction of the pixel is 1, so the relation holds of the expression $x_1 = x_0 + 1, x_2 = x_1 + 1, \ldots,$ $x_7 = x_6 + 1$. In this case, the approximation function f(x) can be represented by Expression (150).

$$f(x) = \begin{cases} Q_0 & (x_0 - 0.5 \leq x \leq x_0 + 0.5) \\ Q_1 & (x_1 - 0.5 \leq x \leq x_1 + 0.5) \\ Q_2 & (x_2 - 0.5 \leq x \leq x_2 + 0.5) \\ Q_3 & (x_3 - 0.5 \leq x \leq x_3 + 0.5) \\ Q_4 & (x_4 - 0.5 \leq x \leq x_4 + 0.5) \\ Q_5 & (x_5 - 0.5 \leq x \leq x_5 + 0.5) \\ Q_6 & (x_6 - 0.5 \leq x \leq x_6 + 0.5) \\ Q_7 & (x_7 - 0.5 \leq x \leq x_7 + 0.5) \end{cases} \quad (150)$$

In the event that the actual world 1 light signals are stationary, the pixel values obtained at the eight pixels in the region 12031 are values integrating the approximation function f(x) in Expression (150), over the exposure time, from Expression (146). In this case, the exposure time is 1, so the pixel values obtained at the eight pixels in the region 12031 are the same value as $Q_0$ through $Q_7$, which are the approximation function f(x) values in Expression (150), as shown in FIG. 148A. Accordingly $Q_0$ through $Q_7$ are the pixel values of the eight pixels in the region 12031 in the case in which the actual world 1 light signals are stationary, and there is no movement blurring are occurring in the pixels wherein the pixel values $Q_0$ through $Q_7$ are obtained, and accordingly will hereafter be referred to as pixel values without movement blurring.

FIG. 148B represents an example of image data (pixel values) $P_0$ through $P_7$ output from the sensor 2 regarding the region 12031 of the sensor 2 upon the signals represented by the approximation function f(x) being input, in the event that the actual world 1 light signals represented by the approximation function f(x) have continuity of moving in the horizontal direction with a certain movement amount of v. Now, the pixel values $P_0$ through $P_7$ are the pixel values of eight pixels wherein the coordinates in the X direction within the region 12031 are $x_0, x_1, \ldots, x_7$, respectively.

In the event that the movement amount v in the exposure time is 5, for example, the pixel values $P_0$ through $P_7$ can be represented as shown in FIG. 148C, using the movement amount v and the pixel values $Q_0$ through $Q_7$ with no movement blurring.

That is to say, as described with reference to FIG. 146 and FIG. 147A through FIG. 147C, in the event that the actual world 1 light signals are moving in the horizontal direction at a constant speed, a charge corresponding to the light signal represented by the approximation function f(x) is stored at the position of the pixel for each time 1/v (in the cases FIG. 148C, of ⅕) at the eight pixels of which the center coordinates in the X direction is $x_0$ through x 7.

Now, representing a pixel of which the center coordinate value in the X direction is $X_1$ as pixel #1, and a charge is stored in at the pixel #4 with the center coordinate value in the X direction of $X_4$, corresponding to the light signal represented by the approximation function f(x) at the position of the pixel #4, over the time 1/v which is from 0 which is the exposure start time to the point-in-time 1/v. That is to say, at the pixel #4, the pixel value according to the charge stored and at this time, is $Q_4/v$, which is 1/v of the pixel value $Q_4$ as to the charge stored with the exposure time of 1. That is to say, the pixel value from the charge stored at the pixel #4 at this time is $Q_4/v$, which is a value obtained by the value $Q_4$ at the position of the pixel #4 in the approximation function f(x) in the Expression (150) being subjected to time integration by the time 1/v.

Next, during the 1/v from point-in-time 1/v to point-in-time 2/v, the charge is stored at the pixel #4, corresponding to a light signal represented by the approximation function f(x) at the position of the pixel #4. At this time, the approximation function f(x) is in a state shifted by one pixel in the X direction from the state at the point of starting the exposure, due to the continuity of the actual world 1 light signals moving in the horizontal direction by the movement amount of v, so the pixel value of the charge stored at the pixel #4 is $Q_3$/v, which is the value obtained by the value $Q_3$ at the position of the pixel #4 in the approximation function f(x) shifted by one pixel in the X direction being subjected to time integration by time 1/v.

During the exposure time, the approximation function f(x) moves in the X direction at an equal speed, so subsequently, in the same way as described above, a charge corresponding to the pixel value $Q_2$/v is stored at the pixel #4 over the time 1/v from the point-in-time 2/v to the point-in-time 3/v, and a charge corresponding to the pixel value $Q_1$/v is stored at the pixel #4 over the time 1/v from the point-in-time 3/v to the point-in-time 4/v. Further, a charge corresponding to the pixel value $Q_0$/v is stored at the pixel #4 over the time 1/v from the point-in-time 4/v to the point-in-time 5/v (in the case of FIG. 148C, the point-in-time 1, i.e., the exposure ending time). Accordingly, ultimately, the pixel value $P_4$ of the pixel #4, is the sum of these pixel values, i.e., $Q_4/v+Q_3/v+Q_2/v+Q_1/v+Q_0/v$.

Pixels other than the pixel #4 can also be considered the same way, so the pixel values $P_4$ through $P_7$ of the pixels in the region 12031 are represented by the following Expression (151), using the movement amount v and the pixel values $Q_0$ through Q7 with no movement blurring.

$$P_4=(Q_0+Q_1+Q_2+Q_3+Q_4)/v$$

$$P_5=(Q_1+Q_2+Q_3+Q_4+Q_5)/v$$

$$P_6=(Q_2+Q_3+Q_4+Q_5+Q_6)/v$$

$$P_7=(Q_3+Q_4+Q_5+Q_6+Q_7)/v \quad (151)$$

Thus, pixel values $P_i$ (i=0, 1, ..., 7) output from the sensor 2 are the sum (integration) of the multiple pixel values $Q_i$ without movement blurring, and accordingly have movement blurring.

Now, the approximation function f(x) approximates the actual world light signals projected on the pixels #0 through pixel #7 in the processing region, at the point-in-time of starting exposure. Also, in this case, the subject in the processing region is moving in the X direction (from the left to right direction). Accordingly, pixels to the left side of this processing region, i.e., pixels #0, #1, #2, and #3, in FIG. 148C, cannot be represented using the approximation function f(x). Accordingly, in Expression (151), the pixel values without movement blurring, i.e., the number of variables $Q_0$ through $Q_7$ to be obtained, is greater than the number of equations.

That is to say, in Expression (151), the number of variables to obtain is the eight variables of $Q_0$ through $Q_7$, but here the number of equations is 4, which is smaller than 8. Accordingly, in order to obtain the pixel values $Q_0$ through $Q_7$ without movement blurring, there is further needs of the independent equations using the pixel values $Q_0$ through $Q_7$ without movement blurring. Accordingly here, equations constraining the pixel values $Q_0$ through $Q_7$ without movement blurring are substituted in, for example. These equations will be described later.

The actual world estimating unit 12003 shown in FIG. 143 generates an expression the same as Expression (151) as a relation model, according to the number of pixels in the X direction of the processing region and the movement amount v, and based on the relation model, obtains the pixel values without movement blurring, i.e., the approximation function f(x) serving as an approximation model approximating the actual world 1 light signals.

Next, the actual world estimation processing (the processing in step S11208 in FIG. 144) of the actual world estimating unit 12003 (FIG. 143) will be described in detail with reference to the flowchart in FIG. 149.

In step S12031, the model generating unit 12011 generates a relation model. That is to say, the model generating unit 12011 recognizes the processing region in the input image from the processing region information supplied from the processing region setting unit 12001, and also recognizes the movement amount corresponding to the image data of the processing region, from the continuity information supplied from the continuity setting unit 12002. Further, the model generating unit 12011 generates, for each horizontal line in the processing region, a relation model modeling the relation between the pixel values Pi of the pixels detected by the sensor 2 within the processing region and the pixel values $Q_i$ of pixels without movement blurring represented by the approximation model approximating the actual world 1 light signals, according to the pixels making up the horizontal line of the processing region, and the movement amount corresponding to the image data in the processing region, for the processing region in the input image, and supplies this to the equation generating unit 12012. The model generating unit 12011 then proceeds from step S12031 to step S12032.

Specifically, the model generating unit 12011 generates an expression representing the relation between the pixel values Pi of the pixels in each horizontal line of the processing region, and the pixel values $Q_i$ without movement blurring, described with reference to FIG. 148A through FIG. 148C, according to the number of pixels in the horizontal line of the processing region, and the movement amount, as a relation model. For example, in the event that the number of pixels in a horizontal line is in the processing region is 8, and the movement amount v is 5, the equations in the above-described Expression (151), are generated as a relation model.

In step S12032, the equation generating unit 12012 performs equation generating processing. That is to say, the equation generating unit 12012 recognizes the processing region in the input image from the processing region information supplied from the processing region setting unit 12001, and with regard to this processing region, substitutes the pixel values $P_i$ of each of the pixels of the input image into the relation model obtained with regard to each of the horizontal lines of the processing region supplied from the model generating unit 12011, thereby generating the equations (model equations) of the Expression (151) for obtaining pixel values $Q_i$ without movement blurring, represented by an approximation function approximating the actual world 1 light signals.

Further, the equation generating unit 12012 generates constraint condition expressions which are expressions for constraining the approximation model approximating the actual world 1 light signals in the horizontal line of the processing region recognized from the processing region information supplied from the processing region setting unit 12001. That is to say, with model expressions, the number of pixel values $Q_i$ without movement blurring, which are the variables to be obtained, are greater than the number of equations, as indicated in Expression (151) so there is the need to introduce equations of a number equal to or greater than the number of pixel values $Q_i$ without movement blurring for the total number of equations, in order to obtain the pixel values $Q_i$ without movement blurring. Here, the equation generating unit 12012 generates a constraint condition expression to say that to the difference between the pixel values $Q_i$ without movement blurring represented by the approximation function, between adjacent pixels, is small (there is spatial correlation). The equation generating unit 12012 combines the generated model equation with the constraint condition expression, generates a normal equation, which is supplied to the actual world waveform estimating unit 12013, and the flow proceeds from step S12032 to step S12033.

Note that hereafter, the processing in step S12032 which the equation generating unit 12012 executes as described above will be called "equation generating processing". The details of "equation generating processing" will be described later with reference to the flowchart in FIG. 151.

In step S12033, the actual world waveform estimating unit 12013 solves the normal equation regarding each horizontal line of the processing region, supplied from the equation generating unit 12012, thereby estimating the waveform of the actual world 1 light signals, i.e., obtaining the pixel values $Q_i$ without movement blurring represented by the approximation function, and supplies the pixel values thereof to the image generating unit 12004.

Next, FIG. 150 illustrates a detailed configuration example of the equation generating unit 12012 shown in FIG. 143.

In FIG. 150, the equation generating unit 12012 comprises a model equation generating unit 12051, and constraint condition expression generating unit 12052, and normal equation generating unit 12053.

The relation model modeling the relation between pixel values of the pixels of each horizontal line in the processing region (pixel values of the movement blurring image), and the pixel values without movement blurring, are input from the model generating unit 12011, to the equation generating unit 12012 of which the configuration is shown in FIG. 150, and supplied to the model equation generating unit 12051. Also, the input image is input from the sensor 2 (FIG. 1) to the equation generating unit 12012, and the input image is supplied to the model equation generating unit 12051. Further, processing region information is input from the processing region setting unit 12001 to the equation generating unit 12012, and the processing region information is supplied to the model equation generating unit 12051 and the constraint condition expression generating unit 12052.

The model equation generating unit 12051 recognizes the processing region of the input image from the processing region information, and substitutes the pixel values of the processing region in the input image as the pixel values $P_i$ of each of the pixels in the movement blurring image of the relation model supplied from the model generating unit 12011, thereby generating the model equation in Expression (151). The model equation generating unit 12051 supplies the model equation to the normal equation generating unit 12053. Note that the relation models obtained from the model generating unit 12011 have specific values substituted into the movement amount v in Expression (151), for example, and the model equations obtained from the model equation generating unit 12051 have a specific value substituted into the pixel values $P_4$ through $P_7$ in Expression (151).

The constraint condition expression generating unit 12052 generates predetermined constraint conditions for the pixels of each of the horizontal lines in the processing region based on the processing region information, and supplies the constraint condition expressions to the normal equation generating unit 12053.

The normal equation generating unit 12053 combines the model equations supplied from the model equation generating unit 12051 and the constraint condition expressions supplied from the constraint condition expression generating unit 12052 to generate normal equations, which are supplied to the actual world waveform estimating unit 12013.

Next, the equation generating processing (the processing in step S12032 in FIG. 149) of the equation generating unit 12012 (FIG. 150), will be described in detail with reference to the flowchart in FIG. 151.

In step S12051, the model equation generating unit 12051 obtains a relation model for each horizontal line in the processing region from the model generating unit 12011, and the flow proceeds to step S12052. In step S12052, the model equation generating unit 12051 acquires the input image from the sensor 2, and also obtains processing region information from the processing region setting unit 12001. The model equation generating unit 12051 then recognizes the pixel values $P_i$ for each of the pixels within the processing region from the processing region information of the input image, and substitutes the pixel values $P_i$ into the relation model of the Expression (151) obtained from the model generating unit 12011, thereby generating a model equation for each horizontal line of the processing region. Further, the model equation generating unit 12051 supplies the model equations to the normal equation generating unit 12053. In the event that the model equation generating unit 12051 has obtained the relation models represented by the above Expression (151) from the model generating unit 12011, for example, model equations are generated by substituting the pixel values of the input image into the pixel values $P_4$ through $P_7$ in Expression (151).

Following the processing in step S12052, the flow proceeds to step S12053, where the constraint condition expression generating unit 12052 generates constraint condition expressions based on the processing region information, supplies the constraint condition expressions to the normal equation generating unit 12053, and the flow proceeds to step S12054, that is to say, the constraint condition expression generating unit 12052 generates constraint condition expressions representing the constraint condition wherein the difference between pixel values $Q_i$ and $Q_{i+1}$, between adjacent pixels without movement blurring represented by the approximation function, is small, according to the number of pixels in the horizontal line in the processing region. For example, in the event that the number of pixels in a horizontal line in the processing region is 8, and the pixel values without movement blurring of these eight pixels are to be represented with $Q_0$ through $Q_7$, the constraint Expression is represented as in the following Expression (152), for example.

$Q_0 = Q_1$ $Q_1 = Q_2$ $Q_2 = Q_3$ $Q_3 = Q_4$ $Q_4 = Q_5$ $Q_5 = Q_6$ $Q_6 = Q_7$ (152)

That is to say, Expression (152) represents that the pixel values $Q_i$ and $Q_{i+}$ of that adjacent pixels in the horizontal line in the processing region, are equal.

In step S12054, the normal equation generating unit 12053 combines the model equations of the Expression (151) supplied from the model equation generating unit 12051, and the constraint condition expression of the Expression (152) supplied from the constraint condition expression generating unit 12052, thereby generating normal equations which are supplied to the actual world waveform estimating unit 12013.

Hereafter, the actual world waveform estimating unit 12013 solves the normal equation supplied from the normal equation generating unit 12053 with the minimum norm for the least-square-error, for example, thereby obtaining the pixel value $Q_i$ with no movement blurring, for the pixels of each horizontal line in the processing region.

Note that the above-described actual world waveform estimating processing is performed for each of the pixels arrayed in the horizontal direction within the processing region (horizontal line). That is to say, the actual world waveform estimating unit 12013 obtains pixel values $Q_i$ without movement blurring for each of the pixels in the processing region, for each horizontal line. The actual world waveform estimating unit 12013 then, having obtained the pixel values $Q_i$ without movement blurring for each of the pixels within all the horizontal lines within the processing region, supplies the pixel values $Q_i$ without movement blurring of each of the pixels of the processing region, to the image generating unit 12004. The image generating unit 12004 generates an image wherein the pixel values $P_i$ of each of the pixels in the processing region in the input image have been replaced with the pixel values $Q_i$ without movement blurring, as an output image, and supplies this to the image display unit 12005 for display.

Now, FIG. 152A through FIG. 152C illustrate the relation between the pixel values $P_i$ of the pixels in a certain horizontal line in the processing region output from the sensor 2 and the pixel values $Q_i$ without movement blurring in fact horizontal line. Note that in the drawings, the portions which correspond to those in FIG. 148A through FIG. 148C are denoted with the same reference numerals, and hereafter the description thereof will be omitted as appropriate.

FIG. 152A through FIG. 152C are basically the same diagrams as the above-described FIG. 148A through FIG. 148C, and accordingly, represent the relation between the pixel values $Q_i$ with no movement blurring, and the pixel values $P_i$ wherein there is movement blurring.

Further, in FIG. 152A, the arrows 12061-1 through 12061-7 appended on the pixels with no movement blurring represent constraint conditions wherein the difference between the pixel values $Q_i$ and $Q_{i+1}$ between the pixels without movement blurring, indicated by both ends of the arrow, is small. The constraint condition shown in FIG. 152A represents that the difference between the pixel values $Q_i$ and $Q_{i+1}$ between all adjacent pixels without movement blurring in the horizontal line of the region 12031 which is the processing region, is small. The constraint condition expression generating unit 12052 shown in FIG. 150 employs the constraint condition shown in FIG. 152A, and generates the constraint condition expressions of Expression (152) representing the constraint condition.

FIG. 153 illustrates another configuration example of another embodiment of an application example of the signal processing device 4 shown in FIG. 111.

Note that FIG. 153 illustrates the configuration example of an embodiment of the signal processing device 4 for estimating actual world 1 light signals from movement blurring image data, which is an example of data 3 having continuity of moving in a predetermined direction at a predetermined speed, for example. That is to say, this signal processing device 4 estimates an image without blurring (image without movement blurring) from an image wherein a subject is taken in a blurred manner due to the subject (object) moving at the time of imaging, for example (movement blurring image). Accordingly, with the embodiment shown in FIG. 153, a movement blurring image, wherein movement blurring has occurred due to taking a moving object, is input to the signal processing device 4 as the input image. Note that here, an image obtained by imaging an object moving in the horizontal direction (from the left to right direction) at a constant speed (movement amount) is employed as the input image.

In FIG. 153, the processing region setting unit 12071, the continuity setting unit 12072, the actual world estimating unit 12073, image generating unit 12074, image display unit 12075, and user I/F 12076, each correspond to the processing region setting unit 10001, the continuity setting unit 10002, the actual world estimating unit 10003, image generating unit 10004, image display unit 10005, and user I/F 10006 shown in FIG. 111, and basically perform the same processing as the processing region setting unit 10001, the continuity setting unit 10002, the actual world estimating unit 10003, image generating unit 10004, image display unit 10005, and user I/F 10006. Further, in FIG. 153, the actual world estimating unit 12073 comprises a model generating unit 12081, an equation generating unit 12082, and actual world waveform estimating unit 12083. The model generating unit 12081, equation generating unit 12082, and actual world waveform estimating unit 12083 correspond to each of the model generating unit 10011, equation generating unit 10012, and actual world waveform estimating unit 10013 shown in FIG. 111, and basically perform the same processing as each of the model generating unit 10011, equation generating unit 10012, and actual world waveform estimating unit 10013.

Note however, that in FIG. 153, the assisting information which the user I/F 12076 outputs by the user operating the user I/F 12076, is supplied to the processing region setting unit 12071 and the actual world estimating unit 12073.

That is to say, in FIG. 153, the user can instruct a region wherein the image without movement blurring is estimated to be flat, as a flat region, with regard to the image displayed on the image display unit 12075, by operating the user I/F 12076, and upon the user performing operations to instruct the flat region, the user I/F 12076 supplies flat region instruction information representing the flat region specified by that operation, to the processing region setting unit 12071 and the actual world estimating unit 12073.

Now, examples of the method for instructing the flat region by operating the user I/F 12076 include, for example, the method by instructing with a rectangle surrounding the flat region, a method for instructing by trimming (trim) the flat region, a method for instructing by pointing one or more arbitrary points within the processing region, and so forth; here, the user instructs the flat region by pointing one arbitrary point in flat processing region, for example, by operating the user I/F 12076. In this case, the user I/F 12076 supplies coordinates on the image of that point, for example, as information representing the point where the user pointed, to the processing region setting unit 12071 and actual world estimating unit 12073, as processing region instructing information.

Next, the processing of the signal processing device 4 shown in FIG. 153 will be described with reference to the flowchart shown in FIG. 154.

First, in step S12071, the signal processing device 4 performs pre-processing, and the flow proceeds to step S12072.

That is to say, the signal processing device 4 supplies one frame or one field, for example, of the input image, supplied from the sensor 2 (FIG. 1) as data 3, to the processing region setting unit 12071, continuity setting unit 12072, actual world estimating unit 12073, image generating unit 12074, and image display unit 12075. Further, the signal processing unit 4 causes the image display unit 12075 to display the input image.

In step S12072, the user I/F 12076 determines whether or not there has been some sort of user input, by the user operating the user I/F 12076. In step S12072, in the event that determination is made that there is no user input, i.e., in the event that the user has made no operations, the flow skips steps S12073 through S12075, and proceeds to step S12076.

Also, in step S12072, in the event that determination is made that there has been user input, i.e., in the event that the user has viewed the input image displayed on the image display unit 12075 and operated the user I/F 12076, thereby making user input indicating some sort of instruction or information, the flow proceeds to step S12073, where the user I/F determines whether or not the user input is user instructions instructing ending of the processing of the signal processing device 4.

In the event that determination is made that in step S12073 that the user input is ending instructions, that is to say, for example, in the event that the user who has viewed the input image displayed on the image display unit 12075, operates the user I/F 12076 so as to end the processing of the signal processing device 4 with no need for performing signal processing with regard to the input image, since the user did not find the image quality of the input image unsatisfactory, the signal processing device 4 ends the processing.

Also, in the event that determination is made in step S12073 that the user input is not ending instructions, the flow proceeds to step S12074, where the user I/F 12076 determines whether or not the user input is flat region instruction information. In the event that determination is made in step S12074 that the user input is not flat region instruction information, step S12075 is skipped, and the flow proceeds to step S12076.

On the other hand, in the event that determination is made in step S12074 that there has been input of flat region instructing information, that is to say, in the event that the user who has viewed the input image displayed on the image display unit 12075 and found the image quality of the input image unsatisfactory, and therefore operated the user I/F 12076 so as to point a portion wherein an image without movement blurring is estimated to be a flat image, the flow proceeds to step S12075, where the user I/F 12076 supplies flat region instructing information representing the point which the user has pointed by operating the user I/F 12076 to the processing region setting unit 12071, and the actual world estimating unit 12073, and the flow proceeds to step S12076.

In step S12076, the processing region setting unit 12071 sets a predetermined rectangular region including the flat region as a processing region for example, based on the flat region instruction information supplied from the user I/F 12076, and supplies the processing region information to the continuity setting the unit 12072, the actual world estimating unit 12073, and the image generating unit 12074, and the flow proceeds to step S12077. Note that this processing region may be input by the user operating the user I/F 12076.

However, in the event that flat region instructing information is not supplied from the user I/F 12076 to the processing region setting unit 12071 (in the event that the processing of step S12076 is performed immediately following step S12072 or step S12074), the processing region setting unit 12071 automatically sets a processing region by performing predetermined processing (for example, processing for detecting a region in the input image where movement blurring has occurred).

In step S12077, the continuity setting unit 12072 recognizes the processing region in the input image, from the processing region information supplied from the processing region setting unit 12071. Further, the continuity setting unit 12072 sets the movement amount of the object displayed in the processing region, as information representing the continuity of the actual world 1 signals lost in each of the processing region image data, and supplies continuity information representing the continuity to the actual world estimating unit 12073, and the flow proceeds to step S12078. Note that this movement amount may be input by the user operating the user I/F 12076. Also, here, the continuity setting unit 12072 sets movement amount representing the magnitude of movement of the object as the continuity information in the input image, since it is assumed that the object is moving in the horizontal direction, but an arrangement may be made wherein a movement vector representing the magnitude and direction of movement of the object is set as the continuity information.

In step S12078, the actual world estimating unit 12073 estimates the actual world 1 light signals (image without movement blurring) with regard to the image data within the processing region of the input image (data of movement blurring image), based on the movement amount of the corresponding actual world 1 signals, according to the processing region information supplied from the processing region setting unit 12071, and the flat region instruction information supplied from the user I/F 12076.

That is to say, at the actual world estimating unit 12073, the model generating unit 12081 recognizes the processing region in the input image from the processing region information supplied from the processing region setting unit 12071, and also recognizes the movement amount of the actual world 1 signals corresponding to the processing region image data, based on the continuity information supplied from the continuity setting unit 12072, i.e., in this case, recognizes the amount of movement of the object displayed in the processing region. Further, the model generating unit 12081 generates a relation model modeling the relation between the pixel values of the pixels in each horizontal line within the processing region and the actual world 1 light signals, corresponding to the pixels making up each horizontal line in the processing region of the input image and the movement amount of the actual world 1 light signals corresponding to the image data of the processing region, for each of the horizontal lines in the processing region, which are supplied to the equation generating unit 12082.

The equation generating unit 12082 recognizes the processing region in the input image from the processing region information supplied from the processing region setting unit 12071, and substitutes pixel values of each of the pixels of the input image into the relation model for each horizontal line of the processing region according to the processing region which has been supplied from the model generating unit 12081, thereby generating an equation for obtaining an approximation function serving as an approximation model approximating the actual world 1 signals, which is then supplied to the actual world waveform estimating unit 12083. Further, the equation generating unit 12082 generates a constraint condition expression constraining the approximation function, based on the processing region information or the flat region instructing information, and supplies this to the actual world waveform estimating unit 12083.

The actual world waveform estimating unit 12083 solves the equation supplied from the equation generating unit 12082, thereby estimating waveforms of the actual world 1 light signals. That is to say, the actual world waveform estimating unit 12083 obtains an approximation function serving as an approximation model modeling the actual world 1 light signals by solving the equation supplied from the equation generating unit 12012, and supplies the approximation function to the image generating unit 12074 as estimation results of the actual world 1 light signals.

Now, the processing in step S12078 which such an actual world estimating unit 12073 executes will be called "actual world estimation processing". Details of "actual world estimation processing" will be described later with reference to the flowchart in FIG. 155.

Following the processing in step S12078, the flow proceeds to step S12079, where the image generating unit 12074 generates signals closer approximating the actual world 1 light signals, based on the approximation function closer approximating the waveform of the actual world 1 light signals, supplied from (the actual world waveform estimating unit 12083 of) the world estimating unit 12073. That is to say, the image generating unit 12074 recognizes the processing region in the input image from the processing region information supplied from the processing region setting unit 12071, and generates an approximation image closer approximating the actual world 1 light signals (an image without movement blurring in this case, for example), based on the approximation function regarding the corresponding processing region supplied from the actual world estimating unit 12073.

Further, the image generating unit 12074 generates, as an output image, an image wherein the processing region portion in the input image has been replaced with the approximation image (image without movement blurring), which is then supplied to the image display unit 12075, and the flow proceeds from step S12079 to step S12080.

In step S12080, the image display unit 12075 displays the output image supplied from the image generating unit 12074 instead of the input image displayed in step S12071, or along with the input image, and the flow proceeds to step S12081.

In step S12081, as with the case of step S12072, the user I/F 12076 determines whether or not there has been some sort of user input by the user operating the user I/F 12076, and in the event that determination is made that there has been no user input, i.e., in the event that the user has made no operations, the flow returns to step S12081, and awaits some sort of user input.

Also, in the event that determination is made in step S12081 that there has been user input, i.e., in the event that the user has viewed the input image or output image displayed on the image display unit 12075 and operated the user I/F 12076, thereby making user input representing some sort of instructions or information and in the event that there has been some sort of user input, the flow proceeds to step S12082, where the user I/F 12076 determines whether or not the user input is ending instructions instructing ending of the processing of the signal processing device 4.

In the event that determination is made in step S12082 that the user input is ending instructions, that is to say, for example, in the event that the user who has viewed the output image displayed on the image display unit 12075, operates the user I/F 12076 so as to end the processing of the signal processing device 4 with no need for performing signal processing with regard to the output image, since the user did not find the image quality of the input image unsatisfactory, the signal processing device 4 ends the processing.

Also, in the event that determination is made in step S12082 that the user input is not ending instructions, the flow proceeds to step S12083, where the user I/F 12076 determines whether or not the user input is flat region instruction information. In the event that determination is made in step S12083 that the user input is not flat region instruction information, the flow returns to step S12081, and hereafter the same processing is repeated.

Also, in the event that determination is made in step S12083 that the user input is flat region instructing information, that is to say, in the event that the user who has viewed the output image displayed on the image display unit 12075 and found the image quality of the input image unsatisfactory, and therefore operated the user I/F 12076 so as to point to a portion wherein an image without movement blurring is estimated to be a flat image as to the output image, the flow returns to step S12075, where the user I/F 12076 supplies flat region instructing information representing the point which the user has pointed by operating the user I/F 12076 to the processing region setting unit 12071 and the actual world estimating unit 12073, as described above, and the flow proceeds from step S12075 to step S12076 and hereafter the same processing is repeated.

That is to say, accordingly, this processing of steps S12075 through S12083 is repeated, the dissatisfaction of the user with the output image is resolved, and consequently, the user obtains an output image of the desired image quality.

As described above, with the signal processing device 4, an output image which is a processing result of the input image is presented to the user, for the user to instruct a new flat region from the output image, wherein an image without movement blurring is estimated to be a flat image, and processing is performed again based upon the flat region, so high-quality output images, meeting the user's preferences, can be easily obtained.

That is to say, the signal processing device 4 presents the user with an output image which is processing results of the input image. On the other hand, the user recognizes the output image, and gives feedback to the signal processing device 4 with a region, wherein an image without movement blurring is estimated to be a flat image, as a flat region. The signal processing device 4, considering the feedback from the user, for example, generates a constraint condition expression wherein the difference between pixel values of adjacent pixels is small, as a constraint condition expression for constraining approximation functions serving as approximation models approximating the actual world 1 light signals, for the flat region alone instructed from the user out of the input image. The signal processing device 4 uses the constraint condition expressions to process the input image again, and hereafter the same processing is repeated. Accordingly, the signal processing device 4 generates a constraint condition expression wherein the difference between pixel values of adjacent pixels is small, for the flat region alone of the input image, and so the input image is processed for regions with edges without generating the constraint condition expression wherein the difference between pixel values of adjacent pixels is small, so noise in flat regions in the input image is suppressed, edges in regions with edges are maintained, and high-quality output images, meeting user preferences, can be easily obtained.

Now, it can be said that the signal processing device 4 receiving feedback from the user and performing processing on the input image means that the signal processing device 4 is performing processing in cooperation with the user.

Next, the actual world estimation processing (the processing in step S12078 in FIG. 154) of the actual world estimating unit 12073 (FIG. 153) will be described in detail with reference to the flowchart in FIG. 155.

In step S12101, the model generating unit 12081 generates a relation model. That is to say, the model generating unit 12081 recognizes the processing region in the input image from the processing region information supplied from the processing region setting unit 12071, and also recognizes the movement amount corresponding to the image data of the processing region, from the continuity information supplied from the continuity setting unit 12072. Further, the model generating unit 12081 generates, for each horizontal line in the processing region, a relation model modeling the relation between the pixel values $P_i$ of the pixels detected by the sensor 2 within the processing region and the pixel values $Q_i$ of pixels without movement blurring represented by the approximation model approximating the actual world 1 light signals, according to the pixels making up the horizontal line of the processing region, and the movement amount corresponding to the image data in the processing region, for the processing region in the input image, and supplies this to the equation generating unit 12082. The model generating unit 12081 then proceeds from step S12101 to step S12102.

Specifically, the model generating unit 12011 generates an expression representing the relation between the pixel values $P_i$ of the pixels in each horizontal line of the processing region, and the pixel values $Q_i$ without movement blurring, described with reference to FIG. 148A through FIG. 148C, according to the number of pixels in the horizontal line of the processing region, and the movement amount, as a relation model. For example, in the event that the number of pixels in a horizontal line in the processing region is 8, and the movement amount v is 5, the equations in the above-described expression (151), are generated as a relation model.

In step S12102, the equation generating unit 12082 performs equation generating processing. That is to say, the equation generating unit 12082 recognizes the processing region in the input image from the processing region information supplied from the processing region setting unit 12071, and with regard to this processing region, substitutes the pixel values $P_i$ for each of the pixels of the input image making up the processing region into the relation model obtained with regard to each of the horizontal lines of the processing region supplied from the model generating unit 12081, thereby generating the equations (model equations) of the Expression (151) for obtaining pixel values $Q_i$ without movement blurring, represented by an approximation function approximating the actual world 1 light signals.

Further, the expression generating unit 12082 generates constraint condition expressions which are expressions for constructing the approximation model approximating the actual world 1 light signals in the horizontal line of the processing region recognized from the processing region information supplied from the processing region setting unit 12071. That is to say, with model expressions, the number of pixel values $Q_i$ without movement blurring, which are the variables to be obtained, are greater than the number of equations, as indicated in Expression (151) so there is the need to introduce equations of a number equal to or greater than the number of pixel values $Q_i$ without movement blurring for the total number of equations, in order to obtain the pixel values $Q_i$ without movement blurring. Here, the equation generating unit 12082 generates a constraint condition expression to say that to the difference between the pixel values $Q_i$ without movement blurring represented by the approximation function, between adjacent pixels, is small (there is spatial correlation). In the event that a flat region has been instructed by the user, the equation generating unit 12082 generates the constraint condition expression regarding the flat region alone.

Accordingly, even in the event that the image without movement blurring is not flat and has some sort of pattern, for example, such that the image has a high level of activity, an image without movement blurring having the image quality which the user desires can be obtained. That is to say, the equation generating unit 12082 does not apply the constraint condition wherein the difference between the pixel values of adjacent pixels is small, to edge portions where light intensity is markedly different that not instructed as a flat region by the user, in an image without movement blurring, and applies the constraint condition wherein the difference between the pixel values of adjacent pixels is small, to flat portions instructed as flat regions by the user, thereby generating constraint condition equations. Consequently, the edge is maintained in edge portion images, and a high-image-quality image without movement blurring, and with noise suppressed, is obtained at the flat portion images.

Also, in the event that the user instructs a flat region, there is no need for the user to determine constraint condition expressions for each of the pixels with regard to all of the pixels in the processing region, or for the equation generating unit 12082 to determine constraint condition expressions by estimating flat regions from features and so forth of the input image, and a constraint condition expression can easily be applied to a flat image portion alone in an image without movement blurring. Consequently, the signal processing device 4 can easily obtain an output image of the image quality which the user desires.

The equation generating unit 12082 combines the generated model equations and the constraint condition expressions to generate normal equations, supplies this to the actual world waveform estimating unit 12083, and the flow proceeds from step S12102 to step S12103.

Note that hereafter, the processing in step S12102 which the equation generating unit 12082 executes as described above will be called "equation generating processing". The details of "equation generating processing" will be described later with reference to the flowchart in FIG. 157.

In step S12103, the actual world waveform estimating unit 12083 solves the normal equation regarding each horizontal line of the processing region, supplied from the equation generating unit 12082, thereby estimating the waveform of the actual world 1 light signals, i.e., obtaining the pixel values $Q_i$ without movement blurring represented by the approximation function, and supplies the pixel values thereof to the image generating unit 12074.

Next, FIG. 156 illustrates a detailed configuration example of the equation generating unit 12082 shown in FIG. 153.

In FIG. 156, the equation generating unit 12082 comprises a model equation generating unit 12101, and constraint condition expression generating unit 12102, and normal equation generating unit 12103.

The relation model modeling the relation between pixel values of the pixels of each horizontal line in the processing region (pixel values of the movement blurring image), and the pixel values without movement blurring, are input from the model generating unit 12081, to the equation generating unit 12082 of which the configuration is shown in FIG. 156, and supplied to the model equation generating unit 12101. Also, the input image is input from the sensor 2 (FIG. 1) to the equation generating unit 12082, and the input image is supplied to the model equation generating unit 12101.

Further, processing region information is input from the processing region setting unit 12071 to the equation generating unit 12082, and the processing region information is supplied to the model equation generating unit 12101 and the constraint condition expression generating unit 12102. Also, the flat region instruction information is input to the equation generating unit 12082 from the user I/F 12076, which is supplied to the constraint condition expression generating unit 12102.

The model equation generating unit 12101 recognizes the processing region of the input image from the processing region information, and substitutes the pixel values of the processing region in the input image as the pixel values $P_i$ of each of the pixels in the movement blurring image of the relation model supplied from the model generating unit 12081, thereby generating the model equation in Expression (151). The model equation generating unit 12101 supplies the model equation to the normal equation generating unit 12103. Note that the relation models obtained from the model generating unit 12081 have specific values substituted into the movement amount v in Expression (151), for example, and the model equations obtained from the model equation generating unit 12101 have a specific value substituted into the pixel values $P_4$ through $P_7$ in Expression (151).

The constraint condition expression generating unit 12102 generates predetermined constraint conditions for the pixels of each of the horizontal lines in the processing region based on the processing region information or the flat region instruction information, and supplies the constraint condition expressions to the normal equation generating unit 12103.

The normal equation generating unit 12103 combines the model equations supplied from the model equation generating unit 12101 and the constraint condition expression supplied from the constraint condition expression generating unit 12102 to generate normal equation, which are supplied to the actual world waveform estimating unit 12083.

Next, the equation generating processing (the processing in step S12102 in FIG. 155) of the equation generating unit 12082 (FIG. 156), will be described in detail with reference to the flowchart in FIG. 157.

In step S12121, the model equation generating unit 12101 obtains a relation model for each horizontal line in the processing region from the model generating unit 12081, and the flow proceeds to step S12122. In step S12122, the model equation generating unit 12101 acquires the input image from the sensor 2, and also obtains processing region information from the processing region setting unit 12071. The model equation generating unit 12101 then recognizes the pixel values $P_i$ for each of the pixels within the processing region from the processing region information of the input image, and substitutes the pixel values $P_i$ into the relation model of the Expression (151) obtained from the model generating unit 12081, thereby generating a model equation for each horizontal line of the processing region. Further, the model equation generating unit 12101 supplies the model equations to the normal equation generating unit 12103. In the event that the model equation generating unit 12101 has obtained the relation models represented by the above Expression (151) from the model generating unit 12081, for example, model equations are generated by substituting the pixel values of the input image into the pixel values $P_4$ through $P_7$ in Expression (151).

Following the processing in step S12122, the flow proceeds to step S12123, where the constraint condition expression generating unit 12102 determines regarding whether or not flat region instruction information has been input from the user I/F 12076, and in the event that determination is made that flat region instruction information has not been input, step S12124 is skipped, and the flow proceeds to step S12125. In this case, in step S12125 the constraint condition expression generating unit 12102 generates constraint condition expressions based on the processing region information automatically set by the processing region setting unit 12071 performing predetermined processing, for example, supplies the constraint condition expressions to the normal equation generating unit 12103, and the flow proceeds from step S12125 to step S12126. That is to say, the constraint condition expression generating unit 12102 generates constraint condition expressions representing the constraint condition wherein the difference between pixel values $Q_i$ and $Q_{i+1}$, between adjacent pixels without movement blurring represented by the approximation function, is small, for all pixels in each horizontal line in the processing region. For example, in the event that the number of pixels in a horizontal line in the processing region is 8, and the pixel values without movement blurring of these eight pixels are to be represented with $Q_0$ through $Q_7$, the constraint expression is represented as in the above-described Expression (152), for example.

On the other hand, in the event that determination is made in step S12123 that flat region instruction information has been input from the user I/F 12076, the constraint condition expression generating unit 12102 proceeds to step S12124, obtains flat region instruction information from the user I/F 12076, and the flow proceeds to step S12125.

In this case, in step S12125, the constraint condition expression generating unit 12102 generates constraint condition expressions based on the flat region instruction information. That is to say, the constraint condition expression generating unit 12102 generates constraint condition expressions only regarding flat regions (changes the weight regarding a constraint condition expression corresponding to pixels in the flat region and weight regarding constraint condition expressions corresponding to pixels other than in flat regions, from 1-to-1 to 1-to-0. That is to say, weighting of part of the constraint condition expression is changed). The constraint condition expression generating unit 12102 supplies the generated constraint condition expressions to the normal equation generating unit 12103, and the flow proceeds from step S12125 to step S12126.

For example, as shown in FIG. 148A through FIG. 148C or FIG. 152A through 152C, in the event that a horizontal line in the processing region is configured of eight pixels #0 through #7, and the pixels #0 through #5 of the eight pixels #0 through #7 are specified as a flat region, the constraint condition expressions are as in the following Expression (153) using the pixel values $Q_0$ through $Q_5$ without movement blurring of the pixels #0 through #5, for example.

$$Q_0 = Q_1$$
$$Q_1 = Q_2$$
$$Q_2 = Q_3$$
$$Q_3 = Q_4$$
$$Q_4 = Q_5 \qquad (153)$$

That is to say, Expression (153) represents that the pixel values $Q_i$ and $Q_{i+1}$ of that adjacent pixels in the horizontal line in the processing region, are equal.

Accordingly, the constraint condition wherein the difference between pixel values of adjacent pixels in an image without movement blurring is small, is applied only to regions where the actual image is flat, so the signal processing device 4 can generate images without movement blurring that closer approximate the actual world 1 signals.

In step S12126, the normal equation generating unit 12103 combines the model equations of Expression (151) supplied from the model equation generating unit 12101, and the constraint condition expressions of the Expression (152) supplied from the constraint condition expression generating unit 12102 or the constraint condition expressions of Expression (153) (constraint condition expressions of which weighting is changed), thereby generating normal equations which are supplied to the actual world waveform estimating unit 12083.

Hereafter, the actual world waveform estimating unit 12083 solves the normal equation supplied from the normal equation generating unit 12103 with the minimum norm for the least-square-error, for example, thereby obtaining the pixel values $Q_i$ with no movement blurring, for the pixels of each horizontal line in the processing region.

Note that the above-described actual world estimating processing is performed for each of the pixels arrayed in the horizontal direction within the processing region (horizontal line). That is to say, the actual world waveform estimating unit 12083 obtains pixel values $Q_i$ without movement blurring for each of the pixels in the processing region, for each horizontal line. The actual world waveform estimating unit 12083 then, having obtained the pixel values $Q_i$ without movement blurring for each of the pixels within all the horizontal lines within the processing region, supplies the pixel values $Q_i$ without movement blurring of each of the pixels of the processing region, to the image generating unit 12074. The image generating unit 12074 generates an image wherein the pixel values $P_i$ of each of the pixels in the processing region in the input image have been replaced with the pixel values $Q_i$ without movement blurring, as an output image, and supplies this to the image display unit 12075 for display.

Also, in the above description, the user operates the user I/F 12076 to instruct flat regions from the output image, but instruction of regions with edges may be made. In this case, an instructed region with edges is supplied to the processing region setting unit 12071 and actual world estimating unit 12073 as edge region instruction information, in the same way as with the above-described processing. Of the processing region, the constraint condition expression generating unit 12102 generates constraint condition expressions regarding regions other than the regions instructed to be edge regions (changes the weight regarding constraint condition expressions corresponding to pixels in the edge region and weight regarding constraint condition expressions corresponding to pixels other than in edge regions within the processing region, from 1-to-1 to 1-to-0). That is to say, the constraint condition expression generating unit 12102 does not generate constraint condition expressions regarding edge regions.

Further, while the above-described processing does not generate constraint condition expressions regarding other than flat regions, constraint condition expressions regarding other than flat regions may also be generated with smaller weighting as compared to the weighting of constraint condition expressions regarding flat regions. In this case, for example, constraint condition expressions are generated with constraint condition expressions regarding flat regions being weighted by 1, and constraint condition expressions regarding other than flat regions being weighted by less than 1, such as 0.5 for example.

FIG. 158 and FIG. 159 are diagrams describing the overview of the processing of the signal processing device 4 shown in FIG. 153.

As shown in FIG. 158, the user views the input image 12121 and imagines an image 12123 without movement blurring, and instructs regions estimated to be flat to the input image 12121 as flat regions. Also, the user views the output image 12122 which is the processing results of the input image 12121 having been processed at the signal processing unit 4, imagines an image 12123 without movement blurring, and instructs regions estimated to be flat to the output image 12122 as flat regions. The signal processing device 4 generates constraint condition expression regarding only the regions which the user has instructed to be flat regions, and generates an image without movement blurring, closer approximating the actual world 1 light signals, using the constraint condition expression.

Thus, with the signal processing device 4, the user is presented with an input image or output image, and instructs flat regions with regard to the input image or output image. The signal processing device 4 applies constraint conditions to the flat region wherein the difference between the pixel values of the adjacent pixels in the image without movement blurring is small, so optimal constraint conditions can be easily set, and an image closer approximating the actual world 1 light signals can be obtained. Also, the user can directly instruct dissatisfaction with the image quality to the signal processing device 4, and can easily obtain an image with the desired image quality or an image close to the desired image quality.

FIG. 159 is a diagram for describing the processing of the signal processing device 4 in a case wherein the user views the input image and instructs flat regions, and a case of not instructing flat regions.

As shown in FIG. 159, in the event that the user does not instruct flat regions to the input image 12142, a processing region is determined by the signal processing device 4, and constraint condition expression are generated in a uniform (equal) manner, as if it were, for all pixels in each horizontal line in the processing region (uniform processing).

On the other hand, in the event that the user views the input image 12142, imagines an image 12123 without movement blurring, and makes instruction of flat regions in the image 12123 without movement blurring with regard to the input image 12142, non-uniform processing is performed. That is to say, in the example in FIG. 159, the user has instructed pixels of which the pixel values in the input image are $P_3$ and $P_4$, as a flat region.

The signal processing device 4 generates a constraint condition expression wherein the difference between the pixel values $Q_3$ and $Q_4$ without movement blurring, corresponding to the pixels of which the pixel values in the input image are $P_3$ and $P_4$, is small based on the flat region instructed by the user. Also, the signal processing device 4 generates constraint condition expressions with smaller weighting regarding the pixels other than in the flat region in the processing region, as compared to the constraint condition expression in the flat region. That is to say, the constraint condition expressions are generated as to the processing region in a non-uniform manner, as if it were (non-uniform processing).

Accordingly, the signal processing device 4 can apply constraint conditions to regions where the actual image is flat with greater weighting than other regions within the processing region, without complicated processing. Consequently, the signal processing device 4 can make the image without movement blurring to be closer to the actual image.

FIG. 160A through FIG. 160C represent the relation between pixel values $P_i$ of pixels in a certain horizontal line in a processing region output from the sensor 2, and pixel values $Q_i$ of pixels without movement blurring in the horizontal line. Note that in the drawings, the portions which correspond to those in FIG. 152A through FIG. 152C are denoted with the same symbols, and description thereof will be omitted as appropriate in the following.

FIG. 160A through FIG. 160C are basically the same as the above-described FIG. 152A through FIG. 152C, respectively, and accordingly represent the relation between pixel values $Q_i$ without movement blurring and pixel values $P_i$ with movement blurring.

In the example shown in FIG. 160A through FIG. 160C, the user operates the user I/F 12076 to instruct as flat regions, a region wherein the pixel values of pixels without movement blurring are $Q_0$ and $Q_1$, a region wherein the pixel values of pixels without movement blurring are $Q_2$ through $Q_5$, and a region wherein the pixel values of pixels without movement blurring are $Q_6$ and $Q_7$.

Accordingly, as shown in FIG. 160A, the constraint condition, wherein the difference between the pixel values of the adjacent pixels $Q_i$ and $Q_{i+1}$ of the pixels without movement blurring is small, is applied only to the region wherein the pixel values of pixels without movement blurring are $Q_0$ and $Q_1$, the region wherein the pixel values of pixels without movement blurring are $Q_2$ through $Q_5$, and the region wherein the pixel values of pixels without movement blurring are $Q_6$ and $Q_7$ (regions instructed as being flat regions).

FIG. 161 illustrates another configuration example of another embodiment of an application example of the signal processing device 4 shown in FIG. 111.

Note that FIG. 161 illustrates the configuration example of an embodiment of the signal processing device 4 for estimating actual world 1 light signals from movement blurring image data, which is an example of data 3 having continuity of moving in a predetermined direction at a predetermined speed, for example. That is to say, this signal processing device 4 estimates an image without blurring (image without movement blurring) from an image wherein a subject is taken in a blurred manner due to the subject (object) moving at the time of photography (movement blurring image), for example. Accordingly, with the embodiment shown in FIG. 161, a movement blurring image, wherein movement blurring has occurred due to taking a moving object, is input to the signal processing device 4 as the input image. Note that here, an image obtained by imaging an object moving in the horizontal direction (from the left to right direction) at a constant speed (movement amount) is employed as the input image.

In FIG. 161, the processing region setting unit 12161, the continuity setting unit 12162, the actual world estimating unit 12163, image generating unit 12164, image display unit 12165, and user I/F 12166, each correspond to the processing region setting unit 10001, the continuity setting unit 10002, the actual world estimating unit 10003, image generating unit 10004, image display unit 10005, and user I/F 10006 shown in FIG. 111, and basically perform the same processing as the processing region setting unit 10001, the continuity setting unit 10002, the actual world estimating unit 10003, image generating unit 10004, image display unit 10005, and user I/F 10006. Further, in FIG. 161, the actual world estimating unit 12163 comprises a model generating unit 12171, an equation generating unit 12172, and actual world waveform estimating unit 12173. The model generating unit 12171, equation generating unit 12172, and actual world waveform estimating unit 12173 correspond to each of the model generating unit 10011, equation generating unit 10012, and actual world waveform estimating unit 10013 shown in FIG. 111, and basically perform the same processing as each of the model generating unit 10011, equation generating unit 10012, and actual world waveform estimating unit 10013.

Note however, that in FIG. 161, the assisting information which the user I/F 12166 outputs by the user operating the user I/F 12166, is supplied to the processing region setting unit 12161 and the actual world estimating unit 12163.

That is to say, in FIG. 161, the user can instruct a region which is unsatisfactory to be taken as an unsatisfactory region with regard to the image displayed on the image display unit 12165, by operating the user I/F 12166, and upon the user performing operations to instruct the unsatisfactory region, the user I/F 12166 supplies unsatisfactory region instruction information representing the unsatisfactory region which is the region specified by that operation, to the processing region setting unit 12161 and actual world estimating unit 12163. Further, in FIG. 161, as described later, multiple output images are displayed on the image display unit 12165, and the user can select output images displayed on the image display unit 12165 by operating the user I/F 12166, and upon the user performing operations for selecting an output image, the user I/F 12166 supplies selection information representing the output image selected by that operation to the processing region selecting unit 12161 and actual world estimating unit 12163, as assisting information.

Now, examples of the method for instructing the unsatisfactory region by operating the user I/F 12166 include, for example, a method for instructing with a rectangle surrounding the unsatisfactory region, a method for instructing by trimming (trim) the unsatisfactory region, a method for instructing by pointing one or more arbitrary points within the unsatisfactory region, and so forth; here, let us say that the user instructs the unsatisfactory region by pointing one arbitrary point in the unsatisfactory region, for example, by operating the user I/F 12166. In this case, the user I/F 12166 supplies coordinates on the image of that point, for example, as information representing the point where the user pointed, to the processing region setting unit 12161 and the actual world estimating unit 12163, as unsatisfactory region instructing information.

Next, the signal processing device 4 shown in FIG. 161 will be described with reference to the flowchart shown in FIG. 162.

First, in step S12141, the signal processing device 4 performs pre-processing, and the flow proceeds to step S12142. That is to say, the signal processing device 4 supplies one frame or one field, for example, of the input image, supplied from the sensor 2 (FIG. 1) as data 3, to the processing region setting unit 12161, continuity setting unit 12162, actual world estimating unit 12163, image generating unit 12164, and image display unit 12165. Further, the signal processing unit 4 causes the image display unit 12165 to display the input image.

In step S12142, the user I/F 12166 determines whether or not there has been some sort of user input, by the user operating the user I/F 12166. In step S12142, in the event that determination is made that there is no user input, i.e., in the event that the user has made no operations, the flow skips steps S12143 through S12145, and proceeds to step S12146.

Also, in step S12142, in the event that determination is made that there has been user input, i.e., in the event that the user has viewed the input image displayed on the image display unit 12165 and operated the user I/F 12166, thereby making user input indicating some sort of instruction or information, and in the event that there has been some sort of user input, the flow proceeds to step S12143, where the user I/F 12166 determines whether or not the user input is user instructions instructing ending of the processing of the signal processing device 4.

In the event that determination is made that in step S12143 that the user input is ending instructions, that is to say, for example, in the event that the user who has viewed the input image displayed on the image display unit 12165, operates the user I/F 12166 so as to end the processing of the signal processing device 4 with no need for performing signal processing with regard to the input image, since the user did not find the image quality of the input image unsatisfactory, the signal processing device 4 ends the processing.

Also, in the event that determination is made in step S12143 that the user input is not ending instructions, the flow proceeds to step S12144, where the user I/F 12166 determines whether or not the user input is unsatisfactory region instruction information. In the event that determination is made in step S12144 that the user input is not unsatisfactory region instruction information, step S12145 is skipped, and the flow proceeds to step S12146.

On the other hand, in the event that determination is made in step S12144 that there has been input of unsatisfactory region instructing information, that is to say, in the event that the user who has viewed the input image displayed on the image display unit 12165 and found the image quality of the input image unsatisfactory, and therefore operated the user I/F 12166 so as to point the unsatisfactory portion, the flow proceeds to step S12145, where the user I/F 12166 supplies unsatisfactory region instructing information representing the point which the user has pointed by operating the user I/F 12166 to the processing region setting unit 12161 and the actual world estimating unit 12163, as assisting information, and the flow proceeds to step S12146.

In step S12146, the processing region setting unit 12161 sets a predetermined rectangular region including the unsatisfactory region for example, based on the unsatisfactory region instruction information serving as assisting information supplied from the user I/F 12166, as a processing region, and supplies to the continuity setting the unit 12162, the actual world estimating unit 12163, and the image generating unit 12164, the processing region information thereof, and the flow proceeds to step S12147. Note that this processing region may be input by the user operating the user I/F 12166.

However, in the event that unsatisfactory region instructing information is not supplied from the user I/F 12166 to the processing region setting unit 12161 (in the event that the processing of step S12146 is performed immediately following step S12142 or step S12144), the processing region setting unit 12161 automatically sets a processing region by performing predetermined processing (for example, processing for detecting a region in the input image where movement blurring has occurred).

In step S12147, the continuity setting unit 12162 recognizes the processing region in the input image, from the processing region information supplied from the processing region setting unit 12161. Further, the continuity setting unit 12162 sets the movement amount of the object displayed in the processing region, as information representing the continuity of the actual world 1 signals lost in each of the processing region image data, and supplies continuity information representing the continuity to the actual world estimating unit 12163, and the flow proceeds to step S12148. Note that this movement amount may be input by operating the user I/F 12166. Also, here, the continuity setting unit 12162 is configured so as to set movement amount representing the magnitude of movement of the object in the input image as the continuity information, since it is assumed that the object is moving in the horizontal direction, but an arrangement may be made wherein a movement vector representing the magnitude and direction of movement of the object is set as the continuity information.

In step S12148, the actual world estimating unit 12163 estimates N, which is multiple, versions of the actual world 1 light signals (image without movement blurring) with regard to the image data within the processing region of the input image (data of movement blurring image), based on the movement amount of the corresponding actual world 1 signals, according to the processing region information supplied from the processing region setting unit 12161 and the unsatisfactory region instruction information supplied from the user I/F 12166.

That is to say, at the actual world estimating unit 12163, the model generating unit 12171 recognizes the processing region in the input image from the processing region information supplied from the processing region setting unit 12161, and also recognizes the movement amount of the actual world 1 signals corresponding to the processing region image data, based on the continuity information supplied from the continuity setting unit 12162, i.e., in this case, recognizes the amount of movement of the object displayed in the processing region. Further, the model generating unit 12171 generates a relation model modeling the relation between the pixel values of the pixels in each horizontal line within the processing region and the actual world 1 light signals, corresponding to the pixels making up each horizontal line in the processing region of the input image and the movement amount of the actual world 71913 1 signals corresponding to the image data of the processing region, for each of the horizontal lines in the processing region, which are supplied to the equation generating unit 12172.

The equation generating unit 12172 recognizes the processing region in the input image from the processing region information supplied from the processing region setting unit 12161, and substitutes pixel values of each of the pixels of the input image into a relation model for each horizontal line in the processing region which has been supplied from the model generating unit 12171 according to the processing region, thereby generating an equation for obtaining an approximation function approximating the actual world 1 signals. Further, the equation generating unit 12172 generates N versions of constraint condition expressions wherein the constraint condition expression constraining the approximation function is weighted in N ways, based on the processing region information or unsatisfactory region instruction information. The equation generating unit 12172 combines the equation for obtaining an approximation function serving as an approximation model approximating the actual world 1 light signals with each of the N versions of constraint conditions, generating N versions of normal equations, which are supplied to the actual world waveform estimating unit 12173.

The actual world waveform estimating unit 12173 computes each of the N versions of normal equations supplied from the equation generating unit 12172, thereby estimating the N versions of waveforms of the actual world 1 signals. That is to say, the actual world waveform estimating unit 12173 solves each of the N versions of normal equations supplied from the equation generating unit 12172, thereby obtaining N versions of approximation functions serving as approximation models modeling the actual world 1 signals, and supplies the approximation functions to the image generating unit 12164 as estimation results of the N versions of actual world 1 signals.

Now, the processing in step S12148 which such an actual world estimating unit 12163 executes will be called "actual world estimation processing". Details of "actual world estimation processing" will be described later with reference to the flowchart in FIG. 163.

Following the processing in step S12148, the flow proceeds to step S12149, where the image generating unit 12164 generates N versions of signals closer approximating the actual world 1 signals, based on the N versions of approximation functions closer approximating the waveforms of the actual world 1 signals, supplied from (the actual world waveform estimating unit 12173 of) the world estimating unit 12163.

That is to say, the image generating unit 12164 recognizes the processing region in the input image from the processing region information supplied from the processing region setting unit 12161, and generates N versions of approximation images closer approximating the actual world 1 signals (image without movement blurring), based on the N versions of approximation functions regarding the corresponding processing region supplied from the actual world estimating unit 12163.

Further, the image generating unit 12164 generates, as N versions of output images, images wherein the processing region portion in the input image has been replaced with the N versions of approximation images (images without movement blurring), which are then supplied to the image display unit 12165, and the flow proceeds from step S12149 to step S12150.

In step S12150, the image display unit 12165 displays the N versions of output images supplied from the image generating unit 12164 instead of the input image displayed in step S12141, or along with the input image, and the flow proceeds to step S12151.

In step S12151, the user I/F 12166 determines whether there has been input of selection information by the user operating the user I/F 12166. That is to say, in step S12150, N versions of output images are displayed on the image display unit 12165, and determination is made in step S12151 regarding whether or not the user who has viewed the N versions of output images has input selection information for selecting an image which is an image with the desired image quality or an image close to the desired image quality from the N versions of output images, by operating the user I/F 12166.

In the event that determination is made in step S12151 that there has been no input of selection information, the flow proceeds to step S12154, and the user I/F 12166 determines whether there has been input of ending instructions, as with the case in step S12143.

In the event that determination is made in step S12154 that there has been input of ending instructions, the signal processing device 4 ends the processing.

Also, in the event that determination is made in step S12154 that there has been no input of ending instructions, the flow returns to step S12151, and hereafter the same processing is repeated.

On the other hand, in the event that determination is made in step S12151 that there has been input of selection information, i.e., in the event that the user who has viewed the N versions of output displayed on the image display unit 12165, images has selected an image which is an image with the desired image quality or an image close to the desired image quality from the N versions of output images, the flow proceeds to step S12152, where the user I/F 12166 determines whether or not the user has input finalization instructions for finalizing the output image which the user has selected as a final output image, by operating the user I/F 12166.

In the event that determination is made in step S12152 that there has been input of finalization instructions, the flow proceeds to step S12153, where the image display unit 12165 displays the output image which the user has selected on the entire screen thereof, and the processing ends. On the other hand, in the event that determination is made in step S12152 that there has been no input of finalization instructions, that is to say, in the event that the user is dissatisfied with the image quality of the selected output image, and has not performed input of finalization instructions in order to perform processing again, the flow returns to step S12145, where the user I/F 12166 supplies selection information representing the output image which the user has selected to the processing region setting unit 12161 and the actual world estimating unit 12163 and the actual world estimating unit 12163 as assisting information, and the flow sequentially proceeds to steps S12146, S12147, and S12148. In the processing region setting processing in step S12146 and the continuity setting processing in step S12147, the processing region and continuity set the previous time are set. The processing region information is then supplied to the continuity setting unit 12162, actual world estimating unit 12163, and image generating unit 12164, and the continuity information is supplied to the actual world estimating unit 12163. Note that the processing of steps S12146 and S12147 performed the second time on can be skipped.

In step S12148, the actual world estimating unit 12163 can estimate the actual world 1 light signals (image without movement blurring) with N new methods, based on the selection information serving as assisting information supplied from the user I/F 12166.

That is to say, in this case, in step S12148, the equation generating unit 12172 of the actual world estimating unit 12163 sets N new versions of constraint condition equations, based on the constraint condition equation used for obtaining the output image represented by the selection information serving as assisting information supplied from the user I/F 12166. The equation generating unit 12172 combines an equation for obtaining an approximation function serving as an approximation model approximating the actual world 1 light signals with each of N new constraint condition equations, thereby generating N new versions of normal equations, and supplies the N new normal equations to the actual world waveform estimating unit 12173. Further, the actual world waveform estimating unit 12173 computes each of the N new normal equations supplied from the equation generating unit 12172, thereby estimating N new versions of actual world 1 light signal waveforms. The flow then proceeds to step S12149 from step S12148, and hereafter the same processing is repeated.

That is to say, accordingly, this processing of steps S12145 through S12154 is repeated, and ultimately the user obtains an output image of the desired image quality wherein the dissatisfaction of the user with the output image has been resolved.

As described above, with the signal processing device 4, N versions of output images which are processing results of the input image are presented to the user, for the user to select a desired one from the N versions of output images, and based on the selection results, processing is performed again, so high-quality output images, meeting the user's preferences can be easily obtained. That is to say, the signal processing device 4 presents the user with N versions of output images which are processing results of the input image. On the other hand, the user recognizes the image quality of the N versions of output images, and gives feedback to the signal processing device 4 regarding judgment of which output image is an image of good image quality. The signal processing device 4 processes the input image again considering the feedback from the user, and hereafter the same processing is repeated. Accordingly, high-quality output images, meeting user preferences, can be easily obtained.

Now, it can be said that the signal processing device 4 receiving feedback from the user and performing processing on the input image means that the signal processing device 4 is performing processing in cooperation with the user.

Next, the actual world estimation processing (the processing in step S12148 in FIG. 162) of the actual world estimating unit 12163 (FIG. 161) will be described in detail with reference to the flowchart in FIG. 163.

In step S12171, the model generating unit 12171 generates a relation model. That is to say, the model generating unit 12171 recognizes the processing region in the input image from the processing region information supplied from the processing region setting unit 12161, and also recognizes the movement amount corresponding to the image data of the processing region, from the continuity information supplied from the continuity setting unit 12162. Further, the model generating unit 12171 generates, for each horizontal line in the processing region, a relation model modeling the relation between the pixel values $P_i$ of the pixels detected by the sensor 2 within the processing region and the pixel values $Q_i$ of pixels without movement blurring represented by the approximation model approximating the actual world 1 light signals, according to the pixels making up the horizontal line of the processing region, and the movement amount corresponding to the image data in the processing region, for the processing region in the input image, and supplies this to the equation generating unit 12172. The model generating unit 12171 then proceeds from step S12171 to step S12172.

Specifically, the model generating unit 12171 generates an expression representing the relation between the pixel values $P_i$ of the pixels in each horizontal line of the processing region, and the pixel values $Q_i$ without movement blurring, described with reference to FIG. 148A through FIG. 148C, according to the number of pixels in the horizontal line of the processing region, and the movement amount, as a relation model. For example, in the event that the number of pixels in a horizontal line is in the processing region is 8, and the movement amount v is 5, the equations in the above-described expression (151), are generated as a relation model.

In step S12172, the equation generating unit 12172 performs equation generating processing. That is to say, the equation generating unit 12172 recognizes the processing region in the input image from the processing region information supplied from the processing region setting unit 12161, and with regard to this processing region, substitutes the pixel values $P_i$ for each of the pixels of the input image making up the processing region into the relation model obtained with regard to each of the horizontal lines of the processing region supplied from the model generating unit 12171, thereby generating the equations (model equations) of the Expression (151) for obtaining pixel values $Q_i$ without movement blurring, represented by an approximation function approximating the actual world 1 light signals.

Further, the equation generating unit 12172 generates constraint condition expressions which are expressions for constructing the approximation model approximating the actual world 1 light signals in the horizontal line of the processing region recognized from the processing region information supplied from the processing region setting unit 12161. That is to say, with model expressions, the number of pixel values $Q_i$ without movement blurring, which are the variables to be obtained, are greater than the number of equations, as indicated in Expression (151) so there is the need to introduce equations of a number equal to or greater than the number of pixel values $Q_i$ without movement blurring for the total number of equations, in order to obtain the pixel values $Q_i$ without movement blurring. Here, the equation generating unit 12172 generates a constraint condition expression to say that to the difference between the pixel values $Q_i$ without movement blurring represented by the approximation function, between adjacent pixels, is small (there is spatial correlation). In the event that an unsatisfactory region has been instructed by the user, the equation generating unit 12172 generates a constraint condition expression weighted regarding the unsatisfactory region.

However, output images with different image quality are obtained depending on how the unsatisfactory region is weighted, so the equation generating unit 12172 generates N versions of weighted constraint condition expressions. Consequently, N versions of output images are generated and displayed at the signal processing device 4. The user views the N versions of output images, and selects an image from these with the desired image quality or an image with close to the desired image quality.

Accordingly, even in the event that the image without movement blurring is not flat and has some sort of pattern, for example, such that the image has a high level of activity, an image without movement blurring having the image quality which the user desires can be obtained. That is to say, the equation generating unit 12172 generates constraint condition expressions wherein the difference between the pixel values having no movement blurring of adjacent pixels is small, weighted in N ways, to the region which the user has instructed as being unsatisfactory. The user can select the image with the desired image quality from the N versions of output images obtained as the result thereof, so an image with the desired image quality, having optimal constraint conditions set regarding the unsatisfactory region, can be obtained.

The equation generating unit 12172 generates model equations, and also generates constraint condition expressions weighted in N ways based on the unsatisfactory region instruction information, and combines the generated model equations and the N versions of constraint condition expressions to generate normal equations. The equation generating unit 12172 supplies the N versions of normal equations to the actual world waveform estimating unit 12173, and the flow proceeds from step S12172 to step S12173.

Note that hereafter, the processing in step S12172 which the equation generating unit 12172 executes as described above will be called "equation generating processing". The details of "equation generating processing" will be described later with reference to the flowchart in FIG. 165.

In step S12173, the actual world waveform estimating unit 12173 solves the N versions of normal equations supplied from the equation generating unit 12172, thereby estimating N versions of waveforms of the actual world 1 light signals, i.e., obtaining pixel values without movement blurring represented by N versions of approximation functions, and supplies the N versions of pixel values thereof to the image generating unit 12164.

Next, FIG. 164 illustrates a detailed configuration example of the equation generating unit 12172 shown in FIG. 161.

In FIG. 164, the equation generating unit 12172 comprises a model equation generating unit 12191, weighting setting unit 12192, constraint condition expression generating unit 12193, and normal equation generating unit 12194.

The relation model modeling the relation between pixel values of the pixels of each horizontal line in the processing region (pixel values of the movement blurring image), and the pixel values without movement blurring, are input from the model generating unit 12171, to the equation generating unit 12172 of which the configuration is shown in FIG. 164, and supplied to the model equation generating unit 12191. Also, an input image is input from the sensor 2 (FIG. 1) to the equation generating unit 12172, which is supplied to the model equation generating unit 12191.

Further, processing region information is input from the processing region setting unit 12161 to the equation generating unit 12172, and the processing region information is supplied to the model equation generating unit 12191 and the constraint condition expression generating unit 12192. Also, unsatisfactory region instruction information and selection information are input from the user I/F 12166 to the equation generating unit 12172, and the unsatisfactory region instruction information is supplied to the constraint condition expression generating unit 12193, and the selection information is supplied to the weighting setting unit 12102, respectively.

The model equation generating unit 12191 recognizes the processing region of the input image from the processing region information, and substitutes the pixel values of the processing region in the input image as the pixel values $P_i$ of each of the pixels in the movement blurring image of the relation model supplied from the model generating unit 12171, thereby generating the model equation in Expression (151) for each horizontal line in the processing region. The model equation generating unit 12191 supplies the model equation to the normal equation generating unit 12194. Note that the relation models obtained from the model generating unit 12171 have specific values substituted into the movement amount v in Expression (151), for example, and the model equations obtained from the model equation generating unit 12191 have a specific value substituted into the pixel values $P_4$ through $P_7$ in Expression (151).

The weighting setting unit 12192 sets N weights to be applied to the constraint condition expression based on the selection information input from the user I/F 12166, and supplies the N weights to the constraint condition expression generating unit 12193. The constraint condition expression generating unit 12193 generates N versions of predetermined constraint conditions weighted in N ways for the pixels of each of the horizontal lines in the unsatisfactory region, based on the processing region information, the unsatisfactory region instructing information input from the user I/F 12166, and the N weights set at the weighting setting unit 12192, and supplies the N versions of constraint condition expressions to the normal equation generating unit 12194.

The normal equation generating unit 12194 combines the model equation supplied from the model equation generating unit 12191 and the N versions of constraint condition expressions supplied from the constraint condition expression generating unit 12193 to generate N versions of normal equations, which are supplied to the actual world waveform estimating unit 12173.

Next, the equation generating processing (the processing in step S12172 in FIG. 163) of the equation generating unit 12172 (FIG. 164), will be described in detail with reference to the flowchart in FIG. 165.

In step S12191, the model equation generating unit 12191 obtains a relation model for each horizontal line in the processing region from the model generating unit 12171, and the flow proceeds to step S12192. In step S12192, the model equation generating unit 12191 acquires the input image from the sensor 2, and also obtains processing region information from the processing region setting unit 12161. The model equation generating unit 12191 then recognizes the pixel values $P_i$ for each of the pixels within the processing region from the processing region information of the input image, and substitutes the pixel values $P_i$ into the relation model of the Expression (151) obtained from the model generating unit 12171, thereby generating a model equation for each horizontal line of the processing region. Further, the model equation generating unit 12191 supplies the model equations to the normal equation generating unit 12194. In the event that the model equation generating unit 12191 has obtained the relation models represented by the above Expression (151) from the model generating unit 12171, for example, model equations are generated by substituting the pixel values of the input image into the pixel values $P_4$ through $P_7$ in Expression (151).

Following the processing in step S12192, the flow proceeds to step S12193, where the weighting setting unit 12192 sets the N weights and supplies each of the weights to the constraint condition expression generating unit 12193, and the flow proceeds to step S12194. Here, in the event that selection information is input from the user I/F 12166, the weighting setting unit 12192 sets N new weights, based on the weighting used for obtaining the output image which the selection information represents. That is to say, at the time of setting the first weighting, the weighting setting unit 12192 sets N weights at equal intervals in the range of 0 to 1 with 0.5 as the center, for example. Then, in the event that selection information is input from the user I/F 12166, the weighting setting unit 12192 sets N new weights at finer intervals than the previous time of setting (but within the range of 0 to 1), centered on the weight used for obtaining the output image which the selection information represents.

Upon the user selecting a desired one from the N versions of output images output from the previous processing, N new weights are set based on the selection results, so by the user repeatedly selecting a desired one from the N output images, a weight whereby an output image of the image quality which the user desires is finally set, and consequently, an output image of the image quality which the user desires is obtained.

In step S12194, determination is made by the constraint condition expression generating unit 12193 regarding whether or not unsatisfactory region instruction information has been input from the user I/F 12166, and in the event that determination is made that unsatisfactory region instruction information has not been input, step S12195 is skipped, and the flow proceeds to step S12196. In this case, in step S12196 the constraint condition expression generating unit 12193 generates constraint condition expressions to which are applied the N weights supplied from the weighting setting unit 12192, based on the processing region information automatically set by the processing region setting unit 12161 performing predetermined processing, for example, and supplies the N constraint condition expressions to the normal equation generating unit 12194. That is to say, in the event that no unsatisfactory region instruction information is input, the constraint condition expression generating unit 12193 generates N versions of constraint condition expressions for all of the pixels in the horizontal line of the processing region.

For example, in the event that the number of pixels in a horizontal line in the processing region is eight, as shown in FIG. 152A through FIG. 152C for example, and the pixel values without movement blurring of these pixels are to be represented with $Q_0$ through $Q_7$, the constraint expression is represented as in the following Expression (154), for example.

$W(Q_1-Q_0)=0$ $W(Q_2-Q_1)=0$ $W(Q_3-Q_2)=0$ $W(Q_4-Q_3)=0$ $W(Q_5-Q_4)=0$ $W(Q_6-Q_5)=0$ $W(Q_7-Q_6)=0$ \hfill (154)

Note that in Expression (154), W represents weighting, and the constraint condition expression generating unit 12193 generates the N versions of constraint condition expressions with different weighting W shown in Expression (154). The greater the value of W is, the greater the weighting of the constraint condition expression wherein the difference between the pixel values of adjacent pixels is small, is. That is to say, the greater the weighting W of the constraint condition expression $(Q_{i+1}-Q_i)=0$ in Expression (154) is, the pixel values $Q_i$ and $Q_{i+1}$ are strongly constrained, as if it were, so as to be the same value. In the event that the weighting W is small, such constraint is weak, as if it were, so the pixel values $Q_i$ and $Q_{i+1}$ more readily take different values.

On the other hand, in the event that determination is made in step S12194 that unsatisfactory region instruction information has been input from the user I/F 12166, the constraint condition expression generating unit 12193 proceeds to step S12195 from step S12194, obtains flat region instruction information from the user I/F 12166, and the flow proceeds to step S12196.

In this case, in step S12196, the constraint condition expression generating unit 12193 generates constraint condition expressions to which are applied the N weights supplied from the weighting setting unit 12193, based on the processing region information and the unsatisfactory region instruction information, and supplies the N versions of constraint condition expressions to the normal equation generating unit 12194. That is to say, in the event that unsatisfactory region instruction information is input, the constraint condition expression generating unit 12193 generates N versions of constraint condition expressions wherein constraint condition expressions to which are applied N weights corresponding to the pixels of each horizontal line in the unsatisfactory region represented by unsatisfactory region instruction information out of the processing region.

For example, as shown in FIG. 152A through 152C, in the event that a horizontal line in the processing region is configured of eight pixels #0 through #7, and pixel values with no movement blurring of the respective pixels #0 through #7 are represented with $Q_0$ through $Q_7$, the five pixels #0 through #5 of the pixel values $Q_0$ through $Q_4$ are specified by the user as an unsatisfactory region, the constraint condition expressions are as in the following Expression (155).

$$W(Q_1-Q_0)=0$$

$$W(Q_2-Q_1)=0$$

$$W(Q_3-Q_2)=0$$

$$W(Q_4-Q_3)=0$$

$$W(Q_5-Q_4)=0 \quad (155)$$

Note that in Expression (155), W represents weighting, and the constraint condition expression generating unit 12193 generates the N versions of constraint condition expressions with different weighting W shown in Expression (155). The greater the value of W is, the greater the weighting of the constraint condition wherein the difference between the pixel values of adjacent pixels is small, is, as with the case in Expression (154).

Following the processing of step S12196, the flow proceeds to step S12197, where the normal equation generating unit 12194 combines the model equations of the Expression (151) supplied from the model equation generating unit 12191, and the N constraint condition expressions shown in Expression (154) or Expression (155) supplied from the constraint condition expression generating unit 12193, thereby generating N normal equations, and the N normal equations are supplied to the actual world waveform estimating unit 12173.

Subsequently, the actual world waveform estimating unit 12173 solves the normal equation supplied from the normal equation generating unit 12194 with the minimum norm for the least-square-error, for example, thereby obtaining N pixel values $Q_i$ with no movement blurring of pixels of each horizontal line in the processing region.

Note that the above-described actual world estimating processing is performed for each of the pixels arrayed in the horizontal direction within the processing region (horizontal line). That is to say, the actual world waveform estimating unit 12173 obtains N versions of pixel values $Q_i$ without movement blurring for each of the pixels in the processing region, for each horizontal line. The actual world waveform estimating unit 12173 then, having obtained the N versions of pixel values $Q_i$ without movement blurring for each of the pixels within all the horizontal lines within the processing region, supplies the N versions of pixel values $Q_i$ without movement blurring of each of the pixels of the processing region, to the image generating unit 12164. The image generating unit 12164 generates an image wherein in the pixel values $P_i$ of each of the pixels in the processing region in the input image have been replaced with the N versions of pixel values $Q_i$ without movement blurring, as N output images, and supplies these to the image display unit 12165 for display.

Also, with the above-described processing, upon an unsatisfactory region being instructed by the user, the constraint condition expression generating unit 12193 does not generate constraint condition expressions regarding other than unsatisfactory regions, but constraint condition expressions regarding other than unsatisfactory regions may also be generated with predetermined weighting. In this case, for example, as shown in FIG. 152A through 152C, in the event that a horizontal line in the processing region is configured of eight pixels #0 through #7, the pixel values of the pixels #0 through #7 without movement blurring being represented by $Q_0$ through $Q_7$, in a case wherein an unsatisfactory region instructed by the user is made up of the five pixels #0 through #4 with the pixel values $Q_0$ through $Q_4$, the constraint condition expression generating unit 12193 generates constraint conditions expression for the three pixels #5 through #7 with the pixel values $Q_5$ through $Q_7$ with predetermined weighting (e.g., weighting different from that of the weighting for the pixels of the unsatisfactory region) W.

FIG. 166 is a diagram describing the overview of the processing of the signal processing device 4 shown in FIG. 161.

As shown in FIG. 166, the user views an input image 12211, and instructs a region which is unsatisfactory as an unsatisfactory region. The signal processing device 4 then changes (sets) the weighting of the constraint condition expression in the unsatisfactory region instructed by the user, and generates and displays N output images 12222-1 through 12222-N, using the constraint condition expression weighted in W ways. The user views the N output images 12222-1 through 12222-N, and selects an image of the desired image quality or an image close to the desired image quality, from the N output images. In the example in FIG. 166, the user has selected 12222-N from the N output images 12222-1 through 12222-N.

The signal processing device 4 applies N new weights (changes the weighting) to the constraint condition expressions in the unsatisfactory region based on the weighting of the constraint condition expressions used to obtain the output image 12222-N selected by the user, and displaying of N new output images obtained based on the N new weights is repeated.

Accordingly, the user can easily set optimal constraint conditions simply be selecting output images and instructing unsatisfactory regions, thereby obtaining an image closer approximating the actual world 1 light signals. That is to say, the user can easily obtain an image of desired image quality or an image closer to the desired image quality.

FIG. 167 illustrates another configuration example of another embodiment of an application example of the signal processing device 4 shown in FIG. 111.

Note that FIG. 167 illustrates the configuration example of an embodiment of the signal processing device 4 for estimating actual world 1 light signals from movement blurring image data, which is an example of data 3 having continuity of moving in a predetermined direction at a predetermined speed, for example. That is to say, this signal processing device 4 estimates an image without blurring (image without movement blurring) from an image wherein a subject is taken in a blurred manner due to the subject (object) moving at the time of photography (movement blurring image), for example. Accordingly, with the embodiment shown in FIG. 167, a movement blurring image, wherein movement blurring has occurred due to taking a moving object, is input to the signal processing device 4 as the input image. Note that here, an image obtained by imaging an object moving in the horizontal direction (from the left to right direction) at a constant speed (movement amount) is employed as the input image.

In FIG. 167, the processing region setting unit 12241, the continuity setting unit 12242, the actual world estimating unit 12243, image generating unit 12244, image display unit 12245, and user I/F 12246, each correspond to the processing region setting unit 10001, the continuity setting unit 10002, the actual world estimating unit 10003, image generating unit 10004, image display unit 10005, and user I/F 10006 shown in FIG. 111, and basically perform the same processing as the processing region setting unit 10001, the continuity setting unit 10002, the actual world estimating unit 10003, image generating unit 10004, image display unit 10005, and user I/F 10006. Further, in FIG. 167, the actual world estimating unit 12243 comprises a model generating unit 12251, an equation generating unit 12252, and actual world waveform estimating unit 12253. The model generating unit 12251, equation generating unit 12252, and actual world waveform estimating unit 12253 correspond to each of the model generating unit 10011, equation generating unit 10012, and actual world waveform estimating unit 10013 shown in FIG. 111, and basically perform the same processing as each of the model generating unit 10011, equation generating unit 10012, and actual world waveform estimating unit 10013.

Note however, that in FIG. 167, the assisting information which the user I/F 12246 outputs by the user operating the user I/F 12246, is supplied to the processing region setting unit 12241 and actual world estimating unit 12243.

That is to say, in FIG. 167, the user can instruct a region which is unsatisfactory to be taken as an unsatisfactory region with regard to the image displayed on the image display unit 12245, by operating the user I/F 12246, and upon the user performing operations to instruct the unsatisfactory region, the user I/F 12246 supplies unsatisfactory region instruction information representing the unsatisfactory region which is the region specified by that operation, to the processing region setting unit 12241 and actual world estimating unit 12243. Further, in FIG. 167, as described later, multiple output images are displayed on the image display unit 12245, and the user can select output images displayed on the image display unit 12245 by operating the user I/F 12246, and upon the user performing operations for selecting an output image, the user I/F 12246 supplies selection information representing the output image selected by that operation to the processing region selecting unit 12241 and actual world estimating unit 12243, as assisting information.

Now, examples of the method for instructing the unsatisfactory region by operating the user I/F 12246 include, for example, a method for instructing with a rectangle surrounding the unsatisfactory region, a method for instructing by trimming (trim) the unsatisfactory region, a method for instructing by pointing one or more arbitrary points within the unsatisfactory region, and so forth; here, let us say that the user instructs the unsatisfactory region by pointing one arbitrary point in the unsatisfactory region, for example, by operating the user I/F 12246. In this case, the user I/F 12246 supplies coordinates on the image of that point, for example, as information representing the point where the user pointed, to the processing region setting unit 12241 and the actual estimating unit 12243, as unsatisfactory region instructing information.

Next, the processing of the signal processing device 4 shown in FIG. 167 will be described with reference to the flowchart shown in FIG. 168.

First, in step S12211, the signal processing device 4 performs pre-processing, and the flow proceeds to step S12212. That is to say, the signal processing device 4 supplies one frame or one field, for example, of the input image, supplied from the sensor 2 (FIG. 1) as data 3, to the processing region setting unit 12241, continuity setting unit 12242, actual world estimating unit 12243, image generating unit 12244, and image display unit 12245. Further, the signal processing unit 4 causes the image display unit 12245 to display the input image.

In step S12212, the user I/F 12246 determines whether or not there has been some sort of user input, by the user operating the user I/F 12246. In step S12212, in the event that determination is made that there is no user input, i.e., in the event that the user has made no operations, the flow skips steps S12213 through S12215, and proceeds to step S12216.

Also, in step S12212, in the event that determination is made that there has been user input, i.e., in the event that the user has viewed the input image displayed on the image display unit 12245 and operated the user I/F 12246, thereby making user input indicating some sort of instruction or information, and in the event that there has been some sort of user input, the flow proceeds to step S12213, where the user I/F 12246 determines whether or not the user input is user instructions instructing ending of the processing of the signal processing device 4.

In the event that determination is made that in step S12213 that the user input is ending instructions, that is to say, for example, in the event that the user who has viewed the input image displayed on the image display unit 12245, operates the user I/F 12246 so as to end the processing of the signal processing device 4 with no need for performing signal processing with regard to the input image, since the user did not find the image quality of the input image unsatisfactory, the signal processing device 4 ends the processing.

Also, in the event that determination is made in step S12213 that the user input is not ending instructions, the flow proceeds to step S12214, where the user I/F 12246 determines whether or not the user input is unsatisfactory region instruction information. In the event that determination is made in step S12214 that the user input is not unsatisfactory region instruction information, step S12215 is skipped, and the flow proceeds to step S12216.

On the other hand, in the event that determination is made in step S12214 that there has been input of unsatisfactory region instructing information, that is to say, in the event that the user who has viewed the input image displayed on the image display unit 12245 and found the image quality of the input image unsatisfactory, and therefore operated the user I/F 12246 so as to point the unsatisfactory portion, the flow proceeds to step S12215, where the user I/F 12246 supplies region unsatisfactory instructing information representing the point which the user has pointed by operating the user I/F 12246 to the processing region setting unit 12241 and the actual world estimating unit 12243, as assisting information, and the flow proceeds to step S12216.

In step S12216, the processing region setting unit 12241 sets a predetermined rectangular region including the unsatisfactory region for example, based on the unsatisfactory region instruction information serving as assisting information supplied from the user I/F 12246, as a processing region, and supplies to the continuity setting unit 12242, the actual world estimating unit 12243, and the image generating unit 12244, the processing region information thereof, and the flow proceeds to step S12217. Note that this processing region may be input by the user operating the user I/F 12246.

However, in the event that unsatisfactory region instructing information is not supplied from the user I/F 12246 to the processing region setting unit 12241 (in the event that the processing of step S12216 is performed immediately following step S12212 or step S12214), the processing region setting unit 12241 automatically sets a processing region by performing predetermined processing (for example, processing for detecting a region in the input image where movement blurring has occurred).

In step S12217, the continuity setting unit 12242 recognizes the processing region in the input image, from the processing region information supplied from the processing region setting unit 12241. Further, the continuity setting unit 12242 sets the movement amount of the object displayed in the processing region, as information representing the continuity of the actual world 1 light signals lost in each of the processing region image data, and supplies continuity information representing the continuity to the actual world estimating unit 12243, and the flow proceeds to step S12218. Note that this movement amount may be input by the user operating the user I/F 12246. Also, here, the continuity setting unit 12242 sets the movement amount representing the magnitude of movement of the object as the continuity information in the input image, since it is assumed that the object is moving in the horizontal direction, but an arrangement may be made wherein a movement vector representing the magnitude and direction of movement of the object is set as the continuity information.

In step S12218, the actual world estimating unit 12243 estimates N, which is multiple, versions of the actual world 1 light signals (image without movement blurring) with regard to the image data within the processing region of the input image (data of movement blurring image), based on the movement amount of the corresponding actual world 1 light signals, according to the processing region information supplied from the processing region setting unit 12241 and the unsatisfactory region instruction information supplied from the user I/F 12246.

That is to say, at the actual world estimating unit 12243, the model generating unit 12251 recognizes the processing region in the input image from the processing region information supplied from the processing region setting unit 12241, and also recognizes the movement amount of the actual world 1 light signals corresponding to the processing region image data, based on the continuity information supplied from the continuity setting unit 12242, i.e., in this case, recognizes the amount of movement of the object displayed in the processing region. Further, the model generating unit 12251 generates a relation model modeling the relation between the pixel values of the pixels in each horizontal line within the processing region and the actual world 1 light signals, corresponding to the pixels making up each horizontal line in the processing region of the input image and the movement amount of the actual world 1 light signals corresponding to the image data of the processing region, for each of the horizontal lines in the processing region, which are supplied to the equation generating unit 12252.

The equation generating unit 12252 recognizes the processing region in the input image from the processing region information supplied from the processing region setting unit 12241, and substitutes pixel values of each of the pixels of the input image into the relation model for each horizontal line in the processing region which has been supplied from the model generating unit 12251 according to the processing region, thereby generating an equation for obtaining an approximation function approximating the actual world 1 light signals, which is then supplied to the actual world waveform estimating unit 12253. Further, the equation generating unit 12252 generates N versions of constraint condition expressions wherein the constraint condition expression constraining the approximation function is weighted in N ways, based on the processing region information and the features of the input image. The equation generating unit 12252 combines the equation for obtaining an approximation function serving as an approximation model approximating the actual world 1 light signals with each of the N versions of constraint condition expressions, to generate N versions of normal equations, which are supplied to the actual world waveform estimating unit 12253.

The actual world waveform estimating unit 12253 computes each of the N versions of normal equations supplied from the equation generating unit 12252, thereby estimating the N versions of waveforms of the actual world 1 light signals. That is to say, the actual world waveform estimating unit 12253 solves each of the N versions of normal equations supplied from the equation generating unit 12252, thereby obtaining N versions of approximation functions serving as approximation models modeling the actual world 1 light signals, and supplies the approximation functions to the image generating unit 12244 as estimation results of the N versions of actual world 1 light signals.

Now, the processing in step S12218 which such an actual world estimating unit 12243 executes will be called "actual world estimation processing". Details of "actual world estimation processing" will be described later with reference to the flowchart in FIG. 169.

Following the processing in step S12218, the flow proceeds to step S12219, where the image generating unit 12244 generates N versions of signals closer approximating the actual world 1 light signals, based on the N versions of approximation functions closer approximating the waveforms of the actual world 1 light signals, supplied from (the actual world waveform estimating unit 12253 of) the actual world estimating unit 12243. That is to say, the image generating unit 12244 recognizes the processing region in the input image from the processing region information supplied from the processing region setting unit 12241, and generates N versions of approximation images closer approximating the actual world 1 light signals (image without movement blurring), based on the N versions of approximation functions regarding the corresponding processing region supplied from the actual world estimating unit 12243.

Further, the image generating unit 12244 generates, as N versions of output images, images wherein the processing region portion in the input image has been replaced with the N versions of approximation images (images without movement blurring), which are then supplied to the image display unit 12245, and the flow proceeds from step S12219 to step S12220.

In step S12220, the image display unit 12245 displays the N versions of output images supplied from the image generating unit 12244 instead of the input image displayed in step S12211, or along with the input image, and the flow proceeds to step S12221.

In step S12221, the user I/F 12246 determines whether there has been input of selection information by the user operating the user I/F 12246. That is to say, in Step S12220, N versions of output images are displayed on the image display unit 12245, and determination is made in step S12221 regarding whether or not the user who has viewed the N versions of output images has input selection information for selecting an image which is an image with the desired image quality or an image close to the desired image quality from the N versions of output images, by operating the user I/F 12246.

In the event that determination is made in step S12221 that there has been no input of selection information, the flow proceeds to step S12224, and the user I/F 12246 determines whether there has been input of ending instructions, as with the case in step S12213.

In the event that determination is made in step S12224 that there has been input of ending instructions, the signal processing device 4 ends processing.

Also, in the event that determination is made in step S12224 that there has been no input of ending instructions, the flow returns to step S12221, and hereafter the same processing is repeated.

On the other hand, in the event that determination is made in step S12221 that there has been input of selection information, i.e., in the event that the user who has viewed the N versions of output images displayed on the image display 12245, and has selected an image which is an image with the desired image quality or an image close to the desired image quality from the N versions of output images, the flow proceeds to step S12222, where the user I/F 12246 determines whether or not the user has input finalization instructions for finalizing the output image which the user has selected as a final output image, by the user operating the user I/F 12246.

In the event that determination is made in step S12222 that there has been input of finalization instructions, the flow proceeds to step S12223, where the image display unit 12245 displays the output image which the user has selected on the entire screen thereof, and the processing ends.

Also, in the event that determination is made in step S12222 that there has been no input of finalization instructions, that is to say, in the event that the user is dissatisfied with the image quality of the selected output image, and has not performed input of finalization instructions in order to perform processing again, the flow returns to step S12215, where the user I/F 12246 supplies selection information representing the output image which the user has selected to the processing region setting unit 12241 and the actual world estimating unit 12243 as assisting information, and the flow sequentially proceeds to steps S12216, S12217, and S12218. In the processing region setting processing in step S12216 and the continuity setting processing in step S12217, the processing region and continuity set the previous time are set.

The processing region information is then supplied to the continuity setting unit 12242, actual world estimating unit 12243, and image generating unit 12244, and the continuity information is supplied to the actual world estimating unit 12243. Note that the processing of steps S12216 and S12217 performed the second time on can be skipped.

In step S12218, the actual world estimating unit 12243 can estimate the actual world 1 light signals (image without movement blurring) with N new methods, based on the selection information serving as assisting information supplied from the user I/F 12246.

That is to say, in this case, in step S12218, the equation generating unit 12252 of the actual world estimating unit 12243 sets N new versions of constraint condition equations, based on the constraint condition equation used for obtaining the output image represented by the selection information serving as assisting information supplied from the user I/F 12246. The equation generating unit 12252 combines an equation for obtaining an approximation function serving as an approximation model approximating the actual world 1 light signals with each of N new constraint condition equations, thereby generating N new versions of normal equations, and supplies the N new normal equations to the actual world waveform estimating unit 12253. Further, the actual world waveform estimating unit 12253 computes each of the N new normal equations supplied from the equation generating unit 12252, thereby estimating N new versions of actual world 1 light signal waveforms. The flow then proceeds to step S12219 from step S12218, and hereafter the same processing is repeated.

That is to say, accordingly, this processing of steps S12215 through S12214 is repeated, and ultimately the user obtains an output image of the desired image quality wherein the dissatisfaction of the user with the output image has been resolved.

As described above, with the signal processing device 4, N versions of output images which are processing results of the input image are presented to the user, for the user to select a desired one from the N versions of output images, and based on the selection results, processing is performed again, so high-quality output images, meeting the user's preferences can be easily obtained. That is to say, the signal processing device 4 presents the user with N versions of output images which are processing results of the input image. On the other hand, the user recognizes the image quality of the N versions of output images, and gives feedback to the signal processing device 4 regarding judgment of which output image is an image of good image quality. The signal processing device 4 processes the input image again based upon the feedback from the user, and hereafter the same processing is repeated. Accordingly, high-quality output images, meeting user preferences, can be easily obtained.

Now, it can be said that the signal processing device 4 receiving feedback from the user and performing processing on the input image means that the signal processing device 4 is performing processing in cooperation with the user.

Next, the actual world estimation processing (the processing in step S12218 in FIG. 168) of the actual world estimating unit 12243 (FIG. 167) will be described in detail with reference to the flowchart in FIG. 169.

In step S12231, the model generating unit 12251 generates a relation model. That is to say, the model generating unit 12251 recognizes the processing region in the input image from the processing region information supplied from the processing region setting unit 12241, and also recognizes the movement amount corresponding to the image data of the processing region, from the continuity information supplied from the continuity setting unit 12242. Further, the model generating unit 12251 generates, for each horizontal line in the processing region, a relation model modeling the relation between the pixel values of the pixels detected by the sensor 2 within the processing region and the image without movement blurring represented by the approximation model approximating the actual world 1 light signals, according to the pixels making up the horizontal line of the processing region, and the movement amount corresponding to the image data in the processing region, for the processing region in the input image, and supplies this to the equation generating unit 12252. The model generating unit 12251 then proceeds from step S12231 to step S12232.

Specifically, the model generating unit 12251 generates an expression representing the relation between the pixel values $P_i$ of the pixels in each horizontal line of the processing region, and the pixel values $Q_i$ without movement blurring, described with reference to FIG. 148A through FIG. 148C, according to the number of pixels in the horizontal line of the processing region, and the movement amount, as a relation model. For example, in the event that the number of pixels in a horizontal line is in the processing region is 8, and the movement amount v is 5, the above-described expression (151), is generated as a relation model.

In step S12232, the equation generating unit 12252 performs equation generating processing. That is to say, the equation generating unit 12252 recognizes the processing region in the input image from the processing region information supplied from the processing region setting unit 12241, and with regard to this processing region, substitutes the pixel values for each of the pixels of the input image making up the processing region into the relation model obtained with regard to each of the horizontal lines of the processing region supplied from the model generating unit 12251, thereby generating the equations (model equations) of the Expression (151) for obtaining pixel values $Q_i$ without movement blurring, represented by an approximation function approximating the actual world 1 light signals.

Further, the expression generating unit 12252 generates constraint condition expressions which are expressions for constructing the approximation model approximating the actual world 1 light signals in the horizontal line of the processing region recognized from the processing region information supplied from the processing region setting unit 12241. That is to say, with model expressions in Expression (151), the number of pixel values $Q_i$ without movement blurring, which are the variables to be obtained, are greater than the number of equations, so there is the need to introduce equations of a number equal to or greater than the number of pixel values $Q_i$ without movement blurring for the total number of equations, in order to obtain the pixel values $Q_i$ without movement blurring. Here, the equation generating unit 12252 generates a constraint condition expression to say that to the difference between the pixel values $Q_i$ without movement blurring represented by the approximation function, between adjacent pixels, is small (there is spatial correlation). Here, the equation generating unit 12252 generates weighted constraint condition expressions regarding pixels of the unsatisfactory region instructed by the user, and pixels in the processing region having features similar to (including identical to) those of the unsatisfactory region within the processing region.

However, output images with different image quality are obtained depending on how the unsatisfactory region is weighted, so the equation generating unit 12252 generates N versions of weighted constraint condition expressions. Consequently, N versions of output images are generated and displayed at the signal processing device 4. The user views the N versions of output images, and selects an image from these with the desired image quality or an image with close to the desired image quality.

Accordingly, even in the event that the image without movement blurring is not flat and has some sort of pattern, for example, such that the image has a high level of activity, an image without blurring having the image quality which the user desires can be obtained. That is to say, the equation generating unit 12252 generates constraint condition expressions wherein the difference between the pixel values with no movement blurring of adjacent pixels is small, weighted in N ways, to the region which the user has instructed as being unsatisfactory. The user can select the image with the desired image quality from the N versions of output images obtained as the result thereof, so an image with the desired image quality, having optimal constraint conditions set regarding the unsatisfactory region, can be obtained.

Also, the equation generating unit 12252 generates constraint condition expressions weighted in N ways, regarding not only the pixels of the unsatisfactory region, but also generates the constraint condition expressions weighted in N ways for the pixels within the processing region having features similar to those of the pixels of the unsatisfactory region, the same as for pixels of the unsatisfactory region, so in the event of providing the same constraint condition expressions for all pixels having features similar to those of the pixels in the unsatisfactory region, the user needs not instruct all pixels to be taken as unsatisfactory regions, and can easily set optimal constraint conditions regarding pixels having features similar to those of the instructed pixels, simply by instructing a certain pixel to be taken as an unsatisfactory region, thereby reducing the burden on the user.

The equation generating unit 12252 generates model equations, and also generates constraint condition expressions weighted in N ways, regarding the pixels of the unsatisfactory region and pixels within the processing region having features similar to those of the pixels of the unsatisfactory region based on the unsatisfactory region instruction information, and combines the generated model equation and the N versions of constraint condition expressions to generate normal equations. The equation generating unit 12252 supplies the N versions of normal equations to the actual world waveform estimating unit 12253, and the flow proceeds from step S12232 to step S12233.

Note that hereafter, the processing in step S12232 which the equation generating unit 12252 executes as described above will be called "equation generating processing". The details of "equation generating processing" will be described later with reference to the flowchart in FIG. 171.

In step S12233, the actual world waveform estimating unit 12253 solves the N versions of normal equations regarding each horizontal line in the processing region supplied from the equation generating unit 12252, thereby estimating N versions of waveforms of the actual world 1 light signals, i.e., obtaining pixel values $Q_i$ without movement blurring represented by N versions of approximation functions, and supplies the N versions of pixel values thereof to the image generating unit 12244.

Next, FIG. 170 illustrates a detailed configuration example of the equation generating unit 12252 shown in FIG. 167.

In FIG. 170, the equation generating unit 12252 comprises a model equation generating unit 12271, features extracting unit 12272, features space LUT (Look Up Table) generating unit 12273, weighting setting unit 12274, constraint condition expression generating unit 12275, and normal equation generating unit 12276.

The relation model modeling the relation between pixel values of the pixels of each horizontal line in the processing region (pixel values of the movement blurring image) detected by the sensor 2 within the processing region, and the pixel values without movement blurring, are input from the model generating unit 12251, to the equation generating unit 12252 of which the configuration is shown in FIG. 170, and supplied to the model equation generating unit 12271. Also, the input image is input from the sensor 2 (FIG. 1) to the equation generating unit 12252, and the input image is supplied to the model equation generating unit 12271 and features extracting unit 12272.

Further, processing region information is input from the processing region setting unit 12241 to the equation generating unit 12252, and the processing region information is supplied to the model equation generating unit 12271 and the features extracting unit 12272. Also, unsatisfactory region instruction information or selection information is input from the user I/F 12246 to the equation generating unit 12252 as assisting information, and the unsatisfactory region instruction information is supplied to the features space LUT generating unit 12273 and the selection information to the features space LUT generating unit 12273 and weighting setting unit 12274, respectively.

The model equation generating unit 12271 recognizes the processing region of the input image from the processing region information, and substitutes the pixel values of the processing region in the input image as the pixel values $P_i$ of each of the pixels in the movement blurring image of the relation model for each horizontal line in the processing region supplied from the model generating unit 12251, thereby generating the model equation for each horizontal line in the processing region. The model equation generating unit 12271 then supplies the model equation to the normal equation generating unit 12276.

The features extracting unit 12272 recognizes (the pixel values of) the pixels making up the processing region, from the processing region information input from the processing region setting unit 12241 and from the input image, and extracts (detects) multiple types of features with regard to each of the pixels making up the processing region. The features extracting unit 12272 supplies the multiple types of features of each of the pixels in the processing region to the features space LUT generating unit 12273.

Examples of multiple types of features of a pixel that can be employed include the difference (first order differential) in pixel value as to a pixel adjacent to that pixel, the difference of that difference (second order differential), the ratio of brightness and color difference as pixel value, movement vector, difference in pixel value as to a pixel in the same position in an adjacent frame, arbitrary values representing other activity, and so forth.

The features space LUT generating unit 12273 generates a features space LUT classifying (class classification) each pixel in the processing region for each of the multiple types of features of each of the pixels in the processing region supplied from the features extracting unit 12272.

Also, the features space LUT generating unit 12273 selects (extracts) pixels in the unsatisfactory region and pixels having the same class of features as those pixels of the pixels within the processing region, based on the unsatisfactory region instruction information input from the user I/F 12246, takes these pixels as pixels to be constrained which are to be constrained by constraint condition expressions, and supplies information regarding the pixels to be constrained to the constraint condition generating unit 12275.

Further, in the event that selection information has been input from the user I/F 12246, i.e., in the event that the user has viewed the N versions of output images and selected a desired image or n image close to that desired by operating the user I/F 12246, the features space LUT generating unit 12273 stores, in the generated features space LUT, weighting as to the constraint condition expression used for obtaining the output image which the selection information represents, as to the class to which the pixels of the unsatisfactory region belong. Upon input of selection information from the user I/F 12246 being repeated, the features space LUT generating unit 12273 stores, in the generated features space LUT, weighting as to the constraint condition expression used for obtaining the output image selected this time, as to the class to which the pixels of the unsatisfactory region belong instead of the weight stored the previous time, and finally stores a weight optimal for the class to which the pixels of the unsatisfactory region belong.

Thus, weights optimal for pixels having features represented by a class to which pixels of an unsatisfactory region belong are stored in the features space LUT, so following optimal weighting being stored in the features space LUT, weighting for constraining condition expressions corresponding to pixels of each of the features is stored to a class to which the pixel belongs in accordance with the features space LUT, thereby, even in the event that the user does not specify an unsatisfactory region, an output image of image quality which the user desires can be obtained with regard to an arbitrary input image.

The weighting setting unit 12274 sets N weights to be applied to the constraint condition expression based on the selection information input from the user I/F 12246, and supplies the N weights to the constraint condition expression generating unit 12275. The constraint condition expression generating unit 12275 generates N versions of predetermined constraint conditions for the pixels to be constrained that are supplied from the features space LUT generating unit 12273, based on the N weights set at the weighting setting unit 12274, and supplies the N versions of constraint condition expressions to the normal equation generating unit 12276.

The normal equation generating unit 12276 combines the model equation supplied from the model equation generating unit 12271 and the N versions of constraint condition expressions supplied from the constraint condition expression generating unit 12275 to generate N versions of normal equations, which are supplied to the actual world waveform estimating unit 12253.

Next, the equation generating processing (the processing in step S12232 in FIG. 169) of the equation generating unit 12252 (FIG. 170), will be described in detail with reference to the flowchart in FIG. 171.

In step S12251, the model equation generating unit 12271 obtains a relation model for each horizontal line in the processing region from the model generating unit 12251, and the flow proceeds to step S12252. In step S12252, the model equation generating unit 12271 acquires the input image from the sensor 2, and also obtains processing region information from the processing region setting unit 12241. The model equation generating unit 12271 then recognizes the pixel values $P_i$ for each of the pixels within the processing region from the processing region information of the input image, and substitutes the pixel values $P_i$ into the relation model of the Expression (151) obtained from the model generating unit 12251, thereby generating a model equation for each horizontal line of the processing region. Further, the model equation generating unit 12271 supplies the model equations to the normal equation generating unit 12276. In the event that the model equation generating unit 12271 has obtained the relation models represented by the above Expression (151) from the model generating unit 12251, for example, model equations are generated by substituting the pixel values of the input image into the pixel values $P_4$ through $P_7$ in Expression (151).

Following the processing in step S12252, the flow proceeds to step S12253, where the features extracting unit 12272 extracts the features of the input image and supplies this to the features space LUT generating unit 12273. That is to say, the features extracting unit 12272 obtains the processing region information from the processing region setting unit 12241, and acquires the input image. The features extracting unit 12272 recognizes the image data within the processing region of the input image based on the processing region information, extracts multiple types of features for each of the pixels within the processing region, and supplies the multiple types of features to the features space LUT generating unit 12273.

Following the processing in step S12253, the flow proceeds to step S12254, where the features space LUT generating unit 12273 performs class classification of each of the pixels within the processing region based on the multiple types of features supplied from the features extracting unit 12272, and generates a features space LUT.

Note that in the event that a features space LUT has already been generated with regard to a certain processing region, and that selection information has been input from the user I/F 12246, i.e., the user has viewed the N versions of output images and selected a desired image or an image close to that desired, instead of performing the processing of steps S12253 and S12254, the features space LUT generating unit 12273 stores the weight used to obtain the output image which the selection information represents as a LUT value in the features space LUT, as to the class to which the pixel of the unsatisfactory region instructed by the user (in the event that an unsatisfactory region has not been instructed by the user, a pixel in the processing region) belongs.

Upon input of selection information from the user I/F 12246 being repeated, the features space LUT generating unit 12273 stores weighting as to the constraint condition expression used for obtaining the output image selected this time, instead of the weight stored the previous time, as to the features class of pixels in the unsatisfactory region and finally stores a weight optimal for the class to which the pixels of the unsatisfactory region belong.

In this case, the equation generating unit 12252 can apply the weight of the constraint condition expression stored in the features space LUT to other input images as well. That is to say, in the event that another input image is newly input, the equation generating unit 12252 extracts the multiple types of features for each of the pixels within the processing region of the input image, and performs class classification of each of the pixels within the processing region based on the multiple types of features. The equation generating unit 12252 sets weighting already stored as an LUT value for a class in the features space LUT which is the same as the class of each of the pixels of the processing region obtained by class classification, as weighting for the constraint condition expression corresponding the pixels. In this case, there is no need for the user to set optimal weighting for each input image, thereby reducing the burden on the user. Also, an arrangement may be made wherein the features space LUT is newly generated or updated each time a new input image is input.

Following the processing in step S12254, the flow proceeds to step S12255, where the features space LUT generating unit 12273 determines pixels to be constrained which are to be constrained by constraint conditions, supplies these to the constraint condition equation generating unit 12275, and the flow proceeds to step S12256. That is to say, the features space LUT generating unit 12273 obtains unsatisfactory region instruction information from the user I/F 12246, determines pixels of the unsatisfactory region and pixels belonging to the same features class (classification class) based on the features space LUT generated in step S12254 as those pixels to be pixels to be constrained, and supplies these to the constraint condition equation generating unit 12275.

Now, in the event that the user does not instruct an unsatisfactory region and there is no input of unsatisfactory region instruction information from the user I/F 12246, the features space LUT generating unit 12273 determines all pixels in the processing region, for example, to be pixels to be constrained which are to be constrained by constraint conditions.

In step S12256, the weighting setting unit 12274 sets the N weights and supplies each of the weights to the constraint condition expression generating unit 12275, and the flow proceeds to step S12257. Here, in the event that selection information is input from the user I/F 12246, the weighting setting unit 12274 sets N new weights, based on the weighting used for obtaining the output image which the selection information represents. That is to say, at the time of setting the first weighting, the weighting setting unit 12274 sets N weights at equal intervals in the range of 0 to 1 with 0.5 as the center, for example. Then, in the event that selection information is input from the user I/F 12246, the weighting setting unit 12274 sets N new weights at finer intervals than the previous time of setting (but within the range of 0 to 1), centered on the weight used for obtaining the output image which the selection information represents.

Accordingly, upon the user selecting a desired one from the N versions of output images output from the previous processing, N new weights are set based on the selection results, so by the user repeatedly selecting a desired one from the N output images, a weight whereby an output image of the image quality which the user desires is finally set, and consequently, an output image of the image quality which the user desires is obtained.

In step S12257, the constraint condition expression generating unit 12275 generates constraint condition expressions based on the N weights set in step S12256, for the pixels to be constrained determined in step S12255. That is to say, the constraint condition expression generating unit 12275 generates constraint condition expressions weighted in W ways for the pixels to be constrained. The constraint condition expression generating unit 12275 then supplies the generated N constraint condition expressions to the normal equation generating unit 12276.

For example, in the event that the number of pixels to be constrained in a horizontal line in the processing region is eight, as shown in FIG. 152A through FIG. 152C for example, and the pixel values without movement blurring of these pixels to be constrained are to be represented with $Q_0$ through $Q_7$, the constraint expression is represented as in the above-described Expression (154). The constraint condition expression generating unit 12275 generates the N versions of constraint condition expressions with different weighting W shown in Expression (154).

Following the processing of step S12257, the flow proceeds to step S12258, where the normal equation generating unit 12276 combines the model equation supplied from the model equation generating unit 12271 with the N constraint condition expressions supplied from the constraint condition expression generating unit 12275, thereby generating N normal equations, and the N normal equations are supplied to the actual world waveform estimating unit 12253.

Subsequently, the actual world waveform estimating unit 12253 solves the N normal equations supplied from the normal equation generating unit 12276 with the minimum norm for the least-square-error, for example, thereby obtaining the N pixel values $Q_i$ with no movement blurring of pixels in each horizontal line within the processing region.

Note that the above-described actual world estimating processing is performed for each of the pixels arrayed in the horizontal direction within the processing region (horizontal line). That is to say, the actual world waveform estimating unit 12253 obtains N pixels values without movement blurring for each of the pixels in the processing region, for each horizontal line. Following obtaining the N pixel values without movement blurring in all of the horizontal lines within the processing region, the actual world waveform estimating unit 12253 supplies the N pixel values without movement blurring of the respective pixels within the processing region to the image generating unit 12244. The image generating unit 12244 generates N versions of output images wherein the pixel values of each of the pixels in the processing region of the input image have been replaced with N versions of pixel values without movement blurring, which are supplied to the image display unit 12245 and displayed.

Also, with the above-described processing, the constraint condition expression generating unit 12275 does not generate constraint condition expressions regarding other than pixels to be constrained, but constraint condition expressions regarding other than pixels to be constrained may also be generated with predetermined weighting. For example, as shown in FIG. 152A through 152C, in the event that a horizontal line in the processing region is configured of eight pixels #0 through #7, the pixel values of the pixels #0 through #7 without movement blurring being represented by $Q_0$ through $Q_7$, in a case wherein pixels to be constrained are made up of the five pixels #0 through #4 with the pixel values $Q_0$ through $Q_4$, constraint conditions expression can be generated for the three pixels #5 through #7 with the pixel values $Q_5$ through $Q_7$ with predetermined weighting (e.g., weighting different from that of the weighting for the pixels of the pixels to be constrained) W.

FIG. 172A and FIG. 172B are diagrams describing the overview of processing with the signal processing device 4 shown in FIG. 167. Note that here, three features A, B, and C, are extracted, for example, as features of the pixels in a processing region, and a features space LUT has been compiled.

The example shown in FIG. 172A and FIG. 172B takes only two features A and C, for example, of the three features A through C, and a features space LUT 12281 takes features A as the horizontal axis and features C as the vertical axis.

As shown in FIG. 172A and FIG. 172B, the user views the input image 12280 and instructs (points) a region which is unsatisfactory as an unsatisfactory region. The signal processing device 4 sets a processing region based on the unsatisfactory region instructed by the user, and extracts the features A through C for each pixel from the input image data within the processing region. The signal processing device 4 generates a features space LUT 12281 based on the features A through C, wherein each of the pixels in the processing region has been subjected to class classification. That is to say, the signal processing device 4 performs class classification of pixels in the features space stipulated by the features A through C of the pixels, according to the partial space where vectors having the features A through C of the pixels as the components belong, and generate a features space LUT 12281 which correlates the class (features class) for the partial space with pixels. Note that in FIG. 172A and FIG. 172B, the features space LUT 12281 only takes note of the features A and C as described above. Also, the grids in the features space LUT 12281 represent the features classes which are partial spaces in the features space.

The signal processing device 4 recognizes the features class 12282 of unsatisfactory region pixels instructed by the user, from the features space LUT 12281, and sets all the pixels classified to that features class 12282 as pixels to be constrained. Further, the signal processing device 4 sets N versions of weighting, generates constraint condition expressions weighted in N ways with regard to the pixels to be constrained, and displays N output images obtained using the N versions of constraint condition expressions.

Note that FIG. 172A and FIG. 172B illustrate examples wherein an output image 12283 and output image 12284, each obtained from constraint condition expressions wherein pixels to be constrained have been applied different weights, have been displayed. The circles on the output image 12283 and the triangles on the output image 12284 represent pixels to be constrained.

The signal processing device 4 displays N versions of output images described with reference to FIG. 172A and FIG. 172B. The user then selects a desired image or an image close to the desired image from the N output images, and the signal processing device 4 repeats setting of N new weights, based on the weight used for obtaining the selected image.

Accordingly, the user can easily set optimal weighting and pixels to be constrained, so as to obtain an image closer approximating the actual world 1 light signals. That is to say, the user is capable of easily obtaining an image of the desired image quality or an image close to the desired image quality. Also, constraint condition expressions are generated for pixels of the same features class as the unsatisfactory region, so the user does not need to instruct all pixels to be taken as unsatisfactory regions, thereby enabling reduction in the burden on the user.

In FIG. 172A and FIG. 172B, only two features A and C of the three features A through C extracted from the pixels are observed, and pixels having the same class of features A and C as the pixels in the unsatisfactory region are taken as pixels to be constrained, but another arrangement may be made wherein, for example, pixels having the same class of all or any one of features A through C as the pixels in the unsatisfactory region are taken as pixels to be constrained. Further, the pixels to be constrained may be determined observing only features A and B, or features B and C. Which features to observe can be determined based on user operations, for example. Also, an arrangement may be made wherein, with the signal processing device 4, only the features of interest are extracted.

FIG. 173 illustrates another configuration example of an embodiment of an application example of the signal processing device 4 shown in FIG. 111.

Note that FIG. 173 illustrates the configuration example of an embodiment of the signal processing device 4 for estimating actual world 1 light signals from image data wherein movement blurring has occurred (movement blurring image data), which is an example of data 3 having continuity of moving in a predetermined direction at a predetermined speed, for example. That is to say, this signal processing device 4 estimates an image without blurring (image without movement blurring) from an image wherein a subject is taken in a blurred manner due to the subject (object) moving at the time of photography, for example (hereafter referred to as movement blurring image as appropriate). Accordingly, with the embodiment shown in FIG. 173, a movement blurring image, wherein movement blurring has occurred due to taking a moving object, is input to the signal processing device 4 as the input image. Note that here, an image obtained by imaging an object moving in the horizontal direction (from the left to right direction) at a constant speed (movement amount) is employed as the input image.

In FIG. 173, the processing region setting unit 12291, the continuity setting unit 12292, the actual world estimating unit 12293, image generating unit 12294, image display unit 12295, and user I/F 12296, each correspond to the processing region setting unit 10001, the continuity setting unit 10002, the actual world estimating unit 10003, image generating unit 10004, image display unit 10005, and user I/F 10006 shown in FIG. 111, and basically perform the same processing as the processing region setting unit 10001, the continuity setting unit 10002, the actual world estimating unit 10003, image generating unit 10004, image display unit 10005, and user I/F 10006. Further, in FIG. 173, the actual world estimating unit 12293 comprises a model generating unit 12301, an equation generating unit 12302, and actual world waveform estimating unit 12303. The model generating unit 12301, equation generating unit 12302, and actual world waveform estimating unit 12303 correspond to each of the model generating unit 10011, equation generating unit 10012, and actual world waveform estimating unit 10013 shown in FIG. 111, and basically perform the same processing as each of the model generating unit 10011, equation generating unit 10012, and actual world waveform estimating unit 10013.

Note however, that in FIG. 173, the assisting information which the user I/F 12296 outputs by the user operating the user I/F 12296, is supplied to the processing region setting unit 12291 and actual world estimating unit 12293.

That is to say, in FIG. 173, the user can instruct a region which is unsatisfactory to be taken as an unsatisfactory region with regard to the image displayed on the image display unit 12295, by operating the user I/F 12296, and upon the user performing operations to instruct the unsatisfactory region, the user I/F 12296 supplies unsatisfactory region instruction information representing the unsatisfactory region which is the region specified by that operation, to the processing region setting unit 12291 and actual world estimating unit 12293. Further, in FIG. 173, multiple output images are displayed on the image display unit 12295 as described later, and the user can select output images displayed on the image display unit 12295 by operating the user I/F 12296, and upon the user performing operations for selecting an output image, the user I/F 12296 supplies selection information representing the output image selected by that operation to the processing region selecting unit 12291 and actual world estimating unit 12293, as assisting information.

Now, examples of the method for instructing the unsatisfactory region by operating the user I/F 12296 include, for example, a method for instructing with a rectangle surrounding the unsatisfactory region, a method for instructing by trimming (trim) the unsatisfactory region, a method for instructing by pointing one or more arbitrary points within the unsatisfactory region, and so forth; here, the user instructs the unsatisfactory region by pointing one arbitrary point in the unsatisfactory region, for example, by operating the user I/F 12296. In this case, the user I/F 12296 supplies coordinates on the image of that point, for example, as information representing the point where the user pointed, to the processing region setting unit 12291 and the actual world estimating unit 12293, as unsatisfactory region instructing information.

Next, the signal processing device 4 shown in FIG. 173 will be described with reference to the flowchart shown in FIG. 174.

First, in step S12271, the signal processing device 4 performs pre-processing, and the flow proceeds to step S12272. That is to say, the signal processing device 4 supplies one frame or one field, for example, of the input image, supplied from the sensor 2 (FIG. 1) as data 3, to the processing region setting unit 12291, continuity setting unit 12292, actual world estimating unit 12293, image generating unit 12294, and image display unit 12295. Further, the signal processing device 4 causes the image display unit 12295 to display the input image.

In step S12272, the user I/F 12296 determines whether or not there has been some sort of user input, by the user operating the user I/F 12296. In step S12272, in the event that determination is made that there is no user input, i.e., in the event that the user has made no operations, the flow skips steps S12273 through S12275, and proceeds to step S12276.

Also, in step S12272, in the event that determination is made that there has been user input, i.e., in the event that the user has viewed the input image displayed on the image display unit 12295 and operated the user I/F 12296, thereby making user input indicating some sort of instruction or information, the flow proceeds to step S12273, where the user I/F 12296 determines whether or not the user input is ending instructions instructing ending of the processing of the signal processing device 4.

In the event that determination is made that in step S12273 that the user input is ending instructions, that is to say, for example, in the event that the user who has viewed the input image displayed on the image display unit 12295, operates the user I/F 12296 so as to end the processing of the signal processing device 4 with no need for performing signal processing with regard to the input image, since the user did not find the image quality of the input image unsatisfactory, the processing of the signal processing device 4 ends.

Also, in the event that determination is made in step S12273 that the user input is not ending instructions, the flow proceeds to step S12274, where the user I/F 12296 determines whether or not the user input is unsatisfactory region instruction information. In the event that determination is made in step S12274 that the user input is not unsatisfactory region instruction information, step S12275 is skipped, and the flow proceeds to step S12276.

On the other hand, in the event that determination is made in step S12274 that there has been input of unsatisfactory region instructing information, that is to say, in the event that the user who has viewed the input image displayed on the image display unit 12295 and found the image quality of the input image unsatisfactory, and therefore operated the user I/F 12296 so as to point the unsatisfactory portion, the flow proceeds to step S12275, where the user I/F 12296 supplies unsatisfactory region instructing information representing the point which the user has pointed by operating the user I/F 12296 to the processing region setting unit 12291 and actual world estimating unit 12293, as assisting information, and the flow proceeds to step S12276.

In step S12276, the processing region setting unit 12291 sets a predetermined rectangular region including the unsatisfactory region for example, based on the unsatisfactory region instruction information supplied from the user I/F 12296 as assisting information, as a processing region, and supplies to the continuity setting the unit 12292, the actual world estimating unit 12293, and the image generating unit 12294, the processing region information thereof, and the flow proceeds to step S12277. Note that this processing region may be input by the user operating the user I/F 12296.

However, in the event that unsatisfactory region instructing information is not supplied from the user I/F 12296 to the processing region setting unit 12291 (in the event that the processing of step S12276 is performed immediately following step S12272 or step S12274), the processing region setting unit 12291 automatically sets a processing region by performing predetermined processing (for example, processing for detecting a region in the input image where movement blurring has occurred).

In step S12277, the continuity setting unit 12292 recognizes the processing region in the input image, from the processing region information supplied from the processing region setting unit 12291. Further, the continuity setting unit 12292 sets the movement amount of the object displayed in the processing region, as information representing the continuity of the actual world 1 light signals lost in each of the processing region image data, and supplies continuity information representing the continuity to the actual world estimating unit 12293, and the flow proceeds to step S12278. Note that this movement amount may be input by the user operating the user I/F 12296. Also, here, movement amount representing the magnitude of movement of the object is set by the continuity setting unit 12292 as the continuity information, since it is assumed that the object is moving in the horizontal direction in the input image, but an arrangement may be made wherein a movement vector representing the magnitude and direction of movement of the object is set as the continuity information.

In step S12278, the actual world estimating unit 12293 estimates the actual world 1 light signals (image without movement blurring) with regard to the image data within the processing region of the input image (data of movement blurring image), based on the movement amount of the corresponding actual world 1 light signals, according to the processing region information supplied from the processing region setting unit 12291 and the unsatisfactory region instruction information supplied from the user I/F 12296, with M, which is multiple, methods.

That is to say, at the actual world estimating unit 12293, the model generating unit 12301 recognizes the processing region in the input image from the processing region information supplied from the processing region setting unit 12291, and recognizes the movement amount of the actual world 1 light signals corresponding to the processing region image data, based on the continuity information supplied from the continuity setting unit 12292, i.e., in this case, recognizes the amount of movement of the object displayed in the processing region. Further, the model generating unit 12301 generates a function serving as a relation model modeling the relation between the pixel values of the pixels in each horizontal line within the processing region and the actual world 1 light signals, corresponding to the pixels making up each horizontal line in the processing region of the input image and the movement amount of the actual world 1 light signals corresponding to the image data of the processing region, for each of the horizontal lines in the processing region, which are supplied to the equation generating unit 12302.

The equation generating unit 12302 recognizes the processing region in the input image from the processing region information supplied from the processing region setting unit 12291, and substitutes pixel values of each of the pixels of the input image into the function serving as a relation model for each of the horizontal lines in the processing region, which has been supplied from the model generating unit 12301 according to the processing region, thereby generating an equation for obtaining an approximation function as an approximation model approximating the actual world 1 light signals. Further, the equation generating unit 12302 generates M versions of constraint condition expressions constraining the approximation function, based on the processing region information and M versions of features in the input image. The equation generating unit 12302 combines the equation for obtaining an approximation function serving as an approximation model approximating the actual world 1 light signals with each of the M versions of constraint conditions, generating M versions of normal equations, which are supplied to the actual world waveform estimating unit 12303.

The actual world waveform estimating unit 12303 computes each of the M versions of normal equations supplied from the equation generating unit 12302, thereby estimating the M versions of waveforms of the actual world 1 signals. That is to say, the actual world waveform estimating unit 12303 solves each of the M versions of normal equations supplied from the equation generating unit 12302, thereby obtaining M versions of approximation functions serving as approximation models modeling the actual world 1 light signals, and supplies the approximation functions to the image generating unit 12294 as estimation results of the M versions of waveforms of the actual world 1 light signals.

Now, the processing in step S12278 which such an actual world estimating unit 12293 executes will be called "actual world estimation processing" hereafter. Details of "actual world estimation processing" will be described later with reference to the flowchart in FIG. 175.

Following the processing in step S12278, the flow proceeds to step S12279, where the image generating unit 12294 generates M versions of signals closer approximating the actual world 1 light signals, based on the M versions of approximation functions closer approximating the waveforms of the actual world 1 light signals, supplied from (the actual world waveform estimating unit 12303 of) the actual world estimating unit 12293. That is to say, the image generating unit 12294 recognizes the processing region in the input image from the processing region information supplied from the processing region setting unit 12291, and generates M versions of approximation images closer approximating the actual world 1 light signals (image without movement blurring), based on the M versions of approximation functions regarding the corresponding processing region supplied from the actual world estimating unit 12293.

Further, the image generating unit 12294 generates, as M versions of output images, images wherein the processing region portion in the input image has been replaced with the M versions of approximation images (images without movement blurring), which are then supplied to the image display unit 12295, and the flow proceeds from step S12279 to step S12280.

In step S12280, the image display unit 12295 displays the M versions of output images supplied from the image generating unit 12294 instead of the input image displayed in step S12271, or along with the input image, and the flow proceeds to step S12281.

In step S12281, the user I/F 12296 determines whether there has been input of selection information by the user operating the user I/F 12296. That is to say, in Step S12280, M versions of output images are displayed on the image display unit 12295, and determination is made in step S12281 regarding whether or not the user who has viewed the M versions of output images has input selection information for selecting an image which is an image with the desired image quality or an image close to the desired image quality from the M versions of output images, by operating the user I/F 12296.

In the event that determination is made in step S12281 that there has been no input of selection information, the flow proceeds to step S12274, and the user I/F 12296 determines whether there has been input of ending instructions, as with the case in step S12273.

In the event that determination is made in step S12284 that there has been input of ending instructions, the signal processing device 4 ends processing.

Also, in the event that determination is made in step S12284 that there has been no input of ending instructions, the flow returns to step S12281, and hereafter the same processing is repeated.

On the other hand, in the event that determination is made in step S12281 that there has been input of selection information, i.e., in the event that the user who has viewed the M versions of output images displayed on the image display unit 12295 has selected an image which is an image with the desired image quality or an image close to the desired image quality from the M versions of output images, the flow proceeds to step S12282, where the user I/F 12296 determines whether or not the user has input finalization instructions for finalizing the output image which the user has selected as a final output image, by operating the user I/F 12296.

In the event that determination is made in step S12282 that there has been input of finalization instructions, the flow proceeds to step S12283, where the image display unit 12295 displays the output image which the user has selected on the entire screen thereof for example, and the processing ends.

Also, in the event that determination is made in step S12282 that there has been no input of finalization instructions, that is to say, in the event that the user is dissatisfied with the image quality of the selected output image, and has not performed input of finalization instructions in order to perform processing again, the flow returns to step S12275, where the user I/F 12296 supplies selection information representing the output image which the user has selected to the processing region setting unit 12291 and the actual world estimating unit 12293 as assisting information, and the flow sequentially proceeds to steps S12276, S12277, and S12278. In the processing region setting processing in step S12276 and the continuity setting processing in step S12277, the processing region and continuity set the previous time are set. The processing region information is then supplied to the continuity setting unit 12292, actual world estimating unit 12293, and image generating unit 12294, and the continuity information is supplied to the actual world estimating unit 12293. Note that the processing of steps S12276 and S12277 performed the second time on can be skipped.

In step S12278, the actual world estimating unit 12293 can estimate the actual world 1 light signals (image without movement blurring) with M new methods, based on the selection information serving as assisting information supplied from the user I/F 12296.

That is to say, in this case, in step S12278, the equation generating unit 12302 of the actual world estimating unit 12293 sets M new versions of constraint condition expressions, based on the constraint condition expression used for obtaining the output image represented by the selection information serving as assisting information supplied from the user I/F 12296. The equation generating unit 12302 combines an equation for obtaining an approximation function serving as an approximation model approximating the actual world 1 light signals with each of M new constraint condition expressions, thereby generating M new versions of normal equations, and supplies the M new normal equations to the actual world waveform estimating unit 12303. Further, the actual world waveform estimating unit 12303 computes each of the M new normal equations supplied from the equation generating unit 12302, thereby estimating M new versions of actual world 1 light signal waveforms. The flow then proceeds to step S12279 from step S12278, and hereafter the same processing is repeated.

That is to say, accordingly, this processing of steps S12275 through S12284 is repeated, and ultimately the user obtains an output image of the desired image quality wherein the dissatisfaction of the user with the output image has been resolved.

As described above, with the signal processing device 4, M versions of output images which are processing results of the input image are presented to the user, for the user to select a desired one from the M versions of output images, and based on the selection results, processing is performed again, so high-quality output images, meeting the user's preferences can be easily obtained. That is to say, the signal processing device 4 presents the user with M versions of output images which are processing results of the input image. On the other hand, the user recognizes the image quality of the M versions of output images, and gives feedback to the signal processing device 4 regarding judgment of which output image is an image of good image quality. The signal processing device 4 processes the input image again based upon the feedback from the user, and hereafter the same processing is repeated. Accordingly, high-quality output images, meeting user preferences, can be easily obtained.

Now, it can be said that the signal processing device 4 receiving feedback from the user and performing processing on the input image means that the signal processing device 4 is performing processing in cooperation with the user.

Next, the actual world estimation processing (the processing in step S12278 in FIG. 174) of the actual world estimating unit 12293 (FIG. 173) will be described with reference to the flowchart in FIG. 175.

In step S12291, the model generating unit 12301 generates a relation model. That is to say, the model generating unit 12301 recognizes the processing region in the input image from the processing region information supplied from the processing region setting unit 12291, and also recognizes the movement amount corresponding to the image data of the processing region, from the continuity information supplied from the continuity setting unit 12292. Further, the model generating unit 12301 generates, for each horizontal line in the processing region, a relation model modeling the relation between the pixel values of the pixels detected by the sensor 2 within the processing region and the image without movement blurring represented by the approximation model approximating the actual world 1 light signals, according to the pixels making up the horizontal line of the processing region, and the movement amount corresponding to the image data in the processing region, for the processing region in the input image, and supplies this to the equation generating unit 12302. The model generating unit 12301 then proceeds from step S12291 to step S12292. Specifically, the model generating unit 12301 generates an expression representing the relation between the pixel values $P_i$ of the pixels in each horizontal line of the processing region, and the pixel values $Q_i$ without movement blurring, described with reference to FIG. 148A through FIG. 148C, according to the number of pixels in the horizontal line of the processing region, and the movement amount, as a relation model. For example, in the event that the number of pixels in a horizontal line in the processing region is 8, and the movement amount v is 5, the equations in the above-described expression (151), are generated as a relation model.

In step S12292, the equation generating unit 12302 performs equation generating processing. That is to say, the equation generating unit 12302 recognizes the processing region in the input image from the processing region information supplied from the processing region setting unit 12291, and with regard to this processing region, substitutes the pixel values for each of the pixels of the input image making up the processing region into the relation model obtained with regard to each of the horizontal lines of the processing region supplied from the model generating unit 12301, thereby generating the equations (model equations) of the Expression (151) for obtaining pixel values $Q_i$ without movement blurring, represented by an approximation function approximating the actual world 1 light signals for each of the horizontal lines of the processing region.

Further, the expression generating unit 12302 generates constraint condition expressions which are expressions for constraining the approximation model approximating the actual world 1 light signals of the processing region recognized from the processing region information supplied from the processing region setting unit 12291. That is to say, with model equations, the number of pixel values without movement blurring, which are the variables to be obtained, are greater than the number of equations, as indicated in Expression (151) so there is the need to introduce equations of a number equal to or greater than the number of pixel values $Q_i$ without movement blurring for the total number of equations, in order to obtain the pixel values $Q_i$ without movement blurring. Here, the equation generating unit 12302 generates a constraint condition expression to say that the difference between the pixel values without movement blurring represented by the approximation function, between adjacent pixels, is small (there is spatial correlation). Here, the equation generating unit 12302 takes pixels of the unsatisfactory region instructed by the user, and pixels in the processing region having features similar to those of the unsatisfactory region, as pixels to be constrained, and generates weighted constraint condition expressions regarding the pixels to be constrained.

That is to say, the equation generating unit 12302 extracts multiple types of features for each of the pixels in the processing region, and selects pixels within the processing region which have features similar to those of the unsatisfactory region are pixels to be constrained, which are to be subjected to constraint condition expressions. Specifically, the equation generating unit 12302 sets M versions of one or more combinations of multiple types of features, and selects pixels to be constrained regarding each of the M versions (of one or more combinations) of features. The equation generating unit 12302 then generates constraint condition expressions with predetermined weighting for the pixels to be constrained. Consequently, M output images are generated and displayed. The user views the M versions of output images, and selects an image from these with the desired image quality or an image with close to the desired image quality.

As described above, the equation generating unit 12302 generates constraint condition expressions, regarding not only the pixels of the unsatisfactory region, but also generates the constraint condition expressions for the pixels within the processing region having features similar to those of the pixels of the unsatisfactory region, the same as for pixels of the unsatisfactory region, based on the one or more combinations of M features, so the user can easily apply the same constraint conditions to portions to which applying of the same constraint conditions is desired, by selecting a desired image from the M output images obtained as a result thereof. Accordingly, even in cases wherein there are multiple portions to which the user desires to apply the same constraint condition expression, there is no need to instruct each of the multiple portions as unsatisfactory regions, thereby reducing the burden on the user.

The equation generating unit 12302 generates model equations, and also generates M versions of constraint condition expressions weighted with a predetermined weight, regarding the pixels of the unsatisfactory region and pixels within the processing region having features similar to those of the pixels of the unsatisfactory region regarding the M types of features (M versions of one or more combinations of features), based on the unsatisfactory region instruction information, and combines the generated model equation and the M versions of constraint condition expressions to generate M versions of normal equations. The equation generating unit 12302 supplies the M versions of normal equations to the actual world waveform estimating unit 12303, and the flow proceeds from step S12292 to step S12293.

Note that hereafter, the processing in step S12292 which the equation generating unit 12302 executes as described above will be called "equation generating processing". The details of "equation generating processing" will be described later with reference to the flowchart in FIG. 177.

In step S12293, the actual world waveform estimating unit 12303 solves the M versions of normal equations for each of the horizontal lines in the processing region supplied from the equation generating unit 12302, thereby obtaining pixel values $Q_i$ without movement blurring represented by M versions of approximation functions, and supplies the M versions of pixel values thereof to the image generating unit 12294.

Next, FIG. 176 illustrates a detailed configuration example of the equation generating unit 12302 shown in FIG. 173.

In FIG. 176, the equation generating unit 12302 comprises a model equation generating unit 12321, features extracting unit 12322, features axis setting unit 12323, features space LUT generating unit 12324, constraint condition expression generating unit 12325, and normal equation generating unit 12326.

The relation model modeling the relation between pixel values of the pixels of each horizontal line in the processing region (pixel values of the movement blurring image), and the pixel values without movement blurring, obtained for each horizontal line in the procession region are input from the model generating unit 12301, to the equation generating unit 12302 of which the configuration is shown in FIG. 176, and supplied to the model equation generating unit 12321. Also, the input image is input from the sensor 2 (FIG. 1) to the equation generating unit 12302, and the input image is supplied to the model equation generating unit 12321 and features extracting unit 12322.

Further, processing region information is input from the processing region setting unit 12291 to the equation generating unit 12302, and the processing region information is supplied to the model equation generating unit 12321 and the features extracting unit 12322. Also, unsatisfactory region instruction information and selection information is input from the user I/F 12296 to the equation generating unit 12302 as assisting information, with the unsatisfactory region instruction information being supplied to the features space LUT generating unit 12324, and the selection information supplied to the features space LUT generating unit 12324 and features axis setting unit 12323, respectively.

The model equation generating unit 12321 recognizes the processing region of the input image from the processing region information, and substitutes the pixel values of the processing region in the input image as the pixel values $P_i$ of each of the pixels in the movement blurring image of the relation model of each horizontal line in the processing region supplied from the model generating unit 12301, thereby generating the model equation in Expression (151) for each horizontal line in the processing region. The model equation generating unit 12321 then supplies the model equation to the normal equation generating unit 12326.

The features extracting unit 12322 recognizes (the pixel values of) the pixels making up the processing region, from the processing region information input from the processing region setting unit 12291 and from the input image, and extracts multiple types of features with regard to each of the pixels making up the processing region. The features extracting unit 12322 supplies the multiple types of features of each of the pixels in the processing region to the features space LUT generating unit 12324.

The features axis setting unit 12323 sets M versions of features axes for generating the features space LUT, based on the selection information input from the user I/F 12296. Note that a features axis is an axis representing one of the multiple features extracted from the input image.

The features space LUT generating unit 12324 classifies (class classification) each pixel in the processing region based on the features corresponding to the features axis supplied from the features axis setting unit 12323, of the multiple types of features of each of the pixels in the processing region supplied from the features extracting unit 12322, and generates a features space LUT. Also, the features space LUT generating unit 12324 classifies each of the pixels in the processing region, regarding each of M versions of features axes supplied from the features axis setting unit 12323, and accordingly generates M versions of features space LUTS. Also, the features space LUT generating unit 12324 selects pixels in the unsatisfactory region and pixels having similar features as those pixels from the pixels in the processing region, based on the M versions of features space LUTs generated and the unsatisfactory region instruction information input from the user I/F 12296, takes these pixels as pixels to be constrained, and supplies information regarding the pixels to be constrained to the constraint condition expression generating unit 12325. Accordingly, the features space LUT generating unit 12324 selects M versions of pixels to be constrained, based on the M versions of the features space LUTs.

Further, in the event that selection information has been input from the user I/F 12296, i.e., in the event that the user has viewed the M versions of output images and selected a desired image or an image close to that desired by operating the user I/F 12296, the features space LUT generating unit 12324 stores weighting applied to the constraint condition expression with regard to the features class of the pixels in the unsatisfactory region instructed by the user (in the event that the user has not instructed an unsatisfactory region, pixels of the processing region) of the features space LUT used for obtaining the output image which the selection information represents from the M versions of features space LUTs generated.

Upon input of selection information from the user I/F 12296 being repeated, the features space LUT generating unit 12324 deletes the features space LUT generated the previous time, and stores weighting as to the features class of the pixels in the unsatisfactory region for the features space LUT used to obtain the output image selected this time, from the M versions of features space LUTs generated this time, and finally stores the weight in the features space LUT that has been used for obtaining the output image of quality which the user has taken to be the best, i.e., the optimal features space LUT. Thus, this optimal features space LUT stores weighting for the features class belonging to pixels optimal for being taken as pixels to be constrained, so following obtaining such an optimal features space LUT, the weight of the constraint condition expressions corresponding to the pixels of each of the features is taken as the weight stored for the class to which that pixel belongs, according to the optimal features space LUT, thereby enabling an output image of image quality which the user desires to be obtained with regard to an arbitrary input image, even in the event that the user does not specify an unsatisfactory region.

Here, the features space LUT is described as storing weight, but the features space LUT may store information representing that weight has been applied (or made to be a pixel to be constrained), instead of the weight itself.

Also, description has been made that the features axis setting unit 12323 sets M versions of features axes, and the features space LUT generating unit 12324 generates M versions of features space LUTs performing class classification of the pixels of the processing region in the features space stipulated by each of the M versions or features axes, but in another arrangement for example, the features axes may be made to be all the same, and the M versions of features space LUTs may be generated by sectioning the same features axis and creating features classes, and by preparing M versions of ways of sectioning the features axis.

The constraint condition expression generating unit 12325 generates M versions of predetermined constraint conditions, with predetermined weighting, for the M versions of pixels to be constrained that are supplied from the features space LUT generating unit 12324, and supplies the M versions of constraint condition expressions to the normal equation generating unit 12326.

The normal equation generating unit 12326 combines the model equation supplied from the model equation generating unit 12321 and each of the M versions of constraint condition expressions supplied from the constraint condition expression generating unit 12325 to generate M versions of normal equations, which are supplied to the actual world waveform estimating unit 12303.

Next, the equation generating processing (the processing in step S12292 in FIG. 175) of the equation generating unit 12302 (FIG. 176), will be described in detail with reference to the flowchart in FIG. 177.

In step S12311, the model equation generating unit 12321 obtains a relation model for each horizontal line in the processing region from the model generating unit 12301, and the flow proceeds to step S12312. In step S12312, the model equation generating unit 12321 acquires the input image from the sensor 2, and also obtains processing region information from the processing region setting unit 12291. The model equation generating unit 12321 then recognizes the pixel values $P_i$ for each of the pixels within the processing region from the processing region information of the input image, and substitutes the pixel values $P_i$ into the relation model of the Expression (151) obtained from the model generating unit 12301 with the pixel value of each pixel in the processing region, thereby generating a model equation for each horizontal line of the processing region. Further, the model equation generating unit 12321 supplies the model equations to the normal equation generating unit 12326. In the event that the model equation generating unit 12321 has obtained the relation models represented by the above Expression (151) from the model generating unit 12301, for example, model equations are generated by substituting the pixel values of the input image into the pixel values $P_4$ through $P_7$ in Expression (151).

Following the processing in step S12312, the flow proceeds to step S12313, where the features extracting unit 12322 extracts the features of the input image and supplies this to the features space LUT generating unit 12324. That is to say, the features extracting unit 12322 obtains the processing region information from the processing region setting unit 12291, and acquires the input image. The features extracting unit 12322 recognizes the pixels within the processing region of the input image based on the processing region information, extracts multiple types of features for each of the pixels within the processing region, and supplies the multiple types of features to the features space LUT generating unit 12324.

Following the processing in step S12313, the flow proceeds to step S12314, where the features axis setting unit 12323 sets M features axes by combining, for example one or more of the multiple features extracted by the features extracting unit 12322, which are supplied to the features space LUT generating unit 12324, and the flow proceeds to step S12315. Here, in the event that selection information is input from the user I/F 12296, the features setting unit 12323 sets M features axes based on the feature axis used for obtaining the output image represented by the selection information. That is to say, in the event of setting a features axis first, the features axis setting unit 12323 takes certain features A, for example as one features axis, and each of the other M features as other features axes, thereby setting M features axes (M versions of combinations of two features axes). Then, in the event that selection information is input from the user I/F 12296, in addition to the two features axes used for obtaining the output image which the selection information represents, for example, the features axes of the features A and B, the features axis setting unit 12323 sets M new features axes (M versions of combinations of three features axes), with each of the M features other than the features A and B as new other features axes.

Accordingly, by the user selecting a desired one from the M output images output in the previous processing, M new features axes are set based on the selection results, and pixels to be constrained which are to be subjected to constraint conditions are determined, so repeating this processing finally sets a features axis by which an output image of the image quality which the user desires is set, and consequently, the user can obtain an output image of desired image quality.

Note that while the above description sets M features axes made up of the same number of features axes as the (combination of) M features axis, but the setting method of M features axes is not restricted to this. That is to say, besides this, M features axes made up of different numbers of features axes (e.g., a feature axis of the feature A alone, a feature axis of features A and B, and so forth) can be set as the M feature axes.

In step S12315, the feature space LUT generating unit 12324 classifies each of the pixels from the features of the pixels within the processing region supplied from the features extracting unit 12322, into features classes, based on the M features axes set in step S12314, and generates M features space LUTs.

That is to say, for example, let us say that three features A, B, and C, have been extracted as multiple features by the features axis extracting unit 12322, and that the features axis setting unit 12323 has set seven axes from the three features A through C, these being features A, B, C, A and B, A and C, B and C, and A and B and C, as the M features axes. In this case, observing the axis of the features A and B for example from the seven features axes set by the features axis setting unit 12322, the features space LUT generating unit 12324 sections the axis of the features A and B at predetermined intervals for example, thereby forming features classes of partial spaces generated in the space stipulated by the features A and B (features space), and generates a features space LUT having the axis of the features A and B, by registering (classifying) the information of a pixel containing features A and B in the features class thereof, to the features class thereof.

Now, in the event that M versions of features space LUTs have already been generated regarding a certain processing region, and selection information is input from the user I/F 12296, i.e., the user has viewed the M output images and has selected a desired image or an image close to that desired, the features space LUT generating unit 12324 stores a weight applied to a constraint condition expression serving as a LUT value, with regard to the features class of pixels in the unsatisfactory region, in the features space LUT used for obtaining the output image which the selection information represents, instead of the processing in steps S12314 and S12315.

Upon input of selection information from the user I/F 12296 being repeated, the features space LUT generating unit 12324 deletes the features space LUT generated the previous time, stores weighting as to the features class of the pixels in the unsatisfactory region of the features space LUT used for obtaining the output image selected this time, from the M versions of features space LUTs generated this time, and finally stores the weight in the features space LUT that has been used of obtaining the output image of the image quality which the user has taken to be the best, i.e., the optimal features space LUT.

In this case, the equation generating unit 12302 can apply the weight of the constraint condition expression stored in the features space LUT to other input images as well. That is to say, in the event that another input image is newly input, the equation generating unit 12302 extracts the multiple types of features for each of the pixels within the processing region of the input image, and performs class classification of each of the pixels within the processing region based on the multiple types of features. The equation generating unit 12302 sets weighting already stored as an LUT value for a class in the features space LUT which is the same as the class of each of the pixels of the processing region obtained by class classification, as weighting for the constraint condition expression corresponding the pixels. In this case, there is no need for the user to set optimal weighting for each input image, thereby reducing the burden on the user. Also, an arrangement may be made wherein the features space LUT is newly generated or updated each time a new input image is input.

Following the processing in step S12315, the flow proceeds to step S12316, where the features space LUT generating unit 12324 determines pixels to be constrained which are to be constrained by constraint conditions, supplies these to the constraint condition expression generating unit 12325, and the flow proceeds to step S12317. That is to say, the features space LUT generating unit 12324 obtains unsatisfactory region instruction information from the user I/F 12296, determines pixels of the unsatisfactory region and pixels belonging to the same features class as those pixels to be pixels to be constrained with regard to each of the M versions of the features space LUTs generated at step S12315, and supplies the M versions of pixels to be constrained obtained by this determination, to the constraint condition expression generating unit 12325.

Now, in the event that the user does not instruct an unsatisfactory region and there is no input of unsatisfactory region instruction information from the user I/F 12296, the features space LUT generating unit 12324 determines all pixels in the processing region, for example, to be pixels to be constrained.

In step S12317, the constraint condition expression generating unit 12325 generates M versions of constraint condition expressions, which are constraint conditions corresponding to the M versions of pixels to be constrained determined in step S12315, weighted by a predetermined weighting. The constraint condition expression generating unit 12325 then supplies the generated M constraint condition expressions to the normal equation generating unit 12326.

For example, in the event that the number of pixels to be constrained is eight, and the pixel values without movement blurring of these pixels are to be represented with $Q_0$ through $Q_7$, one certain version of the constraint condition expression is represented as in the above-described Expression (154). The constraint condition expression generating unit 12325 generates the M versions of constraint condition expressions as shown in Expression (154), regarding the M features space LUTs.

Following the processing of step S12317, the flow proceeds to step S12318, where the normal equation generating unit 12326 combines the model equation supplied from the model equation generating unit 12321 with the M constraint condition expressions supplied from the constraint condition expression generating unit 12325, thereby generating M normal equations, which are supplied to the actual world waveform estimating unit 12303.

Subsequently, the actual world waveform estimating unit 12303 solves the M versions of normal equation supplied from the normal equation generating unit 12325 with the minimum norm for the least-square-error, for example, thereby obtaining the M versions of pixel values of pixels in each horizontal line within the processing region with no movement blurring.

Note that the above-described actual world estimating processing is performed for each of the pixels arrayed in the horizontal direction within the processing region (horizontal line). That is to say, the actual world waveform estimating unit 12303 obtains M pixels values without movement blurring for each of the pixels in the processing region, for each horizontal line. Following obtaining the M pixel values without movement blurring for each of the pixels in all of the horizontal lines within the processing region, the actual world waveform estimating unit 12303 supplies the M pixel values without movement blurring for each of the pixels within the processing region to the image generating unit 12294. The image generating unit 12294 generates M versions of output images wherein the pixel values of each of the pixels in the processing region of the input image have been replaced with M versions of pixel values without movement blurring, which are supplied to the image display unit 12295 and displayed.

Also, with the above-described processing, the constraint condition expression generating unit 12325 does not generate constraint condition expressions regarding other than pixels to be constrained, but constraint condition expressions regarding other than pixels to be constrained may also be generated with predetermined weighting (e.g., a weight different from the weight for pixels to be constrained) W.

Also, in the processing described above, M versions of features space LUTs were generated based on the M features axes, but the equation generating unit 12302 may set M ways for sectioning the features class classification rather than the features axis as described above, and classify pixels within the processing region into features classes based on the ways of sectioning, thereby generating M versions of features space LUTs.

FIG. 178 is a diagram describing the overview of the processing of the signal processing device 4 shown in FIG. 173.

As shown in FIG. 178, the user views the input image 12341, and instructs a region which is unsatisfactory as an unsatisfactory region. Or, the user views the input image 12341 and does not instruct an unsatisfactory region, but views the output image 12342 which the signal processing device 4 has processed based on predetermined conditions, and instructs a region which is unsatisfactory as an unsatisfactory region.

The signal processing device 4 then sets a processing region based on the unsatisfactory region instructed by the user, and extracts multiple types of features for each pixel from the image data within the processing region. The signal processing device 4 sets M versions of features axes, classifies each of the pixels into features classes from the features of the pixels, based on the M versions of features axes, and generates a features space LUT 12343. Note that while FIG. 178 only shows one features space LUT 12343, the signal processing device 4 generates M versions of features space LUTS. Here, the grids in the features space LUT 12343 represent the features classes. Also, the circle shown in the features space LUT 12343 represents an unsatisfactory pixel. Pixels of the features class at the grid with the circle are taken as pixels to be constrained. Note that in FIG. 178, unsatisfactory pixels belong to only one features class, but the features class to which unsatisfactory region pixels belong is not necessarily one. That is to say, the pixels of the unsatisfactory region may belong to multiple classes.

The signal processing device 4 determines pixels belonging to the features class of the unsatisfactory region pixels to be pixels to be constrained, for each of the M versions of features space LUTs. Further, the signal processing device 4 generates constriction condition expressions with a predetermined weight for the pixels to be constrained that have been determined from each of the M versions of features space LUTs, and displays the M output images 12344-1 through 12344-M obtained as a result. The user selects a desired image or an image close to the desired image from the M output images, and the signal processing device 4 repeats setting of M new features axes, based on the features axis used for obtaining the selected image.

Accordingly, the user can easily set optimal pixels to be constrained, thereby obtaining an image closer approximating the light signals of the actual world 1. That is to say, the user can easily obtain a desired image or an image close to the desired image. Also, a constraint condition expression is generated for pixels of the same features class of the unsatisfactory region, so the user does not need to instruct all pixels to be taken as the unsatisfactory region, thereby reducing the burden on the user.

The overview of processing with the signal processing device 4 shown in FIG. 173 will be described with reference to FIG. 179A and FIG. 179B.

IN FIG. 179A and FIG. 179B, three features A through C are extracted as multiple types of features of the pixels. In the example shown in FIG. 179A, a features space LUT 12362 takes features A as the horizontal axis and features B as the vertical axis, for the features axes thereof. Also, in the example shown in FIG. 179B, a features space LUT 12364 takes features A as the horizontal axis and features C as the vertical axis, for the features axes thereof.

As shown in FIG. 179A, the user views the input image 12361 and instructs (points) a region which is unsatisfactory as an unsatisfactory region. The signal processing device 4 sets a processing region based on the unsatisfactory region instructed by the user, and extracts the features A through C for each pixel from the input image data within the processing region. The signal processing device 4 classifies each pixel into a features class based on the features A and B of the features A through C for each pixel, and generates the features space LUT 12362.

The signal processing device 4 recognizes the features class 12263 of unsatisfactory region pixels instructed by the user, from the features space LUT 12362, and sets all the pixels classified to that features class 12363 as pixels to be constrained. Further, the signal processing device 4 generates a constraint condition expression having a predetermined weight for the pixels to be constrained, and displays the output image 12364 obtained using the constraint condition expression. Note that the circles in the circles on the output image 12364 represent pixels which have been classifies to the features class 12363 of the features space LUT 2362 and taken as pixels to be constrained.

FIG. 179B illustrates a case wherein the features space LUT 12365 has been generated based on different features axes from the case in FIG. 179A. That is to say, the signal processing device 4 generates the features space LUT 12365 based on features A as the horizontal axis and features C as the vertical axis, for the features axes thereof, and generates a constraint condition expression with all the pixels classified to the features class 12366 of the pixels in the unsatisfactory region instructed by the user, as pixels to be constrained. Note that this constraint condition expression is weighted the same as with the case in FIG. 179A. The signal processing device 4 generates and displays an output image 12367 obtained using the constraint condition expression.

In the same way as with FIG. 179A and FIG. 179B, the signal processing device 4 generates and displays M output images based on the M versions of features LUTs with different features axes. The user then selects a desired image or an image close to the desired image from the M output images, and the signal processing device 4 repeats setting M new versions of features axes based on the features axes of the features space LUT used for obtaining the selected image.

Accordingly, the user can easily set optimal pixels to be constrained, so as to obtain an image closer approximating the actual world 1 light signals. That is to say, the user is capable of easily obtaining an image of the desired image quality or an image close to the desired image quality. Also, constraint condition expressions are generated for pixels of the same features class as the unsatisfactory region, so the user does not need to instruct all pixels to be taken as unsatisfactory regions, thereby enabling reduction in the burden on the user.

FIG. 180 illustrates configuration example of a signal processing device 4 which is equivalent to the signal processing device 4 shown in FIG. 153, FIG. 161, FIG. 167, and FIG. 173.

That is to say, in FIG. 180, the processing region selecting unit 12381 corresponds, for example, to the processing region selecting unit 12071 in FIG. 153, the movement amount parameter input unit 12382 to the continuity setting unit 12072 in FIG. 153 for example, the features extracting unit 12383, features space LUT generating unit 12384, constraint condition setting unit 12385, and movement blurring removal processing unit 12386, to the actual world estimating unit 12073 in FIG. 153 for example, the output image generating unit 12387 to the image generating unit 12072 in FIG. 153 for example, the image display unit 12388 to the image display unit 12075 in FIG. 153 for example, and the user I/F 12389 to the user I/F 12076 in FIG. 153 for example, respectively.

Note that FIG. 180 illustrates the configuration example of an embodiment of the signal processing device 4 for estimating actual world 1 light signals from image data wherein movement blurring has occurred (movement blurring image data), which is an example of data 3 having continuity of moving in a predetermined direction at a predetermined speed, for example. That is to say, this signal processing device 4 estimates an image without blurring (image without movement blurring) from an image wherein a subject is taken in a blurred manner due to the subject (object) moving at the time of photography, for example (movement blurring image).

With the embodiment shown in FIG. 180, a movement blurring image, wherein movement blurring has occurred due to taking a object moving at a constant movement amount in the horizontal direction (direction from the left to right), is input to the signal processing device 4, and is supplied to the processing region selecting unit 12381, features extracting unit 12383, constraint conditions setting unit 12385, output image generating unit 12387, and image display unit 12388.

The processing region selecting unit 12381 selects (sets) a processing region from the input image, and supplies information of the processing region to the movement amount parameter input unit 12382, constraint condition setting unit 12385, and output image generating unit 12387.

The movement parameter input unit 12382 sets movement parameters representing the movement of the object (values representing movement amount), and supplies the movement amount parameters to the constraint condition setting unit 12385, Note that here, the movement parameter input unit 12382 is arranged to set movement amount representing only the magnitude of the movement of the object, assuming that the object is movement in the horizontal direction, but other arrangements may be made wherein movement vectors are set representing the magnitude and direction of movement of the object.

The features extracting unit 12383 extracts multiple types of features for each pixel from the input image, and supplies the multiple types of features to the features space LUT generating unit 12384. The features space LUT generating unit 12384 classifies each of the pixels of the input image into features classes from the multiple types of features supplied from the features extracting unit 12383, based on the M, which is multiple, types of feature axes, and generates features space LUTs. The features space LUT generating unit 12384 supplies the features space LUT to the constraint condition setting unit 12385.

The constraint condition setting unit 12385 recognizes the pixel values of pixels of each horizontal line in the processing region from the input image and the processing region information supplied from the processing region selection unit 12381, and also recognizes the movement amount of the object from the movement amount parameter supplied from the movement amount parameter input unit 12382. The constraint condition setting unit 12385 generates a relation model modeling the relation between the pixel values of each of the pixels of a horizontal line in the processing region and pixel values of pixels without movement blurring, for each horizontal line in the processing region, based on the movement amount of the object, substitutes the pixel values of each of the pixels in the horizontal lien of the processing region into the relation model, and generates model equations for each of the horizontal lines.

Also, the constraint condition setting unit 12385 sets constraint condition expressions constraining the pixel values of the pixels without movement blurring. At this time, the constraint condition setting unit 12385 sets the constraint condition expression based on the features space LUT supplied from the features space LUT generating unit 12384. The constraint condition setting unit 12385 supplies the model equations and constraint condition expressions for each horizontal line to the movement blurring removal processing unit 12386.

The movement blurring removal processing unit 12386 obtains pixel values without movement blurring regarding the pixels of each horizontal line in the processing region, by solving the model equations and constraint condition expressions supplied from the constraint condition setting unit 12385 for each horizontal line with the minimum norm for the least-square-error, thereby obtaining pixel values with no movement blurring. The movement blurring removal processing unit 12386 supplies pixel values without movement blurring for the pixels in each of the horizontal lines in the processing region to the output image generating unit 12387.

The output image generating unit 12387 recognizes the pixels of each of the horizontal lines in the processing region, from the processing region information supplied from the processing region selecting unit 12381, and generates an image, wherein the pixels of each of the horizontal lines have been replaced with pixel values without movement blurring of the pixels in each of the horizontal lines in the processing region supplied from the movement blurring removal processing unit 12386, as an output image. The output image generating unit 12387 supplies the output image to the image display unit 12388, and displays.

The image display unit 12388 displays the input image, and output images supplied from the output image generating unit 12387.

The user I/F 12389 is operated by the user, and information related to processing region and movement amount is supplied to the processing region selecting unit 12381 and the movement amount parameter input unit 12382, for example, according to the operations of the user.

That is to say, the user views the input image or output image displayed on the image display unit 12388, and operates the user I/F 12389 so as to provide input regarding the input image or output image. The user I/F 12389 supplies information for selecting a processing region to the processing regions selecting unit 12381, according to the user operations. Also, the user I/F 12389 supplies information of the movement amount of the object in the processing region, to the movement amount parameter input unit 12382, in accordance with user operations.

Further, the user I/F 12389 supplies information relating to regions for applying constraint conditions to the features space LUT generating unit 12384 and the constraint condition setting unit 12385, in order to make the constraint conditions regarding the pixels within the processing region non-uniform, according to use our operations. Also, the user I/F 12389 supplies weight instructing information for instructing weighting to the constrained conditions, to the constriction condition setting unit 12385, according to user operations.

The processing of the signal processing device 4 shown in FIG. 180 will be described with reference to the flowcharts in FIG. 181 and FIG. 182. We will say that the object is moving in the horizontal direction at a constant speed.

First, in step S12331, the signal processing device 4 acquires image signals of a movement blurring image as an input image, and supplies this to the processing region selecting unit 12381, features extracting unit 12383, constraint condition setting unit 12385, output image generating unit 12387, and image display unit 12388. The features extracting unit 12383 extract multiple types of features from each pixel in the input image, and supplies the multiple types of features to the features space LUT generating unit 12384. The features space LUT generating unit 12384 generates features space LUTs (FIG. 179A and FIG. 179B) based on the multiple versions of features axis, based on the multiple types of features supplied from the features extracting unit 12383. Further, in step S12331, the signal processing device 4 causes the image display unit 12388 to display the input image, and the flow proceeds to step S12332.

In step S12332, the user I/F 12389 determines whether or not the user has instructed the movement blurring region, i.e., whether or not the user who has viewed the input image displayed on the image display unit 12388 (movement blurring image) feels that there is movement blurring in the input image, and has operated the user I/F 12389 so as to point to a portion where there is movement blurring. In step S12332, in the event that determination is made that the user has not instructed a movement blurring region, i.e., that the user who has viewed the input image displayed on the image display unit 12388 feels that there is no movement blurring in the input image and that the image is not unsatisfactory, the flow proceeds to step S12342 in FIG. 182. In step S12342, the output image generating unit 12387 supplies the input image to the image display unit 12388, as an output image, where it is displayed.

On the other hand, in the event that determination is made in step S12332 that the user has instructed of movement blurring region, the user I/F 12389 supplies movement blurring region instruction information representing a movement blurring region which the user has instructed by operating the user I/F 12389, to the processing region selecting unit 12381, and the flow proceeds to step S12333. In step S12333, the processing regions selecting unit 12381 selects a rectangle including the movement blurring region, for example, as a processing region from the region of the input image, based on the movement blurring region instruction information supplied from the user I/F 12389, and supplies the processing region information representing that processing region to the movement amount parameter input unit 12382, constraint condition setting unit 12385, and output image generating unit 12387. Following the processing in step S12333, the flow proceeds to step S12334, where the movement amount parameter input unit 12382 inputs the movement parameters representing the movement amount of object in the processing region, to the constraint condition setting unit 12385. That is to say, for example, in the event that the user has a view to the input image (movement blurring image) displayed on the image display unit 12388, and has input movement amount of the object in the processing region by operating the user I/F 12389, the movement amount parameter input unit 12382 supplies movement amount parameters representing the movement amount input from the user I/F 12389, to the constraint condition setting unit 12385. Also, the movement amount parameter input unit 12382 detects the movement amount of object in the processing region, and supplies parameters representing the movement amount to the constraint condition setting unit 12385. The constraint condition setting unit 12385 generates and stores, for each horizontal line in the processing region, a relation model modeling the relation between the pixel values of each pixel in the horizontal line in the processing region and the pixel values of pixels without movement blurring, based on the movement amount parameters and the processing region information supplied from the processing region selecting unit 12381, and the flow proceeds from step S12334 to step S12335.

In step S12335, the user I/F 12389 determines whether or not the flat region has been instructed by the user from movement blurring image which is an input image. In the event that determination is made by the user I/F 12389 in step S12335 that a flat region has been instructed from the movement blurring image, by the user operating the user I/F 12389, i.e., that the user has viewed the input image and has instructed a flat region where an image without movement blurring within the processing region is estimated to be flat, the flow proceeds to step S12336, and the user I/F 12389 supplies flat region instructing information representing the flat region which the user has instructed by operating the user I/F 12389, to the constraint condition setting unit 12385.

Following the processing in step S12336, the flow proceeds to step S12337, where the features space LUT generating unit 12384 selects, from the generated multiple features space LUTS, the features space LUT selected by the user operating the user I/F 12389, for example, and supplies this to the constraint condition setting unit 12385, and the flow proceeds to step S12339. That is to say, in step S12337, a button corresponding to the multiple features space LUTs generated by the features space LUT generating unit, 12384, are displayed on the image display unit 12388. Upon the user clicking, or the like, on the button displayed on the image display unit 12388, by operating the user I/F 12389, selects the features space LUT corresponding to the selected button. In step S12339, the constraint condition setting unit 12385 recognizes the flat region within the processing region, from the flat region instruction information supplied from the user I/F 12389. Further, the constraint condition setting unit 12385 recognizes pixels of the processing region having the same features class as the pixels of the flat region, from the features space LUT supplied from the features space LUT generating unit 12384. The constraint condition setting unit 12385 generates constraint condition expressions for each horizontal line in the processing region, with regard to pixels to be constrained, which are pixels and the flat region, and pixels of the same features class as the pixels of the flat region, and supplies the constraint condition expressions to the movement blurring removal unit 12386, and the flow proceeds to step S12340 in FIG. 182. For example, in the event that there are only six pixels to be constrained which are arrayed in the horizontal direction, and $Q_0$ through $Q_5$ represents the pixel values without movement blurring of each of these pixels, the constraint condition expression is as indicated by the above-described Expression (153).

On the other hand, in the event that the user I/F 12389 has determined in step S12335 of FIG. 181 that there has been no instruction of flat region from the movement blurring image, the flow proceeds to step S12338, and determination is made regarding whether and unsatisfactory region has been instructed for the output image, i.e., the user has viewed the output image displayed on the image display unit 12388 in the previous step S12342 (FIG. 182) and found this unsatisfactory, and has instructed the region found unsatisfactory by operating the user I/F 12389. In step S12338, in the event that the user I/F 12389 has determined that there has been no instruction of unsatisfactory region in the output image, the flow proceeds to step S12339. In this case, the user has instructed neither flat region nor unsatisfactory region, so in step S12339 the constraint condition setting unit 12385 generates constraint condition equations for each horizontal line with regard to pixels to be constraint, wherein all pixels in the processing region are taken as pixels to be constrained, for example.

The constraint condition setting unit 12385 supplies the constraint condition expression is to the movement blurring removal processing unit 12386, and the flow proceeds from step S12339 to step S12340 in FIG. 182. For example, in the event that there are eight pixels in the horizontal line, and $Q_0$ through $Q_7$ represents the pixel values without movement blurring of each of these pixels, the constraint condition expression is as indicated by the above-described Expression (152).

In step S12340, the constraint condition setting unit 12385 recognizes the pixel values of the pixel in each of the horizontal lines in the processing region of the input image, from the processing region information supplied from the processing region selecting unit 12381 and the input image. Also, in step S12340, the constraint condition setting unit 12385 substitutes the pixel values of the pixels in each horizontal line of the processing region in the input image into the relation model generated and stored in step S12334, thereby generating the model equations shown in Expression (151). The constraint condition setting unit 12385 then supplies the model equations to the movement blurring removal processing unit 12386.

Following the processing in step S12340, the flow proceeds to step S12341, where the constraint condition setting unit 12385 performs movement blurring removal processing. That is to say, the movement blurring removal processing unit 12386 uses the constraint condition expression supplied from the constraint condition setting unit 12385 and the model equations, to generate normal equations for each of the horizontal lines in the processing region. Further, the movement blurring removal processing unit 12386 solves the normal equations with the minimum norm of the least-square-error, thereby obtaining pixel values was no movement blurring in the pixels of each of the horizontal lines in the processing region. The movement blurring removal processing unit 12386 supplies the pixel values without movement blurring in each of the horizontal lines of the processing region to the output image generating unit 12387, and the flow proceeds from step S12241 to step S12342.

In step S12342, the output image generating unit 12387 recognizes the pixels of each horizontal line in the processing region from the processing region information supplied from the processing regions selecting unit 12381, and replaces the pixel values of the pixels in each of the horizontal lines in the processing region with pixel values without movement blurring that supplied from the movement blurring removal processing unit 12386, thereby generating an output image. Further, in step S12342, the output image generating unit 12387 supplies and displays the output image at the image display unit 12388, and the flow proceeds to step S12351.

On the other hand, in step S12338 in FIG. 181, in the event that the user I/F 12389 determines that an unsatisfactory region in the output image has been instructed, the flow proceeds to step S12343, where unsatisfactory region instructing information representing the unsatisfactory region instructed by the user operating the user I/F 12389 is supplied to the constraint condition setting unit 12385, and the flow proceeds to step S12344. In step S12344, the constraint condition setting unit 12385 sets N versions of weights as to the constraint condition expressions at the pixels of the unsatisfactory region, and the flow proceeds to step S12345. In step S12345, the features space LUT generating unit 12384 chooses a features space LUT selected by the user operating the user I/F 12389, in the same way as with step S12337, for example, from the multiple features space LUTs generated, and supplies the features space LUT to the constraint condition setting unit 12385, in the same way as with the case of step S12337, for example.

Following the processing in step S12345, the flow proceeds to step S12346, where the constraint condition setting unit 12385 recognizes the unsatisfactory region from the unsatisfactory region instruction information supplied from the user I/F 12389, and also recognizes the processing region from the processing region information supplied from the processing region selecting unit 12381. The constraint condition setting unit 12385 recognizes pixels of the same features class as the pixels in the unsatisfactory region, out of the pixels in the processing region, from the features space LUT supplied from the features space LUT generating unit 12384, and takes these as pixels to be constrained. The constraint condition setting unit 12385 then uses the N weights set in step S12344, so as to generate constraint condition expressions for the pixels to be constrained, weighted in N different ways, for each of the horizontal lines. The constraint condition setting unit 12385 supplies the N versions of constraint condition expressions to the movement blurring removal processing unit 12386, and the flow proceeds to step S12347 in FIG. 182.

For example, in the event that there are only eight pixels to be constrained at arrayed in the horizontal direction, and the pixel values without movement blurring of each of the pixels is represented with $Q_0$ through $Q_7$, one version of constraint condition expressions is as in the above-described Expression (154), wherein W represents one version of W as to the constraint condition expressions. The constraint condition setting unit 12385 generates N versions of expressions with different weights W in the constraint condition expression of Expression (154).

In step S12347, the constraint condition setting unit 12385 recognizes the pixel values of the pixels in each horizontal line of the processing region in the input image, from the processing region information supplied from the processing regions selecting unit 12381 and the input image. Also, in step S12347, the constraint condition setting unit 12385 substitutes the pixel values and the pixels of each of the horizontal lines in the processing region of the input image into the relation model generated in stored in step S12334, thereby generating the model equations of Expression (151) for each horizontal line. The constraint condition setting unit 12385 then supplies the model equations to the movement blurring removal processing unit 12386.

Following the processing in step S12347, the flow proceeds to step S1248, where the constraint condition setting unit 12385 performs movement blurring removal processing. That is to say, the movement blurring removal processing unit 12386 generates N versions of normal equations for each of the horizontal lines in the processing region, from each of the N versions of constraint condition expressions supplied from the constraint condition setting unit 12385 and the model equation, and solves the N normal equations with minimum norm of the least square error, thereby obtaining N versions of pixel values without movement blurring, regarding the pixels in each of the horizontal lines of the processing region. The movement blurring removal processing unit 12386 then supplies the N versions of pixel values without movement blurring to the output image generating unit 12387, and the flow proceeds from step S12348 to step S12349.

In step S12349, the output image generating unit 12387 recognizes the pixels of each horizontal line in the processing region, from the processing region information supplied from the processing region selecting unit 12381, and substitutes the pixel values of the pixels in each horizontal line of the processing region with the N versions of pixel values without movement blurring supplied from the movement blurring removal processing unit 12386, thereby generating N versions of output images. Further, in step S12349, the output image generating unit 12387 supplies and displays the N versions of output images at the image display unit 12388, and the flow proceeds to step S12350.

In step S12350, the user I/F 12389 determines whether or not an output image has been selected by the user. That is to say, in step S12349, N versions of output images are displayed on the image display unit 12388, and determination is made in step S12350 regarding whether or not the user who has viewed the N versions of output images has selected, from the N versions of output images, an image of a desired image quality or an image close to the desired image quality. In the event that the user I/F 12389 determines in step S12350 that the user has not selected an output image, the flow stands by until the user selects an output image.

In the event that determination is made in step S12350 by the user I/F 12389 that the user has selected an output image, the flow proceeds to step S12351.

In step S12351, determination is made by the user I/F 12389 regarding whether or not there is dissatisfaction with image within the processing region. That is to say, determination is made in step S12351 regarding whether or not the user has viewed the output image displayed on the image display unit 12388 in step S12342 or the output image selected in step S12350, found the image within the processing regions selected in step S12333 to be unsatisfactory, and operated the user I/F 12389 so as to indicate dissatisfaction. In the event that determination is made in step S12351 by the user I/F 12389 that there is dissatisfaction with the image within the processing region, the flow returns to step S12335 in FIG. 181, and the above-described processing is repeated. Note that in this case, in step S12344 performed next, N new versions of weights are set based on the weighting of the constraint condition expression used for obtaining the output image selected in the immediately-preceding step S12350.

Accordingly, upon the user selecting the a desired one from the N output images output from the processing of the previous time, N new weights are set based on the selection results, so by the user repeating selection of a desired ones from the N versions of output images, finally, a weight is set whereby a an output image of the image quality which the user desires can be obtained. Consequently, the user can obtain an output image wherein the portion of the processing region of the input image has been made into an image with image quality of that desired or an image close to desired image quality.

On the other hand, in step S12351, in the event that determination is made by the user I/F 12389 that there is no dissatisfaction with the image within the processing region, the flow proceeds to step S12352, and determination is made regarding whether or not another movement blurring region has been instructed. That is to say, determination is made in step S12352 regarding whether or not the user has viewed the output image displayed in step S12342 or the output image selected in step S12350, felt that there is movement blurring in the image other than in the processing region, and instructed the region with movement blurring by operating the user I/F 12389. In the event that the user I/F 12389 determines in step S12352 that there has been instruction of another movement blurring region, the flow returns to step S12333, and repeats the above-described processing. That is to say, the signal processing device 4 performs processing regarding the new movement blurring region. Note that in this case, processing is performed with the output image displayed in the immediately-preceding step S12342 or the output image selected in step S12350 as the input image, or, with an image wherein the processing region of the input image has been replaced with pixel values ultimately obtained with regard to that processing region, as the input image. Also, in the event that determination is made in step S12352 by the user I/F 12389 that another movement blurring region has not been instructed, this means that the user is satisfied with output image, so the processing ends.

Other processing of the signal processing device shown in FIG. 180 will be described with reference to the flowcharts in FIG. 183 and FIG. 184. We will say that the object is moving in the horizontal direction at a constant speed.

First, in step S12371, the signal processing device 4 acquires image signals of a movement blurring image as an input image, and supplies this to the processing region selecting unit 12381, features extracting unit 12383, constraint condition setting unit 12385, output image generating unit 12387, and image display unit 12388. The features extracting unit 12383 extract multiple types of features from each pixel in the input image, and supplies the multiple types of features to the features space LUT generating unit 12384. The features space LUT generating unit 12384 generates features space LUTs (FIG. 179A and FIG. 179B) based on the multiple versions of features axes, based on the multiple types of features supplied from the features extracting unit 12383. Further, in step S12371, the signal processing device 4 causes the image display unit 12388 to display the input image, and the flow proceeds to step S12372.

In step S12372, the user I/F 12389 determines whether or not the user has instructed the movement blurring region, i.e., whether or not the user who has viewed the input image displayed on the image display unit 12388 (movement blurring image) feels that there is movement blurring in the input image, and has operated the user I/F 12389 so as to point to a portion where there is movement blurring. In step S12372, in the event that determination is made that the user has not instructed a movement blurring region, i.e., that the user who has viewed the input image displayed on the image display unit 12388 feels that there is no movement blurring in the input image and that the image is not unsatisfactory, the flow proceeds to step S12382 in FIG. 184. In step S12382, the output image generating unit 12387 supplies the input image to the image display unit 12388, as an output image, where it is displayed.

On the other hand, in the event that determination is made in step S12372 that the user has instructed of movement blurring region, the user I/F 12389 supplies movement blurring region instruction information representing a movement blurring region which the user has instructed by operating the user I/F 12389, to the processing region selecting unit 12381, and the flow proceeds to step S12373. In step S12373, the processing regions selecting unit 12381 selects a rectangle including the movement blurring region, for example, as a processing region from the region of the input image, based on the movement blurring region instruction information supplied from the user I/F 12389, and supplies the processing region information representing that processing region to the movement amount parameter input unit 12382, constraint condition setting unit 12385, and output image generating unit 12387.

Following the processing in step S12373, the flow proceeds to step S12374, where the movement amount parameter input unit 12382 inputs movement parameters representing the movement amount of object in the processing region, to the constraint condition setting unit 12385. That is to say, for example, in the event that the user has a view to the input image (movement blurring image) displayed on the image display unit 12388, and has input movement amount of the object in the processing region by operating the user I/F 12389, the movement amount parameter input unit 12382 supplies movement amount parameters representing the movement amount input from the user I/F 12389, to the constraint condition setting unit 12385. Also, the movement amount parameter input unit 12382 detects the movement amount of object in the processing region, and supplies parameters representing the movement amount to the constraint condition setting unit 12385. The constraint condition setting unit 12385 generates and stores, for each horizontal line in the processing region, a relation model modeling the relation between the pixel values of each pixel in the horizontal line in the processing region and the pixel values of pixels without movement blurring, based on the movement amount parameters and the processing region information supplied from the processing region selecting unit 12381, and the flow proceeds from step S12374 to step S12375.

In step S12375, the user I/F 12389 determines whether or not the flat region has been instructed by the user from movement blurring image which is an input image. In the event that determination is made by the user I/F 12389 in step S12375 that a flat region has been instructed from the movement blurring image, by the user operating the user I/F 12389, i.e., that the user has viewed the input image and has instructed a flat region where an image without movement blurring within the processing region is estimated to be flat, the flow proceeds to step S12376, and the user I/F 12389 supplies flat region instructing information representing the flat region which the user has instructed by operating the user I/F 12389, to the constraint condition setting unit 12385.

Following the processing in step S12376, the flow proceeds to step S12377, where the features space LUT generating unit 12384 selects, from the generated multiple features space LUTS, the features space LUT selected by the user operating the user I/F 12389, for example, and supplies this to the constraint condition setting unit 12385, and the flow proceeds to step S12339. That is to say, in step S12377, a button corresponding to the multiple features space LUTs generated by the features space LUT generating unit 12384, are displayed on the image display unit 12388. Upon the user clicking, or the like, on the button displayed on the image display unit 12388, by operating the user I/F 12389, the features space LUT corresponding to the selected button is selected in step S12377.

In step S12379, the constraint condition setting unit 12385 recognizes the flat region within the processing region, from the flat region instruction information supplied from the user I/F 12389. Further, the constraint condition setting unit 12385 recognizes pixels of the processing region having the same features class as the pixels of the flat region, from the features space LUT supplied from the features space LUT generating unit 12384. The constraint condition setting unit 12385 generates constraint condition expressions for each horizontal line in the processing region, with regard to pixels to be constrained, which are pixels and the flat region, and pixels of the same features class as the pixels of the flat region, and supplies the constraint condition expressions to the movement blurring removal unit 12386, and the flow proceeds to step S12380 in FIG. 184. For example, in the event that there are only six pixels to be constrained which are arrayed in the horizontal direction, and $Q_0$ through $Q_5$ represents the pixel values without movement blurring of each of these pixels, the constraint condition expression is as indicated by the above-described Expression (153).

On the other hand, in the event that the user I/F 12389 has determined in step S12375 of FIG. 181 that there has been no instruction of flat region from the movement blurring image, the flow proceeds to step S12378, and determination is made regarding whether and unsatisfactory region has been instructed for the output image, i.e., the user has a view would the output image displayed on the image display unit 12388 in the previous step S12382 (FIG. 184) and found this unsatisfactory, and has instructed the region found unsatisfactory by operating the user I/F 12389. In step S12378, in the event that the user I/F 12389 has determined that there has been no instruction of unsatisfactory region in the output image, the flow proceeds to step S12379. In this case, the user has instructed neither flat region nor unsatisfactory region, so in step S12379 the constraint condition setting unit 12385 generates constraint condition expressions for each horizontal line with regard to pixels to be constraint, wherein all pixels in the processing region are taken as pixels to be constrained, for example.

The constraint condition setting unit 12385 supplies the constraint condition expressions to the movement blurring removal processing unit 12386, and the flow proceeds from step S12379 to step S12380 in FIG. 184. For example, in the event that there are eight pixels in the horizontal line, and $Q_0$ through $Q_7$ represents the pixel values without movement blurring of each of these pixels, the constraint condition expression is as indicated by the above-described Expression (152).

In step S12380, the constraint condition setting unit 12385 recognizes the pixel values of the pixel in each of the horizontal lines in the processing region of the input image, from the processing region information supplied from the processing region selecting unit 12381 and the input image. Also, in step S12380, the constraint condition setting unit 12385 substitutes the pixel values of the pixels in each horizontal line of the processing region in the input image into the relation model generated and stored in step S12384, thereby generating the model equations shown in Expression (151). The constraint condition setting unit 12385 and then supplies the model equations to the movement blurring removal processing unit 12386.

Following the processing in step S12380, the flow proceeds to step S12381, where the constraint condition setting unit 12385 performs movement blurring removal processing. That is to say, the movement blurring removal processing unit 12386 uses the constraint condition expression supplied from the constraint condition setting unit 12385 and the model equations, to generate normal equations for each of the horizontal lines in the processing region. Further, the movement blurring removal processing unit 12386 solves the normal equations with the minimum norm of the least-square-error, thereby obtaining pixel values was no movement blurring in the pixels of each of the horizontal lines in the processing region. The movement blurring removal processing unit 12386 supplies the pixel values without movement blurring in each of the horizontal lines of the processing region to the output image generating unit 12387, and the flow proceeds from step S12381 to step S12382.

In step S12382, the output image generating unit 12387 recognizes the pixels of each horizontal line in the processing region from the processing region information supplied from the processing regions selecting unit 12381, and replaces the pixel values of the pixels in each of the horizontal lines in the processing region with pixel values without movement blurring that supplied from the movement blurring removal processing unit 12386, thereby generating an output image. Further, in step S12382, the output image generating unit 12387 supplies and displays the output image at the image display unit 12388, and the flow proceeds to step S12391.

On the other hand, in step S12378 in FIG. 183, in the event that the user I/F 12389 determines that an unsatisfactory region in the output image has been instructed, the flow proceeds to step S12383, where unsatisfactory region instructing information representing the unsatisfactory region instructed by the user operating the user I/F 12389 is supplied to the constraint condition setting unit 12385, and the flow proceeds to step S12384. In step S12384, the constraint condition setting unit 12385 sets a predetermined weight as to the constraint condition expression at the pixels of the unsatisfactory region, and the flow proceeds to step S12385. Note that the weighting may be set by the user operating the user I/F 12389.

In step S12385, the features space LUT generating unit 12384 chooses M versions of features space LUTs from the features space LUTs generated, and supplies the M versions of features space LUTs to the constraint condition setting unit 12385.

Following the processing in step S12385, the flow proceeds to step S12386, where the constraint condition setting unit 12385 recognizes the unsatisfactory region from the unsatisfactory region instruction information supplied from the user I/F 12389, and also recognizes the processing region from the processing region information supplied from the processing region selecting unit 12381. The constraint condition setting unit 12385 recognizes pixels of the same features class as the pixels in the unsatisfactory region, out of the pixels in the processing region, from the M versions of features space LUTs supplied from the features space LUT generating unit 12384, and takes these as pixels to be constrained. Accordingly, the constraint condition setting unit 12385 recognizes M versions of pixels to be constrained for each horizontal line. The constraint condition setting unit 12385 then uses the predetermined weight set in step S12384, so as to generate M versions of constraint condition expressions for the pixels to be constrained, for each of the horizontal lines. The constraint condition setting unit 12385 supplies the M versions of constraint condition expressions to the movement blurring removal processing unit 12386, and the flow proceeds to step S12387 in FIG. 184.

For example, in the event that there are only eight pixels to be constrained at arrayed in the horizontal direction, and the pixel values without movement blurring of each of the pixels is represented with $Q_0$ through $Q_7$, one version of constraint condition expressions is as in the above-described Expression (154), wherein W represents one version of W as to the constraint condition expressions. Accordingly, the constraint condition setting unit 12385 generates M versions of expressions in the constraint condition expression of Expression (154) as to the M versions of pixels to be constrained.

In step S12387, the constraint condition setting unit 12385 recognizes the pixel values of the pixels in each horizontal line of the processing region in the input image, from the processing region information supplied from the processing regions selecting unit 12381 and the input image. Also, in step S12387, the constraint condition setting unit 12385 substitutes the pixel values and the pixels of each of the horizontal lines in the processing region of the input image into the relation model generated in stored in step S12374, thereby generating the model equations of Expression (151) for each horizontal line. The constraint condition setting unit 12385 then supplies the model equations to the movement blurring removal processing unit 12386.

Following the processing in step S12387, the flow proceeds to step S12388, where the constraint condition setting unit 12385 performs movement blurring removal processing. That is to say, the movement blurring removal processing unit 12386 generates M versions of normal equations for each of the horizontal lines in the processing region, from each of the M versions of constraint condition expressions supplied from the constraint condition setting unit 12385 and from the model equation, and solves the M normal equations with minimum norm of the least square error, thereby obtaining M versions of pixel values without movement blurring, regarding the pixels in each of the horizontal lines of the processing region. The movement blurring removal processing unit 12386 then supplies the N versions of pixel values without movement blurring to the output image generating unit 12387, and the flow proceeds from step S12388 to step S12389.

In step S12389, the output image generating unit 12387 recognizes the pixels of each horizontal line in the processing region, from the processing region information supplied from the processing region selecting unit 12381, and substitutes the pixel values of the pixels in each horizontal line of the processing region with the M versions of pixel values without movement blurring supplied from the movement blurring removal processing unit 12386, thereby generating M versions of output images. Further, in step S12389, the output image generating unit 12387 supplies and displays the M versions of output images at the image display unit 12388, and the flow proceeds to step S12390.

In step S12390, the user I/F 12389 determines whether or not an output image has been selected by the user. That is to say, in step S12389, M versions of output images are displayed on the image display unit 12388, and determination is made in step S12390 regarding whether or not the user who has viewed the M versions of output images has selected, from the M versions of output images, an image of a desired image quality or an image close to the desired image quality. In the event that the user I/F 12389 determines in step S12390 that the user has not selected an output image, the flow stands by until the user selects an output image.

In the event that determination is made in step S12390 by the user I/F 12389 that the user has selected an output image, the flow proceeds to step S12391.

In step S12391, determination is made by the user I/F 12389 regarding whether or not there is dissatisfaction with image within the processing region. That is to say, determination is made in step S12391 regarding whether or not the user has viewed the output image displayed on the image display unit 12388 in step S12382 or the output image selected in step S12390, found the image within the processing regions selected in step S12373 to be unsatisfactory, and operated the user I/F 12389 so as to indicate dissatisfaction. In the event that determination is made in step S12391 by the user I/F 12389 that there is dissatisfaction with the image within the processing region, the flow returns to step S12375 in FIG. 183, and the above-described processing is repeated. Note that in this case, in step S12385 performed next, M new versions of feature axes are selected based upon the features axes of the features space LUT used for obtaining the output image selected in the immediately-preceding step S12390, and the features space LUT having the M versions of features axes is selected.

Accordingly, upon the user selecting the a desired one from the M output images output from the processing of the previous time, M new features axes are set based on the selection results, so by the user repeating selection of a desired ones from the M versions of output images, finally, features axes are set whereby a an output image of the image quality which the user desires can be obtained. Consequently, the user can obtain an output image wherein the portion of the processing region of the input image has been made into an image with image quality of that desired or an image close to desired image quality.

On the other hand, in step S12391, in the event that determination is made by the user I/F 12389 that there is no dissatisfaction with the image within the processing region, the flow proceeds to step S12392, and determination is made regarding whether or not another movement blurring region has been instructed. That is to say, determination is made in step S12392 regarding whether or not the user has viewed the output image displayed in step S12382 or the output image selected in step S12390, felt that there is movement blurring in the image other than in the processing region, and instructed the region with movement blurring by operating the user I/F 12389. In the event that the user I/F 12389 determines in step S12392 that there has been instruction of another movement blurring region, the flow returns to step S12373, and repeats the above-described processing. That is to say, the signal processing device 4 performs processing regarding the new movement blurring region. Note that in this case, processing is performed with the output image displayed in the immediately-preceding step S12382 or the output image selected in step S12390 as the input image, or, with an image wherein the processing region of the input image has been replaced with pixel values ultimately obtained with regard to that processing region, as the input image.

Also, in the event that determination is made in step S12392 by the user I/F 12389 that another movement blurring region has not been instructed, this means that the user is satisfied with output image, so the processing ends.

Also, an arrangement maybe made wherein the processing in the flowchart shown in FIG. 181 and FIG. 182 is combined with the processing of flowchart shown in FIG. 183 and FIG. 184. That is to say, in the event that the user has viewed the output image and instructed an unsatisfactory region, the constraint condition setting unit 12385 sets N versions of weights as to the constraint condition expressions for the pixels to be constrained, and also recognizes M versions of pixels to be constrained based on M versions of features space LUTs, so as to generate a total of N times M versions of output images. Also, in the event that the user has viewed the output image and instructed an unsatisfactory region, the constraint condition setting unit 12385 may alternately perform setting of N versions of weights for the constraint conditions of the unsatisfactory region so as to generate N output images, and recognizing of M versions of pixels to be constrained based on the M feature space LUTs, thereby generating M output images.

FIG. 185 through FIG. 194 are diagrams describing examples of the signal processing device 4 shown in FIG. 180 carrying out combinations of the processing in the flowchart shown in FIG. 181 and FIG. 182, and the processing of flowchart shown in FIG. 183 and FIG. 184.

In these examples, the user instructs a processing region from the input image and further instructs a region wherein the movement blurring image is estimated to be flat. The user then views the output image which is the processing results, instructs unsatisfactory regions, and obtains two versions of output images as the results of processing again. Further, the user selects the image which is closer to the desired image from the to output images, and obtains four versions of output images processed based on the selection results. Finally, the user selects desired image or an image close to the desired image from the four versions of output images.

Now, let us say here that the true value of movement amount parameters is to be provided to the signal processing device 4.

FIG. 185 illustrates a state wherein the user who has viewed the input image has instructed a processing region. The input image shown in FIG. 185 is obtained in by photographing an instant wherein a (toy) airplanes moves horizontal the from the left to the right of the screen. As shown in FIG. 185, the edge portion (outline portion) such as the letters "TAL" are not sharp due to movement blurring. Here, the user has instructed the region of the rectangle surrounding the portion where the letters "TAL" are displayed, as a processing region.

FIG. 186 is an example where an the user who has viewed the input image shown in FIG. 185, has pointed to a portion wherein an image without movement blurring is estimated to be flat, as a flat region. Here, the portion marked with an X in the image shows the position where user has pointed to instruct the flat region, and in FIG. 186, the region of the rectangle surrounding the right side of the letter "L" including the position appointed by the user, is set as a flat region. Also, in FIG. 186, the image surrounded with the square at the upper left side of the image is an image wherein the perimeter of the region which the user has instructed has been enlarged, with the portion surrounded by the rectangle being the flat region set by the user pointing. FIG. 187 illustrates an output image as the processing results obtained by the signal processing device 4 performing processing of the input image shown in FIG. 185 without instructions of the flat region from the user. That is to say, the signal processing device 4 performs step S12331 through step S12335, and step S12338 through step S12342, in FIG. 181 and FIG. 182, and the output image shown in FIG. 187 is displayed on the image display unit 12388. In this case, constraint condition expressions are generated for all pixels in the processing region. With the output image shown in FIG. 187, movement blurring is reduced as compared with the input image shown in FIG. 185 or FIG. 186, and the letters "TAL" are clearer.

FIG. 188 illustrates an output image as the processing results obtained by the signal processing device 4 performing processing of the input image shown in FIG. 185 in a case wherein the user has instructed a flat region, based on the flat region. That is to say, the signal processing device 4 performs step S12331 through step S12337, and step S12339 through step S12342, in FIG. 181 and FIG. 182, and the output image shown in FIG. 188 is displayed on the image display unit 12388. In this case, constraint condition expressions are generated for only the flat region pixels. With the output image shown in FIG. 188, as with the case in FIG. 187, movement blurring is reduced, and the letters "TAL" are clearer. Moreover, the image quality of the edge portion and flat portion has improved in the output image in FIG. 188 as compared to the case in FIG. 187.

FIG. 189 is a diagram illustrating a state wherein the user has instructed an unsatisfactory region in the output image shown in FIG. 188. That is to say, the user has instructed a region in the output image where the image quality without movement blurring differs from that imagined (image quality has deteriorated) as an unsatisfactory region. In the case of the example in FIG. 189, the user has instructed the white deteriorated portion near the right side of the "L" of the letters "TAL" as an unsatisfactory region. That is to say, the portion of the rectangle in the diagram is the region instructed as the unsatisfactory region.

FIG. 190A and FIG. 190B show output images obtained by the signal processing device 4 performing processing based on the unsatisfactory region instructed by the user as shown in FIG. 189. That is to say, the signal processing device 4 performs steps S12331 through step S12335, step S12338, and steps S12343 through step S12349, in FIG. 181 and FIG. 182, and displays the output images shown in FIG. 190A and FIG. 190B on the image display unit 12388.

With FIG. 190A and FIG. 190B, the signal processing device 4 generates constraint condition expressions with two versions of weighting, for the unsatisfactory region instructed by the user, and displays the two versions of output images obtained by perform processing using the two versions of constraint condition expressions. Here, the image surrounded by the square (FIG. 190A) shows the image selected by the user.

FIG. 191A through FIG. 191D show output images obtained by processing the image selected from FIG. 190A and FIG. 190B again. That is to say, the following the processing of steps S12331 through step S12335, step S12338, and steps S12343 through step S12351 in FIG. 181 and FIG. 182, the signal processing device 4 performs the processing of step S12375, step S12378, and steps S12383 through step S12389, and displays the output images of FIG. 191A through FIG. 191D on the image display unit 12388.

With FIG. 191A through FIG. 191D, the signal processing device 4 determines how to reflect the constraint conditions in the unsatisfactory region instructed by the user to the regions other than the unsatisfactory region in the processing region, so features space LUTs are generated based on four versions of features axes from the multiple types of features of the input image, and four versions of the output images are generated and displayed, based on the four versions of features space LUTs.

The user selects an image of the desired image quality or an image close to the desired image quality from the four output images. Here, the image surrounded by the square (this FIG. 191D) shows the image selected by the user.

FIG. 192 is a diagram wherein the letters "TAL" of the input image shown in FIG. 185 have been enlarged.

FIG. 193 shows an output image obtained from the signal processing device 4 in the case wherein the user has not instructed a flat region and unsatisfactory region. As shown in FIG. 193, movement blurring is reduced (removed) from the output image, and the letters "TAL" are clear.

FIG. 194 illustrates an output image obtained from the signal processing device 4 in the case wherein the user has instructed and of flat region one time and unsatisfactory regions two times for the input image shown in FIG. 192. With the output image shown in FIG. 194, the letters "TAL" are clear in comparison with the output image shown in FIG. 193. Further, in the output image shown in FIG. 194, the image quality of the white flat region to the side of the letter "L" has improved over the case in FIG. 193.

Now, while description has been made above regarding weighting constraint condition expressions and changing the weighting, weighting may also be applied not only to constraint condition expressions but also to model equations, with the weighting thereof being changed.

The above-described embodiments include, besides embodiments of the invention described in the claims, embodiments regarding the first throughout sixth signal processing devices given below.

A first signal processing device comprises: processing region setting means for setting the processing region within data, wherein light signals of the real world have been projected on a plurality of pixels each having time integration effects and a part of the continuity of the real world light signals has been lost; movement vector setting means for setting movement vectors of an object within the image data corresponding to the continuity of the real world light signals of which a part of the continuity has been lost in the image data; model generating means for modeling the region between pixel values of each of the pixels within the processing region and pixel values of each of the pixels where there is no movement blurring, with the understanding that the pixel values of each of the pixels within the processing region are values obtained by pixel values of each of the pixels without movement blurring as to the object being integrated while moving corresponding to a movement vector; normal equation generating means for generating normal equations from a first equation wherein the pixel values of the pixels within the processing region have been substituted into a model generated by the model generating means, and a second equation for constraining the relation between the pixels where there is no movement blurring; weight changing means for changing the weighting as to a part of the first or second equations according to user input; and actual world estimating means for estimating the pixel values of each of the pixels where there is no movement blurring, by computing the normal equations generated from the first or second equations of which the weighting has been changed by the weight changing means.

A second signal processing device, which in addition to the features of the first signal processing device, further comprises: display means for displaying at least one of the pixel values of the pixels within the processing region, and the pixel values of the pixels within movement blurring; wherein the weight changing means change the weighting of the first or second equation, corresponding to user input, for the pixel values of each of the pixels displayed on the display means.

A third signal processing device, wherein, in addition to the features of the second signal processing device, the weight changing means change the weighting so that the weighting of the first or second equations corresponding to pixels according to user input increases, and wherein the actual world estimating means estimate the pixel values of pixels without movement blurring by computing the normal equation generated from the first or second equations of which the weight has been changed.

A fourth signal processing device, wherein, in addition to the features of the second signal processing device, the weight changing means set a plurality of weights for the first or second equations corresponding to pixels according to user input, and wherein the actual world estimating means estimate a plurality of pixel values of pixels without movement blurring by computing each of the plurality of normal equations generated from the first or second equations of which a plurality of weights have been set, and wherein the display means display the plurality of pixel values of the pixels without movement blurring, estimated by the actual world estimating means.

A fifth signal processing device, which in addition to the features of the second signal processing device, further comprises: features detecting means for detecting pixel features according to user input; and pixel extracting means for extracting pixels having features similar to the features detected by the features detecting means; wherein the weight changing means change the weighting so that the weighting of the first or second equations corresponding to pixels according to user input increases, and wherein the actual world estimating means estimate the pixel values of pixels without movement blurring by computing the normal equation generated from the first or second equations of which the weight has been changed.

A sixth signal processing device, which in addition to the features of the second signal processing device, further comprises: features detecting means for detecting a plurality of pixel features according to user input; and pixel extracting means for extracting pixels having features similar to each of the plurality of features detected by the features detecting means; wherein the weight changing means change the weighting of the first or second equations corresponding to pixels having features similar to the plurality of types of features, and wherein the actual world estimating means estimate a plurality of pixel values of pixels without movement blurring by computing each of the plurality of normal equations generated from the first or second equations of which the weighting has been changed regarding each of the plurality of types of features, and wherein the display means display the plurality of pixel values of the pixels without movement blurring, estimated by the actual world estimating means.

The above-described embodiments also include embodiments regarding signal processing methods, programs, and recording mediums, given below.

A signal processing method, program, and recording medium, comprise: a processing region setting step for setting the processing region within data, wherein light signals of the real world have been projected on a plurality of pixels each having time integration effects and a part of the continuity of the real world light signals has been lost; a movement vector setting step for setting movement vectors of an object within the image data corresponding to the continuity of the real world light signals of which a part of the continuity has been lost in the image data; a model generating step for modeling the region between pixel values of each of the pixels within the processing region and pixel values of each of the pixels where there is no movement blurring, with the understanding that the pixel values of each of the pixels within the processing region are values obtained by pixel values of each of the pixels without movement blurring as to the object being integrated while moving corresponding to a movement vector; a normal equation generating step for generating normal equations from a first equation wherein the pixel values of the pixels within the processing region have been substituted into a model generated in the model generating step, and a second equation for constraining the relation between the pixels where there is no movement blurring; a weight changing step for changing the weighting as to a part of the first or second equations according to user input; and an actual world estimating step for estimating the pixel values of each of the pixels where there is no movement blurring, by computing the normal equations generated from the first or second equations of which the weighting has been changed in the weight changing step.

INDUSTRIAL APPLICABILITY

As described above, according to the present invention, images and the like closer approximating real world signals can be obtained.

The invention claimed is:

1. A signal processing device comprising:
a processing region setting unit configured to set a processing region to be processed, with regard to second signals of second dimensions that are fewer than first dimensions had by first signals which are real world signals and are projected whereby a part of the continuity of said real world signals is lost;
a continuity setting unit configured to set the continuity of the real world signals that has been lost in said second signals;
an actual world estimating unit configured to estimate signals of said real world, corresponding to said second signals within a processing region set by said processing regions setting unit, according to the continuity set by said continuity setting unit;
an information supplying unit configured to supply information relating to at least one of said processing region, said continuity, and said real world signals, to said processing region setting unit, said continuity setting unit, or said actual world estimating, in accordance with user operations; and
an image generating unit configured to generate images with light signals estimated by said actual world waveform estimating unit;
wherein said processing region setting unit is configured to set said processing region regarding image data wherein real world light signals have been projected in a plurality of pixels having a temporal or spatial integration effects, whereby a part of the continuity of the real world light signals has been lost, said continuity setting unit is configured to set the continuity of the real world light signals lost in said image data, said actual world estimating unit is configured to estimate said real world light signals by modeling said real world light signals corresponding to said image data within said processing region, said information supplying unit is configured to supply again information relating to at least one of said processing region, said continuity, and said real world signals, to said processing region setting unit, said continuity setting unit, or said actual world estimating unit, in accordance with user operations, following displaying of said image on a display unit configured to display the images generated by the image generating unit.

2. The signal processing device according to claim 1, wherein said continuity setting unit is configured to set the movement of an object within said image data corresponding to the continuity of the real world light signals lost in said image data, corresponding to information supplied from said information supplying unit; and wherein said actual world estimating unit includes a model generating unit configured to generate a relation model which models the relation between the pixel values of each of the pixels within said image data, and said real world light signals, corresponding to said processing region and said movement, an equation generating unit configured to generate equations by substituting the pixel values of each of the pixels within said image data as to the relation model generated by said model generating unit, and an actual world waveform estimating unit configured to estimate said real world light signals by computing equations generated by said equation generating unit.

3. The signal processing device according to claim 1, wherein said continuity setting unit is configured to set the spatial direction of an object within said image data corresponding to the continuity of the real world light signals lost in said image data, corresponding to information supplied from said information supplying unit; and wherein said actual world estimating unit includes a model generating unit configured to generate a relation model which models the relation between the pixel values of each of the pixels within said image data, and said real world light signals, assuming that the pixel values of each of the pixels corresponding to a position in at least one dimensional direction of the time-space directions of an approximation model which models the waveform of said real world light signals corresponding to said the image data, are obtained by integrating said approximation model in said at least one dimensional direction, corresponding to said processing region and said spatial direction, an equation generating unit configured to generate equations by substituting the pixel values of each of the pixels within said image data as to the relation model generated by said model generating unit, and an actual world waveform estimating unit configured to estimate said real world light signals by computing equations generated by said equation generating unit.

4. The signal processing device according to claim 3, wherein said model generating unit is configured to generate said relation model, assuming that the pixel values of each of the pixels corresponding to a position in at least one dimensional direction of the time-space directions of said approximation model of said light signal waveform, are obtained by integrating said approximation model in said at least one dimensional direction, with regard to each of a plurality of types of approximation models wherein said real world light signals corresponding to said image data have been modeled using polynomials of a plurality of types of orders, corresponding to said processing region and said spatial direction, and wherein said equation generating unit is configured to generate equations by substituting pixel values as to relation models generated regarding each of said plurality of types of approximation models, and wherein said actual world waveform estimating unit is configured to estimate a plurality of waveforms of said real world light signals, by computing equations regarding each of said plurality of types of approximation models generated by said equation generating unit, and wherein said signal processing device further comprises an image generating unit configured to generate a plurality of images, based on said plurality of light signal waveforms estimated by said actual world waveform estimating unit, and the display unit configured to display said plurality of images generated by said image generating unit, and wherein said models generating unit is configured to further set orders of the polynomials of approximation models modeling said real world light signals corresponding to said the image data, based on information supplied from said information supplying unit in the event that said user has performed an operation for selecting one of said plurality of images.

5. The signal processing device according to claim 1, wherein said continuity setting unit is configured to a plurality of continuities according to information supplied from said information supplying unit, and wherein said actual world estimating unit is configured to estimate a plurality of said real world light signals by modeling said real world light signals corresponding to said the image data within said processing region, corresponding to each of said plurality of continuities, and wherein said display unit is configured to display each of the plurality of images corresponding to said plurality of real world light signals generated by said image generating unit, and wherein said continuity setting unit is configured to set continuity based on information supplied from said information supplying unit in the event that said user has performed an operation for selecting one of said plurality of images.

6. The signal processing device according to claim 1, wherein said processing regions setting unit is configured to set a plurality of processing regions according to the characteristics of the image data selected in the event that said user has performed an operation for selecting image data, and further sets a processing region according to user operations in the event that said user has performed an operation for selecting one of processing results corresponding to said plurality of processing regions.

7. A signal processing method comprising:

setting a processing region with a processing region setting unit configured to set said processing-region, with regard to second signals of second dimensions that are fewer than first dimensions had by first signals which are real world signals and are projected whereby a part of the continuity of said real world signals is lost, wherein said setting a processing region includes setting said processing region regarding image data wherein real world light signals have been projected in a plurality of pixels having a temporal or spatial integration effects, whereby a part of the continuity of the real world light signals has been lost, said continuity setting unit is configured to set the continuity of the real world light signals lost in said image data;

setting said continuity with a continuity setting unit configured to set the continuity of the real world signals that has been lost in said second signals;

estimating step for estimating signals of said real world with a world estimating unit configured to estimate signals of said real world, corresponding to said second signals within a processing region set in said processing regions setting step, according to the continuity set in said setting said continuity, said estimating includes estimating said real world light signals by modeling said real world light signals corresponding to said image data within said processing region;

generating images with light signals estimated by said actual world waveform estimating unit;

displaying said images on a display unit configured to display the images generated by the image generating unit;

supplying information relating to at least one of said processing region, said continuity, and said real world signals, to said processing region setting unit, said continuity setting unit, or said actual world estimating unit, in accordance with user operations; and supplying again information relating to at least one of said processing region, said continuity, and said real world signals, to said processing region setting unit, said continuity setting unit, or said actual world estimating unit, in accordance with user operations, following said displaying of said image on the display unit.

8. A computer-readable recording medium storing a program for causing a computer to perform a predetermined signal processing method, said method comprising:

setting a processing region with a processing region setting unit configured to set said processing-region, with regard to second signals of second dimensions that are fewer than first dimensions had by first signals which are real world signals and are projected whereby a part of the continuity of said real world signals is lost, wherein said setting a processing region includes setting said processing region regarding image data wherein real world light signals have been projected in a plurality of pixels having a temporal or spatial integration effects, whereby a part of the continuity of the real world light signals has been lost, said continuity setting unit is configured to set the continuity of the real world light signals lost in said image data;

setting said continuity with a continuity setting unit configured to set the continuity of the real world signals that has been lost in said second signals;

estimating signals of said real world with a world estimating unit configured to estimate signals of said real world, corresponding to said second signals within a processing region set in said processing regions setting step, according to the continuity set in said setting said continuity, said estimating includes estimating said real world light signals by modeling said real world light signals corresponding to said image data within said processing region;

generating images with light signals estimated by said actual world waveform estimating unit;

displaying said images on a display unit configured to display the images generated by the image generating unit;

supplying information relating to at least one of said processing region, said continuity, and said real world signals, to said processing region setting unit, said continuity setting unit, or said actual world estimating unit, in accordance with user operations; and supplying again information relating to at least one of said processing region, said continuity, and said real world signals, to said processing region setting unit, said continuity setting unit, or said actual world estimating unit, in accordance with user operations, following said displaying of said image on the display unit.

\* \* \* \* \*